US005233513A

United States Patent [19]

Doyle

[11] Patent Number: 5,233,513

[45] Date of Patent: Aug. 3, 1993

[54] BUSINESS MODELING, SOFTWARE ENGINEERING AND PROTOTYPING METHOD AND APPARATUS

[76] Inventor: William P. Doyle, 117 Sterling Pl., Apt. 15, Brooklyn, N.Y. 11217

[21] Appl. No.: 458,881

[22] Filed: Dec. 28, 1989

[51] Int. Cl.[5] ........................ G06F 15/22; G06F 15/20

[52] U.S. Cl. ..................................... 354/401; 364/408

[58] Field of Search ............... 364/401, 400, 408, 200; 395/700, 500, 82, 925, 922, 50, 51, 54, 60

[56] References Cited

U.S. PATENT DOCUMENTS 4,751,635 6/1988 Kret .................................... 364/200
4,975,840 12/1990 Detore et al. ....................... 364/401

*Primary Examiner*—Roy N. Envall, Jr.
*Assistant Examiner*—Khai Tran
*Attorney, Agent, or Firm*—Bean, Kauffman & Spencer

[57] ABSTRACT

A microprocessor manipulated program which extracts the data inherent in the cognitive process leading to the spoken or written word and converts that data into business models capable of defining the interrelationship and functions of a business. The program models the business and the data thus generated is used to produce application software program code capable of controlling and/or performing all functions of the business. The system springs from The Connected Development Process of Four Dimensional Cognitive Modeling using the four basic linguistic entities of PROCESS and its attendant adjuncts of DATA, CONTROL and SUPPORT.

20 Claims, 131 Drawing Sheets

JOINS FIG. 1B

JOINS FOG. 29A & 29B

JOINS FIG. 33A & 33B

JOINS FIG. 35A & FIG. 35C

JOINS FIG. 49B & 49C

JOINS FIG. 50B & 50C

BUSINESS MODELING, SOFTWARE ENGINEERING AND PROTOTYPING METHOD AND APPARATUS

TECHNICAL FIELD

The present invention relates to modeling of businesses through the application of cognitive linguistic fundamentals and a microprocessor based engine for manipulating the data to create variable business models which are converted to application software for the business.

BACKGROUND OF THE INVENTION

Programming engineering has evolved concurrently with hardware development in the computer industry. Unfortunately, the maturation process has not been equal and hardware sophistication has outpaced program engineering creating an ever increasing disparity where hardware is available to do the most sophisticated processes but the software is lagging or non-existent. To solve this dilemma, numerous attempts have been made to utilize a computer to create software. The prior art approach to computer generated software engineering has been a two pronged approach, that is, data flow modeling is created and then an entity relationship is developed based on that model. The entity relationship in the form of data is used to drive the design, that is, in the prior systems, the deduced data and only the data requirements or end result of the program are used to drive the code generator. This creates numerous problems with the detail processes and results in an unacceptable number of false starts through the trial and error process inherent in such systems.

The multitude of shortcomings inherent in the prior art are overcome by a merger of linguistic and cognitive science which have evolved to a system known as Metavision under the guidance of the patentee. The Metavision system presented herein encompasses the concept of cognitive modeling which creates a business model using a linguistic approach to create algorithms that generate programs in conjunction with expert systems. This is achieved through computational linguistic applications which create a four dimensional cognitive model. The dimensions are process, control, data and support (agents or instruments).

Three general principles underlie this system. They are, first the models need to be cognitive intuitive, that is they must be visualizations of thoughts. Second, the models must be complete, including all four dimensions, process, control, data and support. Finally, the models must have transformability.

The simplest model springs from a single sentence which according to linguistic principles includes a subject, verb and object. In cognitive modeling for computational linguistics applications, the subject is considered the source, the verb the path and the object the target. Thus from a simple sentence, a model and program may be developed. The source is the world knowledge. The path is the various avenues with which the data of the world knowledge flows and is manipulated to create the merged data or end result, the target.

The Metavision system with the aid of an analyst creates models based on world knowledge. These models are then converted to software designs via algorithms that include feedback to the models. Once the software design and models have satisfied all the feedback requirements to stabilize the software design, program code is generated to produce the desire application software based on the design.

The feedback process is enhanced by expert systems that perform diagnostics on the feedback to ensure that the input equals the reference or the end result is met with all of the required inputs modeled or accounted for.

OBJECTIVES OF THE INVENTION

A primary objective of the invention is to provide a method to establish project management controls.

Another objective is to provide a method to determine the scope, objectives and benefits for a business model of management controls.

Another objective is to provide a method to quantify scope limits for a business model of management controls.

Another objective is to provide a method to establish quality indicators for objectives for a business model of management controls.

Another objective is to provide a method to quantify benefits for a business model of management controls.

Another objective is to provide a method to develop a deliverables list for a business model of management controls.

Another objective is to provide a method develop a deliverables list for each phase for a business model of management controls.

Another objective is to provide a method to establish project reviews for a business model of management controls.

Another objective is to provide a method to establish the review and acceptance cycle for a business model of management controls.

Another objective is to provide a method to establish progress reporting for a business model of management controls.

Another objective is to provide a method to establish a change control procedure for a business model of management controls.

Another objective is to provide a method to develop a plan for a business model of management controls.

Another objective is to provide a method to develop a detailed plan for first phase of project for a business model of management controls.

Another objective is to provide a method to develop projects tasks for a business model of management controls.

Another objective is to provide a method to develop manpower loading for a business model of management controls.

Another objective is to provide a method to develop deliverable milestones for a business model of management controls.

Another objective is to provide a method to develop review and acceptance dates for a business model of management controls.

Another objective is to provide a method to develop hardware availability dates for a business model of management controls.

Another objective is to provide a method to develop resource budgets for a business model of management controls.

Another objective is to provide a method to develop a personnel budget for a business model of management controls.

Another objective is to provide a method to develop a facilities budget for a business model of management controls.

Another objective is to provide a method to develop a hardware budget for a business model of management controls.

Another objective is to provide a method to develop a software packages and tools budget for a business model of management controls.

Another objective is to provide a method to develop a money budget.

Another objective is to provide a method to develop interview lists and schedules for a business model of management controls.

Another objective is to provide a method to model current business practices for a business model of management controls.

Another objective is to provide a method to conduct interviews to build process models for a business model of management controls.

Another objective is to provide a method to create process models of line management and reporting job roles by function for a business model of management controls.

Another objective is to provide a method to create process models of higher management levels that line management reports to.

Another objective is to provide a method to create process models of automated computer or mechanical systems for a business of management controls.

A still further objective is to provide a method for creating a business model including process models containing the following information:

process transformations, process sequence and process descriptions;

supporting agents performing process and supporting instruments (tools) used in process;

people or organizational units (group, department, division etc.);

software program module or entire automated software system; computer hardware;

tools: manual tools or automated machines;

support quantification (agents and/or instruments used to perform process);

location of supporting resource and facilities information;

size of supporting resource: quantity of people/computers/tools performing process;

commitment of supporting resource: person/computer/tool hours spent on process per unit of calendar time;

cost of supporting resource: total of (person/computer/tool, unit cost)×(resource commitment);

process efficiency: support time to perform job per 1 unit of output;

process throughput: calendar time to produce 1 unit of output;

process capacity: units of output=(resource commitment)×(throughput);

RFP data consumed and produced by each process;

RFP transfer rules controlling transfers between processes: branching, start, stope and sequence;

RFP goals and objectives or policies and procedures controlling a process;

RFP quality standard (quality indicators) for controlling input data quality: edit rules and tables;

RFP quantification;

name, description and form or report number;

collect DBA information: sizing, volume, security, retention and source database names.

Another objective is to model interviewees' organization with an organization chart showing formal control structure for a business model.

Another objective is to collect example RFP's produced, consumed or controlling processes (reports, forms, databases, policies, procedures, goals and other packets of information) during interviews for a business model.

Another objective is to collect user issues and problems about a current business process model.

Another objective is to model automated systems database schemas (within project scope) for a business model.

Another objective is to load existing system database schemas as business information external schemas for a business model.

Another objective is to enter user supplied definitions and descriptions for database fields and record relationships for a business model.

Collect DBA information: sizing, volume, security, retention and source database names for a business model.

Another objective is to summarize and integrate process models, summarize RFPs and summarize supports for a business model.

Another objective is to summarize first line management and worker process models up into a complete functional processes (including both mgt. control and worker execution) by using 7+/−2 rule for each functional area interviewed. Balance summarized levels RFPs for a business model.

Another objective is to integrate summarized process models from different functional areas by summarizing them into larger complete functional processes with their controlling higher management control processes included. Observe the 7+/−2 rule if actual business follows the rule for a business model.

Another objective is to summarize input/output RFP's on higher level process diagrams by creating part-whole relationships, i.e. create summary data class RFPs on high level process diagrams that own detail RFPs on lower level process diagrams for a business model.

Another objective is to summarize controls RPFs: link high level management goal RFPs with their decomposition into sub-goal RFPs i.e., high level goals own the tactical sub-goals of lower level management for a business model.

Another objective is to summarize supports: higher organizational units own their parts, software systems own their programs, computers own their processors and machines own their parts for a business model.

Another objective is to review models with business units and modify for correctness.

A further objective is to determine changes necessary to optimize current business practice: measure process model.

Another objective is to review issues and problems lists to determine if indicated changes are desirable in a business model.

Another objective is to use models of good industry practice to measure difference with a current business model.

Another objective is to verify control RFPs exist and function for regulatory compliance within a business model.

Another objective is to verify data RFPs exist to feed any proposed increases in information systems within a business model.

Another objective is to verify corporate control stack works: high level goal RFPs own low level objective RFPs and feedback loops exist within a business model.

Another objective is to locate information bottlenecks using process throughput measures.

Another objective is to calculate differences between formal organizational controls (formal organization chart) and actual process control RFPs for a business model.

Another objective is to verify quality indicator RFPs exist for goals and objectives of a business model.

Another objective is to create proposed changes to a current business model.

Another objective is to identify specific changes required to improve deficiencies within a business model including changes and additions to information systems or manual processes.

Another objective is to quantify organizational impact (job function changes etc.) and political cost of a business model.

Another objective is to estimate development cost and development time for changes of a business model.

Another objective is to quantify benefits of changes to a business model.

Another objective is to review proposed changes, modify and obtain user concurrence of a business model.

Another objective is to develop information system architecture plan for proposed changes to a business model.

Another objective is to list new information required to implement changes in a business model.

Another objective is to list new sources and owners of information.

Another objective is to list information integration changes: organizational changes, database changes, software changes, communications changes and computer changes.

Another objective is to list known data quality problems.

Another objective is to develop migration plan to implement proposed changes and estimated schedule.

Another objective is to refine estimated development costs and development time for changes.

Another objective is to review proposed changes, modify and obtain user concurrence.

Another objective is to review a proposed desired business practices model, modify and obtain functional management concurrence.

Another objective is to prepare a desired business practices model presentation.

Another objective is to modify models based on executive management priorities.

Another objective is to prioritize approved projects within a business model of management controls.

Another objective is to develop technical designs to implement information system architecture plan within a business model.

another objective is to choose the best implementation design based on relational projects selection methodology; project phase duration less than nine months; cost effectiveness; availability of resources; people, hardware and software; hardware technology; flexibility: open or closed architecture.

Another objective is to develop implementation schedules for each project within a business model.

Another objective is to transform a business model into a software engineering model.

Another objective is to increase detail of business process model in the area to be improved, i.e. compose more detailed levels.

Another objective is to choose single function business processes in improvement area to automate information creation, read (retrieval), update and delete;

information reporting;

information tracking;

information sharing or transmission;

scheduling;

decision making;

procedures within a business model of management controls.

Another objective is to add computer system specific processes, to a business model.

Another objective is to provide menus of system functions (these will select automatable manual processes and computer specific processes) to programs developed form a business model.

Another objective is to provide automated interfaces to other systems to programs developed from a business model.

Another objective is to provide system error reporting and error recovery to programs developed from a business model.

Another objective is to provide system security to programs developed from a business model.

Another objective is to provide audit log of system transactions to programs developed from a business model.

Another objective is to provide database archival and restoration to programs developed from a business model.

Another objective is to provide database maintenance reports to programs developed from a business model.

Another objective is to provide database optimization to programs developed from a business model.

Another objective is to provide database integrity rule enforcement to programs developed from a business model.

Another objective is to add system function selection transfer rules to menu processes to select all system functions within a business model.

Another objective is to specify transfer rules for all function selections of a business model.

Another objective is to model program logic as necessary for design of a business model.

A further objective is to create a question map to model business data relationships.

Another objective is to create a question map to model business data relationships from created simple sentences identifying the questions the user needs to answer.

Another objective is to create a question map to model business data relationships from grouped like sentences combining all similar information gathered from different sources.

Another objective is to create a question map to model business data relationships from developed population tables identifying role names and set up tables of instances.

Another objective is to create a question map to model business data relationships from uniqueness constraints which eliminate duplicates from tables and ensure the proper level of specificity.

Another objective is to create a question map to model business data relationships from multiple reference roles which determine the unique way to identify roles.

Another objective is to create a question map to model business data relationships from integrity constraints to keep logical consistency between statements about a system and reflect how the enterprise works.

Another objective is to group the question map into a conceptual schema to create the optimal database design.

Another objective is to model menus, screens and reports for use by programs developed from a business model.

Another objective is to specify fields for menu function selection for use by programs developed from a business model.

Another objective is to specify detailed hardware and packaged software requirements selection for use by programs developed from a business model.

Another objective is to produce database design documentation for use by programs developed from a business model.

Another objective is to generate application software system from SE models for use by programs developed from a business model.

SUMMARY OF THE INVENTION

A unique merger of linguistic and cognitive science has lead to a revolutionary realization integrating business management planing, business execution and management/operational software development. This is achieved through a microprocessor manipulated program which extracts the data inherent in the cognitive process leading to the spoken or written word and converts that data into business models capable of defining the interrelationship and functions of every member of a business from the director to the shipping clerks and floor sweepers. The thoroughness with which the program models the business and its operations is capitalised on by the program which uses the data it generated to produce application software program code capable of controlling and/or performing any and all functions of the business. A dynamic relationship is created between the business model and developed programs which allows prototyping of all business activities and the investigation of any eventuality followed by generation of new code and programs as needed to follow business growth or change. The system springs from The Connected Development Process of Four Dimensional Cognitive Modeling using the four basic linguistic entities of PROCESS and its attendant adjuncts of DATA, CONTROL and SUPPORT. To simplify the detailed description of this revolutionary approach, the forgoing concepts are embodied in the newly coined word "MetaVision", which shall be used through out this patent to convey the notion of the entity of the applicants invention.

The Metavision program embodies a general knowledge modeling system incorporating four Dimensional Cognitive Modeling and a built-in process for creating the models and automatically generating application software systems from them. The process is the Connected Development Process which requires the execution of the following nine basic steps:

Step 1. "WHAT-IS" Business users create a Metavision Process Model of their job or the jobs of a work group by providing Metavision with the individual workers job steps for each job, the information each worker needs to know to do the job and the information produced by doing the job. The goals and objectives of each job are also provided to the Metavision modeler. An organizational model is created by having users enter the names and titles of the individuals they report to. To enter job process and organization informations, a user will select Metavision prototype job processes and then respond to the Metavision dialogue that follows about the particulars of their job. This results in a Metavision "what-is" model of how the business currently operates.

Step 2. "WHAT-SHOULD-BE" The business user or the work group measure problems in the Metavision "what-is" process model of their jobs by running a variety of Metavision analysis reports that identify job problems like poor management control, lack of information needed to a job and information bottlenecks that slow job performance. For example, the formal organization chart created in the preceding step is matched against the actual organizational controls on the process models. The users improve their job process by changing the "what-is" model based on problems identified. These changes may include both improvements in the jobs performed by the workers and computer automation of some job steps. New reports, forms or packets of information may be required. They will be added together with the new processes that create them, during this step. If a job step is to be automated then it is tagged for further attention. This results in a Metavision "what-should-be" model.

As a result of a "what-should-be" model, a list of the new information in the proposed automated systems together with its sources and relationships to other information is automatically generated by Metavision. This is called and Information Systems Architecture and it will be used to help prioritize projects.

Step 3. "WHAT-TO-DO" the "what-to-do" model is approved or modified by management. In the case of automated systems, management will either decide to automate or not by removing or adding the automated process tags attached in the preceding step. The information systems architecture developed in the previous step is used to prioritize projects since it shows which automated systems must be done first to feed information to later systems. This produces a Metavision "what-to-do" model of specific projects (some of which will be automated systems) and project priorities that the organization has validated.

Step 4. "HOW-TO-DO-IT" In this step, the users will choose "how-to-do-it" by picking the kind of computer, computer language and database system that the automated system will be generated into. This is done by making the appropriate selections from the Metavision menus.

Step 5. "SHOULD-BE-SOFTWARE-PROCESS-MODEL" The next project from "what-to-do" list is selected and the job steps to be automated are composed into greater detail until each job step is at a single function level of detail. Examples of single function job steps are report preparation or creation of new information. A business user does this by selecting Metavision prototype single function job processes and then responding to the Metavision dialogue that follows about the particulars of their job.

The user next adds the extra processes required by a well designed computer system, but that would not otherwise be a part of the business users job such as database reorganization and password security. Menu selections processes are not added at this stage, but in the next step. These, like prototypical job processes, can be selected from a list. However, the Metavision product will provide suggested selections if asked.

Step 6. "SHOULD-BE-CONTROL-LOGIC-MODEL" All the single function processes that will be automated must now be linked to menus that enable a system user to select them. The Metavision product can generate a default menu selection system or the business user can create new selection processes by selecting prototype menu selection processes from the Metavision product process option list. These processes are interconnected with control RFP arrows that contain the transfer of control rules.

Step 7. QUESTION MAP USER RFPs During this step a complete three schema data model for all programs, screens, menus, reports, databases and inter-programs transfers of data is automatically generated from the set of questions that a business user requires the information system to answer. These questions are transformed into declarative sentences and entered, in English, into the Metavision product. They are then parsed into a fifth normal form data model.

More sentences instances of the central question sentences are now collected from a business user. These instances are used by the Metavision product to develop a model of permissible value ranges for the subjects and objects in sentences. The Metavision product also uses them to automatically generate test data sets, record population control files, table validations and update edit rules.

another dialogue with the business user now takes place about how the user uniquely identifies the subjects and objects in the central question sentences. The business user must also engage in a dialogue about references to information shared between two or more question sentences. The answers to these questions are used by the Metavision product to calculate database relations, indexes, keys, navigational paths and referential integrity constraints. The product also uses them to calculate report or screen root files and relational updaters.

After these calculations are complete the Metavision product automatically generates a third normal form logical database design and corresponding third normal for external (Physical) database structure.

Step 8. MODEL, MENUS, SCREENS AND REPORT RFPs Select and interface standard and the hardware and software configurations to support the selected interface. Based on the specified interface standard, the screen is painted by selecting the database fields from a picture of the database.

Step 9. GENERATE SYSTEM Select processes to be automated from the list and the code will be automatically generated.

The nine steps outlined above are preformed by individuals under the direction of a master plan provided by a book of directions or a MetaVision modeler and entails the running of the MetaVision program to process inputs from the individuals. To simplify the detailed explanation of MetaVision, the steps are expanded first as the detailed steps preformed to produce the input to the program and then as the steps and routines performed by the program.

BRIEF DESCRIPTION OF THE DRAWINGS

The standards of legibility require that some diagrams be divided into a plurality of sheets. To maintain continuity, all of the sheets which comprise a single diagram are given the same figure number with a letter suffix to identify individual sheets. Key letters are provided on individual sheets to assist in joining the sheets that comprise a single diagram. In the "Brief Description Of The Drawings" which follows, only the basic figure number, without letter suffixes, is provided to indicate substance of the diagram. Continuity is maintained between the plural sheets for a single diagram by "Joins Figure" notations where applicable.

DESCRIPTION OF THE PREFERRED EMBODIMENT

Figure 1A:
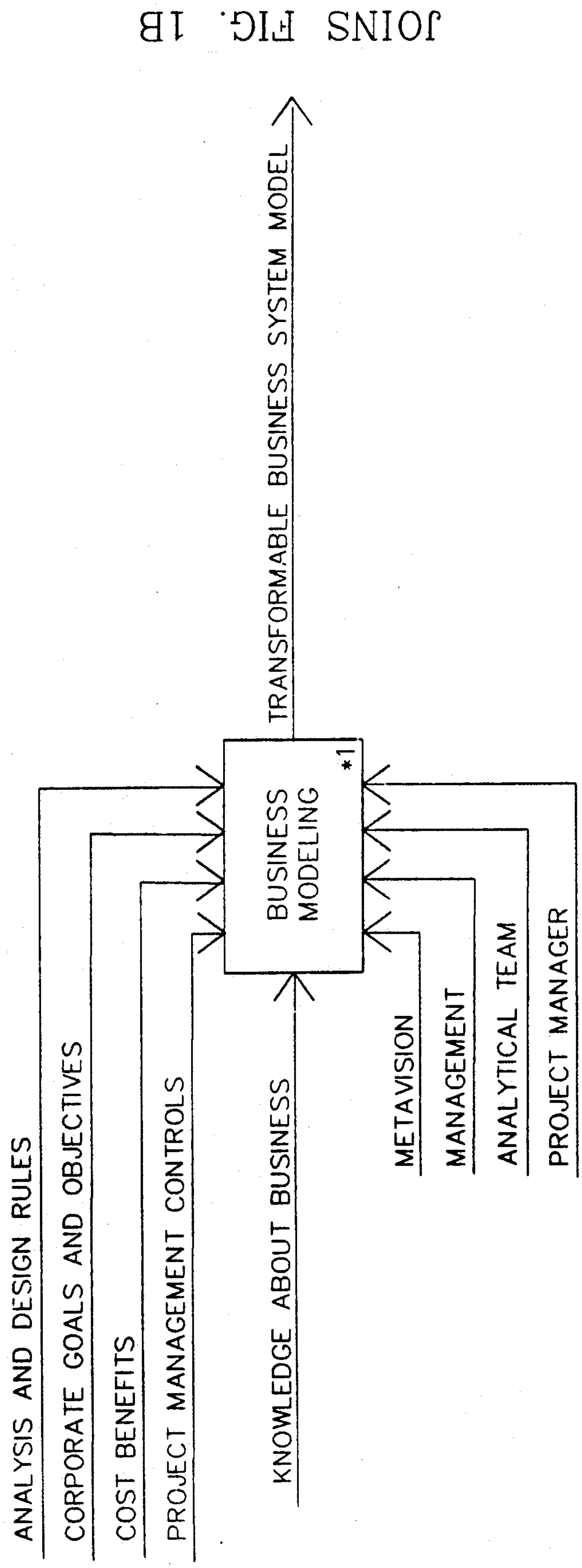
FIGS. 1A, 1B and 1C make up for FIG. 1 which is a functional diagram of the Building Management Systems.

A unique merger of linguistic and cognitive science has lead to a revolutionary realization integrating business management planing, business execution and management/operational software development. This is achieved through a microprocessor manipulated program which extracts the data inherent in the cognitive process leading to the spoken or written word and converts that data into business models capable of defining the interrelationship and functions of every member of a business from the director to the shipping clerks and floor sweepers. The thoroughness with which the program models the business and its operations is capitalized on by the program which uses the data it generated to produce application software program code capable of controlling and/or performing any and all functions of the business. A dynamic relationship is created between the business model and developed programs which allows prototyping of all business activities and the investigation of any eventuality followed by generation of new code and programs as needed to follow business growth or change. The system springs from The Connected Development Process of Four Dimensional Cognitive Modeling using the four basic linguistic entities of PROCESS and its attendant adjuncts of DATA, CONTROL and SUPPORT. To simplify the detailed description of this revolutionary approach, the forgoing concepts are embodied in the newly coined word "MetaVision", which shall be used through out this patent to convey the notion of the entity of the applicants invention.

The Metavision program embodies a general knowledge modeling system incorporating four Dimensional Cognitive Modeling and a built-in process for creating the models and automatically generating application software systems from them. The process is the Connected Development Process which requires the execution of the following nine basic steps:

Step 1. "WHAT-IS" Business users create a Metavision Process Model of their job or the jobs of a work group by providing Metavision with the individual workers job steps for each job, the information each worker needs to know to do the job and the information produced by doing the job. The goals and objectives of each job are also provided to the Metavision modeler. An organizational model is created by having users enter the names and titles of the individuals they report to. To enter job process and organization informations, a user will select Metavision prototype job processes and then respond to the Metavision dialogue that follows about the particulars of their job. This results in a Metavision "what-is" model of how the business currently operates.

Step 2. "WHAT-SHOULD-BE" The business user or the work group measure problems in the Metavision "what-is" process model of their jobs by running a variety of Metavision analysis reports that identify job problems like poor management control, lack of information needed to a job and information bottlenecks that slow job performance. For example, the formal organization chart created in the preceding step is matched against the actual organizational controls on the process models. The users improve their job process by changing the "what-is" model based on problems identified. These changes may include both improvements in the jobs performed by the workers and computer automation of some job steps. New reports, forms or packets of information may be required. They will be added together with the new processes that create them, during this step. If a job step is to be automated then it is tagged for further attention. This results in a Metavision "what-should-be" model.

As a result of a "what-should-be" model, a list of the new information in the proposed automated systems together with its sources and relationships to other information is automatically generated by Metavision. This is called and Information Systems Architecture and it will be used to help prioritize projects.

Step 3. "WHAT-TO-DO" the "what-to-do" model is approved or modified by management. In the case of automated systems, management will either decide to automate or not by removing or adding the automated process tags attached in the preceding step. The information systems architecture developed in the previous step is used to prioritize projects since it shows which automated systems must be done first to feed information to later systems. This produces a Metavision "what-to-do" model of specific projects (some of which will be automated systems) and project priorities that the organization has validated.

Step 4. "HOW-TO-DO-IT" In this step, the users will choose "how-to-do-it" by picking the kind of computer, computer language and database system that the automated system will be generated into. This is done by making the appropriate selections from the Metavision menus.

Step 5. "SHOULD-BE-SOFTWARE-PROCESS-MODEL" The next project from "what-to-do" list is selected and the job steps to be automated are composed into greater detail until each job step is at a single function level of detail. Examples of single function job steps are report preparation or creation of new information. A business user does this by selecting Metavision prototype single function job processes and then responding to the Metavision dialogue that follows about the particulars of their job.

The user next adds the extra processes required by a well designed computer system, but that would not otherwise be a part of the business users job such as database reorganization and password security. Menu selections processes are not added at this stage, but in the next step. These, like prototypical job processes, can be selected from a list. However, the Metavision product will provide suggested selections if asked.

Step 6. "SHOULD-BE-CONTROL-LOGIC-MODEL" All the single function processes that will be automated must now be linked to menus that enable a system user to select them. The Metavision product can generate a default menu selection system or the business user can create new selection processes by selecting prototype menu selection processes from the Metavision product process option list. These processes are interconnected with control RFP arrows that contain the transfer of control rules.

Step 7. QUESTION MAP USER RFPs During this step a complete three schema data model for all programs, screens, menus, reports, databases and inter-programs transfers of data is automatically generated from the set of questions that a business user requires the information system to answer. These questions are transformed into declarative sentences and entered, in English, into the Metavision product. They are then parsed into a fifth normal form data model.

More sentences instances of the central question sentences are now collected from a business user. These instances are used by the Metavision product to develop a model of permissible value ranges for the subjects and objects in sentences. The Metavision product also uses them to automatically generate test data sets, record population control files, table validations and update edit rules.

Another dialogue with the business user now takes place about how the user uniquely identifies the subjects and objects in the central question sentences. The business user must also engage in a dialogue about references to information shared between two or more question sentences. The answers to these questions are used by the Metavision product to calculate database relations, indexes, keys, navigational paths and referential integrity constraints. The product also uses them to calculate report or screen root files and relational updaters.

After these calculations are complete the Metavision product automatically generates a third normal form logical database design and corresponding third normal for external (Physical) database structure.

Step 8. MODEL, MENUS, SCREENS AND REPORT RFPs Select and interface standard and the hardware and software configurations to support the selected interface. Based on the specified interface standard, the screen is painted by selecting the database fields from a picture of the database.

Step 9. GENERATE SYSTEM Select processes to be automated from the list and the code will be automatically generated.

The nine steps outlined above are preformed by individuals under the direction of a master plan provided by a book of directions or a MetaVision modeler and entails the running of the MetaVision program to process inputs from the individuals. To simplify the detailed explanation of MetaVision, the steps are expanded first as the detailed steps preformed to produce the input to the program and then as the steps and routines performed by the program.

To provide a logical presentation of the steps involved in executing the Metavision System, this specification presents an overview of the equipment required, how the software is loaded into the equipment, how the various programs are invoked and the functions of the programs and routines. A glossary of terms is included to standardize nomenclature before the features of the Metavision Business Modeling software are presented. A detailed presentation of the four dimensions of BUSINESS MODELING WITH METAVISION follows to provide a complete understanding of the concepts involved. Next, a sample project provides 'how-to' detailed steps a user should execute to carry out the types of analysis and automated software development obtainable through the Metavision system. This is followed by a functional description of the operations performed by the Metavision program in executing the sample project.

Details on installing and invoking the MetaVision software and Metavision fundamentals, including the use of the mouse and keyboard, the nature of Metavision pull-down menus and dialog boxes, plotting diagrams, the setup for printing reports, file import/merge and export, and the Metavision Help system follow.

In order to operate the version of MetaVision provided herein as a typical reduction to practice of the applicants invention, you must have an IBM PC or AT compatible computer with 640 kilobytes of memory with at least 520 kilobytes available for MetaVision, a hard disk, some type of video graphics adapter, a 25-pin parallel port and a graphics monitor. You must be running MS-DOS or PC-DOC 3.0 or later. A mouse as a pointing device is highly recommended. Hardcopy output may be produced on various printers and plotters.

An installation program is used which contains video device drivers for the following graphics adapters: IBM CGA, EGA and VGA, A.T.& T. 6300, Hercules, Compaq III and Toshiba 3100. All of the video device drivers are used in monochrome mode except the EGA and VGA device drivers. Microsoft, Mouse Systems, Visi-On, and IBM Personal System/2 mouse drivers are included. Hardcopy device drivers are included for Epson printers, for the Hewlett Packard Laser Jet+ printer, and for Hewlett Packard plotters. A variety of other device drivers are available Initial installation of MetaVision requires the loading of MetaVision software onto the hard disk, the modification of the CONFIG.SYS file to load the device drivers required by MetaVision, and the modification of the AUTOEXEC.BAT file.

The MetaVision installation programs may be provided double sided/double density 5¼" floppy diskettes or 9 high-density 5 ¼" or 3½" diskettes or any equipment compatible media. The following description of the installation procedure assumes that MetaVision is being installed from double sided/double density diskettes; the procedure for high density source media differs only by virtue of involving fewer diskettes. Since the difference in numbers of diskettes is reflected in the individual installation prompts, it will always be clear which particular diskette to insert at any given point in the installation procedure.

The first step in implementing the invention is to install MetaVision on a drive using the MetaVision Installation program by inserting the program containing disk into the operational drive and typing INSTALL $N_1$: $N_2$:. This invokes the program and the first parameter tells the installation procedure which drive to read files from. The second parameter specifies the drive to which the files should be copied. A third parameter may be used to indicate whether it is a new installation or an upgrade.

The program creates a batch file with a subdirectory named METAVISI on the hard disk and copies the MetaVision files into that subdirectory.

The examples presented assumes that you are reading from drive A:.

As the batch file begins execution, the following message will appear:

MetaVision Installation Procedure
Checking for existing files . . . .
Creating directories and copying files . . .
Strike a key when ready . . .

At this point, after you strike a key, the METAVISI(ON) subdirectory will be created on your hard disk, and MetaVision files on MetaVision Installation Disk 1 will be copied to the subdirectory. After files from the first disk are copied, you will be prompted to insert additional disks one by one and files will be copied from these disks. As long as either the hard disk or floppy disk drive lights are lit, the copying process is going on.

When all of the files have been copied from MetaVision Installation Disk 1, the following message will appear:

Insert MetaVision Installation Disk 2 into drive A . . .
Strike a key when ready . . .

Remove MetaVision Installation Disk 1 and insert MetaVision Installation Disk 2 into drive A and strike any key. When all of the files have been copied from MetaVision Installation Disk 2, the following message will appear:

Insert MetaVision Graphics Disk 1 into drive A . . .
Strike a key when ready . . .

Remove MetaVision Installation Disk 2 and insert MetaVision Graphics Disk 1 into drive A and strike any key. When all of the files have been copied from MetaVision Graphics Disk 1, the following message will appear:

Insert MetaVision Graphics Disk 2 into drive A . . .
Strike a key when ready . . .

Remove MetaVision Graphics Disk 1 and insert MetaVision Graphics Disk 2 into drive A and strike any key. When all of the files have been copied from MetaVision Graphics Disk 2, the following message will appear:

Insert MetaVision Database Disk 1 into drive A . . .
Strike a key when ready . . .

Remove MetaVision Graphics Disk 2 and insert MetaVision Database Disk 1 into drive A and strike any key. The file names of the database files will be echoed as they are being copied. When all of the files have been copied from MetaVision Database Disk 1, the following message will appear:

Insert MetaVision Database Disk 2 into drive A . . .

Strike a key when ready . . .

Remove MetaVision Database Disk 1 and insert MetaVision Database Disk 2 into drive A and strike any key. When all of the files have been copied from MetaVision Database Disk 2, the following message will appear:

Insert MetaVision .EXE Disk 1 into drive A . . .
Strike a key when ready . . .

Remove MetaVision Database Disk 2 and insert MetaVision .EXE Disk 1 into drive A and strike any key. When all of the files have been copied from MetaVision .EXE Disk 1, the following message will appear:

Insert MetaVision .EXE Disk 2 into drive A . . .
Strike a key when ready . . .

Remove MetaVision .EXE Disk 1 and insert MetaVision .EXE Disk 2 into drive A and strike any key. When all of the files have been copied from MetaVision .EXE Disk 2, the following message will appear:

Insert MetaVision .EXE Disk 3 into drive A . . .
Strike a key when ready . . .

Remove MetaVision .EXE Disk 2 and insert MetaVision .EXE Disk 3 into drive A and strike any key. When all of the files have been copied from MetaVision .EXE Disk 3, the following instructions will be displayed:

Insert MetaVision .EXE Disk 4 into drive A . . .
Strike a key when ready . . .

Remove MetaVision .EXE Disk 3 and insert MetaVision .EXE Disk 4 into drive A and strike any key. When all of the files have been copied from MetaVision .EXE Disk 4, the following instructions will be displayed:

Insert MetaVision Help Disk 1 into drive A . . .
Strike a key when ready . . .

Remove MetaVision .EXE Disk 4 and insert MetaVision Help Disk 1 into drive A and strike any key. The file names of the Help System files will be echoed as they are being copied. When all of the files have been copied from MetaVision Help Disk 1, the following message will appear:

Insert MetaVision Help Disk 2 into drive A . . .
Strike a key when ready . . .

Remove MetaVision Help Disk 1 and insert MetaVision Help Disk 2 into drive A and strike any key. The Help System file names will be echoed as they are being copied. When all of the files have been copied from MetaVision Help Disk 2 and the Help file build is completed, the following message will appear:

Insert MetaVision Prototype Disk 1 into drive A . . .
Strike a key when ready . . .

Remove MetaVision HELP Disk 2 and insert MetaVision Prototype Disk 1 into drive A and strike any key. When all of the files have been copied from MetaVision Prototype Disk 1, the following instructions will be displayed:

Insert MetaVision Prototype Disk 2 into drive A . . .
Strike a key when ready . . .

Remove MetaVision Prototype Disk 1 and insert MetaVision Prototype Disk 2 into drive A and strike any key. When all of the files have been copied from MetaVision Prototype Disk 2, the following instructions will be displayed:

Insert MetaVision Prototype Disk 3 into drive A . . .
Strike a key when ready . . .

Remove MetaVision Prototype Disk 2 and insert MetaVision Prototype Disk 3 into drive A and strike any key. When all of the files have been copied from MetaVision Prototype Disk 3, the following instructions will be displayed:

The files necessary for METAVISION have been copied.

Before METAVISION can be run, you must set up METAVISION files AUTOEXEC.BAT and CONFIG.SYS.

After the AUTOEXEC.BAT and CONFIG.SYS files have been set up, you must re-boot the system before you can run METAVISION. Be sure to install the MetaVision Software Protection Device on the parallel port. This completes the METAVISION Installation Procedure.

To run METAVISION, type the following commands after re-booting the system and installing the Software Protection Device:

```
CD \METAVISI
METAVISI
```

This is the end of the automatic portion of the MetaVision installation procedure. You must now set up the CONFIG.SYS and AUTOEXEC.BAT files as follows.

A SOFTWARE CONFIGURATION message is displayed at the end of the software installation procedure. It gives instructions on the need to replace or alter two files in the root directory of your hard disk: the AUTOEXEC.BAT file and the CONFIG.SYS file.

The AUTOEXEC.BAT file is automatically executed by DOS when your system is booted (turned on); the CONFIG.SYS file instructs DOS to load the listed device drivers and to set the number of DOS files and buffers.

An AUTOEXEC.BAT file and a CONFIG.SYS file are created in the METAVISI subdirectory by the MetaVision Installation procedure. The commands in these files must be incorporated into AUTOEXEC.BAT and CONFIG.SYS files, or the files themselves must be substituted for your existing AUTOEXEC.BAT and CONFIG.SYS files. Since they affect what happens when your computer is booted, you will have to reboot the system after making the changes.

The following is the sample AUTOEXEC.BAT file copied to the METAVISION subdirectory by the MetaVision Installation procedure:

```
path c:\;c:\METAVISI
prompt $p$g
REM set location of font files:
```

SET FONTS=C:\METAVISI REM set the upper 128 characters for
display
drivers:
GRAFTABL
REM set serial mouse parameters
REM SET MOUSE=VISMOUSE
REM SET VISMOUSE=COM2
REM plotter parameters
REM mode com1:96,n,8,1,p
REM mode com2:96,n,8,1,p
REM set plotter=hpplot REM set hpplot=com2

The first line is a DOS command to include the METAVISI directory in the search path. This line is required.

The next line is a DOS command to display the path of the current directory as the prompt. This line is optional.

The next two lines inform MetaVision where the graphics font files are located. These lines are required.

The next two lines set the upper 128 characters for display drivers. These lines are optional.

The next three lines are examples of how to inform MetaVision that a mouse is attached to serial port COM2 rather than COM1. The example is for a Visi-On mouse. This is necessary only if you are using a Visi-On or Mouse Systems mouse and it is attached to COM2. If you do not have one of these mice, you may delete these lines.

The last set of lines deals with setting parameters for an attached Hewlett Packard plotter. There are examples of mode statements for COM1 and COM2. If you have a plotter, you may use the one which references the serial port to which the plotter is attached. If your plotter is attached to COM2, the last two lines must be included to inform METAVISION of this. If you do not have a Hewlett Packard-compatible plotter, you may delete this set of lines.

If other statements in your AUTOEXEC.BAT file invoke memory-resident programs, be sure that at least 520 kilobytes are left free for use by MetaVision.

The following is the sample CONFIG.SYS file copied to the METAVISION subdirectory by the MetaVision Installation procedure:

BUFFERS=20
FILES=20
DEVICE=C:\METAVISI\MOUSE.SYS
DEVICE=C:\METAVISI\MSMOUSE.SYS /GROUP:INPUT
DEVICE=C:\METAVISI\MOUSESYS.SYS /GROUP:INPUT
DEVICE=C:\METAVISI\VISMOUSE.SYS /GROUP:INPUT
DEVICE=C:\METAVISI\PS2MOUSE.SYS /GROUP:INPUT
DEVICE=C:\METAVISI\IBMEGA.SYS /GROUP:OUTPUT
DEVICE=C:\METAVISI\IBMBW.SYS /GROUP:OUTPUT
DEVICE=C:\METAVISI\IBMVGA11.SYS /GROUP:OUTPUT
DEVICE=C:\METAVISI\IBMVGA12.SYS /GROUP:OUTPUT
DEVICE=C:\METAVISI\HERCBW.SYS /GROUP:OUTPUT
DEVICE=C:\METAVISI\CGI6300B.SYS /GROUP:OUTPUT

DEVICE=C:\METAVISI\COMPAQ3.SYS /GROUP:OUTPUT
DEVICE=C:\METAVISI\T3100.SYS /GROUP:OUTPUT
DEVICE=C:\METAVISI\HPPLOT.SYS /GROUP:OUTPUT
DEVICE=C:\METAVISI\EPSONLQ.SYS /GROUP:OUTPUT
DEVICE=C:\METAVISI\EPSONX.SYS /GROUP:OUTPUT
DEVICE=C:\METAVISI\FONTDRV.SYS /GROUP:FONTS
DEVICE=C:\METAVISI\GSSCGI.SYS /T

This file instructs DOS to load the device drivers needed by METAVISION. Device drivers are needed for input devices such as mice, for the graphics display, and for output devices such as printers or plotters which you may be using. Device drivers contain logic to access specific devices. Not all of the lines in this section should be retained in your final CONFIG.SYS file; lines dealing with devices which you do not have should be deleted. You may also delete any device drivers which you will not be using from the METAVISION subdirectory.

The first two lines of the CONFIG.SYS file are DOS commands to set the number of files and buffers. It is necessary to set FILES=20. The buffers number may be varied if desired. Consult your MS-DOS or PC-DOS manual for more information about these two statements. If you are using disk caching software, you may be able to omit the BUFFERS statement. Consult the disk caching software manual. Disk caching significantly enhances the performance of MetaVision. If you are not using disk caching software, the buffers number should be greater than 20.

The remaining lines all use the "DEVICE" keyword. These statements instruct DOS to load the device drivers required by METAVISION and tell DOS where to find the device driver files.

The last two lines are required lines. They refer to the font device driver and the main graphics device driver.

The first group of device drivers refers to input devices, namely, mice. If you have a Microsoft Mouse, include the first two lines in this section—the MOUSE.SYS driver and the MSMOUSE.SYS driver—in your final CONFIG.SYS file, and delete the other two lines ending with /GROUP:INPUT.

If you have a Mouse Systems Mouse, include the MOUSESYS.SYS driver and delete the other lines referring to /GROUP:INPUT.

If you have a Visi-On Mouse, use the VISMOUSE.SYS device driver and delete the other lines referring to /GROUP:INPUT.

If you have no mouse, you may delete all of the lines ending with /GROUP:INPUT. This will allow you to use the cursor keys on the keyboard to point and the alphanumeric keys to 'click' for selection purposes.

The next set of device drivers—those lines which end with /GROUP:OUTPUT—refer to output devices. Of this set, the first group of lines refers to different display screens, the second group to printers and plotters.

You must have some type of graphics adapter in order to run METAVISION.

The first device driver in the first group is IBMEGA.SYS. This is the EGA (Extended Graphics Adapter) video device driver. If your system has an EGA graphics adapter and monitor, use this line and delete the rest of the lines in this section.

If you have a CGA (Color Graphics Adapter)-compatible graphics adapter, you may use the IBMBW.SYS device driver. This driver will use the CGA adapter in high resolution monochrome mode. You may also use this driver with an EGA adapter.

If you have a VGA-compatible graphics adapter, you may use either IBMVGA11.SYS or the IBMVGA12.-SYS device driver. IBMVGA11.SYS is a monochrome device driver, IBMVGA12.SYS a color device driver.

If you have a Hercules-compatible graphics adapter you may use the HERCBW.SYS device driver.

If you have an A.T.& T. 6300-compatible graphics adapter, you may use the CGI6300B.SYS device driver.

If you have a Compaq Portable III, you may use the COMPAQ3.SYS device driver.

If you have a Toshiba 3100, you may use the T3100.SYS device driver.

Additional display drivers are available on request from Applied Axiomatics. If you want to use one of these drivers, obtain a copy from Applied Axiomatics, copy it to the METAVISION subdirectory on your computer and substitute the device driver name in one of the lines of the CONFIG.SYS file.

In all of the above cases, you should delete all the lines in the display section except the one you need for your display. If you are using a video driver other than the IBM CGA, EGA or VGA device driver, add the following line to your AUTOEXEC.BAT file:

The SET VERIFYFONT=OFF command will cause smaller fonts to be used on your drawings.

The second group of output device lines refer to hardcopy devices. If you have a Hewlett Packard Plotter, use the HPPLOT.SYS device driver. If you have an Epson LQ printer (with a 24-pin print head) or a compatible one, use the EPSONLQ.SYS device driver. If you have an Epson EX, FX or MX-compatible printer, use the EPSONX.SYS device driver.

If you have both a printer and a plotter attached to your system, you may keep both lines in your CONFIG.SYS file.

Make the appropriate changes to your AUTOEXEC.BAT and CONFIG.SYS files and reboot your system.

If any disk other than METAVISION Installation Disk 1 is in drive A: when the installation process is initiated, the system will respond as follows:

Insert METAVISION Installation Disk 1 into drive A . . .
Strike a key when ready . . .

The above message will be displayed until METAVISION Installation Disk 1 is inserted into drive A.

In general, if at any point the requested disk is not found to be in the disk drive, the message requesting the disk will be repeated again and again until the correct disk is inserted.

If a METAVISI subdirectory already exists on your hard disk, the following warning will be displayed:

METAVISION Installation Procedure Checking for existing files . . .
WARNING:
METAVISION files may overwrite files in directory METAVISION
Press "Control/C" to terminate the installation or
Strike a key when ready . . .

The MetaVision installation procedure will place files in the METAVISI subdirectory. If you don't want this to happen, hit "Control/C" at this point to abort the installation procedure. You should give the current METAVISION subdirectory a different name. You may then rerun the installation procedure.

If you want the MetaVision files copied to your METAVISION subdirectory, hit any key to continue the installation procedure. The following message will then be displayed:

Creating directories and copying files . . .
Strike a key when ready . . .

When the above message is displayed, you will have another opportunity to abort the installation procedure by hitting "Control/C." To continue, press any key. If you continue, up to three error messages will be displayed:

Unable to create directory
Unable to create directory
Unable to create directory If you omit the New/Upgrade parameter or the destination disk drive parameter, or enter only 'C' instead of 'C:' for the destination disk drive parameter, the following message will be displayed:

Calling sequence A:INSTALL C: N for new installation or
A:INSTALL C: U for upgrade
to install MetaVision on drive C:

Reenter the correct calling sequence, for example:

A:INSTALL C: N.

The exemplary version of the MetaVision system requires about 7 megabytes of disk space plus the disk space for each project being worked on. Each project resides in its own subdirectory. The sole limit on the project subdirectory size is disk space. The average project should run between 250 kilobytes and 1 megabyte.

In order to run MetaVision, you must attach the software protection device included in the installation package to the LPT1 parallel port of your computer system. If you have a printer attached to this port, you may attach the printer cable to the software protection device. This device will not interfere with your printer. If you have a printer attached, it must be powered on and in the ready condition for METAVISION to function properly.

After you have configured your AUTOEXEC.BAT and CONFIG.SYS files, rebooted your system and attached the software protection device, execute MetaVision by typing:

CD METAVISI
METAVISI

To load a project database onto your hard disk, follow these steps:

1) Create a project with a relevant name using the ADD PROJECT selection on the Project Menu. This will create a project subdirectory of the name you specify. See the MetaVision Usage Guide for more information on the Project Menu operations.

2) Exit from MetaVision.

3) Change to the project subdirectory which you just created in the ADD PROJECT operation. For example, if you are loading the IFIP example project database and you entered a subdirectory name of IFIP, to change to the IFIP subdirectory you would enter:

CD IFIP <enter>

4) Insert the MetaVision DATABASE Disk 1 into drive A: of your computer.

5) Invoke the Archive Extraction Program to extract the database files for the project that you wish to retrieve. For example, if you are loading the IFIP example project database, type:

\METAVISI\ARCE A:IFIP.ARC *.* /R <enter>

This will load all of the IFIP project files into the database which you just created. If you want to load one of the other example projects, substitute the correct file name in place of IFIP.ARC in the above statement. Be sure to include the A:.

6) Change back to the MetaVision subdirectory by typing:

CD \METAVISI <enter>

7) Now you may reenter MetaVision, select Process Diagram or the Business Information Diagram, and the Diagramming Activity in order to view the example project.

The Database Definition of MetaVision is also provided on the MetaVision DATABASE Disk 1. It is located in a file called CASEDB.ARC. The above procedure can be used to load this information onto your hard disk into an appropriate project subdirectory which you create.

It is recommended that a mouse be installed to facilitate interaction with MetaVision. Follow the instructions on Installation for installing the needed software.

Whenever a cursor is displayed on the screen, you may move it by means of moving the mouse on a flat surface. Cursors in MetaVision can have a number of different shapes and each of them can have a variety of functions, depending on which menu items have been chosen.

Most, if not all, of the functions are intuitively obvious from the menu option names. The arrow cursor is used for making menu and list selections. The menu selection that will be chosen when you click a mouse button is highlighted so that you know what you are about to select before you select it. The cursor executes the function in question when one of the mouse buttons is clicked. Either the right or left button on the mouse may be used in running MetaVision, since MetaVision does not make a distinction between them. Sometimes a series of clicks is involved in performing a function, with each click invoking a distinct function. For example, manually routing the line connecting two icons on a diagram involves a series of clicks to establish the X and Y axis turning points for the line.

If a mouse is not installed on your computer you may use the arrow keys to move the cursor around on the screen, select menu options, and perform other cursor-related functions by pressing any of the alphanumeric keys in the main portion of the keyboard, including the space bar and ENTER or RETURN key. The up and down arrows move the cursor up and down on the screen; the left and right arrows move it left and right; and the keys on the diagonal of the direction keys move it diagonally on the screen.

There are two modes of cursor movement, fine and coarse, with coarse the default. You may toggle to the other one by pressing the Ins (Insert) key. The fine mode is often necessary to precisely position the cursor on a diagram, as icons are positioned close to each other. Having a mouse attached is the default situation when using MetaVision, and this is reflected in the Helps and documentation. If you do not have a mouse attached, translate all directions involving a mouse to the corresponding keyboard directions.

For example, the frequent direction to click a mouse button should be interpreted to mean press an alphanumeric key, space bar, or ENTER key. If a mouse is not installed and the arrow keys don't move the cursor, check to see whether the NumLck key has been pressed—if NumLck is on, the arrow cursor will not respond to these keys, since they are being interpreted as numbers; pressing the NumLck key again will toggle the arrow keys to being cursor movement keys rather than numbers.

After invoking MetaVision from the DOS prompt, the various functions in MetaVision are accessed via pull-down menus. Menus are ordered from left to right but only the PROJECT and METHOD menus must be accessed in that order, so that, after a project has been chosen or added using the PROJECT menu and a method has been chosen using the METHOD menu, the other menus may be accessed in any order.

This documentation covers the Business Modeling Methodology and only the menu items that are related to Business Modeling will work. If either of the other methods (Software Engineering or Prototyping) is chosen, menus that apply to those methods will appear when selected but they will not be operational.

The main menu options available for each method under each menu header are as follows:

BUSINESS MODELING

ADMIN
- Method Diagram
- Document Management
- Project Management
- Report Writer Process
- Process Diagram
- Process Hierarchy
- What If Data
- Business Info Diagram
- What If Control
- Decision Logic Diagram
- Goals & Objectives Diagram
- What If Support
- Organization Chart
- Terms/Issues/Problems
- What If Prototype
- None

SOFTWARE ENGINEERING

ADMIN
- Method Diagram
- Document Management
- Project Management
- Report Writer Process
- System Design
- Module Relationship
- Data Flow Diagram Data
- Question Map
- Conceptual Schema
- External Schema
- Screen Design
- Report Design Control
- State Transition Diagram
- Program Calls Support
- System Organization Chart Prototype
- None

PROTOTYPING

ADMIN
- Method Diagram
- Document Management
- Project Management
- Report Writer PROCESS
- None DATA
- None CONTROL
- None SUPPORT
- None PROTOTYPE
- dBASE III Prototype
- Database Manager
- Test Data Set
- COBOL Prototype
- CICS Prototype
- Code Generator For all three methods—Business Modeling, Software Engineering, and Prototyping—the main menu also consists of the following standard menu selections:

PROJECT
- Choose Project
- Add Project
- Change Project
- Delete Project
- Change Password
- Quit To select a menu option, move the arrow cursor so that it is close enough to an option so that the option is highlighted, then click a mouse button. For some options, dialog and/or pop-up boxes appear that require either input from the keyboard or the positioning of the cursor and the clicking of a mouse button. A Menu is a set of choices (options) that are displayed by positioning the cursor so that the menu title is highlighted and clicking a mouse button. A particular option may then be chosen by positioning the cursor so that the option is highlighted and clicking a mouse button again. You can usually move the cursor outside the set of options provided by the pull-down menus and select another function.

When another menu is selected, the previously selected menu will be withdrawn automatically.

Dialog Boxes are used to input or edit data using the keyboard. The mouse is not active when you are in a dialog box.

Almost all dialog boxes consist of a header line indicating the four major functions that are available in a dialog box. These functions are invoked by pressing the corresponding function key on the keyboard. F1 refers to the function key labeled F1. F1 HELP invokes the Help system and provides help on the currently displayed dialog box.

F3 LIST provides a list of available responses that have previously been entered and may be chosen for the current box entry. This option is not always available, since it does not apply to some dialog boxes.

5 DONE indicates that the entries for the dialog box are as complete as desired at this time and that the system should process the information that has been entered and include it in the supporting database, either as temporary or permanent data, depending on which dialog box is present.

F10 CANCEL should be pressed when the function supported by the dialog box is not to be performed and any information entered in the dialog box is to be ignored. You will be returned to the screen from which the dialog box appeared without the option that brought up the dialog box having taken effect.

The body of a dialog box consists of a number of input fields for data to be input from the keyboard. Sometimes default values generated by MetaVision will be displayed in one or more of the input fields. Although generated values may be changed, they should normally be accepted as is.

A few basic edit functions are available for entering and changing text in the fields. The Back Space key is a destructive backspace, moving the cursor left and destroying the character to the left. The left and right arrows move the cursor without destroying any previously-entered data. The Home and End keys may be used to position the cursor at the beginning and end of a data field, respectively. The Enter/Return, Tab, or Down Arrow keys may be pressed to proceed to the beginning of the next input field. The Shift-Tab or Up Arrow keys may be pressed to move to the preceding input field. The Insert key may be pressed to insert a space at the position of the cursor. The Delete key may be used to delete characters at the location of the cursor. Note that data pushed off the right of the displayed field is lost.

Some of the entries on a dialog box are required, others are optional; some must be of a specific type (e.g. numeric). Many of the differences will be identified in this documentation and Helps but you will also be given error messages for many incorrect entries, since MetaVision does extensive error-checking on all input data before accepting a value when you press F5.

To select an item from a Selection list, place the arrow cursor in position to highlight the item on the list you wish to select and click a mouse button. If there are more items than will fit in the pop-up screen, you may scroll down the list using the pan bar on the right side of the list. You may cancel choosing an item at this stage by placing the arrow cursor on the word CANCEL in the upper right-hand corner of the pop-up screen and clicking a mouse button. You may obtain help by placing the arrow cursor on the word HELP in the upper left-hand corner of the pop-up screen and clicking a mouse button.

When the desired item is in view, move the mouse so that the arrow cursor is positioned so that the item is highlighted and click a mouse button.

After clicking a mouse button on a list item, the pop-up screen will disappear and the item you chose will be used by the system for the field value for the field involved.

When an entry is evaluated by MetaVision and is found to be invalid, or an option is chosen that cannot be performed, an error message box is presented with a short characterization of the error. The word 'Continue' is displayed in a box under the error message and you must position the arrow cursor inside the box and click a mouse button in order to resume your work. Normally, if you have been entering data in a dialog window and have pressed F5, you will correct the offending input field value and press F5 again.

All of the screens in MetaVision except for the Main Menu screen allow you to move the portion of the screen that is displayed by means of the pan bars located on the bottom and right side of the screen. The triangles in the bars indicate the position of the window on the screen relative to the total diagram.

If the triangles are in the center of the bottom and right side of the screen you are seeing the center portion of the diagram displayed on the screen. If the triangles are on the right side and bottom of the pan bars, you are seeing the bottom right portion of the diagram displayed on the screen.

You may change the portion of the screen being displayed in two ways. One is to use the arrows that appear at the top and bottom of the pan bar on the right of the screen and on the right and left of the pan bar along the bottom of the screen.

The other method involves placing the cursor at a position in the pan bars, not on the arrows, and clicking a mouse button to have the screen window centered on that position. To use the pan arrows to move the screen window, place the cursor on the appropriate arrow and click a mouse button. The screen will be redrawn with the centering triangle moved slightly in the direction pointed to by the arrow.

Repeated clicking of the mouse button will incrementally move the screen window in the direction pointed to by the arrow. To move the screen window more quickly and radically, move the arrow cursor to a location on the pan bar in the same box as the centering triangles at a position other than on the triangles and click a mouse button. This will re-display the screen so that the centering triangle is located where the arrow cursor is positioned and redraw the diagram so that it is re-centered on the new position of the triangle.

Sometimes it may help to use the ZOOM Menu option $\frac{1}{2}\times$ to display more of a diagram on the screen at one time. You can then use the pan bars to reposition the screen window so that you can work on another portion of a diagram at a larger scale.

To set up the page size on which output is to be printed, use the Setup Menu header. The Page Size option is the only option under the Setup Menu header; it provides the capability of changing the size of a page that will be printed or plotted. The edges of the page are indicated on the screen by means of a thin (yellow) line. Page sizes are connected to each diagram independently, so they need to be set for each diagram if they differ from the default values. When the option is invoked, a pop-up dialog window appears that consists of a header line, the title 'Page Size' and 2 input fields.

The header line includes the normal functions. The body of the window consists of two input fields, Page Width and Page Height, which are each 7 digits. The values input should be numbers and may contain a decimal point; other non-numbers are not supported. Diagrams are printed or plotted either rotated or not rotated, depending on the value included in your AUTOEXEC.BAT file for the ORIENTATION parameter. If you have the line SET ORIENTATION=PORTRAIT, output will not be rotated; if you have the line SET ORIENTATION=LANDSCAPE, output will be rotated 270 degrees counterclockwise from the way it appears on the screen. You need to take this into account when setting the page size using this option, especially if you want all of the diagram to print on a single page.

Another consideration in determining page size is the value of the PAPER parameter in your AUTOEXEC.-BAT file. If you have the line SET PAPER=NARROW, the diagram will be printed using a value of 8.5"×11" for the paper size and the printer driver will write on an 8"×10" area of the paper. If you have the line SET PAPER=WIDE, the diagram will be printed using a value of 14"×11" for the paper size and the printer driver will write on a 13.2"×10" area of the paper. A consequence of this is that if you want to print a diagram on a single 8.5"×11" page using ORIENTATION=PORTRAIT, the page size should not be more than 8"×10"; for ORIENTATION=LANDSCAPE, the page size should not be more than 10"×8". The printer driver automatically continues printing or plotting on other sheets if the printout will not fit on a single sheet; the parts of the page can then be cut and pasted together. If the line SET FORMFEED=OFF is in your AUTOEXEC.BAT file, you may perform long "continuous sheet" print-plotting so that your height or width dimension may be extended, depending on whether you have ORIENTATION set to PORTRAIT or LANDSCAPE, respectively.

You must have opened a diagram on a Diagram screen in order to set the page size using the Setup Page Size option. Move the arrow cursor to the Setup Menu header (near or on the word Setup) and click a mouse button. The Setup option Page Size will be highlighted under the Setup Menu header. Click a mouse button a second time to invoke the option.

The Page Size dialog window will appear and you enter whole or decimal numbers for the Page Width and Page Height fields and press F5 to have the new page size established. F10 will leave the dialog window without changing the size of the page. Shortly the diagram will be redrawn with the new page edges indicated by the thin (yellow) line. It may be necessary to use the ZOOM Fit Screen option if the diagram doesn't fit on the resized page.

More information on setup is given in later chapters.

The Plotting Option provides the capability of producing hardcopy output of any diagram produced using MetaVision. The diagram may be sent to a plotter or printer. The diagram to be plot/printed is selected from the available diagrams by means of a selection list box. A number of formatting options are provided by means of a dialog box labeled 'Plot Information'. Input fields on the dialog box are used to record Text Size, Title Size, Zoom Factor, Left Margin, and whether the output is to be sent to a plotter or printer.

Choose the Plotting option under the Activity Menu heading on the Main Menu screen to print or plot a MetaVision diagram. A selection list box will be presented for the diagrams available to be plot/printed and you may select from this list in the normal manner. The dialog box labeled 'Plot Information' appears and you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/print process. When the process is complete the Activity Menu options will again be displayed and control will be returned to you.

The Text Size and Title Size fields must contain integer or decimal values greater than 0.

The Margin field must contain an integer or decimal value greater than 0.

The Zoom Factor field must contain an integer or decimal value greater than 0.

DIALOG WINDOW - PLOT INFORMATION

```
Text Size:      __________ (7)
Title Size:     ________
Zoom Factor:    ________
Left Margin:    __________
Printer:        _                      Plotter: _

Plot All:       _
```

Report generation in MetaVision is achieved through a utility called R&R, a product of Concentric Data Systems Inc. In report generation, R&R is run, and the program reads a configuration file whose default name is RR.CNF. This file describes the configuration of your computer system. For R&R to work properly, the information in this file must match the configuration of your system.

To import data from another directory or project use the FILE IMPORT/MERGE activity menu option. The data will be merged into the MetaVision database for the currently open project.

After clicking a mouse on this option, a dialog window will appear with the normal header line of:

F1: HELP F3:LIST F5:DONE F10:CANCEL

The body of the dialog window consists of a single field which should be filled in with the path name for the subdirectory containing the project information to be merged with the current project information.

All of the information is automatically merged from the files in the subdirectory with the entered path name.

Use the FILE EXPORT activity to output the information for a project to a set of dBASE III files that can be used to transfer information from one work station to another. This becomes especially useful when several people are working on a single project and it is time to integrate the pieces on one machine.

After clicking a mouse on the FILE EXPORT option a dialog window entitled Destination will appear with the normal header line of F1: HELP, F3:LIST, F5:DONE, and F10:CANCEL. The body of the dialog window consists of a single field, Path Name, which should be filled in with the path name for the subdirectory to which the current project information is to be written. Do not include the final '\' for the directory; e.g. 'a:', NOT 'a: ', to export the current project files to the a: drive root directory.

All of the information for the current project is automatically written to files in the subdirectory with the entered path name.

When several people are working on the same project, it is the responsibility of the project leader to assign non-overlapping sets of Diagram and Icon IDs to the individual team members. If there is overlap, difficulties will be encountered when the parts are to be merged on a single computer under the same project name. The dBASE III files will contain duplicate keyed information and this will seriously jeopardize the integrity of the control information.

Help in MetaVision is a context-sensitive system that closely mirrors the documentation presented in the individual chapters. Enter the HELP system by placing the cursor on the word HELP in the far right of the menu options along the top of the screen and clicking a button on the mouse.

A Help window will be displayed in the middle of the screen which contains three items across the top: HELP, HELP, and CANCEL. The left HELP may be used for accessing the information contained in this section on how to use the HELP system. The HELP in the top-center of the window identifies that you are in the Help system. You may leave the Help system by placing the cursor on CANCEL in the upper left of the window and clicking a button on the mouse.

A list of the Help topics that relate to the currently displayed set of menus is displayed when the Help system is initially invoked. Choose the topic on which you desire help by highlighting the topic and clicking a button on the mouse. When you have picked a topic, the subtopics or text relating to the topic you chose will be displayed. If there are more topics or text than will fit on the screen, you may move down the list or text by placing the cursor on the downward-pointing arrow in the lower right corner of the window and clicking a button on the mouse. Similarly, you may move up the list of topics or text by placing the cursor on the upward-pointing arrow in the upper right of the Help system window.

The four options listed along the bottom of the Help system window allow you to see Help on other topics. Placing the cursor on 'NEXT' will display the topics or text for the topic which immediately follows the currently selected topic. Placing the cursor on 'PREV' will display the topics or text for the topic which is immediately previous to the currently selected topic.

Choosing the 'LEVEL UP' option moves you to the set of topics of which the currently selected topic is a member. 'RELATED TOPICS' displays a selection list of topics that are related to the option for which Help is currently displayed.

To exit the activities under a particular menu heading use the Exit option. You will be returned, to the main menu option from which you came. Placing the cursor on CANCEL in the upper right-hand corner of the activity list will accomplish the same result.

The Main Menu Screen provides the highest level of access to the MetaVision functions. It directs users through the MetaVision system via ordered menu choices.

A series of pull-down menu titles are displayed across the top of the screen with the following titles: 'PROJECT METHOD ADMIN PROCESS DATA CONTROL SUPPORT PROTOTYPE HELP'. The Project Menu header is initially high-lighted and the options for that menu are displayed in the pull-down menu under it.

After invoking MetaVision from the DOS prompt, the various functions in MetaVision are accessed via pull-down menus. Menus and options are normally invoked by means of a mouse which is used to move the cursor on the screen; when the cursor points at the desired menu or option, click the mouse. PROJECT must be accessed prior to any other menu. For some options dialog boxes and/or pop-up windows appear that require either input from the keyboard or positioning of the cursor and a mouse click.

If the software does not display the Main Menu screen as it should, the software was probably not loaded properly or there is insufficient memory for it to operate. Check that you have carefully followed the installation procedure in chapter 1 and review the suggestions offered there. Remember that you must first choose an item under the PROJECT header; otherwise the only other header that is active is HELP.

Initially, the PROJECT menu header is highlighted and its menu is pulled down, i.e., the options for that menu are displayed under it. The PROJECT menu is the entry and exit point for access to other parts of MetaVision. It is also the reentry point if you wish to change projects as you are working. Once a project has been chosen, another menu option (except for HELP) must be selected to do work on a particular project.

Proceed through the first two menu items from left to right. To pull down a menu place the arrow cursor so the menu name is highlighted and click a mouse button; the pull-down option list will appear. Choose an option from the menu displayed by highlighting the option and clicking the mouse. Proceed to the next option by moving the cursor using the mouse or arrow keys. To leave MetaVision, exit the tool you are using via the menu option provided. When you have returned to the Main Menu Screen, place the arrow cursor over the Project Menu title and click the mouse. Choose the Quit option and you should be back at the DOS prompt.CHOOSE PROJECT The Choose Project selection allows you to select a Project from the list of Projects already defined in the system and access it.

To select a project, move the arrow cursor into position using the mouse to highlight 'Choose Project' and click a mouse button. A selection list containing a Project List of available projects appears automatically. To select a project, place the arrow cursor into position to highlight the project you wish to select and click the mouse. If there are more items than will fit in the pop-up screen, you may scroll down the list by using the up and down arrows in the right of the box. You may cancel choosing a project at this stage by placing the arrow cursor on the word CANCEL in the upper right hand corner of the pop-up screen and clicking. You will be returned to the Project Menu. After clicking on an existing project the pop-up screen will disappear and the text 'Please Enter Your Password' appears in the middle of the screen, if a non blank password was entered when the project was created or changed. Enter the password for the project at the keyboard and press Return on the keyboard. Be sure to enter the password using the same case letters as used when it was initially entered. The password will not be displayed as you type it. When the correct password has been entered the cursor will automatically proceed to the Method menu indicating a project has been successfully chosen.

If you click the mouse in places other than those prescribed, nothing will happen. If you try to choose a project before any have been added, you will receive an error message to that effect. An invalid password will be the result if you type the wrong letters or if the correct password is in upper case and you enter lower case or the password is in lower case and you enter upper case. The message 'Invalid Password: Please Re-Enter' appears in a pop-up screen and you must click on the highlighted word 'Continue' to enter another password. If you enter an invalid password three times in a row you will be returned automatically to the Project Menu.

Pick the Add Project option from the Project Menu to add a new project. The Add project option provides the means to include a new project in your list of projects on which you may work with MetaVision. It is available as a choice under the PROJECT pull-down menu of the Main Menu Screen. A dialog box appears that consists of a header and eight data elements to be input from the keyboard.

The header functions are those described in the Dialog Boxes section of Chapter I. The dialog box input fields include the following: The Project Name is the name displayed on lists of projects when you choose a project. The project name is 30 or fewer characters in length. The Project ID is a 6 (or fewer) character identifier of the project for MetaVision internal identification. Capital letters are distinguished from small letters so that, for instance, 'Project' is distinct from 'project'.

The Password for a project is a 4 (or fewer) character code that will be requested each time the project is chosen before entry is permitted for work on that project. Capital letters are distinguished from small letters when passwords are stored. It is possible to not enter an entry for the password, in which case that project will not be password protected unless a password is later assigned to it. The password may consist of any numbers, letters, or characters.

A subdirectory is created that contains all of the files that pertain to the project that has been created. A unique subdirectory name must be assigned with 8 or fewer characters. Capital letters are NOT distinguished from small letters for directory names. The subdirectory name must conform to normal DOS restrictions on directory naming. The name may consist of any combination of letters, numbers, or symbols from the set {0–9 a–z A–Z $ % ' - @ { } ~ ' ! # }. The character '\' is not included in the subdirectory field value.

WP Call is the name of the word processor to be accessed through the ADMIN. Document Management menu option. The entry should consist of the drive, path, and program name (without extension) that will be used to invoke the word processor from the MetaVision subdirectory. A subdirectory, WP, will be created under the project directory. This subdirectory will contain the documents created using the software package from the Document Management option.

The PM Call is the name of the project management software to be accessed through the ADMIN. Project Management menu option. The entry should consist of the drive, path, and program name (without extension) that will be used to invoke the Project Management package from the MetaVision subdirectory. A subdirectory, PM, will be created on the project that is created. This subdirectory will contain the data files created by the Project Management package.

The DBMS Call is the name of the database manager software to be accessed via the PROTOTYPE Menu for the Database Manager option. The entry should consist of the drive, path, and program name (without extension) that will be used to invoke the DBMS package being used.

The RW Call is the name of the dBASE III compatible report writer software to be accessed via the ADMIN Menu for the Report Writer option. The entry should consist of the drive, path, and program name (without extension) that will be used to invoke the Report Writer package that can be used to perform ad hoc queries on your project files for the selected project.

Choose the pull-down menu 'ADD PROJECT' on the Main Menu screen by placing the arrow cursor on or near the header 'ADD PROJECT' and click the mouse. When the dialog box for this option appears in the center of the screen input the 8 items of information and press F5 to signal the end of entering data and to begin the creation of the subdirectory and files for the new project. You may use the editing features listed under Dialog Boxes in Chapter 1.

Enter the Project name by which the new project will be identified on screen lists and reports. The Project name should be easily identifiable and distinct from other project names but it is not required to be so by the system. Enter a unique project ID of 6 characters or less that will identify the project internally for the MetaVision files. Enter a password of 4 characters or less if password protection of the project being created is desired.

If you do not want any password protection, do not enter any password. Enter a valid DOS subdirectory name that has not already been entered for another project. You may edit entries using the movement keys.

Enter the drive, path, and file names for the word processing, project management software, database manager and report writer in the fields labelled 'WP Call', 'PM Call', 'DBMS Call', and 'RW Call', respectively. You may leave these fields blank if you do not wish to access one of these types of software. You must install the package(s) to be called from MetaVision yourself, of course.

If you don't enter anything in the Project Name screen input field and you press F5, you will receive the message 'You must enter a name!'. To continue click the mouse when the arrow cursor is on 'Continue'.

If you don't enter anything in the Project ID field, when you press F5 to add the project the message 'You must enter an ID!' is displayed. To continue click the mouse when the arrow cursor is on 'Continue'.

If you don't enter anything in the Subdirectory field, when you press F5 to add the project the message 'You must enter a subdirectory name' is displayed. To continue click the mouse when the arrow cursor is on 'Continue'.

If you enter the same project name that you entered for another project, the project will be added but you will have two indistinguishable Project Names in the system. It is strongly advised that you pick unique project names. If you enter the same project ID that you entered for another project, when you press F5 to add the project the message 'ID already exists!' will be displayed. To continue click the mouse when the arrow cursor is on 'Continue'.

If you enter the same subdirectory name that you entered for another project, when you press F5 to add the project the message 'Could not create subdirectory name!' will be displayed. To continue click the mouse when the arrow cursor is on 'Continue'.

If you enter a subdirectory name that does not comply with the standard DOS directory naming conventions, when you press F5 to add the project the message 'Could not create subdirectory name!' will be displayed. To continue click the mouse when the arrow cursor is on 'Continue'.

To change any of the entries that you added by means of the ADD PROJECT menu option use the CHANGE PROJECT option. A list of previously added projects will be displayed and you should pick the one you wish to change by highlighting by means of moving the cursor and clicking a mouse button. If the project you pick has a password you will be asked to enter it at the keyboard. After typing it in you should press ENTER.

A dialog window containing the same fields that comprised the original ADD PROJECT dialog window (except Project ID) is displayed. The values in any of the fields may be changed and made permanent by pressing F5.

To delete a project pull down the PROJECT menu options by clicking a mouse button while the cursor is on PROJECT. Then click a mouse button with the cursor on DELETE. A series of windows will appear that ask for confirmation that the project, files, and directories are really to be deleted. The first one says 'Delete Project ID <project name>' with the options 'YES' and 'NO'. You may choose the 'NO' option and the project will not be deleted. If you pick the 'YES' option the MetaVision control information will be deleted for the project. A message to that effect will appear in a window and you must press a mouse button with the cursor on 'Continue'. You will then be asked if all files and subdirectories relating to the project are to be deleted as well. A 'YES' response here will result in all word processing documents and project management data files as well as all information about your diagrams being deleted. After a 'YES' response the message 'Project files deleted' will be displayed and you must place the cursor on 'Continue' to exit the delete option.

To change the password for a project choose the PROJECT menu and the CHANGE PASSWORD option under it. A list of previously added projects will be displayed and you should pick the one you wish to change by highlighting by means of moving the cursor and clicking a mouse button. If the project you pick has a password you will be asked to enter it at the keyboard. After typing it in you should press ENTER.

The message 'Please Enter Your New Password' will appear in a dialog window. You should enter the new password at the keyboard and press enter. Remember that password may be up to four characters in length and may consist of any of the keyboard characters, numbers, letters, or symbols. Case is distinctive for letters and should be carefully noted. After pressing ENTER, the message 'Verify this password' will appear and you should re-enter the new password just as before.

If you do not exactly repeat the same password in response to the 'Verify this password' message a window will appear with the message 'Invalid Password: Password not changed'. You must then click a mouse button with the cursor on 'Continue' to return to the menu. You may then try again, if you wish, to enter a new password using the PROJECT then CHANGE PASSWORD menu options.

BACKUP PROJECT allows you to make a copy of project files in another subdirectory.

To backup a project, move the arrow cursor into position using the mouse to highlight to highlight 'Backup Project' and click a mouse button. A selection list containing a Project List of available projects appears automatically. To select a project, place the arrow cursor into position to highlight the project you wish to select and click the mouse. You may cancel backing up a project at this stage by placing the arrow cursor on the word CANCEL in the upper right hand corner of the pop-up screen and clicking. You will be returned to the Project Menu. After clicking on an existing project the pop-up screen will disappear and the text 'Please Enter Your Password' appears in the middle of the screen, if a non blank password was entered during project creation. After entering it correctly you should press ENTER.

A dialog window requesting the Path Name is displayed, and you should enter the name of the directory in which you want the backup copy stored (for example \MV2). Hit F5 when the entry is complete.

If you enter a subdirectory name that does not exist, the words 'Subdirectory not found' will appear in a box in the center of your screen and you must click on 'Continue'. You will be returned to the Project menu.

If you enter an illegal path name (for example, not beginning with \), the words 'Illegal Path Name' will appear in a box in the center of your screen and you must click on 'Continue'. You will be returned to the Project menu.

If the backup is successful, you will be returned to the Project menu. No message will appear.

RESTORE PROJECT allows you to restore a previously backed up copy of a project's files from another subdirectory.

To restore a project, move the arrow cursor into position using the mouse to highlight to highlight 'Restore Project' and click a mouse button. A selection list containing a Project List of available projects appears automatically. To select a project, place the arrow cursor into position to highlight the project you wish to select and click the mouse. You may cancel restoring a project at this stage by placing the arrow cursor on the word CANCEL in the upper right hand corner of the pop-up screen and clicking. You will be returned to the Project Menu. After clicking on an existing project the pop-up screen will disappear and the text 'Please Enter Your Password' appears in the middle of the screen, if a non blank password was entered during project creation. After entering it correctly you should press ENTER.

A dialog window requesting the Path Name is displayed, and you should enter the name of the directory from which you want the backup copy restored (for example MV2). Hit F5 when the entry is complete.

If you enter a subdirectory name that does not exist, the words 'Subdirectory not found' will appear in a box in the center of your screen and you must click on 'Continue'. You will be returned to the Project menu.

If you enter an illegal path name (for example, not beginning with \), the words 'Illegal Path Name' will appear in a box in the center of your screen and you must click on 'Continue'. You will be returned to the Project menu. If the restore is successful, you will be returned to the Project menu. No message will appear. The project and all its files will be overwritten with the backup copy that you restored.

To exit MetaVision move the cursor to the PROJECT menu header and pull down the options under it by clicking a mouse button. Move the cursor to the 'QUIT' option and again click a mouse button to leave MetaVision.

The Method Diagram option of Metavision contains process diagrams that explain the methodology intended to be used when using the MetaVision system. Although one can employ their own methodology and just use the tools provided by MetaVision, it is recommended to use the methodology that MetaVision was built to support. There is a diagram that explains the overall process of building information systems using MetaVision and three diagrams that explain each of the three modules of MetaVision; Business Modeling, Software Engineering and Prototyping.

To access the Method Diagram option from the main menu screen when no other menus are pulled down, move the arrow cursor so that the ADMIN menu header is highlighted and click a mouse button. A menu of options will be displayed under the ADMIN menu. Move the arrow cursor so that the Method Diagram option is highlighted. Click a mouse button and an Activity List will be displayed in a window. To view the Method Diagrams select Diagramming on the Activity List. Method Diagrams have all the functionality of a regular process diagram.

A Selection List will be presented entitled - Standard Document List. This contains the names of some standard forms that may be imported. The possibilities include:

CHANGE CONTROL STANDARD
INTERVIEW OUTLINE

For each of them a Dialog Window is presented that requests the name of file to be imported.

The following dialog window will be presented when the CREATE DOCUMENT option is chosen using the cursor and mouse.

Dialog Window - WP Document

File Name: ____________
Document Name: ______________________________
Document Description: ______________________________
______________________________
______________________________

The File Name is the DOS file name to be created in the WP subdirectory of the current project's directory. Include the extension but not the path or drive.

Document Name is the means by which the document will be identified for editing later on a selection list.

The Document Description is information about the document that is useful in establishing the contents of documents without having to review the total document.

Note that this option does not create the document on your hard disk but establishes the control information for the document. In order to actually create the document you need to select the Edit Document option (described immediately below) and pick the newly created document from the selection list and create the file for the document using your word processor.

When the Edit Document option is selected a list of available documents is displayed in a selection list window with the title WP Document List.

Select a document from the WP Document List and MetaVision will invoke your word processing system for the document located in the WP (word processing) subdirectory of the directory corresponding to the project chosen in the initial menu choices when MetaVision was invoked.

Use the documentation for your word processing system while you are in the document edit mode. When you exit the word processor normally you will be returned to the Document Management options in MetaVisision.

When the Delete Document option is selected a list of available documents is displayed in a selection list window with the title WP Document List.

Select a document from the WP Document List and MetaVision will delete the document control information and the file created by your word processing system that corresponds to the document.

When the Change Document Management Info. option is selected a list of available documents is displayed in a selection list window with the title WP Document List. . Select a document from the WP Document List and MetaVision will display the dialog window with the information previously entered for modification.

Dialog Window - WP Document

File Name: __________
Document Name: ________________________
Document Description:
____________________________________
____________________________________

Modify the data as desired and press F5 to change the stored data or F10 to cancel the change.

QUIT

Quit the Document Management option and return to the ADMIN menu using the Quit option.

Help in MetaVision is a context sensitive system that closely mirrors the documentation presented here. You enter the HELP system by placing the cursor on the word HELP in the far right of the menu options along the top of the screen and click a button on the mouse.

A Help window will be displayed in the middle of the screen which contains three items across the top HELP, HELP, and CANCEL. The left HELP may be used for accessing the information contained in this section on how to use the HELP system. The HELP in the top-center of the window identifies that you are in the help system. You may leave the help system by placing the cursor on CANCEL in the upper right of the window and clicking a button on the mouse.

A list of the help topics that relate to the currently displayed set of menus is displayed when the help system is initially invoked. You pick the topic on which you desire help by highlighting the topic and clicking a button on the mouse. When you have picked a topic, the subtopics or text relating to the topic you chose will be displayed. If there are more topics or text than will fit on the screen you may move down the list or text by placing the cursor on the downward pointing arrow in the lower right corner of the window and clicking a button on the mouse. Similarly, you may move up the list of topics or text by placing the cursor on the upward pointing arrow in the upper right of the help system window.

The four options listed along the bottom of the help system window allow you to see help on other topics. Placing the cursor on 'NEXT' will display the topics or text for the topic which immediately follows the currently selected topic. Placing the cursor on 'PREV' will display the topics or text for the topic which is immediately previous to the currently selected topic.

Choosing the 'LEVEL UP' option moves you to the set of topics of which the currently selected topic is a member. 'TOPICS' displays a selection list of topics that are related to the option for which help is currently displayed.

To make a call to the Project Management software, simply highlight the option and click a mouse button and MetaVision will invoke your project management software.

The call to the software is determined by the values entered when you set up the project using the PROJECT, and ADD PROJECT, or later using the CHANGE PROJECT, option. The field 'PM Call:' should contain any needed drive, path, and file names to invoke your Project Management software as you would from the MetaVisi directory.

To make a call to the Report Writer software, highlight the option and click a mouse button and MetaVision will invoke your report writer software.

The call to the software is determined by the values entered when you set up the project using the PROJECT, and ADD PROJECT, or later using the CHANGE PROJECT, option. The field 'RW Call:' should contain any needed drive, path, and file names to invoke your Report Writing software as you would from the MetaVisi directory.

To make a call to the Database Manager software, highlight the option and click a mouse button and MetaVision will invoke your database manager software.

The call to the software is determined by the values entered when you set up the project using the PROJECT, and ADD PROJECT, or later using the CHANGE PROJECT, option. The field 'DBMS Call:' should contain any needed drive, path, and file names to invoke your Database Management software as you would from the MetaVisi directory.

The MetaVision Business Modeling system provides the means to perform three separate but related types of activities. They are Business Modeling, Software Engineering, and Prototyping. They all spring from the Business Modeling Method which begins with a Method Diagram.

An important element of the Metavision System is the PROCESS DIAGRAM. Processes are the activities or functions performed by humans or machines in a business endeavor. A process typically interacts with other processes by producing or consuming materials or information that are in turn consumed or produced by other processes. Processes may be modeled in a hierarchical manner, either from the bottom up or top down.

The PROCESS menu item in MetaVision provides the capability of modeling the processes involved in a business endeavor. The implications of that model can be explored and investigated by a wide variety of means in reports and alternative diagrams.

Like other types of modeling in MetaVision, information on Process models is kept in a database and is related to other types of models by MetaVision.

The Process Diagram option under the PROCESS menu header provides the primary means to model and manage information about the processes in your enterprise.

To access the Process Diagram option from the main menu screen when no other menus are pulled down, move the arrow cursor so that the PROCESS menu header is highlighted and click a mouse button. A menu of options will be displayed under PROCESS, with four options: Process Diagram, Process Hierarcy, What If, and Matrix Diagram.

Move the arrow cursor so that the Process Diagram option is highlighted. Click a mouse button and an Activity List will be displayed in a window. The activities listed include DIAGRAMMING, REPORT GENERATION, PLOTTING, VALIDATION, DATA DICTIONARY, MAINTENANCE REPORTS, FILE IMPORT/MERGE, FILE EXPORT, and EXIT. Each of these activities is covered in the following sections.

The Process Diagramming capability of MetaVision supports the graphic modeling of the processes involved in an organization, the job roles or documents controlling those processes, job roles or organizations that support or perform those processes, and data flow between processes. Text may also be added to the diagram for clarity. All information shown on a Process Diagram, including the existence, positions, and connections of icons, is kept in standard dBASE III files. Reports and plots may be generated from the information entered on the diagramming screen and other related diagram information is automatically updated to reflect information on each Process Diagram.

Diagrams are created on the screen using icons to represent processes, data, control, and support. Menus are used to choose diagramming functions. Dialog windows are provided to enter information concerning icons. A mouse and cursor are used to position and move icons on a diagram.

Diagrams may be edited by changing icon labels, the positions of icons, and the size of the diagram. Icons may be added to, deleted from, and moved around on diagrams, and the supporting text on a diagram may be changed. A diagram may be plotted on a variety of plotters and printers in a variety of sizes and fonts.

To select the DIAGRAMMING activity move the arrow cursor so that DIAGRAMMING is highlighted and click a button on the mouse. After a short time the Process Diagram DIAGRAMMING screen will be displayed.

Create is used to establish a particular icon as part of your diagram. Icons in MetaVision are labeled and described in a database that keeps track of them, their placement on diagrams and their connections with other icons. They are located along the left of the diagram under the menu header, CREATE.

There are six icons for the Process Diagramming tool: Process Box icons, which represent processes performed within an organization; Arrow icons, which represent data, control, or support; Data Source/Sink icons, which represent the initial source or final destination of data; Data Fan-in icons, which indicate that several types of data are to be considered as combined for subsequent analysis and design; Data Fan-out icons, which indicate a breakout of constituent data elements from a set previously combined; and Text, which allows free-form text to be entered on a diagram.

A diagram must be open before you can create an icon. If you attempt to create an icon before opening a diagram an error message will be displayed in an error message window.

A Process Box icon is used to represent a process that is involved in the transformation of information or material, its creation, change, or consumption.

To add a Process Icon to a diagram, first go through the procedures necessary to bring up a diagram on which you wish to work using the options provided under the DIAGRAM menu header.

Move the arrow cursor so that it is on or near the Process Box icon on the left side of a screen and click a mouse button. The Process Box icon is a rectangle and is located at the top of the column labelled CREATE.

The arrow cursor is replaced by a cross-hairs cursor that you may move to any position on your diagram using the mouse. The Process Box will be positioned so that the cross-hairs are in the middle of the Process Box. When you have moved the cross-hairs cursor to the desired location, click a mouse button and the dialog window labeled 'Process Box' will appear with a set of input fields.

The dialog window consists of a header and input fields for four pieces of information to be input from the keyboard: Process Identifier, Process Type, Process Name, and Narrative. The dialog window header contains the function options of F1:HELP, F3:LIST, F5:DONE, and F10:CANCEL. Pressing F1 invokes the MetaVision Help system with its text being displayed on screen in a window. Press F3 to see a selection list of previously-entered Process Icons. Press F5 when you have completed input of the requested information in the fields of the dialog window. F10 cancels the creation of the icon.

The Process Identifier field is a system-generated unique identifier for the Process Box and normally contains the Process Identifier. A Process Identifier is a string, normally of numbers, which consists of the Process Identifier of the owning diagram with another digit concatenated to the right of the parent diagram Process Identifier to indicate the relative position of the Process Box in the current diagram. The Process Identifier may also consist of any combination of twenty characters or less that uniquely identifies a process. For each process, the system generates a new Process Identifier which may be accepted as is by the user or changed. The value in this field can be changed but since the numbers are generated in sequence, you should have a good reason for not accepting the generated value; the value is displayed mostly for your information. A non-null value must be present for a Process Box to be added.

The Process Ty field is a one character field used to indicate if the Process is Manual (M) or Automated (A). If it is left blank, the Process is assumed to be both Manual and Automated. The MetaVision Prototyping Module uses this information to determine which processes to prototype. It deals only with Automated Processes.

The Process Name field is the descriptive label that will be displayed on the Process Box that is being created. The Process Name value is also used in reports. The Process Name may be null but normally should not be, since the process will not be identified on diagrams or reports.

The Process Name may be a maximum of 50 characters, but unless its presence on reports in such a long form is desired, it should not normally be that long, for the following reasons. The Process Name is displayed on the box with the name broken into words which are centered and placed on up to three lines in the box. The box is 11 characters wide, so that if a word in the Process Name extends beyond 11 characters, it will extend beyond the edges of the box's outline. The Process Name will overwrite part of the third line if it extends as far as the position of the Process Identifier. Words beyond those that fit on the initial three lines will not be displayed on the box. Experience will provide a basis for creating Process Names that fit. The Change option on the EDIT menu can be used to modify the Process Name until it is acceptably positioned on the box.

The Narrative field consists of four fifty-character lines of description of the process represented by the box. You should take full advantage of this field, since it will clarify and expand on the Process Name for a process in reports. The Narrative field value does not appear on the Process Diagram.

Modify the Process Identifier (if deemed necessary) and input the Process Name, Process Type, and Narrative for the Process Box and press F5.

The dialog window will disappear and the Process Box will be displayed with the label you entered associated with the Process Box, either in or across it. The Process Identifier will appear in the lower right hand corner of the icon.

The cross-hairs cursor does not disappear at this point, so that if you wish to place another Process Box on your diagram you may do so by again clicking a mouse button when you have positioned the cursor in the location where you want the next Process Box to appear.

When you are done entering Process Boxes, move the cross-hairs to any border region and click a mouse button to replace the cross-hairs cursor with the arrow cursor.

If you attempt to create an icon before you have opened a process, the error message 'Diagram not open' will be displayed in a pop-up window; you must click a mouse button with the cursor on Continue to resume.

If you change the system-generated Process Identifier to be the same as a Process Identifier previously used, the error message 'Process already exists' will be displayed; you must click a mouse button with the cursor on 'Continue' to resume.

The Process Identifier must be non-null; if you delete the system-generated Process Identifier and don't replace it with another and try to add the box via F5 you will receive the message 'ID is invalid'; you must click on 'Continue' to resume.

If you place a Process Box too close to another icon you may not be able to read its label, move it, or delete it without also deleting the other icon; experience will help suggest Process Box placement.

Don't try to represent too many processes on a single diagram; your diagram will be hard to decipher. Five to seven processes seems to be the range of processes on a single diagram that can be easily managed conceptually.

The Data Source/Sink icon represents the initial source or final destination of data that will not be further analyzed by decomposition in the set of diagrams in which it is contained. A database is usually represented by a data Source/Sink icon, but any organizational unit that generates or consumes data may also be represented by a Data Source/Sink icon in the Software Engineering version of MetaVision.

To add a Data Source/Sink icon to your diagram you must be in the Process Diagram screen and have a Process Diagram open. Use the options provided under the DIAGRAM menu header to open a Process Diagram.

In order to add a Data Source/Sink icon to a Process Diagram, first position the arrow cursor so that it is on or near that icon and click a mouse button. The Data Source/Sink icon is the short cylinder in the column of icons under the CREATE menu heading on the Process Diagram Screen.

The arrow cursor then becomes a cross-hairs cursor, which you move to the position on the diagram where you wish to place the icon; clicking a mouse button places the icon in a position that takes the intersection of the cross-hairs as the center of the icon.

A dialog window appears that consists of a header and three data elements to be input from the keyboard: the Data S/S ID (S/S=Source/Sink), Data S/S Name, and the Instance. The header functions are displayed across the top of the dialog window and include the function options F1:HELP, F3:LIST, F5:DONE, and F10:CANCEL. Pressing F1 invokes the MetaVision Help system, the text of which is displayed on screen in a window. Press F3 to see a selection list of previously-entered Data Source/Sink Icons. Press F5 when you have completed input of the requested information in the fields of the dialog window. F10 cancels the creation of the icon.

The Data S/S ID is a 4-digit (or fewer) numeric identifier by which the source/sink is known to the system. This number is automatically generated by the system but the value that appears may be replaced with another number; subsequent ID's will be incrementally generated using the one with the largest value that has been previously used.

The Data S/S Name is a 50-character alphanumeric field that is printed on the side of the icon and should be sufficiently descriptive to identify the data. The name displayed on a Source/Sink icon is based on the Data Name. Two lines are displayed wrapped at spaces that will fit within the bounds of the icon; the lines will be 12–15 characters in length depending on the word lengths and character sizes. Long names may extend beyond the bounds of the icon if they do not contain spaces; the portion of the name after the second line will not appear on the icon. A Data Name entry is not required, but an entry should be made so that it is clear what is being represented.

The Instance is a one character field that is used to uniquely identify each occurrence of the same Data Source/Sink on a diagram. A Data Source/Sink may be placed in two or more locations to make the diagram easier to read by reducing line crossings. The Instance field must be filled in with a unique value for each additional occurrence of the Data Source/Sink.

Fill in the data input fields and press F5; the cross-hairs cursor will reappear and you may then add another icon to the diagram.

When you have finished adding Data Source/Sink icons to your diagram, move the cross-hairs cursor to the border of the diagram and click a button on the mouse to make the arrow cursor reappear. If the same Data Source/Sink ID is to act both as source and sink on a diagram, you should make two distinct icons on your diagram with the same Data Name and ID.

If you attempt to create a Data Source/Sink icon before opening a diagram, a pop-up window with the message 'No Process Diagram open' will be displayed; you must click a mouse button with the cursor in the area labeled 'Continue' to resume.

If you change the Data S/S ID so that it is no longer a numeric, the message 'ID is invalid' will be displayed in a pop-up window and you must click a mouse button with the cursor in the area labeled 'Continue' to resume.

If you delete the generated value for Data S/S ID, the message 'ID is invalid' will be displayed and you must click a mouse button with the cursor in the area labeled 'Continue' to resume.

If you enter the same ID number for a Data S/S already added with the same Instance value, the message 'Data S/S already exists' will be displayed and you must click a mouse button with the cursor in the area labeled 'Continue' to resume.

If you enter the same ID number for a Data S/S already added with a different Instance value, the message 'Data S/S already exists—change name?' appears in a pop-up window. You must then click a mouse button with the cursor in the area labeled either 'Yes' or 'No'. If you answer 'Yes', a new icon will be created with a name on its face that is different from the name on the other icon with the same ID Number but different Instance value. This will almost always be a mistake, since they are probably the same database acting as source and sink. Their name should be the same in both cases. If you answer 'No' then an icon will be added with the same name as the previously-entered icon, but the one you are now adding will have a different Instance value.

Arrow Icon

Arrow Icon Arrow icons represent data and are interpreted differently depending on their relationship to the Process Boxes to which they are connected.

Arrows going into the bottom of Process Boxes represent the Supports for the process. These supports may be the personnel, departments, systems, or programs involved in, or responsible for, carrying out the process represented by the box to which they point; they are referred to as Support arrows.

Arrows going into the top of a box represent factors which control the process to which they point and are referred to as control arrows. Control arrows may represent data or other information originating from a source identified in the diagram or from a source left unspecified and simply named; the latter is done by not connecting one end of the arrow to any other data arrow or Process Box.

Input into processes is represented by arrows touching a Process Box on the left side. Input data may originate from a source identified in the diagram or their source may be unspecified and the data simply named.

Output from processes is represented by arrows touching a Process Box on the right side. Note that output arrows point away from the box. These data may have destinations that are identified in the Process Diagram or they may simply be named.

Input, Output, and Control arrows may also be connected to other data arrows with which they share a common ID, or combined with other arrows by means of the Fan Out and Fan In icons.

The creation of an arrow requires that you have opened a diagram and that there exists at least one process box on the diagram.

To add any type of arrow icon to your diagram, begin by selecting the arrow icon under the Create Menu header; the arrow cursor will become a hand cursor. Move the hand cursor until it is near or just touching the edge of the Process Box or Data Source/Sink to which you wish to connect the arrow and click a button on the mouse. The edge of the Process Box or Data Source/Sink you have clicked on will be highlighted and determines the type of arrow you are adding.

Support arrows are the most easily implemented. Point the hand cursor at the bottom of the box for which you wish to specify the support involved and click a button on the mouse. A dialog window appears consisting of a header line, the title 'Support Information' and a body, which consists of 5 fields for input: Support ID, Support Type, Name, Desc., and Location.

The header line consists of F1: HELP, F3: LIST, F5: DONE, and F10: CANCEL, with their normal functions. The body of the dialog window consists of five input fields.

Support ID is a 4-digit positive integer identifier for the arrow that is automatically generated by the system to identify the arrow; it may be changed but it would normally only be changed to match a previously-entered ID.

Support Type is a one character field that indicates whether the support is a Person/Department (P) or a System/Program (S). One of these values is required, and the system will add the default value 'P' if you don't enter a value. The MetaVision Prototyping Module uses this information to determine which processes to prototype.

Name is a string of up to 50 characters which is used to label the Support arrow on the Process Diagram and identify the support involved. Support arrows do not connect to other arrows.

The description (Desc.) of the support may be entered on two lines of 50 characters each. This information is displayed on various reports.

The Location is a 50 character field used to specify the work location of a person or department or the computer on which the system or program is executed.

Usually you should accept the generated Support ID and enter the appropriate support information. Pressing F5 will cause the arrow to be connected to the bottom of the box and labeled with the Name just entered.

Control arrows are created by placing the hand cursor near or on the top of a Process Box and clicking the mouse so that the top of the box is highlighted. The hand cursor will still be active and you may move the cursor to another process's output or other output data arrow and click a mouse button. The process or data indicated by the second click should be the source of the control for the process to which you first pointed.

If you don't wish to specify the source of control, click the mouse a second time away from any box or arrow and a default control arrow will be generated. If you are entering a new arrow, you will be presented with the Report/Form/Packet Information dialog window, which consists of the normal header line and the input fields: RFP ID, Add More Info., RFP Type, RFP Name, Desc., and Label. These fields are described more fully below. You should enter the identifying information and press F5 to return to the diagram, which will now include the new control arrow.

Input and Output arrows are created by pointing the hand cursor in the vicinity of the origin of the output arrow or destination of the Input arrow and clicking a mouse button; this specifies one end of the arrow. To specify the other end of the arrow, move the cursor to the vicinity of the origin of the Input arrows or the destination for Output arrows.

When you create an Input, Output, or Control arrow, the Report/Form/Packet Information dialog window appears. The header line consists of the standard functions F1: HELP, F3: LIST, F5: DONE, and F10: CANCEL.

The body of the dialog window consists of six input fields: RFP ID, Add More Info., RFP Type, RFP Name, Desc., and Label.

The acronym RFP stands for Report/Form/Packet and is taken to be a broad characterization that includes data of widely varying types; the name is to be taken as placing minimal restrictions on the form of the data the arrows represent.

The RFP ID is an automatically-generated 4-digit positive integer that is used by the system to identify the arrow.

The RFP Name may be up to 50 characters long and is used to label the arrow on the Process Diagram; it identifies the data for the reader. (Note that only about thirty characters of the RFP Name are printed on the arrow.)

The 1-character field labeled 'Add More Info.' has a default of 'N'; other values can be entered, but only 'Y' or 'y' will permit the input of detailed information about an RFP via two dialog windows.

The Label field is used to indicate whether the arrow should be labeled. A value of 'Y' or 'y' must be entered to display the Name on the arrow. The default value for Label depends on the type of arrow. An input arrow that is not connected to another process box has a default of 'Y'. An input arrow that is connected to another process box has a default of 'N'. Control and output arrows have a default of 'Y'.

When you enter a 'Y' or 'y' in the 'Add More Info.' field, the second RFP dialog window appears, consisting of a header line, the title 'Report/Form/Packet Information', and a body of 6 fields for input. The header line consists of the normal functions: 'F1: HELP, F3: LIST, F5: DONE, F10: CANCEL'. The body of the window consists of six input fields: the RFP ID, the Form Number, Volume, Information Quality, Security Requirements, and Performance Criteria. The RFP ID is the RFP ID that appeared on the first Report/Form/Packet Information dialog window and is displayed for ease of identifying the RFP to which the information applies. Form Number is a 10-character alphanumeric field that can contain a cross-reference number to a form number found on the actual form being represented. The Volume is a 7-digit number that indicates the amount of data in pieces that are involved with the RFP being described. Information Quality is a single character/integer field that may contain a user-defined code that indicates the reliability and validity of the data represented here.

Security Requirements is a 35-character field that may contain free format text or any standard coding scheme for the characterization of the security procedures that obtain with respect to the RFP.

Performance Criteria is a 35-character field that may contain free format text or any standard coding scheme for the characterization of the speed and reliability of any processing of this data by the system.

When you exit the second RFP Information window a third dialog window appears consisting of a header line, the title 'Report/Form/Packet Information', and a body, which consists of seven fields for input. The header line consists of the four functions: F1: HELP, F3: LIST, F5: DONE, F10: CANCEL. The body of the window consists of seven input fields, including fields for Volatility, Retention Quantity, Retention Measure, Frequency of Access, Frequency Measure, and two lines for Comments.

Volatility is a 10-character field that may be used to describe the turnover rate of any given data.

Retention Quantity is a 6-digit integer field that is used to indicate the length of time this RFP is retained in the system being modeled, measured in units indicated by the next field, Retention Measure. Retention Measure is a 1-character field coded to indicate the extent of the time measurement used for the Retention Quantity; conventional values include 'Y'-year, 'M'-month, and 'D'-day.

Frequency of Access is a 7-digit numeric field that is used to indicate the number of times per time period the RFP is accessed; the unit of measure for the time period is found in the Frequency Measure field which immediately follows. Frequency Measure is a 10-character field that indicates the unit of measurement used in the Frequency of Access field.

Two lines of 50 characters each are provided for Comments that help to explain the RFP.

When the first 'Report/Form/Packet Information' dialog window appears, you may use a previously-entered ID by either simply entering the ID or pressing F3 to obtain a list of previously-entered IDs. If you enter an existing ID, the message 'RFP ID already exists—change name?' to which you respond 'YES' or 'NO' by moving the cursor to the corresponding area and clicking the mouse. Normally, you should select 'NO'. The information for the RFP ID that was entered will be displayed. Press F5 to select the RFP. If 'YES' is selected, the existing information for the RFP will be overwritten with the contents of the dialog window once F5 is pressed. If the dialog window is not filled in, the information will be lost. Any changes to the RFP information will be globally reflected in all occurrences of the RFP.

The possible sources and destinations for Input and Output arrows are found in the chart below labeled 'Legal data arrow connections'. After entering RFP information, routing of arrows occurs when a connection is made between two diagram elements; a dialog screen queries whether the routing technique should be 'Manual' or 'Automatic'. Both techniques involve moving a cross-hairs cursor that appears after an option is chosen to the screen location desired and clicking the mouse.

Automatic routing requires that you specify the initial horizontal turning point, but from there the system generates a route that proceeds to the destination in as direct a path as possible using horizontal and vertical lines. The disadvantage of automatic routing in some cases is that the generated line may well proceed through boxes and/or be very close to other data arrows.

The Manual routing technique consists of specifying three components for the routing: First move the cursor to the right or left and click a mouse button to specify the first horizontal turning point; then move the cursor up or down and click a mouse button to specify the vertical turning point. Finally, specify a second horizontal turning point by moving the cursor to the right and left and clicking the mouse. The final routing of the data arrow connecting the Process Box or Data Source/Sink is performed automatically by the system. Manual routing should be used when the route is not straightforward.

In both the Automatic and Manual Routing modes, the motion of the cursor is restricted to the appropriate axis. For example, the cursor will not move if the mouse is moved up or down when a horizontal turning point is expected.

The following chart indicates your options for creating data arrows:

| Arrow Type | Click 1 | Click 2 | |
|---|---|---|---|
| -------------------- | ¦ ------------ | ¦ ------------ | |
| Personnel | | | ¦ Bottom |
| of | | | ¦ None |
| | | | Process |
| Box | | | |
| Control | | | ¦ Top |
| of | | | ¦ Space on |
| | | | ¦ Process |
| Box ¦ diagram | | | |
| | | | ¦ Right |
| Side of | | | ¦ Output |
| Data | | | |
| | | | ¦ Process |
| Box | | | ¦ Arrow |
| Input | | | ¦ Left |
| side of | | | ¦ Space on |
| Data Arrow | | | ¦ Process |
| Box ¦ diagram | | | |
| Output Data | | | ¦ Left |
| side of | | | ¦ Right |
| side of | | | |
| Arrow | | | ¦ Data |
| Sink | | | ¦ Data |
| Source | | | |
| Output | | | ¦ Right |
| side of | | | ¦ Space |
| on | | | |
| | | | ¦ Process |
| Box ¦ diagram | | | |
| side of ¦ Left side of | | | |
| | | | ¦ Data |
| Sink | | | ¦ Process |
| Box | | | |
| | | | ¦ Top of |
| Proc. | | | |
| | | | ¦ Box |
| | | | ¦ Input |
| Arrow ---------------------------------------------------------- | | | |

To continue drawing arrows, you may select another Process or Data Source/Sink side. To conclude the creation of new arrows, click a mouse button with the cursor anywhere not listed in the above chart under the Click 1 column.

You must have created a Process Box before you can enter any arrow icons; otherwise the hand cursor will revert to the arrow cursor.

If no Process Diagram is open when you try to create an arrow icon, the error message 'No Process Diagram open' will be displayed; you must click on 'Continue' to resume.

Arrows cannot be connected to a Support arrow; the message 'Illegal connection to support' will be displayed and you must click on 'Continue' to resume.

Negative numbers for Support and RFP ID's are invalid and create the error message 'ID is invalid'. Click on 'Continue' to resume.

If you attempt to add two arrows with the same RFP ID to the same side of a Process Box or Data Source/Sink, you will receive the error message 'Arrow already exists'; connect one arrow to the other instead.

If you attempt to make any connection using arrows other than those specified in the chart above, an error message will be displayed and you will not be allowed to make the connection.

The Fan In icon represents the summarization of data on a Process Diagram. The data line to the right is referred to as the Owning RFP and the lines to the left as the Owned RFP's. There may be any number (up to 99) of Owned RFP's per Owning RFP. The use of the Fan In and Fan Out icons may be seen as analogous to the hierarchical decomposition of processes by means of embedded Process Diagrams.

You must have opened a diagram in order to create a Fan In icon. Use the options under the DIAGRAM menu header to open a diagram.

To add a Fan In icon to your diagram click a mouse button with the cursor pointing at the Fan In icon. The Fan In icon is found under the menu header CREATE and has three lines on the left connected to a single line on the right. The arrow cursor will become a cross-hairs cursor. Move the cursor to the point where you wish the intersection of the Owned and Owning RFP's to be located and click a mouse button.

A dialog window appears, consisting of a header line with the standard functions: 'F1: HELP, F3: LIST, F5: DONE, F10: CANCEL', the title 'Owning RFP', and a body which consists of five fields for input: the Owning RFP ID, RFP Type, Select only Owning RFP's, RFP Name, and RFP Desc.

The Owning RFP ID is an automatically-generated RFP ID, whose components are represented by the arrows on the left of the Fan In icon; it corresponds to the single arrow on the right of the icon. A default value is provided that may be accepted as displayed, changed directly on the dialog window, or replaced by choosing from RFP ID's previously entered (by pressing F3).

You may select from previously entered Owning RFP ID's by placing a 'Y' in the 'Select only Owning RFP ID's' field, or from all previously-entered RFP ID's by placing a 'N' in the field. Pressing F3 will then display the appropriate selection list of RFP's.

After selecting an RFP from the list or entering the Owning RFP information in the dialog window, information about each of the Owned RFP's will also be entered. The Report/Form/Packet Information dialog window will be displayed with a system generated RFP ID to obtain the information for each of the Owned RFP's. This dialog window and the other two Report/Form/packet dialog windows are discussed more fully in the previous section, Arrow Icon. You will be prompted for additional Owned RFP's until F10: Cancel is pressed.

Once the Owned RFP and Owning RFP's have been entered and the Fan In icon appears on the Process Diagram, the data arrows on the icon may be connected, moved, etc. like single line RFP arrows.

If you enter or select a previously entered Owning RFP ID, the Owning ID and all of the Owned ID's will automatically be generated and displayed on the diagram. If you enter a new Owning RFP ID or an RFP ID that was not previously an Owning RFP, you will be presented with a series of Report/Form/Packet Information dialog windows. A dialog window for each of the Owned RFP ID's must be completed; if you press F10 for cancel while in an 'Report/Form/Packet Information' dialog window, you will end the entry of Owned RFP's.

When you have finished inputting the information for the last Owned RFP ID or if the Owning RFP ID previously existed, the Fan In icon will be created with the number of lines of the RFP's on the left equal to the number of Owned RFP's for which information was input. The cross-hairs cursor will then still be available so that you may create another Fan In icon at a different location if desired. If you do not want to include more Fan In icons on your diagram at this time, move the icon to any spot on the border of the screen, click a mouse button, and the arrow cursor will reappear.

If you entered a value for Owning RFP that consists of a character string not beginning with one of the digits 1-9, you will see the error message 'ID is invalid' displayed in a pop-up window; you must click mouse button with the cursor on Continue to resume.

The Fan Out icon represents the decomposition of data on a Process Diagram. The data line to the left is referred to as the Owning RFP and the lines to the right as the Owned RFP's. There may be any number (up to 99) of Owned RFP's per Owning RFP. The use of the Fan In and Fan Out icons may be seen as analogous to the hierarchical decomposition of processes by means of embedded Process Diagrams.

You must have opened a diagram in order to create a Fan Out icon. Use the options under the DIAGRAM menu header to open a diagram.

To add a Fan Out icon to your diagram click a mouse button with the cursor pointing at the Fan Out icon. The Fan Out icon is found under the menu header CREATE and has three lines on the right connected to a single line on the left. The arrow cursor will become a cross-hairs cursor. Move the cursor to the point where you wish the intersection of the Owned and Owning RFP's to be located and click a mouse button.

A dialog window appears, consisting of a header line with the standard functions: 'F1: HELP, F3: LIST, F5: DONE, F10: CANCEL', the title 'Owning RFP', and a body which consists of five fields for input: the Owning RFP ID, RFP Type, Select only Owning RFP's, RFP Name, and RFP Description.

The Owning RFP ID is an automatically-generated RFP ID, whose components are represented by the arrows on the right of the Fan Out icon; it corresponds to the single arrow on the left of the icon. A default value is provided that may be accepted as displayed, changed directly on the dialog window, or replaced by choosing from RFP ID's previously entered (by pressing F3).

After selecting an RFP from the list or entering the Owning RFP information in the dialog window, information about each of the Owned RFP's will also be entered. The Report/Form/Packet Information dialog window will be displayed with a system generated RFP ID to obtain the information for each of the Owned RFP's. This dialog window and the other two Report-/Form/packet dialog windows are discussed more fully in the previous section, Arrow Icon. You will be prompted for additional Owned RFP's until F10: Cancel is pressed.

Once the Owned RFP and Owning RFP's have been entered and the Fan Out icon appears on the Process Diagram, the data arrows on the icon may be connected, moved, etc. like single line RFP arrows.

If you enter or select a previously entered Owning RFP ID, the Owning ID and all of the Owned ID's will automatically be generated and displayed on the diagram. If you enter a new Owning RFP ID or an RFP ID that was not previously an Owning RFP, you will be presented with a series of Report/Form/Packet Information dialog windows. A dialog window for each of the Owned RFP ID's must be completed; if you press F10 for cancel while in an 'Report/Form/Packet Information' dialog window, you will end the entry of Owned RFP's.

When you have finished inputting the information for the last Owned RFP ID, or if the Owning RFP ID previously existed, the Fan Out icon will be created with the number of lines of the RFP's on the right equal to the number of Owned RFP's for which information was input. The cross-hairs cursor will then still be available so that you may create another Fan Out icon at a different location if desired; if you do not want to place more Fan Out icons on your diagram at this time, move the icon to any spot on the border of the screen, click a mouse button, and the arrow cursor will reappear.

If you entered a value for Owning RFP that consists of a character string not beginning with one of the digits 1-9, you will see the error message 'ID is invalid' displayed in a pop-up window; you must click a mouse button with the cursor on Continue to resume.

To include text on a Process Diagram wherever desired use the Text icon. Text may be placed anywhere on your diagram.

To add text to a diagram, place the arrow cursor on the word Text under the Create menu header on the Process Diagram Screen and click a mouse button; the cross-hairs cursor will appear. Move the cross-hairs cursor to the position on the diagram where the text is to be placed and click a mouse button.

The Free Text dialog window will appear. It consists of the normal header options and one system-generated field and several fields whose values are to be input. ID is a system-generated field that is three characters and should be accepted as is.

Justification is a one character field that may have the value 'L', 'C', or 'R'. 'L' indicates that the text will start at the vertical line of the cross-hairs cursor; 'R' indicates that the text will end at the vertical line of the cross-hairs cursor; and 'C' indicates that the text will be centered on the vertical line of the cross-hairs cursor. The default of 'C' is indicated when the window initially appears.

Size is a one digit number that indicates the relative size of the text. The default of 8 is initially displayed, and should be left as 8, since changing the font size is not allowed in Business Modelling.

Text is a fifty-character field that contains the text to be placed on the Process Diagram. Any non-null alphanumeric string up to fifty characters is supported. You may create longer text strings by placing a number of text strings next to each other on the diagram.

Color is a two character field that indicates the color of the text. The value may be 'R' Red, 'P' Pink, 'B' Blue, 'T' Turquoise, 'Y' Yellow, 'G'-Green, or 'N' Neutral.

Font is a two digit number that indicates the text Font. The default value is '4'. Changing the font type is not an option in Business Modeling, and should be left as 4.

Extended is a two character field that indicates how the text should be highlighted. The value may be 'HR' Highlight Reverse Video, 'HU' Highlight Underscore, 'HB' Highlight Blink, or blank for normal display without highlight. Changing the highlighting is not an option in business modelling, so this field may be left blank.

Intensity is a one character field that indicates whether the text should be 'B' Bright, 'N' Normal, or 'D' Dark. Changing the intensity is not an option in business modelling, so this field may be left blank.

Fill in the field values appropriately and press F5 to have the text placed on the Process Diagram. After the text has been placed on the diagram, the cross-hairs cursor will again be available so that you can include other text on your diagram. To discontinue placing text on your diagram, position the cursor on the border of the screen and click a mouse button, or press F10 when the Free Text dialog window is displayed.

'ID is invalid' will be displayed in the error message window if anything other than a positive integer is entered in the ID field.

'ID already exists' will be displayed in the error message window if the ID is changed to the value of a previous ID.

'Justification must be L, C, or R' will be displayed in the error message window if you enter anything other than an L, C, or R in the Justification field. These are the only Justification options supported.

'Size must be >0' will be displayed in the error message window if you enter anything other than a non-zero digit in the Size field.

'You must enter some text!' will be displayed in the error message window if the other fields contain valid entries but you have not included any text in the Text field.

'Font-code must be >0' will be displayed in the error message window if you enter anything other than a non-zero digit in the field.

'Extent must be HU, HR, or HR' will be displayed in the error message window if you enter anything other than a blank HU, HB, or HR in the Extent field. These are the only Extent options supported.

Although you can enter text on top of other text or on top of other icons, there are probably few good reasons to do such things, and it is a good idea not to, because editing functions such as Move and Delete require that the relevant text be identified by pointing. It may well become difficult to point at the required text or icon if they are overlapping.

Manage your diagrams using this option by adding new ones and deleting obsolete ones. Open a diagram for modification using this option. This option should be accessed first when the Process Diagram screen appears.

If you attempt to choose items from other Process Diagram menus without having opened a diagram using the DIAGRAM menu, you will be given an error message and denied access to the diagram tool.

The Open Diagram option exists under the DIAGRAM menu header on the Process Diagram screen and opens an existing Process Diagram for modification. If you are in the Process Diagram Screen and you wish to open a Process Diagram, then, using the mouse, place the arrow cursor so that the DIAGRAM Menu header is highlighted and click a button on the mouse; if another menu is pulled down you will have to click the mouse a second time, since the first only pulled up the previous menu.

Menu options that include 'Open' will appear under the menu header; move the arrow cursor to the Open option using the mouse and, when it is highlighted, click a button on the mouse. When the list of available Process Diagrams Names appears, place the arrow cursor so that the desired title is highlighted and click a button on the mouse. If more diagram titles exist than will fit on the screen, pan arrows are available in the upper and lower right-hand corners of the Process Diagram Name list to make it possible to see any of the Diagram Names that do not fit in the window. If necessary, use the pan arrows to move the list until the desired Name is visible in the window. Then highlight the Name of the Process Diagram you wish to work with and click a button on the mouse. The message 'One Moment Please . . . ' will appear, followed shortly by the specified diagram.

Note: A Process Diagram that is hierarchically connected with other Process diagrams provides alternative access methods to its owning and owned diagrams. So, if you are working on a diagram and you wish to access its owning diagram or one of the diagrams it owns, you may use the Up or Down options under the menu header to get from one Process Diagram to another.

You must be in the Process Diagram Screen to use the Open Diagram option; you may use this option whether on not another Process Diagram is open. If you click the mouse when the cursor is at any location other than those for which a function is prescribed, nothing happens.

If you click the mouse on the pan arrows when the list of Diagram Names cannot be moved in the direction specified because the list is already at the top or bottom, nothing happens.

If you attempt to open a diagram when none have been previously created for this project, you will receive the message 'No entries to choose'; to resume your work you must click the mouse when the cursor is on 'Continue'.

To create a new Process Diagram, use the New option under the DIAGRAM menu header. You must be in the Process Diagram screen to use the New option; it doesn't matter whether or not another Process Diagram is open. If you are in the Process Diagram screen and you wish to create a new Process Diagram, then using the mouse, place the arrow cursor so that the DIAGRAM Menu header is highlighted and click a button on the mouse; if another menu is pulled down you will have to click the mouse a second time, since the first only pulled up the previous menu.

The menu options that include New will appear under the DIAGRAM menu header. Move the arrow cursor to the New option using the mouse, and, when it is highlighted, click a button on the mouse. A dialog window will appear that is used to input identifying and descriptive information for the new diagram.

The dialog window consists of a header line, the title 'New Process Diagram Information', and a body which consists of four fields for input. The header line consists of the four functions: 'F1: HELP, F3: LIST, F5: DONE, F10: CANCEL'. The body of the diagram consists of four input fields: Diagram ID, Process Type, Diagram Name, and Narrative.

The Process Diagram ID consists of up to twenty characters and is the MetaVision identifier for the diagram being created; this is a required field.

The Process Type is a one character field that indicates whether the process is Automated ('A'), Manual ('M'), or Both (blank). The MetaVision Prototyping Module uses this information to identify the processes to prototype.

The Diagram Name may be up to fifty characters and is the title that will be displayed on the top of the diagram and in various other places; this is not a required field, but a value here is strongly recommended to aid in keeping track of your diagrams.

The Narrative consists of four lines of fifty characters each which describe the process and provide additional information not evident from the Process Diagram.

Fill in the input fields and press F5 to create a new diagram with the displayed identifying and descriptive fields, or press F10 to cancel the addition of a diagram at this time.

The Diagram ID field is required. If you do not put a value in that field and press F5 you will receive the message 'Owned ID' is invalid; you must then place the cursor on the 'Continue' portion of the error message pop-up window and click the mouse. You can get a list of the values for this field by pressing F3, or you can create a new value.

If a value other than blank, 'A', or 'M' is entered for Process Type you will receive the message 'Process Type must be 'A', 'M', or blank'; you must then place the cursor on the 'Continue' portion of the error message pop-up window and click the mouse.

It is definitely a good idea to enter a Process Diagram Name and Narrative, even though they are not required by MetaVision.

To bring up the Process Diagram that is hierarchically above the one currently displayed, or to create it if it does not exist, use the Up option under the DIAGRAM menu.

You must have opened a diagram on the Process Diagram screen in order to use the DIAGRAM Up option. Move the arrow cursor to the DIAGRAM Menu Header (near or on the word DIAGRAM) and click a mouse button.

The DIAGRAM options will appear under the DIAGRAM Menu header. Select the Up option by moving the cursor so that Up is highlighted and clicking a mouse button. The Process Diagram that owns the current Process Diagram will be displayed.

If a Process Diagram does not exist for the owning process when the DIAGRAM Up option is invoked, the message 'Create Owning Process' will be displayed. If you click a mouse button on 'NO', you are returned to the current diagram. If the 'YES' response is selected, the New Process Diagram Information dialog window pops up. It is completed as described above under 'New'.

It should be noted that you cannot move up from the top level Process Diagram (ID is 0). If Up is selected the error message 'No Owning Process Exists' will be displayed. Click a mouse button on 'Continue' to proceed.

There are a number of ways to move between Process Diagrams. The DIAGRAM Up and Down options provide the most straightforward means once a diagram has been opened using the DIAGRAM Open option. The DIAGRAM Up option provides a quick way to move to and work on the owning Process Diagram for the diagram currently displayed and to create the owning Process Diagram if it does not already exist.

A set of Process Diagrams may be visualized as the roots of a tree with a single node at the top. The Process Diagram at this top node describes the entire process being modeled on one Process Diagram. The second level down decomposes the component process boxes appearing on the top level diagram, the third level decomposes the boxes appearing on the second level, and so on.

There is, at most, a single Process Diagram above any Process Diagram (the one at the top doesn't have any Process Diagram above it). Moving to the next higher level on the tree is accomplished using the DIAGRAM Up option; the Process Diagram at this level is said to 'own' the Process Diagrams on the level below it. In other places, this diagram is referred to as the parent Process Diagram and the owned process as a child process. Moving from a diagram to its owning Process Diagram is useful for quickly determining the context of the diagram on which you are working, and to visually validate that the input, process, and output arrows on the current diagram are represented on the next higher diagram.

The owning Process Diagram for a diagram is established in one of three ways: (1) via the Create Process Box option; (2) by MetaVision when you invoke the DIAGRAM Down option for a process that has not previously had a diagram created for it; or (3) using the DIAGRAM Up option.

If you invoke the Up option before you have opened a Process Diagram, the message 'No Process Diagram open' will be displayed in a pop-up error message window; you must click on 'Continue' to resume.

The Diagram ID must be non-null; if you delete the system-generated Diagram ID without replacing it with another and try to add the process box via F5, you will receive the message 'ID is invalid'; you must click on 'Continue' to resume.

If you change the system-generated Diagram ID to be the same as a Diagram ID previously used, the error message 'Process already exists' will be displayed, and you must click a mouse button with the cursor on 'Continue' to resume.

To move to a Process Diagram corresponding to one of the process boxes on the current diagram use the DIAGRAM Down option. This option will create the Process Diagram if it does not exist prior to invoking the Down option.

You must have opened a diagram in order to invoke the Down option. Move the arrow cursor to the DIAGRAM menu header and click a mouse button. The DIAGRAM menu options will appear under the Hierarchy Menu header; Down is the fourth option on the list.

Select the Down option by moving the cursor until Down is highlighted and clicking a mouse button. The hand cursor replaces the arrow cursor. Move the hand cursor to the process box that you wish to decompose and click a mouse button again. The selected process will be displayed with the header line (Process ID and name) for the corresponding diagram. All of the Menu options are available for use with the diagram.

This option permits the opening of a Process Diagram that corresponds to one of the process boxes on the Process Diagram currently open. The hand cursor is used to point at the Process Box that will become the Process Diagram opened for editing. Any of the displayed process boxes may be selected by moving the cursor so that it points to the desired process box and clicking a mouse button. If a Process Diagram does not exist for the process you have selected, the system will create a diagram for it.

In creating the system information for the new Process Diagram, the system uses the Owning Process ID of the Process from which the option is invoked.

If you invoke the DIAGRAM Down option before you have opened a Process Diagram, the message 'No Process Diagram open' will be displayed in a pop-up error message window; you must click on 'Continue' to resume.

If you invoke the DIAGRAM Down option on a Process Diagram that does not contain any component process boxes, you won't have anything to point to and you'll have to click a mouse button to replace the hand cursor with the arrow cursor.

To save all additions and changes to diagrams since the last save use the Save option.

The Save option is under the DIAGRAM menu header and saves all changes that have been made to any diagrams since the last save.

Position the cursor on the DIAGRAM menu header and click a mouse button. The DIAGRAM options will be displayed in a pull-down menu. Move the cursor to the Save option and click a mouse button again. The changes made to any diagrams since you last issued a Save will be made permanent. When the process is complete the control of the cursor will be returned to you.

It is strongly recommended that the Save option be used periodically to save your work to insure against power or program failures.

Undo

To undo any changes that have not been made permanent by means of the DIAGRAM Save option while working on a diagram or by the Quit Save option when leaving a diagram, use the DIAGRAM Undo option.

The Undo option is a means of retracting a set of changes without having to retract each component of the changes. This capability only exists for entries, additions, changes, and deletions that have been made since the last Save operation was performed.

All changes made to any diagram since you used the Save option will be lost, and all diagrams will be returned to the state they were in when you last invoked a Save option.

Position the cursor on the DIAGRAM menu header and click a button on the mouse. The DIAGRAM options will be displayed in a pull-down menu. Move the cursor to the Undo option and click a button on the mouse again. A pop-up window with the message 'Are you sure' will appear. To complete the Undo, select 'YES' by positioning the cursor and clicking a mouse button. When the process is complete the control of the cursor will be returned to you. To abandon the Undo operation, select 'NO'.

Be certain that you really want to perform an undo of all work since you last saved your work, since invoking this option causes ALL work since your last save to be irrevocably deleted. Consequently, you should leave a modified Process Diagram using the sequence DIAGRAM Quit Save when you wish changes to be made permanent. If you use the sequence DIAGRAM Quit Exit, your changes may be undone by an Undo operation that you think is only undoing the changes made to another diagram.

To stop work on one Process Diagram and begin work on another one use the DIAGRAM Close option. The DIAGRAM Close option removes a diagram from the screen and returns you to a state where you may add or open another diagram.

Position the cursor on the DIAGRAM menu header and click a button on the mouse. The DIAGRAM options will be displayed in a pull-down menu. Move the cursor to the Close option and click a mouse button again. An option-selection window will be displayed with three available options: Save, Undo, and Exit.

The Save option makes permanent the information on all changes that have been made to all of your diagrams since the last Save operation and that have not been undone. Select this option by placing the cursor in the corresponding highlighted selection box and pressing a button on the mouse.

The Undo option restores all diagrams to their state at the time of the last Save operation, thereby undoing all changes, additions, or deletions to all of your diagrams in the meantime. Select this option by placing the cursor in the corresponding highlighted selection box and pressing a button on the mouse. The Undo must be confirmed by selecting the 'YES' option on the 'Are you sure' pop-up window.

The Exit option leaves the currently-open diagram without making any changes to that diagram permanent. Information on changes made to a diagram are kept in a temporary set of files. The information in those files is moved to the permanent project information files when a Save option is selected, or deleted if an Undo operation is performed first. Select this option by placing the cursor in the corresponding highlighted selection box and pressing a button on the mouse.

After selecting one of the preceding three options, the Process Diagram screen will be available for you to open or add a new Process Diagram.

Be certain that you really want to perform an undo of all work since you last saved your work, since invoking this option causes ALL work since your last save to be irrevocably deleted. Consequently, you should leave a modified Process Diagram using the sequence DIAGRAM Close Save when you wish changes to be made permanent. If you use the sequence DIAGRAM Close Exit, your changes may be undone by an Undo operation that you think is only undoing the changes made to another diagram.

The Delete Option exists under the DIAGRAM Menu header on the Process Diagram screen. Clicking a button on the mouse when the arrow cursor is on the Delete option causes a pop-up screen to appear which lists the Diagram ID and Diagram Names of as many of the previously-created diagrams as will fit in the window at a time. The pop-up window consists of a header line with HELP and CANCEL, a title, and, below the title, a list of Process Diagrams with their IDs and Names.

Pan arrows are present in the upper and lower right-hand corners of the Process Diagram ID—Name list to make it possible to see any of the diagram ID—Names that initially do not fit in the window Placing the cursor arrow on one of the pan arrows and clicking the mouse moves the list of diagram ID—Names in the direction of the arrow.

Placing the cursor arrow on one of the diagram titles highlights the title and if the mouse is clicked, the corresponding diagram and all associated control information is deleted from the MetaVision system.

The Quit Option exists under the DIAGRAM Menu header in the Process Diagram screen and causes the current Process Diagram to be closed and the Main Menu Screen to be displayed.

You must be in the Process Diagram Screen to use the Quit option. If you are in the Process Diagram screen and you wish to access another part of MetaVision, then, using the mouse, place the arrow cursor so that the DIAGRAM menu header is highlighted and click a button on the mouse; if another menu is pulled down you will have to click the mouse a second time since the first only pulled up the previous menu.

The menu options that include 'Quit' will appear under the menu header; move the arrow cursor to the Quit option using the mouse and, when it is highlighted, click the mouse.

You will be returned to the main menu options on the Main Menu screen. If you wish to exit MetaVision completely at this time you may move the arrow cursor to the Project Menu and pick the Quit option there.

Remember that any changes made to any diagrams that have not been made permanent by using a Save option will be maintained and made permanent the next time a Save option is performed, or deleted when an undo operation is chosen. It should be noted that a Save is automatically performed when you exit MetaVision.

Use this option to modify components already appearing on a diagram by moving, swapping, deleting, or changing database information concerning them.

To change information relating to a Process Diagram icon use the Change option under the EDIT menu header. Change is the first option under the EDIT menu header, and permits changing information relating to an icon existing on the Process Diagram that is currently open. Except for ID fields, any information field associated with any of the icons on the diagram may be changed using the Change option.

Icon-related information is edited via dialog windows that are the same as the original input screens used at the time of creation of the icons. Process boxes are edited via the Process Box dialog window. RFP arrows, either singly or as components of Fan In or Fan Out Icons, are edited via the Report/Form/Packet Information dialog windows. Data S/S's are edited via the Data Source/-Data Sink dialog window.

You must have opened a diagram on the Process Diagram screen in order to edit the information for icons. Move the arrow cursor to the EDIT menu header (near or on the word EDIT) and click a mouse button. The EDIT options will appear under the EDIT menu header. Move the arrow cursor so that the Change option is highlighted and again click a mouse button. The Edit options will be removed and a pointer cursor will replace the arrow cursor. Move the pointer cursor so that it points to the label of the icon for which you wish to change information and click a mouse button. The icon you have pointed at will be highlighted and the dialog window for that type of icon will appear.

Enter information in the fields of the dialog window just as you would when creating them, except that you cannot modify the value in the ID field. When you are done press F5:DONE to have the changes go into effect; the system files will be updated and the modified icon information will be displayed on the diagram if appropriate. The hand cursor will still be available so that you can select another icon and change the information associated with it.

When you are done changing information for icons, move the hand cursor off the diagram to the border of the screen and click a mouse button to have the arrow cursor reappear. If you pressed F10: CANCEL while in a dialog window to discontinue entering changes to icon information, the arrow cursor reappears and you must click on the Change option in the EDIT menu to make further changes.

Note that the change option is only for changing already-existing data, and not for adding new icons, or for deleting or changing the position of existing icons. For the add functions, use the CREATE menu; for the other two, use the Delete or Move options on the EDIT menu. The options on the dialog window header lines have interpretations similar to their normal ones, with the following differences. F5: DONE has the function of entering the changes made into the system database for that icon, and F3: LIST displays the icons of the same type but does not allow choosing one of them; they are displayed for your information only.

The Delete option is the second option under the EDIT menu header; it permits deleting any of the icons on a diagram. In addition to deleting the icon pointed to, other icons may also be deleted from the diagram in order to maintain the integrity of the relationships between the icons on the diagram.

In order to delete icons, you must have opened a diagram on the Process Diagram screen. Move the arrow cursor to the EDIT menu header (near or on the word Edit) and click a mouse button; the Edit options will appear under the EDIT menu header. Move the arrow cursor so that the Delete option is highlighted and again click a mouse button. The Edit options will be removed and a hand cursor will replace the arrow cursor. Move the hand cursor so that it covers part of the name of the icon to be deleted and click a mouse button. The icon will be deleted, along with any of the other icons that must be deleted to maintain the integrity of the diagram.

The hand cursor will still be available to be used to delete other icons on the diagram. When you are done deleting icons on a diagram, move the hand cursor so that it is not touching any icon and click a mouse button; the arrow cursor will replace the hand cursor. Occasionally a Process Diagram will appear a bit 'ragged' after an icon is deleted, with a stray line or text still visible; these may be removed by using the REPAINT menu option found on the far right of the Process Diagram screen.

When a Process Box is deleted, all arrow icons connected to it that are not connected to another Process Box are also deleted. When any of the Owned RFPs or the Owning RFP in a Fan In or Fan Out icon are deleted, the entire Fan In or Fan Out icon is deleted. This option is very powerful and the results of its use are permanent after the Diagram Save option is invoked. It is therefore important that care be taken that only the desired icons are removed using it. (You may of course recreate the deleted icons, but this may be difficult or impossible if there is no hard-copy of the diagrams on which they appear.)

There are no error messages that are displayed with this option; if you delete something, it is deleted. If you click a mouse button when the hand cursor is not touching an icon the cursor reverts to the arrow cursor. If you delete an icon by mistake, you can use the Undo option to restore the diagram to the state it was in as of the last Save, though all changes since the last Save will be lost. It may be more appropriate to simply recreate the mistakenly-deleted icon.

Use the EDIT Remove option to delete a single Owned RFP from a Fan I/O icon.

The Move option under the EDIT menu header is used to reposition icons on a Process Diagram. Any icon may be moved to any position on the diagram that is visible; all connections between that icon and other icons on the diagram will be maintained. A hand cursor is used to indicate the icon to be moved.

When a mouse button is clicked with the hand cursor on an icon, the icon is highlighted and may then be moved to any position visible on the screen. Clicking a mouse button again causes the highlighted icon to be redrawn in the new position; at the same time, all the arrow icons to which it is connected are also redrawn, so that the connections are rerouted.

You must have opened a diagram on the Process Diagram screen in order to edit icons. Move the arrow cursor to the EDIT menu header (near or on the word EDIT) and click a mouse button. The EDIT options will appear under the EDIT menu header. Move the arrow cursor so the Move option is highlighted and again click a mouse button.

The EDIT options will be removed and a hand cursor will replace the arrow cursor; move the hand cursor so that it is over part of the icon and click a mouse button. A highlighted image will be 'attached' to the cursor; you may move it to any location on the screen. Clicking the mouse again will cause the icon to be repositioned in that location and all other connecting arrow icons to be redrawn so that they maintain the same connections but with different routings.

If an overall perspective of icons on a Process Diagram page is needed in order to position the icons on the page, use the ZOOM Menu options to make the whole diagram page visible on the screen. The page outline is indicated by the (yellow) border line. Move the icons on the page to the position desired and then again use the ZOOM menu options to return the icons to full size.

For arrow icons connecting two icons, the lines that can be moved depend on whether the icon was created using the Automatic or Manual routing technique. For either method the horizontal portions of the arrow going to or from other icons cannot be moved using the Move option. For arrow icons created with the Manual routing technique, either of the vertical portions of the arrow or the horizontal portion of the arrow that connects the two vertical portions can be moved using the Move option. For arrow icons created with the Automatic routing technique only the vertical portion of the arrow can be moved using the Move option.

After the affected portions of the diagram have been redrawn, the hand cursor will still be available so that you can select another icon and move it without having to return to the EDIT menu header. To discontinue the Move option, place the hand cursor so that it is not touching any icon and click a mouse button. The hand cursor will be replaced by the arrow cursor and the move option will no longer be in effect. If the screen has some 'ragged' portions after moving an icon, place the arrow cursor on the REPAINT menu header on the far right of the menu header line and click a mouse button; the screen will be redrawn to reflect only the information in the database.

Icons may be placed on top of one another but this is not advised, since it will probably be difficult to separate them later. Under normal circumstances, there should be no need to place icons on top of one another.

It is possible to move portions of icons outside the border of the page by moving them beyond the yellow boundary lines which indicate the edges of the page. Portions of the diagram beyond the edges of the page will not be printed or plotted.

If you attempt to move the horizontal portion of an arrow that is going into or coming from a Process Box or Data S/S, the hand cursor will have no effect, since you cannot move those portions of arrows.

Sometimes it may be difficult to click a mouse button precisely when the cursor is on the icon's label. If the cursor is not positioned correctly it will have no effect. Try to get the horizontal line in the hand cursor even with the horizontal lines of the label that you are trying to move.

The order of the connection of arrows to and from Process Boxes, Data Source/Sink icons and Fan In and Fan Out icons is originally automatically generated by MetaVision. Often the arrows are not ordered in an optimal way, since the system-generated ordering may involve more crossing of lines than is necessary or desirable.

The Swap option gives you the capability of swapping the positions of any two arrows going into or coming from the same icon if they are on the same side of the icon. For example, the positions of two Control Arrows on the same Process Box may be swapped, as may the positions of two Input Arrows on the same Process Box, or two owned RFP's on a Fan In icon, and so on.

You must have opened a diagram on the Process Diagram screen in order to edit the information for icons. Move the arrow cursor to the EDIT menu header (near or on the word EDIT) and click a mouse button. The EDIT options will appear under the EDIT menu header. Move the arrow cursor so that the Swap option is highlighted and again click a mouse button; the EDIT options will be removed and a hand cursor will replace the arrow cursor. Move the hand cursor so that it points to a part of the arrow name and click a mouse button; the portion of the Arrow icon with the Arrow Name will be highlighted. Move the hand cursor to the other arrow to be swapped with the first and again click a mouse button.

The positions of the two arrows will be reversed. If the arrows are Input or Output arrows, the one originally on top will now be on the bottom and vice versa; if the arrows are Control or Personnel arrows the one on the right will now be on the left and vice versa. The hand cursor will remain, so that you may swap other arrows positions if desired. If you do not want to swap the positions of any other arrows at this time, you may leave the Swap mode by moving the hand cursor to a position on the outer borders of the screen; this causes the arrow cursor to return.

If you attempt to swap arrows that are not on the same side of a Process Box, the message 'Arrows must be on the same process side' will appear in a pop-up window; you must click a mouse button with the cursor on 'Continue' to resume.

If you first select an arrow that is connected to a Process Box and by mistake do not select another arrow, the message 'Choose two arrows of a process' will appear in a pop-up window; you must click a mouse button with the cursor on 'Continue' to resume.

If you first select an arrow that is connected to a Process Box and you attempt to swap the arrow with an arrow that is connected to another Process Box, the message 'Arrows must belong to the same process' will appear in a pop-up window; you must click a mouse button with the cursor on 'Continue' to resume.

If you first select an Owned RFP connected to a Fan In or Fan Out icon and then select an Owned RFP that is not owned by the same Owning RFP, the message 'Arrows must belong to the same Fan I/O' will appear in a pop-up window; you must click a mouse button with the cursor on 'Continue' to resume. If your first mouse button click is on an Owning RFP, the message 'Only owned arrows can be swapped' will appear in a pop-up window; you must click a mouse button with the cursor on 'Continue' to resume.

To add an Owned RFP icon to a set of Owned RFP icons connected to a Fan In or Fan Out icon, use the Insert option. This option makes it possible to add an Arrow without deleting the entire icon and starting over by creating a new one with the additional icon.

To insert an Owned RFP icon on your diagram place the arrow cursor so that the EDIT menu header is highlighted and click a button on the mouse. Choose the Insert option from the options under the EDIT menu header; a hand cursor will appear. Move the hand cursor to the position in the Fan icon where you wish the new arrow to be inserted and click a button on the mouse. A dialog window appears entitled 'Report/Form/Packet Information' The header line consists of the standard functions F1: HELP, F3: LIST, F5: DONE, and F10: CANCEL.

The body of the dialog window consists of five input fields: RFP ID, Add More Info., RFP Type, RFP Name, and Desc.

The RFP ID is an automatically-generated 4-digit positive integer that is used by the system to identify the arrow.

The RFP Name may be up to 50 characters long and is used to label the arrow on the Process Diagram; it identifies the data for the reader. (Note that only about thirty characters of the RFP Name are printed on the arrow.)

The 1-character field labeled 'Add More Info.' has a default of 'N'; other values can be entered, but only 'Y' or 'y' will permit the input of detailed information about an RFP via two dialog windows.

When you enter a 'Y' or 'y' in the 'Add More Info.' field, the second RFP dialog window appears, consisting of a header line, the title 'Report/Form/Packet Information', and a body of 6 fields for input. The header line consists of the normal functions: 'F1: HELP, F3: LIST, F5: DONE, F10: CANCEL'. The body of the window consists of six input fields: the RFP ID, Form Number, Volume, Information Quality, Security Requirements, and Performance Criteria.

The RFP ID is the RFP ID that appeared on the first Report/Form/Packet Information dialog window and is displayed for ease of identifying the RFP to which the information applies. Form Number is a 10-character alphanumeric field that can contain a cross-reference number to a form number found on the actual form being represented. The Volume is a 7-digit number that indicates the amount of data in pieces that are involved with the RFP being described. Information Quality is a single character/integer field that may contain a user-defined code that indicates the reliability and validity of the data represented here.

Security Requirements is a 35-character field that may contain free format text or any standard coding scheme for the characterization of the security procedures that obtain with respect to the RFP.

Performance Criteria is a 35-character field that may contain free format text or any standard coding scheme for the characterization of the speed and reliability of any processing of this data by the system.

When you exit the second RFP Information window a third dialog window appears consisting of a header line, the title 'Report/Form/Packet Information', and a body, which consists of six fields for input. The header line consists of the four functions: F1: HELP, F3: LIST, F5: DONE, F10: CANCEL. The body of the window consists of six input fields, including fields for Volatility, Retention Quantity, Measure, Frequency of Access, Frequency Measure, and two lines for Comments.

Volatility is a 10-character field that may be used to describe the turnover rate of any given data.

Retention Quantity is a 6-digit integer field that is used to indicate the length of time this RFP is retained in the system being modeled, measured in units indicated by the next field, Retention Measure. Retention Measure is a 1-character field coded to indicate the extent of the time measurement used for the Retention Quantity; conventional values include 'Y'-year, 'M'-month, and 'D'-day.

Frequency of Access is a 7-digit numeric field that is used to indicate the number of times per time period the RFP is accessed; the unit of measure for the time period is found in the Frequency Measure field which immediately follows. Frequency Measure is a 10-character field that indicates the unit of measurement used in the Frequency of Access field.

Two lines of 50 characters each are provided for Comments that help to explain the RFP.

When the first 'Report/Form/Packet Information' dialog window appears, you may use a previously-entered ID by either simply entering the ID or pressing F3 to obtain a list of previously-entered IDs. If you enter an existing ID, the message 'RFP ID already exists—change name?' to which you respond 'YES' or 'NO' by moving the cursor to the corresponding area and clicking the mouse. Normally, you should select 'NO'. The information for the RFP ID that was entered will be displayed. Press F5 to select the RFP. If 'YES' is selected, the existing information for the RFP will be overwritten with the contents of the dialog window once F5 is pressed. If the dialog window is not filled in, the information will be lost. Any changes to the RFP information will be globally reflected in all occurrences of the RFP.

When you have finished inputting the information for the Owned RFP ID, the first Report/Form/Packet Information dialog window will again be displayed. You may end the Insert option by pressing F10 or continue to insert additional RFP's. After F10 is pressed to end the Insert option, the modified icon will be created with the number of lines of the Owned RFP's increased by the number of inserted RFP's.

To remove an Owned RFP arrow from a Fan In or Fan Out icon use the Remove option. This makes it possible to remove an arrow without deleting the entire icon and starting over by creating a new Fan I/O without the deleted Owned RFP.

To remove an Owned RFP icon on your diagram place the arrow cursor so that the EDIT menu header is highlighted and click a button on the mouse. Choose the Remove option from the options under the EDIT menu header and a pointer cursor will appear. Point the cursor to the position in the Fan icon highlighting the RFP you wish to be deleted and click a button on the mouse.

The icon will be redrawn without the Remove(d) icon. This removal from the Fan icon will not remove the icon from the diagram if it is connected to something on the end of the arrow that was not formerly connected to the Fan icon.

If you remove an icon and wish to retrieve it without recreating it, you may use the Undo option. However, this will undo all changes since the last Save operation.

Use the ZOOM option to redraw the diagram in the window at some factor smaller or larger than its current size.

It is often desirable to enlarge a portion of a Process Diagram so that it fills the entire screen, since this makes editing of that portion of the diagram easier. A portion of a diagram is enlarged by outlining that portion using the Arbitrary option. The outlined portion will then fill the screen. Process Boxes, Data Source/-Sink icons, and Fan In/Fan Out icons will be enlarged proportionally. Arrow icons will be lengthened to connect other icons appropriately. Names will occupy their normal positions on the icons, i.e. in the center of Process Boxes and Data Source/Sink icons and at the beginning of data arrows. It should be noted that Names will only be displayed if the combination of zoom factor and font will allow. The normal CREATE, EDIT, ZOOM, SETUP, HYPERTEXT, HELP, and REPAINT options are available on the enlarged diagram.

In order to enlarge a portion of the diagram, you must have opened a diagram on the Process Diagram screen. To enlarge a portion of a diagram displayed on the screen use the Arbitrary option under the ZOOM menu header. Move the arrow cursor to the ZOOM menu header and click a mouse button. The ZOOM options will appear under the ZOOM menu header; 'Arbitrary' is the first option on the list. Select the Arbitrary option by moving the cursor until 'Arbitrary' is highlighted and clicking a mouse button; the menu options will disappear and a cross-hairs cursor will appear. Move the cross-hairs cursor to a corner of the portion of the screen to be enlarged and click a mouse button. Any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged. Vertical and horizontal lines will appear as the cursor is moved to indicate the bounds of the portion of the diagram that will fill the screen. Click the mouse a second time to establish the size and extent of the portion of the diagram to be enlarged; the portion outlined will be enlarged to fill the screen.

A portion of the enlarged diagram may again be expanded using the Arbitrary option, though this will usually not be necessary. The ZOOM $\frac{1}{2}\times$ and $2\times$ options may also be used on the results of using the Arbitrary option.

Mistakes are not identified as such explicitly by the system for this option; some actions, however, are not recommended or motivated.

If you move the cross-hairs cursor to a spot and click a mouse button twice on that same spot the diagram will be redrawn without any changes.

If you move the cross-hairs cursor to a spot on the border of the screen and click a mouse button the diagram will be redrawn without any changes.

If you expand a Process Diagram so that nothing is showing on the screen you will not see the relation of the expanded portion to other icons.

If you expand a portion of a diagram that lies entirely within a Process Box and then create a Process Box on the expanded screen, the edges of the new Process Box will not be visible, and when you return to a more standard size the new Process Box will partially or completely overlap the original so that it may be difficult to separate the two boxes.

The complete Process Diagram may be viewed on the screen at one time by means of the ZOOM Fit Screen option. Appropriate magnification factors are calculated by the system to make the diagram fit on the screen; the yellow line that appears indicates the boundaries of the page on which the diagram fits. The page size is determined by the SETUP menu option. The diagram will not always fill the screen if its height or width is extreme, but the boundaries of the diagram will always be visible.

You must have opened a diagram on the Process Diagram screen in order to use the Fit Screen option. To use the option move the arrow cursor to the ZOOM menu header (near or on the word ZOOM) and click a mouse button. The ZOOM options will appear under the ZOOM menu header. Select the Fit Screen option by moving the cursor so that 'Fit Screen' is highlighted and click a mouse button. The menu options will disappear and the screen will be redrawn so that the boundaries of the diagram, indicated by yellow lines, will appear.

If the page size is much greater in one dimension than in the other (say, 30 by 7.5 inches) the Fit Screen option may not be very helpful, since the page may be too narrow to display the icons in a recognizable way. It may be better to use other ZOOM options such as Arbitrary and $\frac{1}{2}\times$ to place the icons on the page.

The Fit Screen option is useful for rough placement of icons on the diagram and in selecting a portion of the page to edit at a larger size. The Fit Screen option may be required when routing connections between widely spaced icons since you can only join icons that appear on the screen together.

If you change the page size, the ZOOM Fit Screen option will have to be executed again to fit the new page size on the screen. Many or all of the icon names may be suppressed, so that you will not be able to identify the individual icons except by their shape, position, and your memory; you can, however, still edit them in the normal way.

Only a part of the Process Diagram will normally be visible on the screen at one time, since the size of the screen where diagram editing is performed is not usually the same size as the paper on which the diagram will be printed. Use the ZOOM Actual option to see a portion of the diagram with the icons the same size as they will be when plotted. You may move the view of the screen by means of the pan bars along the bottom and right of the screen to see any portion of the diagram that you wish.

You must have opened a diagram on the Process Diagram screen in order to use the ZOOM Actual option. Move the arrow cursor to the ZOOM menu header and click a mouse button. The ZOOM options will appear under the ZOOM menu header. Select the Actual option by moving the cursor so that Actual is highlighted and click a mouse button. The menu options will disappear and the screen will be redrawn so that the icons will be labeled and be the size they will be when they are printed or plotted.

In order to see as much as practical of a Process Diagram while still seeing all of the icon names, you will normally work on it at Actual size; this is the default size that is used when you initially create a new Process Diagram.

Often a diagram will be too big to see all the components and their relationships at once. The ZOOM ½× option provides the means to shrink a diagram by 50%. The option may be repeated and the diagram shrunk even smaller, or used before or after other ZOOM options. Use the ½× option to 'undo' the 2× option.

In order to use the ZOOM ½× option, you must have opened a diagram on the Process Diagram screen. Move the arrow cursor to the ZOOM menu header and click a mouse button. The ZOOM options will appear under the ZOOM menu header. Select the ½× option by moving the cursor so that ½× is highlighted and click a mouse button. The menu options will disappear and the screen will be redrawn so that the icons will be half the size they were before the option was selected.

It is possible to reduce the size of the diagram to the point where it almost disappears. You will have problems selecting icons if you try to edit a diagram when it is in a very reduced size, and if you Create an icon when the diagram is at a reduced size you will have minimal control over its position with respect to other icons on the diagram.

Often a diagram will be too small to easily edit the components and their relationships. The ZOOM 2× option provides the means to expand the diagram to twice its size before executing the ZOOM 2× option. This option may be repeated and the icons made even larger, or it may be used before or after other ZOOM options. The 2× option may be used as an 'undo' of the ½× option.

In order to use the ZOOM 2× option, you must have opened a diagram on the Process Diagram screen. Move the arrow cursor to the ZOOM menu header and click a mouse button. The ZOOM options will appear under the ZOOM menu header. Select the 2× option by moving the cursor so that 2× is highlighted and click a mouse button. The menu options will disappear and the screen will be redrawn so that the icons will be twice the size they were before the option was executed; only half as much of the diagram will be displayed on the screen.

If you repeatedly apply the 2× option to a diagram you will eventually not see any of the icons for the diagram on the screen. If you add icons to the diagram when it is this size you will not be able to see them, since they will be enlarged to be the same size as other icons.

The ZOOM Enter Zoom option allows an arbitrary zoom factor to be entered so that a diagram may be displayed at any size. This is an absolute zoom factor. If 1.0 is entered, the result is the same as selecting the Actual option. Trial and error will quickly give you experience in choosing a specific zoom factor appropriate for your purpose.

You must have opened a diagram on the Process Diagram screen in order to use the Enter ZOOM option. Move the arrow cursor to the ZOOM menu header and click a mouse button. The ZOOM options will appear under the ZOOM menu header. Select the Enter Zoom option by moving the cursor so that 'Enter Zoom' is highlighted and click a mouse button; the menu options will disappear and the Zoom Factor dialog box will be displayed with the current zoom factor. Enter a larger or smaller value and press the F5 key to register your selection. This selection will remain active as the default selection until you again change it for this diagram.

A non-positive zoom factor is not permitted.

Often a diagram will be too big to see all the components and their relationships at once; the ZOOM 75% option provides the means to shrink the diagram to 75% of its actual size. The arrow icon names will not be displayed at this size and only a portion of the Data Source/Sink and Process Box Names will be displayed along with the ID's for the Data Source/Sink and Process Box icons.

You must have opened a diagram on the Process Diagram screen in order to use the ZOOM 75% option. Move the arrow cursor to the ZOOM menu header and click a mouse button. The ZOOM options will appear under the ZOOM menu header. Select the 75% option by moving the cursor so that '75%' is highlighted and clicking a mouse button. The menu options will disappear and the screen will be redrawn so that the icons will be ¾ the size they would be had the Actual option been chosen.

Use this option to set the size of the diagram, shift the entire diagram on the page, and set the grid for the diagram.

The Page Size option exists under the SETUP menu header. It provides the capability of changing the size of the diagram page that appears on the screen or that will be printed or plotted. Edges of the page are indicated on the screen by means of a thin (yellow) line. Page sizes are connected to each diagram independently, so they need to be set for each diagram if they differ from the default values.

You must have opened a diagram on the Process Diagram screen in order to set the page size using the SETUP Page Size option. Move the arrow cursor to the SETUP menu header and click a mouse button. The SETUP option Page Size will be highlighted under the SETUP menu header; click a mouse button a second time to invoke the option.

The Page Size dialog window will appear; it consists of a header line, the title 'Page Size' and 2 input fields. The header line includes the normal functions. The body of the window consists of two input fields, Page Width and Page Height, which are each 7 digits. The values input should be numbers and may contain a decimal point; other non-numbers are not supported. Press F5 to have the new page size established. F10 will leave the dialog window without changing the size of the page. Shortly the diagram will be redrawn with the new page edges indicated by the thin (yellow) line. If the diagram doesn't fit on the resized page, it may be necessary to use the ZOOM Fit Screen option.

Diagrams are printed or plotted either rotated or not rotated, depending on whether the orientation is set to Portrait, which is the default value, or Landscape, which rotates the output 90 degrees clockwise from the way it appears on the screen. You need to take this into account when setting the page size using this option, especially if you want all of the diagram to print on a single page.

Another consideration in determining page size is whether the Paper is set to Narrow, which is the default value, or to Wide. In Narrow mode the diagram will be printed using a value of 8.5"×11" for the paper size and the printer driver will write on an 7.5"×10" area of the paper. In Wide mode the diagram will be printed using a value of 14"×11" for the paper size and the printer driver will write on a 13"×10" area of the paper. A consequence of this is that if you want to print a diagram on a single 8.5"×11" page using Portrait, the page size should not be more than 7.5"×10"; for Landscape, the page size should not be more than 10″×7.5″. If the printout will not fit on a single sheet, the printer driver automatically continues printing or plotting on successive sheets; the parts of the page can then be cut and pasted together.

If the diagrams are to be presented in book form and a diagram cannot fit on a single page, it is usually best to print it in Portrait mode with the Page Width in increments of 7.5″ and a Page Height of 10″. This will allow the cut and pasted diagram to neatly fold out of the binder.

If you select the Page Size Option without having first opened a diagram, a pop-up error window will appear with the message 'No Process Diagram open'; you must click a mouse button with the cursor on 'Continue' to resume.

If you select the F3: LIST option in the dialog window, a pop-up error window will appear with the message 'No list available'; you must click a mouse button with the cursor on 'Continue' to resume.

If you enter a non-numeric value for any digit in the height or width field, a pop-up error window will appear with the message 'Illegal floating-point value'; you must click a mouse button with the cursor on 'Continue' to resume. Decimal points, not fractions, must be used for non-integer page sizes.

The Dgm. Shift option exists under the SETUP menu header. It provides the capability of shifting the entire diagram on the page.

You must have opened a diagram on the Process Diagram screen in order to shift the diagram on the page using the SETUP Dgm. Shift option. Move the arrow cursor to the SETUP menu header and click a mouse button.

The Diagram Shift dialog window will appear; it consists of a header line, the title 'Diagram Shift' and 2 input fields. The header line includes the normal functions. The body of the window consists of two input fields, X Shift and Y Shift, which are each 7 digits. The values input should be numbers and may contain a decimal point; other non-numbers are not supported. Press F5 to shift the diagram on the page by the input values. F10 will leave the dialog window without shifting the diagram. Shortly the diagram will be redrawn with the new page edges indicated by the thin (yellow) line. If the diagram doesn't fit on the shifted page, it may be necessary to use the ZOOM Fit Screen option.

If you select the Diagram Shift Option without having first opened a diagram, a pop-up error window will appear with the message 'No Process Diagram open'; you must click a mouse button with the cursor on 'Continue' to resume.

If you select the F3: LIST option in the dialog window, a pop-up error window will appear with the message 'No list available'; you must click a mouse button with the cursor on 'Continue' to resume.

If you enter a non-numeric value for any digit in the X Shift or Y Shift field, a pop-up error window will appear with the message 'Illegal floating-point value'; you must click a mouse button with the cursor on 'Continue' to resume. Decimal points, not fractions, must be used for non-integer shift values.

The Grid option exists under the SETUP menu header. It provides the capability of setting an invisible grid of variably-spaced vertical and horizontal lines to which the icons that you create will automatically snap when you create them.

You must have opened a diagram on the Process Diagram screen in order to set the grid using the SETUP Grid option. Move the arrow cursor to the SETUP menu header and click a mouse button. Move the arrow cursor to the Grid option and click again.

The Grid Status Dialog Box will appear; it consists of a header line, the title 'Grid Status' and 3 input fields. The header line includes the normal functions. The body of the window consists of three input fields'Grid Status, Grid X and Grid Y. Grid Status is a one-digit field which should contain either an 'I' for 'Inactive' or an 'A' for 'Active' as you prefer. The default value is 'I'. Either capital or lower case letters are acceptable. If anything other than an 'A' or 'I' is input, you will get the error message 'Grid Status must be 'A' or 'I' when you hit F5. The fields Grid X and Grid Y are each 5 digits. The values input should be numbers and may contain a decimal point; other non-numbers are not supported. Press F5 to place the invisible grid on the page. F10 will leave the dialog window without changing the previous grid status.

If you select the Grid Option without having first opened a diagram, a pop-up error window will appear with the message 'No Process Diagram open'; you must click a mouse button with the cursor on 'Continue' to resume.

If you select the F3: LIST option in the dialog window, a pop-up error window will appear with the message 'No list available'; you must click a mouse button with the cursor on 'Continue' to resume.

If you enter a non-numeric value for any digit in the Grid X or Grid Y field, a pop-up error window will appear with the message 'Illegal floating-point value'; you must click a mouse button with the cursor on 'Continue' to resume. Decimal points, not fractions, must be used for non-integer grid values.

The Hypertext Menu options allow you to see the details of the composition of processes and data and to view supporting information for any Icon.

The HYPERTEXT Composition option permits you to see the details of the composition of data or a process. Use this option if viewing the components of a data element or seeing the processes that go into making up a process is desired.

To see the composition of an element represented by an icon on a diagram, pull down the menu under the menu header HYPERTEXT by highlighting the option and clicking a button on the mouse. Then move the mouse so that the cursor moves to a position that highlights the option Composition and click a mouse button again. The arrow cursor will be replaced by a pointer cursor that may be moved using the mouse. Move the pointer cursor to the process whose corresponding sub-process information you wish to examine and click a button on the mouse again.

A window will appear entitled Sub-Process List. It will show you the ID and name of all sub-processes for your selected process, or any owned elements for your selected arrow. When you are finished viewing the list, click the arrow cursor on CANCEL in the upper right hand corner of the dialog box. The box will disappear and you will be returned to the arrow cursor on the diagram.

If you click the pointer cursor on a process box that has no subprocesses entered, the window 'No decomposition exists.' will appear on the center of the screen. You must click on 'Continue' to be returned to the diagram.

If you click the pointer cursor anywhere other than on a process box or an arrow title, the pointer cursor will be replaced with an arrow cursor and you will be returned to the diagram.

To see the MetaVision supporting (non-graphic) information for any icon on a diagram use the HYPERTEXT View option. The information relating to the icon will be displayed in a window similar to the EDIT Change dialog window, except that no changes are permitted.

To invoke the HYPERTEXT View option, pull down the menu under the menu header HYPERTEXT by highlighting the option and clicking a button on the mouse. Then move the mouse so that the cursor moves to a position that highlights the option View and click a mouse button again. The arrow cursor will be replaced by a pointer cursor that may be moved using the mouse. Move the pointer cursor to the diagram whose corresponding database information you wish to examine and click a button on the mouse again.

A window will appear with the field values of information to which the icon corresponds. The field values are displayed in a format similar to the dialog window via which information for the icon was initially entered and by which it is optionally changed.

When you have finished examining the information that relates to an icon, press F5 or F10 to retain the pointer cursor on the screen so that you can point at another icon and examine information about it as well. To remove the pointer cursor and revert to the arrow cursor, click a button on the mouse when the cursor is in any border area.

Help in MetaVision is a context-sensitive system that closely mirrors the documentation presented here. Enter the HELP system by placing the cursor on the word HELP in the far right of the menu options along the top of the screen and click a button on the mouse.

A Help window will be displayed in the middle of the screen which contains three items across the top: HELP, HELP, and CANCEL. The left HELP may be used for accessing the information contained in this section on how to use the HELP system. The HELP in the top-center of the window identifies that you are in the Help system. You may leave the Help system by placing the cursor on CANCEL in the upper right of the window and clicking a button on the mouse.

A list of the Help topics that relate to the currently displayed set of menus is displayed when the Help system is initially invoked. Pick the topic on which you desire help by highlighting the topic and clicking a button on the mouse. When you have picked a topic, the subtopics or text relating to the topic you chose will be displayed. If there are more topics or text than will fit on the screen, you may pan down the list or text by placing the cursor on the downward-pointing arrow in the lower right corner of the window and clicking a button on the mouse. Similarly, you may move up the list of topics or text by placing the cursor on the upward-pointing arrow in the upper right of the Help system window.

The four options listed along the bottom of the Help system window allow you to see help on other topics. Placing the cursor on 'NEXT' will display the topics or text for the topic which immediately follows the currently-selected topic. Placing the cursor on 'PREV' will display the topics or text for the topic which is immediately previous to the currently selected topic.

Choosing the 'LEVEL UP' option moves you to the set of topics of which the currently selected topic is a member. 'TOPICS' displays a selection list of topics that are related to the option for which Help is currently displayed.

If the screen has some 'ragged' portions after editing, place the cursor on the Repaint Menu header on the far right of the Menu Header line and click a button on the mouse. The screen will be redrawn to reflect only the information in the database.

MetaVision provides a variety of reports that organize the information for a Project in report format for inspection, distribution, and review.

To select the REPORT GENERATION activity move the arrow cursor so that REPORT GENERATION is highlighted on the Process Diagram Activity List and click a button on the mouse. The Report List selection list will appear, on which are located the reports listed and described in the following.

Select a particular report by highlighting the title for that report and clicking a mouse button. If the report you want to print is not visible on the list, you may pan down through the list using the pan bars on the right of the list.

When you have selected a report by highlighting it and clicking a mouse button, a selection window will appear with the three choices File, Printer, or Screen; place the cursor in your choice of response box and click a button on the mouse. A "printer" response indicates that you wish the report to be printed immediately on your printer. In this case the window message 'Align paper in printer . . . ' will appear and when your printer is ready you should click a button on the mouse with the cursor on Continue. The report is then printed directly. The reports will all fit on an 80 column page. If your printer is not connected properly, the message "Printer Unavailable" appears, and you are given the choice to Retry or Cancel the print request.

A "Screen" response indicates that you wish the report to be displayed on the screen. After the report is generated, the beginning of the report will appear on the screen. The bottom line of the screen will list your choices for moving around the report "(L) Line, (S) Screen, (P) Pan, (W) Window, (C) Continuous, (R) Restart, and (Q) Quit." To view the report, just type in the first letter of the mode you desire. "L" will move the screen down one line at a time, each time you press it. "S" will move down the report an entire screen each time you press it. "P" and "W" are inactive at this time and will not do anything when depressed. "C" will cause the screen to continuously scroll until it reaches the end of the report or until you hit "Escape" on your keyboard, at which time it will stop. "R" will send you back to the beginning of the report. "Q" will give you the message "Report Cancelled" and send you back to PROCESS on the main menu.

A "File" response indicates that you wish the report to be printed to a file. The dialog window FILE NAME will be displayed with the input field Path Name. You should type in a complete file specification here, including the path name where you wish the report to be directed. When you have entered the name press F5 and the report will be sent to the specified file.

If the pathname is not a valid path name, the error message 'Unable to open file' will appear in a message window and you must click a button on the mouse with the cursor on the word Continue. You will be returned to the FILE NAME dialog window to enter another file specification.

If the file specification you enter corresponds to a file that already exists, the message 'File exists already—overwrite it?' will appear in a selection window and you may indicate the option you wish by placing the cursor in the Yes or No response and clicking a button on the mouse. A Yes response overwrites the file; a No response returns you to the PROJECT PATHNAME to enter another file name or cancel the production of the report by pressing F10.

A short description and examples of the reports available under the REPORT GENERATOR activity are given on the following pages.

This report reports on the hierarchical connections of processes for a project by listing the OWNED PROCESS NAME and corresponding OWNED PROCESS ID by OWNING PROCESS NAME and OWNING PROCESS ID for each process in a project.

The PROCESS ID, PROCESS NAME, and PROCESS NARRATIVE are listed for each process in the project giving a concise summary of the processes involved in a system.

Control, input, output, and support are given for each process by listing for each PROCESS NAME/ID in the project the CONTROL NAME/ID, INPUT NAME/ID, OUTPUT NAME/ID, and SUPPORT NAME/ID.

Input data and processes are identified by this report. For each INPUT DATA NAME (RFP) the RFP ID and all PROCESS NAMEs and PROCESS IDs are printed.

Ouput data and processes are identified by this report. For each OUTPUT DATA NAME (RFP) the RFP ID and all PROCESS NAMEs and PROCESS IDs are printed.

For each SUPPORT/PERSON the corresponding SUPPORT ID is printed along with the PROCESS and PROCESS ID and the INPUT DATA/ID and OUTPUT DATA/ID for all of the processes connected to that SUPPORT/PERSON.

For each process that has a DATA SOURCE/SINK connected to it, the PROCESS DIAGRAM NAME and PROCESS DIAGRAM ID are listed, along with the DATA SOURCE/SINK NAME, DSS ID, and whether it is a source or sink for all DATA S/S's connected to the process.

The hierarchical relationships between data sources/sinks and process names and IDs are given by this report. For each DATA SOURCE/SINK, the PROCESS NAME and PROCESS IDs that use the source or sink are printed.

For each support person or department, the processes and controls for which they are responsible are listed by PROCESS ID #. For each PERSON/SUPPORT, the PROCESS ID and NAME and the CONTROL for that process are printed.

The hierarchical relationships between processes and their subordinate processes are given by this report. For each PROCESS ID # and NAME, the subordinate PROCESS ID #'s and NAMES are reported in ascending numeric order. In other words, they will be ordered by process, so that you will see all the subprocesses for a process box down to the lowest level of detail, then the next process box starting with the highest level and through to its lowest level of detail, and so on.

The hierarchical relationships between processes and their subordinate processes are given by this report. For each PROCESS ID # and NAME, the subordinate PROCESS ID #'s and NAMES are reported in ascending numeric order by level, in other words, you will see diagram 0 processes first, then all the processes on the second level (say 1,2,3,4), then all the processes on the third level (say 11,12,13,21,22,23,24,41,42), etc.

The hierarchical relationships between data elements (RFPs) are given by this report. For each OWNING RFP NAME and OWNING RFP ID the OWNED RFP NAME and OWNED RFP ID are printed.

The RFP ID and REPORT/FORM/PACKET (RFP) NAME are listed (in alphabetical order of RFP NAME) for all the RFPs in the project giving a record of how RFP IDs and NAMEs are connected.

The RFP ID and REPORT/FORM/PACKET (RFP) NAME are listed (in order of RFP ID #) for all the RFPs in the project giving a record of how RFP IDs and NAMEs are connected.

The RFP ID and REPORT/FORM/PACKET (RFP) NAME and DESCRIPTION are listed (in alphabetical order of RFP NAME) for all the RFPs in the project giving a record of how RFP IDs and NAMEs/-DESCRIPTIONs are connected.

The names of the source/sink IDs are given by this report. The DATA S/S ID and DATA SOURCE/-SINK NAME are listed for each DATA S/S.

The Glossary of Terms report lists the terms defined using the TERMS/ISSUES/PROBLEMS option under the SUPPORT main menu heading. For each Term that was entered the corresponding definition is printed.

The PROCESS ID and PROCESS NAME are listed for each process in the project, followed by their CONTROL NAME(s) and ID(s) and S/R(s), their OUTPUT NAME(s) and ID(s) and S/R(s), and their SUPPORT NAME(s) and ID(s), as applicable.

System I/O requirements are catalogued by means of this report. For each RFP the REPORT/FORM-/PACKET (RFP) NAME, RFP ID, USER FORM NUMBER, VOLUME, INFORMATION QUALITY, RETENTION QUANTITY, RETENTION UNIT OF MEAS. INFO ACCESS QUANTITY, INFO ACCESS UNIT OF MEAS., VOLATILITY, RFP DESCRIPTION, SECURITY REQUIREMENTS, PERFORMANCE CRITERIA, and COMMENTS are printed.

The PROCESS ID and PROCESS NAME are listed for each process in the project.

The SUPPORT ID, SUPPORT NAME, and SUPPORT TYPE are listed (in alphabetical order of SUPPORT NAME) for all the SUPPORTs in the project giving a record of how SUPPORT IDs and NAMEs are connected.

The SUPPORT ID, SUPPORT NAME, and SUPPORT TYPE are listed (in numeric order of SUPPORT ID) for all the SUPPORTs in the project giving a record of how SUPPORT IDs and NAMEs are connected.

The SUPPORT TYPE, SUPPORT LOCATION, and SUPPORT DESCRIPTION are listed (in numeric order of SUPPORT ID) for all the SUPPORT NAMES and IDs in the project giving a full record of all information about SUPPORTs.

The Plotting Option provides the capability of producing hardcopy output of any diagram produced using MetaVision. The diagram may be sent to a plotter or printer. The diagram to be plot/printed is selected from the available diagrams by means of a selection list box.

A number of formatting options are provided by means of a dialog box labeled 'Plot Information'. Input fields on the dialog box are used to record Text Size, Title Size, ZOOM Factor, Left Margin, and whether the output is to be sent to a plotter or printer.

To print or plot a MetaVision diagram, choose the Plotting option under the PROCESS Menu, Process Diagram, heading on the Main Menu screen. The dialog box labeled 'Plot Information' appears and you should enter positive integers or decimal numbers in the first 4 fields and a 'Y' in either the Printer or Plotter field and an 'N' in the other. The 'Y' specifies the device to be used for output. Make certain that the printer/plotter is connected and on-line and press F5 to call the selection list box of diagrams available to be plot/printed. You may select from this list in the normal manner. When the process is complete the Activity Menu options will again be displayed and control will be returned to you.

Use this feature to check your process diagrams. Click on 'PROCESS' in the main menu header, then on 'Validation' in the pull down menu. You can validate a variety of aspects of the diagrams in your project. For each CONSTRAINT ID a CONSTRAINT DESCRIPTION can be printed, sent to a file, or displayed on the screen. If the diagram meets the constraint, a sentence to that effect is given. If the diagram does not meet the conditions of the constraint a list of the offending elements is given, with a sentence explaining how they violate the constraint.

A variety of types of constraint checks are possible. Metavision prompts for these in turn with a dialog window that requires that a mouse button be clicked with the cursor on either Yes or No, indicating that the type of validation check noted is to be performed.

If a Yes response is given to any of the types of validation checks the following query will be displayed in a window.

If your response to this query is "File", another dialog window appears in which you should enter the path name and file name to which the report file is to be sent.

If your response is "Printer", the report will be sent directly to the printer, and the following will appear in a message window.

Align paper in printer . . .
Continue

When you are ready to begin printing the report, click a mouse button with the cursor on Continue.

If Your response is "Screen", the report will be sent directly to the screen, with the bottom line displaying '(L) Line, (S) Screen, (P) Pan, (W) Window, (C) Continuous, (R) Restart, and (Q) Quit.' Entering the first letter of these words (as indicated) will help you to move around to view the report.

The types of validation checks and the accompanying queries are shown below.

| | |
|---|---|
| Do database constraint validation? | |
| Yes | No |
| Check for processes missing arrow types? | |
| Yes | No |
| Check for top level unconnected arrows? | |
| Yes | No |
| Check for pass-through arrows? | |
| Yes | No |
| Check for conservation of Data Source/Sinks? | |
| Yes | No |
| Check for level-balancing of arrows top-down? | |
| Yes | No |
| Check for level-balancing of arrows bottom-up? | |
| Yes | No |

The DATA DICTIONARY activity provides capability of adding, modifying and deleting information in the MetaVision system support files directly via dialog windows instead of using the the DIAGRAMMING activity. All the information needed to produce diagrams in MetaVision is stored in dBASE III-compatible files. This includes information on the placement of icons and information normally entered via dialog windows. All of this information is directly accessible via the DATA DICTIONARY activity.

Choose this option by moving the arrow cursor so that DATA DICTIONARY is highlighted on the activity list under PROCESS, PROCESS DIAGRAM, and clicking a button on the mouse. The main menu screen will be replaced by a screen containing the DATA DICTIONARY options Add to File, Modify File, Delete File Elements, and Quit. Choose one of these options by moving the cursor so that the desired option is highlighted and clicking a button on the mouse.

A selection list will be presented, from which you choose a file whose contents you wish to modify. Highlight the desired file name and click a mouse button. Then follow the directions for the specific option.

The Add to File option permits adding data directly to the MetaVision information stored in dBASE III database files. This is the same information that is normally updated via the diagram screens and dialog boxes.

When the Add to File option is chosen from the EDIT menu a selection list will be presented, from which you choose a file or file set to which additions are to be made. Move the cursor so that the desired file is highlighted and click a button on the mouse; a dialog window will appear in which you can add new entries. The appearance of the dialog window and the information available for editing varies for different file types, as indicated in the following.

The Process Diagram information is the information that generally describes and specifies each Process Diagram as a whole.

Updates to the Fan Input or Output Dialog Window (Relational) file are for RFPs that will be available for being the output side of Fan In icons or the input side of Fan Out icons.

Updates to the RFP Arrow file produce arrows on diagrams. Connection Type is either i (input), o (output), or c (control).

When a Data Source/Sink (Relational) error occurs, an error message window will be displayed—'Illegal Relational Operation'. This relation may only be modified.

When an RFP ID Change error occurs, an error message window will be displayed,—Illegal and only the Relational Operation may be modified.

When an Process Sub-tree Move/Delete error occurs, an error message window will be displayed,—Illegal and only the Relational Operation may be modified.

When a Person ID Change error occurs, an error message window will be displayed,—Illegal and only the Relational Operation may be modified.

When a Data S/S ID Change error occurs, an error message window will be displayed,—Illegal and only the Relational Operation may be modified. The Process Hierarchy (PD) file Updates specify the hierarchical connections between processes. Each Process can be owned by only one Owning Process, but may in turn be an Owning Process for several other Owned Processes.

The Process Information (PROC) screen allows you to enter Process Box names and narrative descriptions. Note that adding values via the previous screen (PD) will not result in useful diagrams unless you also name them, preferably first.

The Process Diagram/Data Source/Sink (PDDSS) dialog window is used to create and position Data Source/Sink icons on a diagram.

The Process/RFP Information (IOCAR) dialog window creates connections between Process Boxes and Arrows. Connection type can be i (input), o (output), or c (control).

The Process to Process Connections (PCON) dialog window is used to connect Process Boxes and to specify the routing of the connection between them.

The RFP Decomposition (FAN) dialog window is used to specify the connection between Owning and Owned RFPs for Fan icons.

The Fan Location Information (FIOLOC) dialog window is used to specify the location of Fan icons.

The Fan to Process Connections (FIOCON) dialog window is used to specify the connections and routing between Fan and Process Box icons.

The Support Information (PER) dialog window is used to enter Personnel Names for Personnel (Support) Arrow icons.

The Process/Support Information (PERARR) dialog window is used for assigning Personnel icons to Process Box icons.

The Data Source/Sink Information (DSS) dialog window is for entering Source/Sink Names for Data S/S IDs.

The Data Source/Sink Connections (DCON) dialog window specifies the connection between Data Source/Sinks and Process Boxes or data arrows. Connection Type options are i (input), o (output), c (control), s (Data Source), or k (Data Sink).

The RFP Description (RFP) dialog window is used to input information about RFPs:

The RFPD Information (RFPD) dialog window is used to input additional information about RFPs:

The Process Diagram Information (PICT) dialog window may be used to add graphic information about Process Diagrams to your project directly.

The Transfer Information (CCTRL) dialog window may be used to add control and transfer information about Process Diagrams to your project directly.

The Condition Information (COND) dialog window may be used to add condition information about Process Diagrams to your project directly.

The Cai Information (CAI) dialog window may be used to add c, a, or i information about Process Diagrams to your project directly.

The Free Text (FTEXT) dialog window may be used to add free text information and locations on Process Diagrams to your project directly.

FTEXT - Single File Update

The Modify File option permits directly changing data already added to the MetaVision information stored in dBASE III database files. This is the same information that is normally updated via the diagram screens and dialog boxes.

For most of the items on the selection list, when the Modify File option is chosen from the EDIT menu, a selection list will be presented from which you choose a file to which additions are to be made. Move the cursor so that the desired file is highlighted and click a button on the mouse. Another selection list will appear that contains the keys for the values in the file that you have indicated you want to modify. Choose one of the sets of key values by highlighting it by moving the cursor and clicking a button on the mouse. The last three items on the selection list work differently, as explained under their headings: RFP ID Change, Process Sub-tree Move, and Person ID Change.

A dialog window will be appear, by which you may modify the entry with the keys you have indicated. The appearance of the dialog window, and the information available for modification varies for different file types, as indicated below.

Process is a relational operation that cannot be modified. The message 'Illegal relational operation' will appear if you select this; you must click a mouse button with the cursor on 'Continue' to resume.

Fan Input or Output is a relational operation that cannot be modified. The message 'Illegal relational operation' will appear if you select this; you must click a mouse button with the cursor on 'Continue' to resume.

RFP Arrow is a relational operation that cannot be modified. The message 'Illegal relational operation' will appear if you select this; you must click a mouse button with the cursor on 'Continue' to resume.

Data Source/Sink is a relational operation that cannot be modified. The message 'Illegal relational operation' will appear if you select this; you must click a mouse button with the cursor on 'Continue' to resume.

With the RFP ID Change selection you have the capability of changing one RFP to another existing RFP so that the second will be substituted for the first in all of its occurrences on diagrams. A selection box entitled 'RFP ID to change' will be presented, requesting the values for the ID to be changed. When you enter a value and hit F5, the 'Change RFP ID to:' dialog window will appear and the value may be modified. Press F5 to have the changes take effect. Press F10 to cancel any changes made to the value in the window.

Process Sub-tree Move/Delete should be selected to change the position on the hierarchical 'tree' of Process Diagrams of a particular Process Diagram. A selection box entitled 'Process ID to change' will be presented, requesting the values for the ID to be changed. When you enter a value and hit F5, the 'New Process ID' dialog window will appear and the value may be modified. Press F5 to have the changes take effect. Press F10 to cancel any changes made to the value in the window.

The hierarchical position of a given process is given by its ID number: for any two process IDs, the one with more digits is lower, and the one with fewer, higher on the hierarchy. The ID number of a process which immediately dominates another will be identical in all digits but the last, which it will lack.

The Person ID Change is used to change one Support ID to a second existing Support ID. When this item is chosen from the selection list, a dialog window appears, in which you should enter the Support ID to be changed. Alternatively, you may press F3 to view a selection list of existing Support ID's and names. Whether you enter the ID on the dialog window or choose from the selection list, a second dialog window will appear, which asks you for the ID you want the chosen ID to be changed to.

Data S/S ID Change is used to change one Data Source/Sink ID to a second existing Data Source/Sink ID. When this item is chosen from the selection list, a dialog window appears, in which you should enter the DSS ID to be changed. Alternatively, you may press F3 to view a selection list of existing DSS ID's and names. Whether you enter the ID on the dialog window or choose from the selection list, a second dialog window will appear, which asks you for the ID you want the chosen ID to be changed to.

The Process Hierarchy fields are displayed in order for the record to be modified for the Process Hierarchy include the Owning Process ID and the Owned Process ID. Choose a pair of these by highlighting the pair by moving the cursor and clicking a button on the mouse. Modifications to this file change the hierarchical connections between processes. Each Process can be owned by only one Owning Process but may in turn be an Owning Process for several other Owned Processes.

The Process Information record to be modified for the Process Information file is identified on the selection list by the fields Process ID and Process Name. Process Box names and locations and narrative descriptions are modified via this screen.

The Process Diagram/Data Source/Sink record to be modified for this file is identified on the selection list by the Process ID, Data S/S ID, and the Data S/S Flag (I,O). The dialog window is used to modify the position of Data Source/Sink icons on a diagram.

The Process/RFP Information records from which you may choose in the selection list are identified by their Process ID, RFP ID and Connection Type. The dialog window changes the connections between Process Boxes and Arrows. Connection type can be i (input), o (output), or c (control).

The Process to Process Connections selection window presents sets of values in each row for the following fields: Output Process ID, Input Process ID, Connecting Arrow ID and Connection Type. Highlight the desired set of values and select the corresponding record to be modified by clicking a button on the mouse. The dialog window is used to change the connections between Process Boxes and to specify the routing of the connections between them.

The RFP Decomposition record to be modified is identified by pairs of values for the Owning RFP ID and the Owned RFP ID on the selection list. This dialog window is used to modify the connection between Owning and Owned RFPs for Fan icons.

The Fan Location Information records in this file are identified in the selection list by their Owning Process ID, Owning RFP ID, and I/O Flag. This dialog window is used to modify the relationships and locations of Fan icons.

The Fan to Process Connections records in this file are identified in the selection list by values for the fields Connected Process ID, Owning RFP ID, Owned RFP ID, and Connection Type. This dialog window is used to change the connections and routing between Fan and Process Box icons.

Support Information Records in the file for the names of support personnel are identified by values for the Personnel IDs and Personnel Names presented in the selection list. This dialog window is used to change the Personnel Names for Personnel (Support) Arrow icons.

Process/Support Information Records are identified on the selection list by Connected Process ID and Personnel ID values. This dialog window is used for changing the assignment of Personnel icons to Process Box icons.

Data Source/Sink Information Records are identified by values for the two fields, Data S/S ID and Data S/S Name listed on the selection list. This dialog window is for changing Source/Sink Names for Data S/S IDs.

Data Source/Sink Connections Records are identified by values displayed in the selection list for the fields Connected Process ID, Connected Data S/S ID, Input or Output identifier, Connecting Arrow ID, and Connection Type. This dialog window is used for changing the connection between Data Source/Sinks and Process Boxes or data arrows and their positions. Connection Type options are i (input), o (output), c (control), s (Data Source), or k (Data Sink).

An RFP Description selection list consisting of RFP IDs and RFP Names is presented for choosing the RFP record to be modified. The dialog window is used to change information about RFPs, Name, Description, etc.

An RFPD Information selection list consisting of RFP IDs and RFP Names is presented for choosing the RFP record to be modified. The dialog window is used to change additional information about RFPs, Form Numbers, Volume, Security, etc.

Process Diagram Information records are identified on the selection list by means of their Diagram IDs and Names. This dialog window may be used to change graphic information about Process Diagrams in your project.

The Transfer Information dialog window may be used to modify control and transfer information about Process Diagrams. A Selection List entitled 'CCTRL' is presented with the fields 'To Process ID', 'From Process ID', 'RFP ID', 'CAI ID', and 'CAI Type', from which you should choose the record you wish to modify.

The Condition Information dialog window may be used to modify condition information about your project directly. A Selection List entitled 'COND' is presented with the fields 'Condition ID', 'Field ID', 'Operator', and 'Value', from which you should choose the record you wish to modify.

The Cai Information dialog window may be used to add c, a, or i information about Process Diagrams to your project directly. A Selection List entitled 'CAI' is presented with the fields 'CAI ID', 'CAI Type', and 'CAI Expression', from which you should choose the record you wish to modify.

The Free Text dialog window may be used to modify free text information and locations on your Process Diagrams directly.

To delete File Elements via the Data Dictionary option, select the option and a selection list of files will be presented. When a file has been selected using the mouse and cursor, a selection list of values that identify the file elements is presented from which you may choose the element to be deleted. The identifying values are those listed under the previous option, Modify File. When you select an item by clicking a button on the mouse when the item is highlighted, the corresponding record will be deleted.

Note that there is no 'Undo' for this option so that items that are deleted are deleted unless they are reentered.

To quit deleting file elements use the CANCEL option provided in the upper right hand corner of the selection list. Quit To quit using the Data Dictionary option place the cursor on the QUIT option and click a mouse button. You will be returned to the Activity List, from which you may choose another option or return to the main menu.

MetaVision provides a variety of maintenance reports that organize the detailed information relating to diagram icon placement, names, and RFP information for a Project in report format for inspection, distribution, and review.

To select the MAINTENANCE REPORTS activity, under 'PROCESS', move the arrow cursor so that MAINTENANCE REPORTS is highlighted and click a button on the mouse. The Report List selection list will appear, on which are located the reports described and exemplified more fully below.

Select a particular report by highlighting the title for that report and clicking a mouse button. If the report you want to print is not visible on the displayed list, you may pan down through the list using the pan bars on the right of the list.

When you have selected a report by highlighting it and clicking a mouse button, a selection window will appear with the query 'Select: File, Printer, or Screen' You must place the cursor in one of the response boxes and click a button on the mouse. A 'Printer' response indicates that you wish the report printed immediately on your printer. In this case the window message 'Align paper in printer . . . ' will appear; when your printer is ready you should click a button on the mouse with the cursor on Continue. The report is then printed directly. The reports will all fit on an 80 column page.

A 'File' response indicates that you wish the report printed to a file. The dialog window PROJECT PATHNAME will be displayed with the input field Path Name. You should type in a complete file specification here, including the path name where you wish the report to be directed. When you have entered the name press F5 and the report will be sent to the specified file.

If the path name is not a valid path name the error message 'Unable to open file' will appear in a message window and you must click a button on the mouse with the cursor on the word Continue. You will be returned to the PROJECT PATHNAME dialog window to enter another file specification.

If the file specification you enter corresponds to a file that already exists, the message 'File exists already—overwrite it?' will appear in a selection window and you may indicate your answer by placing the cursor in the Yes or No response area and clicking a button on the mouse. A Yes response overwrites the file; a No response returns you to the PROJECT PATHNAME to enter another file name or cancel the production of the report by pressing F10.

A 'Screen' response indicates that you wish the report to be displayed on the screen for viewing. Once the report is prepared, its first page will appear on the screen with a line at the bottom listing '(L) Line, (S) Screen, (P) Pan, (W) Window, (C) Continuous, (R) Restart, and (Q) Quit.' Entering the first letter of one of these words will help you to move around the report and view the sections you desire.

The Process Diagram Information Maintenance Report contains a listing of values for the following fields, by numeric order of DIAGRAM ID: DIAGRAM TYPE, DIAGRAM NAME, FONT ID, TEXT SIZE, WINDOW X LOCATION, WINDOW Y LOCATION PAGE X SIZE, PAGE Y SIZE, GRID X SIZE, GRID Y SIZE, ZOOM FACTOR, PAGE ORIENT, and GRID STATUS.

The Process Information Maintenance Report contains the following fields of information for each process in the project in numeric order by PROCESS ID: PROCESS ID, PROCESS NAME, PROCESS NARRATIVE, BOX X LOCATION, BOX Y LOCATION, and PROCESS TYPE.

The Process Hierarchy Maintenance Report contains values for the fields OWNING PROCESS ID and OWNED PROCESS ID, in numeric order by owning process id.

The Data Source/Sink Information Maintenance Report contains values for the DATA S/S ID, DATA SOURCE/SINK NAME, and DATA SOURCE/SINK TYPE fields, in numeric order by ID.

The Process Diagram/Data Source/Sink Maintenance Report contains values for the following fields for each Source/Sink, in numeric order by OWNING PROCESS ID: OWNING PROCESS ID, DATA SOURCE/SINK ID, SOURCE/SINK INSTANCE(I,O), DATA S/S X LOCATION, and DATA S/S Y LOCATION.

The Data Source/Sink Connections Maintenance Report contains values for the following fields for each Data Source/Sink in numeric order by CONNECTED PROCESS ID: CONNECTED PROCESS ID, RFP ID, OCCURRENCE, ARROW ID, CONNECTED TO PROCESS, DSS CONNECTION ORDINAL NUMBER, ROUTE Y OFFSET, INPUT X OFFSET, OUTPUT X OFFSET, and FLOW.

The RFP Description maintenance report contains information on the following fields for each Report/Form/Packet in the project in numeric order of RFP ID: REPORT/FORM/PACKET (RFP) NAME, RFP ID, RFP DESCRIPTION, and TYPE.

The RFP Information validation report contains information on the following fields for each Report/Form/Packet in the project: REPORT/FORM/PACKET (RFP) NAME, RFP ID, USER FORM NUMBER, VOLUME, INFORMATION QUALITY, RETENTION QUANTITY, RETENTION UNIT OF MEAS. INFO ACCESS QUANTITY, INFO ACCESS UNIT OF MEAS. VOLATILITY, RFP DESCRIPTION, SECURITY REQUIREMENTS, PERFORMANCE CRITERIA, and COMMENTS.

The Process/RFP Information Maintenance Report contains a listing of the following fields: CONNECTED PROCESS ID, CONNECTED RFP ID, CONNECTION TYPE (I,O,C), CONNECTION ORDINAL, FLOW, and LABEL, in numeric order by Connected Process ID.

The Process To Process Connections Maintenance Report contains the following fields of information for each connection in numeric order by Output Process ID: OUTPUT PROCESS ID, INPUT PROCESS ID, CONNECTED ARROW ID, CONNECTION TYPE, ROUTE Y OFFSET, INPUT X OFFSET, and OUTPUT X OFFSET.

The RFP Decomposition (FAN) Maintenance Report contains a listing of values for the following fields: OWNING RFP ID, OWNED RFP ID, and ORDINAL NUMBER in numeric order by Owning RFP ID.

The Fan Location Information Maintenance Report contains data on the diagram positions of Fan I/O icons for the fields OWNING PROCESS ID, OWNING RFP ID, I/O FLAG, FAN X LOCATION, and FAN Y LOCATION.

The Fan Connections information Maintenance Report contains data on the connections between Fan I/O icons and other icons. It includes data listed for the fields CONNECTED PROCESS ID, CONNECTED TO PROCESS, OWNING ARROW ID, OWNED ARROW ID, PROCESS CONNECTION TYPE, OUTPUT X OFFSET, ROUTE Y OFFSET, and INPUT X OFFSET, in numeric order by Connected Process ID.

The Support Information Maintenance Report contains data listed for the SUPPORT ID, SUPPORT NAME, SUPPORT DESCRIPTION, SUPPORT LOCATION and SUPPORT TYPE fields, in numeric order by Support ID.

The Process/Support Information Maintenance Report contains a listing of values for the following fields: CONNECTED PROCESS ID, SUPPORT ID, and SUPPORT ORDINAL NUMBER, in numeric order by Connected Process ID.

The Condition Information Maintenance Report contains data listed for the CAI ID, FIELD ID, OPERATOR, and VALUE fields, in numeric order by CAI ID.

The Control/Transfer Information Maintenance Report contains a listing of values for the following fields: FROM PROCESS ID, TO PROCESS ID, RFP ID, CAI ID, and CAI TYPE, in numeric order by To Process ID.

To import data from another directory or project use the FILE IMPORT/MERGE activity menu option. The data will be merged into the MetaVision database for the currently open project.

After clicking a mouse on this option, which appears under PROCESS, Process Diagram, a dialog window entitled 'Copy/Merge From:' will appear with the normal header line of F1:HELP, F3:LIST, F5:DONE, and F10:CANCEL. The body of the dialog window consists of a single field, which should be filled in with the path name for the subdirectory containing the project information to be merged with the current project information.

All of the information is automatically merged from the files in the subdirectory with the entered path name.

Use the FILE EXPORT activity to output the information for a project to a set of dBASE III files that can be used to transfer information from one work station to another. This becomes especially useful when several people are working on a single project and it is time to integrate the pieces on one machine.

After clicking a mouse on the FILE EXPORT option, located under PROCESS, Process Diagram, a dialog window entitled Destination will appear with the normal header line of F1:HELP, F3:LIST, F5:DONE, and F10:CANCEL. The body of the dialog window consists of a single field, Path Name, which should be filled in with the path name for the subdirectory to which the current project information is to be written. Do not include the final '\' for the directory; e.g. 'a:', NOT 'a: ', to export the current project files to the a: drive root directory.

All of the information for the current project is automatically written to files in the subdirectory with the entered path name.

When several people are working on the same project it is the responsibility of the project leader to assign non-overlapping sets of Diagram and Icon IDs to the individual team members. If there is overlap, difficulties will be encountered when the parts are to be merged on a single computer under the same project name. The dBASE III files will contain duplicate keyed information and this will seriously jeopardize the integrity of the control information. Merging data from other directories or projects.i.Transferring information from one workstation to another.

To exit the activities under a particular menu heading use the exit option. You will be returned to the main menu option from which you came. Placing the cursor on CANCEL in the upper right hand corner of the activity list will accomplish the same result.

The Process Hierarchy menu item under PROCESS gives you the capability of seeing and plotting a representation of the hierarchical relationships between the processes you have created under the Process Diagram menu item.

To select the Process Hierarchy menu item, click on PROCESS on the main menu screen after having opened a project and chosen the Business Modeling Method. Select Process Hierarchy by moving the cursor and clicking a button on the mouse when Process Hierarchy is highlighted.

The normal activity list will be displayed. However, only the DIAGRAMMING and PLOTTING activities are active on this list. Select the activity you want or move the cursor so that EXIT or CANCEL is highlighted to leave the Module Relationship activity list.

The DIAGRAMMING activity for the Process Hierarchy option provides the capability of viewing the Process Hierarchy diagram and changing the ZOOM factors related to the diagram. The contents of this diagram are generated from the information entered for the Process Diagrams for a project. The diagram consists of a display of the hierarchical composition of processes. Owning processes are displayed above their corresponding owned processes.

To select the DIAGRAMMING activity from the Activity List, move the arrow cursor so that DIAGRAMMING is highlighted and click a button on the mouse. After a short time the Process Diagramming screen will be displayed.

Since this is a generated diagram, the CREATE and EDIT options are not needed; since there is only a single Process Hierarchy diagram per project there is no need for the HYPERTEXT menu options. To open a diagram, choose Select in the left margin, by moving the mouse cursor to Select and clicking. A dialog window, 'Process ID' will be displayed. The two input fields are Process ID and Max. Levels, both of which may be selected from a list using the F3 option. Max. Levels stands for Maximum Levels and describes the number of levels on the diagram you wish to view. The input must be a positive integer.

The DIAGRAM menu contains a single option, QUIT. All of the Process Boxes for a project are displayed on a single diagram so that there is only one per project.

The Quit Option exists under the DIAGRAM Menu header in the Process Hierarchy Diagram screen and causes the current diagram to be closed and the Main Menu Screen to be displayed.

You must be in the Process Hierarchy Diagram screen to use the Quit option. If you are in the Process Hierarchy Diagram Screen and you wish to access another part of MetaVision, then, using the mouse, place the arrow cursor so that the DIAGRAM Menu header is highlighted and click the mouse; if another menu is pulled down you will have to click the mouse a second time since the first only pulled up the previous menu.

The menu option 'Quit' will appear under the menu header; move the arrow cursor to the Quit option using the mouse and, when it is highlighted, click a button on the mouse. The Main Menu screen will be displayed after a few seconds; the message 'One Moment Please . . . ' will initially be displayed in the top center of the screen but any of the options on the Main Menu screen will presently be available. If you wish to exit MetaVision completely at this time, you may move the arrow cursor to the PROJECT menu and pick the Quit option there.

Use the ZOOM option to redraw the diagram in the window at some factor smaller or larger than its current size.

It is often desirable to enlarge a portion of a Process Diagram so that it fills the entire screen, since this makes viewing of that portion of the diagram easier. A portion of a diagram is enlarged by outlining that portion using the Arbitrary option. The outlined portion will then fill the screen. Process Boxes, Data Source/-Sink icons, and Fan In/Fan Out icons will be enlarged proportionally. Arrow icons will be lengthened to connect other icons appropriately. Names will occupy their normal positions on the icons, i.e. in the center of Process Boxes and Data Source/Sink icons and at the beginning of data arrows. It should be noted that Names will only be displayed if the combination of zoom factor and font will allow.

To enlarge a portion of a diagram displayed on the screen use the Arbitrary option under the ZOOM menu header. Move the arrow cursor to the ZOOM menu header and click a mouse button. The ZOOM options will appear under the ZOOM menu header; 'Arbitrary' is the first option on the list. Select the Arbitrary option by moving the cursor until 'Arbitrary' is highlighted and clicking a mouse button; the menu options will disappear and a cross-hairs cursor will appear. Move the cross-hairs cursor to a corner of the portion of the screen to be enlarged and click a mouse button. Any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged. Vertical and horizontal lines will appear as the cursor is moved to indicate the bounds of the portion of the diagram that will fill the screen. Click the mouse a second time to establish the size and extent of the portion of the diagram to be enlarged; the portion outlined will be enlarged to fill the screen.

A portion of the enlarged diagram may again be expanded using the Arbitrary option, though this will usually not be necessary. The ZOOM ½× and 2× options may also be used on the results of using the Arbitrary option.

Mistakes are not identified as such explicitly by the system for this option; some actions, however, are not recommended or motivated.

If you move the cross-hairs cursor to a spot and click a mouse button twice on that same spot the diagram will be redrawn without any changes.

If you move the cross-hairs cursor to a spot on the border of the screen and click a mouse button the diagram will be redrawn without any changes.

If you expand a Process Hierarchy Diagram so that nothing is showing on the screen you will not see the relation of the expanded portion to other icons.

The complete Process Hierarchy Diagram may be viewed on the screen at one time by means of the ZOOM Fit Screen option. Appropriate magnification factors are calculated by the system to make the diagram fit on the screen; the yellow line that appears indicates the boundaries of the page on which the diagram fits. The page size is determined automatically.

To use the option move the arrow cursor to the ZOOM menu header (near or on the word ZOOM) and click a mouse button. The ZOOM options will appear under the ZOOM menu header. Select the Fit Screen option by moving the cursor so that 'Fit Screen' is highlighted and click a mouse button. The menu options will disappear and the screen will be redrawn so that the boundaries of the diagram, indicated by yellow lines, will appear.

Only a part of the Process Diagram will normally be visible on the screen at one time. Use the ZOOM Actual option to see a portion of the diagram with the icons the same size as they will be when plotted. You may move the view of the screen by means of the pan bars along the bottom and right of the screen to see any portion of the diagram that you wish.

Move the arrow cursor to the ZOOM menu header and click a mouse button. The ZOOM options will appear under the ZOOM menu header. Select the Actual option by moving the cursor so that Actual is highlighted and click a mouse button. The menu options will disappear and the screen will be redrawn so that the icons will be labeled and be the size they will be when they are printed or plotted.

Often a diagram will be too big to see all the components and their relationships at once. The ZOOM ½× option provides the means to shrink a diagram by 50%. The option may be repeated and the diagram shrunk even smaller, or used before or after other ZOOM options. Use the ½× option to 'undo' the 2× option.

Move the arrow cursor to the ZOOM menu header and click a mouse button. The ZOOM options will appear under the ZOOM menu header. Select the ½× option by moving the cursor so that ½× is highlighted and click a mouse button. The menu options will disappear and the screen will be redrawn so that the icons will be half the size they were before the option was selected.

It is possible to reduce the size of the diagram to the point where it almost disappears.

The ZOOM 2× option provides the means to expand the diagram to twice its size. This option may be repeated and the icons made even larger, or it may be used before or after other ZOOM options. The 2× option may be used as an 'undo' of the ½× option.

Move the arrow cursor to the ZOOM menu header and click a mouse button. The ZOOM options will appear under the ZOOM menu header. Select the 2× option by moving the cursor so that 2× is highlighted and click a mouse button. The menu options will disappear and the screen will be redrawn so that the icons will be twice the size they were before the option was executed; only half as much of the diagram will be displayed on the screen.

If you repeatedly apply the 2× option to a diagram you will eventually not see any of the icons for the diagram on the screen.

The ZOOM Enter Zoom option allows an arbitrary zoom factor to be entered so that a diagram may be displayed at any size. This is an absolute zoom factor. If 1.0 is entered, the result is the same as selecting the Actual option. Trial and error will quickly give you experience in choosing a specific zoom factor appropriate for your purpose.

Move the arrow cursor to the ZOOM menu header and click a mouse button. The ZOOM options will appear under the ZOOM menu header. Select the Enter Zoom option by moving the cursor so that 'Enter Zoom' is highlighted and click a mouse button; the menu options will disappear and the Zoom Factor dialog box will be displayed with the current zoom factor. Enter a larger or smaller value and press the F5 key to register your selection. This selection will remain active as the default selection until you again change it for this diagram.

A non-positive zoom factor is not permitted.

Often a diagram will be too big to see all the components and their relationships at once; the ZOOM 75% option provides the means to shrink the diagram to 75% of its actual size. The arrow icon names will not be displayed at this size and only a portion of the Data Source/Sink and Process Box Names will be displayed along with the ID's for the Data Source/Sink and Process Box icons.

Move the arrow cursor to the ZOOM menu header and click a mouse button. The ZOOM options will appear under the ZOOM menu header. Select the 75% option by moving the cursor so that '75%' is highlighted and clicking a mouse button. The menu options will disappear and the screen will be redrawn so that the icons will be ¾ the size they would be had the Actual option been chosen.

Help in MetaVision is a context-sensitive system that closely mirrors the documentation presented here. You enter the HELP system by placing the cursor on the word HELP in the far right of the menu options along the top of the screen and clicking a button on the mouse.

A Help window will be displayed in the middle of the screen which contains three items across the top: HELP, HELP, and CANCEL. The left HELP may be used for accessing the information contained in this section on how to use the HELP system. The HELP in the top-center of the window identifies that you are in the Help system. You may leave the Help system by placing the cursor on CANCEL in the upper left of the window and clicking a button on the mouse.

When the Help system is initially invoked, a list of the Help topics that relate to the currently displayed set of menus is presented. You pick the topic on which you desire help by highlighting the topic and clicking a button on the mouse. When you have picked a topic, the subtopics or text relating to the topic you chose will be displayed. If there are more topics or text than will fit on the screen, you may move down the list of text by placing the cursor on the downward-pointing arrow in the lower right corner of the window and clicking a button on the mouse. Similarly, you may move up the list of topics or text by placing the cursor on the upward-pointing arrow in the upper right of the Help system window.

The four options listed along the bottom of the Help system window allow you to see Help on other topics. Placing the cursor on 'NEXT' will display the topics or text for the topic which immediately follows the currently-selected topic. Placing the cursor on 'PREV' will display the topics or text for the topic which is immediately previous to the currently-selected topic.

Choosing the 'LEVEL UP' option moves you to the set of topics of which the currently selected topic is a member. 'TOPICS' displays a selection list of topics that are related to the option for which Help is currently displayed.

The Plotting Option provides the capability of producing hardcopy output of any diagram produced using MetaVision. Diagram may be sent to a plotter or printer. The diagram to be plot/printed is selected from the available diagrams by means of a selection list box. A number of formatting options are provided by means of a dialog box labeled 'Plot Information'. Input fields on the dialog box are used to record Text Size, Title Size, ZOOM Factor, Left Margin, and whether the output is to be sent to a plotter or printer.

To print or plot a MetaVision diagram, choose the Plotting option under the Activity Menu heading on the Main Menu screen. A selection list box will be presented for the diagrams available to be plot/printed and you may select from this list in the normal manner. The dialog box labeled 'Plot Information' appears; you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/print process. When the process is complete the Activity Menu options will again be displayed and control will be returned to you.

The Text Size and Title Size fields must contain integer or decimal values greater than 0.

The Margin field must contain an integer or decimal value greater than 0.

The ZOOM Factor field must contain an integer or decimal value greater than 0.

To exit the activities under a particular menu heading use the Exit option. You will be returned to the main menu option from which you came. Placing the cursor on CANCEL in the upper right-hand corner of the activity list will accomplish the same result.

The What If menu option under the main menu header PROCESS prints a report indicating the affected portions of your project if a process is omitted. The report may be printed to a file, the screen, or the printer.

To use the What If option under the PROCESS menu header pull down the menu under PROCESS by highlighting PROCESS and click a button on the mouse. Highlight What If by moving the cursor and click a button on the mouse to activate the What If option.

A dialog window will appear that provides for inputting from the keyboard, or selecting from a list of available Process IDs, the Process ID for the process to be omitted for the report that follows. The window is entitled 'What If Process ID Changed' and consists of the normal header functions F1: HELP, F3: LIST, F5: DONE, and F10: CANCEL, and a single input field Enter ID. You may either enter a Process ID and press F5 for done or press F3 to see a list of Process IDs and Process Names for the project on which you are working.

When you have entered a Process ID or selected one, a set of output options will be presented in a window.

The options include: File, Printer, or Screen. Place the cursor in the box next to the desired option and click a mouse button. If you select the File option a dialog window appears that is used for inputting the name of the output file. The window is simply entitled File: and the input field is labelled Path Name:. Enter a complete file name including drive and path specifications and press F5.

If you select the Printer option the report will be sent to the printer. Note that the report requires that you have your printer set for at least 132 columns wide so that the report will be printed with a report row on a single row of output.

If you select the Screen output option the report will be printed to your screen. Several options are provided to aid in viewing the report on your screen including (L)Line, (S)Screen, (P)Pan, (W)Window, (C)Continuous, (R)Restart, and (Q)Quit.

Whichever output you select the report will have the general form of the following which has been modified by minimizing spaces in columns to make the report fit on the page here. The items listed in each column are the names of the PROCESS, DATA, CONTROL, or SUPPORT that will be affected by deletion of the chosen Process ID.

After the report is produced the set of options under PROCESS will again be displayed.

The Matrix Diagram menu item under PROCESS gives you the capability of seeing or plotting a matrix representation of the processes verses the Report/Form/Packet information you have created under the Process Diagram menu item.

To select the Matrix Diagram menu item, click on PROCESS on the main menu screen after having opened a project and chosen the Business Modeling Method. Select Matrix Diagram by moving the cursor and clicking a button on the mouse when Matrix Diagram is highlighted.

The normal activity list will be displayed. However, only the DIAGRAMMING and PLOTTING activities are active on this list. Select the activity you want or move the cursor so that EXIT or CANCEL is highlighted to leave the Module Relationship activity list.

The DIAGRAMMING activity for the Matrix Diagram option provides the capability of viewing the Matrix Diagram and changing the ZOOM factors related to the diagram. The contents of this diagram are generated from the information entered for the Process Diagrams for a project. The diagram consists of a matrix of processes verses RFP information.

To select the DIAGRAMMING activity from the Activity List, move the arrow cursor so that DIAGRAMMING is highlighted and click a button on the mouse. After a short time the Process Diagramming screen will be displayed.

Since this is a generated diagram, the CREATE and EDIT options are not needed; since there is only a single Matrix Diagram per project there is no need for the HYPERTEXT menu options.

DIAGRAM

The DIAGRAM menu contains a single option, QUIT. All of the Process Boxes for a project are displayed on a single diagram so that there is only one per project.

The Quit Option exists under the DIAGRAM Menu header in the Matrix Diagram screen and causes the current diagram to be closed and the Main Menu Screen to be displayed.

You must be in the Matrix Diagram screen to use the Quit option. If you are in the Matrix Diagram Screen and you wish to access another part of MetaVision, then, using the mouse, place the arrow cursor so that the DIAGRAM Menu header is highlighted and click the mouse; if another menu is pulled down you will have to click the mouse a second time since the first only pulled up the previous menu.

The menu option 'Quit' will appear under the menu header; move the arrow cursor to the Quit option using the mouse and, when it is highlighted, click a button on the mouse. The Main Menu screen will be displayed after a few seconds; the message 'One Moment Please . . . ' will initially be displayed in the top center of the screen but any of the options on the Main Menu screen will presently be available. If you wish to exit MetaVision completely at this time, you may move the arrow cursor to the PROJECT menu and pick the Quit option there.

Use the ZOOM option to redraw the diagram in the window at some factor smaller or larger than its current size.

It is often desirable to enlarge a portion of a Matrix Diagram so that it fills the entire screen, since this makes viewing of that portion of the diagram easier. A portion of a diagram is enlarged by outlining that portion using the Arbitrary option. The outlined portion will then fill the screen. It should be noted that Names will only be displayed if the combination of zoom factor and font will allow.

To enlarge a portion of a diagram displayed on the screen use the Arbitrary option under the ZOOM menu header. Move the arrow cursor to the ZOOM menu header and click a mouse button. The ZOOM options will appear under the ZOOM menu header; 'Arbitrary' is the first option on the list. Select the Arbitrary option by moving the cursor until 'Arbitrary' is highlighted and clicking a mouse button; the menu options will disappear and a cross-hairs cursor will appear. Move the cross-hairs cursor to a corner of the portion of the screen to be enlarged and click a mouse button. Any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged. Vertical and horizontal lines will appear as the cursor is moved to indicate the bounds of the portion of the diagram that will fill the screen. Click the mouse a second time to establish the size and extent of the portion of the diagram to be enlarged; the portion outlined will be enlarged to fill the screen.

A portion of the enlarged diagram may again be expanded using the Arbitrary option, though this will usually not be necessary. The ZOOM $\frac{1}{2}\times$ and $2\times$ options may also be used on the results of using the Arbitrary option.

Mistakes are not identified as such explicitly by the system for this option; some actions, however, are not recommended or motivated.

If you move the cross-hairs cursor to a spot and click a mouse button twice on that same spot the diagram will be redrawn without any changes.

If you move the cross-hairs cursor to a spot on the border of the screen and click a mouse button the diagram will be redrawn without any changes.

The complete Matrix Diagram may be viewed on the screen at one time by means of the ZOOM Fit Screen option. Appropriate magnification factors are calculated by the system to make the diagram fit on the screen; the yellow line that appears indicates the boundaries of the page on which the diagram fits. The page size is determined automatically.

To use the option move the arrow cursor to the ZOOM menu header (near or on the word ZOOM) and click a mouse button. The ZOOM options will appear under the ZOOM menu header. Select the Fit Screen option by moving the cursor so that 'Fit Screen' is highlighted and click a mouse button. The menu options will disappear and the screen will be redrawn so that the boundaries of the diagram, indicated by yellow lines, will appear.

Using this option on a Matrix Diagram of any large project will not be useful, since the diagram will only show the grid.

Only a part of the Matrix Diagram will normally be visible on the screen at one time. Use the ZOOM Actual option to see a portion of the diagram with the lettering the same size as it will be when plotted. You may move the view of the screen by means of the pan bars along the bottom and right of the screen to see any portion of the diagram that you wish.

Move the arrow cursor to the ZOOM menu header and click a mouse button. The ZOOM options will appear under the ZOOM menu header. Select the Actual option by moving the cursor so that Actual is highlighted and click a mouse button. The menu options will disappear and the screen will be redrawn so that the icons will be labeled and be the size they will be when they are printed or plotted.

Often a diagram will be too big to see all the components and their relationships at once. The ZOOM ½× option provides the means to shrink a diagram by 50%. The option may be repeated and the diagram shrunk even smaller, or used before or after other ZOOM options. Use the ½× option to 'undo' the 2× option.

Move the arrow cursor to the ZOOM menu header and click a mouse button. The ZOOM options will appear under the ZOOM menu header. Select the ½× option by moving the cursor so that ½× is highlighted and click a mouse button. The menu options will disappear and the screen will be redrawn so that the icons will be half the size they were before the option was selected.

It is possible to reduce the size of the diagram to the point where it almost disappears.

The ZOOM 2× option provides the means to expand the diagram to twice its size. This option may be repeated and the information made even larger, or it may be used before or after other ZOOM options. The 2× option may be used as an 'undo' of the ½× option.

Move the arrow cursor to the ZOOM menu header and click a mouse button. The ZOOM options will appear under the ZOOM menu header. Select the 2× option by moving the cursor so that 2× is highlighted and click a mouse button. The menu options will disappear and the screen will be redrawn so that the icons will be twice the size they were before the option was executed; only half as much of the diagram will be displayed on the screen.

If you repeatedly apply the 2× option to a diagram you will eventually not see any of the information for the diagram on the screen.

The ZOOM Enter Zoom option allows an arbitrary zoom factor to be entered so that a diagram may be displayed at any size. This is an absolute zoom factor. If 1.0 is entered, the result is the same as selecting the Actual option. Trial and error will quickly give you experience in choosing a specific zoom factor appropriate for your purpose.

Move the arrow cursor to the ZOOM menu header and click a mouse button. The ZOOM options will appear under the ZOOM menu header. Select the Enter Zoom option by moving the cursor so that 'Enter Zoom' is highlighted and click a mouse button; the menu options will disappear and the Zoom Factor dialog box will be displayed with the current zoom factor. Enter a larger or smaller value and press the F5 key to register your selection. This selection will remain active as the default selection until you again change it for this diagram.

A non-positive zoom factor is not permitted.

Often a diagram will be too big to see all the components and their relationships at once; the ZOOM 75% option provides the means to shrink the diagram to 75% of its actual size.

Move the arrow cursor to the ZOOM menu header and click a mouse button. The ZOOM options will appear under the ZOOM menu header. Select the 75% option by moving the cursor so that '75%' is highlighted and clicking a mouse button. The menu options will disappear and the screen will be redrawn so that the icons will be ¾ the size they would be had the Actual option been chosen.

Help in MetaVision is a context-sensitive system that closely mirrors the documentation presented here. You enter the HELP system by placing the cursor on the word HELP in the far right of the menu options along the top of the screen and clicking a button on the mouse.

A Help window will be displayed in the middle of the screen which contains three items across the top: HELP, HELP, and CANCEL. The left HELP may be used for accessing the information contained in this section on how to use the HELP system. The HELP in the top-center of the window identifies that you are in the Help system. You may leave the Help system by placing the cursor on CANCEL in the upper left of the window and clicking a button on the mouse.

When the Help system is initially invoked, a list of the Help topics that relate to the currently displayed set of menus is presented. You pick the topic on which you desire help by highlighting the topic and clicking a button on the mouse. When you have picked a topic, the subtopics or text relating to the topic you chose will be displayed. If there are more topics or text than will fit on the screen, you may move down the list of text by placing the cursor on the downward-pointing arrow in the lower right corner of the window and clicking a button on the mouse. Similarly, you may move up the list of topics or text by placing the cursor on the upward-pointing arrow in the upper right of the Help system window.

The four options listed along the bottom of the Help system window allow you to see Help on other topics. Placing the cursor on 'NEXT' will display the topics or text for the topic which immediately follows the currently-selected topic. Placing the cursor on 'PREV' will display the topics or text for the topic which is immediately previous to the currently-selected topic.

Choosing the 'LEVEL UP' option moves you to the set of topics of which the currently selected topic is a member. 'TOPICS' displays a selection list of topics that are related to the option for which Help is currently displayed.

The Plotting Option provides the capability of producing hardcopy output of any diagram produced using MetaVision. Diagram may be sent to a plotter or printer. The diagram to be plot/printed is selected from the available diagrams by means of a selection list box. A number of formatting options are provided by means of a dialog box labeled 'Plot Information'. Input fields on the dialog box are used to record Text Size, Title Size, ZOOM Factor, Left Margin, and whether the output is to be sent to a plotter or printer.

To print or plot a MetaVision diagram, choose the Plotting option under the Activity Menu heading on the Main Menu screen. A selection list box will be presented for the diagrams available to be plot/printed and you may select from this list in the normal manner. The dialog box labeled 'Plot Information' appears; you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/print process. When the process is complete the Activity Menu options will again be displayed and control will be returned to you.

The Text Size and Title Size fields must contain integer or decimal values greater than 0.

The Margin field must contain an integer or decimal value greater than 0.

To exit the activities under a particular menu heading use the Exit option. You will be returned to the main menu option from which you came. Placing the cursor on CANCEL in the upper right-hand corner of the activity list will accomplish the same result.

Data are the entities that are transferred between processes in a business endeavor. Data may be machine (computer) readable or printed reports produced by either computers or human report writers. The term might even be extended to include material and personnel although this is not a usual perspective when using Business Modeling. Data on a Business Information Diagram may consist of any information considered pertinent to the operation of a business endeavor. Most often, however, the data modeled with a Business Information Diagram are the logical view of the records stored in computer files that support a business's endeavors. This may be a historical view during the analysis phase of a project or a proposed or planning view during the design phases of a project.

Data records and their relationships may be modeled in a Business Information Diagram showing records and their component fields, uniqueness constraints and keys for records and subset, equality, disjoint, and algorithmic constraints between records. These relationships can then be investigated using a variety of reports including a What If report for any selected record to determine its connections with other records.

Like other types of modeling in MetaVision, information on Business Information models is kept in a database and is related to other types of models by MetaVision.

The Business Information Diagram option under the DATA menu header provides the primary means to model and manage information about the data in your enterprise.

To access the Business Information Diagram option from the main menu screen when no other menus are pulled down, move the arrow cursor so that the DATA menu header is highlighted and click a mouse button. A menu of options will be displayed under DATA that include Business Information Diagram, What If, and Matrix Diagram.

Move the arrow cursor so that the Business Information Diagram option is highlighted. Click a mouse button and an Activity List will be displayed in a window. The activities listed include DIAGRAMMING, REPORT GENERATION, PLOTTING, VALIDATION, DATA DICTIONARY, MAINTENANCE REPORTS, FILE IMPORT/MERGE, FILE EXPORT, and EXIT. Each of these activities is covered in the following sections.

The Business Information Diagramming capability of MetaVision supports the graphic modeling of the information involved in an organization as well as the conceptual relationships between the elements of that information. Text may also be added to the diagram for clarity. All information shown on a Business Information Diagram is kept in standard dBASE III files including the existence, positions, and connections of icons. Reports and plots may be generated from the information entered on the diagramming screen and other related diagram information is automatically updated to reflect information on each Business Information Diagram.

Diagrams are created on the screen using icons to represent data and relationships between data elements. Menus are used to choose diagramming functions. Dialog windows are provided to enter information concerning icons. A mouse and cursor are used to position and move icons on a diagram.

Diagrams may be edited by changing icon labels, the positions of icons, and the size of the diagram. Icons may be added to, deleted from, moved, or the supporting text changed on a diagram. A diagram may be plotted on a variety of plotters and printers in a variety of sizes and fonts.

To select the DIAGRAMMING activity move the arrow cursor so that DIAGRAMMING is highlighted and click a button on the mouse. After a short time the Business Information Diagram DIAGRAMMING screen will be displayed.

Create is used to establish a particular icon as part of your diagram. Icons in MetaVision are labeled and described in a database that keeps track of them, their placement on diagrams and their connections with other icons. They are located along the left of the diagram under the menu header, CREATE.

There are seven icons for the Business Information Diagramming tool: Record icon—represents the data records in the business system being analyzed or designed including their component fields. Uniqueness Constraint/Key icon—represents the fields in each record that are sufficient to identify the record uniquely or if interpreted as a key, possibly a non-unique key, that are used for accessing the records in a file in a particular order. Subset Constraint icon—represents the state of affairs when the values that can be in one set of elements are a subset of the values that can be in a similar set of elements in another record. Equality Constraint icon—represents the relationship between two sets of data elements in two records when the set of values in one set of data elements must be identical to the set of values in the other. Disjoint Constraint icon—represents the relationship between two sets of data elements in two records when every instance of a value in one set of elements must NOT be equivalent to an instance of a value in the other set of elements. Algorithmic Constraint icons—represent cases where the values of fields are related by some other algorithm that can be entered. Text—free form text may be entered on a diagram using this icon.

In order to work on a Business Information Diagram you must first Add or Choose a project using the PROJECT menu on the MetaVision Project screen, select Business Modeling, from the METHOD pull-down menu, select Business Information Diagram from the DATA menu, and select Diagramming from the Activity selection list.

A diagram must be open before you can create an icon. If you attempt to create an icon before opening a diagram an error message will be displayed in an error message window. Record Icon Record icons represent the file structures existing in an enterprise. They consist of rectangles representing fields joined together with other fields in the same record. Each record and field has information entered for it that is integrated with other information from other MetaVision models automatically.

When a Record icon has been placed on a Business Information diagram a series of pop-up dialog windows are displayed with fields for a variety of pieces of information to be input.

To add a Record icon to a Business Information diagram be certain that you have a diagram open for modification either by Opening a previously created one or adding a New one using the corresponding option from the DIAGRAM menu. Move the arrow cursor to the column of icons along the left of the diagram under the menu header CREATE to a location on or near the rectangle and click a mouse button. A cross-hair cursor will replace the arrow cursor. Move the cross-hair cursor using the mouse to a position on the diagram where you wish the Record icon to be centered and click a mouse button again.

The dialog window entitled Data Record Information will be presented. The information input in this window applies to the record as a whole.

Record ID is a system generated 4 position unique identifier for this record. If there are more than 4 Characters in the Record ID you wish to use, you can type them all in the Queue ID field. You may change this value but normally will have no reason to do so. Record Name is the name by which the record structure is to be known. Record Description is a two line field for describing the record, its function, content, and/or context in the business. File Name is the name of the computer file in which the record is stored if this information is available to the analyst; sometimes this information is not available to an analyst because the database manager being used keeps and names files so that their names are not known to users.

When all of the information has been entered another dialog window will appear. This one is used iteratively to enter information about the component fields that go to make up the current record. It is labelled Field Information and is used to input information about the fields that go to make up a record.

The Field Information dialog window consists of the normal header functions, F1: HELP, F3: LIST, F5: DONE, and F10: CANCEL, along with a body containing a number of fields of data about fields to be input. F3:LIST is especially useful on this window since the same field may appear in several different records and it will be much easier to pick a formerly entered Field ID from a list that includes its name instead of keeping track of and re-entering its Field ID each time it occurs on a diagram. The fields for which values are to be input are as follows: ID is a 4 character system generated field that is used to uniquely identify a field. Field Name is a 30 character field provided to input the name of the field that will appear on the icon on a diagram. 30 characters is longer than will fit in the icon so that shorter names should be used. Description is two lines of 50 characters each that are provided for a description of the field. Data Type is a one character alphanumeric field that may contain a data type code such as 'A' for alpha, 'N' for numeric, 'R' for real, and so on; the field is not validated by MetaVision so that you are responsible for the Type codes used. Data Size is a four character alphanumeric field that may contain the size in characters of the field; this field is not validated so that anything may be included here.

Format is a 19 character alphanumeric field that may contain a coded indication of the format of the data for this field; this field is not validated in any way so that you are responsible for the validity of any formats entered.

Enter an RFP ID number if you wish to include one in your field information. If you wish to select from the RFP List, enter a 'Y' in the next field and the list of existing RFPs will appear. Choose one by moving through the list until the one you want is highlighted and click the mouse. The ID of the RFP you have chosen will then appear in the RFP ID box. If you wish to enter more information about the RFP, indicate that by placing a 'Y' in the next field. Once you press F5, a dialog box will appear that looks similar to this:

All fields will be filled in with data entered on the previous screen. You should leave this information as is or change as appropriate. The F3 List option is helpful when setting up Common Names and IDs.

Press F5 after you have completed the Common Information dialog window to invoke the Field Information dialog window again so that values may be input for the next field in the record. Do this as long as there are more fields for which data is entered. Discontinue entering fields by pressing F10 when the dialog window reappears after the last one has been entered by pressing F5.

The record icon will be placed at the position of the cross-hairs cursor with the Record ID in the upper left hand corner of the first field that was entered and an Field ID in the lower right hand corner of each field rectangle. The Field Name for each field will be displayed in the center of the rectangle for the field.

'A Sentence/Record must have at least one Role/-Field.' appears in the error message window if you press F10 without entering any field information on the Field Information window. You must click a mouse button with the cursor on 'Continue' to resume.

You are not required to enter a value in the Field Name but you may find it difficult to determine precisely what you had in mind when you need to use or interpret your diagram later. The field is there for your information and the benefit of those with whom you are trying to communicate; use it.

'ID is invalid.' appears in the error message box when anything other than a positive integer is entered in the Field ID field. You must press a mouse button with the cursor on 'Continue' to resume.

'Role/Field may appear only once in a Sentence/-Record.' appears in the error message pop-up window if you enter the same number for a field as a number previously entered for the same question. You must press a mouse button with the cursor on 'Continue' to resume.

The Field Name field is 30 characters wide but when choosing a Field Name you will probably wish to restrict yourself to two strings (separated by a space in the Field Name field) of about 8 or fewer characters each. If you include longer ones the Field Name may overwrite the Record ID and/or the Field ID and even continue into the adjacent box overwriting (or being overwritten by) the field name for that box.

The Key Identifier icon indicates which of the fields in a record uniquely identifies a record in the file. These are termed uniqueness constraints in Information Analysis. The Key Identifier icon may also be used to represent fields constituting secondary keys in the file.

The Key Identifier pop-up dialog window consists of a title 'Key Information' and a header with the four normal functions. The body of the window consists of three input fields. Key ID is up to four digits in length and is automatically generated by MetaVision and will normally be accepted as the appropriate value for the Key ID. Key Type is a one character field to identify a key as either 'P' for primary or 'S' for secondary. Index File Name which is a twenty character field to assign a file name to the index file.

To place a Key Identifier icon on a Data Map click a mouse button with the arrow cursor in the vicinity of the Key Identifier icon. The arrow cursor will be replaced by the pointer cursor, and using the mouse, move the pointer cursor so it is located inside one of the fields to be included under the Key Identifier icon.

Click a mouse button and the field where the pointer cursor is located will be highlighted and the Key Information dialog window will be displayed. Enter the requested information and press the F5 function key to accept the system generated Key ID and the dialog window will be removed and the pointer cursor will again be displayed. Using the mouse, move the pointer cursor to each of the other fields in the same record to be included under the Key Identifier icon and click a mouse button on each. Each of these fields will be highlighted. If there is to be only one field under the Key Identifier icon you do not need to click a mouse button a second time inside the field.

After all of the fields you wish to include under the Key Identifier icon have been highlighted, move the pointer cursor completely outside the record icon and click a mouse button; the Key Identifier icon will appear above all and only those fields you specified.

The pointer cursor will still be available so that you may add other Key Identifier icons at this time. You may also quit including Key Identifier icons by placing the pointing cursor outside all fields and clicking a mouse button.

'ID is invalid.' is displayed in the error message window if you replace the system generated Key ID on the Identifier dialog window with anything other than a positive integer.

'Identifier/Key ID already exists.' is displayed in the error message window if you replace the system generated Key ID with a number that is the Key ID for another Identifier.

'Key type must be P (primary) or S (secondary)' is displayed in the error message window if you do not enter either a P or an S in the Key Type field.

Going to another Record icon after pressing F5 to accept a Key ID and clicking a mouse button may be a mistake. The Key Identifier icon will be placed over only those fields included in the record within which you clicked a mouse button originally.

It is a conceptual mistake to identify a set of fields with a Key Identifier icon and then identify a proper subset of that set with another Key Identifier icon unless the identifier for the subset of fields is intended to indicate a secondary key.

The Subset Constraint icon consists of the normal subset symbol, a horse-shoe shaped symbol on its side. It is found under the Create menu header on the Business Information Diagram and is located just below the Key Identifier icon. The open end of the symbol points to the subset and the closed end points to the set, the superset, that contains the subset. The horse-shoe has a horizontal line passing through it that connects the subset and the superset.

Subset icons are used to connect two sets of fields in records to indicate that all of the instances, actual and possible, of the combinations of field values in the subset are matched by an identical combination of values in the superset. The subset does not have to be a proper subset of the superset; that is, the sets involved may be identical at some points.

You must be positioned in the Business Information Diagram screen before you can add a Subset Constraint icon to a Business Information Diagram. To add a Subset Constraint icon first click a mouse button when the cursor is near or on the Subset Constraint icon under the Create menu header. The Subset Constraint icon will be highlighted, the hand cursor displayed, and the message 'Select Superset end first' will appear.

Move the cursor so it is inside the first (and perhaps only) field of the superset. Click a mouse button, the field will be highlighted, and the Constraint Information dialog window will be displayed. The dialog window is labeled Constraint Information and the normal header options are available as listed across the top of the window. The input fields include the following: Constraint ID: an integer up to four digits in length that is generated by the system and should normally be accepted without change. Description: two lines of 50 characters each in which a description of the constraint may be placed. Expression: a 50 character line that may be used to record the precise nature of the constraint.

Accept the Constraint ID value as generated by the system, enter values for the Description and Expression fields, and press F5 to have the values processed by MetaVision. If the subset constraint applies to more than one field in a record, click a mouse button with the pointer cursor on each of the other fields (besides the one chosen before the Constraint Information dialog window was displayed) that comprise the subset.

Subset Constraints may be between single fields, which are here referred to as simple constraints, or between combinations of fields, which are here referred to as compound constraints. For simple subset constraints, values from a single field are a subset of values in another single field. For a compound Subset Constraint the first combination of values must be a subset of values in the second combination.

If the field(s) comprising the superset are in the same record as the field(s) comprising the subset, move the cursor so that it is outside any field and click a mouse button and then move the cursor to the field(s) that comprise the superset and click a mouse button on each. When the fields comprising the subset are in a second record, after clicking a mouse button with the cursor on the last field in the first record of the superset combination, move the cursor to the second record and click a mouse button with the pointer cursor on each of the fields in the subset. If the number of fields comprising the superset is less than the number of fields in the subset, click a mouse button with the pointer cursor inside the fields that comprise the superset. Then click a mouse button with the pointer cursor outside any field.

The routing option window will be displayed and you should either choose 'manually' to connect the two combinations of fields yourself or request the system to do it automatically.

The fields in compound constraints are indicated on the Business Information Diagram by means of diagonal lines beneath the fields involved, and under some circumstances with a vertical line from another field. More than two fields may be involved in a compound constraint and they may be connected to a number of fields in the second combination of fields that is equal to or less than the number of fields in the first combination.

Fields connected by Subset Constraint icons will usually be the same field in two different records but the subset constraint may also be used to indicate a variety of relationships between two fields or constraints between two fields that have different names but apply to the same type of entity. An instance of these latter cases would be a subset constraint that symbolizes that managers are a subset of employees. Subset constraints may exist between fields in a single record when the possible values for one field are a subset of the values that are possible in the other field. An example is given by the question 'Who manages whom?'. All managers are employees but not all employees are managers.

Click the mouse button so that the number of clicks outside any Field equals the number of subset fields minus the number of superset fields. The Subset Constraint will be displayed after the last click. After a Subset Constraint icon has been added to the Business Information Diagram, while the pointer cursor is still displayed, you may add additional Subset Constraints without having to click a mouse button on the icon under Create.

MetaVision does not prevent you from adding some logically impossible constraints between fields but it does identify the logically questionable constraints with the Validation tool found on the ACTIVITY menu.

'No list available.' is displayed if you press F3 while in the Constraint Information dialog window. Click a mouse button with the cursor on Continue to resume work.

'ID is invalid.' is displayed in an error message window if you change the Constraint ID to anything that is not a positive integer.

'ID already exists.' is displayed in an error message window if you change the Constraint ID to a number that has been used for a Constraint ID for a previous constraint.

'Constrint must connect fields with the same Common ID.' is displayed if you try to connect two records without Common ID numbers. Doing so would either be a mistake or else you misnamed and numbered your fields in the Common Information window. Common fields can be renamed using the Edit Change option, described later.

You may connect complex fields with simple fields using the Subset icon but this is almost certainly a mistake. Complex fields should only be connected with other complex fields.

If too many compound constraints are included for a single record, it may not be clear which fields are connected. Some of the fields involved are probably better represented as complex fields.

Connecting unequal numbers of fields suggests that the smaller number of fields includes a complex field. If it does not, you should consider making some of the superset fields into a complex field.

Equality Constraint icon

The Equality Constraint icon consists of two subset symbols with their open ends facing away from each other and their closed ends touching each other. It is found under the Create menu header on the Business Information Diagram Screen and is located just below the Subset Constraint icon. The horizontal line passing through the icon connects the two sets of fields that are constrained to have identical members.

Equality constraint icons are used to connect two sets of fields in records and indicate that all of the instances, actual and possible, of the combinations of field values are matched by an identical combination of values in the other set.

You must be positioned in the Business Information Diagram screen before you can add an Equality Constraint icon to the Business Information Diagram. To add an Equality Constraint icon first click a mouse button when the cursor pointer is near or on the Equality Constraint icon under the Create menu header. The Equality Constraint icon is highlighted and the pointer cursor is displayed. Move the cursor so it is inside the first (and perhaps only) field of the first combination of fields.

Click a mouse button and the field will be highlighted and the Constraint Information dialog window will be displayed. The normal header functions are available as listed across the top of the window. The input fields include the following: Constraint ID: an integer up to four digits in length that is generated by the system and should normally be accepted without change. Description: two lines of 50 characters each in which a description of the constraint may be placed. Expression: a 50 character line that may be used to record the precise nature of the constraint. Accept the Constraint ID value as generated by the system, enter values for the Description and Expression fields, and press F5 to have the values processed by MetaVision.

Equality Constraints may be between single fields which are here referred to as simple constraints, or between combinations of fields which are here referred to as compound constraints. For simple Equality Constraints, each value of the first field must be identical to a value in the second field and vice versa.

For compound Equality Constraints the combination of values in the first fields must be identical to the combination of values in the second and vice versa. The fields in complex constraints are indicated on the Business Information Diagram by means of diagonal lines beneath the fields involved and under some circumstances with a vertical line from another field. More than two fields may be involved in a compound constraint and they may be connected to a number of fields in the second combination of fields that is equal to or less than the number of fields in the first combination. Context icons, instead of fields, should presumably be used for some of these. Fields connected by Equality Constraints will usually be the same field but this is not necessarily the case since there may be type or variety relations involved between the fields.

If the Equality Constraint applies to more than one field in a record, click a mouse button with the pointer cursor on each of the other fields (besides the one chosen before the Constraint Information dialog window was displayed) that comprise the combination.

If the field comprising the second combination of fields is in the same record as the first combination of fields, move the cursor so that it is outside any field and click a mouse button and then move the cursor to the field(s) that comprise the second combination of fields and click a mouse button with the cursor on each.

When the fields comprising the second combination are in a second record, click a mouse button with the cursor on the last field in the first record of the combination and then move the cursor to the second record and click a mouse button with the pointer cursor on each of the fields in the superset. The routing option window will be displayed and you should either 'manually' connect the two combinations of fields or request the system to do it automatically.

If the number of fields comprising the second combination is less than the number of fields in the first combination, click a mouse button with the pointer cursor inside the fields that comprise the second combination. Then click a mouse button with the pointer cursor outside any field. Click the mouse button so that the number of clicks outside any field equals the number of fields in the first combination minus the number in the second combination.

After an Equality Constraint icon has been added to the Business Information Diagram, while the pointer cursor is still displayed, you may add additional Equality Constraints without having to click a mouse button on the icon under Create.

MetaVision does not prevent you from adding some logically impossible constraints between fields but it does identify the logically questionable constraints with the Validation tool found on the ACTIVITY menu.

'No list available.' is displayed if you press F3 while in the Constraint Information dialog window. Click a mouse button with the cursor on Continue to resume work.

'ID is invalid.' is displayed in an error message window if you change the Constraint ID to anything that is not a positive integer.

'ID already exists.' is displayed in an error message window if you change the Constraint ID to a number that has been used for a Constraint ID for a previous constraint.

'Constrint must connect fields with the same Common ID.' is displayed if you try to connect two records without Common ID numbers. Doing so would either be a mistake or else you misnamed and numbered your fields in the Common Information window. Common fields can be renamed using the Edit Change option, described later.

'A Constraint must involve two Sentences/Records.' is displayed if you click only on records within the same sentence.

You may connect complex fields with simple fields using the Equality icon but this is almost certainly a mistake. Complex fields should only be connected with other complex fields.

If too many compound constraints are included for a single record, it may not be clear which fields are connected. Some of the fields are probably better represented as complex fields in these cases.

Connecting unequal numbers of fields suggests that the smaller number of fields includes a complex field. If it does not, you should consider making some of the superset fields into a complex field.

The Disjoint Constraint icon consists of two subset symbols with their open ends facing away from each other and their closed ends touching each other and a diagonal slash passing through the point where the subset symbols touch. It is found under the Create menu header on the Business Information Diagram Screen and is located just below the Equality Constraint icon. The horizontal line passing through the icon connects the two sets of fields that are constrained to have members that belong to completely different sets.

Disjoint constraint icons are used to connect two sets of fields in records and indicate that all of the instances, actual and possible, of the combinations of field values are never matched by an identical combination of values in the other set.

You must be positioned in the Business Information Diagram screen before you can add a Disjoint Constraint icon to the Business Information Diagram. To add a Disjoint Constraint icon first click a mouse button when the cursor pointer is near or on the Disjoint Constraint icon under the Create menu header. The Disjoint Constraint icon is highlighted and the pointer cursor is displayed. Move the cursor so it is inside the first (and perhaps only) field of the first combination of fields.

Click a mouse button and the field will be highlighted and the Constraint Information dialog window will be displayed. The normal header options are available as listed across the top of the window. The input fields include the following: Constraint ID: an integer up to four digits in length that is generated by the system and should normally be accepted without change. Description: two lines of 50 characters each in which a description of the constraint may be placed. Expression: a 50 character line that may be used to record the precise nature of the constraint. Accept the Constraint ID value as generated by the system, enter values for the Description and Expression fields, and press F5 to have the values processed by MetaVision.

Disjoint Constraints may be between single fields which are here referred to as simple constraints, or between combinations of fields which are here referred to as compound constraints. For simple Disjoint Constraints, each value of the first field must never be identical with the second field value. For compound Disjoint Constraints the values in the first combination of fields must never be identical to the values in the second combination.

The fields in complex constraints are indicated on the Business Information Diagram by means of diagonal lines beneath the fields involved and under some circumstances with a vertical line from another field. More than two fields may be involved in a compound constraint and they may be connected to a number of fields in the second combination of fields that is equal to or less than the number of fields in the first combination. Context icons, instead of fields, should presumably be used for some of these. Fields connected by Disjoint Constraints will usually be the same field but this is not necessarily the case since there may be type or variety relations involved between the fields.

If the Disjoint Constraint applies to more than one field in a record, click a mouse button with the pointer cursor on each of the other fields (besides the one chosen before the Constraint Information dialog window was displayed) that comprise the combination.

If the fields comprising the second combination of fields are in the same record as the first combination of fields, move the cursor so that it is outside any field and click a mouse button and then move the cursor to the field(s) that comprise the second combination of fields and click a mouse button with the cursor on each. When the fields comprising the second combination are in a second record, click a mouse button with the cursor on the last field in the first record of the subset combination and then move the cursor to the second record and click a mouse button with the pointer cursor on each of the fields in the superset. The routing option window will be displayed and you should either 'manually' connect the two combinations of fields or request the system to do it automatically.

If the number of fields comprising the second combination is less than the number of fields in the first combination, click a mouse button with the pointer cursor inside the fields that comprise the second combination. Then click a mouse button with the pointer cursor outside any field. Click the mouse button so that the number of clicks outside any field equals the number of fields in the first combination minus the number in the second combination. After a Disjoint Constraint icon has been added to the Business Information Diagram, while the pointer cursor is still displayed, you may add additional Disjoint Constraints without having to click a mouse button on the icon under Create.

The Business Information Diagram does not prevent you from adding some logically impossible constraints between fields but it does identify the logically questionable constraints with the Validation tool found on the ACTIVITY menu.

'No list available.' is displayed if you press F3 while in the Constraint Information dialog window. Click a mouse button with the cursor on Continue to resume work.

'ID is invalid.' is displayed in an error message window if you change the Constraint ID to anything that is not a positive integer.

'ID already exists.' is displayed in an error message window if you change the Constraint ID to a number that has been used for a Constraint ID for a previous constraint.

'Constrint must connect fields with the same Common ID.' is displayed if you try to connect two records without Common ID numbers. Doing so would either be a mistake or else you misnamed and numbered your fields in the Common Information window. Common fields can be renamed using the Edit Change option, described later.

'A Constraint must involve two Sentences/Records' will be displayed if you click only on records within the same sentence.

You may connect complex fields with simple fields using the Disjoint icon but this is almost certainly a mistake. Complex fields should only be connected with other complex fields.

If too many compound subset constraints are included for a single record, it may not be clear which fields are connected. Some of the fields are probably better represented as complex fields in these cases.

Connecting unequal numbers of fields suggests that the smaller number of fields includes a complex field. If it does not, you should consider making some of the superset fields into a complex field.

Algorithmic Constraint

The ALG Constraint icon consists simply of the string 'ALG' above the line connecting the two sets of fields involved in the constraint. It is found under the Create menu header on the Business Information Diagram Screen and is located just below the Disjoint Constraint icon. ALG Constraint icons are used to connect two sets of fields in records and indicate that all of the instances, actual and possible, of the combinations of field values are related by the same algorithm to a combination of values in the other set. The precise algorithm relating the two sets of fields is specified in the dialog window that accompanies the creation of a ALG Constraint.

You must be positioned in the Business Information Diagram screen before you can add an ALG Constraint icon to the Business Information Diagram. To add an ALG Constraint icon first click a mouse button when the cursor pointer is near or on the ALG Constraint icon under the Create menu header. The ALG Constraint icon is highlighted and the pointer cursor is displayed. Move the cursor so it is inside the first (and perhaps only) field of the first combination of fields.

Click a mouse button and the field will be highlighted and the Constraint Information dialog window will be displayed. The normal header options are available as listed across the top of the window. The input fields include the following: Constraint ID: an integer up to four digits in length that is generated by the system and should normally be accepted without change. Description: two lines of 50 characters each in which a description or prose version of the algorithm may be placed. Expression: a 50 character line that may be used to record the precise nature of the algorithm connecting the two sets of fields.

Accept the Constraint ID value as generated by the system, enter a prose version of the algorithm in the Description field and a more formal version of the algorithm in the Expression field, and press F5 to have the values processed by MetaVision.

ALG Constraints may be between single fields which are here referred to as simple constraints, or between combinations of fields which are here referred to as compound constraints. For simple ALG Constraints, each value of the first field must be related by an algorithm to a value in the second field. For compound ALG Constraints the values in the first combination of fields must be related via an algorithm to values in the second combination.

The fields in complex constraints are indicated on the Business Information Diagram by means of diagonal lines beneath the fields involved and under some circumstances with a vertical line from another field. More than two fields may be involved in a compound constraint and they may be connected to a number of fields in the second combination of fields that is equal to or less than the number of fields in the first combination. Context icons, instead of fields, should presumably be used for some of these.

If the ALG Constraint applies to more than one field in a record, click a mouse button with the pointer cursor on each of the other fields (besides the one chosen before the Constraint Information dialog window was displayed) that comprise the combination. If the fields comprising the second combination of fields is in the same record as the first combination of fields, move the cursor so that it is outside any field and click a mouse button and then move the cursor to the field(s) that comprise the second combination of fields and click a mouse button with the cursor on each. When the fields comprising the second combination are in a second record, click a mouse button with the cursor on the last field in the first record of the ALG combination and then move the cursor to the second record and click a mouse button with the pointer cursor on each of the fields in the superset. The routing option window will be displayed and you should either 'manually' connect the two combinations of fields or request the system to do it automatically.

If the number of fields comprising the second combination is less than the number of fields in the first combination, click a mouse button with the pointer cursor inside the fields that comprise the second combination. Then click a mouse button with the pointer cursor outside any field. Click the mouse button so that the number of clicks outside any field equals the number of fields in the first combination minus the number in the second combination. After an ALG Constraint icon has been added to the Business Information Diagram, while the pointer cursor is still displayed, you may add additional ALG Constraints without having to click a mouse button on the icon under Create.

'No list available.' is displayed if you press F3 while in the Constraint Information dialog window. Click a mouse button with the cursor on Continue to resume work.

'ID is invalid.' is displayed in an error message window if you change the Constraint ID to anything that is not a positive integer.

'ID already exists.' is displayed in an error message window if you change the Constraint ID to a number that has been used for a Constraint ID for a previous constraint.

'A Constraint must involve two Sentences/Records' will be displayed if you click only on records within the same sentence.

If too many compound constraints are included for a single record, it may not be clear which fields are connected. Some of the fields are probably better represented as complex fields in these cases.

The CN Constraint icon consists simply of the string 'CN' above the line connecting the two sets of fields involved in the constraint. It is found under the Create menu header on the Business Information Diagram Screen and is located just below the ALG Constraint icon. CN Constraint icons are used to connect two sets of fields in records and indicate that all of the instances, actual and possible, of the combinations of field values are related by the same Common Names and IDs to a combination of values in the other set. The CN Constraint is useful to show that two or more roles really mean the same thing even though they have different Role Names and IDs.

You must be positioned in the Business Information Diagram screen before you can add a CN Constraint icon to the Business Information Diagram. To add a CN Constraint icon first click a mouse button when the cursor pointer is near or on the CN Constraint icon under the Create menu header. The CN Constraint icon is highlighted and the pointer cursor is displayed. Move the cursor so it is inside the first (and perhaps only) field of the first combination of fields.

Click a mouse button and the field will be highlighted and the Constraint Information dialog window will be displayed. The normal header options are available as listed across the top of the window. The input fields include the following: Constraint ID: an integer up to four digits in length that is generated by the system and should normally be accepted without change. Description: two lines of 50 characters each in which a description or prose version of the algorithm may be placed. Expression: a 50 character line that may be used to record the precise nature of the common name constraint connecting the two sets of fields.

Accept the Constraint ID value as generated by the system, enter a prose version of the constraint in the Description field and a more formal version of the constraint in the Expression field, and press F5 to have the values processed by MetaVision.

CN Constraints may be between single fields which are here referred to as simple constraints, or between combinations of fields which are here referred to as compound constraints. For simple CN Constraints, each value of the first field must be related by an algorithm to a value in the second field. For compound CN Constraints the values in the first combination of fields must be related via an algorithm to values in the second combination.

The fields in complex constraints are indicated on the Business Information Diagram by means of diagonal lines beneath the fields involved and under some circumstances with a vertical line from another field. More than two fields may be involved in a compound constraint and they may be connected to a number of fields in the second combination of fields that is equal to or less than the number of fields in the first combination. Context icons, instead of fields, should presumably be used for some of these.

If the CN Constraint applies to more than one field in a record, click a mouse button with the pointer cursor on each of the other fields (besides the one chosen before the Constraint Information dialog window was displayed) that comprise the combination. If the fields comprising the second combination of fields is in the same record as the first combination of fields, move the cursor so that it is outside any field and click a mouse button and then move the cursor to the field(s) that comprise the second combination of fields and click a mouse button with the cursor on each. When the fields comprising the second combination are in a second record, click a mouse button with the cursor on the last field in the first record of the CN combination and then move the cursor to the second record and click a mouse button with the pointer cursor on each of the fields in the superset. The routing option window will be displayed and you should either 'manually' connect the two combinations of fields or request the system to do it automatically.

If the number of fields comprising the second combination is less than the number of fields in the first combination, click a mouse button with the pointer cursor inside the fields that comprise the second combination. Then click a mouse button with the pointer cursor outside any field. Click the mouse button so that the number of clicks outside any field equals the number of fields in the first combination minus the number in the second combination. After a CN Constraint icon has been added to the Business Information Diagram, while the pointer cursor is still displayed, you may add additional CN Constraints without having to click a mouse button on the icon under Create.

'No list available.' is displayed if you press F3 while in the Constraint Information dialog window. Click a mouse button with the cursor on Continue to resume work.

'ID is invalid.' is displayed in an error message window if you change the Constraint ID to anything that is not a positive integer.

'ID already exists.' is displayed in an error message window if you change the Constraint ID to a number that has been used for a Constraint ID for a previous constraint.

'Constrint must connect fields with the same Common ID.' is displayed if you try to connect two records without Common ID numbers. Doing so would either be a mistake or else you misnamed and numbered your fields in the Common Information window. Common fields can be renamed using the Edit Change option, described later.

'A constraint must involve two Sentences/Records' will be displayed if you click only on records within the same sentence.

If too many compound constraints are included for a single record, it may not be clear which fields are connected. Some of the fields are probably better represented as complex fields in these cases.

Text may be placed anyplace on your Business Information Diagram by placing the cursor on the word 'Text' under the menu header Create and entering the text in the Text field on the Free Text dialog window.

Place the arrow cursor on the word Text under the Create menu header on the Business Information Diagram Screen and click a mouse button; the cross-hair cursor will appear. Move the cross-hair cursor to the position on the Business Information Diagram where the text is to be placed and click a mouse button.

The Free Text Information dialog window will appear. It consists of the normal header options and one system generated and five fields to be input.

ID is a system generated field that is three characters and should be accepted as is. Justification is a one character field that may have the value 'L', 'C', or 'R', An 'L' indicates that the text will start at the vertical line of the cross-hairs cursor; an 'R' indicates that the text will end at the vertical line of the cross-hairs cursor; and a 'C' indicates that the text will be centered on the vertical line of the cross- hairs cursor. The default of C is indicated when the window initially appears.

Size is a one digit number that indicates the relative size of the text; the default of 1 is initially displayed. Text is a fifty character field that contains the text to be placed on the Business Information Diagram. Any nonnull alphanumeric string up to fifty characters is supported. You may create longer text strings by placing shorter ones next to each other on the Business Information Diagram. Color, Font, Extended, and Intensity are fields to be used in future planned enhancements of MetaVision and are currently not operational.

The ID field should be accepted as it is and you should change the Justification to L or R if desired. Enter a digit in the size field if the default of 1 is not desired. Enter Text in the Text field and press F5 to have the text placed on the Business Information Diagram.

After the text has been placed on the Business Information Diagram, the cross-hairs cursor will again be available so that you can include other text on your Business Information Diagram. To discontinue placing text on your Business Information Diagram position the cursor on the border of the screen and click a mouse button or press F10 when the Free Text dialog window is displayed.

'ID is invalid.' will be displayed in the error message window if anything other than a positive integer is entered in the Id field.

'ID already exists.' will be displayed in the error message window if the Id is changed to the value of a previous Id.

'Justification must be L, C, or R' will be displayed in the error message window if you enter anything other than an L, C, or R in the Justification field. These are the only justification options supported.

'Size must be >0' will be displayed in the error message window if you enter anything other than a nonzero digit in the Size field.

'Text may not be blank.' will be displayed in the error message window if the other fields contain valid entries but you have not included any text in the Text field.

You can enter text on top of other text or on top of other Business Information Diagram Icons; there are probably few good reasons to do such things and it is a good idea not to because editing functions such as Move and Delete require that the relevant text be identified by pointing. It may well become difficult to point at the required text or icon if they are overlapping.

Manage your diagrams using this option by adding new ones and deleting obsolete ones. Open a diagram for modification using this option. This option should be accessed first when the Business Information Diagram screen appears.

The Open Option exists under the DIAGRAM Menu header on the Business Information Diagram screen and opens an existing Business Information Diagram for modification.

You must be in the Business Information Diagram Screen to use the Open Diagram option; it doesn't matter whether on not another Business Information Diagram is open to use this option. If you are in the Business Information Diagram Screen and you wish to open a Business Information Diagram, then, using the mouse, place the arrow cursor so that the DIAGRAM Menu header is highlighted and click a button on the mouse. Menu options that include 'Open' will appear under the menu header; move the arrow cursor to the Open option using the mouse and, when it is highlighted, click the mouse.

Click a mouse button with the cursor on the Open option and a pop-up screen appears which lists the Business Information Diagram ID and Names of as many of the previously created diagrams as will fit in the window at a time. The pop-up window consists of a header line with HELP and CANCEL, the title, 'Business Information Diagrams' and a list of the available Business Information Diagrams and their IDs listed below the title. Pan arrows are present in the upper right and lower right hand corners of the Business Information Diagram ID - Name list to make it possible to see any of the diagram ID - Names that do not fit in the window. When the list of available Business Information Diagrams ID - Names appears, place the arrow cursor so that the desired title is highlighted and click a button on the mouse. If more diagram titles exist than will fit on the screen, then use the pan arrows to move the list until the desired ID - Name is visible in the window, highlight the ID - Name and click the mouse. The message 'One Moment Please . . . ' will appear in the center of the screen and shortly the specified diagram will appear.

Placing the cursor arrow on one of the diagram titles highlights the title, and, if the mouse is clicked, draws that diagram on the screen for editing. If you click the mouse when the cursor is any place other than those for which a function is prescribed, nothing happens.

If you click the mouse on the pan arrows when the list of ID - Names cannot be moved in the direction specified because the list does not proceed any further in that direction, nothing happens.

If you attempt to open a diagram when none have been previously created for this project you will receive the message 'No entries to choose.'; You must click the mouse when the cursor is on 'Continue' to resume. Use the 'New' option under Diagram instead of the 'Open' option.

The New Option exists under the DIAGRAM Menu header on the Business Information Diagram Screen and clicking the mouse when it is highlighted causes a pop-up window to appear that is used to input identifying and descriptive information for the new diagram.

You must be in the Business Information Diagram Screen to use the New Diagram option; it doesn't matter whether or not another Business Information Diagram is open to use this option. If you are in the Business Information Diagram Screen and you wish to open a new Business Information Diagram, then, using the mouse, place the arrow cursor so that the DIAGRAM Menu header is highlighted and click the mouse.

The menu options that include 'New' will appear under the menu header; move the arrow cursor to the New option using the mouse and, when it is highlighted, click the mouse. The pop-up window consists of a header line, the title 'New Business Info. Diagram', and a body which consists of a system generated Diagram ID and one field for input. The header line consists of the four functions: 'F1: HELP F3: LIST F5: DONE F10: CANCEL'. The input field, Diagram Name, may be up to 60 characters in length and is printed along with the project ID at the top of both the screen and plotted diagrams.

After the New Business Information Diagram window has appeared in the center of the screen, fill in the input field and press F5 to create a new diagram or press F10 to cancel the addition of a diagram at this time. If you pressed F5 and did not receive any error messages, a Business Information Diagram will appear with the ID and name that you have just entered.

To save all additions and changes to diagrams since the last save use the Save option.

The Save option is under the Diagram Menu header and saves all changes that have been made to any diagrams since the last save.

Position the cursor on the Diagram Menu header and click a mouse button. The Diagram Options will be displayed in a pull-down menu. Move the cursor to the Save option and click a mouse button again. The changes made to any diagrams since you invoked the Diagramming option on the Activity menu or last issued a Save will be made permanent. When the process is complete the control of the cursor will be returned to you.

To undo any changes that have not been made permanent by means of the Save Option or upon exiting a diagram using the Quit option use the Undo.

The Undo option is a means of retracting a set of changes without having to retract each component of the changes. This capability only exists for entries, additions, changes, and deletions that have been made since the last save option was performed.

Position the cursor on the Diagram Menu header and click a mouse button. The Diagram options will be displayed in a pull-down menu. Move the cursor to the Undo option and click a mouse button again. The window 'Are You Sure?' will appear and you must click a mouse button on 'Yes' or 'No' to continue. If you answer 'Yes', any changes made to any diagrams since you used the Save option will be lost and the diagram returned to the state that existed when you last saved the diagram. When the process is complete the control of the cursor will be returned to you.

Be certain that you really want to perform an undo of all work since you last saved your work since invoking this option causes ALL work since your last save to be irrevocably deleted.

To stop work on one diagram and begin work on another use the Close option.

The Close option removes a diagram from the screen and returns you to a state where you may Add or Open another diagram. All changes made to the currently open diagram will remain in effect as temporary changes until you select the Save option or the temporary files are made permanent when the Quit option is executed.

Position the cursor on the Diagram Menu header and click a mouse button. The Diagram options will be displayed in a pull-down menu. Move the cursor to the Close option and click a mouse button again. You will be asked to Select: Save, Undo, or Exit. If you chose 'Exit', any changes made to any diagrams since you invoked the Diagramming option on the Activity menu or used the Save option will be saved in temporary files. If you choose Undo, the diagram you close will be returned to the state that existed when you entered or last saved the diagram, whichever was more recent. If you choose Save, any changes you have made will be saved.

Be careful to not use the Close option and then think that changes made to the diagram are permanent when you have not used the Save option. Any Undo option will remove all changes made since the last Save on all diagrams.

The Delete Option exists under the DIAGRAM Menu header on the Business Information Diagram screen and deletes an existing Business Information Diagram. When the mouse is clicked on the Delete option a pop-up screen appears which lists the Business Information Diagram ID and Names of as many of the previously created diagrams as will fit in the window at a time. The pop-up window consists of a header line with HELP and CANCEL, the title, 'Business Information Diagrams' and a list of the available Business Information Diagrams listed below the title. Pan arrows are present in the upper right and lower right hand corners of the Business Information Diagram ID - Name list to make it possible to see any of the diagram ID - Names that do not fit in the window. Placing the cursor arrow on one of the pan arrows and clicking the mouse moves the list of diagram ID - Names in the direction of the arrow. Placing the cursor arrow on one of the diagram titles highlights the title, and, if the mouse is clicked, the dialog box 'Are you sure?' appears. You must choose 'Yes' or 'No'. If you choose 'Yes', the corresponding diagram and all associated control information is deleted from the MetaVision system.

To quit working on a Business Information Diagram use the Quit option on the DIAGRAM Menu. Executing this option returns you to the ACTIVITY Menu on the main options screen. All changes to the diagram on which you are working are saved in a set of temporary files until you enact the save option presented on exiting via the Quit option. Then they become part of the permanent copy of the database for the project on which you are working.

You may select the Quit option at any time by moving the cursor to the Menu header DIAGRAM and clicking a mouse button when the arrow cursor is displayed. You may need to click a mouse button a second time if the arrow cursor was not displayed before the first mouse button click; in this case the arrow cursor will be displayed after the first click on the menu heading.

The Change option under the EDIT menu header permits changing information relating to an icon that exists on the Business Information diagram that is currently open. Information is edited via dialog windows that are the same as the original input screens used at the time of creation of the icons.

You must have opened a diagram on the Business Info Diagram screen in order to edit the information for icons. Move the arrow cursor to the EDIT menu header (near or on the word Edit) and click a mouse button. The Edit options will appear under the EDIT menu header. Move the arrow cursor so the Change option is highlighted and again click a mouse button. The Edit options will be removed and a hand cursor will replace the arrow cursor. Move the hand cursor so that it points to the label of the icon for which you wish to change information and click a mouse button.

The icon you have pointed at will be highlighted and the dialog window for that type of icon will appear. Enter information in the fields of the dialog window just as you would when creating them except that you cannot modify the value in the ID field. When you are done press F5:DONE to have the changes go into effect; the system files will be updated and the modified icon will be displayed on the diagram.

The hand cursor will still be available so that you can move to another icon and change the information associated with it. When you are done changing information for icons, move the hand cursor off the diagram to the border of the screen and click a mouse button to have the arrow cursor reappear.

If you attempt to change the ID field for any icon, a pop-window with the error message 'ID change not yet implemented—use delete and add.' will be displayed and you must move the cursor to the word 'Continue' and click a mouse button to resume.

The Delete option is the second option under the EDIT menu header; it permits deleting any of the icons on a diagram. In addition to deleting the icon pointed to, other icons may also be deleted from the diagram in order to maintain the integrity of the relationships between the icons on the diagram.

You must have opened a diagram on the Business Information diagram screen in order to delete icons. Move the arrow cursor to the EDIT menu header (near or on the word Edit) and click a mouse button. The Edit options will appear under the EDIT menu header. Move the arrow cursor so the Delete option is highlighted and again click a mouse button.

The Edit options will be removed and a hand cursor will replace the arrow cursor; move the hand cursor so that it covers part of the name of the icon to be deleted and click a mouse button. The icon will be deleted along with any of the other icons that must be deleted to maintain the integrity of the diagram.

The hand cursor will still be available to be used to delete other icons on the diagram. When you are done deleting icons on a diagram, move the hand cursor so that it is in the border area of the screen and click a mouse button; the arrow cursor will replace the hand cursor. Occasionally the Business Info Diagram will appear a bit 'ragged' after an icon is deleted with a stray line or text; these may be removed by using the Repaint Menu option found on the far right of the Business Info Diagram screen.

There are no error messages that are displayed with this option; if you delete something, it is deleted unless you later use the Undo option under the DIAGRAM menu or the Undo option from the options window presented when you choose Quit from the DIAGRAM menu.

The Move option under the EDIT menu header is used to reposition icons on a Business Information diagram. Any icon may be moved to any position on the diagram that is visible. All connections between that icon and other icons on the diagram will be maintained. A hand cursor is used to indicate the icon to be moved.

You must have opened a diagram on the Business Info Diagram screen in order to edit the information for icons. Move the arrow cursor to the EDIT menu header (near or on the word Edit) and click a mouse button. The Edit options will appear under the EDIT menu header; move the arrow cursor so the Move option is highlighted and again click a mouse button. The Edit options will be removed and a hand cursor will replace the arrow cursor.

Move the hand cursor so that it is over part of the icon name and click a mouse button. A highlighted image will be 'attached' to the cursor and you may move it to anyplace on the screen; clicking the mouse again will cause the icon to be repositioned in that location and all other connecting arrow icons will be redrawn so that they maintain the same connections but with different routings. When a mouse button is clicked with the hand cursor on an icon, the icon is highlighted and may be moved to any position visible on the screen. Clicking a mouse button again causes the highlighted icon to be redrawn in the new position and all of the icons to which it is connected are also redrawn so that the connections are rerouted but maintained as they were before the icon was moved.

If an over-all perspective of icons on a Business Info Diagram page is needed in order to position the icons on the page, use the ZOOM menu options to make the whole diagram page visible on the screen. The page outline is indicated by the (yellow) border line; move the icons on the page to the position desired and then again use the ZOOM menu options to return the icons to full size.

For constraint icons the lines that can be moved depend on whether the icon was created using the Automatic or Manual routing technique. For either method the horizontal portions of the arrow going to or from other icons can be moved using the Move option. For Constraint icons created with the Manual routing technique either of the vertical portions of the arrow or the horizontal portion of the arrow that connects the two vertical portions can be moved using the Move option. For constraint icons created with the Automatic routing technique only the vertical portion of the icon can be moved using the Move option.

After the affected portions of the diagram have been redrawn, the hand cursor will still be available so that you can move it to another icon and move it without having to return to the EDIT menu header. To discontinue the move option place the hand cursor in the border area and click a mouse button; the hand cursor will be replaced by the arrow cursor and the move option will no longer be in effect.

If the screen has some 'ragged' portions after moving an icon, place the arrow cursor on the Repaint Menu header on the far right of the Menu Header line and click a mouse button; the screen will be redrawn to reflect only the information in the database.

Icons may be placed on top of one another but this is not advised since it will probably be difficult to separate them later; there should be no need to do this under normal circumstances.

It is possible to move icons outside the border of the page by moving them beyond the yellow boundary lines which indicate the edges of the page. Portions of the diagram beyond the edges of the page will not be printed or plotted.

Sometimes it may be difficult to click a mouse button precisely when the cursor is on the icon's label. Try to position the horizontal line in the hand directly over the horizontal line in a constraint icon, or try to center it in the process boxes.

To swap the position of two fields in a record or the vertical position of two identifiers on a record use the EDIT Swap option.

The order of Identifiers and Fields in records is originally determined by the order in which they were introduced to the diagram. Sometimes this order will not be most desirable at some later time. Instead of having to delete the record and re-enter the Field and Identifier information you may modify the order of fields and identifiers using the Swap option.

You must have opened a diagram on the Business Info Diagram screen in order to edit the information for icons. Move the arrow cursor to the EDIT menu header (near or on the word EDIT) and click a mouse button. The Edit options will appear under the EDIT menu header; move the arrow cursor so the Swap option is highlighted and again click a mouse button.

The Edit options will be removed and a pointer cursor will replace the arrow cursor; move the pointer cursor so that it is over the first Field or Identifier whose position is to be swapped and click a mouse button; the Field or Identifier will be highlighted. Move the pointer cursor to the other Field or Identifier to be swapped with the first and again click a mouse button. The positions of the two will be reversed.

The hand cursor will remain so that you may swap other icons' positions if desired; if you do not want to swap any more icons' positions at this time, move the pointer cursor to one of the borders and click a mouse button to leave the Swap mode and cause the arrow cursor to return.

Note that the Swap option may only be used within the bounds of a Record; the Fields involved must belong to the same Record and, similarly, the Identifiers involved in a Swap operation must belong to the same Record. If they are not you will obtain the Error Message window, 'Roles/Fields must belong to the same Sentence/Record'. You must click on 'Continue' to resume.

The EDIT Insert Field option permits you to add another Field to a Record after the initial entry of Fields at the time the Record was created has been completed.

You must have opened a diagram on the Business Info Diagram screen in order to use the EDIT Insert Field option. Move the arrow cursor to the EDIT menu header (near or on the word EDIT) and click a mouse button.

The Edit options will appear under the EDIT menu header; move the arrow cursor so the Insert Field option is highlighted and again click a mouse button.

The Edit options will be removed and a pointer cursor will replace the arrow cursor; move the pointer cursor so that it is over the Record to which a Field is to be added and click a mouse button.

A dialog window labelled Field Information will appear that is used to input information about the field that is to be added to the record.

The Field Information dialog window consists of the normal header functions, F1: HELP, F3: LIST, F5: DONE, and F10: CANCEL, along with a body containing a number of fields of data about fields to be input. F3:LIST is especially useful on this window since the same field may appear in several different records and it will be much easier to pick a formerly entered Field ID from a list that includes its name instead of keeping track of and re-entering its Field ID each time it occurs on a diagram.

Press F5 after you have completed the Field Information dialog window to invoke the Field Information dialog window again so that values may be input for the next field in the record. Do this as long as there are more fields for which data is entered. Discontinue entering fields by pressing F10 when the dialog window reappears after the last one has been entered by pressing F5.

The added Field icon will be placed at the end of the record pointed to by the pointer cursor. The position of the added field may be swapped with any other in the Record using the EDIT Swap option.

The EDIT Remove Field option permits you to remove a Field from a Record.

You must have opened a diagram on the Business Info Diagram screen in order to use the EDIT Remove Field option. Move the arrow cursor to the EDIT menu header (near or on the word EDIT) and click a mouse button. The Edit options will appear under the EDIT menu header; move the arrow cursor so the Remove Field option is highlighted and again click a mouse button.

The Edit options will be removed and a pointer cursor will replace the arrow cursor; move the pointer cursor so that it is over the Field to be removed and click a mouse button. The Record will be redrawn without the Field that has been removed. Any constraint icons attached to the Field will also be removed when the Record is redrawn.

If you try to remove the last Field in a Record, the error message 'A Sentence/Record must have at least one Role/Field' will appear. Use the Edit Delete option instead.

Use the ZOOM option to redraw the diagram in the window at some factor smaller or larger than its current size.

It is often desirable to enlarge a portion of a Business Info Diagram so that it fills the entire screen, since this makes editing of that portion of the diagram easier. A portion of a diagram is enlarged by outlining that portion using the Arbitrary option. The outlined portion will then fill the screen. All icons will be enlarged proportionally. Arrow icons will be lengthened to connect other icons appropriately. Names will occupy their normal positions on the icons. It should be noted that Names will only be displayed if the combination of zoom factor and font will allow. The normal CREATE, EDIT, ZOOM, SETUP, HYPERTEXT, HELP, and REPAINT options are available on the enlarged diagram.

In order to enlarge a portion of the diagram, you must have opened a diagram on the Business Info Diagram screen. To enlarge a portion of a diagram displayed on the screen use the Arbitrary option under the ZOOM menu header. Move the arrow cursor to the ZOOM menu header and click a mouse button. The ZOOM options will appear under the ZOOM menu header; 'Arbitrary' is the first option on the list. Select the Arbitrary option by moving the cursor until 'Arbitrary' is highlighted and clicking a mouse button; the menu options will disappear and a cross-hairs cursor will appear. Move the cross-hairs cursor to a corner of the portion of the screen to be enlarged and click a mouse button. Any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged. Vertical and horizontal lines will appear as the cursor is moved to indicate the bounds of the portion of the diagram that will fill the screen. Click the mouse a second time to establish the size and extent of the portion of the diagram to be enlarged; the portion outlined will be enlarged to fill the screen.

A portion of the enlarged diagram may again be expanded using the Arbitrary option, though this will usually not be necessary. The ZOOM ½× and 2× options may also be used on the results of using the Arbitrary option.

Mistakes are not identified as such explicitly by the system for this option; some actions, however, are not recommended or motivated.

If you move the cross-hairs cursor to a spot and click a mouse button twice on that same spot the diagram will be redrawn without any changes.

If you move the cross-hairs cursor to a spot on the border of the screen and click a mouse button the diagram will be redrawn without any changes.

If you expand a Business Info Diagram so that nothing is showing on the screen you will not see the relation of the expanded portion to other icons.

If you expand a portion of a diagram that lies entirely within a Record Box and then create a Record Box on the expanded screen, the edges of the new Record Box will not be visible, and when you return to a more standard size the new Record Box will partially or completely overlap the original so that it may be difficult to separate the two boxes.

The complete Business Info Diagram may be viewed on the screen at one time by means of the ZOOM Fit Screen option. Appropriate magnification factors are calculated by the system to make the diagram fit on the screen; the yellow line that appears indicates the boundaries of the page on which the diagram fits. The page size is determined by the SETUP menu option. The diagram will not always fill the screen if its height or width is extreme, but the boundaries of the diagram will always be visible.

You must have opened a diagram on the Business Info Diagram screen in order to use the Fit Screen option. To use the option move the arrow cursor to the ZOOM menu header (near or on the word ZOOM) and click a mouse button. The ZOOM options will appear under the ZOOM menu header. Select the Fit Screen option by moving the cursor so that 'Fit Screen' is highlighted and click a mouse button. The menu options will disappear and the screen will be redrawn so that the boundaries of the diagram, indicated by yellow lines, will appear.

If the page size is much greater in one dimension than in the other (say, 30 by 7.5 inches) the Fit Screen option may not be very helpful, since the page may be too narrow to display the icons in a recognizable way. It may be better to use other ZOOM options such as Arbitrary and ½× to place the icons on the page.

The Fit Screen option is useful for rough placement of icons on the diagram and in selecting a portion of the page to edit at a larger size. The Fit Screen option may be required when routing connections between widely spaced icons since you can only join icons that appear on the screen together.

If you change the page size, the ZOOM Fit Screen option will have to be executed again to fit the new page size on the screen. Many or all of the icon names may be suppressed, so that you will not be able to identify the individual icons except by their shape, position, and your memory; you can, however, still edit them in the normal way.

Only a part of the Business Info Diagram will normally be visible on the screen at one time, since the size of the screen where diagram editing is performed is not usually the same size as the paper on which the diagram will be printed. Use the ZOOM Actual option to see a portion of the diagram with the icons the same size as they will be when plotted. You may move the view of the screen by means of the pan bars along the bottom and right of the screen to see any portion of the diagram that you wish.

You must have opened a diagram on the Business Info Diagram screen in order to use the ZOOM Actual option. Move the arrow cursor to the ZOOM menu header and click a mouse button. The ZOOM options will appear under the ZOOM menu header. Select the Actual option by moving the cursor so that Actual is highlighted and click a mouse button. The menu options will disappear and the screen will be redrawn so that the icons will be labeled and be the size they will be when they are printed or plotted.

In order to see as much as practical of a Business Info Diagram while still seeing all of the icon names, you will normally work on it at Actual size; this is the default size that is used when you initially create a new Business Info Diagram.

Often a diagram will be too big to see all the components and their relationships at once. The ZOOM ½× option provides the means to shrink a diagram by 50%. The option may be repeated and the diagram shrunk even smaller, or used before or after other ZOOM options. Use the ½× option to 'undo' the 2× option.

In order to use the ZOOM ½× option, you must have opened a diagram on the Business Info Diagram screen. Move the arrow cursor to the ZOOM menu header and click a mouse button. The ZOOM options will appear under the ZOOM menu header. Select the ½× option by moving the cursor so that ½× is highlighted and click a mouse button. The menu options will disappear and the screen will be redrawn so that the icons will be half the size they were before the option was selected.

It is possible to reduce the size of the diagram to the point where it almost disappears. You will have problems selecting icons if you try to edit a diagram when it is in a very reduced size, and if you Create an icon when the diagram is at a reduced size you will have minimal control over its position with respect to other icons on the diagram.

Often a diagram will be too small to easily edit the components and their relationships. The ZOOM 2× option provides the means to expand the diagram to twice its size before executing the ZOOM 2× option. This option may be repeated and the icons made even larger, or it may be used before or after other ZOOM options. The 2× option may be used as an 'undo' of the ½× option.

In order to use the ZOOM 2× option, you must have opened a diagram on the Business Info Diagram screen. Move the arrow cursor to the ZOOM menu header and click a mouse button. The ZOOM options will appear under the ZOOM menu header. Select the 2× option by moving the cursor so that 2× is highlighted and click a mouse button. The menu options will disappear and the screen will be redrawn so that the icons will be twice the size they were before the option was executed; only half as much of the diagram will be displayed on the screen.

If you repeatedly apply the 2× option to a diagram you will eventually not see any of the icons for the diagram on the screen.

If you add icons to the diagram when it is this size you will not be able to see them, since they will be enlarged to be the same size as other icons.

The ZOOM Enter Zoom option allows an arbitrary zoom factor to be entered so that a diagram may be displayed at any size. This is an absolute zoom factor. If 1.0 is entered, the result is the same as selecting the Actual option. Trial and error will quickly give you experience in choosing a specific zoom factor appropriate for your purpose.

You must have opened a diagram on the Business Info Diagram screen in order to use the Enter ZOOM option. Move the arrow cursor to the ZOOM menu header and click a mouse button. The ZOOM options will appear under the ZOOM menu header. Select the Enter Zoom option by moving the cursor so that 'Enter Zoom' is highlighted and click a mouse button; the menu options will disappear and the Zoom Factor dialog box will be displayed with the current zoom factor. Enter a larger or smaller value and press the F5 key to register your selection. This selection will remain active as the default selection until you again change it for this diagram.

A non-positive zoom factor is not permitted.

Often a diagram will be too big to see all the components and their relationships at once; the ZOOM 75% option provides the means to shrink the diagram to 75% of its actual size. The arrow icon names will not be displayed at this size and only a portion of the Data Source/Sink and Process Box Names will be displayed along with the ID's for the Data Source/Sink and Process Box icons.

You must have opened a diagram on the Business Info Diagram screen in order to use the ZOOM 75% option. Move the arrow cursor to the ZOOM menu header and click a mouse button. The ZOOM options will appear under the ZOOM menu header. Select the 75% option by moving the cursor so that '75%' is highlighted and clicking a mouse button. The menu options will disappear and the screen will be redrawn so that the icons will be ¾ the size they would be had the Actual option been chosen.

Use this option to set the size of the diagram, shift the entire diagram on the page, and set the grid for the diagram.

The Page Size option exists under the SETUP menu header. It provides the capability of changing the size of the diagram page that appears on the screen or that will be printed or plotted. Edges of the page are indicated on the screen by means of a thin (yellow) line. Page sizes are connected to each diagram independently, so they need to be set for each diagram if they differ from the default values.

You must have opened a diagram on the Business Info Diagram screen in order to set the page size using the SETUP Page Size option. Move the arrow cursor to the SETUP menu header and click a mouse button. The SETUP option Page Size will be highlighted under the SETUP menu header; click a mouse button a second time to invoke the option.

The Page Size dialog window will appear; it consists of a header line, the title 'Page Size' and 2 input fields. The header line includes the normal functions. The body of the window consists of two input fields, Page Width and Page Height, which are each 7 digits. The values input should be numbers and may contain a decimal point; other non- numbers are not supported. Press F5 to have the new page size established. F10 will leave the dialog window without changing the size of the page. Shortly the diagram will be redrawn with the new page edges indicated by the thin (yellow) line. If the diagram doesn't fit on the resized page, it may be necessary to use the ZOOM Fit Screen option.

Diagrams are printed or plotted either rotated or not rotated, depending on whether the orientation is set to Portrait, which is the default value, or Landscape, which rotates the output 90 degrees clockwise from the way it appears on the screen. You need to take this into account when setting the page size using this option, especially if you want all of the diagram to print on a single page.

Another consideration in determining page size is whether the Paper is set to Narrow, which is the default value, or to Wide. In Narrow mode the diagram will be printed using a value of 8.5"×11" for the paper size and the printer driver will write on an 7.5"×10" area of the paper. In Wide mode the diagram will be printed using a value of 14"×11" for the paper size and the printer driver will write on a 13"×10" area of the paper. A consequence of this is that if you want to print a diagram on a single 8.5"×11" page using Portrait, the page size should not be more than 7.5"×10"; for Landscape, the page size should not be more than 10"×7.5". If the printout will not fit on a single sheet, the printer driver automatically continues printing or plotting on successive sheets; the parts of the page can then be cut and pasted together.

If the diagrams are to be presented in book form and a diagram cannot fit on a single page, it is usually best to print it in Portrait mode with the Page Width in increments of 7.5" and a Page Height of 10". This will allow the cut and pasted diagram to neatly fold out of the binder.

If you select the Page Size Option without having first opened a diagram, a pop- up error window will appear with the message 'No Business Info Diagram open'; you must click a mouse button with the cursor on 'Continue' to resume.

If you select the F3: LIST option in the dialog window, a pop-up error window will appear with the message 'No list available'; you must click a mouse button with the cursor on 'Continue' to resume If you enter a non-numeric value for any digit in the height or width field, a pop-up error window will appear with the message 'Illegal floating-point value'; you must click a mouse button with the cursor on 'Continue' to resume. Decimal points, not fractions, must be used for non-integer page sizes.

Dgm. Shift The Dgm. Shift option exists under the SETUP menu header. It provides the capability of shifting the entire diagram on the page.

You must have opened a diagram on the Business Info Diagram screen in order to shift the diagram on the page using the SETUP Dgm. Shift option. Move the arrow cursor to the SETUP menu header and click a mouse button.

The Diagram Shift dialog window will appear; it consists of a header line, the title 'Diagram Shift' and 2 input fields. The header line includes the normal functions. The body of the window consists of two input fields, X Shift and Y Shift, which are each 7 digits. The values input should be numbers and may contain a decimal point; other non-numbers are not supported. Press F5 to shift the diagram on the page by the input values. F10 will leave the dialog window without shifting the diagram. Shortly the diagram will be redrawn with the new page edges indicated by the thin (yellow) line. If the diagram doesn't fit on the shifted page, it may be necessary to use the ZOOM Fit Screen option.

If you select the Diagram Shift Option without having first opened a diagram, a pop-up error window will appear with the message 'No Business Info Diagram open'; you must click a mouse button with the cursor on 'Continue' to resume.

If you select the F3: LIST option in the dialog window, a pop-up error window will appear with the message 'No list available'; you must click a mouse button with the cursor on 'Continue' to resume.

If you enter a non-numeric value for any digit in the X Shift or Y Shift field, a pop- up error window will appear with the message 'Illegal floating-point value'; you must click a mouse button with the cursor on 'Continue' to resume. Decimal points, not fractions, must be used for non-integer shift values.

The Grid option exists under the SETUP menu header. It provides the capability of setting an invisible grid of variably-spaced vertical and horizontal lines to which the icons that you create will automatically snap when you create them.

You must have opened a diagram on the Business Info Diagram screen in order to set the grid using the SETUP Grid option. Move the arrow cursor to the SETUP menu header and click a mouse button. Move the arrow cursor to the Grid option and click again.

The Grid Status Dialog Box will appear; it consists of a header line, the title 'Grid Status' and 3 input fields. The header line includes the normal functions. The body of the window consists of three input fields, Grid Status, Grid X and Grid Y. Grid Status is a one-digit field which should contain either an 'I' for 'Inactive' or an 'A' for 'Active' as you prefer. The default value is 'I'. Either capital or lower case letters are acceptable. If anything other than an 'A' or 'I' is input, you will get the error message 'Grid Status must be 'A' or 'I' when you hit F5. The fields Grid X and Grid Y are each 5 digits. The values input should be numbers and may contain a decimal point; other non-numbers are not supported. Press F5 to place the invisible grid on the page. F10 will leave the dialog window without changing the previous grid status.

If you select the Grid Option without having first opened a diagram, a pop-up error window will appear with the message 'No Business Info Diagram open'; you must click a mouse button with the cursor on 'Continue' to resume.

If you select the F3: LIST option in the dialog window, a pop-up error window will appear with the message 'No list available'; you must click a mouse button with the cursor on 'Continue' to resume.

If you enter a non-numeric value for any digit in the Grid X or Grid Y field, a pop-up error window will appear with the message 'Illegal floating-point value'; you must click a mouse button with the cursor on 'Continue' to resume. Decimal points, not fractions, must be used for non-integer grid values.

The Hypertext Menu options allow you to view supporting information for any Icon.

To see the MetaVision supporting (non- graphic) information for any icon on a diagram use the HYPERTEXT View option. The information relating to the icon will be displayed in a window similar to the EDIT Change dialog window, except that no changes are permitted.

To invoke the HYPERTEXT View option, pull down the menu under the menu header HYPERTEXT by highlighting the option and clicking a button on the mouse. Then move the mouse so that the cursor moves to a position that highlights the option View and click a mouse button again. The arrow cursor will be replaced by a pointer cursor that may be moved using the mouse. Move the pointer cursor to the diagram whose corresponding database information you wish to examine and click a button on the mouse again.

A window will appear with the field values of information to which the icon corresponds. The field values are displayed in a format similar to the dialog window via which information for the icon was initially entered and by which it is optionally changed.

When you have finished examining the information that relates to an icon, press F5 or F10 to retain the pointer cursor on the screen so that you can point at another icon and examine information about it as well. To remove the pointer cursor and revert to the arrow cursor, click a button on the mouse when the cursor is in any border area.

Help in MetaVision is a context- sensitive system that closely mirrors the documentation presented here. Enter the HELP system by placing the cursor on the word HELP in the far right of the menu options along the top of the screen and click a button on the mouse.

A Help window will be displayed in the middle of the screen which contains three items across the top: HELP, HELP, and CANCEL. The left HELP may be used for accessing the information contained in this section on how to use the HELP system. The HELP in the top- center of the window identifies that you are in the Help system. You may leave the Help system by placing the cursor on CANCEL in the upper right of the window and clicking a button on the mouse.

A list of the Help topics that relate to the currently displayed set of menus is displayed when the Help system is initially invoked. Pick the topic on which you desire help by highlighting the topic and clicking a button on the mouse. When you have picked a topic, the subtopics or text relating to the topic you chose will be displayed. If there are more topics or text than will fit on the screen, you may pan down the list or text by placing the cursor on the downward- pointing arrow in the lower right corner of the window and clicking a button on the mouse. Similarly, you may move up the list of topics or text by placing the cursor on the upward- pointing arrow in the upper right of the Help system window.

The four options listed along the bottom of the Help system window allow you to see help on other topics. Placing the cursor on 'NEXT' will display the topics or text for the topic which immediately follows the currently-selected topic. Placing the cursor on 'PREV' will display the topics or text for the topic which is immediately previous to the currently selected topic.

Choosing the 'LEVEL UP' option moves you to the set of topics of which the currently selected topic is a member. 'TOPICS' displays a selection list of topics that are related to the option for which Help is currently displayed.

If the screen has some 'ragged' portions after editing, place the cursor on the Repaint Menu header on the far right of the Menu Header line and click a button on the mouse. The screen will be redrawn to reflect only the information in the database.

When the REPORT GENERATION option on the Activity List is selected, a list of the available reports is presented. When a report is selected, you will be asked whether to send the report to the Screen, to the default System Printer, or to a File.

If you choose to have the report sent to a file, you will be asked for the name of the file in which the report will be stored.

The following sections give a brief description and a sample of all the Business Information Diagram Reports.

The Business Information Diagram Records Report shows the ID and Title of the Diagram as well as the Record ID, Record Name, and Record Description for every record on the diagram.

The Business Info Diagram Records And Key Fields Report shows the ID and Title of the Diagram as well as the Record ID, Record Name, and information about each field in every Record. The fields are listed in numeric order, by Record ID, as defined in the Record.

If a field is a Key Field it is noted as such and the name of the Index File associated with that key will be displayed if it has been provided.

The Field Names Report shows the Name and ID of all Fields. It is sorted in alphabetic order by the Field Name.

The Field Names By ID Report shows the Id and Name of all Fields. It is sorted by the Field ID.

The System Data Requirements (Fields) Report shows the ID, Role Name, Field Name, Description, field characteristics, Use Type, and Common ID and Name.

The Report/Form/Packet List Report shows the Name and ID for all RFP's. It is sorted alphabetically by Name.

The Report/Form/Packet List By ID Report shows the ID and Name for all RFP's. It is sorted numerically by ID.

The Report/Form/Packet Description Report shows the ID, Name, and Description for all RFP's. It is sorted alphabetically by RFP Name.

The RFP/Business Info Diagram Cross Reference Report shows where an RFP is used on a Business Information Diagram. The ID and Name of the Diagram as well as the ID and Name of each Record on the Diagram that uses information from an RFP is displayed, in numeric order of Model ID and RFP ID.

The Constraint Report shows how the records on a Business Information Diagram are related to each other. The Constraint ID, Type, Expression, Description, as well as data about the records and the fields of the records that are joined by a Constraint are displayed in numeric order by Constraint ID.

The Plotting Option provides the capability of producing hardcopy output of any diagram produced using MetaVision. The diagram may be sent to a plotter or printer. The diagram to be plot/printed is selected from the available diagrams by means of a selection list box. A number of formatting options are provided by means of a dialog box labeled 'Plot Information'. Input fields on the dialog box are used to record: Text Size, Title Size, Zoom Factor, Left Margin, and whether the output is to be sent to a plotter or printer and if you wish to print all diagrams.

Choose the Plotting option under the Activity Menu heading on the Main Menu screen to print or plot a MetaVision diagram. A selection list box will be presented for the diagrams available to be plot/printed and you may select from this list in the normal manner. The dialog box labeled 'Plot Information' appears and you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/-print process. When the process is complete the Activity Menu options will again be displayed and control will be returned to you.

The Text Size and Title Size fields must contain integer or decimal values greater than 0.

The Margin field must contain an integer or decimal value greater than 0.

The Zoom Factor field must contain an integer or decimal value greater than 0.

DESCRIPTION is printed. If the diagram meets the constraint, a sentence to that effect is printed. If the diagram does not meet the conditions of the constraint a list of the offending elements is given, with a sentence explaining how they violate the constraint. A variety of types of constraint checks are possible. Metavision prompts for these in turn with a dialog window that requires that a mouse button be clicked with the cursor on either Yes or No, indicating that the type of validation check noted is to be performed. The queries are as follows.

| | |
|---|---|
| Do database constraint validation? | |
| Yes | No |
| Check that all Sentences/Records have identifiers/keys? | |
| Yes | No |
| Check for redundant identifiers/keys? | |
| Yes | No |

Once you have answered all of these questions, a dialog window will appear asking if you want the report written to a file, the printer, or the screen. Choosing file will cause a dialog window to appear prompting for the Path Name. You should enter the path name and file name to which the report file is to be sent. Choosing printer will cause the report to be sent to your default printer. Choosing screen will cause the report to be shown on your screen.

To add data directly to the MetaVision information database, use the Add to File Option. The Add to File option permits adding data directly to the MetaVision information stored in dBASE III database files. This is the same information that is normally updated via the diagram screens and dialog boxes.

Choose Business Modelling from the Methodology Menu, Business Info. Diagram from the Data Menu, and the Data Dictionary option from the Business Info. Diagram Activity Screen. Choose Edit, and Add to File on the 'Business Info. Diagram Updates' screen. You may then add information directly into the MetaVision databases. A selection list of file updaters will be presented from which you may choose by highlighting the desired updater and clicking a button on the mouse.

Some of the updaters will not work for the Add to File option and you will be presented an error message window with a message to that effect. The same list of updaters is given for all three EDIT options, Add to File, Modify File, and Delete File Elements although they do not all work for all three options.

The updaters and their associated files and fields are described below.

The Business Info Diagram Record updater is used to enter information about a Business Info Diagram, its ID, Record ID, Record Name and Record Description, as well as Location information, File Name, File Type, and Queue ID.

The Field selection only permits deleting elements. You will obtain the 'Illegal Relational Operation' message in an Error Window if you select this.

The Key selection only permits deleting elements. You will obtain the 'Illegal Relational Operation' message in an Error Window if you select this.

The Constraint selection only permits deleting elements. You will obtain the 'Constraint add not allowed.' message in an Error Window if you select this.

The Role ID Change selection only permits modifying elements. You will obtain the 'Illegal Relational Operation' message in an Error Window if you select this.

The Constraint/Record updater permits additions to information about Constraints including the records and routing involved.

The Constraint/Fields updater identifies the fields involved in a constraint. The information is entered via a dialog window.

The Picture Information updater is used to enter data about a diagram as a whole. The information is entered via a dialog window.

The Key/Record updater is used to add information relating to the relative position and type of identifiers (keys) in a record.

The Key/Field updater is used to identify the fields that comprise a key.

The Business Info Diagram Record Information updater is used to enter information about a Business Info Diagram, its ID, Record ID, Record Name and Record Description as well as locational information and File Name and Type and Queue ID.

The Record/Field updater connects Database Records and Field IDs.

The Field Information updater is for entering details about Fields on a diagram.

The RFP/Business Info Diagram updater is for entering the relationships between IDs for RFPs, Diagrams, Records, and Fields.

The Free Text updater is for entering the content, ID, and location and font information for free text to a diagram directly.

To change information in the MetaVision information databases without using the MetaVision diagramming tool and dialog boxes use the Modify File option using the Data Dictionary option under the Activity Menu.

The Modify File option permits changing data directly already added to the MetaVision information stored in dBASE III database files. This is the same information that is normally updated via the diagram screens and dialog boxes.

Choose Business Modelling from the Methodology Menu and the Data Dictionary option from the Data Menu on the Main Menu Screen. A different screen will be drawn with the menu header EDIT and the option Modify File under it along with some other options. Choose the Modify File option by moving the cursor so that Modify File is highlighted and click a button on the mouse. A selection list of file updaters will be presented from which you may choose by highlighting the desired updater and clicking a button on the mouse. You may then change information directly in the MetaVision databases.

Some of the updaters will not work for the Modify File option and you will be presented an error message window with a message to that effect. The same list of updaters is given for all three EDIT options, Add to File, Modify File, and Delete File Elements although they do not all work for all three options.

The updaters and their associated files and fields are described below.

The Business Info Diagram Record is a relational operation that can not be modified. The message 'Illegal Relational Operation.' will appear if you select this and you must click a mouse button with the cursor on 'Continue' to resume.

The Field is a relational operation that cannot be modified. The message 'Illegal Relational Operation' will appear if you select this and you must click a mouse button with the cursor on 'Continue' to resume.

The Key is a relational operation that can not be modified. The message 'Illegal Relational Operation.' will appear if you select this and you must click a mouse button with the cursor on 'Continue' to resume.

The Constraint is a relational operation that can not be modified. The message 'Constraint add not allowed.' will appear if you select this and you must click a mouse button with the cursor on 'Continue' to resume.

The Role ID Change option allows you to change a Role ID from one number to another, and, when F3 is hit, allows you to select IDs and names from a list. First, the following screen appears:

Role ID to change
Enter ID: _

When you are done and press F5 , the following screen appears:

Change Role ID to:
Enter ID: _

Again, you may select from a list using the F3 option.

The record to be modified for the Constraint/Record file is identified on the selection list by the fields Diagram ID, Constraint ID, and Constraint Name. Choose the one you wish to modify from the list presented, highlight it, and click a mouse button. The following screen will be presented with the existing information already filled in. Change what you wish and hit F5.

The record to be modified for the Constraint/Fields file is identified on the selection list by the fields Diagram ID, Constraint ID, Record ID and Field ID.

The record to be modified for the Picture Information file is identified on the selection list by the fields Diagram ID and Diagram Name.

The record to be modified for the Key/Record file is identified on the selection list by the fields Diagram ID, Key ID, and Record ID:

The record to be modified for the Key/Field file is identified on the selection list by the fields Diagram ID, Key ID and Field ID.

The record to be modified for the Business Info Diagram Record Information file is identified on the selection list by the fields Diagram ID and Record ID.

The record to be modified for the Record/Field file is identified on the selection list by the fields Diagram ID, Record ID and Field ID.

The record to be modified for the Role/Field Information file is identified on the selection list by the Field ID and Role Type.

The RFP/Business Info Diagram updater is for modifying the relationships between IDs for RFPs, Diagrams, Records, and Fields. The record to be modified is identified by the fields RFP ID, Diagram ID, Record ID, and Field ID. A dialog window used to modify the information.

The Free Text updater is for modifying the content, ID, and location and font information for free text directly. The Selection box shows Diagram ID, Text ID, and Text to choose from.

To delete File Elements via the Data Dictionary option select the option and a selection list of files will be presented. When a file has been selected using the mouse and cursor, a selection list of values that identify the file elements is presented from which you may choose the element to be deleted. The identifying values are those listed under the previous option, Modify File. When you select an item by clicking a button on the mouse when the item is highlighted, the corresponding record will be deleted.

Note that there is no 'Undo' for this option so that items that are deleted are permanently deleted unless they are reentered.

To quit deleting file elements use the CANCEL option provided in the upper right hand corner of the selection list.

Choosing Role/ID Change will bring up the error window 'Illegal Relational Operation'. This option is active only under Modify File.

In addition to the options listed under Modify File, there are two extra options for deleting elements directly, as follows.

The Key option is for deleting the information about a key directly. The Selection box shows Diagram ID, Key ID, and Field ID to choose from.

The Constraint option is for deleting the information about a constraint directly. The Selection box shows Diagram ID, Constraint ID, and Constraint Description to choose from.

To end changing data in the MetaVision information databases directly use the Quit option.

Help in MetaVision is a context sensitive system that closely mirrors the documentation presented here. You enter the HELP system by placing the cursor on the word HELP in the far right of the menu options along the top of the screen and click a button on the mouse.

A Help window will be displayed in the middle of the screen which contains three items across the top HELP, HELP, and CANCEL. The left HELP may be used for accessing the information contained in this section on how to use the HELP system. The HELP in the top-center of the window identifies that you are in the help system. You may leave the help system by placing the cursor on CANCEL in the upper left of the window and clicking a button on the mouse.

A list of the help topics that relate to the currently displayed set of menus is displayed when the help system is initially invoked. You pick the topic on which you desire help by highlighting the topic and clicking a button on the mouse. When you have picked a topic, the subtopics or text relating to the topic you chose will be displayed. If there are more topics or text than will fit on the screen you may move down the list or text by placing the cursor on the downward pointing arrow in the lower right corner of the window and clicking a button on the mouse. Similarly, you may move up the list of topics or text by placing the cursor on the upward pointing arrow in the upper right of the help system window.

The four options listed along the bottom of the help system window allow you to see help on other topics. Placing the cursor on 'NEXT' will display the topics or text for the topic which immediately follows the currently selected topic. Placing the cursor on 'PREV' will display the topics or text for the topic which is immediately previous to the currently selected topic.

Choosing the 'LEVEL UP' option moves you to the set of topics of which the currently selected topic is a member. 'TOPICS' displays a selection list of topics that are related to the option for which help is currently displayed.

When the MAINTENANCE REPORT option on the Activity List under Business Info. Diagrams is selected, a list of the available reports is presented. When a maintenance report is selected, you will be asked whether to send the report to the Screen, to the default System Printer, or to a File.

If you choose to have the report sent to a file, you will be asked for the name of the file in which the report will be stored.

The following sections give a brief description and a sample of all the Business Information Diagram Maintenance Reports.

The Business Info Diagram Record (ESR) Report shows the information about each record on a Diagram as it is stored in file ESR.DBF.

The Field Information (SP) Report shows the information about each field and Role in every record on a Diagram as it is stored in file SP.DBF. It is listed numerically by Field ID.

The Business Info Diag. Record/Field (ESFLD) Report shows the information about each field in every record on a Diagram as it is stored in file ESFLD.DBF. It also displays the Diagram Name.

The Key/Business Info Diagram (ESKEY) Report shows the information about each Key in every record on a Diagram as it is stored in file ESKEY.DBF. The information is listed by Diagram Name and ID.

The Key/Field (ESKFLD) Report shows the information about each field in every Key in all records on a Diagram as it is stored in file ESKFLD.DBF. It lists the information by Diagram Name and ID.

The Constraint/Business Info Diag. Record (ESCNS) Report shows information about each Constraint between records on a Diagram as it is stored in file ESCNS.DBF. It lists the information by Diagram Name and ID.

The Constraint/Field (ESCFLD) Report shows the information on the fields in each record that are related by a Constraint on the Diagram as it is stored in file ESCFLD.DBF. The information is listed by Diagram Name and ID.

The RFP/Business Info Diag. Fields (RFPESF) Report shows a cross reference between the fields in a Record and the RFP to which they belong for a Diagram as stored in file RFPESF.DBF. It lists the information by Diagram Name and ID.

To combine the data from two different projects into a single project, use the File Import/Merge option under the DATA, Business Info Diagram Menu on the Main Menu screen.

Input the name of the path of the project to be incorporated into the current project path by means of a dialog box. Besides the normal header functions there is a single input field, Path Name: which is 30 characters wide, in which you should place the path name for the project to be incorporated into the current project. The incorporated project path name may include a drive specifier. If the project path is found the data from it are incorporated into the currently open project.

Use the FILE EXPORT activity to output the information for a project to a set of dBASE III files that can be used to transfer information from one work station to another. This becomes especially useful when several people are working on a single project and it is time to integrate the pieces on one machine.

After clicking a mouse on the FILE EXPORT option a dialog window entitled Destination will appear with the normal header line of F1: HELP, F3: LIST, F5:DONE, and F10:CANCEL. The body of the dialog window consists of a single field, Path Name, which should be filled in with the path name for the subdirectory to which the current project information is to be written. Do not include the final '\' for the directory; e.g. 'a:', NOT 'a: ', to export the current project files to the a: drive root directory.

All of the information for the current project is automatically written to files in the subdirectory with the entered path name.

When several persons are working on the same project it is the responsibility of the project leader to assign non-overlapping sets of Diagram and Icon IDs to the individual team members. If there is overlap, difficulties will be encountered at the point that the parts are to be merged on a single computer under the same project name. The dBASE III files will contain duplicate keyed information and this will seriously jeopardize the integrity of the control information.

To return to the main menu place the arrow cursor on the EXIT command and click a mouse button. This has the same effect as placing the cursor on the CANCEL option in the upper right hand corner of the activity list and clicking a mouse button.

The What If menu option under the main menu header DATA prints a report indicating the affected portions of your project if a DATA ID is changed. The report may be printed to a file, the screen, or the printer.

To use the What If option under the DATA menu header pull down the menu under DATA by highlighting DATA and click a button on the mouse. Highlight What If by moving the cursor using the mouse and click a button on the mouse to activate the What If option.

A dialog window will appear that provides for inputting from the keyboard, or selecting from a list of available Data IDs, the Data ID for the process to be changed for the report that follows. The window is entitled 'What If Data ID Changed' and consists of the normal header functions F1: HELP, F3: LIST, F5: DONE, and F10: CANCEL, and a single input field Enter ID. You may either enter a Control ID and press F5 for done or press F3 to see a list of Data IDs and Data Names for the project on which you are working.

When you have entered a Data ID or selected one, a set of output options will be presented in a window. The options include: File, Screen, or Printer. Place the cursor in the box next to the desired option and click a mouse button. If you select the File option a dialog window appears that is used for inputting the name of the output file.

The window is simply entitled File: and the input field is labelled Path Name:. Enter a complete file name including drive and path specifications and press F5.

If you select the Printer option the report will be sent to the printer. Note that the report requires that you have your printer set for at least 132 columns wide so that the report will be printed with a report row on a single row of output.

If you select the Screen output option the report will be printed to your screen. Several options are provided for viewing the report on your screen including (L)Line, (S)Screen, (P)Pan, (W)Window, (C) Continuous, (R)Restart, and (Q)Quit.

Whichever output you select the report will have the general form of the following which has been modified by minimizing spaces in columns to make the report fit on the page here. The items listed in each column are the names of the PROCESS, DATA, CONTROL, or SUPPORT that will be affected by deletion of the chosen Data ID.

The Matrix Diagram menu item under DATA gives you the capability of seeing or plotting a matrix representation of the Data Source/Sinks verses the Report/Form/Packet information you have created under the Data Diagram menu item.

To select the Matrix Diagram menu item, click on DATA on the main menu screen after having opened a project and chosen the Business Modeling Method. Select Matrix Diagram by moving the cursor and clicking a button on the mouse when Matrix Diagram is highlighted.

The normal activity list will be displayed. However, only the DIAGRAMMING and PLOTTING activities are active on this list. Select the activity you want or move the cursor so that EXIT or CANCEL is highlighted to leave the Matrix Diagram activity list.

The DIAGRAMMING activity for the Matrix Diagram option provides the capability of viewing the Matrix Diagram and changing the ZOOM factors related to the diagram. The contents of this diagram are generated from the information entered for the Data Diagrams for a project. The diagram consists of a matrix of Data Source/Sinks verses RFP information.

To select the DIAGRAMMING activity from the Activity List, move the arrow cursor so that DIAGRAMMING is highlighted and click a button on the mouse. After a short time the Process Diagramming screen will be displayed.

Since this is a generated diagram, the CREATE and EDIT options are not needed; since there is only a single Matrix Diagram per project there is no need for the HYPERTEXT menu options.

The DIAGRAM menu contains a single option, QUIT. All of the matrix for a project is displayed on a single diagram so that there is only one per project.

The Quit Option exists under the DIAGRAM Menu header in the Matrix Diagram screen and causes the current diagram to be closed and the Main Menu Screen to be displayed.

You must be in the Matrix Diagram screen to use the Quit option. If you are in the Matrix Diagram Screen and you wish to access another part of MetaVision, then, using the mouse, place the arrow cursor so that the DIAGRAM Menu header is highlighted and click the mouse; if another menu is pulled down you will have to click the mouse a second time since the first only pulled up the previous menu.

The menu option 'Quit' will appear under the menu header; move the arrow cursor to the Quit option using the mouse and, when it is highlighted, click a button on the mouse. The Main Menu screen will be displayed after a few seconds; the message 'One Moment Please . . . ' will initially be displayed in the top center of the screen but any of the options on the Main Menu screen will presently be available. If you wish to exit MetaVision completely at this time, you may move the arrow cursor to the PROJECT menu and pick the Quit option there.

Use the ZOOM option to redraw the diagram in the window at some factor smaller or larger than its current size.

It is often desirable to enlarge a portion of a Matrix Diagram so that it fills the entire screen, since this makes viewing of that portion of the diagram easier. A portion of a diagram is enlarged by outlining that portion using the Arbitrary option. The outlined portion will then fill the screen. It should be noted that Names will only be displayed if the combination of zoom factor and font will allow.

To enlarge a portion of a diagram displayed on the screen use the Arbitrary option under the ZOOM menu header. Move the arrow cursor to the ZOOM menu header and click a mouse button. The ZOOM options will appear under the ZOOM menu header; 'Arbitrary' is the first option on the list. Select the Arbitrary option by moving the cursor until 'Arbitrary' is highlighted and clicking a mouse button; the menu options will disappear and a cross-hairs cursor will appear. Move the cross-hairs cursor to a corner of the portion of the screen to be enlarged and click a mouse button. Any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged. Vertical and horizontal lines will appear as the cursor is moved to indicate the bounds of the portion of the diagram that will fill the screen. Click the mouse a second time to establish the size and extent of the portion of the diagram to be enlarged; the portion outlined will be enlarged to fill the screen.

A portion of the enlarged diagram may again be expanded using the Arbitrary option, though this will usually not be necessary. The ZOOM $\frac{1}{2}\times$ and $2\times$ options may also be used on the results of using the Arbitrary option.

Mistakes are not identified as such explicitly by the system for this option; some actions, however, are not recommended or motivated.

If you move the cross-hairs cursor to a spot and click a mouse button twice on that same spot the diagram will be redrawn without any changes.

If you move the cross-hairs cursor to a spot on the border of the screen and click a mouse button the diagram will be redrawn without any changes.

The complete Matrix Diagram may be viewed on the screen at one time by means of the ZOOM Fit Screen option. Appropriate magnification factors are calculated by the system to make the diagram fit on the screen; the yellow line that appears indicates the boundaries of the page on which the diagram fits. The page size is determined automatically.

To use the option move the arrow cursor to the ZOOM menu header (near or on the word ZOOM) and click a mouse button. The ZOOM options will appear under the ZOOM menu header. Select the Fit Screen option by moving the cursor so that 'Fit Screen' is highlighted and click a mouse button. The menu options will disappear and the screen will be redrawn so that the boundaries of the diagram, indicated by yellow lines, will appear.

Using this option on a Matrix Diagram of any large project will not be useful, since the diagram will only show the grid.

Only a part of the Matrix Diagram will normally be visible on the screen at one time. Use the ZOOM Actual option to see a portion of the diagram with the lettering the same size as it will be when plotted. You may move the view of the screen by means of the pan bars along the bottom and right of the screen to see any portion of the diagram that you wish.

Move the arrow cursor to the ZOOM menu header and click a mouse button. The ZOOM options will appear under the ZOOM menu header. Select the Actual option by moving the cursor so that Actual is highlighted and click a mouse button. The menu options will click a mouse button. The menu options will disappear and the screen will be redrawn so that the icons will be labeled and be the size they will be when they are printed or plotted.

Often a diagram will be too big to see all the components and their relationships at once. The ZOOM $\frac{1}{2}\times$ option provides the means to shrink a diagram by 50%. The option may be repeated and the diagram shrunk even smaller, or used before or after other ZOOM options. Use the $\frac{1}{2}\times$ option to 'undo' the $2\times$ option.

Move the arrow cursor to the ZOOM menu header and click a mouse button. The ZOOM options will appear under the ZOOM menu header. Select the $\frac{1}{2}\times$ option by moving the cursor so that $\frac{1}{2}\times$ is highlighted and click a mouse button. The menu options will disappear and the screen will be redrawn so that the icons will be half the size they were before the option was selected.

It is possible to reduce the size of the diagram to the point where it almost disappears.

The ZOOM $2\times$ option provides the means to expand the diagram to twice its size. This option may be repeated and the information made even larger, or it may be used before or after other ZOOM options. The $2\times$ option may be used as an 'undo' of the $\frac{1}{2}\times$ option.

Move the arrow cursor to the ZOOM menu header and click a mouse button. The ZOOM options will appear under the ZOOM menu header. Select the $2\times$ option by moving the cursor so that $2\times$ is highlighted and click a mouse button. The menu options will disappear and the screen will be redrawn so that the icons will be twice the size they were before the option was executed; only half as much of the diagram will be displayed on the screen.

If you repeatedly apply the $2\times$ option to a diagram you will eventually not see any of the information for the diagram on the screen.

The ZOOM Enter Zoom option allows an arbitrary zoom factor to be entered so that a diagram may be displayed at any size. This is an absolute zoom factor. If 1.0 is entered, the result is the same as selecting the Actual option. Trial and error will quickly give you experience in choosing a specific zoom factor appropriate for your purpose.

Move the arrow cursor to the ZOOM menu header and click a mouse button. The ZOOM options will appear under the ZOOM menu header. Select the Enter Zoom option by moving the cursor so that 'Enter Zoom' is highlighted and click a mouse button; the menu options will disappear and the Zoom Factor dialog box will be displayed with the current zoom factor. Enter a larger or smaller value and press the F5 key to register your selection. This selection will remain active as the default selection until you again change it for this diagram.

A non-positive zoom factor is not permitted.

Often a diagram will be too big to see all the components and their relationships at once; the ZOOM 75% option provides the means to shrink the diagram to 75% of its actual size.

Move the arrow cursor to the ZOOM menu header and click a mouse button. The ZOOM options will appear under the ZOOM menu header. Select the 75% option by moving the cursor so that '75%' is highlighted and clicking a mouse button. The menu options will disappear and the screen will be redrawn so that the icons will be $\frac{3}{4}$ the size they would be had the Actual option been chosen.

Help in MetaVision is a context- sensitive system that closely mirrors the documentation presented here. You enter the HELP system by placing the cursor on the word HELP in the far right of the menu options along the top of the screen and clicking a button on the mouse.

A Help window will be displayed in the middle of the screen which contains three items across the top: HELP, HELP, and CANCEL. The left HELP may be used for accessing the information contained in this section on how to use the HELP system. The HELP in the top- center of the window identifies that you are in the Help system. You may leave the Help system by placing the cursor on CANCEL in the upper left of the window and clicking a button on the mouse.

When the Help system is initially invoked, a list of the Help topics that relate to the currently displayed set of menus is presented. You pick the topic on which you desire help by highlighting the topic and clicking a button on the mouse. When you have picked a topic, the subtopics or text relating to the topic you chose will be displayed. If there are more topics or text than will fit on the screen, you may move down the list of text by placing the cursor on the downward-pointing arrow in the lower right corner of the window and clicking a button on the mouse. Similarly, you may move up the list of topics or text by placing the cursor on the upward-pointing arrow in the upper right of the Help system window.

The four options listed along the bottom of the Help system window allow you to see Help on other topics. Placing the cursor on 'NEXT' will display the topics or text for the topic which immediately follows the currently-selected topic. Placing the cursor on 'PREV' will display the topics or text for the topic which is immediately previous to the currently-selected topic.

Choosing the 'LEVEL UP' option moves you to the set of topics of which the currently selected topic is a member. 'TOPICS' displays a selection list of topics that are related to the option for which Help is currently displayed.

The Plotting Option provides the capability of producing hardcopy output of any diagram produced using MetaVision. Diagram may be sent to a plotter or printer. The diagram to be plot/printed is selected from the available diagrams by means of a selection list box. A number of formatting options are provided by means of a dialog box labeled 'Plot Information'. Input fields on the dialog box are used to record Text Size, Title Size, ZOOM Factor, Left Margin, and whether the output is to be sent to a plotter or printer.

To print or plot a MetaVision diagram, choose the Plotting option under the Activity Menu heading on the Main Menu screen. A selection list box will be presented for the diagrams available to be plot/printed and you may select from this list in the normal manner. The dialog box labeled 'Plot Information' appears; you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/-print process. When the process is complete the Activity Menu options will again be displayed and control will be returned to you.

The Text Size and Title Size fields must contain integer or decimal values greater than 0.

The Margin field must contain an integer or decimal value greater than 0.

To exit the activities under a particular menu heading use the Exit option. You will be returned to the main menu option from which you came. Placing the cursor on CANCEL in the upper right-hand corner of the activity list will accomplish the same result.

The Decision Logic Diagram is generated from your Process diagrams. The processes are represented by Process State icons and the Input/Output data by Transition Arc Icons. Control data is used by MetaVision in setting up the Transition Arc icons.

Even though the Decision Logic Diagram is generated it is possible to include a new Process State icon on your diagram. This is done by moving the arrow cursor to the circle icon under the CREATE menu heading and clicking a mouse button. Move the cursor to the position where you wish the process state icon to be located and click a mouse button.

The dialog windows that appear when RFPs are created on the PROCESS diagram will be displayed.

You may enter information relating to the RFPs using these windows. The data you enter will be reflected on other MetaVision Diagrams.

The changes made to a Decision Logic Diagram are not reflected as changes to the corresponding Process Diagrams until the DIAGRAM Update option is invoked.

Transition Arrows may also be added to the Decision Logic Diagram. This is done by moving the pointer cursor to the line icon under the CREATE menu heading and clicking a mouse button.

Move the cursor to the position where you wish the transition arrow icon to be placed and click a mouse button.

The dialog window that appears for processes will be displayed.

The changes made to a Decision Logic Diagram are not reflected as changes to the corresponding Process Diagrams until the DIAGRAM Update option is invoked.

To include text on a Diagram wherever desired use the Text icon. Text may be placed anyplace on your Diagram Map by placing the cursor on the word 'Text' under the menu header Create and entering the text in the Text field on the Free Text dialog window. The Free Text dialog window consists of the normal header options and one system generated and three fields to be input. Id: a system generated field that is three characters and should be accepted as is. Justification: a one character field that may have the value 'L', 'C', or 'R'. An 'L' indicates that the text will start at the vertical line of the cross-hairs cursor; an 'R' indicates that the text will end at the vertical line of the cross-hairs cursor; and a 'C' indicates that the text will be centered on the vertical line of the cross- hairs cursor. The default of C is indicated when the window initially appears. Size: a one digit number that indicates the relative size of the text; the default of 1 is initially displayed.

A thirty character field that contains the text to be placed on the Decision Logic Diagram. Any non-null alphanumeric string up to thirty characters is supported. You may create longer text strings by placing shorter ones next to each other on the Data Map.

Place the arrow cursor on the word Text under the Create menu header on the Decision Logic Diagram Screen and click a mouse button; the cross-hair cursor will appear. Move the cross-hair cursor to the position on the Data Map where the text is to be placed and click a mouse button. The Free Text dialog window will appear; the Id field should be accepted as it is and you should change the Justification to L or R if desired. Enter a digit in the size field if the default of 1 is not desired. Enter Text in the Text field and press F5 to have the text placed on the Decision Logic Diagram.

After the text has been placed on the Decision Logic Diagram, the cross-hairs cursor will again be available so that you can include other text on your Decision Logic Diagram. To discontinue placing text on your Decision Logic Diagram position the cursor on the border of the screen and click a mouse button or press F10 when the Free Text dialog window is displayed.

'ID is invalid.' will be displayed in the error message window if anything other than a positive integer is entered in the Id field.

'ID already exists.' will be displayed in the error message window if the Id is changed to the value of a previous Id.

'Justification must be L, C, or R' will be displayed in error message window if you enter anything other than an L, C, or R in the Justification field. These are the only justification options supported.

'Size must be >0' will be displayed in the error message window if you enter anything other than a non-zero digit in the Size field.

'You must enter some text!' will be displayed in the error message window if the other fields contain valid entries but you have not included any text in the Text field.

You can enter text on top of other text or on top of other Decision Logic Diagram Icons; there are probably few good reasons to do such things and it is a good idea not to because editing functions such as Move and Delete require that the relevant text be identified by pointing. It may well become difficult to point at the required text or icon if they are overlapping.

Manage your diagrams using this option by adding new ones and deleting obsolete ones. Open a diagram for modification using this option. This option should be accessed first when the Decision Logic Diagram screen appears.

If you attempt to choose Decision Logic Diagram for the Tool Menu without having chosen appropriate items from the preceding menus, you will be given an error message and denied access to the diagram tool.

The Open Option exists under the DIAGRAM Menu header on the Decision Logic Diagram screen and opens an existing Decision Logic Diagram for modification. When the mouse is clicked on the Open option a pop-up screen appears which lists the Decision Logic Diagram ID and Names of as many of the previously created diagrams as will fit in the window at a time. The pop-up window consists of a header line with HELP and CANCEL, the title, 'Decision Logic Diagram List' and a list of the available Decision Logic Diagrams listed below the title. Pan arrows are present in the upper right and lower right hand corners of the Decision Logic Diagram ID - Name list to make it possible to see any of the diagram ID - Names that do not fit in the window. Placing the cursor arrow on one of the pan arrows and clicking the mouse moves the list of diagram ID - Names in the direction of the arrow.

Placing the cursor arrow on one of the diagram titles, highlights the title and if the mouse is clicked, draws that diagram on the screen for editing. Note: A Decision Logic Diagram that is hierarchically connected with other Decision Logic Diagrams also provides access to its owning and owned diagrams so that if you are working on a diagram and you wish to access its owning diagram or one of the diagrams it owns then you may also use the HIERARCHY Menu to get from one Decision Logic Diagram to another.

You must be in the Decision Logic Diagram Screen to use the Open Diagram option; it doesn't matter whether on not another Decision Logic Diagram is open to use this option. If you are in the Decision Logic Diagram Screen and you wish to open a Decision Logic Diagram, then, using the mouse, place the arrow cursor so that the DIAGRAM Menu header is highlighted and click the mouse; if another menu is pulled down you will have to click the mouse a second time since the first only pulled up the previous menu.

Menu options that include 'Open' will appear under the menu header; move the arrow cursor to the Open option using the mouse and, when it is highlighted, click the mouse. When the list of available Decision Logic Diagrams ID - Names appears, place the arrow cursor so that the desired title is highlighted and click the mouse. If more diagram titles exist than will fit on the screen, then use the pan arrows to move the list until the desired ID - Name is visible in the window, highlight the ID - Name and click the mouse. The message 'One Moment Please . . . ' will appear in the center of the screen and shortly the specified diagram will appear.

If you click the mouse when the cursor is any place other than those for which a function is prescribed, nothing happens.

If you click the mouse on the pan arrows when the list of ID - Names cannot be moved in the direction specified because the list does not proceed any further in that direction, nothing happens.

If you attempt to open a diagram when none have been previously created for this project you will receive the message 'No entries to choose.'; You must click the mouse when the cursor is on 'Continue' to resume your work.

If you select a Decision Logic Diagram ID - Name in the manner described you should have the corresponding diagram appear without problem.

The New Option exists under the DIAGRAM Menu header on the Decision Logic Diagram Screen and clicking the mouse when it is highlighted causes a pop-up window to appear that is used to input identifying and descriptive information for the new diagram.

The pop-up window consists of a header line, the title 'New Decision Logic Diagram', and a body which consists of four fields for input. The header line consists of the four functions: 'F1: HELP F3: LIST F5: DONE F10: CANCEL' Note: Means for editing this information are not provided so that care should be taken that the information is as accurate as possible before pressing F5.

The body of the diagram consists of four input fields: the Owning Process ID, Process Diagram Name, Decision Logic Diagram ID, and Process Description. The Owning Process ID is the Decision Logic Diagram ID for the Decision Logic Diagram of which the diagram being created is a component; Process Diagram ID can be up to 6 characters; if the diagram being added is the top most diagram in a hierarchy of diagrams to be created then a value of −1 is suggested here. The Owning Process ID is a required field; i.e., a value must be entered. The Decision Logic Diagram Name may be up to 50 characters and is the title that will be displayed on the top of the diagram and in various other places; this is not a required field but a value here is strongly suggested to aid in keeping track of your diagrams. The Decision Logic Diagram ID consists of up to 6 characters and is the MetaVision identifier for the diagram being created; this a required field. The Process Description consists of two lines of fifty characters which describe the process and provide additional information not evident from the Decision Logic Diagram.

You must be in the Decision Logic Diagram Screen to use the New Diagram option; it doesn't matter whether or not another Decision Logic Diagram is open to use this option. If you are in the Decision Logic Diagram Screen and you wish to open a new Decision Logic Diagram, then using the mouse place the arrow cursor so that the DIAGRAM Menu header is highlighted and click the mouse; if another menu is pulled down you will have to click the mouse a second time since the first only pulled up the previous menu.

The menu options that include 'New' will appear under the menu header; move the arrow cursor to the New option using the mouse and, when it is highlighted, click the mouse. After the New Decision Logic Diagram window has appeared in the center of the screen, fill in the input fields and press F5 to create a new diagram with the displayed identifying and descriptive fields or press F10 to cancel the addition of a diagram at this time. If you pressed F5 and did not receive any error messages, a Decision Logic Diagram will appear with the ID and name that you have just entered. Note that if you have already created a Process box in another Decision Logic Diagram for a process you wish to decompose using a process diagram, you may also create the new diagram via the HIERARCHY menu and the Decompose option.

The Owning Process ID field is required so that if you do not put a value in that field and press F5 you will receive the message 'Owning ID is invalid'; you must then place the cursor on the 'Continue' portion of the error message pop-up window and click the mouse.

The Decision Logic Diagram ID fields are required so that if you do not put a value in that field and press F5 you will receive the message 'Owned ID is invalid'; you must then place the cursor on the 'Continue' portion of the error message pop-up window and click the mouse.

It is definitely a good idea to enter a Decision Logic Diagram Name and Description even though they are not required by MetaVision.

It is definitely a good idea to enter a Decision Logic Diagram Name and Description even though they are not required by MetaVision.

If you enter an Process ID for the Owning Process ID that already exists, you will be asked if you wish to over-write the existing Decision Logic Diagram information; the choice to do so here is irreversible.

The Decision Logic Diagram is generated from the Process Diagram information. It is, however, possible to edit the resulting diagram. In order to keep the corresponding Process diagrams and the current Decision Logic Diagram synchronized use the Update option. If there are changes that require further information be entered for the database data that support the two diagrams, you will prompted via a dialog window for the needed data.

To bring up the Decision Logic Diagram that is hierarchically above the one currently displayed and create it if it does not exist use the Hierarchy Summarize option.

There are a number of ways to move between Decision Logic Diagrams; the options under the Hierarchy Menu provide the most straight-forward means once a diagram has been opened using the DIAGRAM Open option. The Summarize option provides a quick way to move to and work on the owning Decision Logic Diagram for the diagram currently displayed and create the owning Decision Logic Diagram if it does not exist.

A set of Decision Logic Diagrams may be visualized as the roots of a tree with a single node at the top. The Decision Logic Diagram at this top node describes the entire process being modeled on one Decision Logic Diagram. The second level down decomposes the component process boxes appearing on the top level diagram, the third level decomposes the boxes appearing on the second level, and so on.

There is, at most, a single Decision Logic Diagram above any Decision Logic Diagram (the one at the top doesn't have any above it). Moving to the level next higher on the tree is performed using the Summarize option; the Decision Logic Diagram at this level is said to own the Decision Logic Diagrams on the level below it. In other places this diagram is referred to as the parent Decision Logic Diagram and the owned process as a child process. Moving from a diagram to its owning Decision Logic Diagram is useful for quickly determining the context of the diagram on which you are working and to visually validate that the input, process, and output arrows on the current diagram are represented on the next higher diagram.

The owning Decision Logic Diagram for a diagram is established in one of three ways: (1) via the Create Process Box option, (2) by the system when you invoke the Hierarchy Down or Decompose option for a process that has not previously had a diagram created for it, or (3) using the Hierarchy Summarize option.

If a Decision Logic Diagram does not exist for the owning process when the Summarize option is invoked the Process Box dialog window pops up with the normal four functions listed on the window header and three data fields below the Process Box title.

The Process ID field is a system generated unique identifier for the process box and normally contains the Process Identifier. This value in this field can be changed but it is displayed mostly for your information since the numbers are generated in sequence and you should have a good reason for not accepting the generated value. A non- null value must be present for a process box to be added.

The Process Name field is the descriptive label that will be displayed on the process box that is being created. The Process Name value is also used in reports. The Process Name may be null but normally should not be for obvious reasons. The Process Name may be a maximum of 50 characters long but, unless its presence on reports in such a long form is desired, it should not normally be that long due to the following considerations. The Process Name is displayed on the box with the name broken into words which are centered and placed on up to three lines in the box. The box is 11 characters wide so that if a word in the Process Name extends beyond 11 characters it will extend beyond the edges of the box's outline.

The Process Identifier will overwrite part of the third line if it extends as far as the position of the Process Identifier. Words beyond those that fit on the initial three lines will not be displayed on the box. Experience will provide a basis for creating Process Names that fit. The Change option on the EDIT menu can be used to modify the name until it is acceptably positioned on the box.

The Process Description consists of two fifty character lines of description of the process represented by the box. You should take full advantage of this field since it will clarify and expand on the box name for a process in reports. The Process Description does not appear on the Decision Logic Diagram.

Note that the distinction between this option and the Hierarchy Up option is that the Up option does not create the owning Decision Logic Diagram if it does not already exist whereas the Summarize option does create the owning Decision Logic Diagram if it does not exist.

You must have opened a diagram on the Decision Logic Diagram screen in order to use the Hierarchy Summarize option. Move the arrow cursor to the Hierarchy Menu Header (near or on the word Hierarchy) and click a mouse button.

The Hierarchy options will appear under the Hierarchy Menu header; 'Summarize' is the third option on the list. Select the Summarize option by moving the cursor so Summarize is highlighted and clicking a mouse button. The Decision Logic Diagram that owns the current Decision Logic Diagram will be created if it does not exist and then it will be displayed and all menu options are available for use on this owning diagram.

If the Decision Logic Diagram must be created, the dialog window labeled 'Process Box' will appear with a set of input fields. Input the Process Name and Process Description for the process box and press F5. The dialog window will be replaced by the new diagram with the label you entered as the Process ID and Name displayed along the top of the screen. The pop-up window '<ID> location needed' will appear and you must place the cursor on 'Continue' and click a mouse button. A cross-hairs cursor will appear and you should move it to a location on the screen where you wish the owned process box to be located. Clicking a mouse button causes the process box icon to be displayed in the location specified.

If you invoke the Hierarchy Up option before you have opened a Decision Logic Diagram the message 'No Decision Logic Diagram open.' will be displayed in a pop-up error message window and you must click on 'Continue' to resume.

The Process ID must be non-null; if you delete the system generated Process ID and don't replace it with another and try to add the process box via F5 you will receive the message 'ID is invalid.'; You must click on 'Continue' to resume.

If you change the system generated Process ID to be the same as a Process ID previously used, the error message 'Process already exists' will be displayed and you must click a mouse button with the cursor on 'Continue' to resume.

To move a Decision Logic Diagram corresponding to one of the process boxes on the current diagram use the Hierarchy Decompose option. This option will create the Decision Logic Diagram if it does not exist prior to invoking the Decompose option.

This option permits the opening of a Decision Logic Diagram that corresponds to one of the process boxes on the Decision Logic Diagram it is currently open. The hand cursor will appear and that is used to point at the process box that which will become the Decision Logic Diagram opened for editing. Any of the displayed process boxes may be selected by moving the cursor so it points to the desired process box and clicking a mouse button. If a Decision Logic Diagram does not exist for the process you have selected the system will create a diagram for it.

In creating the system information for the new Decision Logic Diagram the system uses the Owning Process ID of the Decision Logic Diagram from which the option is invoked. Note that the Down option provides a list of processes from which to choose whereas the Decompose option involves the hand cursor to point at the process box to be decomposed; the Decompose option can only be used for processes that appear on the screen when it is invoked.

You must have opened a diagram in order to successfully invoke the Hierarchy Decompose option. Move the arrow cursor to the Hierarchy Menu Header (near or on the word Hierarchy) and click a mouse button. The Hierarchy options will appear under the Hierarchy Menu header; 'Decompose' is the fourth option on the list.

Select the Decompose option by moving the cursor so Decompose is highlighted and clicking a mouse button. The hand cursor replaces the arrow cursor and you should move the cursor to the process box that you wish to decompose and click a mouse button again. The selected process will be displayed with the header line (Process ID and name) for the corresponding diagram. All of the Menu options are available for use with the diagram.

If you invoke the Hierarchy Decompose option before you have opened a Decision Logic Diagram the message 'No Decision Logic Diagram open.' will be displayed in a pop-up error message window and you must click on 'Continue' to resume.

If you invoke the Hierarchy Decompose option on a Decision Logic Diagram that does not contain any component process boxes you won't have anything to point to and you'll have to click a mouse button to replace the hand cursor with the arrow cursor.

To save all additions and changes to diagrams since the last save use the Save option.

The Save option is under the Diagram Menu header and saves all changes that have been made to any diagrams since the last save.

Position the cursor on the Diagram Menu header and click a mouse button. The Diagram Options will be displayed in a pull-down menu. Move the cursor to the Save option and click a mouse button again. The changes made to any diagrams since you invoked the Diagramming option on the Activity menu or last issued a Save will be made permanent. When the process is complete the control of the cursor will be returned to you.

It is a mistake NOT to use the Save option occasionally to save your work to insure against power or program failures.

To undo any changes that have not been made permanent by means of the Save Option or upon exiting a diagram using the Quit option use the Undo.

The Undo option is a means of retracting a set of changes without having to retract each component of the changes. This capability only exists for entries, additions, changes, and deletions that have been made since the last save option was performed.

Position the cursor on the Diagram Menu header and click a mouse button. The Diagram options will be displayed in a pull-down menu. Move the cursor to the Undo option and click a mouse button again. Any changes made to any diagrams since you invoked the Diagramming option on the Activity menu or used the Save option will be lost and the diagram returned to the state that existed when you entered or last saved the diagram, whichever was more recent. When the process is complete the control of the cursor will be returned to you.

Be certain that you really want to perform an undo of all work since you last saved your work since invoking this option causes ALL work since your last save to be irrevocably deleted.

Close

To stop work on one diagram and begin work on another use the Close option.

The Close option removes a diagram from the screen and returns you to a state where you may add or open another diagram. All changes made to the currently open diagram will remain in effect as temporary changes until the Save option or the temporary files are made permanent when the Quit option is executed.

Position the cursor on the Diagram Menu header and click a mouse button. The Diagram options will be displayed in a pull-down menu. Move the cursor to the Close option and click a mouse button again. Any changes made to any diagrams since you invoked the Diagramming option on the Activity menu or used the Save option will be saved in temporary files and the diagram you close will be returned to the state that existed when you entered or last saved the diagram, whichever was more recent, if you perform an Undo option. Otherwise any changes will be saved when you invoke the Save option or save changes when you so choose when you have invoked the Quit option.

Be careful to not use the Close option and then think that changes made to the diagram are permanent when you have not used the Save option. Any Undo option will remove all changes made since the last Save on all diagrams.

The Delete Option exists under the DIAGRAM Menu header on the Decision Logic Diagram screen and opens an existing Decision Logic Diagram for modification. When the mouse is clicked on the Delete option a pop-up screen appears which lists the Decision Logic Diagram ID and Names of as many of the previously created diagrams as will fit in the window at a time. The pop-up window consists of a header line with HELP and CANCEL, the title, 'Decision Logic Diagram List' and a list of the available Decision Logic Diagrams listed below the title. Pan arrows are present in the upper right and lower right hand corners of the Decision Logic Diagram ID Name list to make it possible to see any of the diagram ID - Names that do not fit in the window. Placing the cursor arrow on one of the pan arrows and clicking the mouse moves the list of diagram ID - Names in the direction of the arrow.

Placing the cursor arrow on one of the diagram titles, highlights the title and if the mouse is clicked, the corresponding diagram and all associated control information is deleted from the MetaVision system.

The Quit Option exists under the DIAGRAM Menu header in the Diagram screen and causes the current Decision Logic Diagram to be closed and the Main Menu Screen to be displayed.

You must be in the Diagram Screen to use the Quit option. If you are in the Diagram Screen and you wish to access another part of MetaVision, then, using the mouse, place the arrow cursor so that the DIAGRAM Menu header is highlighted and click the mouse; if another menu is pulled down you will have to click the mouse a second time since the first only pulled up the previous menu.

The menu options that include 'Quit' will appear under the menu header; move the arrow cursor to the Quit option using the mouse and, when it is highlighted, click the mouse. The Main Menu Screen will be displayed after a few seconds; the message 'One Moment Please . . . ' will initially be displayed in the center of the screen but any of the options on the MAIN MENU Screen will presently be available. If you wish to exit MetaVision completely at this time you may move the arrow cursor to the Project Menu and pick the Quit option there.

Use this option to modify components already appearing on a diagram by moving, swapping, deleting, or changing database information concerning that component.

To change information relating to a Decision Logic Diagram icon use the CHANGE option under the Edit Menu header.

The Change option is the first option under the Edit Menu header; it permits changing information relating to an icon that exists on the Decision Logic Diagram that is currently open. Except for ID fields and the routing technique for Input/Output/Control arrows, any information field associated with any of the icons on the diagram may be changed using the Change option.

Information is edited via dialog windows that are the same as the original input screens used at the time of creation of the icons with one exception; when an owning RFP arrow is to be changed on a Fan In or Fan Out icon, the dialog window used to make those changes is the normal 'Input/Output/Control Arrow' dialog window and not the original 'Owning RFP Screen'. One consequence of not being able to edit the Owning RFP using the original 'Owning RFP' screen is that the number of owned RFP's cannot be changed for a Fan In or Fan Out icon; changing the number of owned RFP's for a Fan In or Fan Out icon requires choosing the Edit Delete option to remove the icon from the diagram and then creating the correct one.

A consequence of not being able to change the routing technique for an Input/Output/Control Arrow is that in some cases the arrow must be deleted and re-added in order to change the routing technique associated with that icon at the time it was created. Sometimes the current routing will be acceptable if some icons are moved (using the Move option.) Process boxes are edited via the 'Process Box' dialog window; RFP arrows, either singly or as components of Fan In or Fan Out Icons are edited via the 'Input/Output/Control Arrow' dialog window; and Data S/S's are edited via the 'Data Source/Data Sink' dialog window.

Note that the change option is only for changing already existing data, not for adding new icons or deleting them or changing their position on the diagram; for the add functions use the CREATE menu; for the other two use the Delete or Move options on the Edit Menu. The options on the dialog window header lines have interpretations similar to their normal ones with the following differences: F5: DONE has the function of entering the changes made into the system database for that icon; and F3: LIST displays the icons of the same type but does not allow choosing one of them; they are displayed for information only.

You must have opened a diagram on the Decision Logic Diagram screen in order to edit the information for icons. Move the arrow cursor to the Edit Menu header (near or on the word Edit) and click a mouse button. The Edit options will appear under the Edit Menu header; move the arrow cursor so the Change option is highlighted and again click a mouse button. The Edit options will be removed and a hand cursor will replace the arrow cursor; move the hand cursor so that it points to the label of the icon for which you wish to change information and click a mouse button. The icon you have pointed at will be highlighted and the dialog window for that type of icon will appear.

Enter information in the fields of the dialog window just as you would when creating them except that you cannot modify the value in the ID field. When you are done press F5:DONE to have the changes go into effect; the system files will be updated and the modified icon will be displayed on the diagram. The hand cursor will still be available so that you can move to another icon and change the information associated with it.

When you are done changing information for icons, move the hand cursor off the diagram to the border of the screen and click a mouse button to have the arrow cursor reappear. If you pressed F10: CANCEL while in a dialog window to discontinue entering changes for an icon, the arrow cursor reappears and you must click on the Change option in the Edit Menu to make further changes.

If you attempt to change the ID field for any icon, a pop-window with the error message 'ID change not yet implemented—use delete and add.' will be displayed and you must move the cursor to the word 'Continue' and click a mouse button to resume.

To remove an icon from the diagram that is being displayed use the Delete option under the Edit Menu header.

The Delete option is the second option under the Edit Menu header; it permits deleting any of the icons on a diagram. In addition to deleting the icon pointed to other icons may also be deleted from the diagram in order to maintain the integrity of the relationships between the icons on the diagram.

When a process box is deleted, all arrow icons connected to it that are not connected to another process box are also deleted; when any of the owned or the owning RFP in a Fan In or Fan Out icon are deleted, the entire Fan In or Fan Out icon is deleted. This option is very powerful and the results of its use are permanent after the Diagram Save option is invoked so care should be exercised that only the desired icons are removed using it. (You may of course recreate the deleted icons but this may be difficult or impossible if there is no hard-copy of the diagrams on which they appear.)

You must have opened a diagram on the Decision Logic Diagram screen in order to delete icons. Move the arrow cursor to the Edit Menu header (near or on the word Edit) and click a mouse button. The Edit options will appear under the Edit Menu header; move the arrow cursor so the Delete option is highlighted and again click a mouse button. The Edit options will be removed and a hand cursor will replace the arrow cursor; move the hand cursor so that it covers part of the name of the icon to be deleted and click a mouse button. The icon will be deleted along with any of the other icons that must be deleted to maintain the integrity of the diagram.

The hand cursor will still be available to be used to delete other icons on the diagram. When you are done deleting icons on a diagram, move the hand cursor so that it is not touching any icon and click a mouse button; the arrow cursor will replace the hand cursor. Occasionally the Decision Logic Diagram will appear a bit 'ragged' after an icon is deleted with a stray line or text; these may be removed by using the Repaint Menu option found on the far right of the Decision Logic Diagram screen.

There are no error messages that are displayed with this option; if you delete something, it is deleted; if you click a mouse button when the hand cursor is not touching an icon the cursor reverts to the arrow cursor. It is a mistake to delete an icon that you don't wish to delete because you will have to recreate the icon and any icons deleted along with it if you 'accidentally' delete one by mistake.

To reposition an icon on a Decision Logic Diagram for visual appeal and/or readability use the Move option under the Edit Menu header on the Decision Logic Diagram screen.

The Move option under the Edit Menu header is used to reposition icons on a Decision Logic Diagram page. Any icon may be moved to any position on the diagram that is visible; all connections between that icon and other icons on the diagram will be maintained.

A hand cursor is used to indicate the icon to be moved. When a mouse button is clicked with the hand cursor on an icon, the icon is highlighted and may be moved to any position visible on the screen. Clicking a mouse button again causes the highlighted icon to be redrawn in the new position and all of the arrow icons to which it is connected are also redrawn so that the connections are rerouted but maintained as they were before the icon was moved.

If an over-all perspective of icons on a Decision Logic Diagram page is needed in order to position the icons on the page, use the Zoom Menu options to make the whole diagram page visible on the screen; the page outline is indicated by the (yellow) border line. Move the icons on the page to the position desired and then again use the Zoom Menu options to return the icons to full size.

For arrow icons connecting two icons the lines that can be moved depend on whether the icon was created using the Automatic or Manual routing technique. For either method the horizontal portions of the arrow going to or from other icons cannot be moved using the Move option. For arrow icons created with the Manual routing technique either of the vertical portions of the arrow or the horizontal portion of the arrow that connects the two vertical portions can be moved using the Move option. For arrow icons created with the Automatic routing technique only the vertical portion of the arrow can be moved using the Move option.

You must have opened a diagram on the Decision Logic Diagram screen in order to edit the information for icons. Move the arrow cursor to the Edit Menu header (near or on the word Edit) and click a mouse button. The Edit options will appear under the Edit Menu header; move the arrow cursor so the MOVE option is highlighted and again click a mouse button. The Edit options will be removed and a hand cursor will replace the arrow cursor; move the hand cursor so that it is over part of the icon name and click a mouse button. A highlighted image will be 'attached' to the cursor and you may move it to anyplace on the screen; clicking the mouse again will cause the icon to be repositioned in that location and all other connecting arrow icons will be redrawn so that they maintain the same connections but with different routings.

After the affected portions of the diagram have been redrawn, the hand cursor will still be available so that you can move it to another icon and move it without having to return to the Edit Menu header. To discontinue the move option place the hand cursor so that it is not touching any icon and click a mouse button; the hand cursor will be replaced by the arrow cursor and the move option will no longer be in effect. If the screen has some 'ragged' portions after moving an icon, place the arrow cursor on the Repaint Menu header on the far right of the Menu Header line and click a mouse button; the screen will be redrawn to reflect only the information in the database.

Icons may be placed on top of one another but this is not advised since it will probably be difficult to separate them later; there should be no need to do this under normal circumstances.

It is possible to move icons outside the border of the page by moving them beyond the yellow boundary lines which indicate the edges of the page. Portions of the diagram beyond the edges of the page will not be printed or plotted.

If you attempt to move the horizontal portion of an arrow that is going into or from a process or data S/S, the hand cursor will revert to the arrow cursor since you cannot move those portions of arrows. If you attempt to move the horizontal portion of an constraint icon that is going into or from an S/P or Context, the hand cursor will revert to the arrow cursor since you cannot move those portions of constraint icons.

Sometimes it may be difficult to click a mouse button precisely when the cursor is on the icon's label. If you do not do so, the cursor will usually revert to the arrow cursor and you will have to again click a mouse button on the Edit Menu header and the Move option.

Use this option to redraw the diagram in the window at some factor smaller or larger than its current size.

To enlarge a portion of the Decision Logic Diagram that is on the screen so that it fills the entire screen use the Zoom Arbitrary option. This option is useful for focusing your attention on one portion of the screen and enlarging it to fill the whole screen so that editing is easier.

It is often desirable to enlarge a portion of a Decision Logic Diagram so that it fills the entire screen to make editing of that portion of the diagram easier. The enlarged portion will fill the screen with as much of the diagram as was outlined during the execution of the Arbitrary option. Process Boxes, Data Source/Sink icons, and Fan In/Fan Out icons will be enlarged proportionally. Arrow icons will be lengthened to connect the other icons appropriately. Names will not be enlarged but will occupy their normal positions on the icons, i.e., in the center of Process Boxes and Data Source/Sink icons and at the beginning of data arrows. The normal Create, Edit, Zoom, Setup, Hierarchy, and Help options are available on the enlarged diagram.

You must have opened a diagram on the Decision Logic Diagram screen in order to enlarge a portion of the diagram. Move the arrow cursor to the Zoom Menu header (near or on the word Zoom) and click a mouse button. The Zoom options will appear under the Zoom Menu header; 'Arbitrary' is the first option on the list. Select the Arbitrary option by moving the cursor so 'Arbitrary' is highlighted and clicking a mouse button; the menu options will disappear and a cross-hair cursor will appear. Move the cross-hairs cursor to a corner of the portion of the screen to be enlarged and click a mouse button; any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged; vertical and horizontal lines will appear as the cursor is moved to indicate the bounds of the portion that will fill the screen. Click the mouse a second time to establish the size and extent of the portion of the diagram to be enlarged; the portion outlined will be enlarged to fill the screen.

A portion of the enlarged diagram may again be expanded using the Arbitrary option though this will usually not be wise or necessary as discussed more in the Mistakes section below; the Zoom ½× and 2× options may also be used on the results of using the Arbitrary option.

Mistakes are not identified as such explicitly by the system for this option; some actions, however, are not recommended or motivated.

You move the cross-hairs cursor to a spot and click a mouse button twice on that same spot; the diagram will be redrawn without any changes.

You move the cross-hairs cursor to a spot on the border of the screen and click a mouse button; the diagram will be redrawn without any changes.

You expand a Decision Logic Diagram so that nothing is showing on the screen; this is not usually a good idea since you will not see the relation of the expanded portion to other icons.

If you expand a portion of a diagram that all lies within a process box and then create a process box on the expanded screen, the edges of the new process box will not be visible and when you return to a more standard size the new process box will partially or completely overlap the original so that it may be difficult to separate the two boxes.

To see and edit the entire Decision Logic Diagram on the screen at one time no matter what its size use the Zoom Fit Screen option. This is desirable before printing so that you have a clear idea of what the diagram and the placement of the components will look like when plotted.

The complete Decision Logic Diagram may be viewed on the screen at one time by means of the Zoom Fit Screen option. Appropriate magnification factors are calculated by the system to make the diagram fit on the screen; the yellow line that appears indicates the boundaries of the page on which the diagram fits. The page size is determined by the Setup Menu option. The diagram will not always fill the screen if its height or width proportions are extreme but the boundaries of the diagram will always be visible.

If you change the page size, the Zoom Fit Screen option will have to be executed again to fit the new page size on the screen. Many or all of the icon names may be suppressed so that you will not be able to identify the individual icons except by their shape, position, and your memory; you can, however, still edit them in the normal way.

You must have opened a diagram on the Decision Logic Diagram screen in order to enlarge a portion of the diagram. Move the arrow cursor to the Zoom Menu header (near or on the word Zoom) and click a mouse button. The Zoom options will appear under the Zoom Menu header; Fit Screen is the second option on the list. Select the Fit Screen option by moving the cursor so 'Fit Screen' is highlighted and clicking a mouse button; the menu options will disappear and the screen will be redrawn so that the boundaries of the diagram, indicated by yellow lines, will appear with either the horizontal or vertical lines (perhaps both) near the boundary of the screen work area.

If the page size is much greater in one dimension than in the other, e.g., 30 by 7.5 inches, the Fit Screen option will not be very helpful since the page will be too narrow to display the icons in a recognizable way. If you do want the page dimensions to be very different it would be better to use other Zoom options such as Arbitrary and ½× to place the icons on the page; the Fit Screen option could be used in selecting a portion of the page to edit at a larger size.

To enlarge or shrink a diagram so that the icons will be displayed on the screen the same size as they will be on the plot of the diagram use the Zoom Actual option; this size includes all of the names associated with the various icons.

Only a part of the Decision Logic Diagram will normally be visible on the screen at one time since the size of the screen where diagram editing is performed is not usually the same size as the paper on which the diagram will be printed. Use the Zoom Actual option to see a portion of the diagram with the icons the same size as they will be when plotted. You may move the view of the screen by means of the pan bars along the bottom and right of the screen to see any portion of the diagram that you wish.

In order to see as much as practical of a Decision Logic Diagram while still seeing all of the icon names you will normally work on it at Actual size; this is the default size that is used when you initially create a new diagram.

You must have opened a diagram on the Decision Logic Diagram screen in order to use the Zoom option. Move the arrow cursor to the Zoom Menu header (near or on the word Zoom) and click a mouse button. The Zoom options will appear under the Zoom Menu header; Actual is the third option on the list. Select the Actual option by moving the cursor so that Actual is highlighted and click a mouse button; the menu options will disappear and the screen will be redrawn so that the icons will be labeled and be the size they will be when they are printed or plotted.

The diagram should appear the same size as the default size after using the Zoom Actual option.

To shrink the size of a diagram to ½ its current size use the Zoom ½× option.

Often a diagram will be too big to see the components and their relationship on a diagram; the Zoom ½× option provides the means to shrink the diagram by 50%. The option may be repeated and the diagram shrunk even smaller or used before or after other Zoom options. Use the ½× option to 'undo' the 2× option.

You must have opened a diagram on the Decision Logic Diagram screen in order to use the Zoom ½× option. Move the arrow cursor to the Zoom Menu header (near or on the word Zoom) and click a mouse button. The Zoom options will appear under the Zoom Menu header; ½× is the fourth option on the list. Select the ½× option by moving the cursor so that ½× is highlighted and click a mouse button; the menu options will disappear and the screen will be redrawn so that the icons will be half the size they were before the option was selected.

It is possible to reduce the size of the diagram to the point where it almost disappears and doesn't serve much function. You will have problems with your diagram if you try to edit any of its icons when it is in a very reduced size and if you Create an icon you will have minimal control over its position with respect to other icons on the diagram.

To expand the size of a diagram to twice its current size use the Zoom 2× option.

Often a diagram will be too small to easily edit the components and their relationship on a diagram; the Zoom 2× option provides the means to expand the diagram to twice its size. The option may be repeated and the icons made even larger or it may be used before or after other Zoom options. The 2× option may be used as an 'undo' of the ½× option.

You must have opened a diagram on the Decision Logic Diagram screen in order to use the Zoom 2× option. Move the arrow cursor to the Zoom Menu header (near or on the word Zoom) and click a mouse button. The Zoom options will appear under the Zoom Menu header; 2× is the fifth option on the list. Select the 2× option by moving the cursor so that 2× is highlighted and click a mouse button. The menu options will disappear and the screen will be redrawn so that the icons will be twice the size they were before the option was executed; only half as much of the diagram will be displayed on the screen.

If you repeatedly apply the 2× option to a diagram you will eventually not see any of the icons for the diagram on the screen. If you add icons to the diagram when it is this size you will not be able to see them since they will be enlarged to be the same size as other icons.

To enter the zoom factor at which you want the diagram displayed select the Enter Zoom option. This is an absolute zoom factor. If 1.0 is entered, it is the same as Actual.

This option allows an arbitrary zoom factor to be entered so that a diagram may be displayed at any size. This is an absolute zoom factor. If 1.0 is entered, the result is the same as selecting the Actual option.

You must have opened a diagram on the Decision Logic Diagram screen in order to use the Enter Zoom option. Move the arrow cursor to the Zoom Menu header (near or on the word Zoom) and click a mouse button. The Zoom options will appear under the Zoom Menu header; Enter Zoom is the sixth option on the list. Select the Enter Zoom option by moving the cursor so that 'Enter Zoom' is highlighted and click a mouse button; the menu will disappear and the Zoom Factor dialog box will be displayed with the current zoom factor. Enter a larger or smaller value and press the F5 key to register your selection.

A non-positive zoom factor is not permitted.

To change the size of a diagram to 75% of its actual size use the Zoom 75% option. This option is useful if you want to decrease the size of the whole diagram somewhat but not necessarily to ½ its original size. It is easier to place icons on a diagram appropriately when the whole diagram is visible at one time; this can be done with the Zoom Fit Screen option; parts of the diagram may be off the screen at this size but be visible after using the Zoom 75% option.

Often a diagram will be too big to see the components and their relationship on a diagram; the Zoom 75% option provides the means to shrink the diagram to 75% of its actual size; the arrow icon names will not be displayed at this size and only a portion of the data S/S and process box names will be displayed along with the ID's for the data S/S and process box icons.

You must have opened a diagram on the Decision Logic Diagram screen in order to use the Zoom 75% option. Move the arrow cursor to the Zoom Menu header (near or on the word Zoom) and click a mouse button. The Zoom options will appear under the Zoom Menu header; 75% is the seventh option on the list. Select the 75% option by moving the cursor so that '75%' is highlighted and click a mouse button. The menu options will disappear and the screen will be redrawn so that the icons will be ¾ the size they were if the Actual option was chosen. Usually the entire diagram will be displayed on the screen.

Set up the page size on which output is to be printed.

To change the size of a page that will be printed or plotted use the Setup Page Size option.

The Page Size option is the only option under the Setup Menu header; it provides the capability of changing the size of a page that will be printed or plotted; the edges of the page are indicated on the screen by means of a thin (yellow) line; page sizes are connected to each diagram independently so they need to be set for each diagram if they differ from the default values. When the option is invoked a pop-up dialog window appears that consists of a header line, the title 'Page Size' and 2 input fields.

The header line includes the normal functions. The body of the window consists of two input fields, Page Width and Page Height, which are each 7 digits. The values input should be numbers and may contain a decimal point; other non-numbers are not supported. Diagrams are printed or plotted either rotated or not rotated depending on the value included in your AUTOEXEC.BAT file for the ORIENTATION parameter; if you have the line SET ORIENTATION=PORTRAIT output will not be rotated; if you have the line SET ORIENTATION=LANDSCAPE output will be rotated 270 degrees counterclockwise from the way it appears on the screen. You need to take this into account when setting the page size using this option especially if you want all of the diagram to print on a single page.

Another consideration in determining page size is the value of the PAPER parameter in your AUTOEXEC.BAT file. If you have the line SET PAPER=NARROW the diagram will be printed using a value of 8.5"×11" for the paper size and the printer driver will write on an 8"×10" area of the paper. If you have the line SET PAPER=WIDE the diagram will be printed using a value of 14"×11" for the paper size and the printer driver will write on a 13.2"×10" area of the paper. A consequence of this is that if you want to print a diagram on a single 8.5"×11" page using ORIENTATION=PORTRAIT the page size should not be more than 8"×10"; if ORIENTATION=LANDSCAPE the page size should not be more than 10"×8". The printer driver automatically continues printing or plotting on other sheets if the printout will not fit on a single sheet; the parts of the page can then be cut and pasted together. If the line SET FORMFEED=OFF is in your AUTOEXEC.BAT file you may perform long "continuous sheet" print-plotting so that your height or width dimension may be extended depending on if you have ORIENTATION set to PORTRAIT or LANDSCAPE, respectively.

You must have opened a diagram on the Decision Logic Diagram screen in order to set the page size using the Setup Page Size option. Move the arrow cursor to the Setup Menu header (near or on the word Setup) and click a mouse button. The Setup option Page Size will be highlighted under the Setup Menu header and you click a mouse button a second time to invoke the option.

The Page Size dialog window will appear and you enter whole or decimal numbers for the Page Width and Page Height fields and press F5 to have the new page size established. F10 will leave the dialog window without changing the size of the page. Shortly the diagram will be redrawn with the new page edges indicated by the thin (yellow) line. It may be necessary to use the ZOOM Fit Screen option if the diagram doesn't fit on the resized page.

If you select the Page Size Option without having opened a diagram first, a pop- up error window will appear with the message 'No Decision Logic Diagram open.'; you must click a mouse button with the cursor on 'Continue' to resume.

If you select the F3: LIST option in the dialog window, a pop-up error window will appear with the message 'No list available.'; you must click a mouse button with the cursor on 'Continue' to resume.

If you enter a non-numeric value for the first digit in the height or width field a pop-up error window will appear with the message 'Invalid Page Width'; you must click a mouse button with the cursor on 'Continue' to resume.

If you enter a non-numeric after the first digit only the portion up to the non- numeric will be used to set the page size; decimal points, not fractions, must be used for non-integer page sizes.

To see the MetaVision supporting (non- graphic) information for any icon on a diagram use the HYPERTEXT View option. The information relating to the icon will be displayed in a window similar to the EDIT Change dialog window except that no changes are permitted.

To invoke the HYPERTEXT View option pull down the menu under the menu header, HYPERTEXT, by highlighting the option and clicking a button on the mouse. Then move the mouse so that the cursor moves to a position that highlights the option View and click a mouse button again. The arrow cursor will be replaced by a pointer cursor that may be moved using the mouse. Move the pointer cursor to the diagram whose corresponding database information you wish examine and click a button on the mouse button again.

A window will appear with the field values of information to which the icon corresponds displayed in a format similar to the dialog window via which information for the icon was initially entered and by which it is also optionally changed.

When you have finished examining the information that relates to an icon, press F5 to retain the pointer cursor on the screen so that you can point at another cursor and examine information about it also. To remove the pointer cursor and revert to the arrow cursor press F10 if you are in the View window or click a button on the mouse button when the cursor is not near any icon.

Help in MetaVision is a context sensitive system that closely mirrors the documentation presented here. You enter the HELP system by placing the cursor on the word HELP in the far right of the menu options along the top of the screen and click a button on the mouse.

A Help window will be displayed in the middle of the screen which contains three items across the top HELP, HELP, and CANCEL. The left HELP may be used for accessing the information contained in this section on how to use the HELP system. The HELP in the top-center of the window identifies that you are in the help system. You may leave the help system by placing the cursor on CANCEL in the upper left of the window and clicking a button on the mouse.

A list of the help topics that relate to the currently displayed set of menus is displayed when the help system is initially invoked. You pick the topic on which you desire help by highlighting the topic and clicking a button on the mouse. When you have picked a topic, the subtopics or text relating to the topic you chose will be displayed. If there are more topics or text than will fit on the screen you may move down the list or text by placing the cursor on the downward pointing arrow in the lower right corner of the window and clicking a button on the mouse. Similarly, you may move up the list of topics or text by placing the cursor on the upward pointing arrow in the upper right of the help system window.

The four options listed along the bottom of the help system window allow you to see help on other topics. Placing the cursor on 'NEXT' will display the topics or text for the topic which immediately follows the currently selected topic. Placing the cursor on 'PREV' will display the topics or text for the topic which is immediately previous to the currently selected topic.

Choosing the 'LEVEL UP' option moves you to the set of topics of which the currently selected topic is a member. 'RELATED TOPICS' displays a selection list of topics that are related to the option for which help is currently displayed.

If the screen has some 'ragged' portions after editing, place the cursor on the Repaint Menu header on the far right of the Menu Header line and click a button on the mouse. The screen will be redrawn to reflect only the information in the database.

The Plotting Option provides the capability of producing hardcopy output of any diagram produced using MetaVision. The diagram may be sent to a plotter or printer. The diagram to be plot/printed is selected from the available diagrams by means of a selection list box. A number of formatting options are provided by means of a dialog box labeled 'Plot Information'. Input fields on the dialog box are used to record: Text Size, Title Size, Zoom Factor, Left Margin, and whether the output is to be sent to a plotter or printer.

Choose the Plotting option under the Activity Menu heading on the Main Menu screen to print or plot a MetaVision diagram. A selection list box will be presented for the diagrams available to be plot/printed and you may select from this list in the normal manner. The dialog box labeled 'Plot Information' appears and you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/-print process. When the process is complete the Activity Menu options will again be displayed and control will be returned to you.

The Text Size and Title Size fields must contain integer or decimal values greater than 0.

The Margin field must contain an integer or decimal value greater than 0.

The Zoom Factor field must contain an integer or decimal value greater than 0.

When the MAINTENANCE REPORT option on the Activity List is selected, a list of the available reports is presented. When a maintenance report is selected, you will be asked whether to send the report to the Screen, to the default System Printer, or to a File.

If you choose to have the report sent to a file, you will be asked for the name of the file in which the report will be stored.

The following sections give a brief description and a sample of all the Business Information Diagram Maintenance Reports.

The Decision Logic Information (PICT) Report shows the basic information about the Diagram as stored in file PICT.DBF.

The Decision Logic Connections (RDCON) Report shows the routing of the connections between nodes as stored in file RDCON.DBF. In addition, the Diagram Name is also displayed.

To import data from another directory or project use the FILE IMPORT/MERGE activity menu option. The data will be merged into the MetaVision database for the currently open project.

After clicking a mouse on this option a dialog window will appear with the normal header line of:

F1: HELP F3:LIST
F5:DONE F10:CANCEL

The body of the dialog window consists of a single field which should be filled in with the path name for the subdirectory containing the project information to be merged with the current project information:

All of the information is automatically merged from the files in the subdirectory with the entered path name.

Use the FILE EXPORT activity to output the information for a project to a set of dBASE III files that can be used to transfer information from one work station to another. This becomes especially useful when several people are working on a single project and it is time to integrate the pieces on one machine.

After clicking a mouse on the FILE EXPORT option a dialog window entitled Destination will appear with the normal header line of F1: HELP, F3:LIST, F5:DONE, and F10:CANCEL. The body of the dialog window consists of a single field, Path Name, which should be filled in with the path name for the subdirectory to which the current project information is to be written. Do not include the final '\' for the directory; e.g. 'a:', NOT 'a:\', to export the current project files to the a: drive root directory.

All of the information for the current project is automatically written to files in the subdirectory with the entered path name.

When several persons are working on the same project it is the responsibility of the project leader to assign non-overlapping sets of Diagram and Icon IDs to the individual team members.

If there is overlap, difficulties will be encountered at the point that the parts are to be merged on a single computer under the same project name. The dBASE III files will contain duplicate keyed information and this will seriously jeopardize the integrity of the control information.

To exit the activities under a particular menu heading use the exit option. You will be returned to the main menu option from which you came. Placing the cursor on CAN-CEL in the upper right hand corner of the activity list will accomplish the same result.

The Goals & Objectives menu item under CONTROL gives you the capability of seeing and plotting a representation of the hierarchical relationship between the controls you have created under the Process Diagram menu item.

To select the Goals & Objectives menu item click on CONTROL on the main menu screen after having opened a project and chosen a methodology. The three menu items Decision Logic Diagram, Goals & Objectives, and What If will be displayed. Select Goals & Obectives by moving the cursor using the mouse and clicking a button on the mouse when Goals & Objectives is highlighted.

The normal activity list will be displayed. However, only the DIAGRAMMING and PLOTTING activities are active on this list. Select the activity you want or move the cursor so that EXIT or CANCEL is highlighted to leave the Goals & Objectives activity list.

The DIAGRAMMING activity for the Goals & Objectives option provides the capability of viewing the goals objectives diagram and changing the ZOOM factors related to the diagram. The contents of this diagram are generated from the information entered for the Process Diagrams for a project. The diagram consists of a display of the hierarchical composition of controls. The owning processes are displayed above their corresponding owned processes.

To select the DIAGRAMMING activity move the arrow cursor so that DIAGRAMMING is highlighted and click a button on the mouse. After a short time the Goals & Objectives DIAGRAMMING screen will be displayed.

Since this is a generated diagram the CREATE and EDIT options are not needed; since there is only a single Goals & Objectives diagram per project there is no need for the HYPERTEXT menu options.

The DIAGRAM menu contains a single option QUIT. All of the Process Boxes for a project are displayed on a single diagram so that there is only one per project.

The Quit Option exists under the DIAGRAM Menu header in the Diagram screen and causes the current Goals & Objectives Diagram to be closed and the Main Menu Screen to be displayed.

You must be in the Diagram Screen to use the Quit option. If you are in the Diagram Screen and you wish to access another part of MetaVision, then, using the mouse, place the arrow cursor so that the DIAGRAM Menu header is highlighted and click the mouse.

The menu option 'Quit' will appear under the menu header; move the arrow cursor to the Quit option using the mouse and, when it is highlighted, click the mouse. The Main Menu Screen will be displayed after a few seconds; the message 'One Moment Please . . . ' will initially be displayed in the center of the screen but any of the options on the MAIN MENU Screen will presently be available. If you wish to exit MetaVision completely at this time you may move the arrow cursor to the Project Menu and pick the Quit option there.

Use this option to redraw the diagram in the window at some factor smaller or larger than its current size.

To enlarge a portion of the Decision Logic Diagram that is on the screen so that it fills the entire screen use the Zoom Arbitrary option. This option is useful for focusing your attention on one portion of the screen and enlarging it to fill the whole screen so that editing is easier.

It is often desirable to enlarge a portion of a Decision Logic Diagram so that it fills the entire screen to make editing of that portion of the diagram easier. The enlarged portion will fill the screen with as much of the diagram as was outlined during the execution of the Arbitrary option. Process Boxes, Data Source/Sink icons, and Fan In/Fan Out icons will be enlarged proportionally. Arrow icons will be lengthened to connect the other icons appropriately. Names will not be enlarged but will occupy their normal positions on the icons, i.e., in the center of Process Boxes and Data Source/Sink icons and at the beginning of data arrows. The normal Create, Edit, Zoom, Setup, Hierarchy, and Help options are available on the enlarged diagram.

You must have opened a diagram on the Decision Logic Diagram screen in order to enlarge a portion of the diagram. Move the arrow cursor to the Zoom Menu header (near or on the word Zoom) and click a mouse button. The Zoom options will appear under the Zoom Menu header; 'Arbitrary' is the first option on the list. Select the Arbitrary option by moving the cursor so 'Arbitrary' is highlighted and clicking a mouse button; the menu options will disappear and a cross-hair cursor will appear. Move the cross-hairs cursor to a corner of the portion of the screen to be enlarged and click a mouse button; any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged; vertical and horizontal lines will appear as the cursor is moved to indicate the bounds of the portion that will fill the screen. Click the mouse a second time to establish the size and extent of the portion of the diagram to be enlarged; the portion outlined will be enlarged to fill the screen.

A portion of the enlarged diagram may again be expanded using the Arbitrary option though this will usually not be wise or necessary as discussed more in the Mistakes section below; the Zoom $\frac{1}{2}\times$ and $2\times$ options may also be used on the results of using the Arbitrary option.

Mistakes are not identified as such explicitly by the system for this option; some actions, however, are not recommended or motivated.

You move the cross-hairs cursor to a spot and click a mouse button twice on that same spot; the diagram will be redrawn without any changes.

You move the cross-hairs cursor to a spot on the border of the screen and click a mouse button; the diagram will be redrawn without any changes.

You expand a Decision Logic Diagram so that nothing is showing on the screen; this is not usually a good idea since you will not see the relation of the expanded portion to other icons.

If you expand a portion of a diagram that all lies within a process box and then create a process box on the expanded screen, the edges of the new process box will not be visible and when you return to a more standard size the new process box will partially or completely overlap the original so that it may be difficult to separate the two boxes.

Fit Screen

To see and edit the entire Decision Logic Diagram on the screen at one time no matter what its size use the Zoom Fit Screen option. This is desirable before printing so that you have a clear idea of what the diagram and the placement of the components will look like when plotted.

The complete Decision Logic Diagram may be viewed on the screen at one time by means of the Zoom Fit Screen option. Appropriate magnification factors are calculated by the system to make the diagram fit on the screen; the yellow line that appears indicates the boundaries of the page on which the diagram fits. The page size is determined by the Setup Menu option. The diagram will not always fill the screen if its height or width proportions are extreme but the boundaries of the diagram will always be visible.

If you change the page size, the Zoom Fit Screen option will have to be executed again to fit the new page size on the screen. Many or all of the icon names may be suppressed so that you will not be able to identify the individual icons except by their shape, position, and your memory; you can, however, still edit them in the normal way.

You must have opened a diagram on the Decision Logic Diagram screen in order to enlarge a portion of the diagram. Move the arrow cursor to the Zoom Menu header (near or on the word Zoom) and click a mouse button. The Zoom options will appear under the Zoom Menu header; Fit Screen is the second option on the list. Select the Fit Screen option by moving the cursor so 'Fit Screen' is highlighted and clicking a mouse button; the menu options will disappear and the screen will be redrawn so that the boundaries of the diagram, indicated by yellow lines, will appear with either the horizontal or vertical lines (perhaps both) near the boundary of the screen work area.

If the page size is much greater in one dimension than in the other, e.g., 30 by 7.5 inches, the Fit Screen option will not be very helpful since the page will be too narrow to display the icons in a recognizable way. If you do want the page dimensions to be very different it would be better to use other Zoom options such as Arbitrary and $\frac{1}{2}\times$ to place the icons on the page; the Fit Screen option could be used in selecting a portion of the page to edit at a larger size.

To enlarge or shrink a diagram so that the icons will be displayed on the screen the same size as they will be on the plot of the diagram use the Zoom Actual option; this size includes all of the names associated with the various icons.

Only a part of the Decision Logic Diagram will normally be visible on the screen at one time since the size of the screen where diagram editing is performed is not usually the same size as the paper on which the diagram will be printed. Use the Zoom Actual option to see a portion of the diagram with the icons the same size as they will be when plotted. You may move the view of the screen by means of the pan bars along the bottom and right of the screen to see any portion of the diagram that you wish.

In order to see as much as practical of a Decision Logic Diagram while still seeing all of the icon names you will normally work on it at Actual size; this is the default size that is used when you initially create a new diagram.

You must have opened a diagram on the Decision Logic Diagram screen in order to use the Zoom option. Move the arrow cursor to the Zoom Menu header (near or on the word Zoom) and click a mouse button. The Zoom options will appear under the Zoom Menu header; Actual is the third option on the list. Select the Actual option by moving the cursor so that Actual is highlighted and click a mouse button; the menu options will disappear and the screen will be redrawn so that the icons will be labeled and be the size they will be when they are printed or plotted.

The diagram should appear the same size as the default size after using the Zoom Actual option.

To shrink the size of a diagram to ½ its current size use the Zoom ½× option.

Often a diagram will be too big to see the components and their relationship on a diagram; the Zoom ½× option provides the means to shrink the diagram by 50%. The option may be repeated and the diagram shrunk even smaller or used before or after other Zoom options. Use the ½× option to 'undo' the 2× option.

You must have opened a diagram on the Decision Logic Diagram screen in order to use the Zoom ½× option. Move the arrow cursor to the Zoom Menu header (near or on the word Zoom) and click a mouse button. The Zoom options will appear under the Zoom Menu header; ½× is the fourth option on the list. Select the ½× option by moving the cursor so that ½× is highlighted and click a mouse button; the menu options will disappear and the screen will be redrawn so that the icons will be half the size they were before the option was selected.

It is possible to reduce the size of the diagram to the point where it almost disappears and doesn't serve much function. You will have problems with your diagram if you try to edit any of its icons when it is in a very reduced size and if you Create an icon you will have minimal control over its position with respect to other icons on the diagram.

To expand the size of a diagram to twice its current size use the Zoom 2× option.

Often a diagram will be too small to easily edit the components and their relationship on a diagram; the Zoom 2× option provides the means to expand the diagram to twice its size. The option may be repeated and the icons made even larger or it may be used before or after other Zoom options. The 2× option may be used as an 'undo' of the ½× option.

You must have opened a diagram on the Decision Logic Diagram screen in order to use the Zoom 2× option. Move the arrow cursor to the Zoom Menu header (near or on the word Zoom) and click a mouse button. The Zoom options will appear under the Zoom Menu header; 2× is the fifth option on the list. Select the 2× option by moving the cursor so that 2× is highlighted and click a mouse button. The menu options will disappear and the screen will be redrawn so that the icons will be twice the size they were before the option was executed; only half as much of the diagram will be displayed on the screen.

If you repeatedly apply the 2× option to a diagram you will eventually not see any of the icons for the diagram on the screen. If you add icons to the diagram when it is this size you will not be able to see them since they will be enlarged to be the same size as other icons.

To enter the zoom factor at which you want the diagram displayed select the Enter Zoom option. This is an absolute zoom factor. If 1.0 is entered, it is the same as Actual.

This option allows an arbitrary zoom factor to be entered so that a diagram may be displayed at any size. This is an absolute zoom factor. If 1.0 is entered, the result is the same as selecting the Actual option.

You must have opened a diagram on the Decision Logic Diagram screen in order to use the Enter Zoom option. Move the arrow cursor to the Zoom Menu header (near or on the word Zoom) and click a mouse button. The Zoom options will appear under the Zoom Menu header; Enter Zoom is the sixth option on the list. elect the Enter Zoom option by moving the cursor so that 'Enter Zoom' is highlighted and click a mouse button; the menu options will disappear and the Zoom Factor dialog box will be displayed with the current zoom factor. Enter a larger or smaller value and press the F5 key to register your selection.

A non-positive zoom factor is not permitted.

To change the size of a diagram to 75% of its actual size use the Zoom 75% option. This option is useful if you want to decrease the size of the whole diagram somewhat but not necessarily to ½ its original size. It is easier to place icons on a diagram appropriately when the whole diagram is visible at one time; this can be done with the Zoom Fit Screen option; parts of the diagram may be off the screen at this size but be visible after using the Zoom 75% option.

Often a diagram will be too big to see the components and their relationship on a diagram; the Zoom 75% option provides the means to shrink the diagram to 75% of its actual size; the arrow icon names will not be displayed at this size and only a portion of the data S/S and process box names will be displayed along with the ID's for the data S/S and process box icons.

You must have opened a diagram on the Decision Logic Diagram screen in order to use the Zoom 75% option. Move the arrow cursor to the Zoom Menu header (near or on the word Zoom) and click a mouse button. The Zoom options will appear under the Zoom Menu header; 75% is the seventh option on the list. Select the 75% option by moving the cursor so that '75%' is highlighted and click a mouse button. The menu options will disappear and the screen will be redrawn so that the icons will be ¾ the size they were if the Actual option was chosen. Usually the entire diagram will be displayed on the screen.

Help in MetaVision is a context sensitive system that closely mirrors the documentation presented here. You enter the HELP system by placing the cursor on the word HELP in the far right of the menu options along the top of the screen and click a button on the mouse.

A Help window will be displayed in the middle of the screen which contains three items across the top HELP, HELP, and CANCEL. The left HELP may be used for accessing the information contained in this section on how to use the HELP system. The HELP in the top-center of the window identifies that you are in the help system. You may leave the help system by placing the cursor on CANCEL in the upper left of the window and clicking a button on the mouse.

A list of the help topics that relate to the currently displayed set of menus is displayed when the help system is initially invoked. You pick the topic on which you desire help by highlighting the topic and clicking a button on the mouse. When you have picked a topic, the subtopics or text relating to the topic you chose will be displayed. If there are more topics or text than will fit on the screen you may move down the list or text by placing the cursor on the downward pointing arrow in the lower right corner of the window and clicking a button on the mouse. Similarly, you may move up the list of topics or text by placing the cursor on the upward pointing arrow in the upper right of the help system window.

The four options listed along the bottom of the help system window allow you to see help on other topics. Placing the cursor on 'NEXT' will display the topics or text for the topic which immediately follows the currently selected topic. Placing the cursor on 'PREV' will display the topics or text for the topic which is immediately previous to the currently selected topic.

Choosing the 'LEVEL UP' option moves you to the set of topics of which the currently selected topic is a member. 'RELATED TOPICS' displays a selection list of topics that are related to the option for which help is currently displayed.

If the screen has some 'ragged' portions after editing, place the cursor on the Repaint Menu header on the far right of the Menu Header line and click a button on the mouse. The screen will be redrawn to reflect only the information in the database.

The Plotting Option provides the capability of producing hardcopy output of any diagram produced using MetaVision. The diagram may be sent to a plotter or printer. The diagram to be plot/printed is selected from the available diagrams by means of a selection list box. A number of formatting options are provided by means of a dialog box labeled 'Plot Information'. Input fields on the dialog box are used to record: Text Size, Title Size, Zoom Factor, Left Margin, and whether the output is to be sent to a plotter or printer.

Choose the Plotting option under the Activity Menu heading on the Main Menu screen to print or plot a MetaVision diagram. A selection list box will be presented for the diagrams available to be plot/printed and you may select from this list in the normal manner. The dialog box labeled 'Plot Information' appears and you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/print process. When the process is complete the Activity Menu options will again be displayed and control will be returned to you.

The Text Size and Title Size fields must contain integer or decimal values greater than 0.

The Margin field must contain an integer or decimal value greater than 0.

The Zoom Factor field must contain an integer or decimal value greater than 0.

To exit the activities under a particular menu heading use the exit option. You will be returned to the main menu option from which you came. Placing the cursor on CANCEL in the upper right hand corner of the activity list will accomplish the same result.

The What If menu option under the main menu header CONTROL prints a report indicating the affected portions of your project if a process is omitted. The report may be printed to a file, the screen, or the printer.

To use the What If option under the CONTROL menu header pull down the menu under CONTROL by highlighting CONTROL and click a button on the mouse. The options Decision Logic Diagram, Goals & Objectives Diag., and What If will be displayed under CONTROL. Highlight What If by moving the cursor using the mouse and click a button on the mouse to activate the What If option.

A dialog window will appear that provides for inputting from the keyboard, or selecting from a list of available Process IDs, the Control ID for the process to be omitted for the report that follows. The window is entitled 'What If Control ID Change' and consists of the normal header functions F1: HELP, F3: LIST, F5: DONE, and F10: CANCEL, and a single input field Enter ID. You may either enter a Control ID and press F5 for done or press F3 to see a list of Control IDs and Control Names for the project on which you are working.

When you have entered a Control ID or selected one, a set of output options will be presented in a window. The options include: File, Screen, or Printer. Place the cursor in the box next to the desired option and click a mouse button. If you select the File option a dialog window appears that is used for inputting the name of the output file. The window is simply entitled File: and the input field is labelled Path Name:. Enter a complete file name including drive and path specifications and press F5.

If you select the Printer option the report will be sent to the printer. Note that the report requires that you have your printer set for at least 132 columns wide so that the report will be printed with a report row on a single row of output.

If you select the Screen output option the report will be printed to your screen. Several options are provided for viewing the report on your screen including Line, Screen, Pan, Window, Continuous, Restart, and Quit.

Whichever output you select the report will have the general form of the following which has been modified by minimizing spaces in columns to make the report fit on the page here. The items listed in each column are the names of the PROCESS, DATA, CONTROL, or SUPPORT that will be affected by deletion of the chosen Control ID.

The SUPPORT function in MetaVision allows you to create, check, view, and print organization charts, and to list and report on Terms/Issues/Problems for your project, and to manipulate this data in various ways.

Job Roles are added to your organization chart by moving the cursor to the job role icon (a rectangle) under the CREATE menu header so the area around the rectangle is highlighted and click a button on the mouse. Move the cross-hair cursor to a position on an Organization chart and click a button on the mouse.

A dialog window entitled Job Role Description will appear for input of Support ID, Support Type (Program/System or Person/Dept.), Title, Description of the job role, Location of the support and a Y or N in the Add Personnel Names field. The ID is of your choice and is the means by which the chart is identified in the MetaVision database. The Title is the title of the Job Role. If you wish to add the names of the persons who fill the job role in your organization place a Y in the last field, otherwise, an N.

If you place a Y in the Add Personnel Names field of the Job Role Description dialog window a second dialog window will appear that is entitled Personnel Name which contains two input fields: Personnel and Add More Personnel. The Personnel Name is the name of the person filling the job role that is being added to your diagram. You should fill the second input field with a Y if you wish to add more person's names at this time. Otherwise, the default of N should be left and you accept the data as entered by pressing F5:DONE. The icon will appear on the diagram in the position of your cross- hairs.

You may add other Job Role icons at this time or revert to the arrow cursor by moving the crosshair cursor to a position off the diagram and clicking a button on the mouse.

To connect two job roles with a Report To icon place the arrow cursor on the Report To icon (a solid line) and click a button on the mouse. Move the cross-hairs cursor to a side of a previously placed icon representing an organizationally superior job role; click a mouse button; move to the subordinate Job Role involved and click a mouse button again. It is then necessary to click on the two sides a second time to create the Report To Icon. To go around obstacles, simply click on the turning points you would like the lines to make. The system will suggest turning points if you simply click on the sides of the boxes where the connection should emanate.

If you try to connect the same two sides of two boxes that are already connected, the error window 'Connection already exists.' will appear, and you must click on 'Continue' to resume.

Creating a Matrix To icon (the broken line) works the same way as for a Reports To icon except that you first click on the Matrix To icon in the CREATE column instead of the Reports To icon (i.e., the broken line instead of the solid line).

To include text on a Organization Chart wherever desired use the Text icon.

Text may be placed anywhere on your Organization Chart by clicking the cursor on the word 'Text' under the menu header Create, positioning the cross hairs where you want the text to appear, and entering the text in the Text field on the Free Text dialog window. The Free Text dialog window consists of the normal header options and one system generated and five input fields. ID: a system generated field that is three characters and should be accepted as is. Justification: a one character field that may have the value 'L', 'C', or 'R'. An 'L' indicates that the text will start at the vertical line of the cross-hairs cursor; an 'R' indicates that the text will end at the vertical line of the cross-hairs cursor; and a 'C' indicates that the text will be centered on the vertical line of the cross- hairs cursor. The default of C is indicated when the window initially appears. Size: a one digit number that indicates the relative size of the text; the default of 1 is initially displayed. Text: a fifty character field that contains the text to be placed on the Process Diagram. Any non-null alphanumeric string up to fifty characters is supported. You may create longer text strings by placing shorter ones next to each other on the Organization Chart.

Color, Font, Extended, and Intensity are planned future enhancements and are not currently functional.

Place the arrow cursor on the word Text under the Create menu header on the Process Diagram Screen and click a mouse button; the cross-hair cursor will appear. Move the cross-hair cursor to the position on the Organization Chart where the text is to be placed and click a mouse button. The Free Text dialog window will appear; the Id field should be accepted as it is and you should change the Justification to L or R if desired. Enter a digit in the size field if the default of 1 is not desired. Enter Text in the Text field and press F5 to have the text placed on the Process Diagram.

After the text has been placed on the Process Diagram, the cross-hairs cursor will again be available so that you can include other text on your Process Diagram. To discontinue placing text on your Process Diagram position the cursor on the border of the screen and click a mouse button or press F10 when the Free Text dialog window is displayed.

'ID is invalid.' will be displayed in the error message window if anything other than a positive integer is entered in the Id field.

'ID already exists.' will be displayed in the error message window if the Id is changed to the value of a previous Id.

'Text may not be blank.' will be displayed in the error message window if you forget to enter the text and hit F5. To exit the window without entering text, hit F10.

'Justification must be L, C, or R' will be displayed in the error message window if you enter anything other than an L, C, or R in the Justification field. These are the only justification options supported.

'Size must be >0' will be displayed in the error message window if you enter anything other than a non-zero digit in the Size field.

You can enter text on top of other text or on top of other Icons; there are probably few good reasons to do such things and it is a good idea not to because editing functions such as Move and Delete require that the relevant text be identified by pointing. It may well become difficult to point at the required text or icon if they are overlapping.

Manage your diagrams using this option by adding new ones and deleting obsolete ones. Open a diagram for modification using this option. This option should be accessed first when the Process Diagram screen appears.

If you attempt to choose other options from the Tool Menu without having chosen appropriate items from the Diagram menu, you will be given an error message and denied access to the other option.

The Open Option exists under the DIAGRAM Menu header on the Organization Chart screen and opens an existing Organization Chart for modification. When the mouse is clicked on the Open option a pop-up screen appears which lists the Organization Chart ID and Names of as many of the previously created diagrams as will fit in the window at a time. The pop-up window consists of a header line with HELP and CANCEL, the title, 'Organization Charts' and a list of the available Organization Charts listed below the title. Pan arrows are present in the upper right and lower right hand corners of the Organization Chart ID - Name list to make it possible to see any of the diagram ID - Names that do not fit in the window. Placing the cursor arrow on one of the pan arrows and clicking the mouse moves the list of diagram ID - Names in the direction of the arrow.

Placing the cursor arrow on one of the diagram titles highlights the title, and, if the mouse is clicked, draws that diagram on the screen for editing.

You must be in the Organization Chart Screen to use the Open Diagram option; it doesn't matter whether or not another Organization Chart is open to use this option. If you are in the Organization Chart Screen and you wish to open an Organization Chart, then, using the mouse, place the arrow cursor so that the DIAGRAM Menu header is highlighted and click the mouse; if another menu is pulled down you will have to click the mouse a second time since the first only pulled up the previous menu.

Menu options that include 'Open' will appear under the menu header; move the arrow cursor to the Open option using the mouse and, when it is highlighted, click the mouse. When the list of available Organization Charts ID - Names appears, place the arrow cursor so that the desired title is highlighted and click the mouse. If more diagram titles exist than will fit on the screen, then use the pan arrows to move the list until the desired ID - Name is visible in the window, highlight the ID - Name and click the mouse. The message 'One Moment Please . . . ' will appear in the center of the screen and shortly the specified diagram will appear.

If you click the mouse when the cursor is any place other than those for which a function is prescribed, nothing happens.

If you click the mouse on the pan arrows when the list of ID - Names cannot be moved in the direction specified because the list does not proceed any further in that direction, nothing happens.

If you attempt to open a diagram when none have been previously created for this project you will receive the message 'No entries to choose.'; You must click the mouse when the cursor is on 'Continue' to resume your work.

If you select an Organization Chart ID - Name in the manner described you should have the corresponding diagram appear without problem.

The New Option exists under the DIAGRAM Menu header on the Organization Chart Screen and clicking the mouse when it is highlighted causes a pop-up window to appear that is used to input identifying and descriptive information for the new diagram. The pop-up window consists of a header line, the title 'New Organization Chart', and a body which consists of two fields for input. The header line consists of the four functions: 'F1: HELP, F3: LIST, F5: DONE, F10: CANCEL'.

The body of the diagram consists of two input fields: the Diagram ID and the Diagram Name. The Diagram Name may be up to 50 characters and is the title that will be displayed on the top of the Organization Chart and in various other places; this is not a required field but a value here is strongly suggested to aid in keeping track of your diagrams. The Diagram ID consists of up to 4 characters and is the MetaVision identifier for the Organization Chart being created; this a required field.

You must be in the Organization Chart Screen to use the New Diagram option; it doesn't matter whether or not another Organization Chart is open to use this option. If you are in the Organization Chart Screen and you wish to open a new Organization Chart, then using the mouse place the arrow cursor so that the DIAGRAM Menu header is highlighted and click the mouse; if another menu is pulled down you will have to click the mouse a second time since the first only pulled up the previous menu.

The menu options that include 'New' will appear under the menu header; move the arrow cursor to the New option using the mouse and, when it is highlighted, click the mouse. After the New Organization Chart window has appeared in the center of the screen, fill in the input fields and press F5 to create a new diagram with the displayed identifying and descriptive fields or press F10 to cancel the addition of a diagram at this time. If you pressed F5 and did not receive any error messages, an Organization Chart will appear with the ID and name that you have just entered.

To save all additions and changes to diagrams since the last save use the Save option.

The Save option is under the Diagram Menu header and saves all changes that have been made to any diagrams since the last save.

Position the cursor on the Diagram Menu header and click a mouse button. The Diagram Options will be displayed in a pull-down menu. Move the cursor to the Save option and click a mouse button again. The changes made to any diagrams since you invoked the Diagramming option on the Activity menu or last issued a Save will be made permanent. When the process is complete the control of the cursor will be returned to you.

It is a mistake NOT to use the Save option occasionally to save your work to insure against power or program failures.

To undo any changes that have not been made permanent by means of the Save Option or upon exiting a diagram using the Quit option use the Undo.

The Undo option is a means of retracting a set of changes without having to retract each component of the changes. This capability only exists for entries, additions, changes, and deletions that have been made since the last save option was performed.

Position the cursor on the Diagram Menu header and click a mouse button. The Diagram options will be displayed in a pull-down menu. Move the cursor to the Undo option and click a mouse button again. The pop-up window 'Are you sure?' will be displayed, and you must choose Yes or No. If you choose Yes, any changes made to any diagrams since you invoked the Diagramming option on the Activity menu or used the Save option will be lost and the diagram returned to the state that existed when you entered or last saved the diagram, whichever was more recent. When the process is complete the control of the cursor will be returned to you.

Be certain that you really want to perform an undo of all work since you last saved your work since invoking this option causes ALL work since your last save to be irrevocably deleted.

To stop work on one diagram and begin work on another use the Close option.

The Close option removes a diagram from the screen and returns you to a state where you may add or open another diagram. The pop-up window Select: Save, Undo, Exit will appear, and you should choose the desired option. If you choose Exit, all changes made to the currently open diagram will remain in effect as temporary changes until the temporary files are made permanent when the Quit option is executed. They will be erased if you perform an Undo option at the Diagram level.

Position the cursor on the Diagram Menu header and click a mouse button. The Diagram options will be displayed in a pull-down menu. Move the cursor to the Close option and click a mouse button again. Be careful not to use the Close, Exit option and think that changes made to the diagram are permanent when you have not used the Save option. Any Undo option will remove all changes made since the last Save on all diagrams.

The Delete Option exists under the DIAGRAM Menu header on the Organization Chart Diagramming screen and deletes an existing Organization Chart. When the mouse is clicked on the Delete option a pop-up screen appears which lists the Organization Chart ID and Names of as many of the previously created diagrams as will fit in the window at a time. The pop-up window consists of a header line with HELP and CANCEL, the title, 'Organization Charts' and a list of the available diagrams listed below the title. Pan arrows are present in the upper right and lower right hand corners of the Process Diagram ID - Name list to make it possible to see any of the diagram ID - Names that do not fit in the window. Placing the cursor arrow on one of the pan arrows and clicking the mouse moves the list of diagram ID - Names in the direction of the arrow. Placing the cursor arrow on one of the diagram titles, highlights the title and if the mouse is clicked, the corresponding diagram and all associated information is deleted from the MetaVision system.

The Quit Option exists under the DIAGRAM Menu header in the Diagram screen and causes the current process diagram to be closed and the Main Menu Screen to be displayed.

You must be in the Diagram Screen to use the Quit option. If you are in the Diagram Screen and you wish to access another part of MetaVision, then, using the mouse, place the arrow cursor so that the DIAGRAM Menu header is highlighted and click the mouse; if another menu is pulled down you will have to click the mouse a second time since the first only pulled up the previous menu.

The menu options that include 'Quit' will appear under the menu header; move the arrow cursor to the Quit option using the mouse and, when it is highlighted, click the mouse. The Main Menu Screen will be displayed after a few seconds; the message 'One Moment Please . . . ' will initially be displayed in the center of the screen but any of the options on the MAIN MENU Screen will presently be available. If you wish to exit MetaVision completely at this time you may move the arrow cursor to the Project Menu and pick the Quit option there.

Use this option to modify components already appearing on a diagram by moving, swapping, deleting, or changing database information concerning that component.

To change information relating to a process diagram icon use the Change option under the Edit Menu header.

The Change option is the first option under the Edit Menu header; it permits changing information relating to an icon that exists on the Organization Chart Diagram that is currently open. (Except for ID fields, any information field associated with any of the icons on the diagram may be changed using the Change option.

Information is edited via dialog windows that are the same as the original input screens used at the time of creation of the icons.

Note that the change option is only for changing already existing data, not for adding new icons or deleting them or changing their position on the diagram; for the add functions use the CREATE menu; for the other two use the Delete or Move options on the Edit Menu. The options on the dialog window header lines have interpretations similar to their normal ones with the following differences: F5: DONE has the function of entering the changes made into the system database for that icon; and F3: LIST displays the icons of the same type but does not allow choosing one of them; they are displayed for your information only.

You must have opened a diagram on the Organization Chart Diagram screen in order to edit the information for icons. Move the arrow cursor to the Edit Menu header (near or on the word Edit) and click a mouse button. The Edit options will appear under the Edit Menu header; move the arrow cursor so the Change option is highlighted and again click a mouse button. The Edit options will be removed and a hand cursor will replace the arrow cursor; move the hand cursor so that it points to the label of the icon for which you wish to change information and click a mouse button. The icon you have pointed at will be highlighted and the dialog window for that type of icon will appear.

Enter information in the fields of the dialog window just as you would when creating them except that you cannot modify the value in the ID field. When you are done press F5:DONE to have the changes go into effect; the system files will be updated and the modified icon will be displayed on the diagram. The hand cursor will still be available so that you can move to another icon and change the information associated with it.

If you click the hand cursor on a connecting line, the cross-hairs will appear and you will be able to reroute your connection.

When you are done changing information for icons, move the hand cursor off the diagram to the border of the screen and click a mouse button to have the arrow cursor reappear.

If you attempt to change the ID field for any icon, a pop-window with the error message 'ID change not yet implemented—use delete and add.' will be displayed and you must move the cursor to the word 'continue' and click a mouse button to resume.

To remove an icon from the diagram that is being displayed use the Delete option under the Edit Menu header.

The Delete option is the second option under the Edit Menu header; it permits deleting any of the icons on a diagram. In addition to deleting the icon pointed to other icons may also be deleted from the diagram in order to maintain the integrity of the relationships between the icons on the diagram.

When a box is deleted, all arrow icons connected to it are also deleted. This option is very powerful and the results of its use are permanent after the Diagram Save option is invoked so care should be exercised that only the desired icons are removed using it. (You may of course recreate the deleted icons but this may be difficult or impossible if there is no hardcopy of the diagrams on which they appear.)

You must have opened a diagram on the Organization Chart Diagram screen in order to delete icons. Move the arrow cursor to the Edit Menu header (near or on the word Edit) and click a mouse button. The Edit options will appear under the Edit Menu header; move the arrow cursor so the Delete option is highlighted and again click a mouse button. The Edit options will be removed and a hand cursor will replace the arrow cursor; move the hand cursor so that it covers part of the name of the icon to be deleted and click a mouse button. The icon will be deleted along with any of the other icons that must be deleted to maintain the integrity of the diagram.

The hand cursor will still be available to be used to delete other icons on the diagram. When you are done deleting icons on a diagram, move the hand cursor so that it is in a border area on the screen and click a mouse button; the arrow cursor will replace the hand cursor. Occasionally the Organization Chart Diagram will appear a bit 'ragged' after an icon is deleted with a stray line or text; these may be removed by using the Repaint Menu option found on the far right of the Organization Chart Diagram screen.

There are no error messages that are displayed with this option; if you delete something, it is deleted. It is a mistake to delete an icon that you don't wish to delete because you will have to recreate the icon and any icons deleted along with it if you 'accidentally' delete one by mistake, unless you invoke the Undo option to remove all changes to the diagram since your last Save.

To reposition an icon on a Organization Chart Diagram for visual appeal and/or readability use the Move option under the Edit Menu header on the Organization Chart Diagram screen.

The Move option under the Edit Menu header is used to reposition icons on a Organization Chart Diagram page. Any icon may be moved to any position on the diagram that is visible; all connections between that icon and other icons on the diagram will be maintained. A hand cursor is used to indicate the icon to be moved. When a mouse button is clicked with the hand cursor on an icon, the icon is highlighted and may be moved to any position visible on the screen. Clicking a mouse button again causes the highlighted icon to be redrawn in the new position and all of the arrow icons to which it is connected are also redrawn so that the connections are rerouted but maintained as they were before the icon was moved.

If an over-all perspective of icons on an Organization Chart Diagram page is needed in order to position the icons on the page, use the Zoom Menu options to make the whole diagram page visible on the screen: the page outline is indicated by the (yellow) border line. Move the icons on the page to the position desired and then again use the Zoom Menu options to return the icons to full size.

You must have opened a diagram on the Organization Chart Diagram screen in order to edit the information for icons. Move the arrow cursor to the Edit Menu header (near or on the word Edit) and click a mouse button. The Edit options will appear under the Edit Menu header; move the arrow cursor so the MOVE option is highlighted and again click a mouse button. The Edit options will be removed and a hand cursor will replace the arrow cursor; move the hand cursor so that it is over part of the icon name and click a mouse button. A highlighted image will be 'attached' to the cursor and you may move it to anyplace on the screen; clicking the mouse again will cause the icon to be repositioned in that location and all other connecting arrow icons will be redrawn so that they maintain the same connections but with different routings.

After the affected portions of the diagram have been redrawn, the hand cursor will still be available so that you can move it to another icon and move it without having to return to the Edit Menu header. To discontinue the move option place the hand cursor so that it is in a border area and click a mouse button; the hand cursor will be replaced by the arrow cursor and the move option will no longer be in effect. If the screen has some 'ragged' portions after moving an icon, place the arrow cursor on the Repaint Menu header on the far right of the Menu Header line and click a mouse button; the screen will be redrawn to reflect only the information in the database.

Icons may be placed on top of one another but this is not advised since it will probably be difficult to separate them later; there should be no need to do this under normal circumstances.

It is possible to move icons outside the border of the page by moving them beyond the yellow boundary lines which indicate the edges of the page. Portions of the diagram beyond the edges of the page will not be printed or plotted.

You must have opened a diagram on the Organization Chart Diagram screen in order to use the swap option. Move the arrow cursor to the Edit Menu header (near or on the word Edit) and click a mouse button. The Edit options will appear under the Edit Menu header; move the arrow cursor so the Swap option is highlighted and again click a mouse button. The Edit options will be removed and a hand cursor will replace the arrow cursor; move the hand cursor so that it is over part of the personnel name and click a mouse button; the personnel will be highlighted. Move the hand cursor to the other personnel name to be swapped with the first and again click a mouse button.

The positions of the two personnel names will be reversed; the one originally on top will now be on the bottom and vice versa. The hand cursor will remain so that you may swap other personnel name positions if desired; if you do not want to swap any more positions at this time, move the hand cursor to any position on the border of the screen and click a mouse button to leave the Swap mode and cause the arrow cursor to return.

You can only swap personnel within the same Job Role Box. If you attempt to swap in two different boxes, the error window 'Personnel must belong to the same Job Role' will appear and you will have to click on Continue to resume.

Use this option to redraw the diagram in the window at some factor smaller or larger than its current size.

To enlarge a portion of the organization chart that is on the screen so that it fills the entire screen use the Zoom Arbitrary option. This option is useful for focusing your attention on one portion of the screen and enlarging it to fill the whole screen so that editing is easier.

It is often desirable to enlarge a portion of an organization chart so that it fills the entire screen to make editing of that portion of the diagram easier. The enlarged portion will fill the screen with as much of the diagram as was outlined during the execution of the Arbitrary option. Names will not be enlarged but will occupy their normal positions in the center of the organization chart box. The normal Create, Diagram, Edit, Zoom, Setup, Hypertext, Repaint, and Help options are available on the enlarged diagram.

You must have opened a diagram on the organization chart screen in order to enlarge a portion of the diagram. Move the arrow cursor to the Zoom Menu header (near or on the word Zoom) and click a mouse button. The Zoom options will appear under the Zoom Menu header; 'Arbitrary' is the first option on the list. Select the Arbitrary option by moving the cursor so 'Arbitrary' is highlighted and clicking a mouse button; the menu options will disappear and a cross-hairs cursor will appear. Move the cross-hairs cursor to a corner of the portion of the screen to be enlarged and click a mouse button; any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged; vertical and horizontal lines will appear as the cursor is moved to indicate the bounds of the portion that will fill the screen. Click the mouse a second time to establish the size and extent of the portion of the diagram to be enlarged; the portion outlined will be enlarged to fill the screen.

A portion of the enlarged diagram may again be expanded using the Arbitrary option though this will usually not be wise or necessary as discussed more in the Mistakes section below; the Zoom ½× and 2× options may also be used on the results of using the Arbitrary option.

Mistakes are not identified as such explicitly by the system for this option; some actions, however, are not recommended or motivated.

If you move the cross-hairs cursor to a spot and click a mouse button twice on that same spot the diagram will be redrawn without any changes.

If you move the cross-hairs cursor to a spot on the border of the screen and click a mouse button the diagram will be redrawn without any changes.

Expanding an organization chart so that nothing is showing on the screen is not usually a good idea since you will not see the relation of the expanded portion to other icons.

If you expand a portion of a diagram that all lies within a job role box and then create a job role box on the expanded screen, the edges of the new job role box will not be visible and when you return to a more standard size the new job role box will partially or completely overlap the original so that it may be difficult to separate the two boxes.

To see and edit the entire organization chart on the screen at one time no matter what its size use the Zoom Fit Screen option. This is desirable before printing so that you have a clear idea of what the diagram and the placement of the components will look like when plotted.

The complete organization chart may be viewed on the screen at one time by means of the Zoom Fit Screen option. Appropriate magnification factors are calculated by the system to make the diagram fit on the screen; the yellow line that appears indicates the boundaries of the page on which the diagram fits. The page size is determined by the Setup Menu option. The diagram will not always fill the screen if its height or width proportions are extreme but the boundaries of the diagram will always be visible.

If you change the page size, the Zoom Fit Screen option will have to be executed again to fit the new page size on the screen. Many or all of the icon names may be suppressed so that you will not be able to identify the individual icons except by their shape, position, and your memory; you can, however, still edit them in the normal way.

You must have opened a diagram on the Organization Chart Diagram screen in order to enlarge a portion of the diagram. Move the arrow cursor to the Zoom Menu header (near or on the word Zoom) and click a mouse button. The Zoom options will appear under the Zoom Menu header; Fit Screen is the second option on the list. Select the Fit Screen option by moving the cursor so 'Fit Screen' is highlighted and clicking a mouse button; the menu options will disappear and the screen will be redrawn so that the boundaries of the diagram, indicated by yellow lines, will appear with either the horizontal or vertical lines (perhaps both) near the boundary of the screen work area.

If the page size is much greater in one dimension than in the other, e.g., 30 by 7.5 inches, the Fit Screen option will not be very helpful since the page will be too narrow to display the icons in a recognizable way. If you do want the page dimensions to be very different it would be better to use other Zoom options such as Arbitrary and ½× to place the icons on the page; the Fit Screen option could be used in selecting a portion of the page to edit at a larger size.

To enlarge or shrink a diagram so that the icons will be displayed on the screen the same size as they will be on the plot of the diagram use the Zoom Actual option; this size includes all of the names associated with the various icons.

Only a part of the organization chart will normally be visible on the screen at one time since the size of the screen where diagram editing is performed is not usually the same size as the paper on which the diagram will be printed. Use the Zoom Actual option to see a portion of the diagram with the icons the same size as they will be when plotted. You may move the view of the screen by means of the pan bars along the bottom and right of the screen to see any portion of the diagram that you wish.

In order to see as much as practical of an organization chart while still seeing all of the icon names you will normally work on it at Actual size; this is the default size that is used when you initially create a new diagram.

You must have opened a diagram on the Organization Chart Diagram screen in order to use the Zoom option. Move the arrow cursor to the Zoom Menu header (near or on the word Zoom) and click a mouse button. The Zoom options will appear under the Zoom Menu header. Select the Actual option by moving the cursor so that Actual is highlighted and click a mouse button; the menu options will disappear and the screen will be redrawn so that the icons will be labeled and be the size they will be when they are printed or plotted.

The diagram should appear the same size as the default size after using the Zoom Actual option.

To shrink the size of a diagram to ½ its current size use the Zoom ½× option.

Often a diagram will be too big to see the components and their relationship on a diagram; the Zoom ½× option provides the means to shrink the diagram by 50%. The option may be repeated and the diagram shrunk even smaller or used before or after other Zoom options. Use the ½× option to 'undo' the 2× option.

You must have opened a diagram on the organization chart screen in order to use the Zoom ½× option. Move the arrow cursor to the Zoom Menu header (near or on the word Zoom) and click a mouse button. The Zoom options will appear under the Zoom Menu header. Select the ½× option by moving the cursor so that ½× is highlighted and click a mouse button; the menu options will disappear and the screen will be redrawn so that the icons will be half the size they were before the option was selected.

It is possible to reduce the size of the diagram to the point where it almost disappears and doesn't serve much function. You will have problems with your diagram if you try to edit any of its icons when it is in a very reduced size and if you Create an icon you will have minimal control over its position with respect to other icons on the diagram.

To expand the size of a diagram to twice its current size use the Zoom 2× option.

Often a diagram will be too small to easily edit the components and their relationship on a diagram; the Zoom 2× option provides the means to expand the diagram to twice its size. The option may be repeated and the icons made even larger or it may be used before or after other Zoom options. The 2× option may be used as an 'undo' of the ½× option.

You must have opened a diagram on the organization chart screen in order to use the Zoom 2× option. Move the arrow cursor to the Zoom Menu header (near or on the word Zoom) and click a mouse button. The Zoom options will appear under the Zoom Menu header. Select the 2× option by moving the cursor so that 2× is highlighted and click a mouse button. The menu options will disappear and the screen will be redrawn so that the icons will be twice the size they were before the option was executed; only half as much of the diagram will be displayed on the screen.

If you repeatedly apply the 2× option to a diagram you will eventually not see any of the icons for the diagram on the screen. If you add icons to the diagram when it is this size you will not be able to see them since they will be enlarged to be the same size as other icons.

To enter the zoom factor at which you want the diagram displayed select the ZOOM Enter Zoom option. This is an absolute zoom factor. If 1.0 is entered, it is the same as Actual.

This option allows an arbitrary zoom factor to be entered so that a diagram may be displayed at any size. This is an absolute zoom factor. If 1.0 is entered, the result is the same as selecting the Actual option.

You must have opened a diagram on the organization chart screen in order to use the Enter Zoom option. Move the arrow cursor to the Zoom Menu header (near or on the word Zoom) and click a mouse button. The Zoom options will appear under the Zoom Menu header. Select the Enter Zoom option by moving the cursor so that 'Enter Zoom' is highlighted and click a mouse button; the menu options will disappear and the Zoom Factor dialog box will be displayed with the current zoom factor. Enter a larger or smaller value and press the F5 key to register your selection.

A non-positive zoom factor is not permitted.

To change the size of a diagram to 75% of its actual size use the Zoom 75% option. This option is useful if you want to decrease the size of the whole diagram somewhat but not necessarily to ½ its original size. It is easier to place icons on a diagram appropriately when the whole diagram is visible at one time; this can be done with the Zoom Fit Screen option; parts of the diagram may be off the screen at this size but be visible after using the Zoom 75% option.

Often a diagram will be too big to see the components and their relationship on a diagram; the Zoom 75% option provides the means to shrink the diagram to 75% of its actual size.

You must have opened a diagram on the organization chart screen in order to use the Zoom 75% option. Move the arrow cursor to the Zoom Menu header (near or on the word Zoom) and click a mouse button. The Zoom options will appear under the Zoom Menu header. Select the 75% option by moving the cursor so that '75%' is highlighted and click a mouse button. The menu options will disappear and the screen will be redrawn so that the icons will be ¾ the size they were if the Actual option was chosen. Usually the entire diagram will be displayed on the screen.

Use this option to set the size of the diagram, shift the entire diagram on the page, and set the grid for the diagram.

The Page Size option exists under the SETUP menu header. It provides the capability of changing the size of the diagram page that appears on the screen or that will be printed or plotted. Edges of the page are indicated on the screen by means of a thin (yellow) line. Page sizes are connected to each diagram independently, so they need to be set for each diagram if they differ from the default values.

You must have opened a diagram on the Organization Chart Diagram screen in order to set the page size using the SETUP Page Size option. Move the arrow cursor to the SETUP menu header and click a mouse button. The SETUP option Page Size will be highlighted under the SETUP menu header; click a mouse button a second time to invoke the option.

The Page Size dialog window will appear; it consists of a header line, the title 'Page Size' and 2 input fields. The header line includes the normal functions. The body of the window consists of two input fields, Page Width and Page Height, which are each 7 digits. The values input should be numbers and may contain a decimal point; other non- numbers are not supported. Press F5 to have the new page size established. F10 will leave the dialog window without changing the size of the page. Shortly the diagram will be redrawn with the new page edges indicated by the thin (yellow) line. If the diagram doesn't fit on the resized page, it may be necessary to use the ZOOM Fit Screen option.

Diagrams are printed or plotted either rotated or not rotated, depending on whether the orientation is set to Portrait, which is the default value, or Landscape, which rotates the output 90 degrees clockwise from the way it appears on the screen. You need to take this into account when setting the page size using this option, especially if you want all of the diagram to print on a single page.

Another consideration in determining page size is whether the Paper is set to Narrow, which is the default value, or to Wide. In Narrow mode the diagram will be printed using a value of 8.5"×11" for the paper size and the printer driver will write on an 7.5"×10" area of the paper. In Wide mode the diagram will be printed using a value of 14"×11" for the paper size and the printer driver will write on a 13"×10" area of the paper. A consequence of this is that if you want to print a diagram on a single 8.5"×11" page using Portrait, the page size should not be more than 7.5"×10"; for Landscape, the page size should not be more than 10"×7.5". If the printout will not fit on a single sheet, the printer driver automatically continues printing or plotting on successive sheets; the parts of the page can then be cut and pasted together.

If the diagrams are to be presented in book form and a diagram cannot fit on a single page, it is usually best to print it in Portrait mode with the Page Width in increments of 7.5" and a Page Height of 10". This will allow the cut and pasted diagram to neatly fold out of the binder.

If you select the Page Size Option without having first opened a diagram, a pop- up error window will appear with the message 'Diagram not open'; you must click a mouse button with the cursor on 'Continue' to resume.

If you select the F3: LIST option in the dialog window, a pop-up error window will appear with the message 'No list available'; you must click a mouse button with the cursor on 'Continue' to resume.

If you enter a non-numeric value for any digit in the height or width field, a pop-up error window will appear with the message 'Illegal floating-point value'; you must click a mouse button with the cursor on 'Continue' to resume. Decimal points, not fractions, must be used for non-integer page sizes.

The Dgm. Shift option exists under the SETUP menu header. It provides the capability of shifting the entire diagram on the page.

You must have opened a diagram on the Organization Chart Diagram screen in order to shift the diagram on the page using the SETUP Dgm. Shift option. Move the arrow cursor to the SETUP menu header and click a mouse button.

The Diagram Shift dialog window will appear; it consists of a header line, the title 'Diagram Shift' and 2 input fields. The header line includes the normal functions. The body of the window consists of two input fields, X Shift and Y Shift, which are each 7 digits. The values input should be numbers and may contain a decimal point; other non-numbers are not supported. Press F5 to shift the diagram on the page by the input values. F10 will leave the dialog window without shifting the diagram. Shortly the diagram will be redrawn with the new page edges indicated by the thin (yellow) line. If the diagram doesn't fit on the shifted page, it may be necessary to use the ZOOM Fit Screen option.

If you select the Diagram Shift Option without having first opened a diagram, a pop- up error window will appear with the message 'Diagram not open'; you must click a mouse button with the cursor on 'Continue' to resume.

If you select the F3: LIST option in the dialog window, a pop-up error window will appear with the message 'No list available'; you must click a mouse button with the cursor on 'Continue' to resume.

If you enter a non-numeric value for any digit in the X Shift or Y Shift field, a pop- up error window will appear with the message 'Illegal floating-point value'; you must click a mouse button with the cursor on 'Continue' to resume. Decimal points, not fractions, must be used for non-integer shift values.

Grid

The Grid option exists under the SETUP menu header. It provides the capability of setting an invisible grid of variably-spaced vertical and horizontal lines to which the icons that you create will automatically snap when you create them.

You must have opened a diagram on the Organization Chart Diagram screen in order to set the grid using the SETUP Grid option. Move the arrow cursor to the SETUP menu header and click a mouse button. Move the arrow cursor to the Grid option and click again.

The Grid Status Dialog Box will appear; it consists of a header line, the title 'Grid Status' and 3 input fields. The header line includes the normal functions. The body of the window consists of three input fields, Grid Status, Grid X and Grid Y. Grid Status is a one-digit field which should contain either an 'I' for 'Inactive' or an 'A' for 'Active' as you prefer. The default value is 'I'. Either capital or lower case letters are acceptable. If anything other than an 'A' or 'I' is input, you will get the error message 'Grid Status must be 'A' or 'I' when you hit F5. The fields Grid X and Grid Y are each 5 digits. The values input should be numbers and may contain a decimal point; other non-numbers are not supported. Press F5 to place the invisible grid on the page. F10 will leave the dialog window without changing the previous grid status.

If you select the Grid Option without having first opened a diagram, a pop-up error window will appear with the message 'Diagram not open'; you must click a mouse button with the cursor on 'Continue' to resume.

If you select the F3: LIST option in the dialog window, a pop-up error window will appear with the message 'No list available'; you must click a mouse button with the cursor on 'Continue' to resume.

If you enter a non-numeric value for any digit in the Grid X or Grid Y field, a pop-up error window will appear with the message 'Illegal floating-point value'; you must click a mouse button with the cursor on 'Continue' to resume. Decimal points, not fractions, must be used for non-integer grid values.

The Hypertext Menu options allow you to view supporting information for any Icon.

To see the MetaVision supporting (non- graphic) information for any icon on a diagram use the HYPERTEXT View option. The information relating to the icon will be displayed in a window similar to the EDIT Change dialog window, except that no changes are permitted.

To invoke the HYPERTEXT View option, pull down the menu under the menu header HYPERTEXT by highlighting the option and clicking a button on the mouse. Then move the mouse so that the cursor moves to a position that highlights the option View and click a mouse button again. The arrow cursor will be replaced by a pointer cursor that may be moved using the mouse. Move the pointer cursor to the diagram whose corresponding database information you wish to examine and click a button on the mouse again.

A window will appear with the field values of information to which the icon corresponds. The field values are displayed in a format similar to the dialog window via which information for the icon was initially entered.

When you have finished examining the information that relates to an icon, press F5 or F10 to retain the pointer cursor on the screen so that you can point at another icon and examine information about it as well. To remove the pointer cursor and revert to the arrow cursor, click a button on the mouse when the cursor is in any border area.

Help in MetaVision is a context- sensitive system that closely mirrors the documentation presented here. Enter the HELP system by placing the cursor on the word HELP in the far right of the menu options along the top of the screen and click a button on the mouse.

A Help window will be displayed in the middle of the screen which contains three items across the top: HELP, HELP, and CANCEL. The left HELP may be used for accessing the information contained in this section on how to use the HELP system. The HELP in the top- center of the window identifies that you are in the Help system. You may leave the Help system by placing the cursor on CANCEL in the upper right of the window and clicking a button on the mouse.

A list of the Help topics that relate to the currently displayed set of menus is displayed when the Help system is initially invoked. Pick the topic on which you desire help by highlighting the topic and clicking a button on the mouse. When you have picked a topic, the subtopics or text relating to the topic you chose will be displayed. If there are more topics or text than will fit on the screen, you may pan down the list or text by placing the cursor on the downward-pointing arrow in the lower right corner of the window and clicking a button on the mouse. Similarly, you may move up the list of topics or text by placing the cursor on the up- ward- pointing arrow in the upper right of the Help system window.

The four options listed along the bottom of the Help system window allow you to see help on other topics. Placing the cursor on 'NEXT' will display the topics or text for the topic which immediately follows the currently-selected topic. Placing the cursor on 'PREV' will display the topics or text for the topic which is immediately previous to the currently selected topic.

Choosing the 'LEVEL UP' option moves you to the set of topics of which the currently selected topic is a member. 'TOPICS' displays a selection list of topics that are related to the option for which Help is currently displayed.

If the screen has some 'ragged' portions after editing, place the cursor on the Repaint Menu header on the far right of the Menu Header line and click a button on the mouse. The screen will be redrawn to reflect only the information in the database.

When the REPORT GENERATION option on the Activity List is selected, a list of the available reports is presented. When a report is selected, you will be asked whether to send the report to the Screen, to the default System Printer, or to a File.

If you choose to have the report sent to a file, you will be asked for the name of the file in which the report will be stored.

The following sections give a brief description and a sample of all the Support Reports.

The Organization Chart Report shows the Job Role information as well as the information about the individuals that perform the Job Role for each Diagram.

The Plotting Option provides the capability of producing hardcopy output of any diagram produced using MetaVision. The diagram may be sent to a plotter or printer.

The diagram to be plot/printed is selected from the available diagrams by means of a selection list box. A number of formatting options are provided by means of a dialog box labeled 'Plot Information'. Input fields on the dialog box are used to record: Text Size, Title Size, Zoom Factor, Left Margin, and whether the output is to be sent to a plotter or printer and if you wish to print all diagrams.

Choose the Plotting option under the Activity Menu heading on the Main Menu screen to print or plot a MetaVision diagram. A selection list box will be presented for the diagrams available to be plot/printed and you may select from this list in the normal manner. The dialog box labeled 'Plot Information' appears and you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/print process. When the process is complete the Activity Menu options will again be displayed and control will be returned to you.

The Text Size and Title Size fields must contain integer or decimal values greater than 0.

The Margin field must contain an integer or decimal value greater than 0.

The Zoom Factor field must contain an integer or decimal value greater than 0.

For each CONSTRAINT ID a CONSTRAINT DESCRIPTION is printed. If the diagram meets the constraint a sentence to that effect is printed. If the diagram does not meet the conditions of the constraint a list of the offending elements is typed with a sentence explaining how they violate the constraint.

A variety of types of constraint checks are possible. MetaVision prompts for these in turn with a dialog window that requires that a mouse button be clicked with the cursor on either Yes or No indicating that the type of validation check noted is to be performed.

The only query under Support is as follows:

Do database constraint validation?

A yes answer will produce a report with constraints identified.

The DATA DICTIONARY activity provides the capability of adding, modifying and deleting information in the MetaVision system support files directly via dialog windows instead of using the the DIAGRAMMING activity. All of the information needed to produce diagrams in MetaVision is stored in Dbase III compatible files. This includes information on the placement of icons and information normally entered via dialog windows. All of this information is directly accessible via the DATA DICTIONARY activity.

Choose this option by moving the arrow cursor so that DATA DICTIONARY is highlighted on the activity list and click a button on the mouse. The main menu screen will be replaced by another screen which contains the DATA DICTIONARY options, Add to File, Modify File, Delete File Elements, and Quit. Choose one of these options by moving the cursor so that the desired option is highlighted and click a button on the mouse.

A selection list will be presented from which you choose a file whose contents you wish to modify. Highlight the desired file name and click a mouse button. Then follow the directions for the specific option.

The Add to File option permits adding data directly to the MetaVision information stored in dBASE III database files. This is the same information that is normally updated via the diagram screens and dialog boxes.

When the Add to File option is chosen from the EDIT menu a selection list will be presented from which you choose a file to which additions are to be made. Move the cursor so that the desired file is highlighted and click a button on the mouse. A dialog window will be appear in which you can add new entries. The file list names, a brief description of each file and the information being effected, and windows are represented in the following.

The Job Role Titles and Persons updater is used to enter information on the Job Role ID and the Title for a job and the Persons filling that job. The first dialog window is entitled 'Job Role Description' and contains the following fields: Support ID, Support Type (P or S), Job Role Title, Description, Location, and Add Personnel Names that may only contain a 'Y' or 'N' indicating whether or not Personnel Names should be entered for the Job Role.

If a 'Y' is entered in the Add Personnel Names field a second dialog window will appear, the 'Personnel Information' updater. It consists of three fields; Personnel ID, Personnel Name and Add More Personnel. Place a 'Y' in the third field if more names are to be entered and 'N' if not.

The People Diagram/Job Role updater is used to enter locational information for Job Roles on Organization Charts.

The Job Role/Person updater is used to enter connections between Job Roles and Organization Charts and the Personnel Names for the people that fill those Job Roles in the Organization.

The Job Role Connections updater is used to add connections between Job Roles on a diagram.

The People Diagram Information updater is used to add information about an Organization Chart's diagram parameters including Window Location, Zoom Factor, Page Size and Orientation, and Grid Status and Size.

The Job Role Hierarchy updater is used to add information about relationships between owning and owned Support IDs.

The Free Text updater is used to add information about text including location and size information.

Choosing this option results in a selection list being presented that is comprised of the same list of files as presented in the Add To File option. After you pick a file via a selection list you are presented another selection list consisting of the key values of the file you have selected for change. Select a set of key values by highlighting them using the cursor and the same dialog window that appeared for adding to the file will be presented with the values for the record you selected available for changing. The following sections describe which key fields are displayed to select from for each report.

An error message window will be displayed—'Illegal Relational Operation.' These relations may not be modified using this dialog window.

The People Diagram/Job Role updater is used to enter locational information for Job Roles on Organization Charts. A selection window consisting of Organization Chart IDs and Job Role IDs, will be presented, from which you may select the record you wish to update by highlighting the appropriate field values and clicking a button on the mouse. The dialog window containing field values for the selected record will then be displayed and changes may be made to those values. After the values are as you wish press F5: Done.

The Job Role/Person updater is used to enter connections between Job Roles and Organization Charts and the Personnel Names for the people that fill those Job Roles in the Organization. A selection list with values for the fields Organization Chart ID, Job Role ID, and Support ID will be presented, from which you may select the record you wish to update by highlighting the appropriate field values and clicking a button on the mouse. The dialog window containing field values for the selected record will then be displayed and changes may be made to those values. After the values are as you wish press F5: Done.

The Job Role Connections updater is used to add connections between Job Roles on a diagram. A selection list that contains field values for Owning Picture ID, From Job Role ID, and To Job Role ID will be presented, from which you may select the record you wish to update by highlighting the appropriate field values and clicking a button on the mouse. The dialog window containing field values for the selected record will then be displayed and changes may be made to those values. After the values are as you wish press F5: Done.

The People Diagram Information updater is used to add information about an Organization Chart's diagram parameters including Window Location, Zoom Factor, Page Size and Orientation, and Grid Status and Size. A selection list containing values for Organization Chart ID and Name will be presented, from which you may select the record you wish to update by highlighting the appropriate field values and clicking a button on the mouse. The dialog window containing field values for the selected record will then be displayed and changes may be made to those values. After the values are as you wish press F5: Done.

The Job Role Hierarchy updater is used to add information about relationships between owning and owned Support IDs. A selection list containing values for Owning Support ID and Owned Support ID will be presented, from which you may select the record you wish to update by highlighting the appropriate field values and clicking a button on the mouse. The dialog window containing field values for the selected record will then be displayed and changes may be made to those values. After the values are as you wish press F5: Done.

The Free Text updater is used to modify information about text including location and size information. A selection list containing values for Diagram ID, Text ID, and Text will be presented, from which you may select the record you wish to update by highlighting the appropriate field values and clicking a button on the mouse. The dialog window containing field values for the selected record will then be displayed and changes may be made to those values. After the values are as you wish press F5: Done.

To Delete File Elements via the DATA DICTIONARY option select the option and a selection list of files will be presented. When a file has been selected using the mouse and cursor, a selection list of values that identify the file elements is presented from which you may choose the element to be deleted. The identifying values are those listed under the previous option, Modify File. When you select an item by clicking a button on the mouse when the item is highlighted, the corresponding record will be deleted.

Note that there is no 'Undo' for this option so that items that are deleted are deleted.

To quit deleting file elements use the CANCEL option provided in the upper right hand corner of the selection list.

The Quit Option causes the Main Organization Chart Menu Screen to be displayed. To quit using the DATA DICTIONARY option place the cursor on the Quit option and click a button on the mouse. You will be returned to the Activity List from which you may choose another option or return to the main menu.

Help in MetaVision is a context sensitive system that closely mirrors the documentation presented here. You enter the HELP system by placing the cursor on the word HELP in the far right of the menu options along the top of the screen and click a button on the mouse.

A Help window will be displayed in the middle of the screen which contains three items across the top HELP, HELP, and CANCEL. The left HELP may be used for accessing the information contained in this section on how to use the HELP system. The HELP in the top-center of the window identifies that you are in the help system. You may leave the help system by placing the cursor on CANCEL in the upper left of the window and clicking a button on the mouse.

A list of the help topics that relate to the currently displayed set of menus is displayed when the help system is initially invoked. You pick the topic on which you desire help by highlighting the topic and clicking a button on the mouse. When you have picked a topic, the subtopics or text relating to the topic you chose will be displayed. If there are more topics or text than will fit on the screen you may move down the list or text by placing the cursor on the downward pointing arrow in the lower right corner of the window and clicking a button on the mouse. Similarly, you may move up the list of topics or text by placing the cursor on the upward pointing arrow in the upper right of the help system window.

The four options listed along the bottom of the help system window allow you to see help on other topics. Placing the cursor on 'NEXT' will display the topics or text for the topic which immediately follows the currently selected topic. Placing the cursor on 'PREV' will display the topics or text for the topic which is immediately previous to the currently selected topic.

Choosing the 'LEVEL UP' option moves you to the set of topics of which the currently selected topic is a member. 'TOPICS' displays a selection list of topics that are related to the option for which help is currently displayed.

When the MAINTENANCE REPORT option on the Activity List is selected, a list of the available reports is presented. When a maintenance report is selected, you will be asked whether to send the report to the Screen, to the default System Printer, or to a File.

If you choose to have the report sent to a file, you will be asked for the name of the file in which the report will be stored.

The following sections give a brief description and a sample of all the Support Maintenance Reports.

The People Diagram Information (PICT) Report shows the information about all People Diagrams (Organization Charts) as stored in file PICT.DBF.

The People Diagram/Job Role (OCJR) Report shows the location of the Job Role boxes on the People Diagram as stored in file OCJR.DBF.

The Job Role/Person (JRPER) Report shows the individuals assigned to each Job Role on the Organization Chart as stored in file JRPER.DBF.

The Job Role Connections Report (JRRTMT) shows the routing information connecting two Job Role Boxes on a Diagram as stored in file JRRTMT.DBF.

The Job Role Hierarchy Report (SUPOO) shows the relationship between Owning Support ID, Owned Support ID, and Owned Support Ordinal # on a Diagram as stored in file SUPOO.DBF.

To import data from another directory or project use the FILE IMPORT/MERGE activity menu option. The data will be merged into the MetaVision database for the currently open project.

After clicking a mouse on this option a dialog window will appear with the normal header line of F1: HELP, F3:LIST, F5:DONE, and F10:CANCEL. The body of the dialog window consists cf a single field which should be filled in with the path name for the subdirectory containing the project information to be merged with the current project information:

All of the information is automatically merged from the files in the subdirectory with the entered path name.

Use the FILE EXPORT activity to output the information for a project to a set of dBASE III files that can be used to transfer information from one work station to another. This becomes especially useful when several people are working on a single project and it is time to integrate the pieces on one machine.

After clicking a mouse on the FILE EXPORT option a dialog window entitled Destination will appear with the normal header line of F1: HELP, F3:LIST, F5:DONE, and F10:CANCEL. The body of the dialog window consists of a single field, Path Name, which should be filled in with the path name for the subdirectory to which the current project information is to be written. Do not include the final '\' for the directory; e.g. 'a:', NOT 'a:\', to export the current project files to the a: drive root directory.

All of the information for the current project is automatically written to files in the subdirectory with the entered path name.

When several persons are working on the same project it is the responsibility of the project leader to assign non-overlapping sets of Diagram and Icon IDs to the individual team members. If there is overlap, difficulties will be encountered at the point that the parts are to be merged on a single computer under the same project name. The dBASE III files will contain duplicate keyed information and this will seriously jeopardize the integrity of the control information.

To exit the activities under a particular menu heading use the exit option. You will be returned to the main menu option from which you came. Placing the cursor on CANCEL in the upper right hand corner of the activity list will accomplish the same result.

The Terms/Issues/Problems option under SUPPORT provides the capability to gather all definitions of terms and summary and public characterizations of issues and problems dealt with in a project. Diagramming is not used under this option but instead the requirements for the project and a glossary of terms important to the understanding of the project are maintained using this option.

To use the Terms/Issues/Problems option first highlight SUPPORT on the main menu header options and click a button on the mouse. The list of options including Terms/Issues/Problems will be displayed under SUPPORT. Move the cursor using the mouse so that Terms/Issues/Problems is highlighted and click a button on the mouse. An activity list window will appear via which you may pick the activity desired.

As noted above Diagramming does not function under the Terms/Issues/Problems option so that if you click a mouse button when this activity is highlighted nothing happens except that the items on the activity list will be redisplayed.

When the REPORT GENERATION option on the Activity List is selected, a list of the available reports is presented. When a report is selected, you will be asked whether to send the report to the Screen, to the default System Printer, or to a File.

If you choose to have the report sent to a file, you will be asked for the name of the file in which the report will be stored.

The following sections give a brief description and a sample of all the Terms, Issues, and Problems Reports.

The Issues/Needs/Requirements Report shows the Issues, the Types of Issues and the Organizations that must deal with these Issues.

The Plotting Option provides the capability of producing hardcopy output of any diagram produced using MetaVision. The diagram may be sent to a plotter or printer. The diagram to be plot/printed is selected from the available diagrams by means of a selection list box.

A number of formatting options are provided by means of a dialog box labeled 'Plot Information'. Input fields on the dialog box are used to record: Text Size, Title Size, Zoom Factor, Left Margin, and whether the output is to be sent to a plotter or printer.

Choose the Plotting option under the Activity Menu heading on the Main Menu screen to print or plot a MetaVision diagram. A selection list box will be presented for the diagrams available to be plot/printed and you may select from this list in the normal manner. The dialog box labeled 'Plot Information' appears and you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/print process. When the process is complete the Activity Menu options will again be displayed and control will be returned to you.

The Text Size and Title Size fields must contain integer or decimal values greater than 0.

The Margin field must contain an integer or decimal value greater than 0.

The Zoom Factor field must contain an integer or decimal value greater than 0.

For each CONSTRAINT ID a CONSTRAINT DESCRIPTION is printed. If the diagram meets the constraint a sentence to that effect is printed. If the diagram does not meet the conditions of the constraint a list of the offending elements is typed with a sentence explaining how they violate the constraint.

A variety of types of constraint checks are possible. MetaVision prompts for these in turn with a dialog window that requires that a mouse button be clicked with the cursor on either Yes or No indicating that the type of validation check noted is to be performed.

The only query under Support, Terms/Issues/Problems is as follows:

Do database constraint validation?

A yes answer will produce a report with constraints identified similar to the one following.

The DATA DICTIONARY activity provides the capability of adding, modifying and deleting information in the MetaVision system support files directly via dialog windows instead of using the DIAGRAMMING activity.

All of the information needed to produce diagrams in MetaVision is stored in Dbase III compatible files. This includes information on the placement of icons and information normally entered via dialog windows. All of this information is directly accessible via the DATA DICTIONARY activity.

Choose this option by moving the arrow cursor so that DATA DICTIONARY is highlighted on the activity list and click a button on the mouse. The main menu screen will be replaced by another screen which contains the DATA DICTIONARY options, Add to File, Modify File, Delete File Elements, and Quit. Choose one of these options by moving the cursor so that the desired option is highlighted and click a button on the mouse.

A selection list will be presented from which you choose a file whose contents you wish to modify. Highlight the desired file name and click a mouse button. Then follow the directions for the specific option.

The Add to File option permits adding data directly to the MetaVision information stored in dBASE III database files. This is the same information that is normally updated via the diagram screens and dialog boxes.

When the Add to File option is chosen from the EDIT menu a selection list will be presented from which you choose a file to which additions are to be made. Move the cursor so that the desired file is highlighted and click a button on the mouse. A dialog window will be appear in which you can add new entries. The file list names, a brief description of each file and the information being effected, and windows are represented in the following.

The Issue/Problem File updater is used to enter information on Issues and Problems to be dealt with in a project or at least taken note of for documentation purposes. The dialog window is entitled Issue/Problem Information and contains six input fields, ID which is an system generated unique identifying code for an issue/problem, three lines of Description of the issue/problem, a single character field, I/P Type, that indicates whether an issue or problem is being described, Owning Organization, a 30 character field used to identify the organization that is responsible for the issue/problem, and two single character fields More Types [Y/N] and More Organizations [Y/N] via which multiple I/P Types and Owning Organizations may be entered.

The single file updater Issue/Problem Type (IPTYPE) is used to update only information on whether an Issue/Problem is an Issue or a Problem.

The single file updater Issue/Problem Organization (IPORG) is used to update only information on the organizations involved with an issue or problem.

The Glossary of Terms (TERMS) updater is used to enter terms and descriptions of those terms that are important in a project.

Choosing this option results in a selection list being presented that is comprised of the same list of files as presented in the Add To File option. After you pick a file via a selection list you are presented another selection list consisting of the key values of the file you have selected for change. Select a set of key values by highlighting them using the cursor and the same dialog window that appeared for adding to the file will be presented with the values for the record you selected available for changing. The following paragraphs contain information on which fields are displayed in the selection boxes that are presented.

The error window 'Illegal Relational Operation' will appear if you attempt to modify file values using this updater. Use the individual file updaters below to make changes to the file values that were added via the Add to File updater by this name.

The single file updater Issue/Problem Description is used to update only the ID and Description values. The ID and Description field values will be displayed in a select list window from which you may choose the record to be modified by highlighting the set of values and clicking a button on the mouse.

The single file updater Issue/Problem Type is used to update only information on whether an Issue/Problem is an Issue or a Problem. The Issue ID and I/P Type field values are presented in a selection list window and the appropriate record may be selected by highlighting these values and clicking a button on the mouse.

The single file updater Issue/Problem Organization is used to update only information on the organizations involved with an issue or problem. The Issue/Problem ID and Owning Organization field values are presented in a selection list window and the appropriate record may be selected by highlighting these values and clicking a button on the mouse.

The Glossary of Terms updater is used to enter terms and descriptions of those terms that are important in a project. The Term field values are presented in a selection list window and the appropriate record may be selected by highlighting a value and clicking a button on the mouse.

To Delete File Elements via the DATA DICTIONARY option select the option and a selection list of files will be presented. When a file has been selected using the mouse and cursor, a selection list of values that identify the file elements is presented from which you may choose the element to be deleted. The identifying values are those listed under the previous option, Modify File. When you select an item by clicking a button on the mouse when the item is highlighted, the corresponding record will be deleted.

Note that there is no 'Undo' for this option so that items that are deleted are deleted unless they are reentered.

To quit deleting file elements use the CANCEL option provided in the upper right hand corner of the selection list.

The Quit Option causes the Main Menu Screen to be displayed. To quit using the DATA DICTIONARY option place the cursor on the Quit option and click a button on the mouse. You will be returned to the Activity List from which you may choose another option or return to the main menu.

Help in MetaVision is a context sensitive system that closely mirrors the documentation presented here. You enter the HELP system by placing the cursor on the word HELP in the far right of the menu options along the top of the screen and click a button on the mouse.

A Help window will be displayed in the middle of the screen which contains three items across the top HELP, HELP, and CANCEL. The left HELP may be used for accessing the information contained in this section on how to use the HELP system. The HELP in the top-center of the window identifies that you are in the help system. You may leave the help system by placing the cursor on CANCEL in the upper left of the window and clicking a button on the mouse.

A list of the help topics that relate to the currently displayed set of menus is displayed when the help system is initially invoked. You pick the topic on which you desire help by highlighting the topic and clicking a button on the mouse. When you have picked a topic, the subtopics or text relating to the topic you chose will be displayed. If there are more topics or text than will fit on the screen you may move down the list or text by placing the cursor on the downward pointing arrow in the lower right corner of the window and clicking a button on the mouse. Similarly, you may move up the list of topics or text by placing the cursor on the upward pointing arrow in the upper right of the help system window.

The four options listed along the bottom of the help system window allow you to see help on other topics. Placing the cursor on 'NEXT' will display the topics or text for the topic which immediately follows the currently selected topic. Placing the cursor on 'PREV' will display the topics or text for the topic which is immediately previous to the currently selected topic.

Choosing the 'LEVEL UP' option moves you to the set of topics of which the currently selected topic is a member. 'TOPICS' displays a selection list of topics that are related to the option for which help is currently displayed.

When the MAINTENANCE REPORT option on the Activity List is selected, a list of the available reports is presented. When a maintenance report is selected, you will be asked whether to send the report to the Screen, to the default System Printer, or to a File.

If You choose to have the report sent to a file, You will be asked for the name of the file in which the report will be stored.

The following sections give a brief description and a sample of all the Terms, Issues and Problem Maintenance Reports.

The Issue/Problem Description (IPDESC) Report shows the ID and Description for each Issue or Problem as stored in file IPDESC.DBF.

The Issue/Problem Organization (IPORG) Report shows the Issue/Problem ID and the names of the Organizations associated with the Issue/Problem as stored in file IPORG.DBF.

The Issue/Problem Type (IPTYPE) Report shows the Issue/Problem ID and its associated Type as stored in file IPTYPE.DBF.

The Glossary Of Terms (TERMS) Report shows all Terms and their Definitions as stored in file TERMS.DBF.

To import data from another directory or project use the FILE IMPORT/MERGE activity menu option. The data will be merged into the MetaVision database for the currently open project.

After clicking a mouse on this option a dialog window will appear with the normal header line of:

F1:HELP F3:LIST F5:DONE F10:CANCEL

The body of the dialog window consists of a single field which should be filled in with the path name for the subdirectory containing the project information to be merged with the current project information.

All of the information is automatically merged from the files in the subdirectory with the entered path name.

Use the FILE EXPORT activity to output the information for a project to a set of dBase III files that can be used to transfer information from one work station to another. This becomes especially useful when several people are working on a single project and it is time to integrate the pieces on one machine.

After clicking a mouse on the FILE EXPORT option a dialog window entitled Destination will appear with the normal header line of F1: HELP, F3:LIST, F5:DONE, and F10:CANCEL. The body of the dialog window consists of a single field, Path Name, which should be filled in with the path name for the subdirectory to which the current project information is to be written. Do not include the final '\' for the directory; e.g. 'a:', NOT 'a:\', to export the current project files to the a: drive root directory.

All of the information for the current project is automatically written to files in the subdirectory with the entered path name.

When several persons are working on the same project it is the responsibility of the project leader to assign non-overlapping sets of Diagram and Icon IDs to the individual team members. If there is overlap, difficulties will be encountered at the point that the parts are to be merged on a single computer under the same project name. The dBASE III files will contain duplicate keyed information and this will seriously jeopardize the integrity of the control information.

To exit the activities under a particular menu heading use the exit option. You will be returned to the main menu option from which you came. Placing the cursor on CANCEL in the upper right hand corner of the activity list will accomplish the same result.

The What If menu option under the main menu header SUPPORT prints a report indicating the affected portions of your project if a support is omitted. The report may be printed to a file, the screen, or the printer.

To use the What If option under the SUPPORT menu header pull down the menu under SUPPORT by highlighting SUPPORT and click a button on the mouse. Highlight What If by moving the cursor using the mouse and click a button on the mouse to activate the What If option.

A dialog window will appear that provides for inputting from the keyboard, or selecting from a list of available Support IDs, the Support ID for the process to be omitted for the report that follows. The window is entitled 'What If Support ID Changed' and consists of the normal header functions F1: HELP. F3: LIST, F5: DONE, and F10: CANCEL, and a single input field Enter ID. You may either enter a Support ID and press F5 for done or press F3 to see a list of Support IDs and Support Names for the project on which you are working.

When you have entered a Support ID or selected one, a set of output options will be presented in a window. The options include: File, Screen, or Printer. Place the cursor in the box next to the desired option and click a mouse button. If you select the File option a dialog window appears that is used for inputting the name of the output file. The window is simply entitled File: and the input field is labelled Path Name:. Enter a complete file name including drive and path specifications and press F5.

If you select the Printer option the report will be sent to the printer. Note that the report requires that you have your printer set for at least 132 columns wide so that the report will be printed with a report row on a single row of output.

If you select the Screen output option the report will be printed to your screen. Several options are provided for viewing the report on your screen including Line, Screen, Pan, Window, Continuous, Restart, and Quit.

Whichever output you select the report will have the general form of the following which has been modified by minimizing spaces in columns to make the report fit on the page here. The items listed in each column are the names of the SUPPORT, DATA, CONTROL, or SUPPORT that will be affected by deletion of the chosen Support ID.

The Matrix Diagram menu item under SUPPORT gives you the capability of seeing or plotting a matrix representation of the Processes verses the Support information you have created under the Support Diagram menu item.

To select the Matrix Diagram menu item, click on SUPPORT on the main menu screen after having opened a project and chosen the Business Modeling Method. Select Matrix Diagram by moving the cursor and clicking a button on the mouse when Matrix Diagram is highlighted. The normal activity list will be displayed. However, only the DIAGRAMMING and PLOTTING activities are active on this list. Select the activity you want or move the cursor so that EXIT or CANCEL is highlighted to leave the Module Relationship activity list.

The DIAGRAMMING activity for the Matrix Diagram option provides the capability of viewing the Matrix Diagram and changing the ZOOM factors related to the diagram. The contents of this diagram are generated from the information entered for the Support Diagrams for a project. The diagram consists of a matrix of processes verses RFP information.

To select the DIAGRAMMING activity from the Activity List, move the arrow cursor so that DIAGRAMMING is highlighted and click a button on the mouse. After a short time the Process Diagramming screen will be displayed.

Since this is a generated diagram, the CREATE and EDIT options are not needed; since there is only a single Matrix Diagram per project there is no need for the HYPERTEXT menu options.

The DIAGRAM menu contains a single option, QUIT. All of the Process Boxes for a project are displayed on a single diagram so that there is only one per project.

The Quit Option exists under the DIAGRAM Menu header in the Matrix Diagram screen and causes the current diagram to be closed and the Main Menu Screen to be displayed.

You must be in the Matrix Diagram screen to use the Quit option. If you are in the Matrix Diagram Screen and you wish to access another part of MetaVision, then, using the mouse, place the arrow cursor so that the DIAGRAM Menu header is highlighted and click the mouse; if another menu is pulled down you will have to click the mouse a second time since the first only pulled up the previous menu.

The menu option 'Quit' will appear under the menu header; move the arrow cursor to the Quit option using the mouse and, when it is highlighted, click a button on the mouse. The Main Menu screen will be displayed after a few seconds; the message 'One Moment Please . . . ' will initially be displayed in the top center of the screen but any of the options on the Main Menu screen will presently be available. If you wish to exit MetaVision completely at this time, you may move the arrow cursor to the PROJECT menu and pick the Quit option there.

Use the ZOOM option to redraw the diagram in the window at some factor smaller or larger than its current size.

It is often desirable to enlarge a portion of a Matrix Diagram so that it fills the entire screen, since this makes viewing of that portion of the diagram easier. A portion of a diagram is enlarged by outlining that portion using the Arbitrary option. The outlined portion will then fill the screen. It should be noted that Names will only be displayed if the combination of zoom factor and font will allow.

To enlarge a portion of a diagram displayed on the screen use the Arbitrary option under the ZOOM menu header. Move the arrow cursor to the ZOOM menu header and click a mouse button. The ZOOM options will appear under the ZOOM menu header; 'Arbitrary' is the first option on the list. Select the Arbitrary option by moving the cursor until 'Arbitrary' is highlighted and clicking a mouse button; the menu options will disappear and a cross-hairs cursor will appear. Move the cross-hairs cursor to a corner of the portion of the screen to be enlarged and click a mouse button. Any of the four corners may be so anchored.

A dot should appear on the screen at the intersection of the cross-hairs; this is one corner of the portion to be enlarged, top or bottom, right or left. Move the cross-hairs cursor to the opposite corner of the rectangle to be enlarged. Vertical and horizontal lines will appear as the cursor is moved to indicate the bounds of the portion of the diagram that will fill the screen. Click the mouse a second time to establish the size and extent of the portion of the diagram to be enlarged; the portion outlined will be enlarged to fill the screen.

A portion of the enlarged diagram may again be expanded using the Arbitrary option, though this will usually not be necessary. The ZOOM ½× and 2× options may also be used on the results of using the Arbitrary option.

Mistakes are not identified as such explicitly by the system for this option; some actions, however, are not recommended or motivated.

If you move the cross-hairs cursor to a spot and click a mouse button twice on that same spot the diagram will be redrawn without any changes.

If you move the cross-hairs cursor to a spot on the border of the screen and click a mouse button the diagram will be redrawn without any changes.

The complete Matrix Diagram may be viewed on the screen at one time by means of the ZOOM Fit Screen option. Appropriate magnification factors are calculated by the system to make the diagram fit on the screen; the yellow line that appears indicates the boundaries of the page on which the diagram fits. The page size is determined automatically.

To use the option move the arrow cursor to the ZOOM menu header (near or on the word ZOOM) and click a mouse button. The ZOOM options will appear under the ZOOM menu header. Select the Fit Screen option by moving the cursor so that 'Fit Screen' is highlighted and click a mouse button. The menu options will disappear and the screen will be redrawn so that the boundaries of the diagram, indicated by yellow lines, will appear.

Using this option on a Matrix Diagram of any large project will not be useful, since the diagram will only show the grid.

Only a part of the Matrix Diagram will normally be visible on the screen at one time. Use the ZOOM Actual option to see a portion of the diagram with the lettering the same size as it will be when plotted. You may move the view of the screen by means of the pan bars along the bottom and right of the screen to see any portion of the diagram that you wish.

Move the arrow cursor to the ZOOM menu header and click a mouse button. The ZOOM options will appear under the ZOOM menu options will appear under the ZOOM menu header. Select the Actual option by moving the cursor so that Actual is highlighted and click a mouse button. The menu options will disappear and the screen will be redrawn so that the icons will be labeled and be the size they will be when they are printed or plotted.

Often a diagram will be too big to see all the components and their relationships at once. The ZOOM ½× option provides the means to shrink a diagram by 50%. The option may be repeated and the diagram shrunk even smaller, or used before or after other ZOOM options. Use the ½× option to 'undo' the 2× option.

Move the arrow cursor to the ZOOM menu header and click a mouse button. The ZOOM options will appear under the ZOOM menu header. Select the ½× option by moving the cursor so that ½× is highlighted and click a mouse button. The menu options will disappear and the screen will be redrawn so that the icons will be half the size they were before the option was selected.

It is possible to reduce the size of the diagram to the point where it almost disappears.

The ZOOM 2× option provides the means to expand the diagram to twice its size. This option may be repeated and the information made even larger, or it may be used before or after other ZOOM options. The 2× option may be used as an 'undo' of the ½× option.

Move the arrow cursor to the ZOOM menu header and click a mouse button. The ZOOM options will appear under the ZOOM menu header. Select the 2× option by moving the cursor so that 2× is highlighted and click a mouse button. The menu options will disappear and the screen will be redrawn so that the icons will be twice the size they were before the option was executed; only half as much of the diagram will be displayed on the screen.

If you repeatedly apply the 2× option to a diagram you will eventually not see any of the information for the diagram on the screen.

The ZOOM Enter Zoom option allows an arbitrary zoom factor to be entered so that a diagram may be displayed at any size. This is an absolute zoom factor. If 1.0 is entered, the result is the same as selecting the Actual option. Trial and error will quickly give you experience in choosing a specific zoom factor appropriate for your purpose.

Move the arrow cursor to the ZOOM menu header and click a mouse button. The ZOOM options will appear under the ZOOM menu header. Select the Enter Zoom option by moving the cursor so that 'Enter Zoom' is highlighted and click a mouse button; the menu options will disappear and the Zoom Factor dialog box will be displayed with the current zoom factor. Enter a larger or smaller value and press the F5 key to register your selection. This selection will remain active as the default selection until you again change it for this diagram.

A non-positive zoom factor is not permitted.

Often a diagram will be too big to see all the components and their relationships at once; the ZOOM 75% option provides the means to shrink the diagram to 75% of its actual size.

Move the arrow cursor to the ZOOM menu header and click a mouse button. The ZOOM options will appear under the ZOOM menu header. Select the 75% option by moving the cursor so that '75%' is highlighted and clicking a mouse button. The menu options will disappear and the screen will be redrawn so that the icons will be ¾ the size they would be had the Actual option been chosen.

Help in MetaVision is a context- sensitive system that closely mirrors the documentation presented here. You enter the HELP system by placing the cursor on the word HELP in the far right of the menu options along the top of the screen and clicking a button on the mouse.

A Help window will be displayed in the middle of the screen which contains three items across the top: HELP, HELP, and CANCEL. The left HELP may be used for accessing the information contained in this section on how to use the HELP system. The HELP in the top- center of the window identifies that you are in the Help system. You may leave the Help system by placing the cursor on CANCEL in the upper left of the window and clicking a button on the mouse.

When the Help system is initially invoked, a list of the Help topics that relate to the currently displayed set of menus is presented. You pick the topic on which you desire help by highlighting the topic and clicking a button on the mouse. When you have picked a topic, the subtopics or text relating to the topic you chose will be displayed. If there are more topics or text than will fit on the screen, you may move down the list of text by placing the cursor on the downward-pointing arrow in the lower right corner of the window and clicking a button on the mouse. Similarly, you may move up the list of topics or text by placing the cursor on the upward-pointing arrow in the upper right of the Help system window.

The four options listed along the bottom of the Help system window allow you to see Help on other topics. Placing the cursor on 'NEXT' will display the topics or text for the topic which immediately follows the currently-selected topic. Placing the cursor on 'PREV' will display the topics or text for the topic which is immediately previous to the currently-selected topic.

Choosing the 'LEVEL UP' option moves you to the set of topics of which the currently selected topic is a member. 'TOPICS' displays a selection list of topics that are related to the option for which Help is currently displayed.

The Plotting Option provides the capability of producing hardcopy output of any diagram produced using MetaVision. Diagram may be sent to a plotter or printer. The diagram to be plot/printed is selected from the available diagrams by means of a selection list box. A number of formatting options are provided by means of a dialog box labeled 'Plot Information'. Input fields on the dialog box are used to record Text Size, Title Size, ZOOM Factor, Left Margin, and whether the output is to be sent to a plotter or printer.

To print or plot a MetaVision diagram, choose the Plotting option under the Activity Menu heading on the Main Menu screen. A selection list box will be presented for the diagrams available to be plot/printed and you may select from this list in the normal manner. The dialog box labeled 'Plot Information' appears; you should enter positive integers or decimal numbers in the first 4 fields and a 'Y' in the Printer or Plotter field and an 'N' in the other. The 'Y' specifies the device to be used for output. Make certain that the printer/plotter is connected and on-line and press F5 to begin the plot/print process. When the process is complete the Activity Menu options will again be displayed and control will be returned to you.

The Text Size and Title Size fields must contain integer or decimal values greater than 0.

The Margin field must contain an integer or decimal value greater than 0.

The ZOOM Factor field must contain an integer or decimal value greater than 0.

To exit the activities under a particular menu heading use the Exit option. You will be returned to the main menu option from which you came. Placing the cursor on CANCEL in the upper right-hand corner of the activity list will accomplish the same result.

GLOSSARY

The following Glossary is provided to avoid confusion that can stem from regional variations of non-standard terms.

Actual size

Actual size is the original scale of the diagram. It indicates what printed output will look like.

ALG

A type of constraint that obtains between two records is not an Equality, Disjoint, or Subset Constraint. The precise nature of the Constraint is specified via a dialog window.

Arrow cursor

An Arrow cursor is an icon in the stylized shape of an arrow that indicates the active position controlled by the cursor.

AUTOEXEC.BAT

The DOS file that is executed at power-up time and must be modified to include commands needed for the successful execution of MetaVision.

CONFIG.SYS

The DOS file that sets the PC configuration at power-up and must be modified to include commands needed for the successful execution of MetaVision.

Click mouse

A directive to press one of the switches found on the mouse connected to your computer.

Control Arrow

A Control Arrow models the data that controls a process. Control Arrow icons are data that enter the top of Process boxes. They may come from other processes or be left unspecified as to their source.

Cross-hairs cursor

The cross-hairs cursor is a large plus sign used to position icons on your diagram. It is controlled by the mouse like other cursors.

Database

A Database is a collection of related files that are stored so that elements of the files may be used to combine information kept in separated files.

Data Decomposition

Data may often be broken down into its components for more precise modeling. This process or its results may be referred to as Data Decomposition.

Data Map

A data map represents the set of questions and their component elements and relationships that are to be asked of a set of data within the procedures identified via MetaVision Tools Process.

Data Sink

A Data Sink is an entity that consumes a particular data item with no consideration given in the modeling as to how the data is consumed after it is delivered to the sink.

Data Source

A Data Source is an entity that produces a particular data item with no consideration given in the modeling as to how or why the data may be obtained from the source.

Data Source/Sink

The Data Source/Sink icon on Process Diagrams represents sources or destinations of data that will not be further analyzed. In data processing environments this is often a database but may be any producer, consumer, or storer of data.

DSS

DSS is an abbreviation that refers to a Data Source or Data Sink.

Del Key

When a dialog box is active, text may be deleted by means of the delete key (labeled 'Del') or by using the Back Space key over the text to be deleted.

Directory

A directory is a DOS division of files into separate groups that are listed at one time and are treated by DOS as distinct from all other groups of files in other directories.

Down

Down as an option on a Process Diagram is used to move to one of the component Process Diagrams that constitute a Process Diagram.

Down Arrow Key

When a dialog box is active the Down arrow key moves the cursor to the beginning of the next field if there is one.

End Key

When a dialog box is active the End key moves the cursor to the end of the present field.

Enter Key

When a dialog box is active the Enter key may be used to move to the beginning of the next field.

Esc Key

When a dialog box is active the Esc (Escape) Key performs the same function as the F10 Key, i.e. the Cancel function.

F1: HELP

This stands for press F1 for help.

F3: LIST

F3 for a listing of the currently available selections.

F5: DONE

F5 to indicate that you are done with the entries and that the project should be added with those values. Pressing F5 will proceed to add the project if the field values are legitimate.

F10: CANCEL to leave the Add project dialog window without adding a project, press F10.

Fan In

Fan In icons represent the combining of two or more data items into another data item. This is appropriate when the component items are not needed for the analysis or design and their presence detracts from diagrams.

Fanio

Fanio is an abbreviation that refers to a Fan In or Fan Out icon.

Fan Out

Fan Out icons represent the decomposition of a data item into its components data elements. The decomposed elements normally only become relevant when the analysis/design reaches a certain level of detail.

Fit Screen Size

Fit Screen Size is whatever scale is necessary so that the entire diagram appears on the screen.

Form Number

The number given a form by an organization for tracking and control purposes.

Frequency of Access

A measure of the frequency with which a data of a particular type is accessed after it has been created.

Frequency Measure

A measure of the frequency with which a data record of a particular type is produced.

Function Key

Function keys on the keyboard are labeled with F1–F10 or F12 depending on the keyboard being used. F1, F3, F5, and F10 are used by MetaVision. See glossary entries for them for details.

Hand cursor

The Hand cursor is in the shape of a right hand with the fingers extended. It is used to select entities to be moved.

Hierarchy

Processes and data may often be decomposed into smaller analytic units. The relation between these units at different levels constitute a hierarchy.

Highlighted

A portion of the screen that is set off by being of higher intensity than normal or of a different color than is normal, for example white text on a black background.

Home Key

When a dialog box is active the Home key moves the cursor to the beginning of the present field.

Icon

MetaVision uses icons (i.e., graphic symbols) to represent entities and actions on the diagrams that are used to validate data and process flow with users. The objective of icons is to stand for something that they represent with some reasonable symbol that suggests what they are to represent.

Identifier

See uniqueness identifier.

Information Quality

An indicator of the degree of reliability and validity for data.

Input Arrow

An Input Arrow goes into the left hand side of a Process box and represents Input Data. Input data is data that is needed by the Process and may be either consumed, transformed, or referred to by a Process.

Input Field

A screen input field is a portion of the screen which requires that information be typed in from the keyboard. A screen input field will normally be used to input information for identification and labeling of project and diagram components.

Ins Key

When a dialog box is active to insert material before the end of a field, you may use the insert key (labeled 'Ins') to move the text to the right the number of characters that you press the insert key. Note that any material moved past the end of the field is lost and cannot be recovered by deleting the spaces just included.

Justification

The placement of text relative to some reference point or line. Text entered in a dialog window input field in some cases may be placed relative to the bounds of the input field provided. L stands for left-justified, R for right-justified, and C for Centered within the field.

LANDSCAPE

The orientation of a plot may be either PORTRAIT or LANDSCAPE. PORTRAIT orientation indicates that the diagram will be printed so that the long axis of the paper on which printing or plotted is output will be vertical.

Left Arrow

When a dialog box is active the Left arrow key moves the cursor 1 position to the left if there is still room in the present field or to the beginning of the previous field if the cursor is at the beginning of the field.

Menu

A Menu is a set of choices (options) that is displayed by moving the arrow cursor so the menu title is highlighted and clicking the mouse; a particular option may then be chosen by pointing the cursor at the desired option and clicking the mouse again.

Menu title

A Menu title is the portion of a menu that is displayed even when the options for that menu are not.

MetaVision is a Computer Aided Software Engineering product that provides a format and an integrated collection of methods for information system requirements collection, requirements analysis and system design. The specification format is in pictures so that both end users and systems analysts can easily understand what is being specified. The step-by-step method in the software improves productivity for systems analysts and developers because it provides a clearly charted repeatable course. The MetaVision Tool database takes over as a library of the information collected on the job, reporting on it, correlating it and producing pictures of it. MetaVision Tool has three different methodologies to perform three different tasks that commonly confront data processing organizations.

Mouse

A Mouse is an external hand-held device that is used to interface with a computer via appropriately written software in addition to or in place of a keyboard.

Options

Options are the choices provided by a menu. A particular option is selected by moving the arrow cursor so that the option is highlighted and either clicking the mouse (if one is attached) or pressing ENTER on the keyboard (if a mouse is not attached).

Output Arrow

An arrow that is coming from a process from the left side and represents data that is produced by a process.

Owned Arrows

A data arrow that represents one of the components of another data element. On a Process Diagram the Owned Arrows are the multiple arrows on Fan I/Os and the Owning arrows are the single arrows.

Owned Process Diagram

A Process Diagram that is a component of an Owning Process Diagram.

Owning Process Diagram

The Process Diagram that is hierarchically above the current one and of which the Owned one is a component.

Owning Process ID

The Process ID of the Process Diagram that is hierarchically above an Owned one and of which the Owned one is a component.

Pan arrows

Pan arrows are at the top and bottom left of diagrams and selection lists to permit paging through portions of diagrams or selection lists.

Pan Bars

Pan Bars allow the area of the diagram currently being viewed to be changed. The Horizontal Pan Bar along the bottom of the screen moves the diagram from left to right. The Vertical Pan Bar along the right side of the screen moves the diagram up or down.

Password

A password is used to restrict access to information to people for whom it is intended.

People diagram

An organizational chart of an enterprise. It models the roles and participants in an enterprise.

Personnel Arrow

A Personnel Arrow on a Process Diagram indicates the person or organization that is responsible to carry out a process. Personnel Arrows enter Process Diagrams from the bottom and their source is not specified.

PORTRAIT

The orientation of a plot may be either PORTRAIT or LANDSCAPE. PORTRAIT orientation indicates that the diagram will be printed so that the long axis of the paper on which printing or plotted is output will be vertical.

Process Box

Processes are represented by boxes which are labeled rectangles on a diagram. The labeling describes the process or activity represented by the box.

Process Description

A two line description of the process represented by a Process Box. It provides additional information on the processes represented by the Process Box.

Process Diagram

A Process Diagram represents a process or activity involved in the transformation of information, its creation, change, or consumption.

Process Diagram ID

A unique identifier by which a Process Diagram is identified in MetaVision.

Process Diagram Name

The name associated with a Process Diagram. It appears on the face of the icon if it is a component of another Process Diagram and as part of the title line at the top of the diagram if it is further decomposed. It also appears on reports and some selection lists.

Process Identifier

A Process Identifier uniquely identifies a Process Box. A Process Identifier is a string, normally of numbers, which consists of the Process Identifier of the owning diagram with another digit concatenated on to the parent diagram Process Identifier to indicate the relative position of the Process Box in the current diagram. The Process Identifier may also consist of any combination of six characters or less that uniquely identifies a process. For each process the system generates a new Process Identifier which may be accepted as is by the user or changed.

Process Name

The Process Name is a descriptive label for a Process Box that may be up to 50 characters in length. It will be broken up into words and those words will be centered on the surface of the box.

Project

A Project is a coherent task for which analysis, design, and planning are to be performed. The task is coherent in the sense that there is minimal overlap with any other project: different data, different systems, and different people will be involved.

Project ID

A Project ID is an identifier of 6 characters or fewer used by MetaVision to identify and distinguish projects.

Project Name

A project name is the label for a project which will be used to identify the project on lists of projects for choosing and deleting projects.

Proper subset

A proper subset contains at most the members of the set of which it is a subset. It may contain fewer or equal members but not more.

Pull-down Menu

A pull-down menu consists of a menu title displayed along the top of the screen and a set of options displayed under the menu title; the menu title is selected by pointing at it with the cursor so it is highlighted and clicking a mouse button.

RFP

An acronym standing for Report/Form/Packet. This is a general characterization of the types of entities that can constitute input and output/P.

A subject or predicate element of a record that is often known as a field. The term S/P is somewhat more general since it may also be used at an analysis stage before records have been designed.

Subdirectory

A subdirectory is a DOS (disk operating system) construct that treats a directory as a component of another directory.

Sub-process

One of the component processes of a process.

Tab Key

When a dialog box is active pressing the Tab key moves to the beginning of the next field.

Task

A task is coherent in the sense that there is minimal overlap with any other project; different data, different system, and different people will be involved.

Uniqueness constraint

A data constraint that indicates that the values assumed by the portion of a record to which the uniqueness constraint applies is sufficient to identify a particular record.

Up Arrow Key

When a dialog box is active the Up arrow key moves the cursor to the beginning of the previous field if there is one.

Viewpoint of a model

Who is a model being built for, what is their domain of primary interest? Answers to these questions will determine which portions of a project will be dealt with in detail and which only in general terms as well as how Processes and Data are modelled.

Volatility

A measure of the length of time that a set of data is still needed or applicable.

Volume

A measure of the amount of data involved.

DEVICE DRIVERS

The Metavision System supports a wide variety of peripheral devices but requires an operator to identify those that are to be used. Examples of typical devices follow with their required parameters input by the user or program.

| DISPLAY DEVICES | |
|---|---|
| AT&T 6300/6310 - 640 × 400 Monochrome | CGI6300B.SYS |
| AT&T 6300/6310 - 640 × 400 Color | CGI6300C.SYS |
| Compaq Portable III Display | COMPAQ3.SYS |
| DGIS High Performance Displays | CGIDGIS.SYS |
| Hercules InColor Display | HERCINCO.SYS |
| Hercules Monochrome Graphics Adapter | HERCBW.SYS |
| IBM 8514/A 640 × 480 Display | IBMAFL.SYS |
| IBM Color Graphics Adapter - High Res. Mono. | IBMBW.SYS |
| IBM Enhanced Graphics Adapter - 4 Modes | IBMEGA.SYS |
| IBM Personal System/2 - Mode 11 | IBMVGA11.SYS |
| IBM Personal System/2 - Mode 12 | IBMVGA12.SYS |
| Toshiba 3100 Lap Top Display | T3100.SYS |

SPECIFICS OF SUPPORTED DISPLAY DEVICES

COMPAQ PORTABLE III DISPLAY

FILENAME: COMPAQ3.SYS
DEVICE LOGICAL NAME: DISPLAY
DEVICE LOGICAL CHANNEL: CON
DEFAULT RESOLUTION AND ASPECT RATIO:
The horizontal and Vertical dpi (dots per inch) are used for selection of raster fonts.
SPECIFIC FEATURES SUPPORTED:
Color: Two colors are available. Color index 0 is the background color; color index 1 is the foreground color. These colors cannot be redefined

HERCULES MONOCHROME GRAPHICS ADAPTER

FILENAME HERCBW.SYS
DEVICE LOGICAL NAME: DISPLAY
DEVICE LOGICAL CHANNEL: CON
DEFAULT RESOLUTION AND ASPECT RATIO:
The horizontal and vertical dpi (dots per inch) are used for selection of raster fonts.
SPECIFIC FEATURES SUPPORTED:
Color: Two colors are available. Color index 0 is the background color; color index 1 is the foreground color. These colors cannot be redefined.
Request Locator: When request locator is invoked, a graphics input cursor appears on the screen at the initial locator position. The cursor can be moved by pressing keys on the numeric keypad: The Numeric Lock function must be off for the cursor to be moved. Initially, the cursor moves in large increments. The Insert key toggles between large and small movements. When the cursor is at the desired location, the point can be selected by pressing any alpha key on the keyboard.
Request Choice: This driver supports function key values:
Cursor Addressable Text: In addition to the common features, this device supports Reverse Video, Blink, and Bold Intensity attributes.

IBM COLOR GRAPHICS ADAPTER - HIGH RES. MONO.

FILENAME: IBMBW.SYS
DEVICE LOGICAL NAME: DISPLAY
DEVICE LOGICAL CHANNEL: CON
DEFAULT RESOLUTION AND ASPECT RATIO:
The horizontal and Vertical dpi (dots per inch) are used for selection of raster fonts.
SPECIFIC FEATURES SUPPORTED:
Environmental Settings: None available
Color: Two colors are available. Color index 0 is the background color; color index 1 is the foreground color. These colors cannot be redefined.

IBM ENHANCED GRAPHICS ADAPTER

FILENAME: IBMEGA.SYS
DEVICE LOGICAL NAME: DISPLAY
DEVICE LOGICAL CHANNEL: CON
DEFAULT RESOLUTION AND ASPECT RATIO:
The horizontal and Vertical dpi (dots per inch) are used for selection of raster fonts.
Environmental Settings: The user can specify the EGA mode by using the MS-DOS SET command.
Color: Sixteen Color (MR3 and HR3)

This device supports sixteen colors:

IBM PS/2 MODE 11

FILENAME: IBMVGA11.SYS
DEVICE LOGICAL NAME: DISPLAY
DEVICE LOGICAL CHANNEL: CON
DEFAULT RESOLUTION AND ASPECT RATIO:
The horizontal and Vertical dpi (dots per inch) are used for selection of raster fonts.
SPECIFIC FEATURES SUPPORTED:
Color: Two colors are available. Color index 0 is the background color; color index 1 is the foreground color. These colors cannot be redefined.

IBM PS/2 MODE 12 (640×480 16-COLOR)

FILENAME: IBMVGA12.SYS
DEVICE LOGICAL NAME: DISPLAY
DEVICE LOGICAL CHANNEL: CON
DEFAULT RESOLUTION AND ASPECT RATIO:
The horizontal and Vertical dpi (dots per inch) are used for selection of raster fonts.
SPECIFIC FEATURES SUPPORTED:
Color: This device supports sixteen color indexes, each of which may be defined to any color displayable on the attached monitor. On a color display any RGB color may be represented; on a monochrome monitor 64 shades or gray can be displayed.

TOSHIBA 3100 LAP TOP DISPLAY

FILENAME: T3100.SYS
DEVICE LOGICAL NAME: DISPLAY
DEVICE LOGICAL CHANNEL: CON
DEFAULT RESOLUTION AND ASPECT RATIO:
The horizontal and Vertical dpi (dots per inch) are used for selection of raster fonts.
Color: Two colors are available. Color index 0 is the background color; color index 1 is the foreground color. These colors cannot be redefined.
Hardcopy Devices: Metavision supports the hardcopy devices listed below.

| HARDCOPY DEVICES SUPPORTED | |
|---|---|
| Calcomp Ext 960 Plotters | CALPLOT.SYS |
| Canon Laser Beam Printer 8II | CANL8II.SYS |
| Diconix 150 Printer - Low Res | DICONIXL.SYS |
| Diconix 150 Printer - High Res | DICONIXH.SYS |
| Epson LQ Series Printers | EPSONLQ.SYS |
| Epson LQ Series Color Printers | EPSONLQC.SYS |
| Epson MX. FX. And EX Series Printers | EPSONX.SYS |
| Hewlett Packard DeskJet Printer | HPDJET.SYS |
| Hewlett Packard LaserJet+ Printer | LASERJET.SYS |
| Hewlett Packard PaintJet 180dpi Printer | HPPJ180.SYS |
| Hewlett Packard PaintJet 90dpi Printer | HPPJ90.SYS |
| Hewlett Packard Plotters | HPPLOT.SYS |
| Hewlett Packard QuietJet Printer | QUIETJET.SYS |
| Hewlett Packard ThinkJet Printer | THINKJET.SYS |
| HPGL Output Only Plotters | HPGLPLTR.SYS |
| Houston Instrument Plotters | HIPLOTTR.SYS |
| IBM Color Graphics Printer | IBMPRCOL.SYS |
| IBM Graphics Printer | IBMGPR.SYS |
| IBM Proprinter I | IBMPRO.SYS |
| IBM Proprinter II/XL | IBMPROII.SYS |
| IBM Proprinter X24 AND XL24 | IBMX124.SYS |
| IBM Quietwriter II | IBMQW2.SYS |
| IBM Quietwriter III | IBMQW3.SYS |
| NEC P5 Printer | NECP5.SYS |
| NEC Pinwriter | NECP5XL.SYS |
| Okidata 290-Series Printers | OKID290.SYS |
| Postscript Printers | CGIPOST.SYS |
| Roland 980, 990, 2000, 3300 Plotters | ROLAND.SYS |
| Tektronix 4695/4696 Printer | TEK4695.SYS |
| Toshiba P321S1/P351 Printers | TOSHIBA.SYS |
| Versatec Printer/Plotters | VERSATEC.SYS |
| Xerox C150/4020 Color Printer | DIAB150.SYS |

SPECIFICS OF SUPPORTED HARDCOPY DEVICES

EPSON LQ SERIES PRINTERS

FILENAME: EPSONLQ.SYS
DEVICE LOGICAL NAME: PRINTER
DEVICE LOGICAL CHANNEL: PRN
RESOLUTIONS AND ASPECT RATIOS: The Horizontal and Vertical dpi (dots per inch) are used for selection of raster fonts.
SPECIFIC FEATURES SUPPORTED:

Environmental settings: The user can specify environmental settings.

ORIENTATION specifies the orientation of output on the page. PORTRAIT is the default, causing output to be oriented so that the longest side of the page is the Y axis. Setting the orientation to LANDSCAPE causes output to be rotated 90 degrees clockwise on the device page. The longest side of the page would then be the X axis.

PAPER specifies paper size. The device supports US Letter and European page sizes. Setting PAPER to ISOA4 specifies the use of European paper; setting it to NARROW specifies using US Letter (the default); setting it to WIDE specifies using 13.2" by 11" paper. The drawing surface is defined so that the horizontal margins are approximately ¼" and the vertical margins approximately ½" for all page sizes.

PAGELENGTH specifies the number of graphic rows which will be used to represent one standard page of output. Note that this value is resolution-dependent. The specific default values for one page are as follows: One page of graphics may be printed within a region either shorter or longer than the device page. This will result in either condensing or stretching the output. In PORTRAIT mode, the number of rows is a measure of the Y axis, and in LANDSCAPE mode changing PAGELENGTH will affect the length of the X axis. The minimum number of rows is always 1; the maximum number varies as needed.

TEMPDIR specifies the directory in which the driver is to maintain any temporary files. This path will not be used for redirecting output to a file. The default is the directory from which the application was started.

EPSONLQ This driver is capable of redirecting its output to a file, in addition to the channels PRN and LPT1-LPT8. If the filename specified in the environment is not a qualified IO channel, all output will be sent to a file, which may then be printed using "copy/b filename PRN". The /b option is included as a precaution; it may not be necessary. The file need not exist prior to initialization of the driver. If it does exist, however, its contents will be overwritten.

PLISTSIZE informs the printer driver of the maximum number of bytes for its display list buffer. The default and minimum size is 512 bytes. Increasing this value causes the specified number of bytes to be allocated when plotting. It is intended for applications which can afford the memory to obtain increased performance. These bytes are not released until plotting is completed.

RESOLUTION is measured in dots per inch. This setting actually determines the size of a dot. At 120 dpi, one square inch measures 120 dots horizontally and 180 dots vertically. At 180 dpi, one square inch measures 180 dots horizontally and vertically.

FF, the form feed setting, determines whether the driver will cause the device to advance to top of form at the end of graphics. The default is to form feed after output has been displayed. Setting the form feed option OFF in the environment will prevent the form feed command from being sent to the printer.

Color: The Epson LQ supports two colors: Index 1 is displayed in black ink, and index 0 is not displayed. These colors cannot be redefined Hardware Text: The EpsonLQ must have access to two hardware text files. These files must reside in the directory along with the Epson LQ driver or in the FONTS=path. These files are HW_12X24.FNT, the hardware font file for 120 dpi resolution, and HW_18X24.FNT, the hardware font file for 180 dpi resolution.

Switch settings: There are two dip switches that need to be checked: The EpsonLQ driver supports the following printers: EPSON LQ-800, EPSON LQ-1000, EPSON LQ-950 (narrow paper mode only), EPSON LQ-2500, and EPSON LQ-2550.

EPSON FX, MX AND EX SERIES PRINTERS

FILENAME: EPSONX.SYS
DEVICE LOGICAL NAME: PRINTER
DEVICE LOGICAL CHANNEL: PRN
RESOLUTIONS AND ASPECT RATIOS: The Horizontal and Vertical dpi (dots per inch) are used for selection of raster fonts.
SPECIFIC FEATURES SUPPORTED:

Environmental settings: The user can specify environmental settings as need.

ORIENTATION specifies the orientation of output on the page. PORTRAIT is the default, causing output to be oriented so that the longest side of the page is the Y axis. Setting the orientation to LANDSCAPE causes output to be rotated 90 degrees clockwise on the device page. The longest side of the page would then be the X axis.

PAPER specifies paper size. The device supports US Letter, US Legal, and European page sizes. Setting PAPER to ISOA4 specifies the use of European paper; setting it to NARROW specifies using US Letter (the default); setting it to WIDE specifies using US Legal size paper.

PAGELENGTH specifies the number of graphic rows which will be used to represent one standard page of output. This value is resolution-dependent. The specific default values for one page are as follows:

One page of graphics may be printed within a region either shorter or longer than the device page. This will result in either condensing or stretching the output. In PORTRAIT mode, the number of rows is a measure of the Y axis, and in LANDSCAPE mode changing PAGELENGTH will affect the length of the X axis. The minimum number of rows is always 1; the maximum number may vary as required.

If the cut sheet paper feeder is being used, the maximum page length will be set to the default rows per page. The environmental form feed setting (FF) must be turned off for application-specific output to be displayed after graphics on the same page.

TEMPDIR specifies the directory in which the driver is to maintain any temporary files. This path will not be used for redirecting output to a file. The default is the directory from which the application was started.

EPSONX This driver is capable of redirecting its output to a file, in addition to the channels PRN and LPT1-LPT8. If the filename specified in the environment is not a qualified IO channel, all output will be sent to a file, which may then be printed using "copy/b filename PRN". The /b option is included as a precaution; it may not be necessary. The file need not exist prior to initialization of the driver. If it does exist, however, its contents will be overwritten.

PLISTSIZE informs the printer driver of the maximum number of bytes for its display list buffer. The default and minimum size is 512 bytes. Increasing this value causes the specified number of bytes to be allocated when plotting. It is intended for applications which can afford the memory to obtain increased performance. These bytes are not released until plotting is completed.

RESOLUTION is measured in dots per inch. This setting actually determines the size of a dot. At 120 dpi, one square inch measures 120 dots horizontally and 72 dots vertically. This is the only resolution supported.

FF, the form feed setting, determines whether the driver will cause the device to advance to top of form at the end of graphics. The default is to form feed after output has been displayed. Setting the form feed option OFF in the environment will prevent the form feed command from being sent to the printer.

Color: The Epson X supports two colors: Index 1 is displayed in black ink, and index 0 is not displayed. These colors cannot be redefined Hardware Text: The EpsonX must have access to one hardware text file. The driver will assume that the file is in the same directory as EPSONX.SYS unless it finds "FONTS=(some path)" in the environment. The necessary file is HW_6X8.FNT, the hardware font file for 75 dpi resolution in both landscape and portrait mode.

Hardware Specifics: The Epson X runs under the default factory setup. No special hardware installation procedures are required to run EPSONX.SYS. The EpsonX driver supports the following printers: EPSON EX-800, EPSON EX-1000, EPSON FX-85, EPSON FX-185, EPSON FX-286 (though not the FX-86e or FX 286e), EPSON MX-80F/T, and EPSON MX-100 III.

HEWLETT PACKARD LASERJET+ PRINTER

FILENAME: LASERJET.SYS
DEVICE LOGICAL NAME: PRINTER
DEVICE LOGICAL CHANNEL: PRN
DEFAULT RESOLUTION AND ASPECT RATIO: The Horizontal and Vertical dpi (dots per inch) are used for selection of raster fonts.
SPECIFIC FEATURES SUPPORTED:

Environmental settings: The user can specify the environmental settings.

RESOLUTION specifies the density at which the graphics is to be displayed on the Laserjet. The 300 dpi resolution requires that the printer have at least megabytes of memory installed for proper operation CARTRIDGE specifies which optional Hewlett Packard font cartridge can be used in conjunction with the GSS Font driver to display high quality graphics text. The font driver and font files must be installed correctly as documented in the CGI Programmer's Manual. There is one font driver file for each font on a cartridge. For example, cartridge A (COURIER1) has 3 font files named LJA.1 LJA.2 and LJA.3.

TEMPDIR specifies the directory in which the printer driver writes the display list temporary file. The default is the current directory.

PLISTSIZE allows a user to specify the number of bytes for the internal display list buffer. The default size is 512 bytes. The memory required is allocated when plotting and not released until plotting is completed. This function is intended for applications which can afford the memory to obtain increased performance.

PAPER specifies paper size. The device supports US Letter, US Legal, and European page sizes. Setting PAPER to LEGAL specifies the use of US Legal paper 8.5 by 14 inches, with a drawing surface of 8.0 by 13.5 inches). Setting PAPER to ISOA4 specifies the use of European paper (210 by 297 mm, with a drawing surface of 198 by 284 mm). The default is US Letter (8.5 by 11 inches, with a drawing surface of 8.0 by 10.5 inches).

Color: The LaserJet supports two colors: Index 1 is displayed as black, index 0 is not displayed. These colors cannot be redefined Alpha Text: In addition to the common features, the following alpha text capabilities are available on this printer.

Fonts:

1=Normal (default)

2=Bold

Sizes: 1=10 characters per inch (default)

HEWLETT PACKARD PLOTTERS

FILENAME: HPPLOT.SYS

DEVICE LOGICAL NAME: PLOTTER

DEVICE LOGICAL CHANNEL: AUX

SPECIFIC FEATURES SUPPORTED:

Communication ports supported: This device driver supports output to COM1 (default), COM2, COM3, and COM4.

Running in the Compatibility Box of OS2: This driver will run in the compatibility box of OS/2 if the COM port is set up properly. This setup is achieved by issuing the following command at the DOS prompt in the compatibility box.

SETCOM40 COMx=ON where COMx can be either COM1, COM2, COM3, or COM4, depending on your hardware configuration. When you are done with the port, issue the following command to again allow OS/2 to manage the port:

SETCOM40 COMx=OFF

Serial I/O: The following chart gives the cable specifications for various computers. Any pin which is not assigned is not used.

Environmental Settings: The user can specify the environmental settings.

ORIENTATION specifies how the output graphics are presented on the output page. In LANDSCAPE, (the default), the x axis is the longest dimension on the output page; in PORTRAIT, the x axis is the shortest dimension on the output page.

FLAGGING specifies which mode of communication will be used to interact with the plotter. HARDWIRE (the default), specifies hardware handshake as the mode of communication; XONXOFF specifies Xon/Xoff as the mode of communication. This driver supports only serial communication.

COMx specifies a communication protocol. The com port number, "x", designates which com channel will have the protocol specified by the parameters.

Baud defaults to 9600, but available rates are 75, 11[0], 13[4.5], 15[0], 30[0], 60[0], 12[00], 18[00], 20[00], 24[00], 36[00], 48[00], 72[00], 96[00], and 19[200], where only the number outside the brackets is used to specify the rate.

Parity defaults to None, but the optional settings are N[one], E[ven], O[dd], S[pace], and M[ark].

The default for Databits is 8, but this parameter may be set to 5, 6, 7, or 8. If Databits is not set wide enough to contain all data, data will be lost.

Stopbits is set to 1 by default, but a value of 2 may be entered instead.

The only setting for Hardware is N[ullModem], but by leaving this position blank the default setting is assumed. If "N" is specified in the Hardware field, the driver will send data to the device without regard to hardware signal status (i.e. CTS and DSR signals are ignored), and as a result, data may be lost. If no value is given for Hardware, the default is to acknowledge the CTS and DSR signals.

HPPLOT specifies a communication channel for the plotter. Output may be redirected to any of the ports COM1 (the default) through COM4.

Plotters Supported by this driver: In the table below, plotters shown on the same row will be considered identical under the circumstances noted in the last column

| Pens | HP Models | IBM Models | Comment |
|---|---|---|---|
| 8 | 7440A | 6180, 7370 | |
| 2 | 7470A | 7371 | |
| 6 | 7475A | 7372 | |
| 8 | 7550A | 6182 | Auto-feed enabled |
| 8 | 7580B, 7570 | 6184, 7374 | |
| 8 | 7585B, 7586, 7595, 7596 | 6186, 7375 | Roll-feed disabled |
| 8 | 7586B, 7595, 7596 | 6186, 7375 | Roll-feed enabled |

Auto-feed Paper: The HP 7550 and IBM 6182 plotters both support automatic paper loading. This driver always sends the page-feed command to these plotters. If the Autofeed feature has been manually disabled (via access to the plotter's front panel), the page-feed command will have no effect on the plotter. Other plotters may support the paper-roll feed option, which may be treated as an auto-feed.

Request Locator: The pen holder may be used to indicate the point to be selected. Move the pen holder by pressing the position keys on the front panel. When the pen holder is positioned correctly, press the ENTER button. This transmits the coordinates of the point back to the user program.

Color: Color indices are mapped to pen stations. For example, CGI color index 1 is mapped to pen station 1, color index 2 to station 2, and so on. Color index 0 is not displayed.

Alpha Text: In addition to the common features, the following alpha text capability is available on this plotter.

Fonts:

1=Normal

2=Bold

3=Italics

HPGL OUTPUT ONLY PLOTTERS

FILENAME: HPGLPLTR.SYS

DEVICE LOGICAL NAME: PLOTTER

DEVICE LOGICAL CHANNEL: AUX

SPECIFIC FEATURES SUPPORTED:

Communication ports supported: This device driver supports output to COM1 (default), COM2, COM3, and COM4.

Running in the Compatibility Box of OS/2: This driver will run in the compatibility box of OS/2 if the COM port is set up properly. This setup is achieved by issuing the following command at the DOS prompt in the compatibility box.

SETCOM40 COMx=ON where COMx can be either COM1, COM2, COM3, or COM4, depending on your hardware configuration. When you are done with the port, issue the following command to again allow OS/2 to manage the port:

SETCOM40 COMx=OFF

Serial I/O: When a serial port is used, any pin which is not assigned is not used.

Environmental Settings: The user can specify environmental settings.

ORIENTATION specifies how the output graphics are presented on the output page. In LANDSCAPE, (the default), the x axis is the longest dimension on the output page; in PORTRAIT, the x axis is the shortest dimension on the output page.

FLAGGING specifies which mode of communication will be used to interact with the plotter. HARDWIRE (the default), specifies hardware handshake as the mode of communication; XONXOFF specifies Xon/Xoff as the mode of communication.

LOGICALBUF specifies logical buffer size to be used by the device. Some devices allow performance to be optimized by manipulation of the physical and logical buffer sizes. See the device's programming manual for more information. The allowable range for this variable depends on the plotter. The default size as set by this driver is 1024 bytes. The logical buffer size is limited by the physical buffer. The driver does not adjust the size of the physical buffer.

COMx specifies a communication protocol. The com port number, "x", designates which com channel will have the protocol specified by the parameters.

Baud defaults to 9600, but available rates are 75, 11[0], 13[4.5], 15[0], 30[0], 60[0], 12[00], 18[00], 20[00], 24[00], 36[00], 48[00], 72[00], 96[00], and 19[200], where only the number outside the brackets is used to specify the rate.

Parity defaults to None, but the optional settings are N[one], E[ven], O[dd], S[pace], and M[ark].

The default for Databits is 8, but this parameter may be set to 5, 6, 7, or 8. If Databits is not set wide enough to contain all data, data will be lost.

Stopbits is set to 1 by default, but a value of 2 may be entered instead.

The only setting for Hardware is N[ullModem], but by leaving this position blank the default setting is assumed. If "N" is specified in the Hardware field, the driver will send data to the device without regard to hardware signal status (i.e. CTS and DSR signals are ignored), and as a result, data may be lost. If no value is given for Hardware, the default is to acknowledge the CTS and DSR signals.

HPGLPLTR specifies a communication channel for the plotter. Output may be redirected to a file or to any of the ports COM1 (the default) through COM4. Note that the printer ports LTP1-LPT8 are seen as files. If redirecting output to one of these ports, it is necessary to turn file sequencing off by setting the File Sequencing field of the HP_TYPE environmental to "N".

HP_TYPE specifies characteristics of the device and/or driver. This environmental has a field for each option. The fields are:

Device Class, which specifies the type of plotter being used and default characteristics. Available classes are:

7220, which specifies using a Hewlett Packard 7220 plotter or one with compatible features. Default is ANSI A pagesize with 4 pens, and file sequencing in case the output is redirected to a file. To use 8 pens, set the Number of Pens field of the HP_TYPE environmental string to 8. The HP 7220 will not operate at 9600 baud, which is the default for this driver. Use the COMx environmental string to set the baud rate. For example, "set com2=24" will set the baud rate for com2 to 2400 without affecting other default protocol parameters. Make sure the baud rate dial on the back of the plotter is set for the same rate.

7440, which specifies using a Hewlett Packard 7440 plotter or one with compatible features. Default is ANSI A pagesize with 8 pens, and file sequencing in case the output is redirected to a file. Other plotter identification numbers recognized in this class include 6180 and 7370.

7470, which specifies using a Hewlett Packard 7470 plotter or one with compatible features. Default is ANSI A pagesize with 2 pens, and file sequencing in case the output is redirected to a file. Other plotter identification numbers recognized in this class include 7371.

7475, which specifies using a Hewlett Packard 7475 plotter or one with compatible features. Default is ANSI B pagesize with 6 pens, and file sequencing in case the output is redirected to a file. Other plotter identification numbers recognized in this class include 7372.

7550, which specifies using a Hewlett Packard 7550 plotter or one with compatible features. Default is ANSI A pagesize with 8 pens, and file sequencing in case the output is redirected to a file. The 7550 can be set to automatically load the next sheet of paper, and the default assumes this setting. Entering "N" for the Autoload field will disable this feature. Other plotter identification numbers recognized in this class include 6182.

7470, which specifies using a Hewlett Packard 7580 plotter or one with compatible features. Default is ANSI D pagesize with 8 pens, and file sequencing in case the output is redirected to a file. Other plotter identification numbers recognized in this class include 6184, 6186, 7374, 7375, 7570, 7585, 7586, 7595, and 7596.

Page Size, an optional field which will override the default page size setting from the Device Class field. Available page sizes are:

A which specifies ANSI A size paper
B which specifies ANSI B size paper
C which specifies ANSI C size paper
D which specifies ANSI D size paper
E which specifies ANSI E size paper
A4 which specifies European A4 size paper
A3 which specifies European A3 size paper A2 which specifies European A2 size paper
A1 which specifies European A1 size paper
A0 which specifies European A0 size paper Number of Pens, an optional field which will override the default number of pens setting from the Device Class field. The driver expects a positive integer number in this field.

File Sequencing, an optional field which will override the default file sequencing setting from the Device Class field. The driver expects either "S" for sequencing or "N" for no sequencing. File sequencing is only operational if the output is redirected to a file. Note that the printer ports LPT1-LPT8 are seen as files. If redirecting output to one of these ports, it is necessary to turn file sequencing off by setting this field to "N". To redirect output to a file, type the following commands at the DOS prompt.

SET PLOTTER=HPGLPLTR
SET HPGLPLTR=<filename>

If you are not using file sequencing, all output will be written to a file with the specified name, overwriting the file if it exists. If you are using file sequencing, pages of graphics output will be written to separate files. If there are no graphics during a session, no output files will be created. If there is only one page of output, the file will be given the root of the name specified, with "0.000" as an extension. If multiple pages of output are generated, the output files will be given the root of the specified name, with separate, incrementally-advancing extensions—0.000 for the first file, to 0.999 for the thousandth page of output. An error will be returned if more than 1000 pages are generated. If a file with the root and current extension number already exists, the sequence number will be incremented and the driver will attempt to use a name with the incremented extension number. Note that any extension given with the specified name is ignored, and if a file with the specified name exists, it will be deleted.

Auto-feed Paper, an optional field which will override the default setting in the driver only if the device ID specified was 7550 or 6182. The driver expects either "Y" for auto-feed or "N" for no-auto-feed. When using either of these plotters with the auto-feed feature manually disabled, the setting in this field will not affect the plotter.

The settings in (1) specify a Hewlett-Packard 7475 class device, using ANSI A size paper and 4 pens. The file sequencing option has been disabled, and, since the device does not support automatic paper feed, nothing is specified for the Auto Feed field.

The settings in (2) illustrate defaulting. A field with no setting will be set to the default for that device. The settings in (2) specify a Hewlett-Packard 7475 class device, using ANSI A size paper (defaulted), 8 pens (defaulted), the use of file sequencing, and the use of the automatic paper feed feature. The only field which must be specified is the device ID.

Color: Color indices are mapped to pen stations. For example, CGI color index 1 is mapped to pen station 1, color index 2 to station 2, and so on. Color index 0 is not displayed.

Alpha Text: In addition to the common features, the following alpha text capability is available on this plotter.

Fonts:
1=Normal
2=Bold
3=Italics

Graphics Input Devices:

Metavision currently supports the graphics input devices listed below.

| GRAPHICS INPUT DEVICES SUPPORTED | |
|---|---|
| Calcomp 2500/9100 Series Tablets | CALCOMPA.SYS |
| Calcomp Drawing Board Tablet | CALCOMPB.SYS |
| Carroll Touch Smart Frame | CTOUCH.SYS |
| IBM Game Adapter | IBMGIJOY.SYS |
| IBM Personal System/2 Mouse | PS2MOUSE.SYS |
| Microsoft Mouse | MSMOUSE.SYS |
| Mouse Systems PC Mouse | MOUSESYS.SYS |
| Summagraphics MM 1812 Tablet | SUM1812.SYS |
| Summagraphics SummaSketch Tablet | SUMMATB.SYS |
| Visi-On Mouse | VISMOUSE.SYS |

IBM PERSONAL SYSTEM/2 MOUSE

FILENAME: PS2MOUSE.SYS
DEVICE LOGICAL NAME: MOUSE
DEVICE LOGICAL CHANNEL: NOT APPLICABLE

FEATURES SUPPORTED: A graphics input cursor appears on the output echo device at the initial locator position. The graphics input cursor can be positioned by moving the stylus. When the graphics input cursor is at the desired location, the point can be selected by pressing a button on the stylus. This causes the coordinates of the point to be transmitted to the user application, along with the ASCII character code of the specific button pressed.

The buttons and their ASCII character codes are as follows:

| | |
|---|---|
| Left Button: | sp |
| Right Button: | ! |
| Both Buttons: | " |

MICROSOFT MOUSE

FILENAME: MSMOUSE.SYS
DEVICE LOGICAL NAME: MOUSE
DEVICE LOGICAL CHANNEL: NOT APPLICABLE

SPECIAL REQUIREMENTS: This driver will function with either the Bus or Serial version of the Microsoft Mouse. The driver assumes the Microsoft Mouse software, MOUSE.SYS, has been installed in the CONFIG.SYS file, or that the user installed MOUSE.COM after the computer was booted.

FEATURES SUPPORTED:

Request Locator: When Request Locator is invoked, a graphics input cursor appears on the output echo device at the initial locator position. The graphics input cursor can be positioned by moving the stylus. When the graphics input cursor is at the desired location, the point can be selected by pressing a button on the stylus. This causes the coordinates of the point to be transmitted to the user application, along with the ASCII character code of the specific button pressed. The buttons and their ASCII character codes are as follows:

| | |
|---|---|
| Left Button: | sp |
| Right Button: | ! |
| Both Buttons: | " |

Sample Locator: When the driver returns the most recent cursor position and key state information without waiting for operator interaction. The key state is returned in three, 16 - bit integers.

MOUSE SYSTEMS PC MOUSE

FILENAME: MOUSESYS.SYS
DEVICE LOGICAL NAME: MOUSE
DEVICE LOGICAL CHANNEL: COM1
SPECIFIC FEATURES SUPPORTED:

Communication Ports supported: This device driver supports input from COM1 (default) or COM2.

Environmental Settings: The user can specify the following environmental settings.

| COMMAND: | RESULT: |
|---|---|
| SET MOUSESYS=(COMx) | Input from <com1, com2> |

MOUSESYS specifies a communication channel for the device. Input may be redirected from the ports COM1 (default) or COM2. To redirect the input from the tablet driver through COM2 in an application that opens the logical device named MOUSE, type the following commands at the DOS prompt.

Request Locator: When Request Locator is invoked, a graphics input cursor appears on the output echo device at the initial locator position. The graphics input cursor can be positioned by moving the stylus. When the graphics input cursor is at the desired location, the point can be selected by pressing a button on the stylus. This causes the coordinates of the point to be transmitted to the user application, along with the ASCII character code of the specific button pressed. The buttons and their ASCII character codes are as follows:

| | |
|---|---|
| Left Button: | sp |
| Middle Button: | ! |
| Right Button: | # |
| Left and Middle: | " |
| Middle and Right: | % |
| All three: | & |

Sample Locator: When Sample Locator is invoked, the driver returns the most recent cursor position and key state information without waiting for operator interaction. The key state is returned in three, 16 - bit integers as follows.

(1) The current state of the tablet's buttons.
(2) The buttons pressed since the last inquiry, and
(3) The buttons released since the last inquiry.

NOTE: The communication protocol settings for this driver are 1200 baud, 8 data bits, 1 stop bit, and no parity.

VISI ON MOUSE

FILENAME: VISMOUSE.SYS
DEVICE LOGICAL NAME: MOUSE
DEVICE LOGICAL CHANNEL: COM1
SPECIFIC FEATURES SUPPORTED:

Communication Ports supported: This device driver supports input from COM1 (default) or COM2.

Environmental Settings: The user can specify the following environmental settings.

| COMMAND: | RESULT: |
|---|---|
| SET VISMOUSE=(COMx) | Input from <com1, com2> |

VISMOUSE specifies a communication channel for the device. Input may be redirected from the ports COM1 (default) or COM2. To redirect the input from the tablet driver through COM2 in an application that opens the logical device named MOUSE, type the following commands at the DOS prompt.

SET MOUSE=VISMOUSE
SET VISMOUSE=COM2

Request Locator: When Request Locator is invoked, a graphics input cursor appears on the output echo device at the initial locator position. The graphics input cursor can be positioned by moving the stylus. When the graphics input cursor is at the desired location, the point can be selected by pressing a button on the stylus. This causes the coordinates of the point to be transmitted to the user application, along with the ASCII character code of the specific button pressed.

The buttons and their ASCII character codes are as follows:

| | |
|---|---|
| Left Button: | sp |
| Right Button: | ! |
| Both Buttons: | " |

Sample Locator: When Sample Locator is invoked, the driver returns the most recent cursor position and key state information without waiting for operator interaction. The key state is returned in three, 16 - bit integers as follows.

(1) The current state of the tablet's buttons.
(2) The buttons pressed since the last inquiry, and
(3) The buttons released since the last inquiry.

THE R&R REPORTS UTILITY

NOTE: For report generation, MetaVision makes use of the R&R reports utility, a product of Concentric Data Systems Inc. This appendix provides the information on the configuration of this utility; it follows closely the documentation provided by Concentric Data Systems.

Report generation in MetaVision is achieved through the R&R utility. In report generation, R&R is run, and the program reads a configuration file whose default name is RR.CNF. This file describes the configuration of your computer system. For R&R to work properly, the information in this file must match the configuration of your system. The information in this appendix tells you how to run the RRSETUP program that enables you to change the information in this file.

The configuration file contains information about default directories, dBASE memo editor, display type, default index file name extension, and printer types. The only settings you should change are those having to do with the display type and printer(s); altering any of the other settings will cause problems for the operation of MetaVision.

When you invoke rrsetup from the Metavision directory, the following configuration settings of rr.cnf will appear.

Default data directory:
Default work directory:
Default library directory:
Memo editor: dBASE III
Display: Fast Color
Default index file name extension:
Allow file write access: No
Printer 1 type: Generic Printer name: Generic printer
Printer 2 type: Epson MX name: Epson MX
Printer 3 type: UNASSIGNED name:
Printer 4 type: UNASSIGNED name:
Printer 5 type: UNASSIGNED name:
Printer 6 type: UNASSIGNED name:
Printer 7 type: UNASSIGNED name:
Printer 8 type: UNASSIGNED name:

RRSETUP lets you customize these settings. The new settings are stored permanently so that you don't have to change them each time you use R&R, but you can change them if you want to work with R&R on a different system. Again, remember that the only settings you should change are those having to do with the display and printer(s).

To change the existing RR.CNF file, type rrsetup rr

To operate RRSETUP, proceed as follows.

1. Select the item to change by pointing to it using the [Up], [Down], [Left] and [Right] cursor keys and then pressing [Enter].

2. In some cases, you may select the new value from the menu in the control panel; other options may require you to enter new values. To clear the current value, press [Esc]. Type the new value and press [Enter] Press F1 [Help] any time you need help. The rest of this appendix explains your options for each item and how to enter changes.

3. When you are done, type one of the following commands.

To save your changes, type /S.
To cancel your changes, type /C.

4. After you type /S for Save, RRSETUP asks you to enter a name for the configuration file. Since you are changing the current file (RR.CNF), press [Enter]. Do not change the filename or supply a pathname, as this will interfere with the proper operation of MetaVision.

RRSETUP Options for Displays and Printers

Display: When you select Display:, RRSETUP displays a menu with five choices: Monochrome, Slow Black & White, Slow Color, Fast Black & White, and Fast Color. Each display type is explained below. If you aren't sure which is correct, try each type to see which works best.

A Monochrome display displays text only, in one color. It is connected to the IBM Monochrome Display Adapter (MDA) or the equivalent such as the PS/2 MCGA. Choose Monochrome for a Hercules Graphics Card (HGC) and other types of Monochrome/Graphics display adapters.

A Black & White display displays text or graphics in one color. It is connected to the IBM Color Graphics Adapter (CGA) or the equivalent, such as a COMPAQ computer or Hercules Color Card. Choose the Fast Black & White option first and run R&R. If the screen displays an unacceptable amount of "snow" when R&R is updating information, you should choose the Slow Black & White option.

A Color display displays text or graphics in color. It should be an IBM Color Display or the equivalent connected to the IBM Color Graphics Adapter (CGA), Enhanced Graphics Adapter (EGA), or the equivalent. Select this option for the IBM PS/2 Video Graphics Array (VGA). Choose the Fast Color option first and run R&R. If the screen displays an unacceptable amount of "snow" when R&R is updating information, you should choose the Slow Color option.

Printer types: R&R provides a menu listing many popular printers. To identify your printer(s), point to a printer type (e.g. Printer 1 type:) and press [Enter]. If your printer is listed in the menu, just select it. To display the next group of choices, press PgDn and PgUp. R&R displays the factory settings for the printer selected. You can change Printer name, Interface type, Port, and specify fonts (press PgDn to display font screen).

To enter a name for the selected printer, point to Printer name and press [Enter]. Type a name of up to 22 characters (including spaces) and press [Enter].

To change the interface type, point to Interface type and press [Enter]. Select either Parallel or Serial. If you select Serial, you can also specify Data/Stop bits, Parity, and Baud rate To make other changes to the factory settings, you should save the printer selection (type /S) and then change the printer type to CUSTOM, the first choice on the printer menu. You can then change all of the standard settings or add additional settings. When you have finished, type one of the following commands.

To save the choice, type /S.
To cancel the choice and select again, type /C

To remove a printer type from the configuration file, point to it, press [Enter], and select UNASSIGNED, the second choice on the printer menu.

Custom Printer configuration: If your printer is not in the menu, you can still set up R&R to work with your printer. First, try to determine whether your printer works like one of those in the menu. If it does, select that printer. If it seems to be unlike any of those in the menu or does not seem to work properly, select CUSTOM. This choice allows you to tailor R&R for any printer.

Define a custom printer configuration by selecting menu choices and entering codes. Your printer uses these settings to control options such as page size, underlining, and forms handling options. RRSETUP displays the printer settings on two screens. Press PgDn to move from screen one to screen two and then PgUp to move back to screen one.

For information about printer settings and codes, consult your printer manual. On many printers, certain configuration settings have to match the switch settings inside the printer. Another source of information is other software products already set up to work with your printer. Many word processing programs, for example, have utilities that allow you to display the codes and settings.

When RRSETUP asks you to enter a printer control sequence, you can enter a sequence of decimal numbers between 0 and 255, as well as character strings. Enclose character strings within quotation marks or apostrophes. You may use both numbers and character strings within a sequence. Separate each sequence from the next with a comma. For example, the printer reset code for the IBM 80 CPS Dot Matrix printer is given in ASCII characters as Esc @. You would enter this as either 27, Γor 27,l "@". (Tables for translating ASCII characters into decimal code numbers are to be found in most printer manuals.)

Depending on the control sequence required, you can enter a maximum of between 64 and 128 control characters or numbers. If the sequence is too long to be displayed completely on the screen, R&R displays an ellipsis (. . .). When you have finished entering the codes and settings, type /S to save the changes or /C to cancel the changes.

Operation of the Metavision System requires execution of numerous program routines combined with corresponding functional steps performed by system operators. To present the multitude of steps which are performed in the clearest, most logical way, the operator steps required to execute a typical project are presented for the total project. Next, the computer steps which are executed for the same project are presented in the same sequential order.

The operator Builds Management Systems when the required steps are performed. The technology is referred to as Connected Development Methodology. It has three major steps which are subdivided to meet the user's needs. The steps are:

1 Business Modeling
Analysis of Process, Data, Control and Support for business functions within the project scope.
2 Software Engineering
Analysis and design of areas of the Business Model to be automated or to which formal design procedures are to be applied.
3 Prototyping
Create a system that will simulate the actual software application. Code is generated to perform most application functions. Custom code is added to perform the non-generated functions.

Figure 1B:
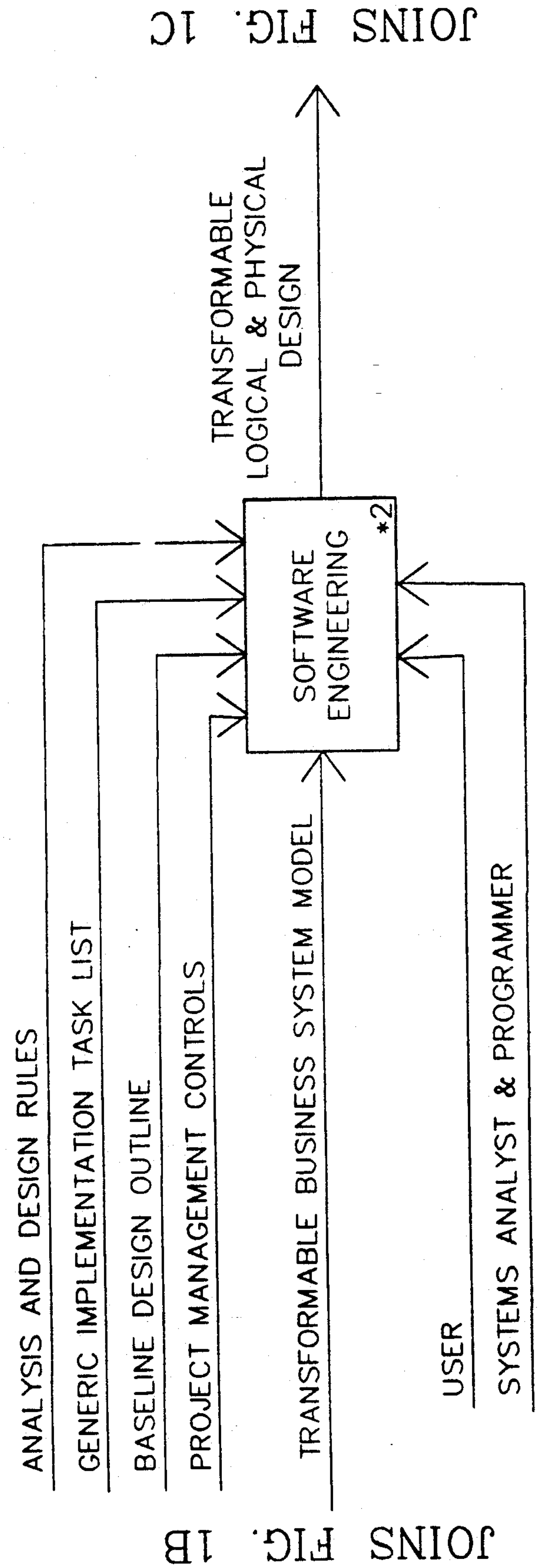
Figure 1C:
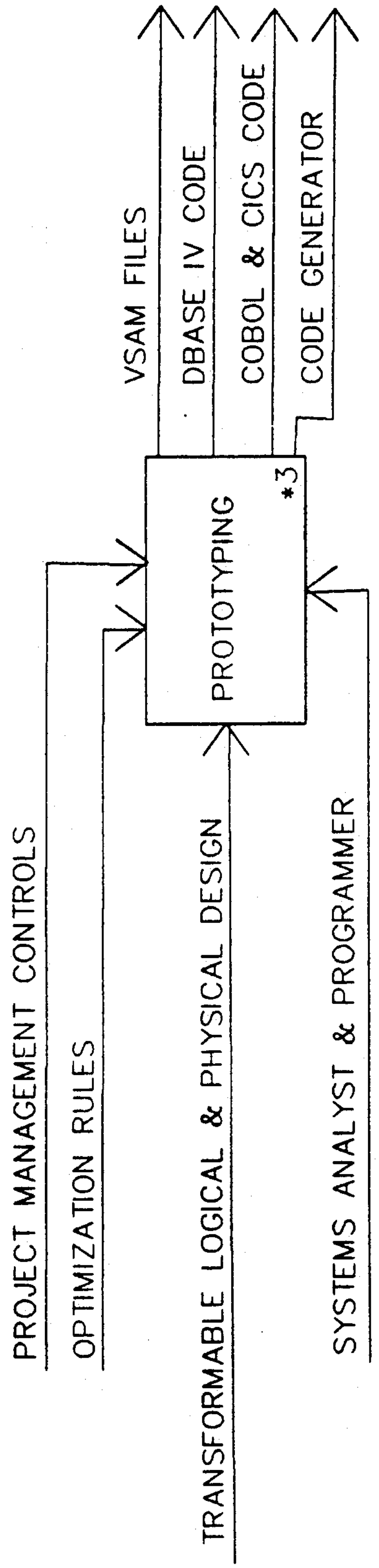
Figure 2A:
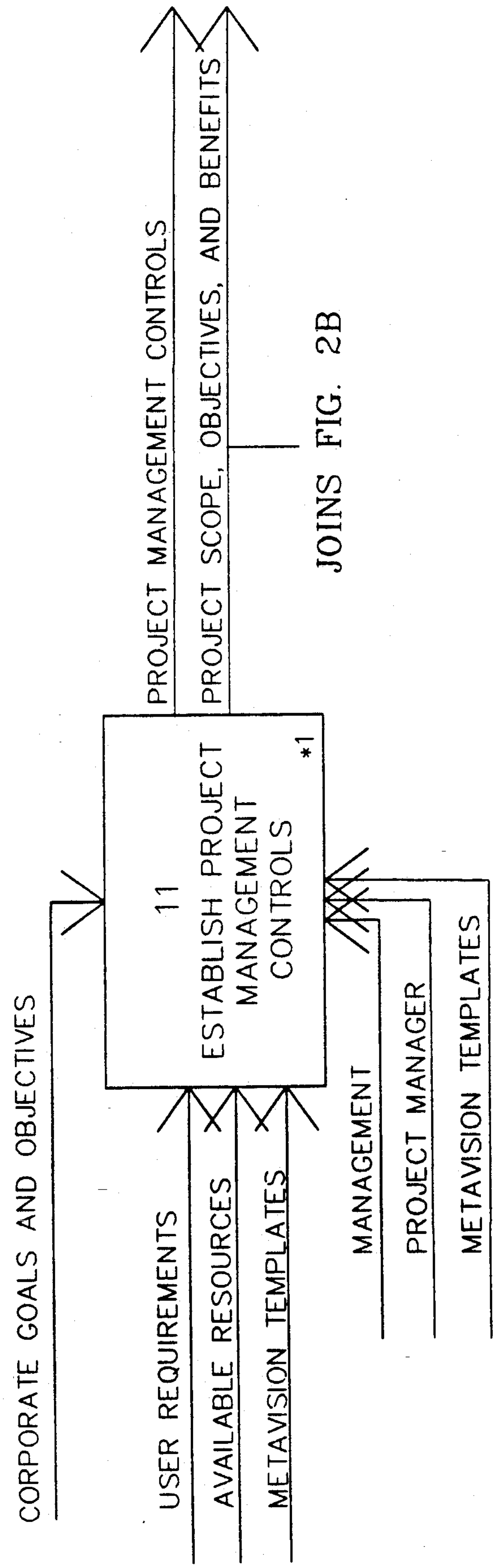
FIGS. 2A, 2B, 2C, 2D and 2E make up for FIG. 2 which is a functional diagram of Business Modeling steps.
Figure 2B:
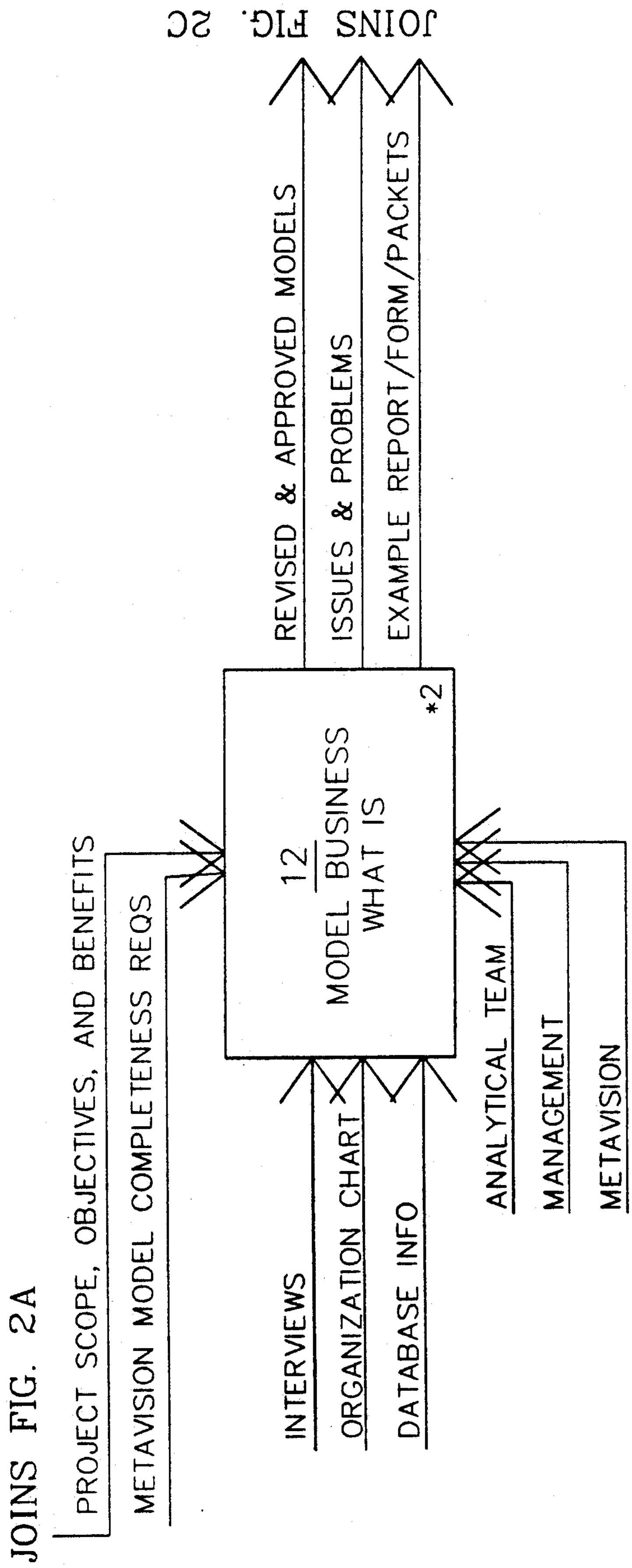
Figure 2C:
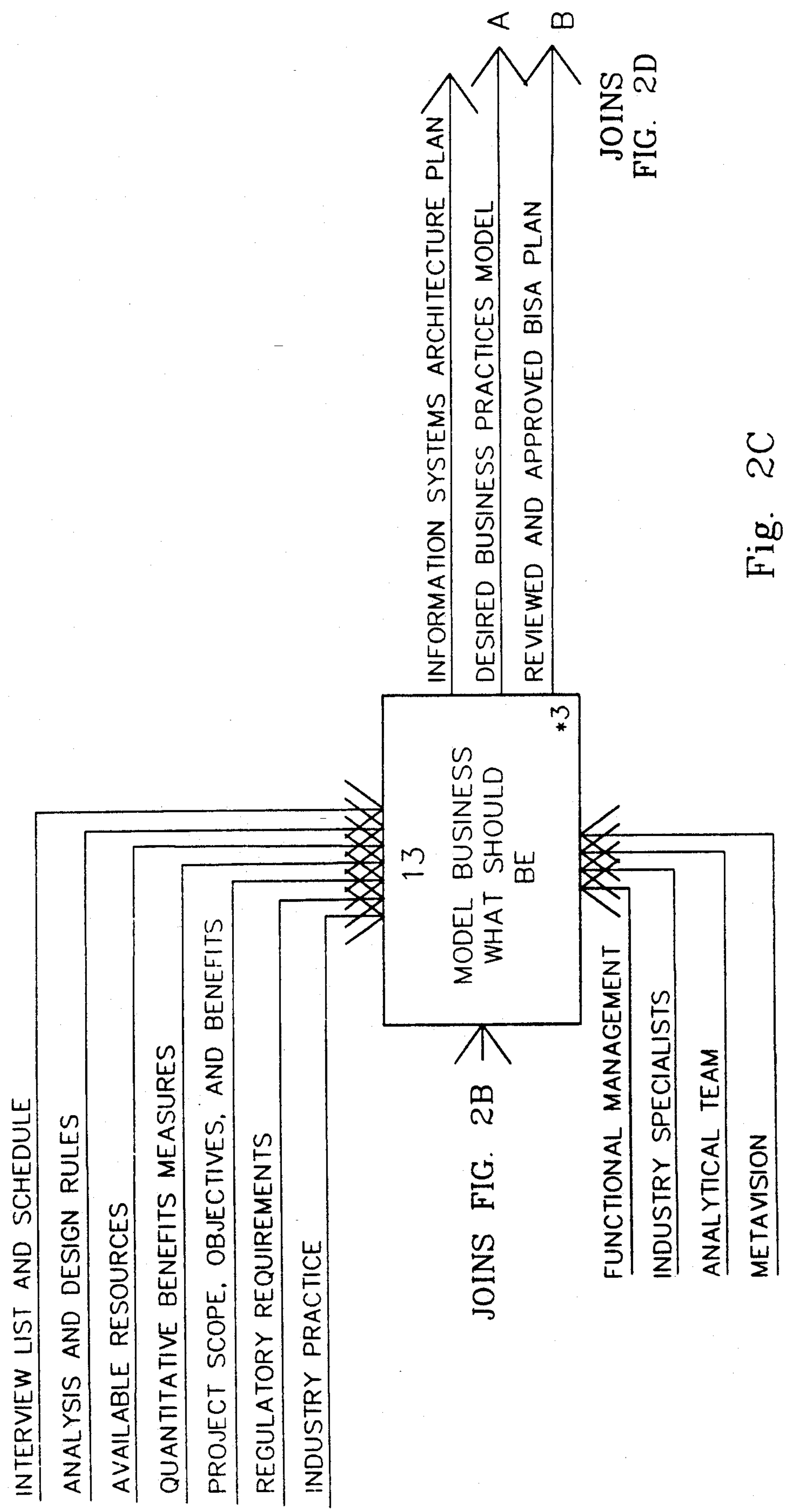
Figure 2D:
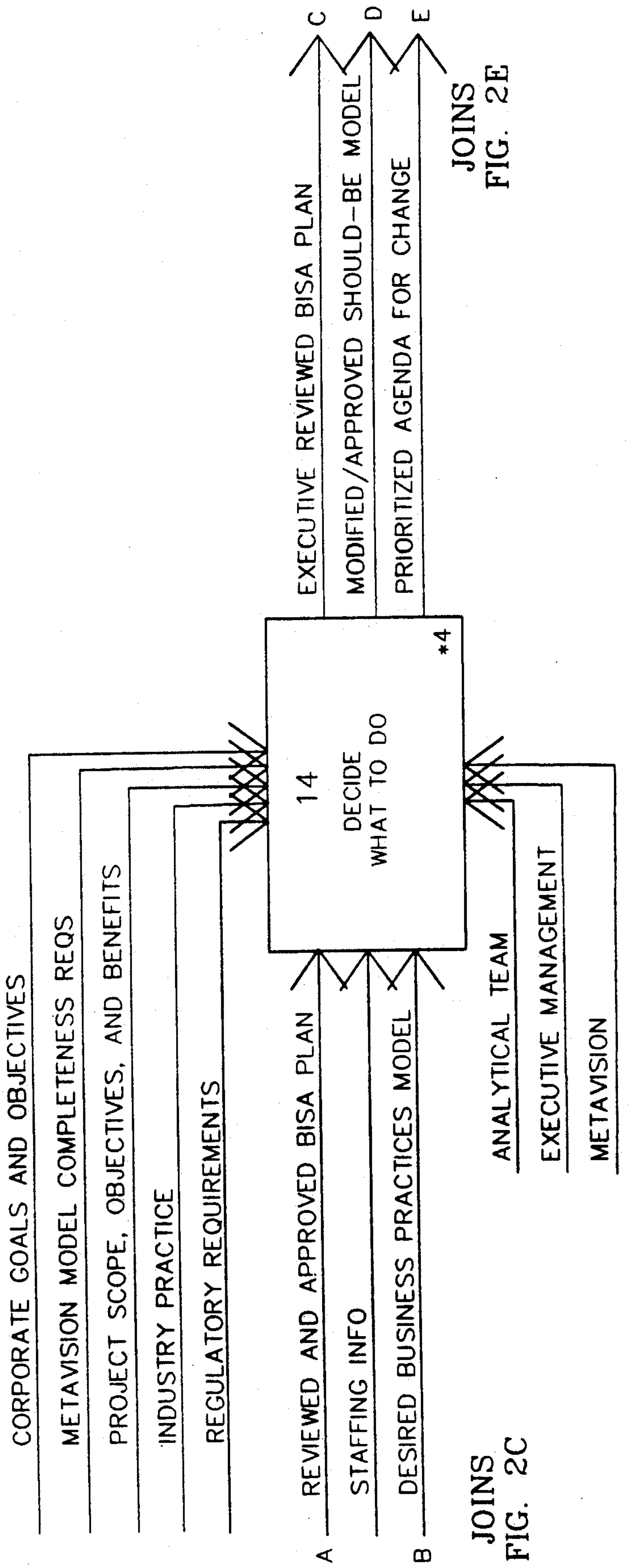
Figure 2E:
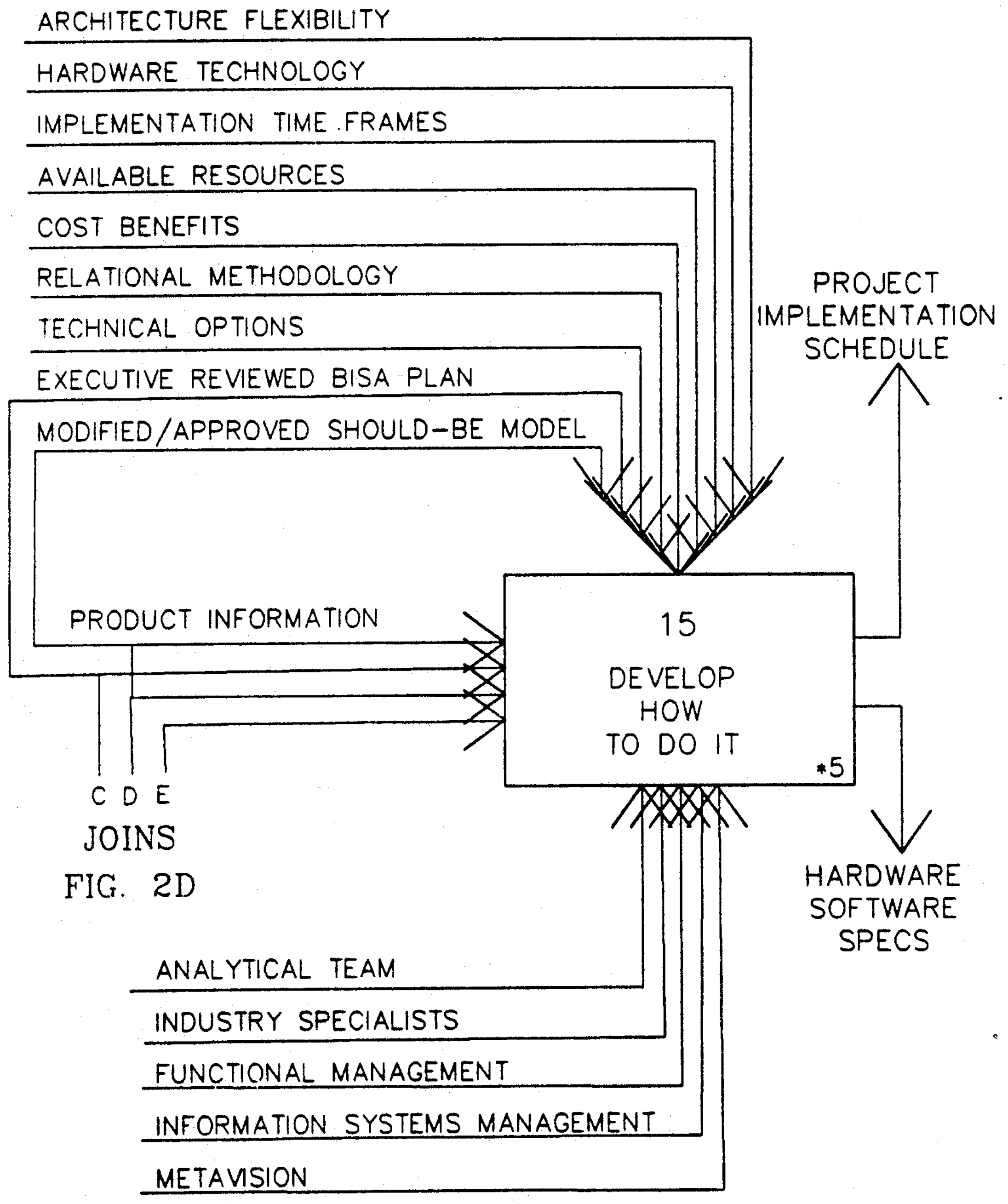
Figure 3A:
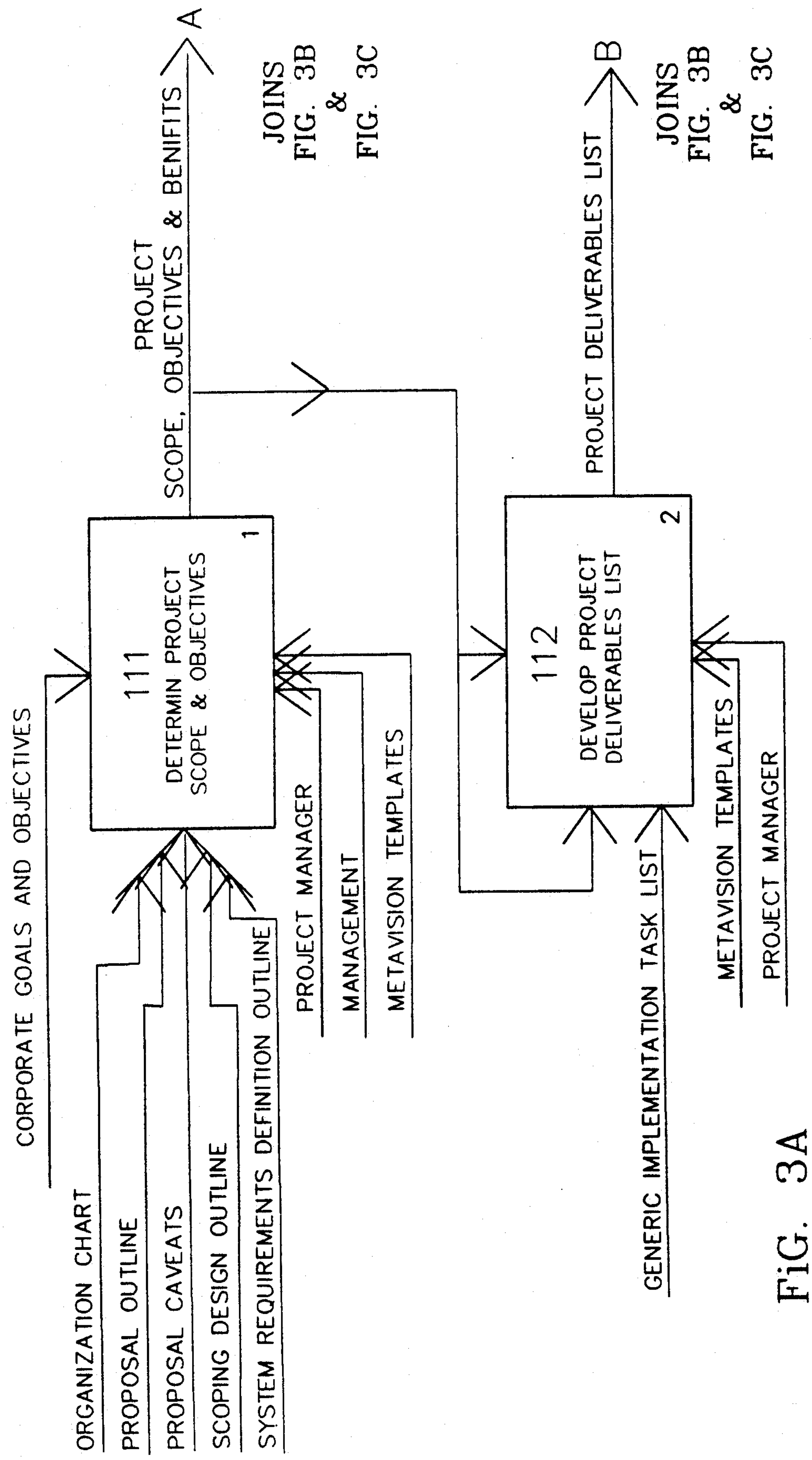
FIGS. 3A, 3B, 3C and 3D make up for FIG. 3 which is a functional diagram of the Establish Project Management Controls steps.
Figure 3B:
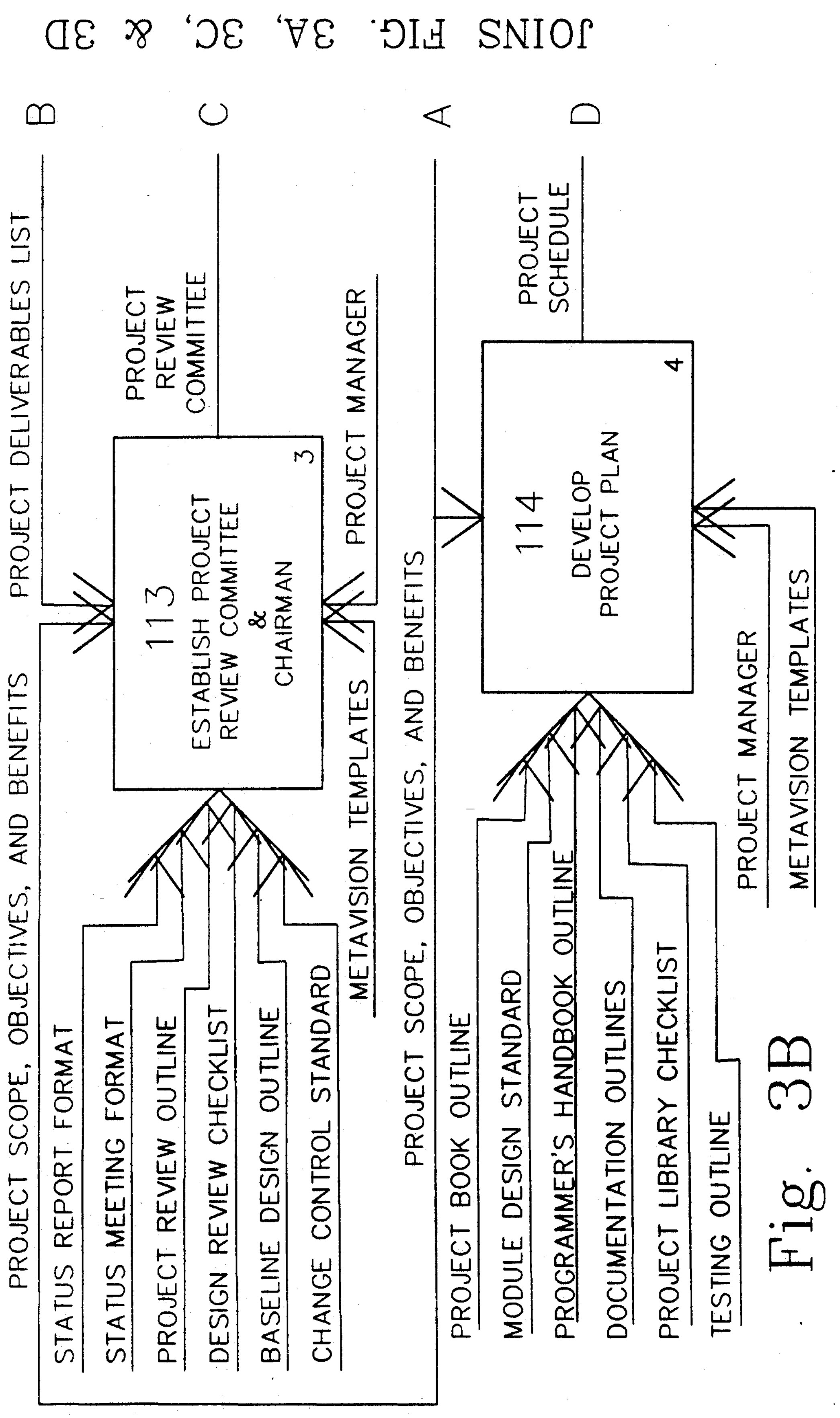
Figure 3C:
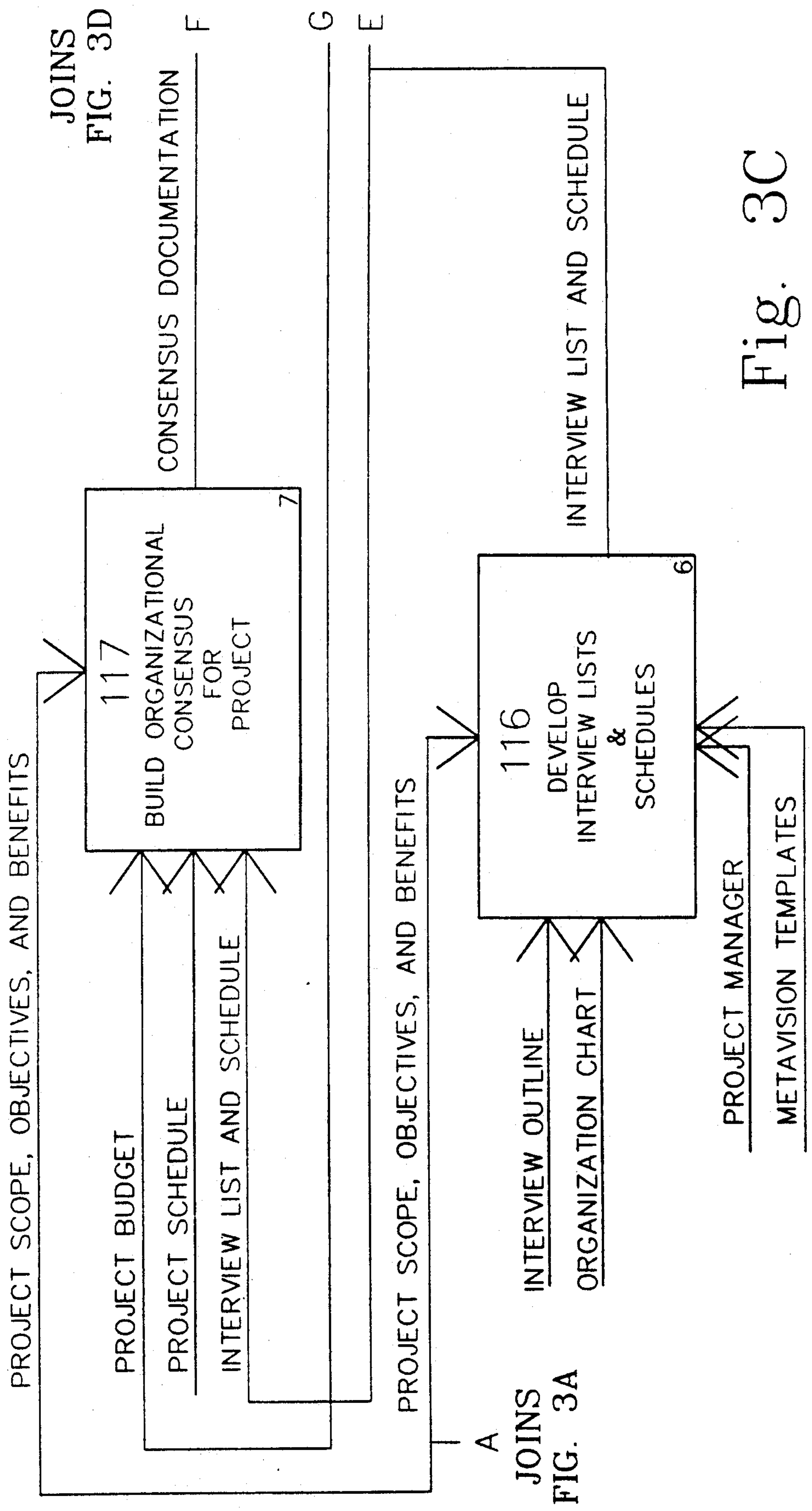
Figure 3D:
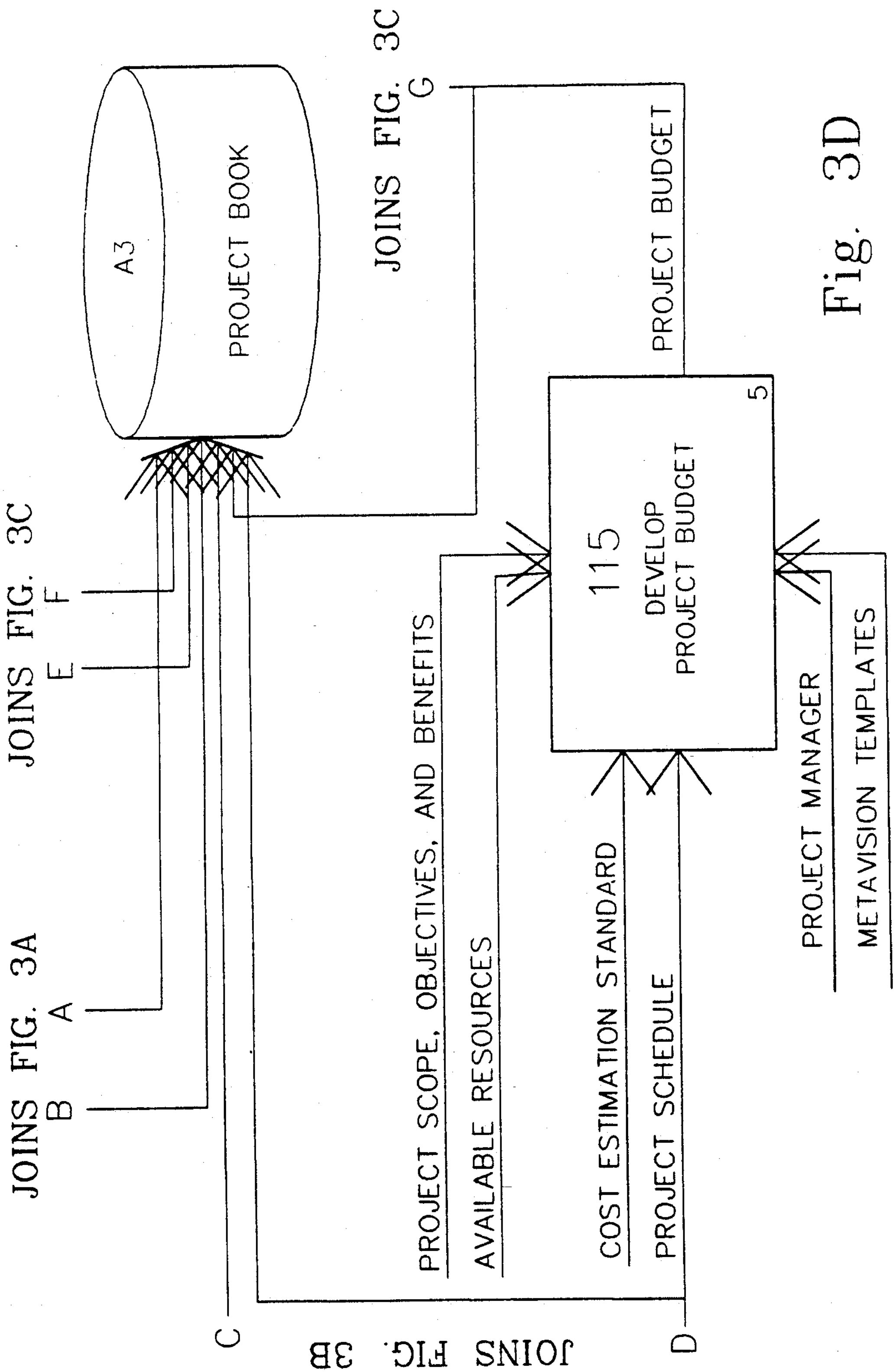

The steps and their inputs are diagrammed in FIG. 1, Building Management Systems.

During the performance of the Building Management Systems steps, input and output data consisting of the following reports, forms and data packets are entered or generated.

1 Cost Benefits
Financial benefits accruing from a particular course of action.
2 Analysis and Design Rules
Connected Development conventions for analyzing and designing systems.
3 Corporate Goals and Objectives
The expressed goals and objectives formulated by upper management for a business.
4 Knowledge about business
The knowledge about particular business functions articulated by particular managers.
5 Transformable Business System Model
A complete MetaVision model of the functioning of a business that may serve as the basis for further elaboration to the point of generating software.
6 Transformable Logical & Physical Design
A MetaVision based model of a system elaborated to the point where it may be used to generate computer source code.
7 VSAM Files
Computer information maintained in VSAM format (Virtual Sequential Access Method).
8 dBase IV Code
Code to be used by Ashton—Tate's dBase IV.
9 COBOL & CICS Code
Source COBOL Code with embedded CICS calls.
10 Code Generator
A program that has as its output source code ready to be compiled in the appropriate language.
11 Optimization Rules
Principles for optimizing a system.
42 Baseline Design Outline
Outline of components of an acceptable delivered system.
47 Generic Implementation Task List
List of items that need to be accomplished in the development and delivery of a software system.
67 Project Management Controls
Practices and procedures that have been developed and agreed to by management and the persons conducting the project for status reviews and reporting.

The Business Modeling steps of Analysis of Process, Data, Control and Support for business functions within the project scope may be considered as comprising the following primary steps:

11 Establish Project Management Controls
Determine the project scope, personnel, responsibilities, schedules, budgets, and deliverables. Build organizational consensus for the project.
12 Model Business What Is
Model the current business practices of the organization for the scope that falls within the project.
13 Model Business what Should Be
Model the business as it should be to meet the new requirements and deal with objections and issues raised during the analysis.
14 Decide What to Do
Describes what needs to be done in order to make the transition from the current system to the proposed system.
15 Develop How To Do It
A model of how to implement the proposed system changes.

The steps and their inputs are diagrammed in FIG. 2, Business Modeling.

During the performance of the Business Modeling steps, input and output data consisting of the following reports, forms and data packets are entered or generated.

1 Cost Benefits
Financial benefits accruing from a particular course of action.

2 Analysis and Design Rules
Connected Development conventions for analyzing and designing systems.
3 Corporate Goals and Objectives
The expressed goals and objectives formulated by upper management for a business.
12 Industry Practice
The industry's common means for dealing with similar requirements for hardware, software, and database managers.
13 Issues & Problems
List of Issues & Problems elicited from supervisors during interviews relative to the system that is being analyzed as part of a MetaVision project.
17 Desired Business Practices Model
MetaVision generated model of the business as it is plus changes to that model including automation of processes and additional data requirements.
18 Information Systems Architecture Plan
List of new information and its system relationships along with known data problems. Migration plan with detailed time, person, & $ estimates.
Staffing Info
Information on personnel availability and assignments.
20 Regulatory Requirements
Requirements by organization(s) regulating the activities of a business including reporting and manner in which activities are performed.
22 Prioritized Agenda for Change
This is an organizationally validated agenda for implementing the changes indicated by review of the WHAT-SHOULD-BE model and ISA Plan.
23 Technical Options
24 Relational Methodology
The MetaVision application of the set of principles that apply to database design using the relational theoretical model as background.
33 Hardware Software Specs
Technical specifications for hardware and software.
39 User requirements
The project parameters as specified by the user including scope and objectives.
40 Available Resources
Personnel and budget available to commit to the project.
50 Project scope, objectives, and benefits
The extent of the system to be modeled and domain where changes are to be considered along with benefits of modeling and possible changes.
55 Interview List and Schedule
List of persons to be interviewed and the schedule for their interviews.
67 Project Management Controls
Practices and procedures that have been developed and agreed to by management and the persons conducting the project for status reviews and reporting.
70 Quantitative Benefits Measures
Quantitative Measures for each of the Benefits that will be obtained by the completion of the project.
76 Interviews
Meetings with the management of a business at which information is gathered to model their job functions, reporting practices, and problems.
77 Organization Chart
A standard graphic representation of the functional organization of personnel within a business.
78 MetaVision model completeness reqs
The criteria determining a complete model, includes all descriptive fields filled in & support & all major types of data icons exist for all processes
88 Revised & Approved Models
Management suggests changes to models until they reflect an acceptable representation of the business.
90 Reviewed and approved BISA Plan
The Business Information Systems Architecture Plan is reviewed by functional management for approval and concurrence that the solutions are reasonable
91 Example Report/Form/Packets
Examples of the Reports, Forms, or Packets that are part of the Current Business Model.
96 Modified/Approved SHOULD-BE Model
Modified SHOULD-BE Business Practices Model with portions to be automated indicated.
97 Executive Reviewed BISA Plan
The Business Information Systems Architecture Plan is reviewed by executive management for approval and concurrence that the solutions are reasonable.
99 Project Implementation Schedule
Schedule of implementation of proposed system.
102 Implementation time frames
The time to implement a project should be less than nine months. More time than this will probably result in business changes making system obsolete.
103 Hardware technology
The state of current hardware technology with regard to possible capacity and performance.
104 Architecture Flexibility
The extent to which a system is open or closed, ie., are later changes or expansions or integration with other current or proposed systems possible.
105 Database Info
System database schemas, record/field definitions/-descriptions and dba sizing and transaction rate information for existing database(s).
106 Product Information
Information on hardware, software, and database management systems.
107 MetaVision Templates
The outlines and forms contained in MetaVision that serve as models for conducting a project.

The Software Engineering steps of Analysis and design of areas of the Business Modelto be automated or to which formal design procedures are to be applied may be considered to include the following primary steps:

21. Develop Software SHOULD-BE Process Model
Expand process diagrams to the point where a single function corresponds to a single program except where program internal functions suggest even further decomposition of the model.
22 Develop SHOULD-BE Control Logic Model
Design flows functions of the system.
23 Model Menus, Screens, & Reports
Using MetaVision's Screen and Report design facilities, design the screens and reports with the headings, body, and free text needed.
24 Develop File Design
Use MetaVision Question Mapping, Grouping, Conceptual Schema, and External Schema modeling capabilities to design file structures. Modify external schema if needed to add indexes for searches & sorts

25 Select Hardware & Software
Based on user and system requirements select the software and hardware to be used in implementation. Review the design done to this point and make any required changes.
26 Document System
Document the system as designed. This should be close, if not identical, to the implemented system documentation.

During the performance of the Software Engineering steps, input and output data consisting of the following reports, forms and data packets are entered or generated.

2 Analysis and Design Rules
Connected Development conventions for analyzing and designing systems.
17 Desired Business Practices Model
MetaVision generated model of the business as it is plus changes to that model including automation of processes and additional data requirements.
21 Corporate Budget
The portion of the corporate resources allocated to particular activities.
27 Schedule
A listing of milestones and dates activities to be completed.
28 Models
Graphic representations of a system of activities showing a decomposition of the entities and processes involved as well as their relationships.
29 System Design Diagrams
MetaVision model of a proposed system.
31 Screen & Report Layouts
Graphic representation of the way computer terminal screens and printed reports are to be organized.
32 Baseline Design
33 Hardware Software Specs
Technical specifications for hardware and software.
34 Project Information
All of the information relating to a project. This should normally be kept together in a project library.
35 Documentation Standards
A MetaVision document that describes the normal components of a project documentation collection.
36 Project Documentation
All of the documents related to a project.
37 Design Standards
Outline of the nomarl elements of a system design.
38 Control Model
A MetaVision model of the system of control in a business.

The Prototyping steps which Create a system that will simulate the actual software application may be considered to include the following primary steps:

31 Demo Prototype and Obtain Feedback
Using the models from Software Engineering, produce a demo prototype that shows the major functions of the system show demo to client and include any feedback in the design.
32 Generate Data Structures & Index Files
Generate data and index file structures from the design.
33 Generate Reports & Screens
Generate reports & screens based on the design.
34 Program Additional Reports & Screens
Make modifications to generated programs for custom report and screen requirements. Code any other programs that can not be generated.
35 Set Up & Generate Menu Programs
Generate the menu system that will be used for the user interface for accessing the system functions.
36 Optimize programs
Custom code any programs as needed to optimize them for the particular environment in which they will be used.
37 Create Test Data Sets
Generate sets of data that appropriately test the generated software.
38 Test System
Using generated test data sets, test the system to be implemented, documenting expected and obtained results.
39 Install & User Test System
Install the system in the environment in which it will be used and conduct tests by users of its functionality and acceptability.
3A Catalog System & Release
Enter the system into the appropriate system catalogs for use and release the system for operation.

In the above steps, Code is generated to perform most application functions. Custom code is added to perform the non-generated functions.

During the performance of the Prototyping steps, input and output data consisting of the following reports, forms and data packets are entered or generated.

61 Testing Outline
Outline of procedures to be used in testing software.

The primary step Establish Project Management Controls; determine the project scope, personnel, responsibilities, schedules, budgets, and deliverables. Build organizational consensus for the project is broken down into the following secondary steps:

111 Determine Project Scope & Objectives
In conference with the project sponsor(s) determine the extent of the effort to be expended and the organization to be modelled. Determine and clarify the overall objectives to be met by the project.
112 Develop Project Deliverables List
List the deliverables for the project in sufficient detail so that all parties will agree a deliverable has in fact been delivered when a delivery is made.
113 Establish Project Review Committee & Chairman
Identify the persons who will review the design and final implementation so that sign-off can be obtained on deliverables.
114 Develop Project Plan
Prepare a project plan using the items listed on the PROPOSAL OUTLINE form as guidelines.
115 Develop Project Budget
Estimate the budget required to produce the project deliverables using the COST ESTIMATION STANDARD form as a guideline.
116 Develop Interview Lists & Schedules
Identify the supervisors to be interviewed, coordinate schedules of interview participants, and set up schedules of interviews.
117 Build Organizational Consensus For Project Inform all persons in the organization that have a stake in the project of your role and intentions. Discuss either informally or informally the project goals with all interested persons.

The steps and their inputs are diagramed in FIG. 3, Establish Project Management Controls.

During the performance of the Establish Project Management Controls steps, input and output data consisting of the following reports, forms and data packets are entered or generated.

3 Corporate Goals and Objectives
The expressed goals and objectives formulated by upper management for a business.

40 Available Resources
Personnel and budget available to commit to the project.

41 Interview Outline
Description of information to be gathered at interviews.

42 Baseline Design Outline
Outline of components of an acceptable delivered system.

43 Change Control Standard
Documenting providing a template for a change control standard.

44 Cost Estimation Standard
Document providing procedure for estimating costs associated with software development.

45 Design Review Checklist
Outline of elements of a design review.

46 Documentation Outlines
Outline of items to be included in the documentation for a project.

47 Generic Implementation Task List
List of items that need to be accomplished in the development and delivery of a software system.

48 Module Design Standard
A ranking of module relationships to be used in determining the modules to be included in a system.

49 Proposal Caveats
Limitations of obligation and commitment at time of project plan submittal.

50 Project scope, objectives, and benefits
The extent of the system to be modeled and domain where changes are to be considered along with benefits of modeling and possible changes.

51 Project Deliverables List
A list of the items to be delivered in satisfaction of a commitment to do a project.

52 Project Review Committee
A list of the members of the review committee for a project including the chairman of that committee.

52 Project Schedule
This will include tasks, schedules, deliverable milestones & review dates.

54 Consensus Documentation
Documents and meeting notes that establish that review committee and executive management agree to the project proposals and understanding of status.

55 Interview List and Schedule
List of persons to be interviewed and the schedule for their interviews.

56 Project Budget
This is for people, equipment, and money.

58 Proposal Outline
Outline of elements to be included in the project proposal.

59 Status Meeting Format
Project status meeting format including the items to be covered, their order, and form.

60 Status Report Format
Includes:
I. Current Progress
II. Outstanding Requests
III. Outstanding Problems
IV. FOLLOW-UP
and V. Resources Used.

61 Testing Outline
Outline of procedures to be used in testing software.

62 Project Review Outline
Outline of items to be covered in a project review including Project Description, Conduct, Tools, and Budget.

64 Scoping Design Outline
Includes items that are to be used in establishing the scope of the effort to be expended on a project.

65 System Requirements Definition Outline
Outline of system parameters to be met by the project.

77 Organization Chart
A standard graphic representation of the functional organization of personnel within a business.

92 Project Book Outline
A MetaVision template outlining the components of a project book.

93 Programmer's Handbook Outline
A MetaVision template document outlining the components of the documentation each programmer should produce.

94 Project Library Checklist
List of items to be included in the library for a project.

The primary step, Model Business What Is; Model the current business practices of the organization for the scope that falls within the project is broken down into the following secondary steps:

121 Model Current Business Practices
Develop a model of how the company (at least the portion of it falling within the scope of the project) conducts its business in terms of functions, paper flow, personnel, and management controls.

122 Model automated systems database schemas
Develop a model of the existing, automated information database schemas that fall within the project scope.

123 Summarize & Integrate Process Models
Supervisors work at different levels. The models from interviews are initially done separately but need to be combined with the functions of the supervisors placed at appropriate levels.

124 Review & Modify Models & Issues List
Go over the models and problems developed from interviews with the review committee to see which of them should be considered areas for potential change.

Figure 4A:
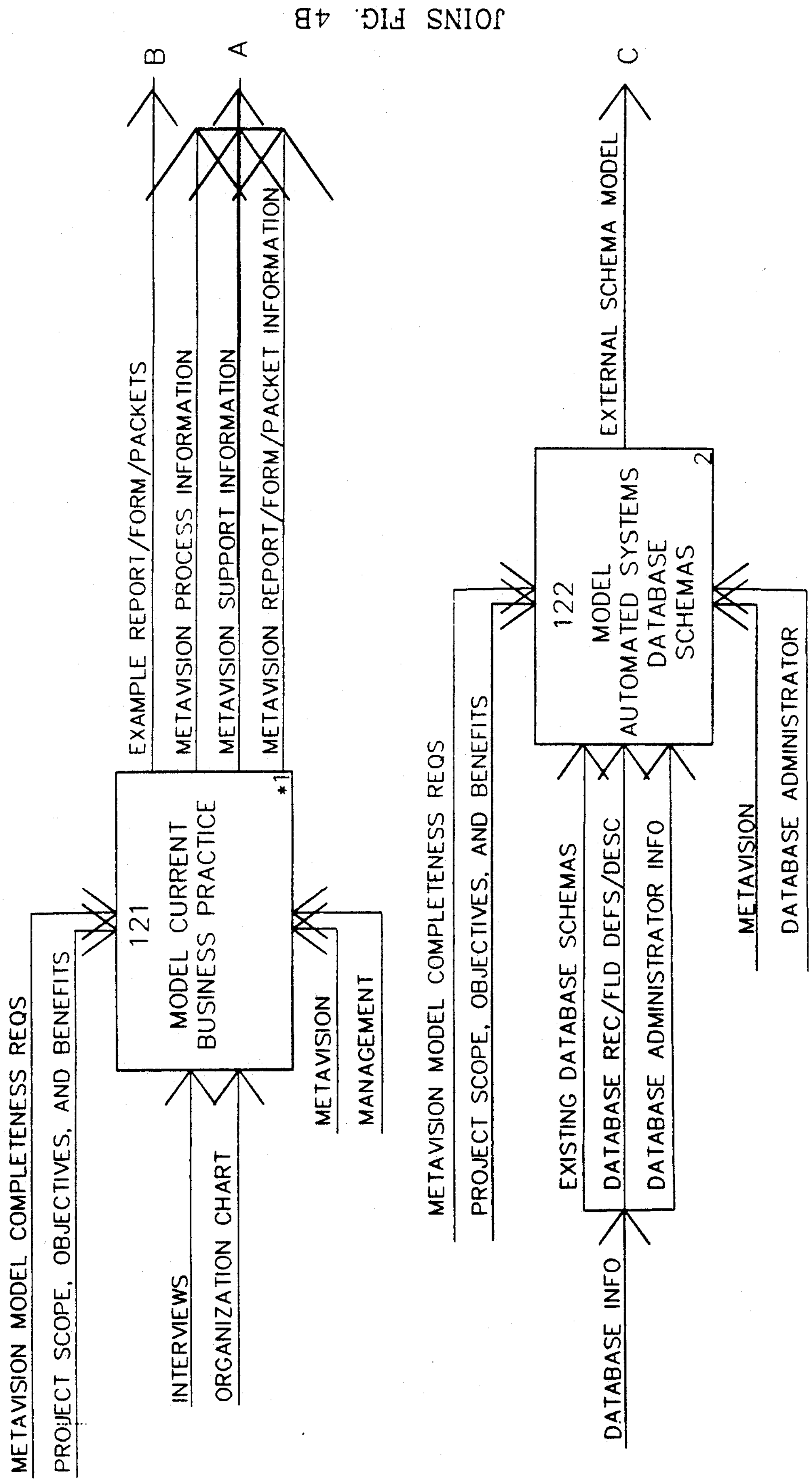
FIGS. 4A and 4B make up for FIG. 4 which is a functional diagram of the Model Business What Is steps.
Figure 4B:
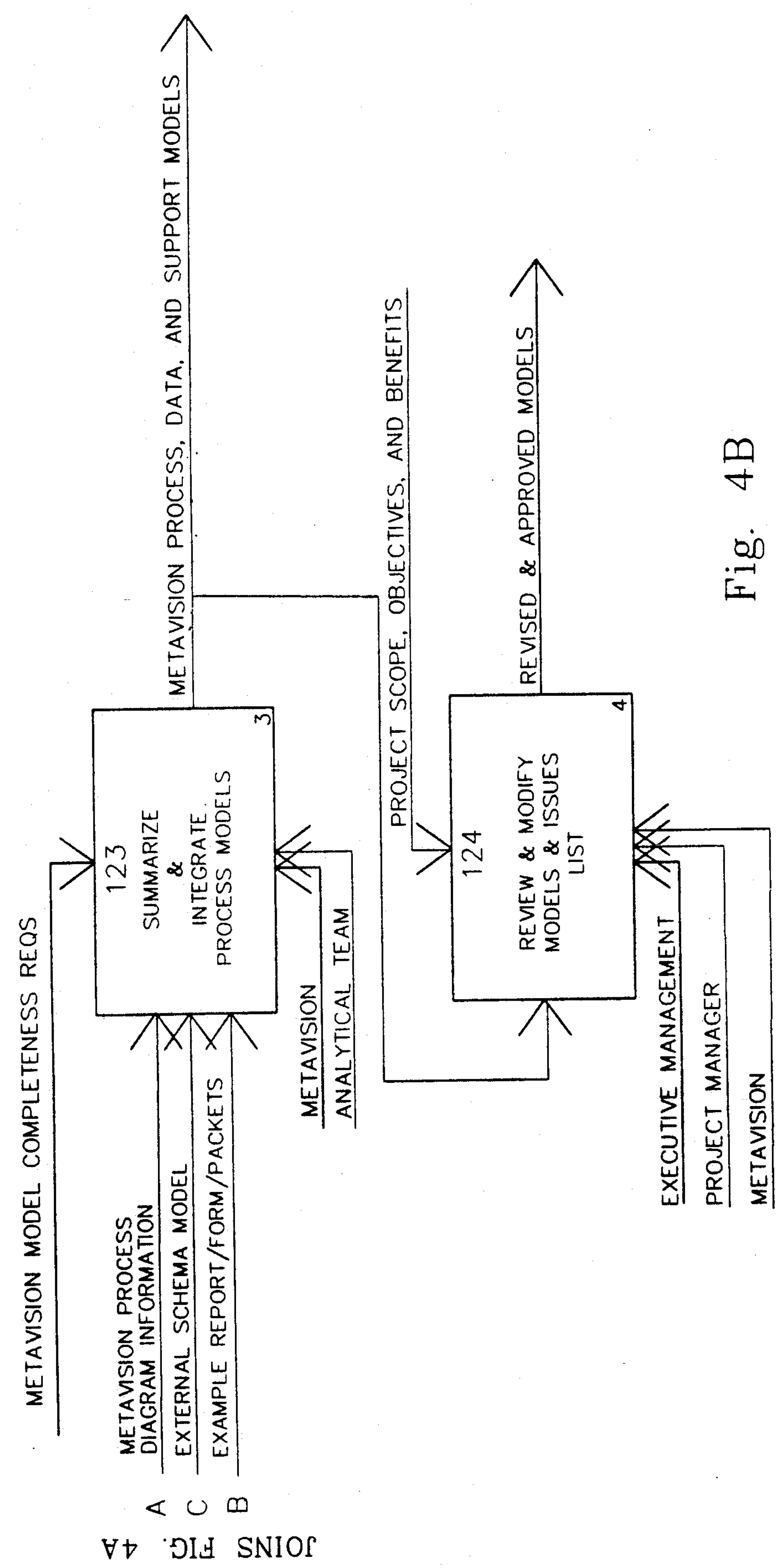

The steps and their inputs are diagramed in FIG. 4, Model Business What Is.

During the performance of the Model Business What Is steps, input and output data consisting of the following reports, forms and data packets are entered or generated.

50 Project scope, objectives, and benefits
The extent of the system to be modeled and domain where changes are to be considered along with benefits of modeling and possible changes.
76 Interviews
Meetings with the management of a business at which information is gathered to model their job functions, reporting practices, and problems.
77 Organization Chart
A standard graphic representation of the functional organization of personnel within a business.
78 MetaVision model completeness reqs
The criteria determining a complete model, includes all descriptive fields filled in & support & all major types of data icons exist for all processes
79 MetaVision Support Information
Information maintained by MetaVision for support data related to processes by means of the support icon and found under the SUPPORT menu header.
80 MetaVision Process Information
Information maintained by MetaVision on the job functions and component processes that are being modeled as well as the managerial functions.
81 MetaVision Report/Form/Packet Information
Information maintained by MetaVision on data flowing between processes, specifically reports, forms, & packets plus other data and consumed materials.
82 Existing database schemas
Documentation or system dumps that describe the current records and fields and their interrelationships stored on computer equipment.
83 Database rec/fld defs/desc
Definitions and descriptions for all of the fields and records that are part of the current databases, as well as information on their relationships.
84 Database Administrator Info
Detailed specifications of fields and records including storage methods and transaction rates.
85 External Schema Modal
A MetaVision generated model of the system data records and fields and their relationships.
86 MetaVision Process Diagram Information
The various types of information captured on MetaVision Process Diagrams including support, process, and report/form/packet information.
87 MetaVision Process, Data, and Support Models
Models created in and generated from MetaVision that encompass process, data, and support.
88 Revised & Approved Models
Management suggests changes to models until they reflect an acceptable representation of the business.
91 Example Report/Form/Packets
Examples of the Reports, Forms, or Packets that are part of the Current Business Model.

The primary step, Model Business What Should Be; Model the business as it should be to meet the new requirements and deal with objects and issues raised during the analysis. It is broken down into the following secondary steps.

131 Measure Current Business Model
Compare the current business model against standards to identify differences and hence areas potentially needing to be included in the Should Be Model.
132 Develop Proposed Solution to Current BPM Problems
Identify specific changes to the current model, assess impact of changes & quantify cost & time, quantify the benefits of the changes.
133 Develop Desired Business Practices Model
Make proposed changes to the current business practices model.
134 Develop Business Information Architecture Plan
The Proposed Business Information Architecture Plan includes both automated and manual systems change plans as well as organization change plan, and ongoing planning and prioritization methodologies.
135 Review & Develop Functional Management "BUY-IN"
Persons who will be managing the implementation and operation of the proposed system must be convinced of the benefits and value of the proposed changes to current business practices.

Figure 5A:
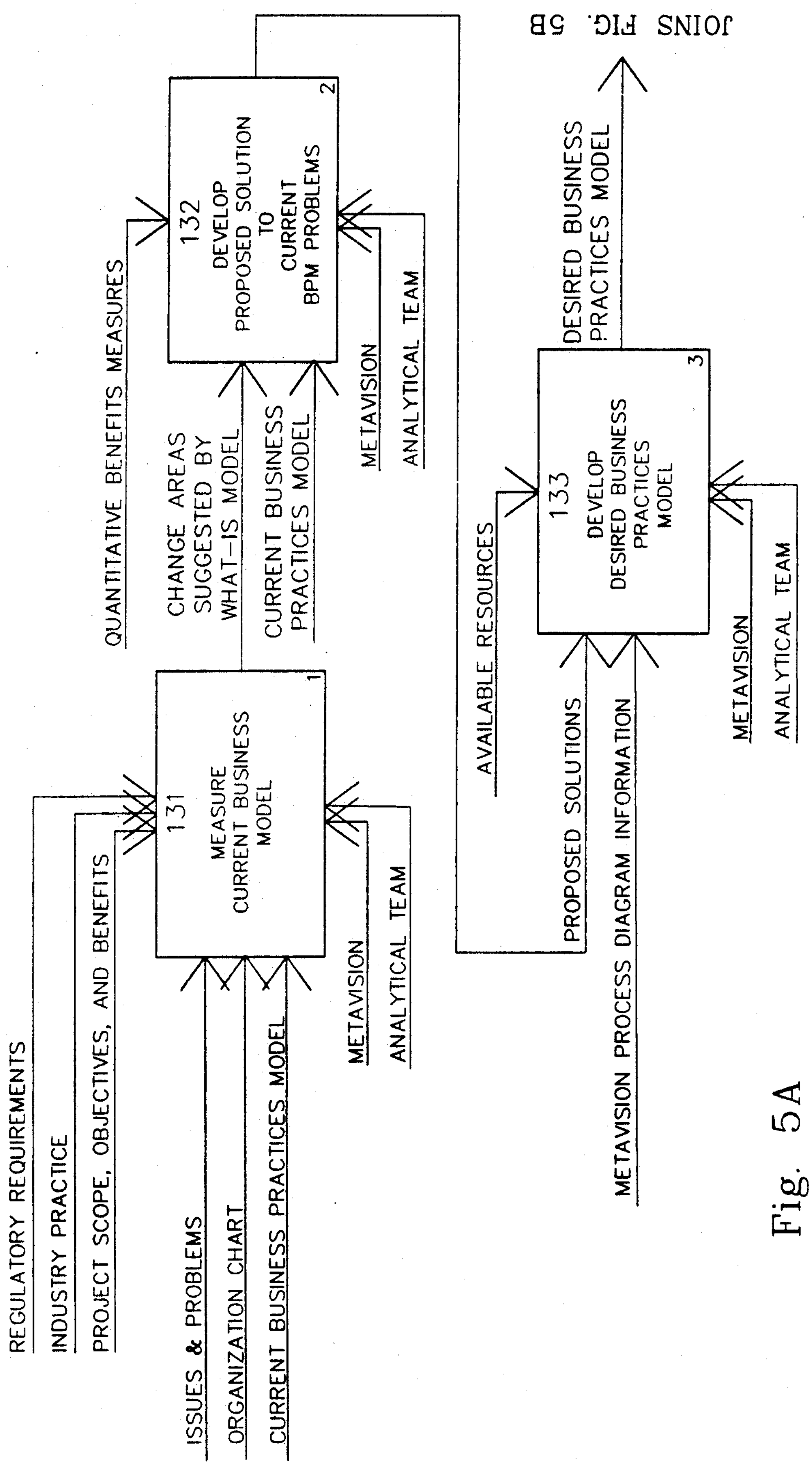
FIGS. 5A and 5B make up for FIG. 5 which is a functional diagram of the Model Business What Should Be steps.
Figure 5B:
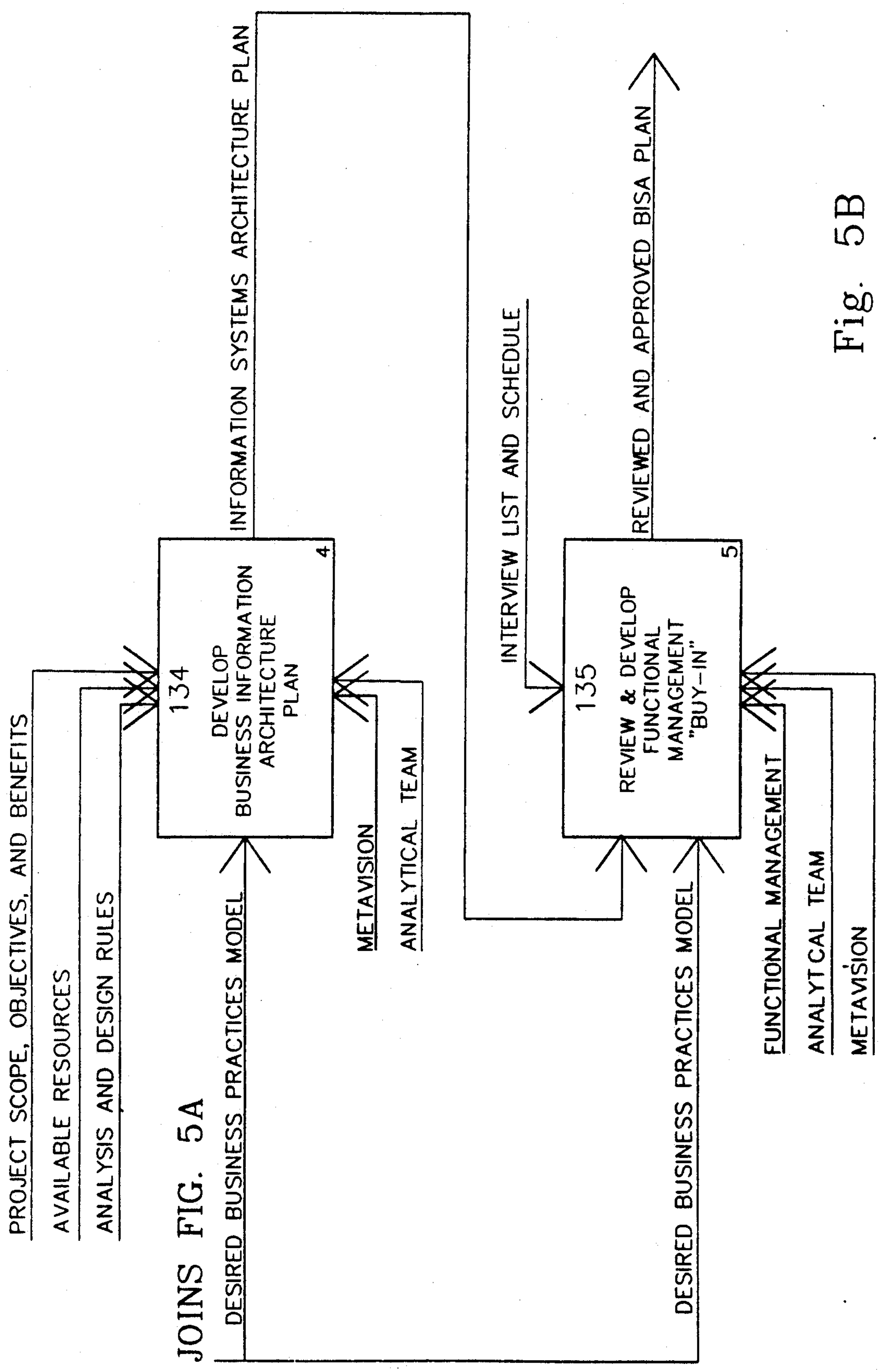

The preceding steps and related inputs and outputs are diagramed in FIG. 5, Model Business What Should Be.

During the performance of the Model Business What Should Be steps, input and output data consisting of the following reports, forms and data packets are entered or generated.

2 Analysis and Design Rules
Connected Development conventions for analyzing and designing systems.
12 Industry Practice
The industry's common means for dealing with similar requirements for hardware, software, and database managers.
13 Issues & Problems
List of Issues & Problems elicited from supervisors during interviews relative to the system that is being analyzed as part of a MetaVision project.
14 Current Business Practices Model
A connected development model of the way that business is currently being conducted in the organization.
16 Proposed Solutions
Outline of elements to be included with specification of the details to solve the problems with a business system disclosed during WHAT-IS modeling.
17 Desired Business Practices Model
MetaVision generated model of the business as it is plus changes to that model including automation of processes and additional data requirements.
18 Information Systems Architecture Plan
List of new information and its system relationships along with known data problems. Migration plan with detailed time, person, & $ estimates.
20 Regulatory Requirements
Requirements by organization(s) regulating the activities of a business including reporting and manner in which activities are performed.
40 Available Resources
Personnel and budget available to commit to the project.
50 Project scope, objectives, and benefits The extent of the system to be modeled and domain where changes are to be considered along with benefits of modeling and possible changes.

55 Interview List and Schedule

List of persons to be interviewed and the schedule for their interviews.

70 Quantitative Benefits Measures

Quantitative Measures for each of the Benefits that will be obtained by the completion of the project.

77 Organization Chart

A standard graphic representation of the functional organization of personnel within a business.

86 MetaVision Process Diagram Information

The various types of information captured on MetaVision Process Diagrams including support, process, and report/form/packet information.

89 Change Areas Suggested by WHAT-IS Model

Issues & problems, regulatory compliance, differences from good industry practices, information bottlenecks, quality indicators do not exist.

90 Reviewed and approved BISA Plan

The Business Information Systems Architecture Plan is reviewed by functional management for approval and concurrence that the solutions are reasonable The primary step, Decide What to Do; Describes what needs to be done in order to make the transition from the current system to the proposed system. It is broken down into the following secondary steps.

141 Present Desired BPM to Executive Management

The proposed Business Practices Model is presented for review, modification, and acceptance/rejection of specific changes to the management having implementation approval authority.

142 Modify Proposed Solutions/ Accepts or Rejects

Using the criteria from review meetings with executive management the WHAT-SHOULD-BE model is modified to reflect changes as required.

145 Prioritize BIAP

Prioritize the implementation of the changes identified in the Business Information Architecture Plan for the changes approved by executive management.

Figure 6:
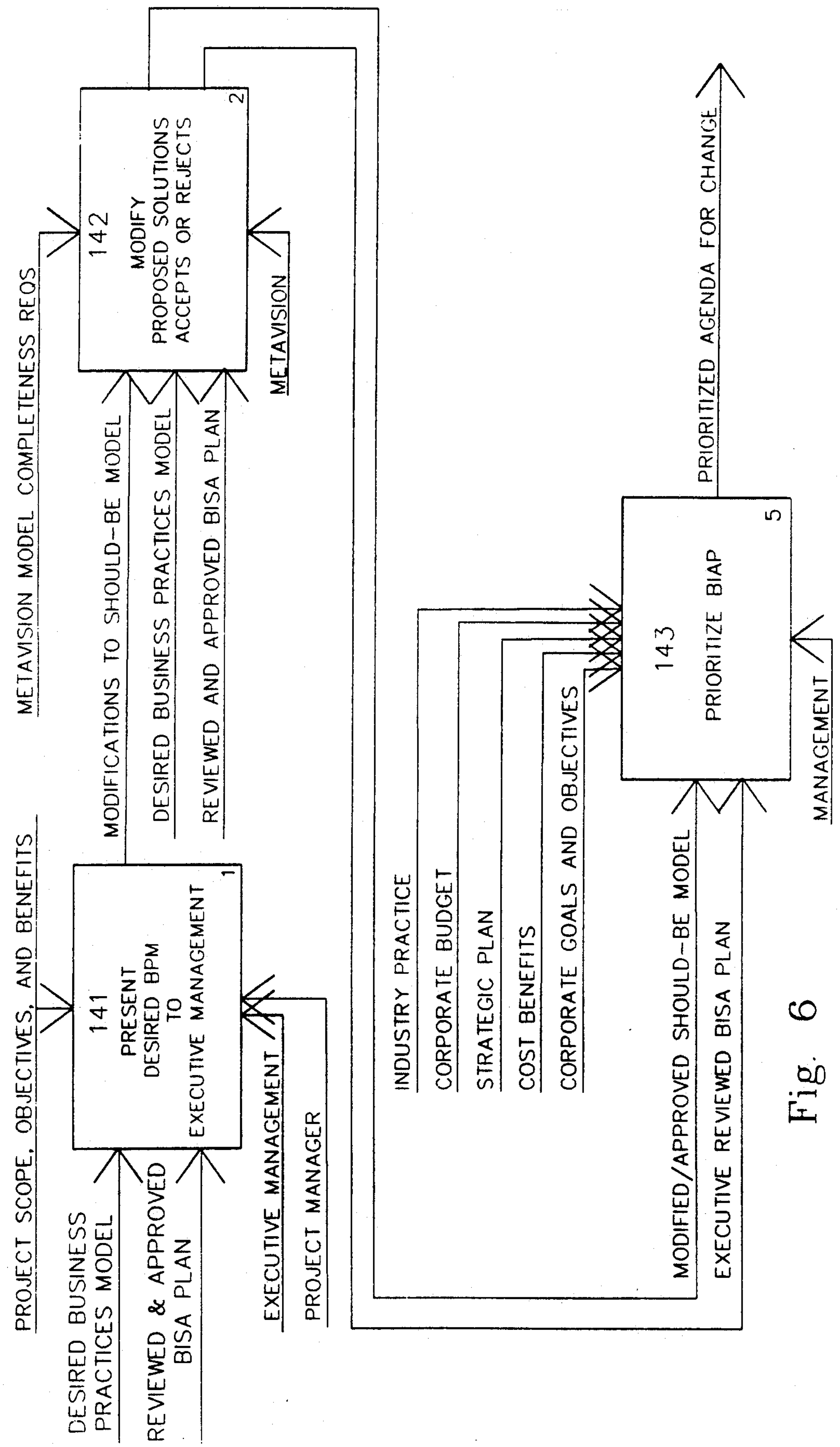
FIG. 6 is a functional diagram of the Decide What to Do steps.

The preceding steps and related inputs and outputs are diagramed in FIG. 6, Decide What to Do.

During the performance of the Decide What to Do steps, input and output data consisting of the following reports, forms and data packets are entered or generated.

1 Cost Benefits

Financial benefits accruing from a particular course of action.

3 Corporate Goals and Objectives

The expressed goals and objectives formulated by upper management for a business.

12 Industry Practice

The industry's common means for dealing with similar requirements for hardware, software, and database managers.

17 Desired Business Practices Model

MetaVision generated model of the business as it is plus changes to that model including automation of processes and additional data requirements.

21 Corporate Budget

The portion of the corporate resources allocated to particular activities.

22 Prioritized Agenda for Change

This is an organizationally validated agenda for implementing the changes indicated by review of the WHAT-SHOULD-BE model and ISA Plan.

25 Strategic Plan

General plan to meet the goals and objectives of a business emphasizing major sub-goals rather than specific methods.

50 Project scope, objectives, and benefits

The extent of the system to be modeled and domain where changes are to be considered along with benefits of modeling and possible changes.

78 MetaVision model completeness reqs

The criteria determining a complete model, includes all descriptive fields filled in & support & all major types of data icons exist for all processes

90 Reviewed and approved BISA Plan

The Business Information Systems Architecture Plan is reviewed by functional management for approval and concurrence that the solutions are reasonable

95 Modifications to SHOULD-BE Model

Includes approvals of models and decisions about which parts of model to automate. Changes to the model are made to the model to make it more valid.

96 Modified/Approved SHOULD-BE Model

Modified SHOULD-BE Business Practices Model with portions to be automated indicated.

97 Executive Reviewed BISA Plan

The Business Information Systems Architecture Plan is reviewed by executive management for approval and concurrence that the solutions are reasonable.

The primary step, Develop How To Do It; A model of how to implement the proposed system changes. It is broken down into the following secondary steps.

151 Develop Technical Designs for Proposed BIAP

The proposed Business Information Architecture Plan is used to develop technical designs to implement the change.

152 Choose Best Implementation Design

Using the criteria identified on model, choose the best design to implement the proposed system.

153 Develop Project Plans & Schedules

Based on the requirements of the implementation design, develop project plans and work schedules.

Figure 7:
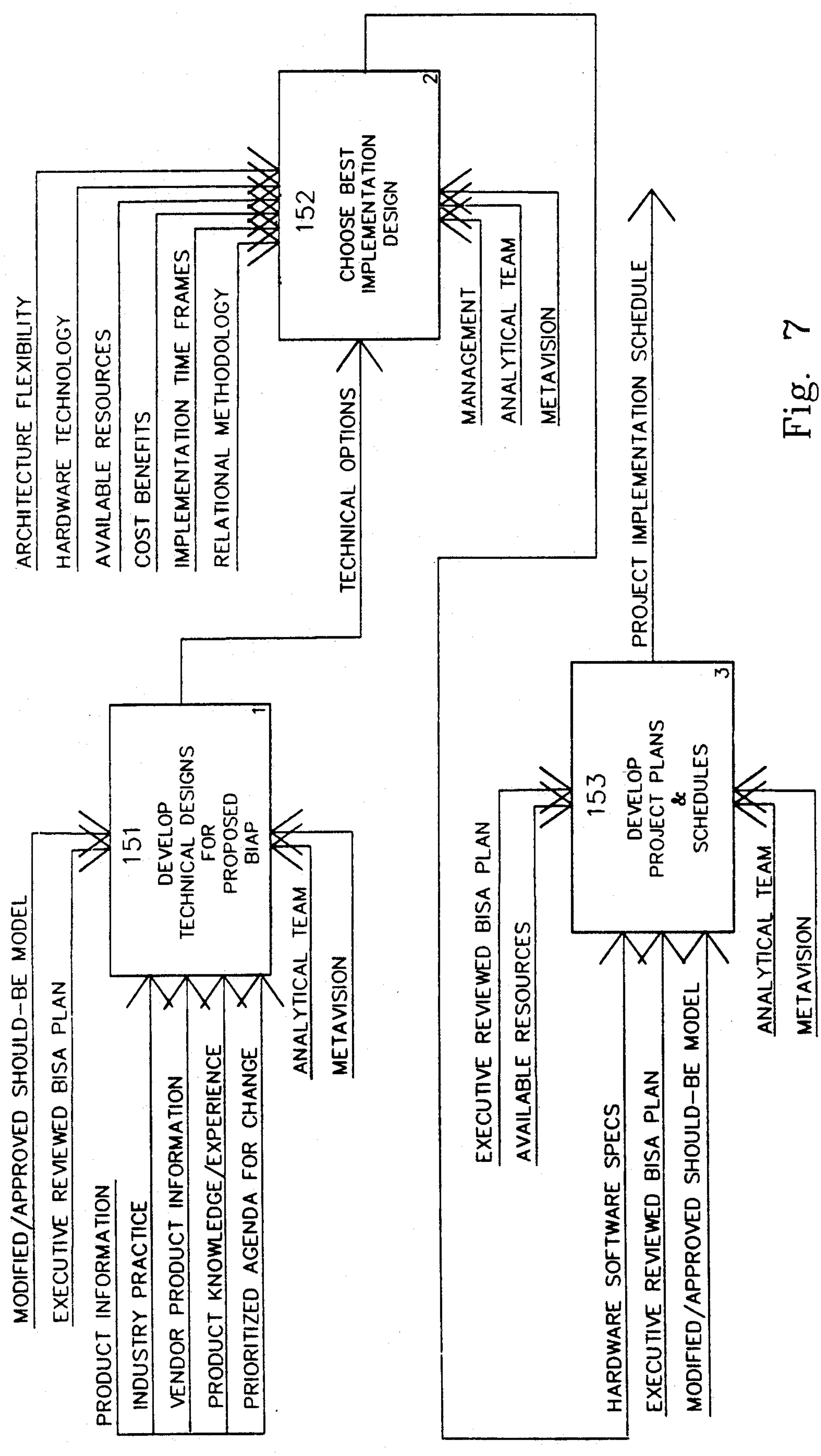
FIG. 7 is a functional diagram of the Develop How To Do It steps.

The preceding steps and related inputs and outputs are diagramed in FIG. 7, Develop How To Do It.

During the performance of the Develop How To Do It steps, input and output data consisting of the following reports, forms and data packets are entered or generated.

1 Cost Benefits

Financial benefits accruing from a particular course of action.

12 Industry Practice

The industry's common means for dealing with similar requirements for hardware, software, and database managers.

22 Prioritized Agenda for Change

This is an organizationally validated agenda for implementing the changes indicated by review of the WHAT-SHOULD-BE model and ISA Plan.

23 Technical Options

24 Relational Methodology

The MetaVision application of the set of principles that apply to database design using the relational theoretical model as background.

33 Hardware Software Specs

Technical specifications for hardware and software.

40 Available Resources

Personnel and budget available to commit to the project.

96 Modified/Approved SHOULD-BE Model

Modified SHOULD-BE Business Practices Model with portions to be automated indicated.

97 Executive Reviewed BISA Plan

The Business Information Systems Architecture Plan is reviewed by executive management for approval and concurrence that the solutions are reasonable.

99 Project Implementation Schedule

Schedule of implementation of proposed system.

100 Vendor product information

Technical specifications from vendors on computer, language, and database products.

101 Product knowledge/experience

Knowledge and experience of the developers of the technical options will be used in developing technical options for developing a system.

102 Implementation time frames

The time to implement a project should be less than nine months. More time than this will probably result in business changes making system obsolete.

103 Hardware technology

The state of current hardware technology with regard to possible capacity and performance.

104 Architecture Flexibility

The extent to which a system is open or closed, ie., are later changes or expansions or integration with other current or proposed systems possible.

The Develop Software SHOULD-BE Process Model steps expand process diagrams to the point where a single function corresponds to a single program except where program internal functions suggest even further decomposition of the model is broken down into the following secondary steps.

211 Compose Process Diagrams to Single Function Level

Process Diagrams are modified so the processes to be automated comprise a single functional level.

212 Choose Single Function Processes To Automate

Information Input, Update, & Query. Information Reporting. Information Tracking. Information Sharing & Transmission. Scheduling.

213 Add Computer System Specific Processes

Menus of system functions, Interfaces to other systems, System error reporting & recovery, Database archive & restore, maintenance reports, optimization, backup, and data integrity rule enforcement.

Figure 8:
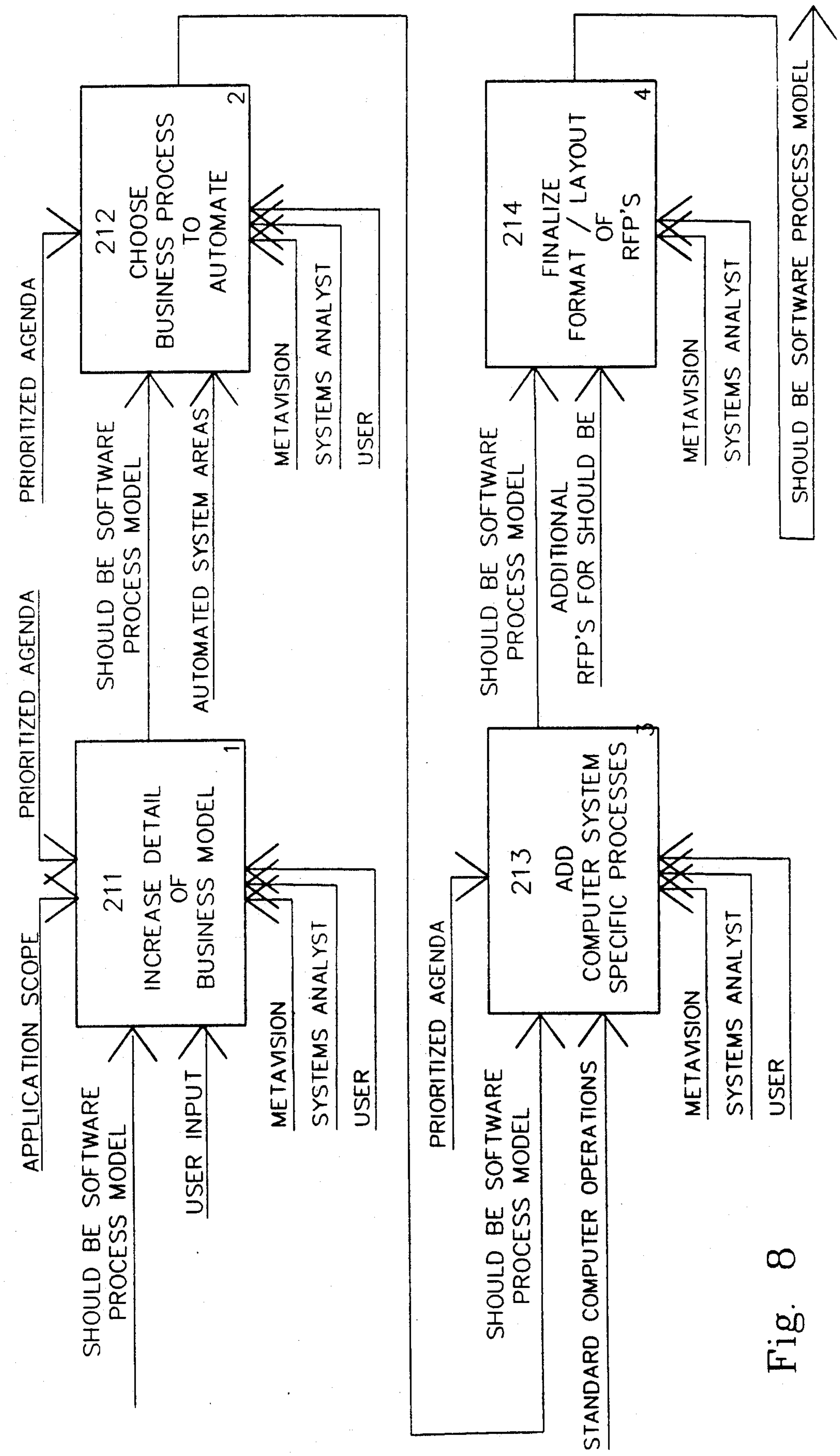
FIG. 8 is a functional diagram of the Develop Software SHOULD-BE Process Model steps.

The preceding steps and related inputs and outputs are diagramed in FIG. 8, Develop Software SHOULD-BE Process Model During the performance of the Develop Software SHOULD-BE Process Model steps, process diagrams are expanded to the point where a single function corresponds to a single program except where program internal functions suggest even further decomposition of the model.

The Develop SHOULD-BE Control Logic Model steps are broken down into the following secondary steps.

221 Develop Menu Function Logic

Develop menu selection logic & update process diagrams with transfer RFP's.

222 Develop Other Function Selection Logic

Develop other logic needed to perform functions of the system besides menu selection logic. Update process diagrams with tranfer RFP's.

223 Specify Transfer Rules for all function selections

Identify and model all transfer rules needed to implement system by function.

224 Model Program Logic as necessary for design

Program Logic should be modelled if other than a simple function is performed by a program.

The Demo Prototype and Obtain Feedback steps use the models from Software Engineering to produce a demo prototype that shows the major functions of the system.

The Demo Prototype is reviewed and all feedback is included in the design.

The secondary step, Model Current Business Practices develop a model of how the company (at least the portion of it falling within the scope of the project) conducts its business in terms of functions, paper flow, personnel, and management controls. It includes the following steps:

1211 Model Job Steps

Model jobs of each work group by inputting the job steps for each job into MetaVision.

1212 Include job information requirements

Include in the model the information required to do each portion of the jobs modeled.

1213 Include job-produced information

Include in the model the information produced by each of the processes that are part of the model.

1214 Include goals and objectives

The goals and objectives for each job step are included in the model.

1215 Include user issues and problems

Collect user issues and problems that relate to current business practices that fall within the scope of the business being modeled.

1216 Model management reporting practices

The names and titles of the information involved in the reporting functions for an organization are modeled.

Figure 9A:
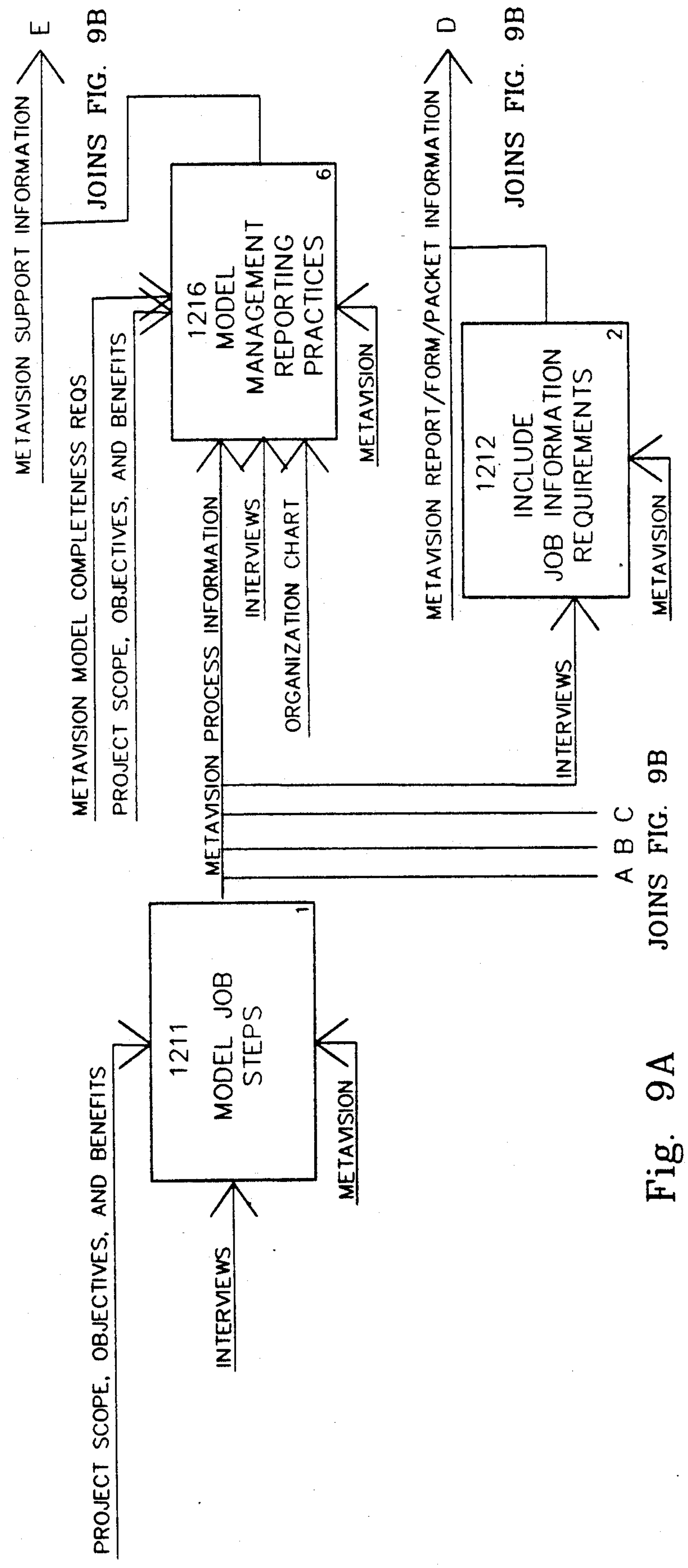
FIGS. 9A and 9B make up for FIG. 9 which is a functional diagram of the Model Current Business Practices steps.
Figure 9B:
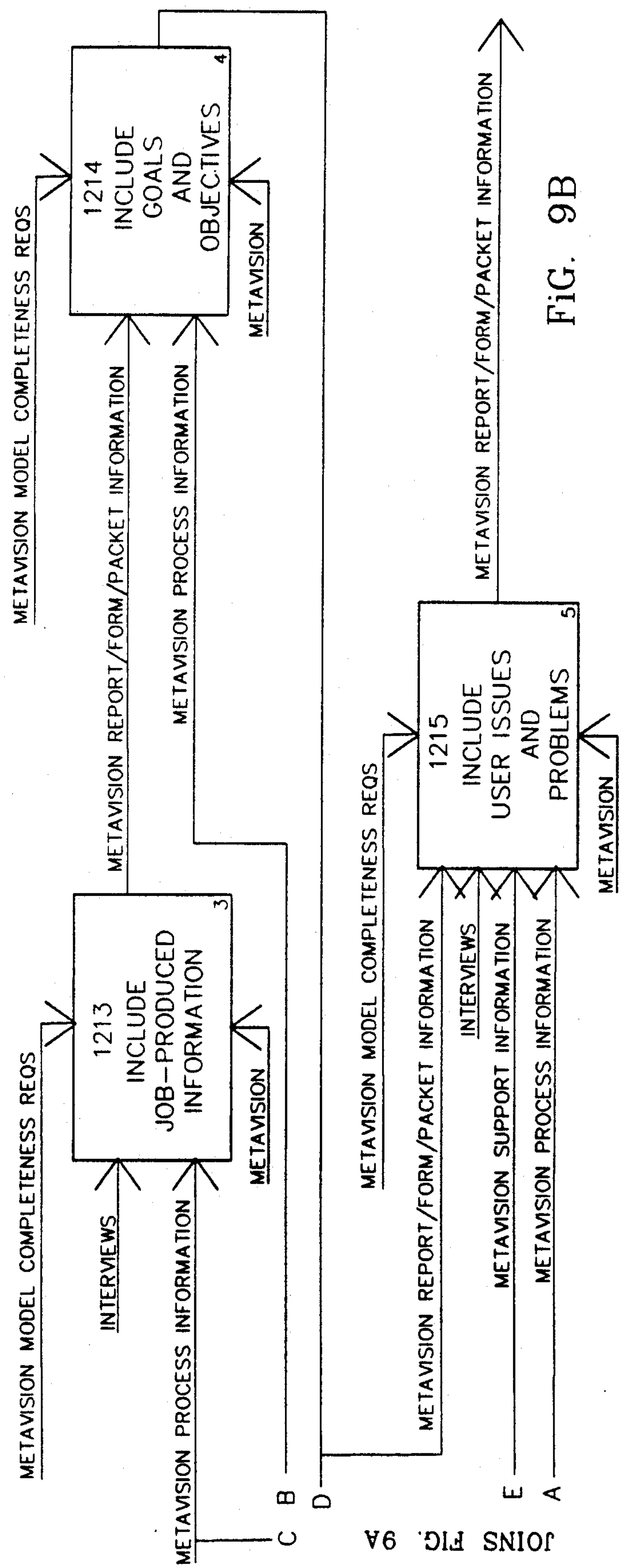

The preceding steps and related inputs and outputs are diagramed in FIG. 9, Model Current Business Practices.

During the performance of the Model Current Business Practices steps, input and output data consisting of the following reports, forms and data packets are entered or generated.

50 Project scope, objectives, and benefits

The extent of the system to be modeled and domain where changes are to be considered along with benefits of modeling and possible changes.

76 Interviews

Meetings with the management of a business at which information is gathered to model their job functions, reporting practices, and problems.

77 Organization Chart
A standard graphic representation of the functional organization of personnel within a business.
78 MetaVision model completeness reqs
The criteria determining a complete model, includes all descriptive fields filled in & support & all major types of data icons exist for all processes
79 MetaVision Support Information
Information maintained by MetaVision for support data related to processes by means of the support icon and found under the SUPPORT menu header.
80 MetaVision Process Information
Information maintained by MetaVision on the job functions and component processes that are being modeled as well as the managerial functions.
81 MetaVision Report/Form/Packet Information
Information maintained by MetaVision on data flowing between processes, specifically reports, forms, & packets plus other data and consumed materials.

The Prototyping steps wherein the system will generate a prototype of the system that has been described includes the following primary steps:.

41 Select Prototyping
Select Prototyping from the Main Menu
42 Select GENERATE PROTOTYPE
From the Main Menu select PROCESS. From the Process Menu select GENERATE PROTOTYPE.
43 Select the Process to be automated
44 Review Prototype
The users should review the prototype and make suggested changes or approve of the design.
45 Select GENERATE CODE
Select Process from the Main Menu. From the PROCESS menu select GENERATE CODE>
46 Generate Code/Prototype
The System prototype will be generated which will allow the user to observe the system behavior. If GENERATE CODE is selected the COBOL code for the system is generated.

Figure 10A:
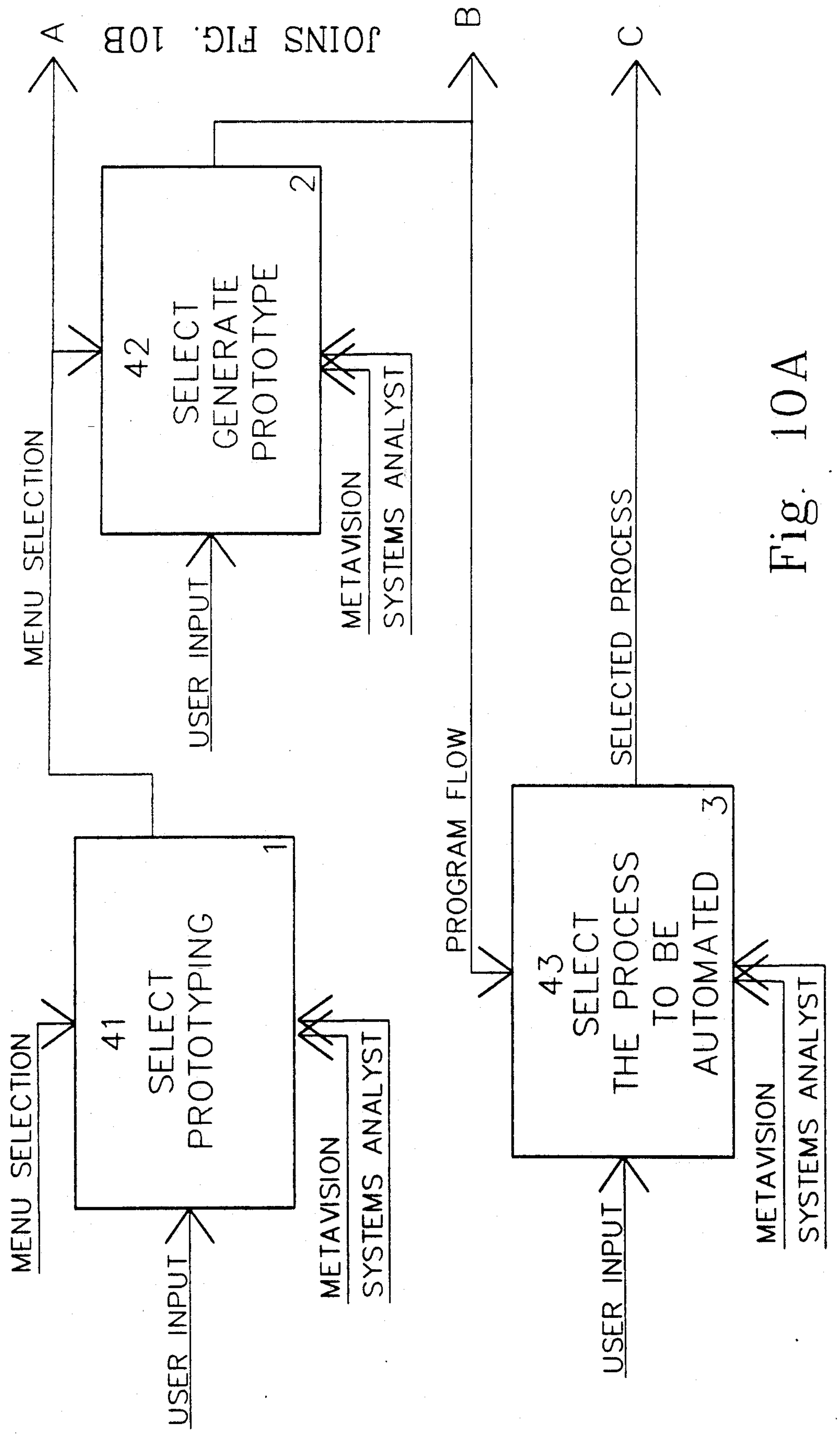
FIGS. 10A and 10B make up for FIG. 10 which is a functional diagram of the Prototyping steps.
Figure 10B:
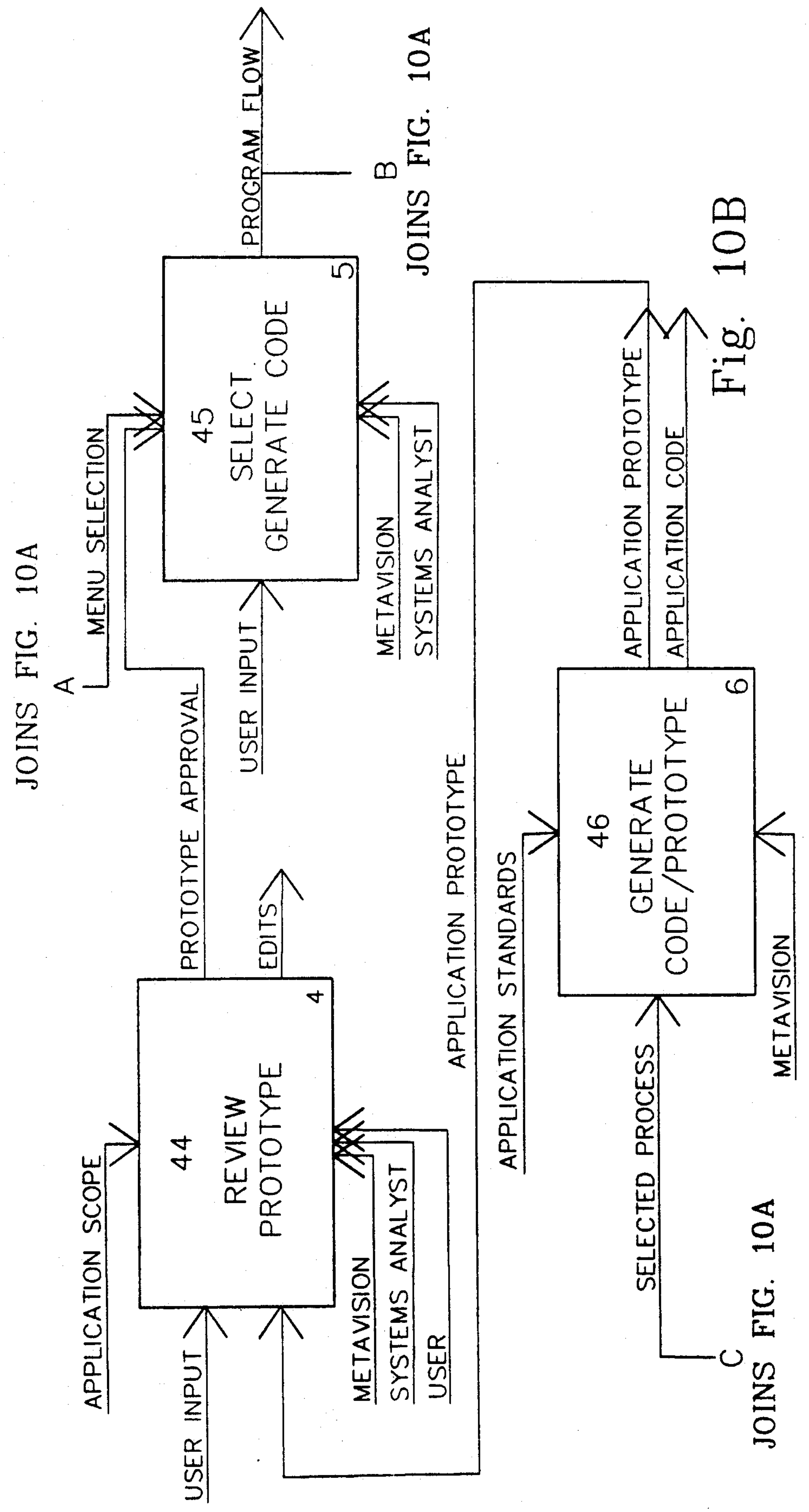

The preceding steps and related inputs and outputs are diagramed in FIG. 10, Prototyping.

During the performance of the Prototyping steps, input and output data consisting of the following reports, forms and data packets are entered or generated and the system will generate a prototype of the business that has been described.

24 Edits
Additions Changes or Deletes being generated from the review process.
38 Application Scope
Scope of the application project.
39 Application Standards
Standards for application development including screen, report designs, program standards, and documentation and testing standards.
43 Menu Selection
Specified menu selection will bring you to the next action.
44 User Input
Input to the screen by selecting from a pop-up menu or by entering from the keyboard.
47 Prototype Approval
The Prototype and design are approved by the user.
48 Program Flow
Program sequence not under user control.
49 Selected Process
Process Selected from process selection list.
50 Application Code
Application Code in COBOL or COBOL II or other languages supported by MetaVision.
51 Application Prototype The primary Develop Software SHOULD-BE Process Model step includes the following steps.

211 Increase detail of Business Model
The areas of the business that are to be modified are decomposed to show the details of how the business will change.
212 Choose business process to automate
Select the area that will be automated and describe the function that will be performed with the automated system e.g. Information Update, Query, Transmission, Scheduling, etc.
213 Add Computer System Specific processes
Add processes that will be specific to computer functions. These include Menus, Database backup, restore, System security etc. The supports for these will be System Names.
214 Finalize Format/Layout of RFP's
The Reports, Screens, Plots, etc. that are used by the system described in full detail. This includes field sizes, colors, error handling, selection method, and all interface issues.

The preceding steps and related inputs and outputs are diagramed in FIG. 8, Develop Software SHOULD-BE Process Model.

During the performance of the Develop Software SHOULD-BE Process Model steps, input and output data consisting of the following reports, forms and data packets are entered or

38 Application Scope
Scope of the application project.
44 User Input
Input to the screen by selected from a pop-up menu or by entering from the keyboard.
52 Should Be Software Process Model
The Model of Job functions down that describe what the system will look like and who will be using it and what information is input and output.
56 "Should Be" Business Model
Model of the Current business practices model modified to reflect the suggestions to make the process works better.
57 Prioritized Agenda
From the "WHAT TO DO" model this agenda of projects to implement automation or change.
58 Additional RFP's for Should be
New Information required by users that will be provided by the new automated system.
59 Standard Computer operations
Pre-Existing models of MENUs, System Security,
60 Automated Systems areas
Areas of the business to be automated.

The Develop File Design steps wherein the data relationships requires for the automated system is modeled using Question Mapping includes the following steps. The Question Map is then grouped into a conceptual schema from which an External Schema is created.

321 Question Map RFP's

The relationships among information used in the automated system are captured using natural language sentences. The Question Map will contain Uniqueness and Integrity constraints.

132 Group into Conceptual Schema

The Question Map is Grouped by linking the natural language sentences connected by an equals integrity constraint into a Conceptual Schema. Select GROUP from the QUESTION MAP diagram menu.

323 Create External Schema

Based on the limitations of the hardware and the

Figure 11:
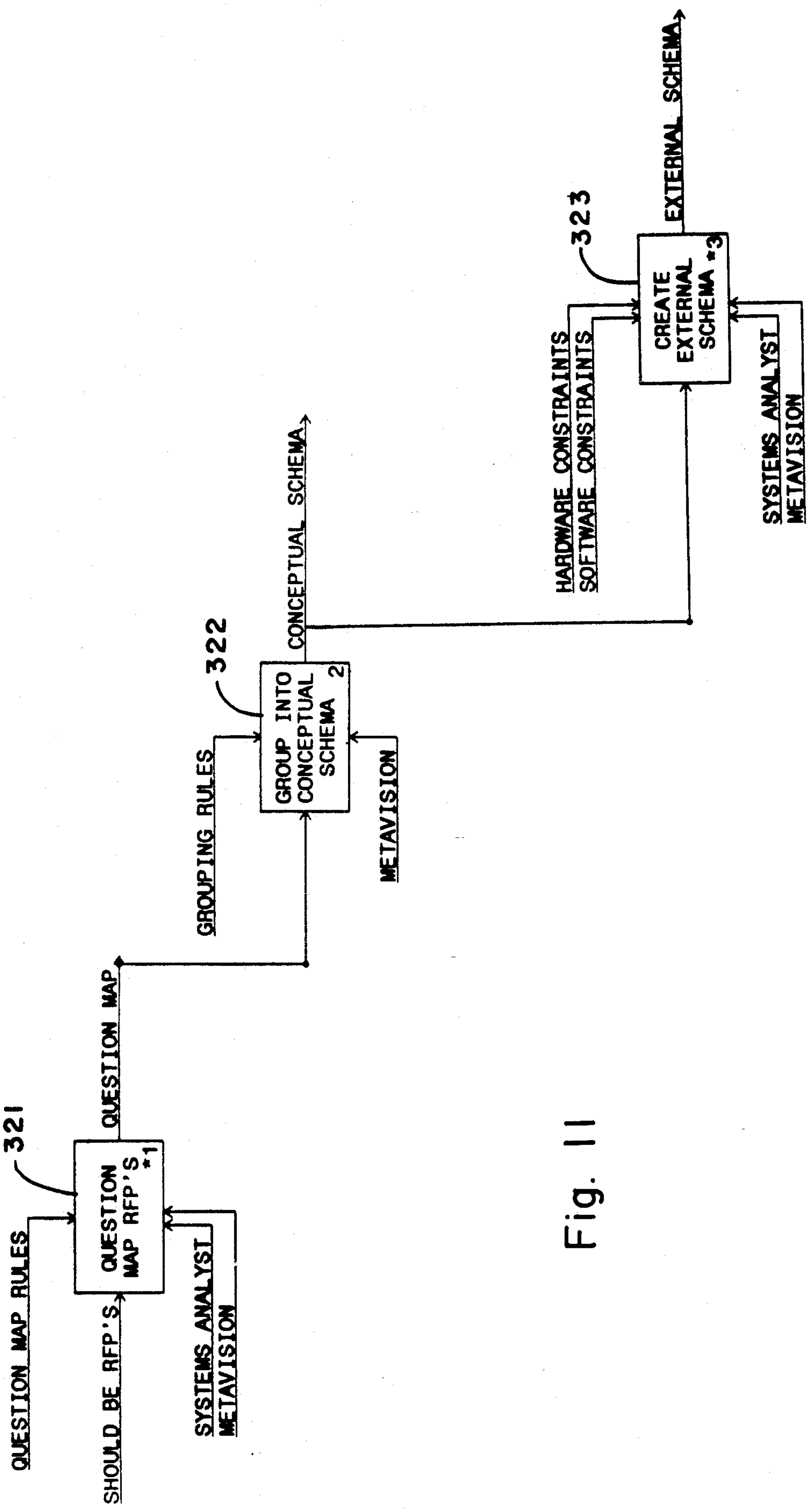
FIG. 11 is a functional diagram of the Develop File Design steps.

The preceding steps and related inputs and outputs are diagramed in FIG. 11, Develop File Design.

During the performance of the Develop File Design steps, input and output data consisting of the following reports, forms and data packets are entered or generated.

1 Should Be RFP's

Reports, Forms, Screens, etc. that will be generated by the automated system. Example layouts and samples of information in each.

2 Question Map

Fifth normal form database design containing all the relationships of data in the automated system described in the form of natural language sentence

3 Conceptual Schema

Third normal form database design resulting from a Grouping of the Question Map.

4 External Schema

Database design that will be used by the automated system.

5 Question Map Rules

Rules for doing Question mapping, including the seven steps and descriptions for each.

6 Grouping Rules

Rules that govern the grouping of the Question Map into a Conceptual Schema.

7 Software Constraints

Constraints dictated by the software with regard to file access speed, program code requirements,

8 Hardware Constraints

Constraints on the file access speed, and database deign or file types supported by the hardware.

The Model Control Logic steps model program logic for menus, update and query screens, and reports. They include the following steps:

331 Review Menu Logic from Should Be Software

Review the requirements for the menu system.

332 Create Calling Program Process

Choose a calling process.

333 Create called program processes

Called program processes are processes that will be called.

334 Create Transfer rules

Create the transfer rules for program calls. When adding a control enter the From and To process and then enter the condition for making the transfer. Either a Field Value, WHEN DONE, or PF KEYS.

335 Add Output RFP's

Adding the Output Screens and Report. Only one screen can be generated from a process at a time when doing control logic.

336 Add Program Names

Program Names should be in line with the Corporate Standards for naming and must be valid for the chosen hardware platform.

Figure 12A:
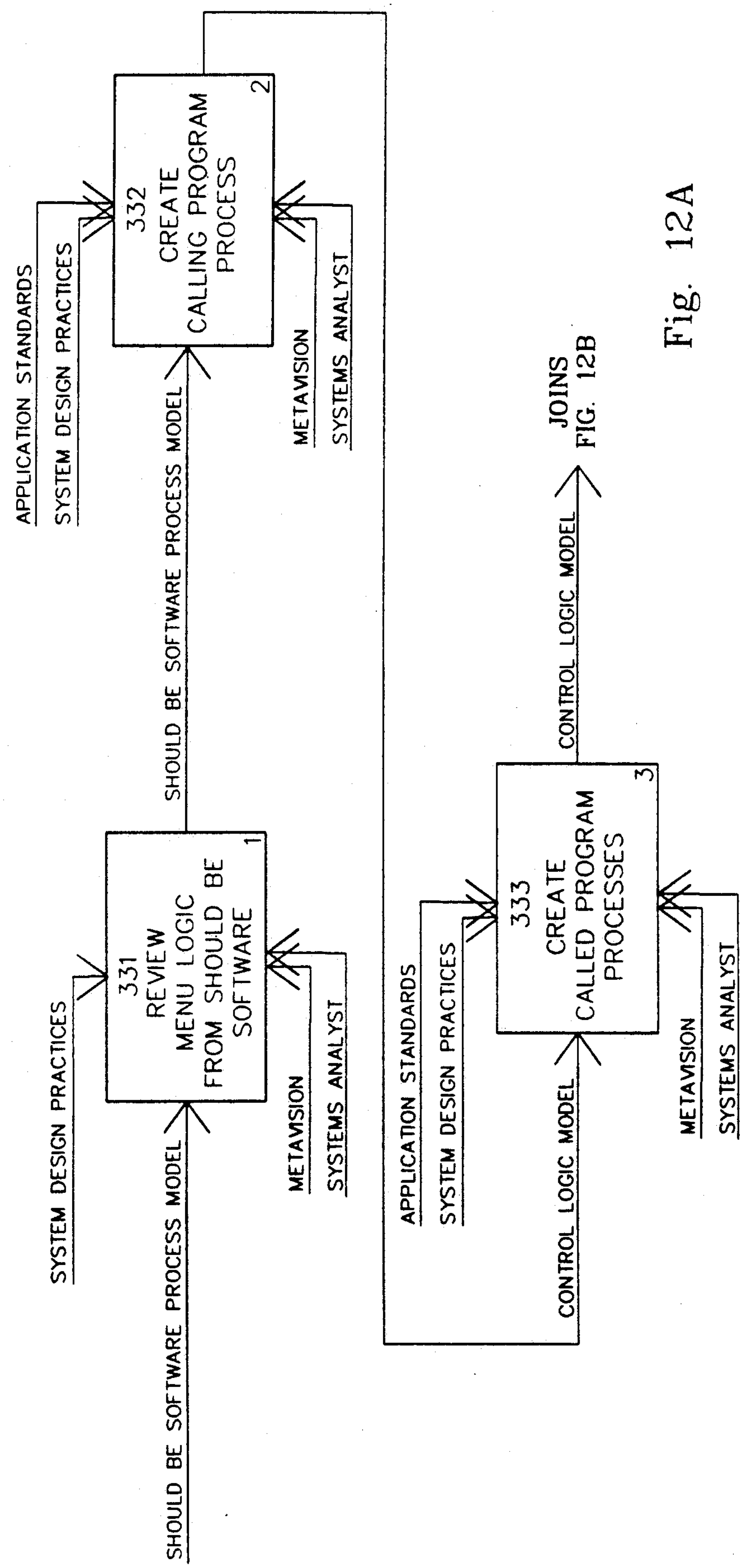
FIGS. 12A and 12B make up for FIG. 12 which is a functional diagram of the Model Control Logic steps.
Figure 12B:
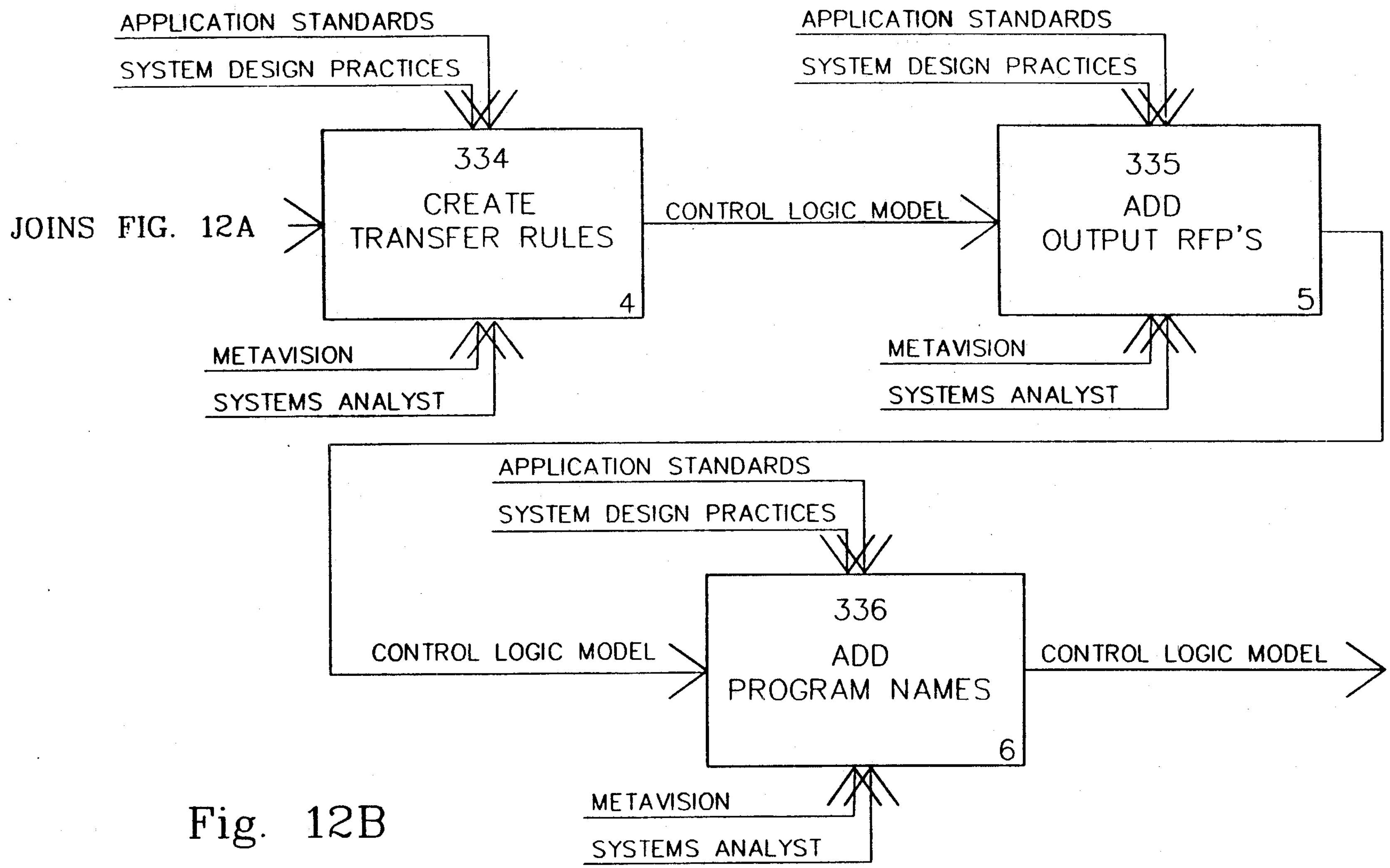

The preceding steps and related inputs and outputs are diagramed in FIG. 12, Model Control Logic.

During the performance of the Model Control Logic steps, input and output data consisting of the following reports, forms and data packets are entered or generated.

39 Application Standards

Standards for application development including screen, report designs, program standards, and documentation and testing standards.

52 Should Be Software Process Model

The Model of Job functions down that describe what the system will look like and who will be using it and what information is input and output.

53 System Design Practices

Good practices for designing computer software.

54 Control Logic Model

Should Be Control Logic Model creates menus and program calls that define how the system at the module level will function.

The Design Screens & Reports steps design the Screens and Reports for the system using External Schema created for the application. They include the following steps.

341 Select Standards for Screen Design

Based on good interface techniques and the available technology as well as the established corporate standards, a document on the interface standards will be produced.

342 Retrieve preliminary layouts

From the should be model for software engineering the initial screen layouts are used as the template for the screen designs.

343 Identify associated fields

The External Schema fields that are associated with the Screen by describing what fields are input and what fields are output from the screen.

344 Identify what fields are user input

Unprotected fields are to be updated by the user however these fields may be initialized to some value.

345 Input screen/report layout

The MetaVision SCREEN/REPORT design is used to create a screen layout. A NEW screen will be created and the fields selected from a diagram.

To copy standard screen formats use COPY SCREEN.

Figure 13:
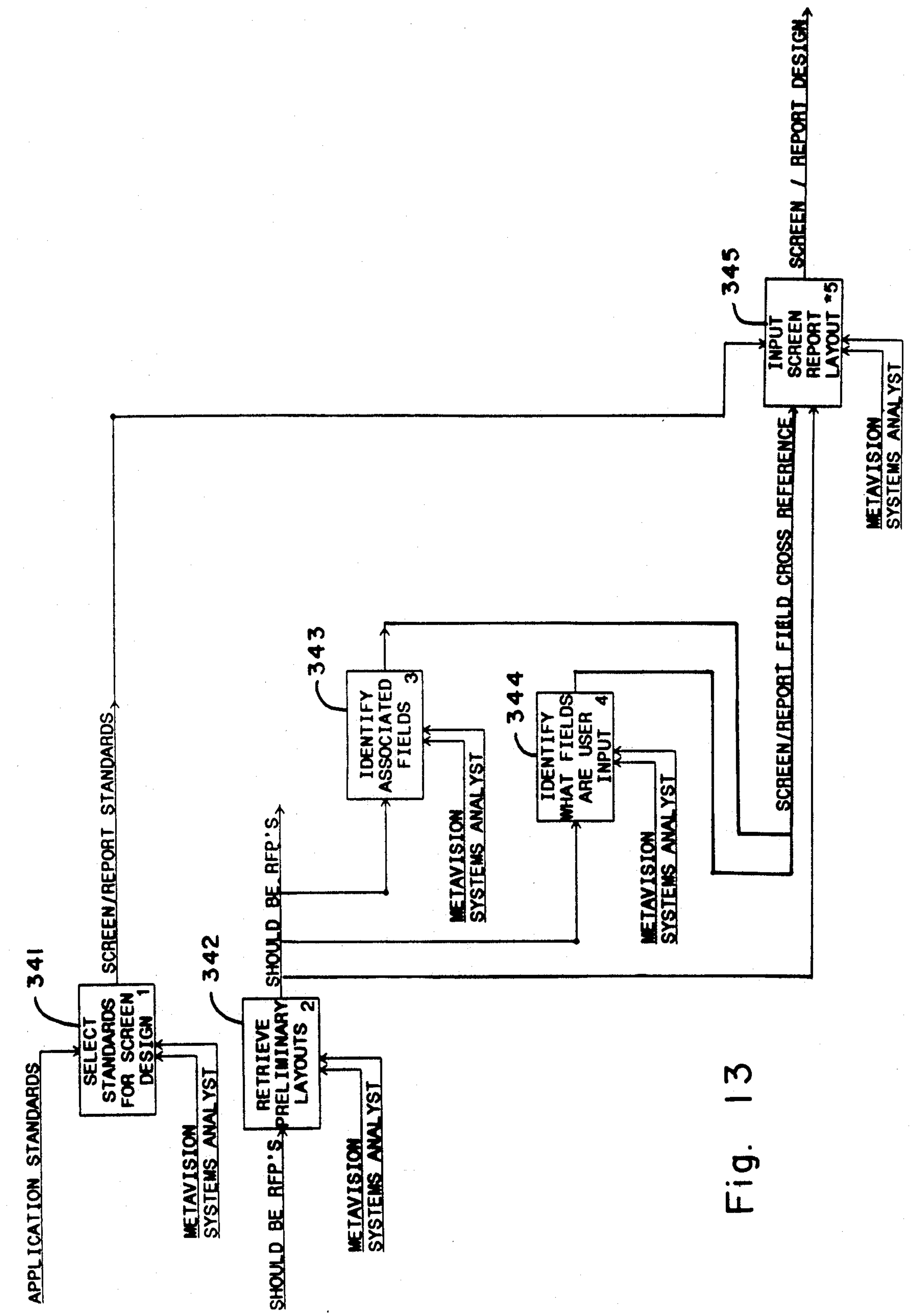
FIG. 13 is a functional diagram of the Design Screens & Reports steps.

The preceding steps and related inputs and outputs are diagramed in FIG. 13, Design Screens & Reports.

During the performance of the Design Screens & Reports steps, input and output data consisting of the following reports, forms and data packets are entered or generated.

1 Should Be RFP's

Reports, Forms, Screens, etc. that will be generated by the automated system. Example layouts and samples of information in each.

39 Application Standards
Standards for application development including screen, report designs, program standards, and documentation and testing standards.

40 Screen/Report Standards

41 Screen/Report field Cross Reference
Cross Reference of the fields and the reports they should appear on and if they are input or output update or read only.

42 Screen/Report Design
MetaVision design of application screens and reports that include colors, titles, field edit rules, initial values, etc.

In the Question Map RFP's step, the relationships among information used in the automated system are captured using natural language sentences using the following steps. The Question Map will contain Uniqueness and Integrity constraints.

3211 Create Simple Sentences
Using the RFP's created for the should be model, simple sentences are written to describe the information on the RFP's.

3212 Group Like Sentences Together
Gather all the sentences that have been created for all the RFP's from the should be model. Group sentences that use the same verbs and the same types of nouns into lists.

3213 Develop population Tables
Transform the grouped sentences into a table that contains columns of word types and instances containing the grouped sentences.

3214 Add Uniqueness Constraints
Select the roles in the population table that make each instance unique and place an arrow over these roles. The uniqueness constraint must follow the N/N−1 rule.

3215 Identify Multiple Reference Roles
When two different names are given to the same "thing" then there exists a multiple reference for that "thing". When these are identified the different roles are given the same COMMON NAME.

3216 Add Integrity Constraints
For roles that have the same COMMON NAME(s) an integrity constraint can be drawn between them to show the set relation (subset, equal, disjoint or algorithmic) that exists between sentences.

Figure 14A:
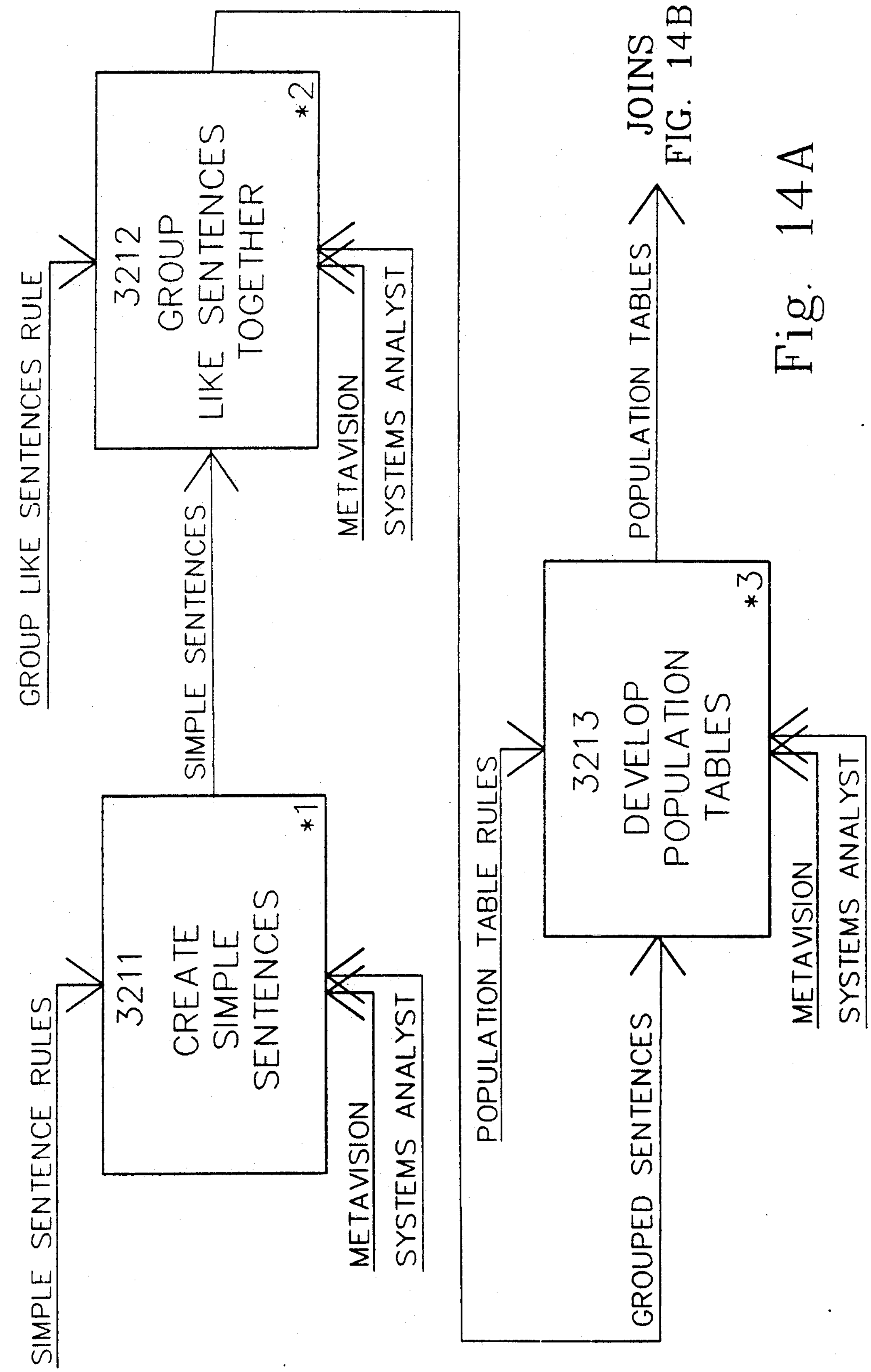
FIGS. 14A and 14B make up for FIG. 14 which is a functional diagram of the Question Map RFP's steps.
Figure 14B:
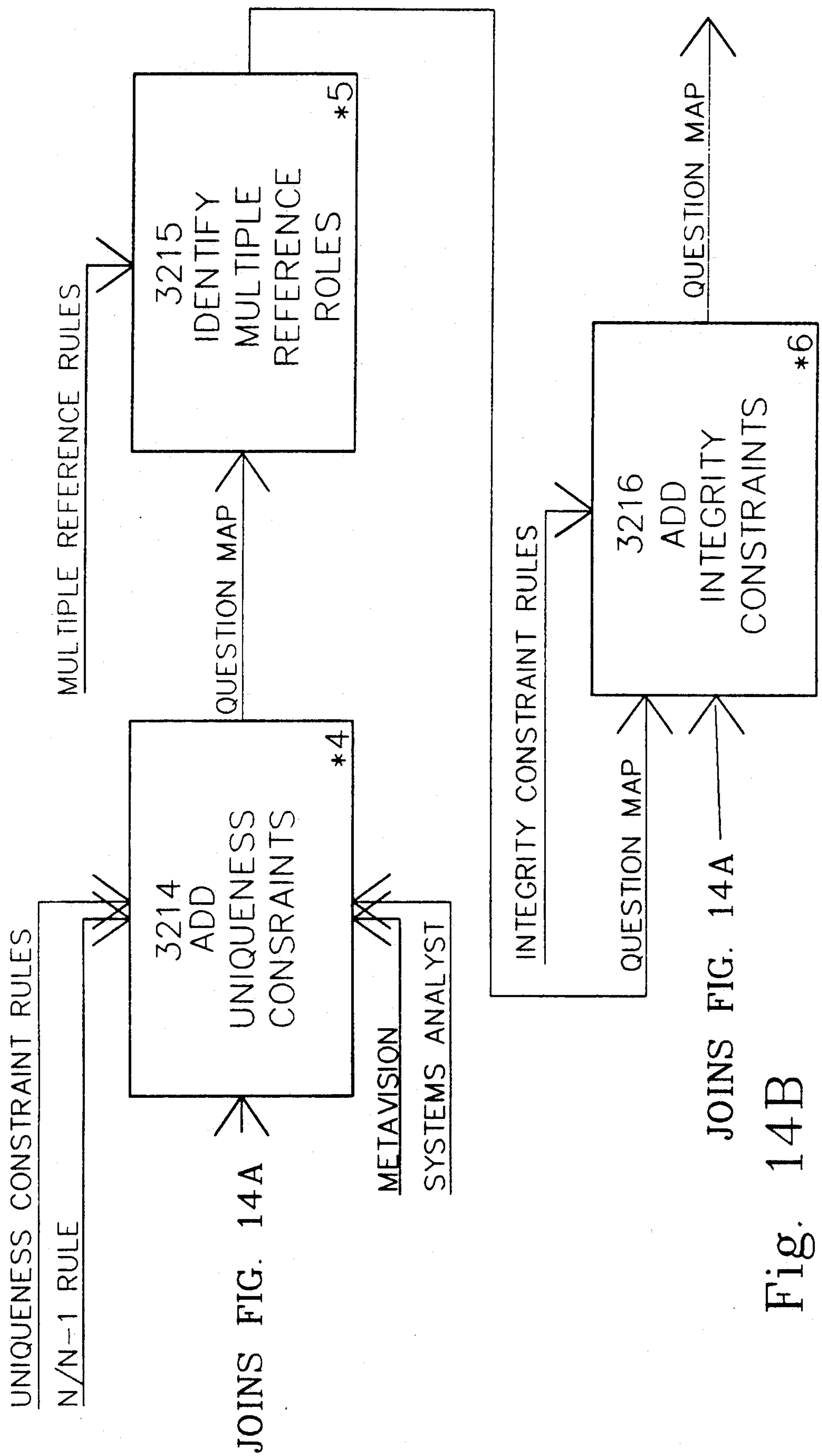

The preceding steps and related inputs and outputs are diagramed in FIG. 14, Question Map RFP's.

During the performance of the Question Map RFP's steps, input and output data consisting of the following reports, forms and data packets are entered or generated.

2 Question Map
Fifth normal form database design containing all the relationships of data in the automated system described in the form of natural language sentence

9 Simple Sentences
Sentences describing RFP's from the "Should be" model that are simple i.e. cannot be broken down into to or more sentences.

10 Grouped Sentences
Sentences that contain the same verbs and the same types of nouns are grouped together.

11 Population Tables
Table containing labeled columns of similar information. The instances in these tables come from grouped sentences.

15 Simple Sentence Rules

16 Group Like Sentences Rule

17 Population Table Rules

18 N/N−1 Rule

19 Uniqueness Constraint Rules

20 Integrity Constraint Rules

21 Multiple Reference Rules

In the Group into Conceptual Schema steps, the Question Map is Grouped by linking the natural language sentences connected by an equals integrity constraint into a Conceptual Schema.

The following Create External Schema steps are based on limitations of the hardware.

3231 Copy Conceptual Schema
Select the COPY command on the conceptual schema diagram menu to create a new External Schema to start from.

3232 Delete unused fields
Fields that are not used in the application can be removed.

3233 Rename Field Names
Field names for the external schema need to be in the form readable by the application code language

3234 Rename File Names
Rename the Record (file) names to match the names required by the application code. File names will be required for data records and index files.

3235 Make Changes to Structures
Modify the structures of the database and add new indexes required to meet the performance criteria and the limitations of the application code language.

Figure 15:
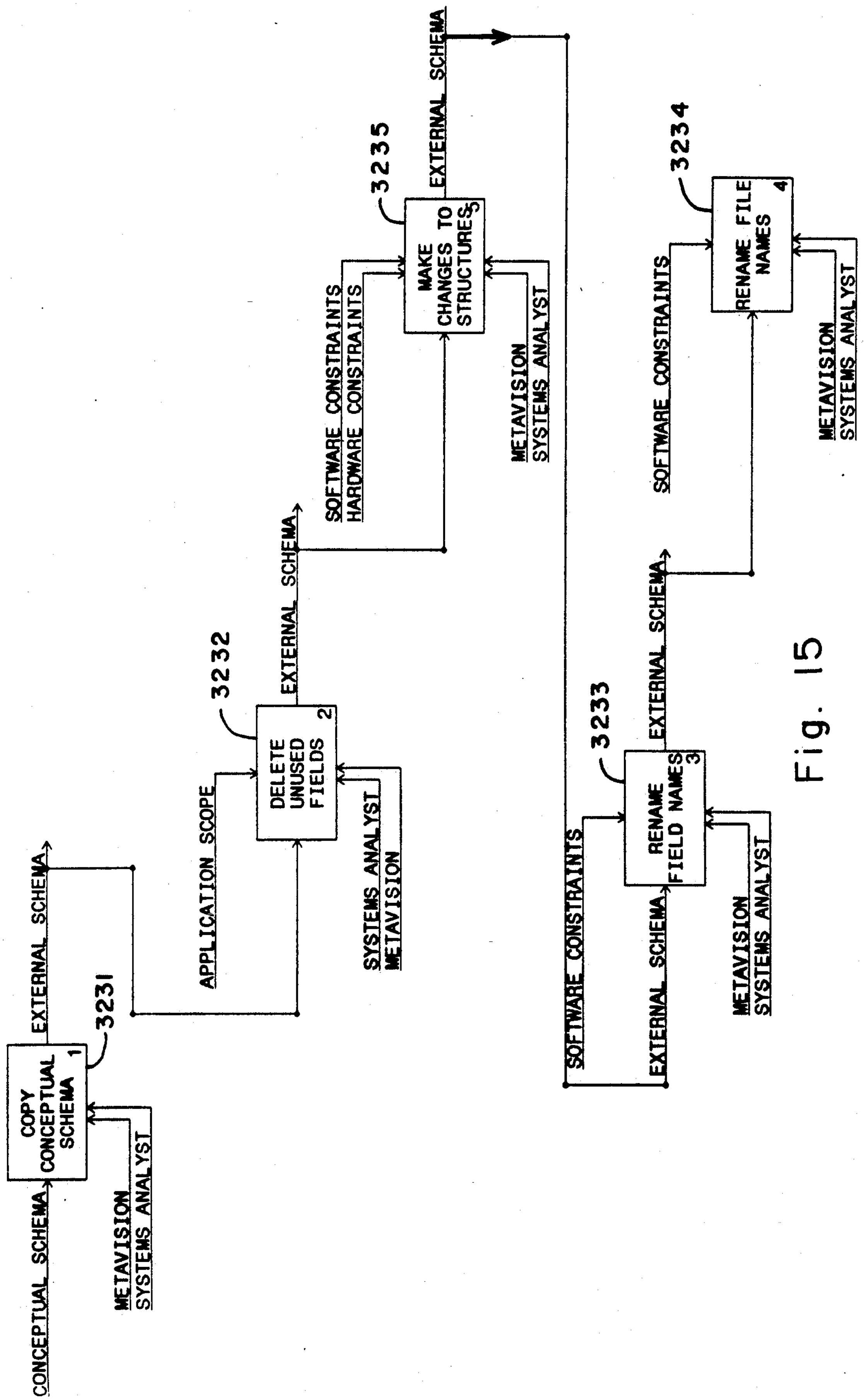
FIG. 15 is a functional diagram of the Create External Schema.

The preceding steps and related inputs and outputs are diagramed in FIG. 15, Create External Schema.

During the performance of the Create External Schema steps, input and output data consisting of the following reports, forms and data packets are entered or generated.

3 Conceptual Schema
Third normal form database design resulting from a Grouping of the Question Map.

4 External Schema
Database design that will be used by the automated system.

7 Software Constraints
Constraints dictated by the software with regard to file access speed, program code requirements,

8 Hardware Constraints
Constraints on the file access speed, and database deign or file types supported by the hardware.

38 Application Scope
Scope of the application project.

The Input screen/report layout steps create The MetaVision SCREEN/REPORT screen layout. They include the following steps.

3451 Select Screen/Report Design

From the main menu of Software Engineering select Screen/Report Design and then select DIAGRAMMING from the activities menu.

3452 Create a NEW Screen/Report

Select DIAGRAM and then NEW from the DIAGRAM menu. This will allow you to enter a new diagram.

3453 Enter Dialogue information

Enter information for the dialogue boxes or simply take the defaults.

3454 Select Fields from External Schema

Select the fields that will appear on the Screen or Report by selecting the SELECT icon from the drum and pointing at the desired fields.

3455 Edit the Screen

Using the editing features, MOVE, CHANGE, etc. modify the screen/report to match the desired layout.

Figure 16:
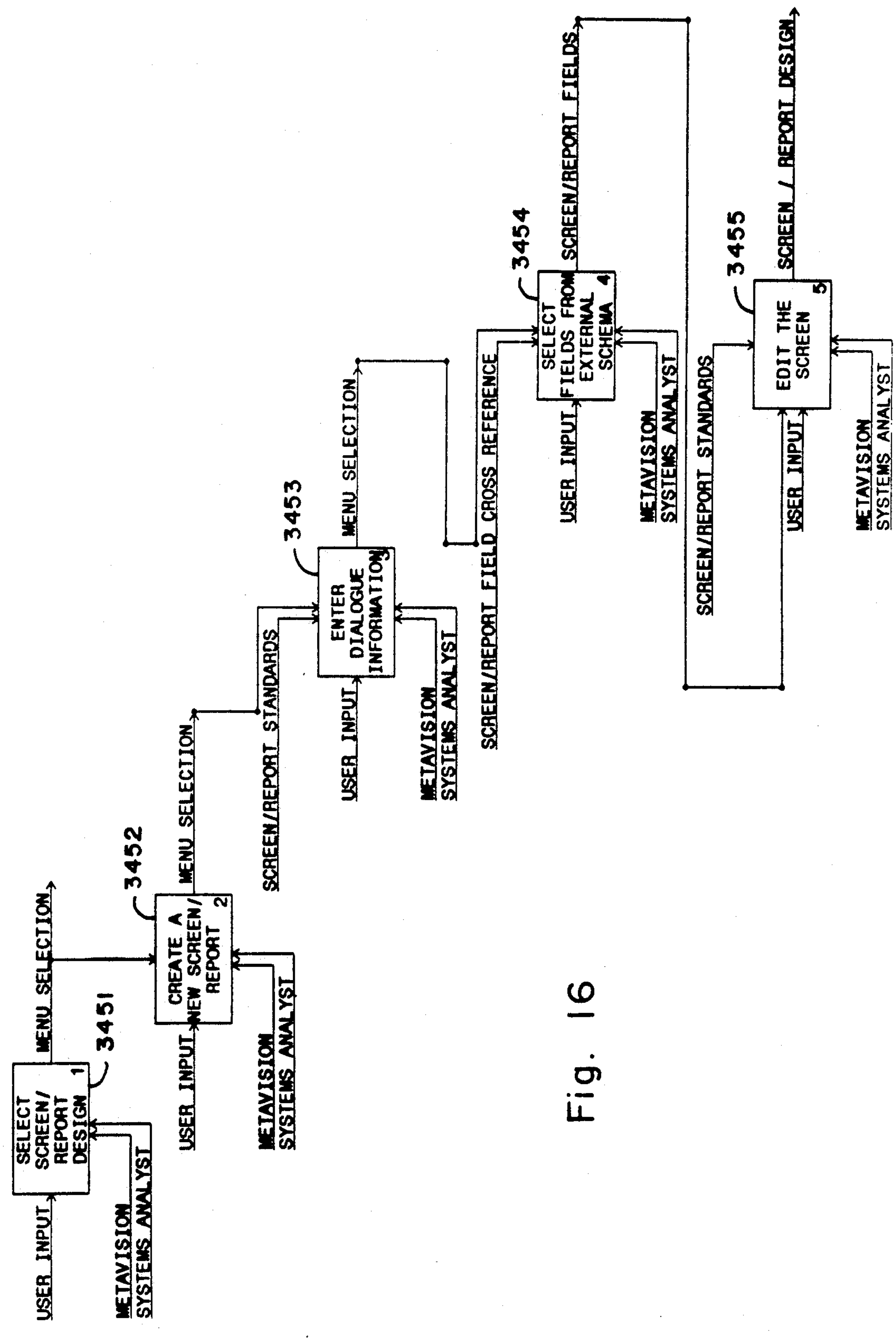
FIG. 16 is a functional diagram of the Input screen report layout steps.

The preceding steps and related inputs and outputs are diagramed in FIG. 16, Input screen report layout.

During the performance of the Input screen / report layout steps, input and output data consisting of the following reports, forms and data packets are entered or generated.

40 Screen/Report Standards

41 Screen/Report field Cross Reference

Cross Reference of the fields and the reports they should appear on and if they are input or output update or read only.

42 Screen/Report Design

MetaVision design of application screens and reports that include colors, titles, field edit rules, initial values, etc.

43 Menu Selection

Specified menu selection will bring you to the next action.

44 User Input

Input to the screen by selecting from a pop-up menu or by entering from the keyboard.

45 Screen/Report Fields

Fields from the External Schema that will appear on the screen.

The Create Simple Sentences steps use the RFP's created for the should be model. Simple sentences are written to describe the information on the RFP's They include the following steps:

32111 Retrieve Copies of RFP's

Retrieve RFP's from user interviews and analysis of the "Should Be". These include all Reports, Screens Inputs, etc.

32112 Retrieve Layouts and Dumps of Existing Database

Retrieve a copy of the external schema from the Business Modeling Business Info Diagram or a copy of the current system documentation. A Dump of a representative sample of each file should be done.

32113 Write/Edit Sentences from RFP's

Write a simple sentence that cannot be broken into two or more simple sentences without loosing information. Words like "AND" or "DUT" may indicate that a complex sentence has been Written.

32114 Review Sentences For Correctness

The systems analyst reviews the sentences with the user for correctness. Ambiguity of relationships and meaning of data are clarified.

Figure 17:
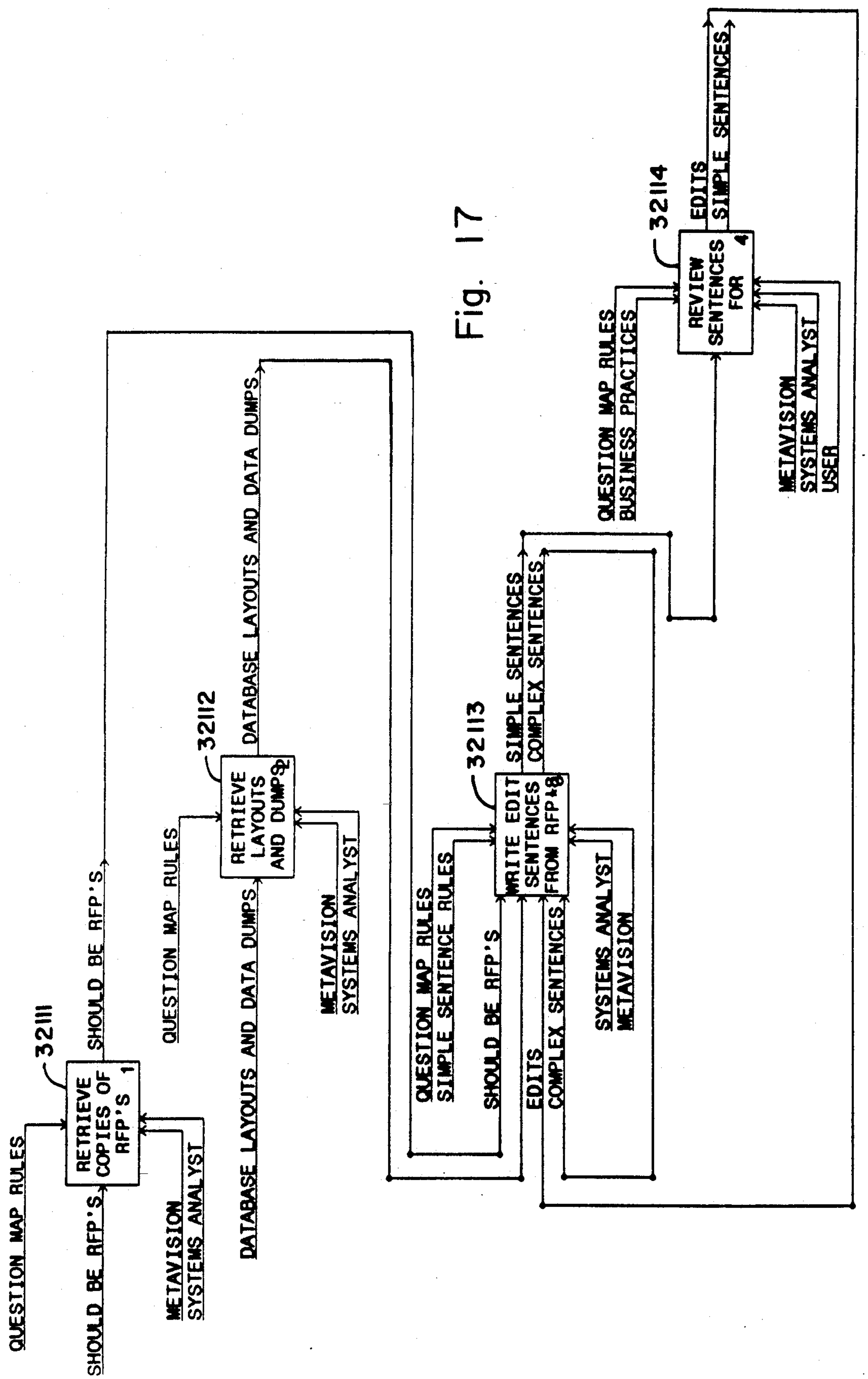
FIG. 17 is a functional diagram of the Create Simple Sentences steps.

The preceding steps and related inputs and outputs are diagramed in FIG. 17, Create Simple Sentences.

During the performance of the Create Simple Sentences steps, input and output data consisting of the following reports, forms and data packets are entered or generated.

1 Should Be RFP's

Reports, Forms, Screens, etc. that will be generated by the automated system. Example layouts and samples of information in each.

5 Question Map Rules

Rules for doing Question mapping, including the seven steps and descriptions for each.

9 Simple Sentences

Sentences describing RFP's from the "Should be" model that are simple i.e. cannot be broken down into to or more sentences.

15 Simple Sentence Rules

22 Complex Sentences

Sentences that do not pass the rules of being a simple sentence i.e. they can be broken down into two or more sentences without loosing meaning.

23 Database Layouts and Data Dumps

Layouts of the database structures in the form of the Business Info. Diagram or other documentation of the structure.

24 Edits

Additions Changes or Deletes being generated from the review process.

25 Business Practices

The way the organization being automated carries on the day to day workings of the business.

The Group Like Sentences Together gather all the sentences that have been created for all the RFP's from the should be model which includes the following steps. Sentences that use the same verbs and the same types of nouns are grouped into lists.

32121 Retrieve All Simple Sentences

All analysts working on the project pool the sentences together from the review of various RFP's.

32122 Find Sentences with same verbs, adject., & nouns

Sentences that are "about" the same thing should be identified by the verbs all being the same.

32123 Combine sentences

Combine the sentences together into one table like block of sentences.

Figure 18:
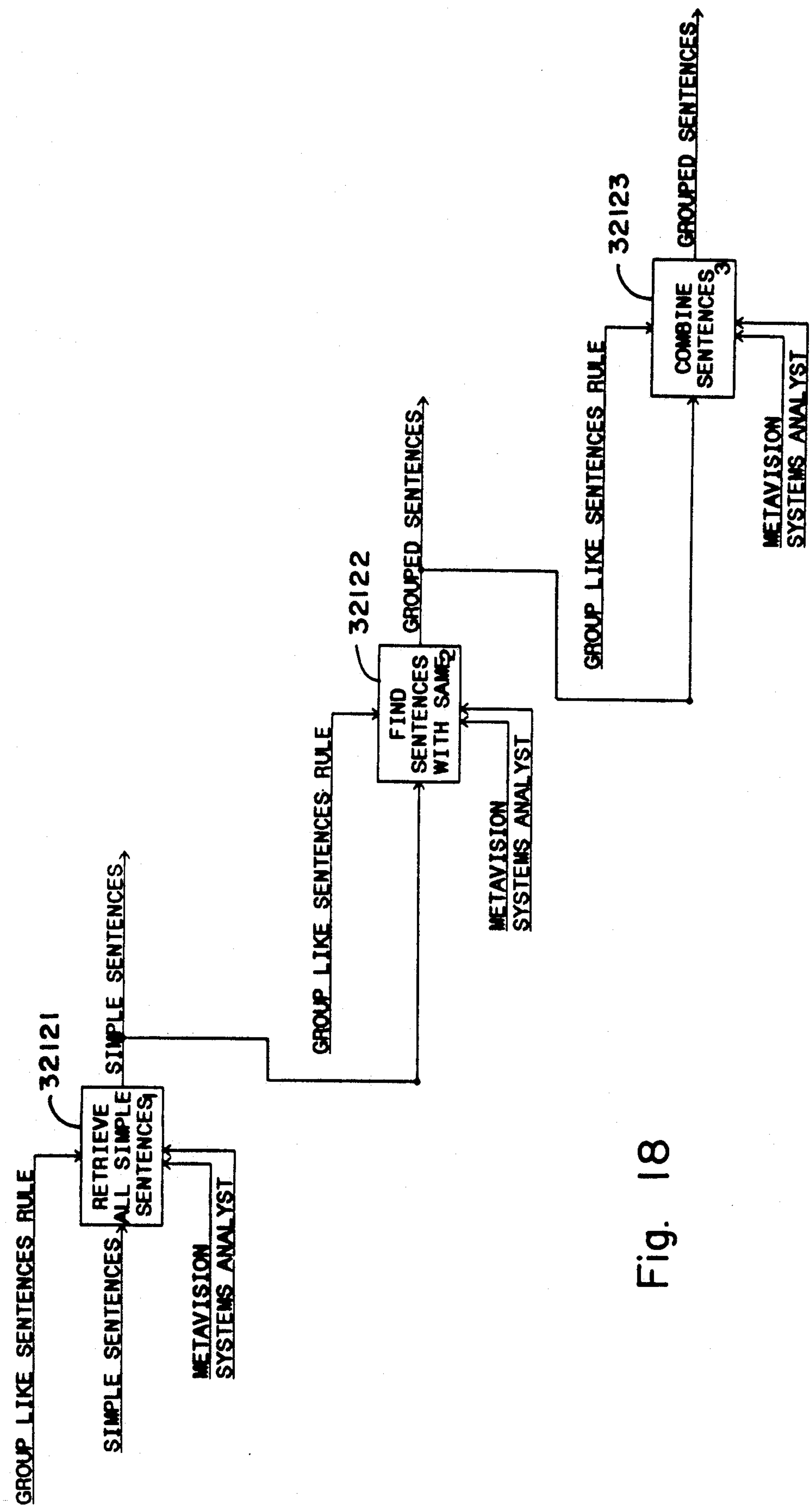
FIG. 18 is a functional diagram of the Group Like Sentences Together steps.

The preceding steps and related inputs and outputs are diagramed in FIG. 18, Group Like Sentences Together.

During the performance of the Group Like Sentences Together steps, input and output data consisting of the following reports, forms and data packets are entered or generated.

9 Simple Sentence

Sentences describing RFP's from the "Should be" model that are simple i.e. cannot be broken down into to or more sentences.

10 Grouped Sentences

Sentences that contain the same verbs and the same types of nouns are grouped together.

16 Group Like Sentences Rule

The Develop population Tables steps transform the grouped sentences into a table that contains columns of word types and instances containing the grouped sentences. They include the following steps:.

32131 Retrieve Grouped Sentences
Gather all the Grouped sentences.

32132 Remove all but key words
All the words in the sentence that are not required for the automated system (i.e. possibly the articles, prepositions etc.) are removed.

32133 Create table boundaries
Create Column and Row Boundaries around the remaining sentence objects.

32134 Add a ROLE name as a Column Heading
Role names or the part the words in the column play in the sentence, are added as column headings in the table.

32135 Write a Generic sentence above the table
A Generic sentence of what the table is about is written above the Population Table to fully describe the relationship between the roles in the sentence.

Figure 19A:
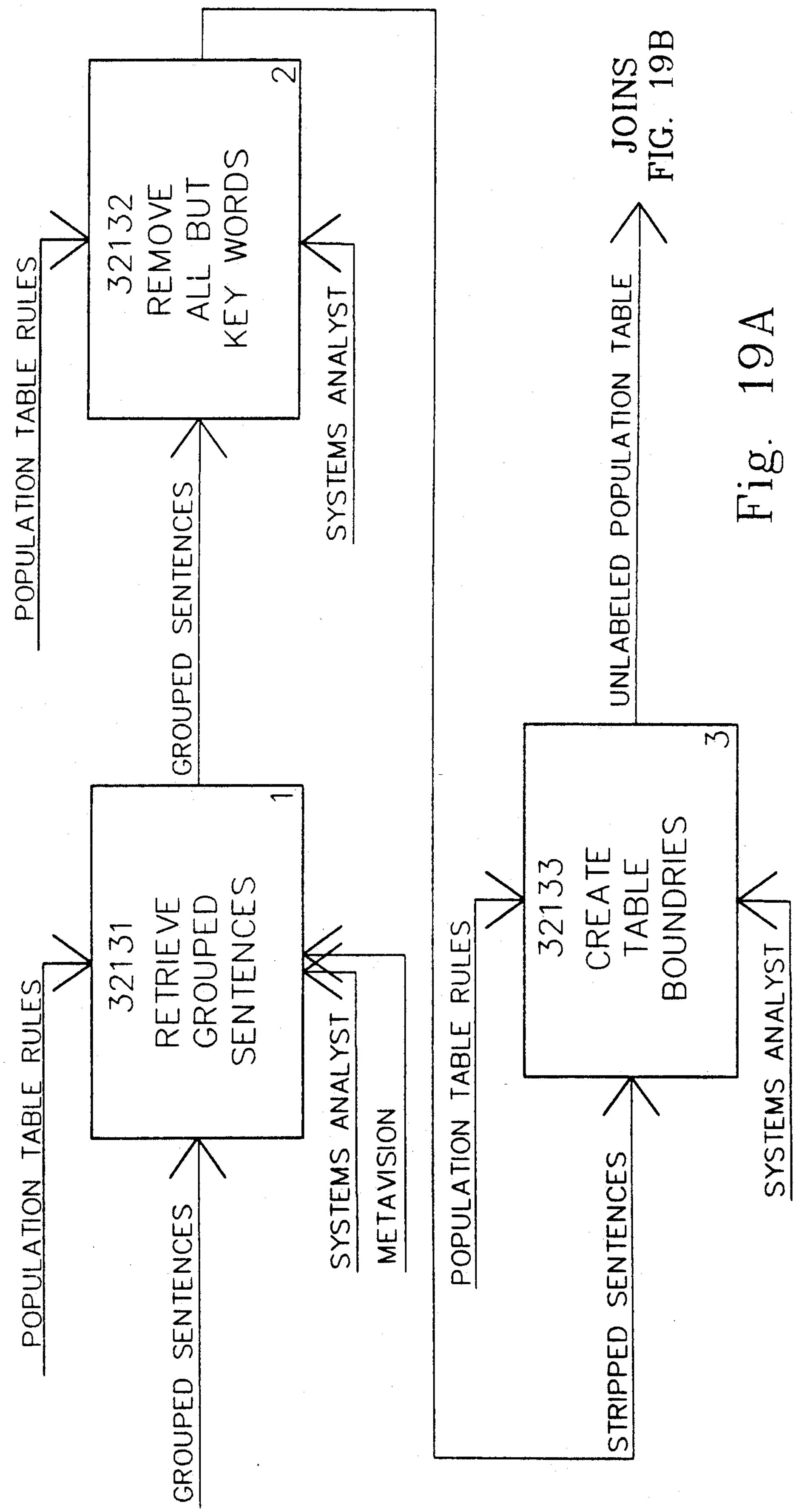
FIGS. 19A and 19B make up for FIG. 19 which is a functional diagram of the Develop Population Tables steps.
Figure 19B:
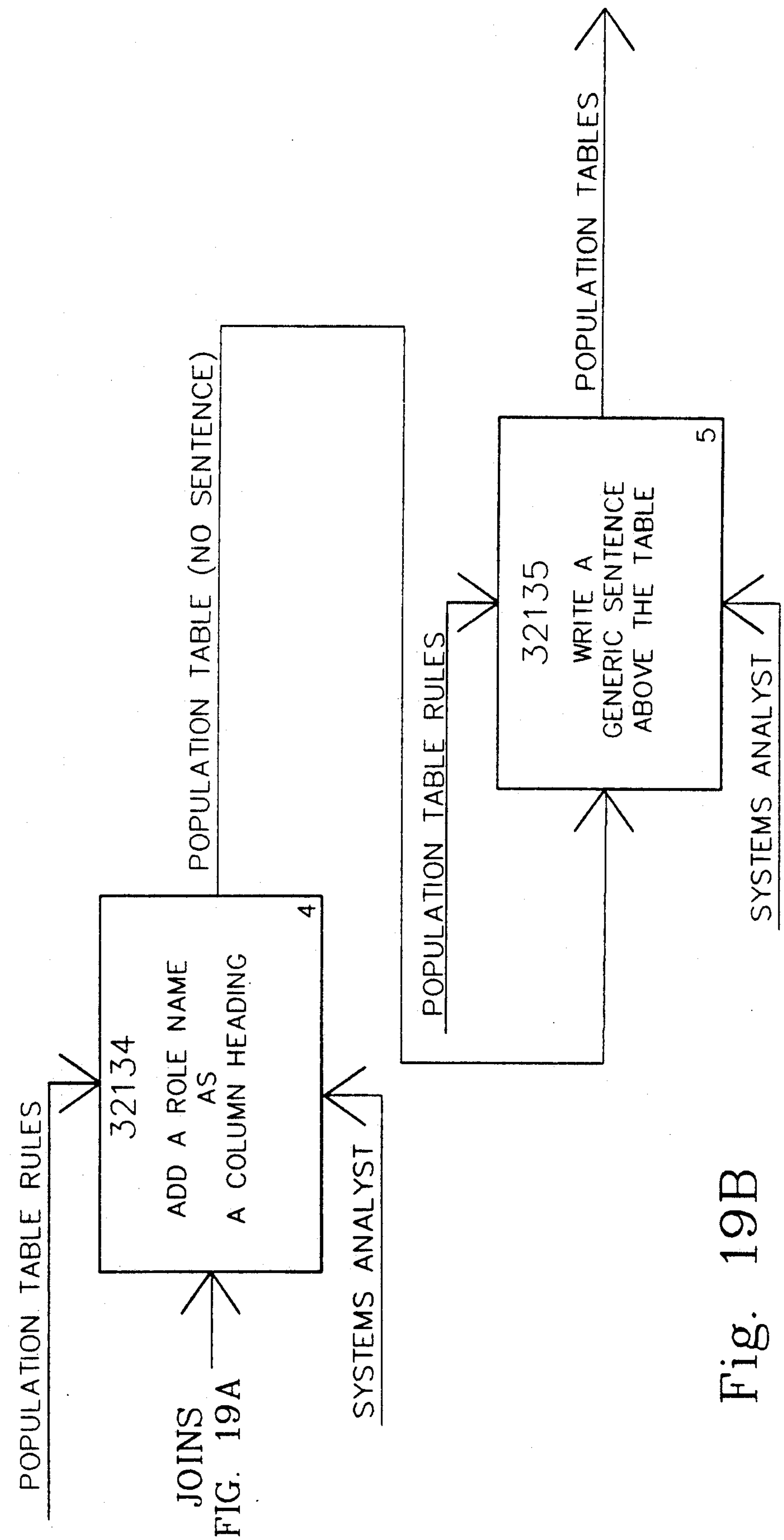

The preceding steps and related inputs and outputs are diagramed in FIG. 19, Develop Population Tables.

During the performance of the Develop population Tables steps, input and output data consisting of the following reports, forms and data packets are entered or generated.

10 Grouped Sentences
Sentences that contain the same verbs and the same types of nouns are grouped together.

11 Population Tables
Table containing labled columns of similar information. The instances in these tables come from grouped sentences.

17 Population Table Rules

26 Stripped Sentences
Sentences that have been stripped of everything except the key words. Articles and prepositions are usually eliminated and often the verb.

27 Unlabeled Population Table
Population table has the key words arranged in columns and the grouped sentences are the instances. This table has no column headings.

28 Population Table (no sentence)
Population table has the key words arranged in columns and the grouped sentences are the instances. This table has no sentence heading.

The Add Uniqueness Constraints steps select the roles in the population table that make each instance unique and place an arrow over these roles. The uniqueness constraint must follow the N/N−1 rule. They include the following steps.

32141 Select Roles that make each instance unique
Scan the population table and select the role or combination of roles that have values that will uniquely identify an instance in the table. The role value or combinations must appear only once.

32142 Add roles to add uniqueness
When no role or combination of roles will uniquely identify an instance in the population table then the population table is revised to add roles that will be used to uniquely identify instances.

32143 Apply N/N−1 Rule
Check to make sure every sentence has at least one uniqueness constraint. Also check to see if there is more than one role in the sentence without a uniqueness constraint. If so it fails N/N−1 Rule

32144 Break Population Table down
The population table contains too much information i.e. the sentence is complex not simple. The sentence therefore should be broken into simple sentences that carry the same meaning.

32145 Finalize Population Table Output
The Output of the population table is finalized in a presentable form.

Figure 20A:
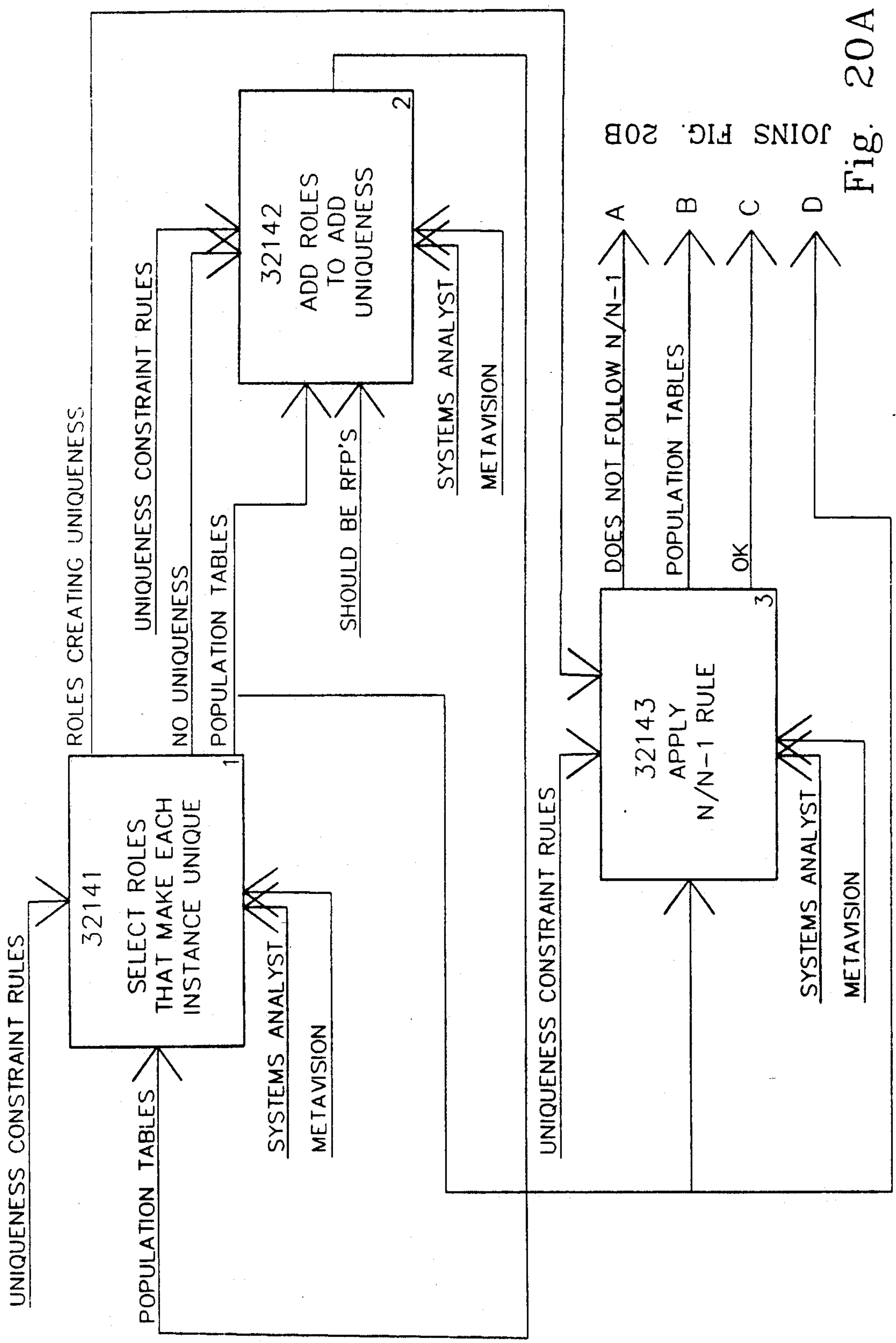
FIGS. 20A and 20B make up for FIG. 20 which is a functional diagram of the Add Uniqueness Constraints steps.
Figure 20B:
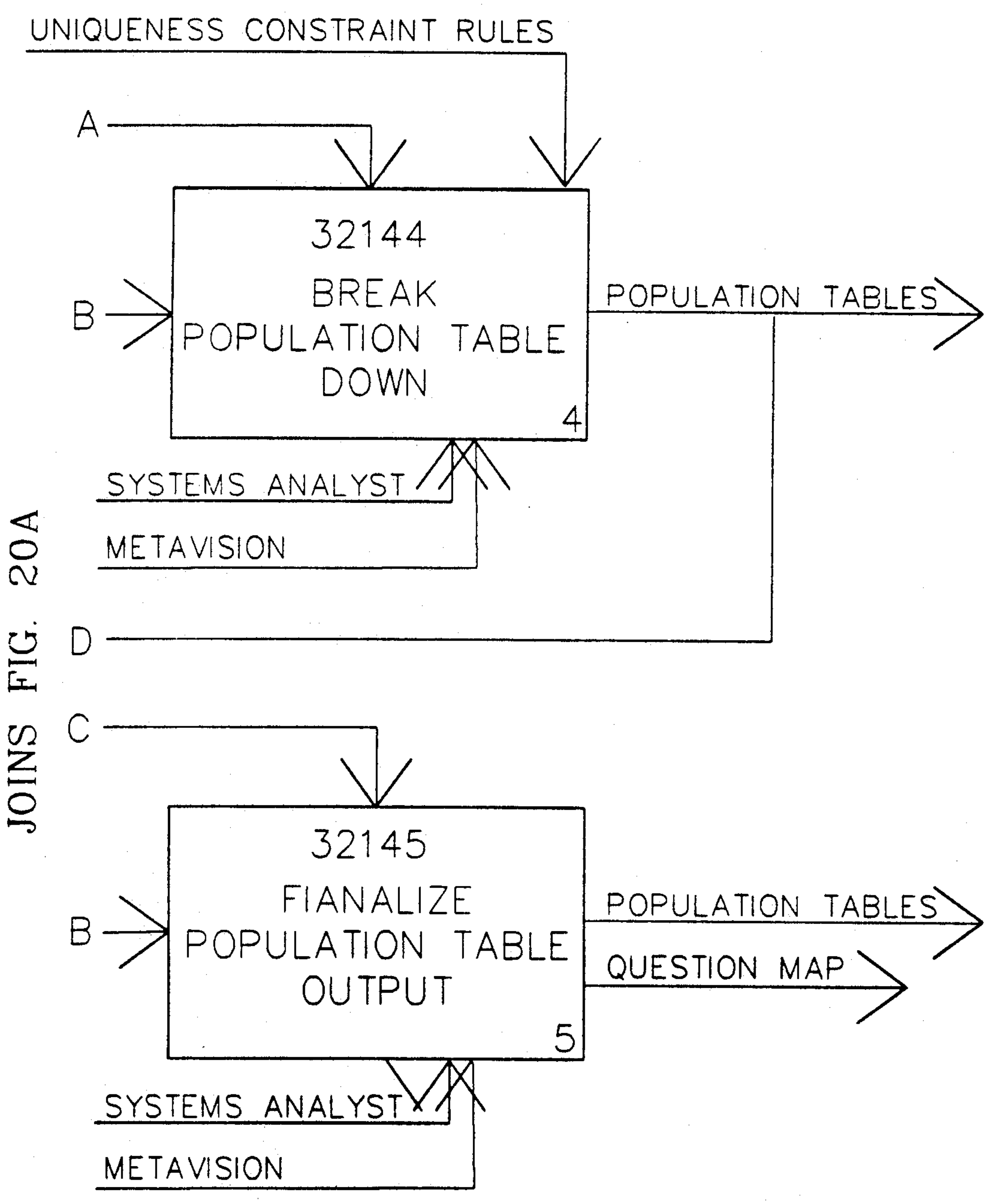

The preceding steps and related inputs and outputs are diagramed in FIG. 20, Add Uniqueness Constraints.

During the performance of the Add Uniqueness Constraints steps, input and output data consisting of the following reports, forms and data packets are entered or generated.

1 Should Be RFP's
Reports, Forms, Screens, etc. that will be generated by the automated system. Example layouts and samples of information in each.

2 Question Map
Fifth normal form database design containing all the relationships of data in the automated system described in the form of natural language sentence

11 Population Tables
Table containing labled columns of similar information. The instances in these tables come from grouped sentences.

19 Uniqueness Constraint Rules

30 No Uniqueness
A Population table is found to not contain any roles that will make the instances unique.

31 Roles creating uniqueness
Roles in the population table that will make instances in the population table unique.

32 Does Not Follow N/N−1
The uniqueness constraints do not follow the N/N−1 rule. There exists more than one role that does not have a uniqueness constraint over it.

33 OK
No Changes Required.

The Identify Multiple Reference Roles steps are used when two different names are given to the same "thing" then there exists a multiple reference for that "thing". When these are identified, the different roles are given the same COMMON NAME. They include the following steps.

32151 Check if Role will loose Uniqueness
Check if there is a possibility that a role used as in a uniqueness constraint may not be unique in the future.

32152 Check if Role size is an issue
Check the size of the roles used as the uniqueness constraints and determine if another role of a smaller size should be used.

32153 Check for Ease of Use for system

The Role may be used frequently as an access ID so the length and type of some roles may be significant.

32154 Make Common Names
Find roles that represent the same information but are known to the user by different names.

32155 Check for two roles being related
Check to see if two roles with different names actually refer to the same common name.

Figure 21:
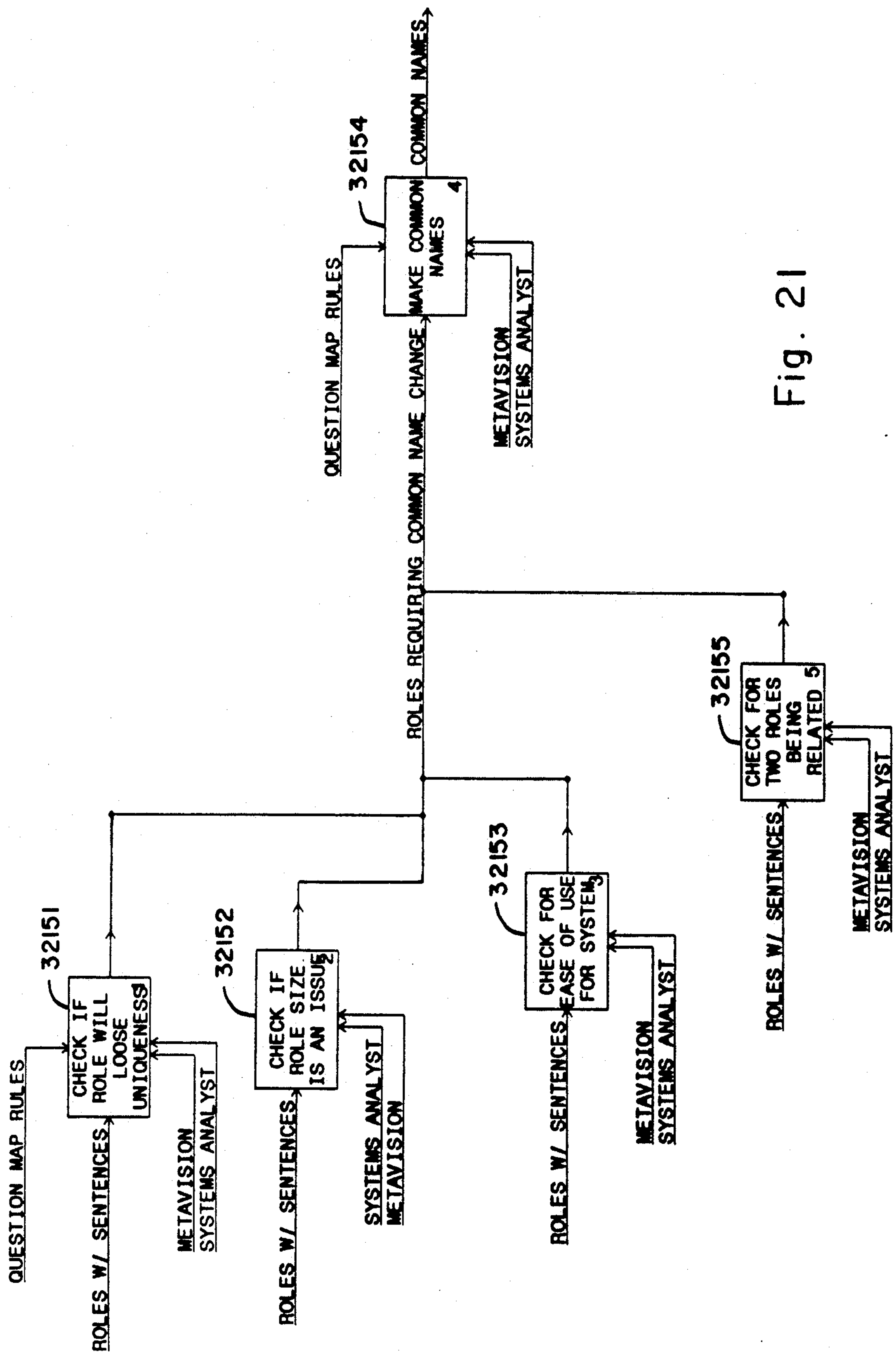
FIG. 21 is a functional diagram of the Identify Multiple Reference Roles steps.

The preceding steps and related inputs and outputs are diagramed in FIG. 21, Identify Multiple Reference Roles.

During the performance of the Identify Multiple Reference Roles steps, input and output data consisting of the following reports, forms and data packets are entered or generated.

5 Question Map Rules
Rules for doing Question mapping, including the seven steps and descriptions for each.

34 Roles w/Sentences
Roles and Sentences with the uniqueness constraint and all population table instances removed.

36 Roles Requiring Common Name Change
Roles identified as needing to change the common name ID.

55 Common Names
For two or more Roles in a Question Map or two or more Fields in an External Schema there can exist a Common Name that links them together.

The Add Integrity Constraints steps are for roles that have the same COMMON NAME(s). An integrity constraint can be drawn between them to show the set relation (subset, equal, disjoint or algorithmic) that exists between sentences. They include the following steps.

32161 Remove Population Table Instances
The instances in the population table that were used in creating the uniqueness constraints are removed and all that remains is the role names (column headings) and uniqueness constraints.

32162 Find Roles with common names
Role names may have the same Common Name ID that will allow different names for the same entity.

32163 Establish set relationships
Establish the set relationships, Subset, Equal, or Disjoint by referring to the instances in the populations tables.

Figure 22:
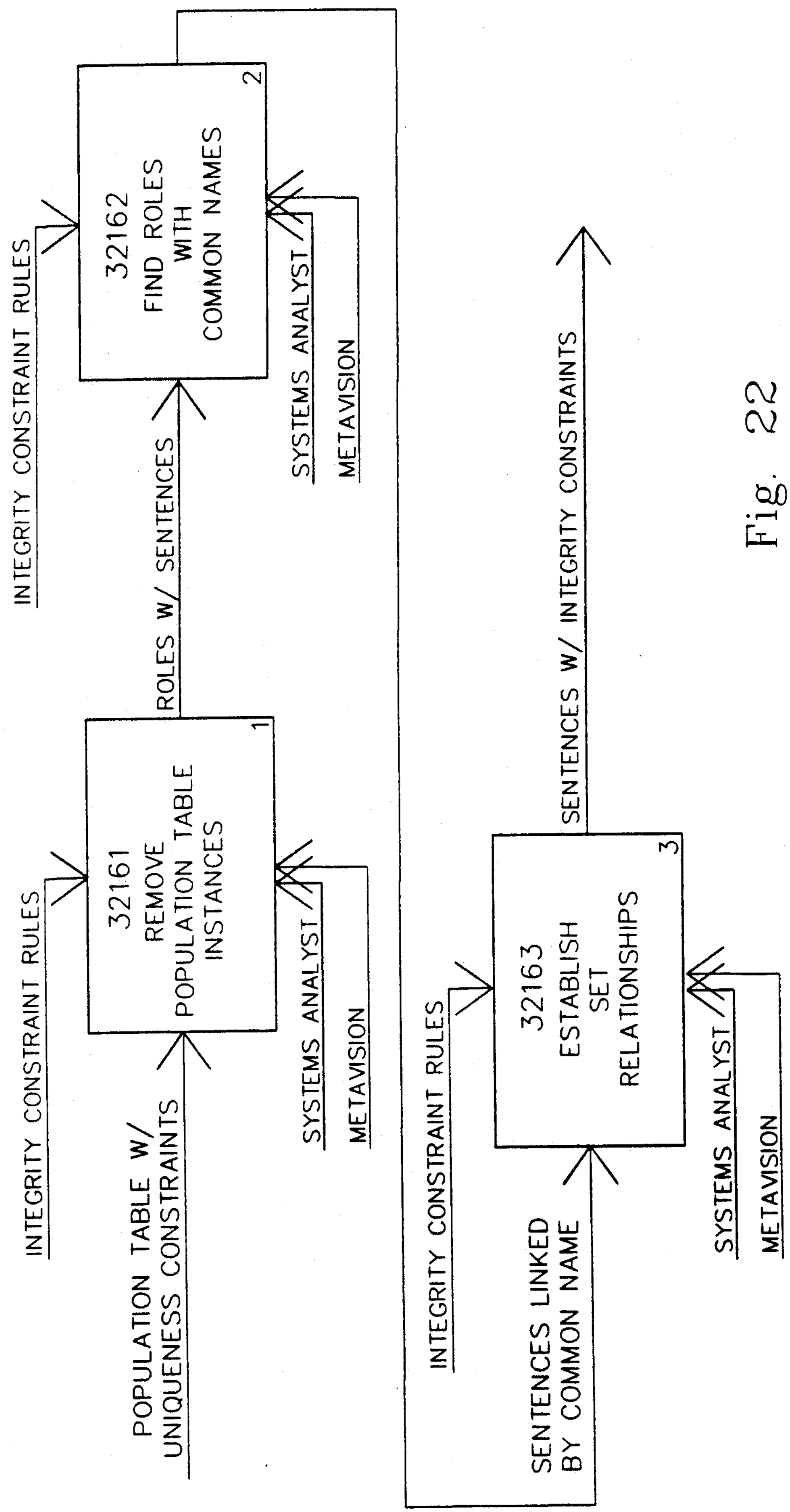
FIG. 22 is a functional diagram of the Add Integrity Constraints steps.

The preceding steps and related inputs and outputs are diagramed in FIG. 22, Add Integrity Constraints.

During the performance of the Add Integrity Constraints steps, input and output data consisting of the following reports, forms and data packets are entered or generated.

13 Sentences w/Integrity Constraints
Sentences with Uniqueness Constraints have Integrity constraints that show the set relations or the common name constraints.

20 Integrity Constraint Rules

29 Population Table w/Uniqueness Constraints
Population table has the key words arranged in columns and the grouped sentences are the instances. This table has no column headings.

34 Roles w/Sentences
Roles and Sentences with the uniqueness constraint and all population table instances removed.

35 Sentences Linked by Common Name
Sentences that have roles with common names are linked by common name constraints.

The Write/Edit Sentences from RFP's steps write a simple sentence that cannot be broken into two or more simple sentences without loosing information. Words like "AND" or "BUT" may indicate that a complex sentence has been written. They include the following steps.

321131 Examine RFP information
By looking at information on the RFP Find the role that seems to be the unique identifier for all other information on the RFP.

321132 Determine Context Roles
Find what ideas/roles/RFP information needs to be grouped together to form a context.

Figure 23:
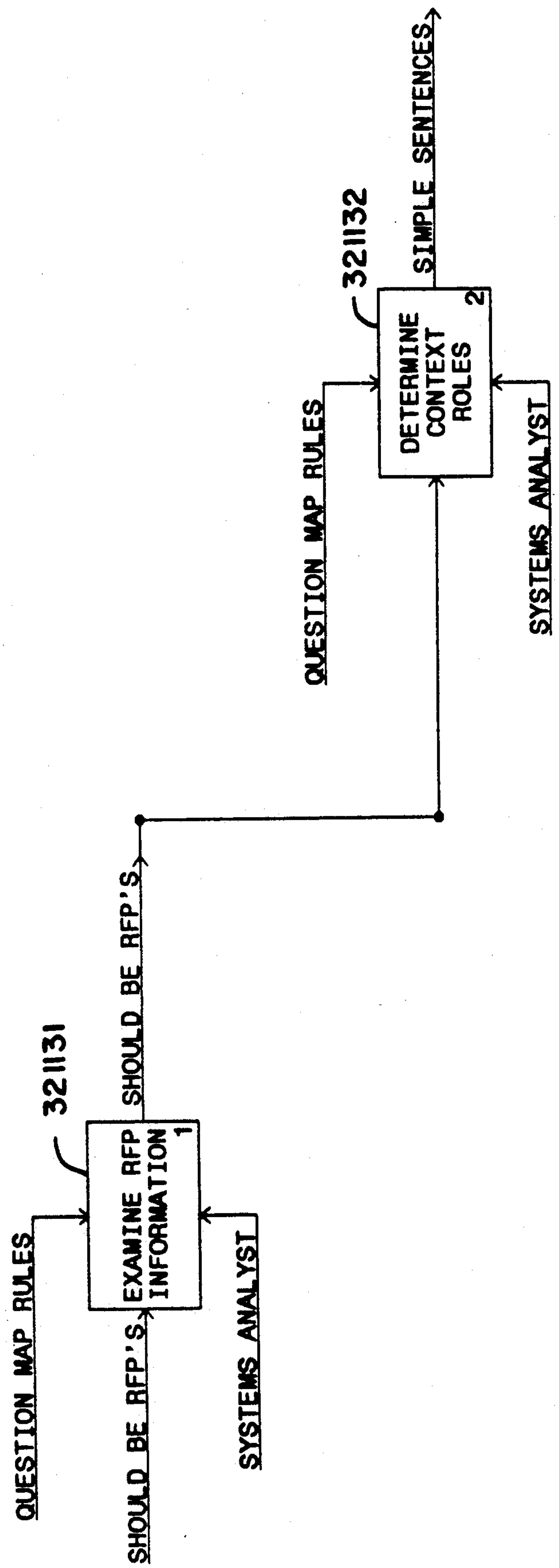
FIG. 23 is a functional diagram of the Write/Edit Sentences from RFP's steps.

The preceding steps and related inputs and outputs are diagramed in FIG. 23, Write/Edit Sentences from RFP's.

During the performance of the Write/Edit Sentences from RFP's steps, input and output data consisting of the following reports, forms and data packets are entered or generated.

1 Should Be RFP's
Reports, Forms, Screens, etc. that will be generated by the automated system. Example layouts and samples of information in each.

5 Question Map Rules
Rules for doing Question mapping, including the seven steps and descriptions for each.

9 Simple Sentences
Sentences describing RFP's from the "Should be" model that are simple i.e. cannot be broken down into to or more sentences.

Figure 24:
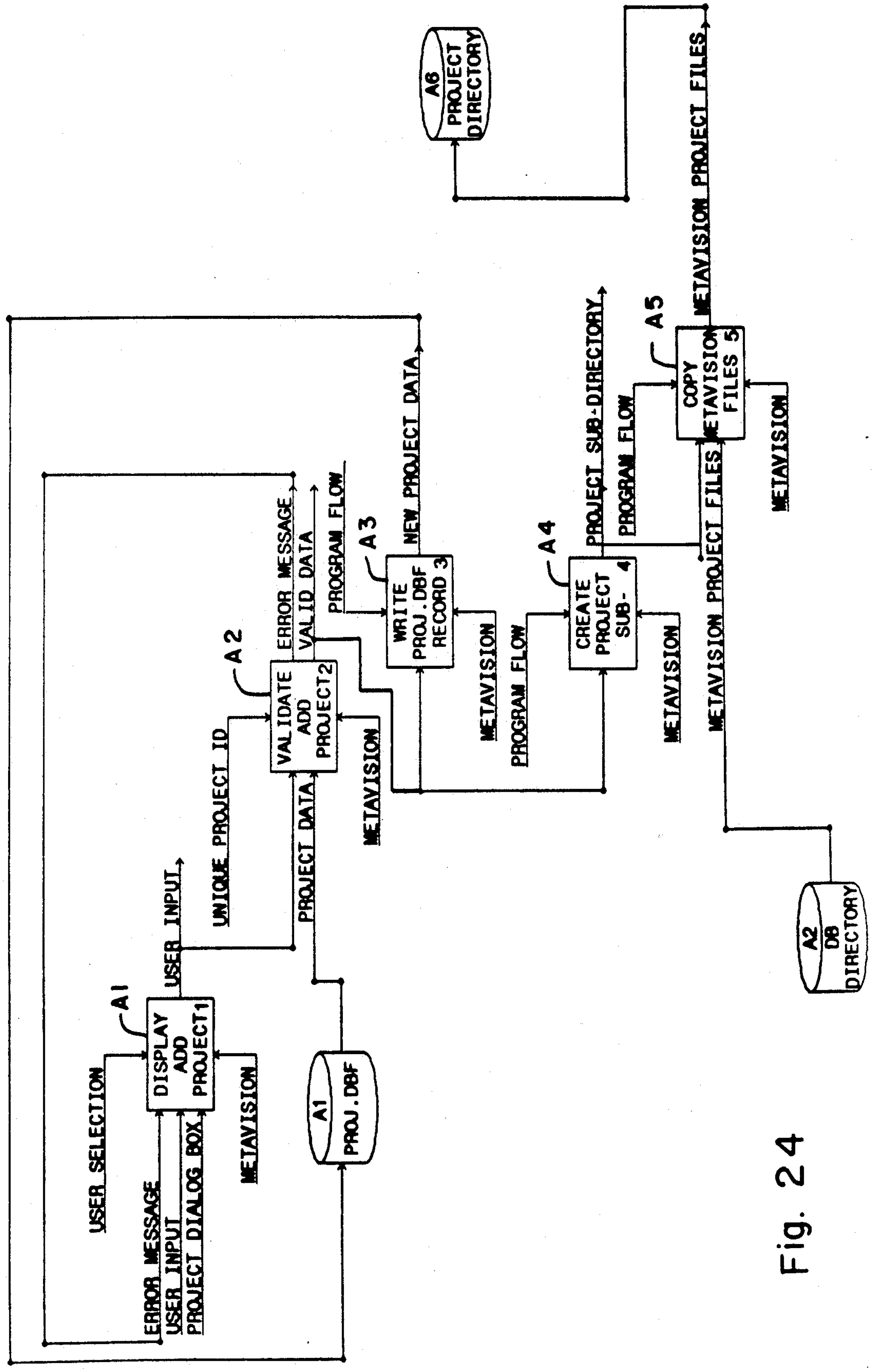
FIG. 24 is the Add Project data flow diagram.

When the project was initiated by the first operator executed steps, the program half of the procedure began by adding a project to the system memory. In the steps to add a project, a PROJ.DBF record is written, the subdirectory is created and made the default directory, and the MetaVision Files are copied from METAVISI DB. This is accomplished by the system performing the following steps which are illustrated in FIG. 24, Add Project.

A1 Display Add Project Dialog Box
The Dialog Box that prompts the user to enter the Project Information is displayed.

A2 Validate Add Project Responses

A3 Write PROJ.DBF Record

A4 Create Project Sub-Directory

A5 Copy MetaVision Files

During the performance of the Add Project steps, input and output data consisting of the following reports, forms and data packets are entered or generated.

4 User Input

22 Program Flow

86 Project Dialog

87 Project Data

88 Error Message

Invalid data causes an error message to be generated and the user must correct the error before proceeding.

Figure 25A:
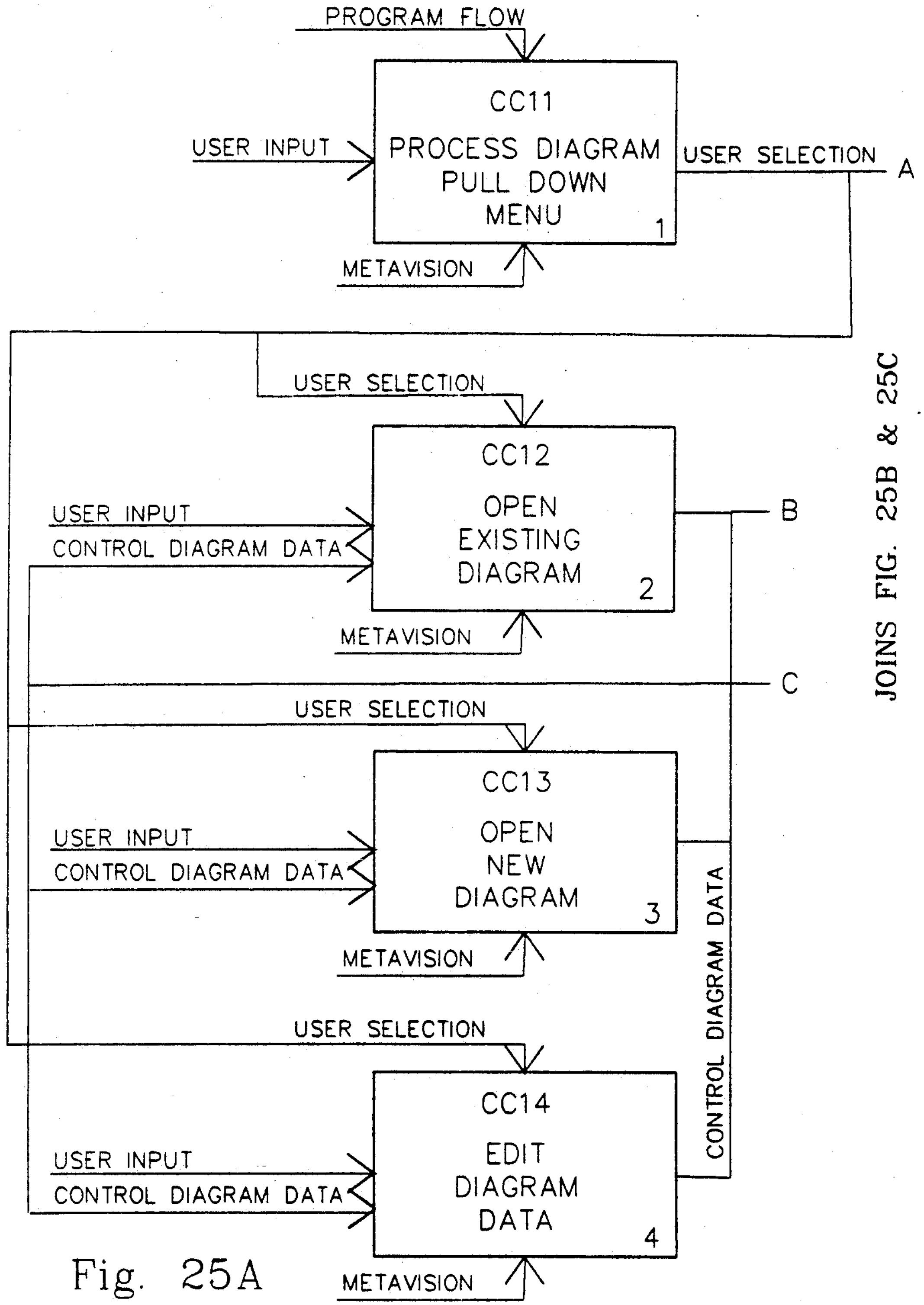
FIGS. 25A, 25B and 25C make up for FIG. 25 which is the Control Diagram DIAGRAM data flow diagram.
Figure 25B:
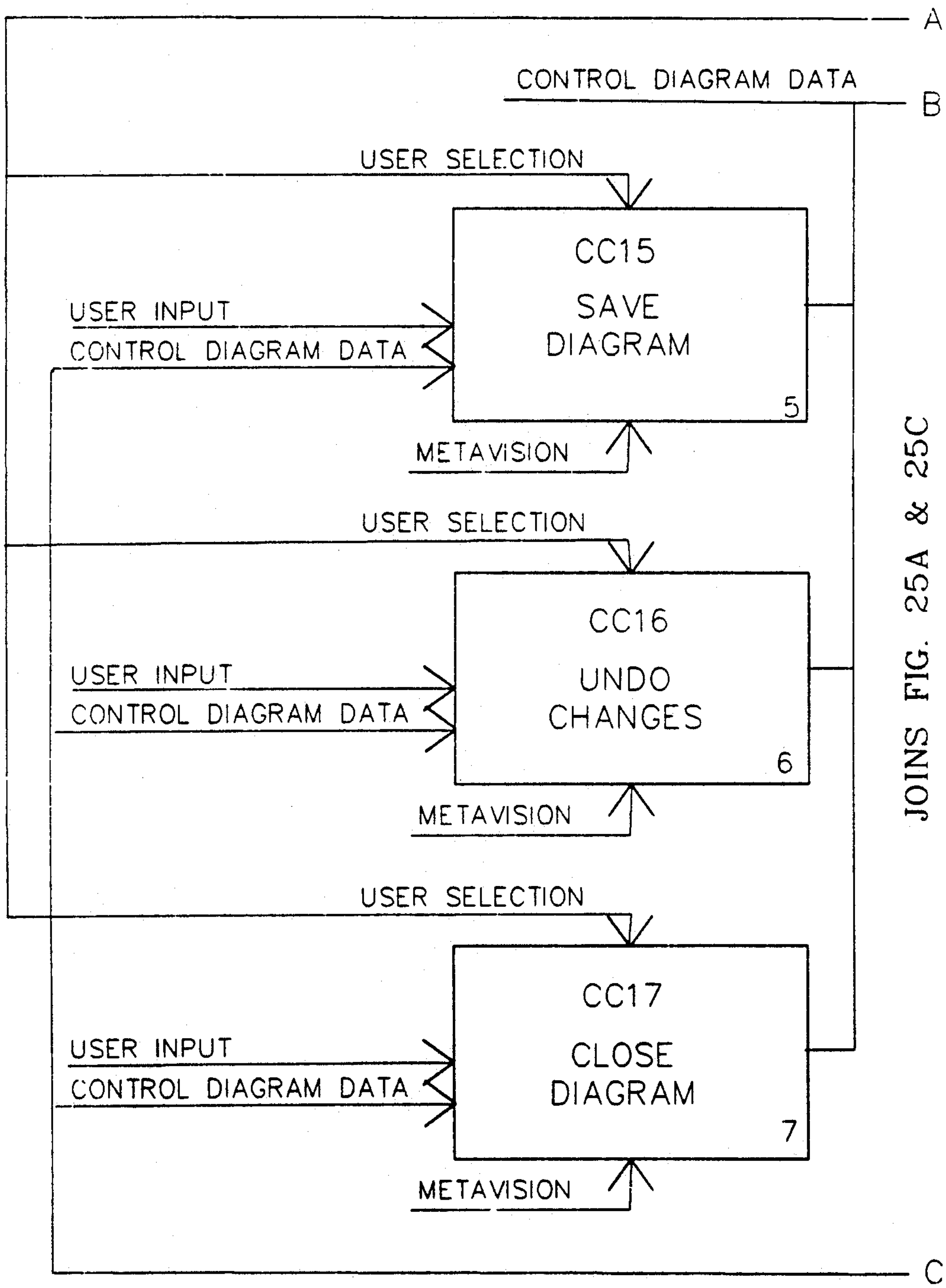
Figure 25C:
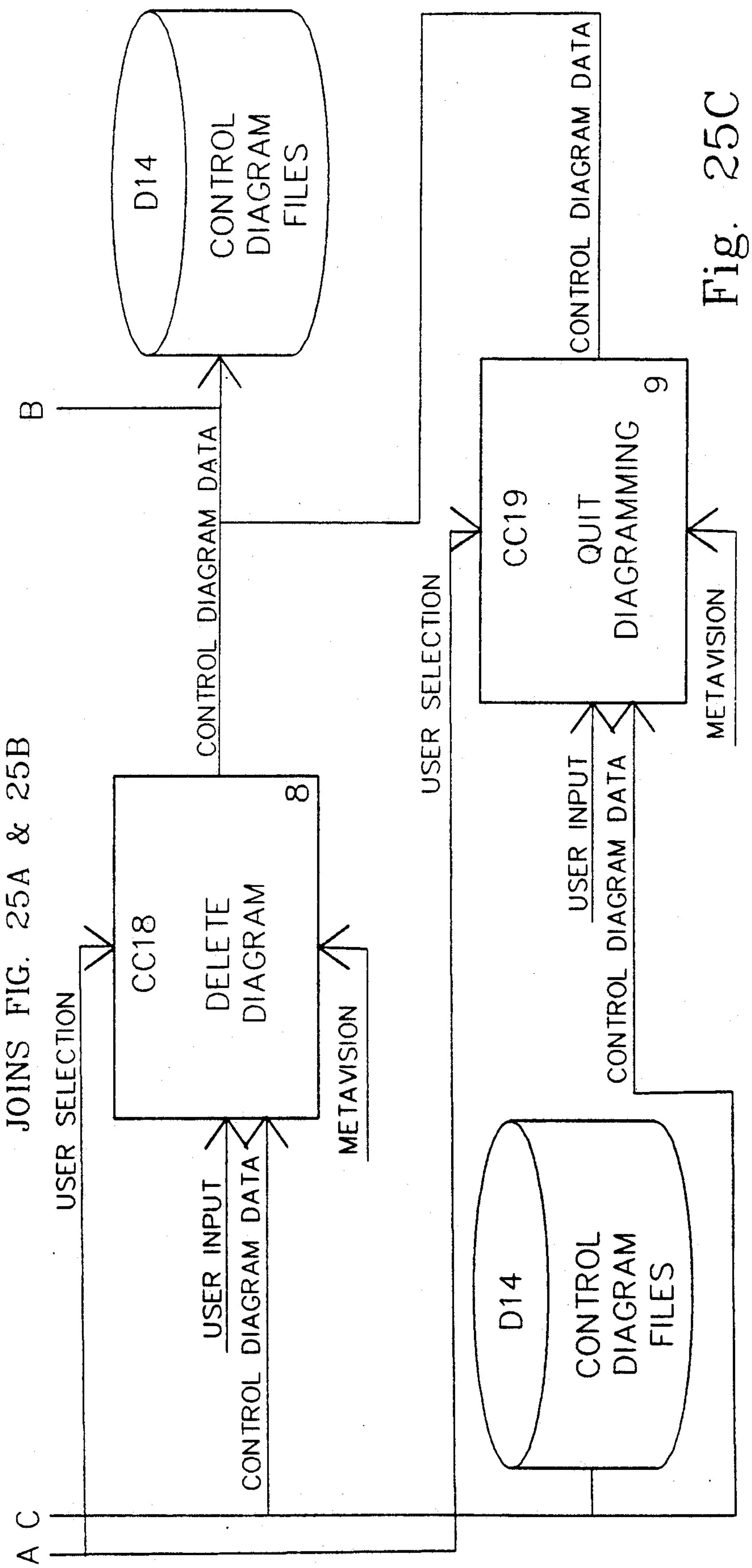

89 Valid Data
90 Project Sub-Directory
91 MetaVision Project Files
92 New Project Data
93 Unique Project ID
94 User Selection The functions of the DIAGRAM Pull Down Menu are accessed according to the following steps and as illustrated in FIG. 25, the Control Diagram DIAGRAM data flow diagram.

CC11 Process DIAGRAM Pull Down Menu
The functions of the DIAGRAM Pull Down Menu are controlled.
CC12 OPEN Existing Diagram
The information for the diagram is read from the Control Diagram Files and stored in linked lists in memory. The diagram is then drawn.
CC13 Open NEW Diagram
The information for the new diagram is read from the Control Diagram Files and stored in linked lists in memory. The diagram is then drawn.
CC14 EDIT Diagram Data
The basic information about the diagram that is kept in PICT.DBF can be changed by selecting Edit from the Diagram Pull Down Menu.
CC15 SAVE Diagram
Save copies the Current Diagram files to the Backup Diagram Diagram files. The diagram is not closed.
CC16 UNDO Changes
The diagram is closed and Undo copies the Backup Diagram files to the Current Diagram files. All changes to every diagram since the last Save are lost.
CC17 CLOSE Diagram
The Save/Undo/Exit choice box is displayed. Save copies the Current files to the Backup files. Undo copies the Backup files to the Current files. Exit does not copy files. The diagram is closed.
CC18 DELETE Diagram
After selecting the diagram to delete from the list of diagrams from PICT.DBF, the Conceptual Schema Data for the selected diagram is deleted in all files. This is a logical delete.

During the performance of the Control Diagram DIAGRAM steps, input and output data consisting of the following reports, forms and data packets are entered or generated.

4 User Input
22 Program Flow
94 User Selection
121 Control Diagram Data

The functions of the DIAGRAM Pull Down Menu are accessed according to the following steps.

CC19 QUIT Diagramming
The Save/Undo/Exit choice is displayed. Save copies the Current files to the Backup files. Undo copies the Backup files to the Current files. Exit does not copy files. Activity Selection List is next.

During the performance of the Control Diagram DIAGRAM steps, input and output data consisting of the following reports, forms and data packets are entered or generated.

4 User Input
22 Program Flow
94 User Selection
121 Control Diagram Data

Figure 26:
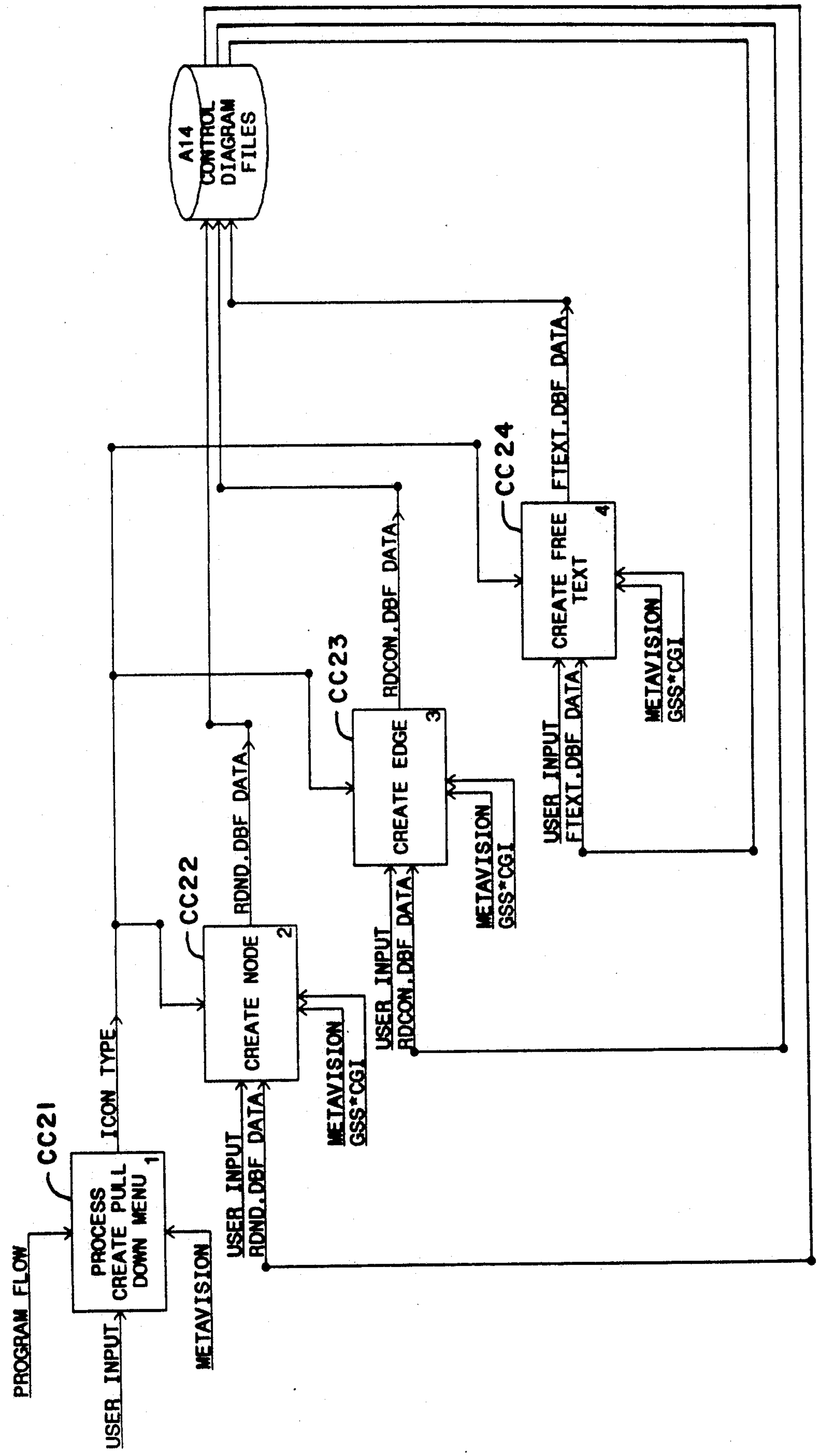
FIG. 26 is the Control Diagram CREATE data flow diagram.

The Control Diagram CREATE routine executes the functions of the CREATE Pull Down menu on a Control Diagram or State Transition Diagram according to the following steps and as illustrated in FIG. 26, the Control Diagram CREATE data flow diagram.

CC21 Process CREATE Pull Down Menu
The processing that occurs when an Icon is chosen from the CREATE Pull Down Menu is controlled by this process.
CC22 Create Node
A Node or process is created by selecting the Node Icon, positioning it on the screen, entering the required information, and drawing the Node.
CC23 Create Edge
Select the first Node, enter the required information, select the second Node, and route and draw the connecting Edge. You may click up to 6 times for offsets X1, Y1, X2, Y2, X3, Y3.
CC24 Create Free Text
After opening a Control Diagram, Free Text is created by selecting the word TEXT, positioning it on the screen, entering the required information, and drawing the Text.

During the performance of the Control Diagram CREATE steps, input and output data consisting of the following reports, forms and data packets are entered or generated.

Figure 27A:
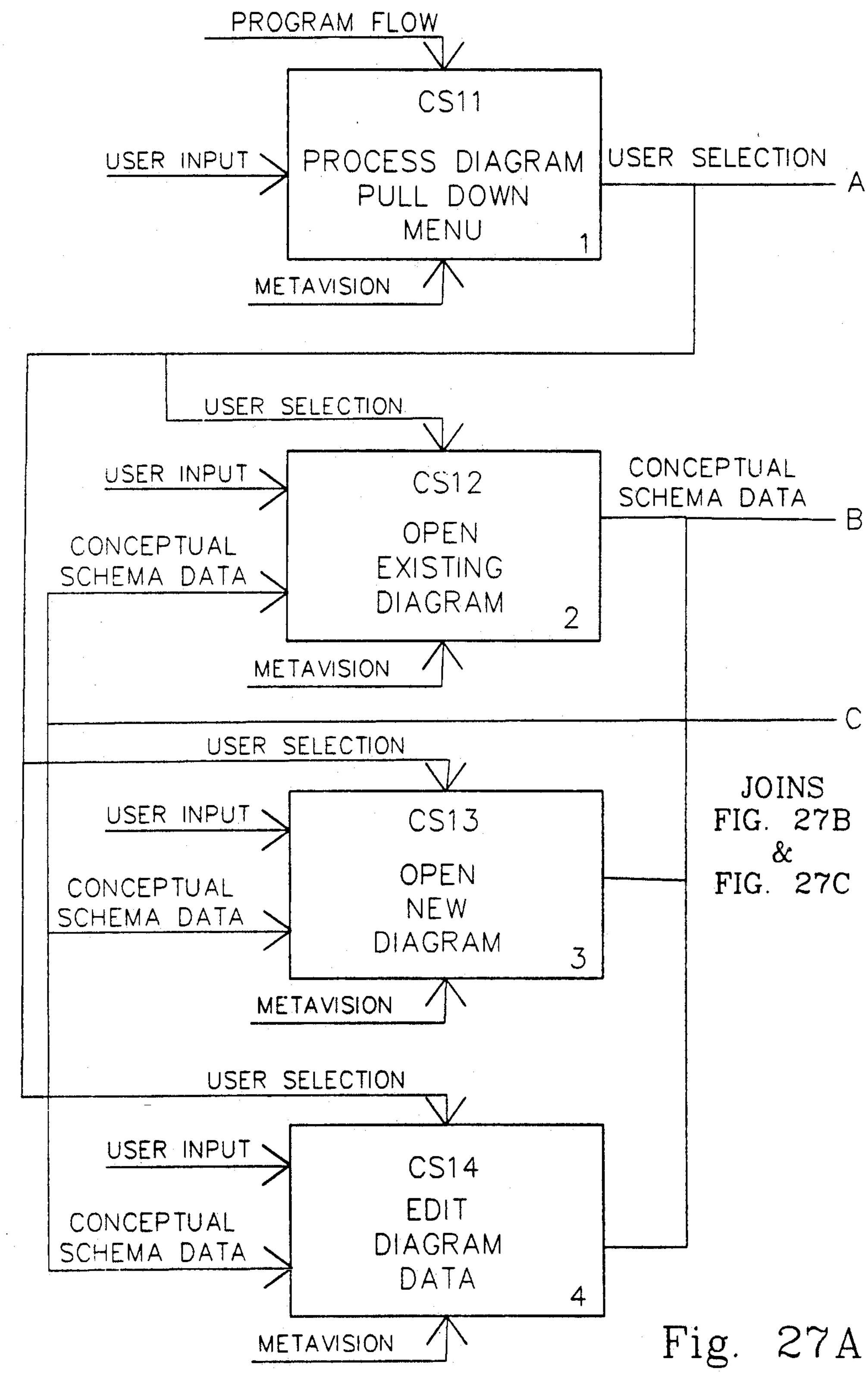
FIGS. 27A, 27B and 27C make up for FIG. 27 which is the Conceptual Scheme DIAGRAM data flow diagram.
Figure 27B:
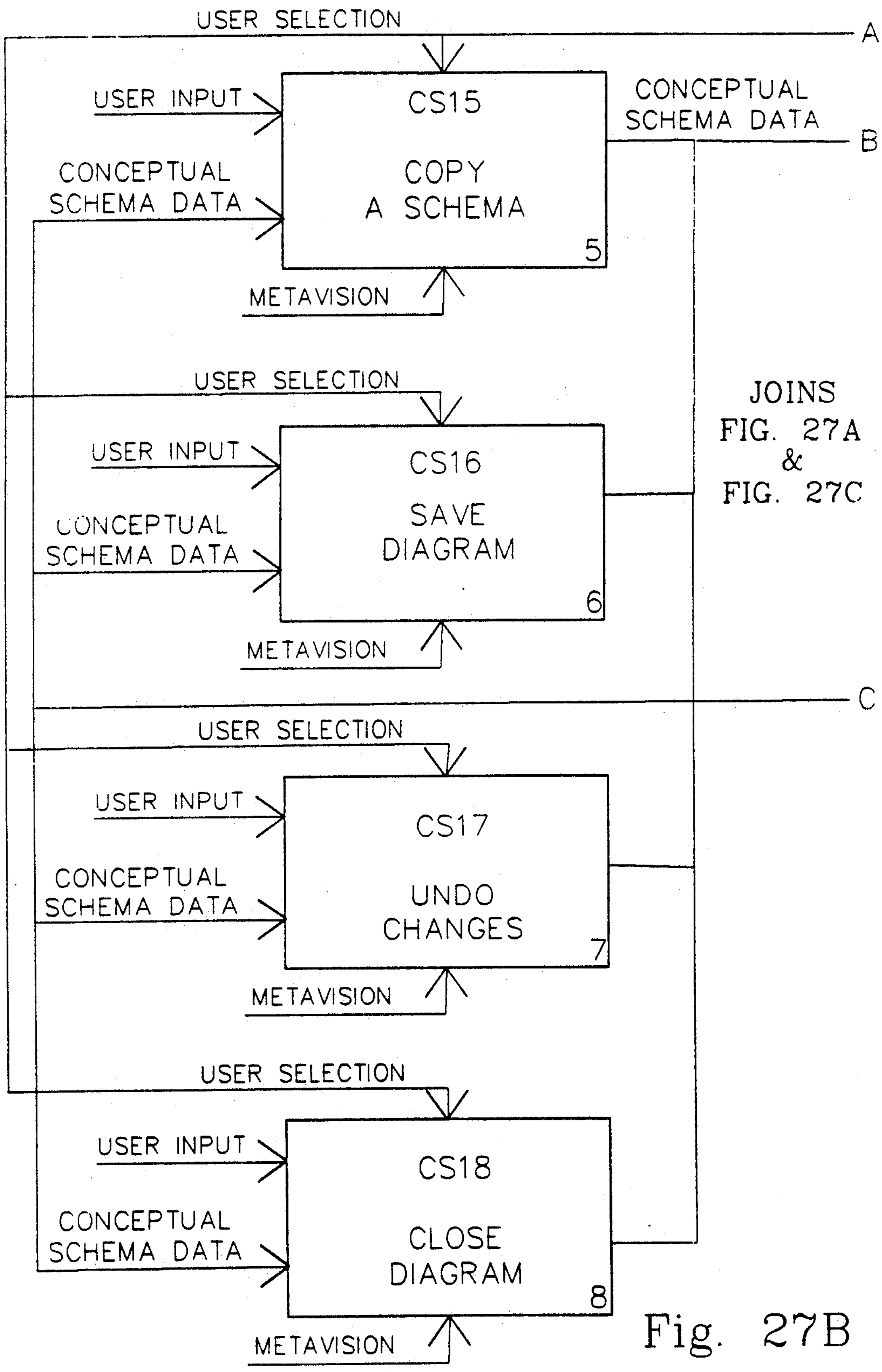
Figure 27C:
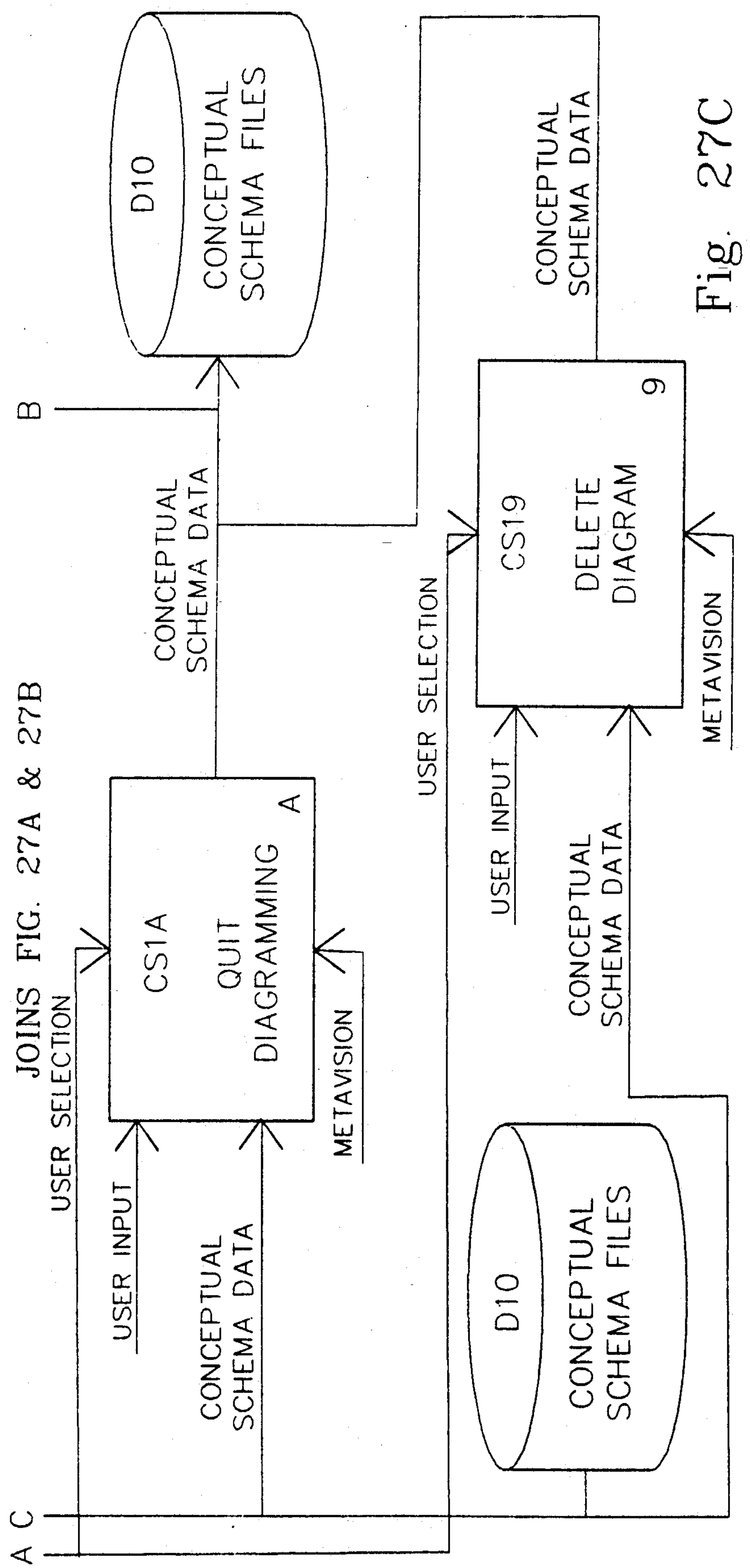

4 User Input
22 Program Flow
59 FTEXT.DBF Data
Free Text information
96 Icon Type
123 RDND.DBF Data
124 RDCON.DBF Data The functions of the DIAGRAM Pull Down Menu are accessed according to the following steps and as illustrated in FIG. 27, the Conceptual Schema DIAGRAM data flow diagram.

CS11 Process DIAGRAM Pull Down Menu
The functions of the DIAGRAM Pull Down Menu are controlled.
CS12 OPEN Existing Diagram
The information for the diagram is read from the Conceptual Schema Files and stored in linked lists in memory. The diagram is then drawn.
CS13 Open NEW Diagram
The information for the new diagram is read from the Conceptual Schema Files and stored in linked lists in memory. The diagram is then drawn.
CS14 EDIT Diagram Data
The basic information about the diagram that is kept in PICT.DBF can be changed by selecting Edit from the Diagram Pull Down Menu.

CS15 COPY A Schema

A new Conceptual Schema may be created by copying an existing Conceptual or External Schema chosen from a selection list.

CS16 SAVE Diagram

Save copies the Current Diagram files to the Backup Diagram Diagram files. The diagram is not closed.

CS17 UNDO Changes

The diagram is closed and Undo copies the Backup Diagram files to the Current Diagram files. All changes to every diagram since the last Save are lost.

CS18 CLOSE Diagram

The Save/Undo/Exit choice box is displayed. Save copies the Current files to the Backup files. Undo copies the Backup files to the Current files. Exit does not copy files. The diagram is closed.

CS19 DELETE Diagram

After selecting the diagram to delete from the list of diagrams from PICT.DBF, the Conceptual Schema Data for the selected diagram is deleted in all files. This is a logical delete.

CS1A QUIT Diagramming

The Save/Undo/Exit choice is displayed. Save copies the Current files to the Backup files. Undo copies the Backup files to the Current files. Exit does not copy files. Activity Selection List is next.

During the performance of the Conceptual Schema DIAGRAM steps, input and output data consisting of the following reports, forms and data packets are entered or generated.

Figure 28A:
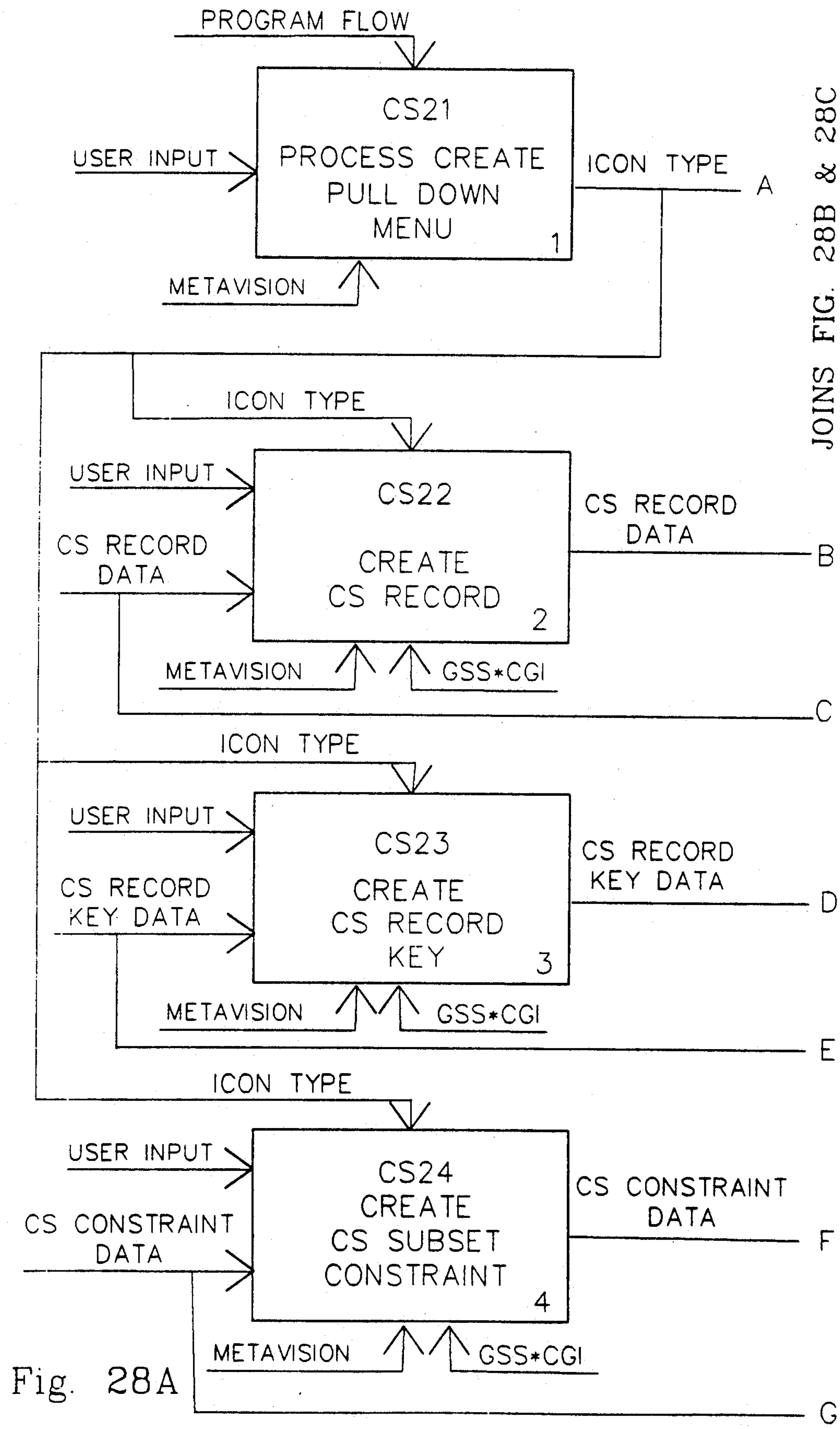
FIGS. 28A, 28B and 28C make up for FIG. 28 which is the Conceptual Schema CREATE data flow diagram.
Figure 28B:
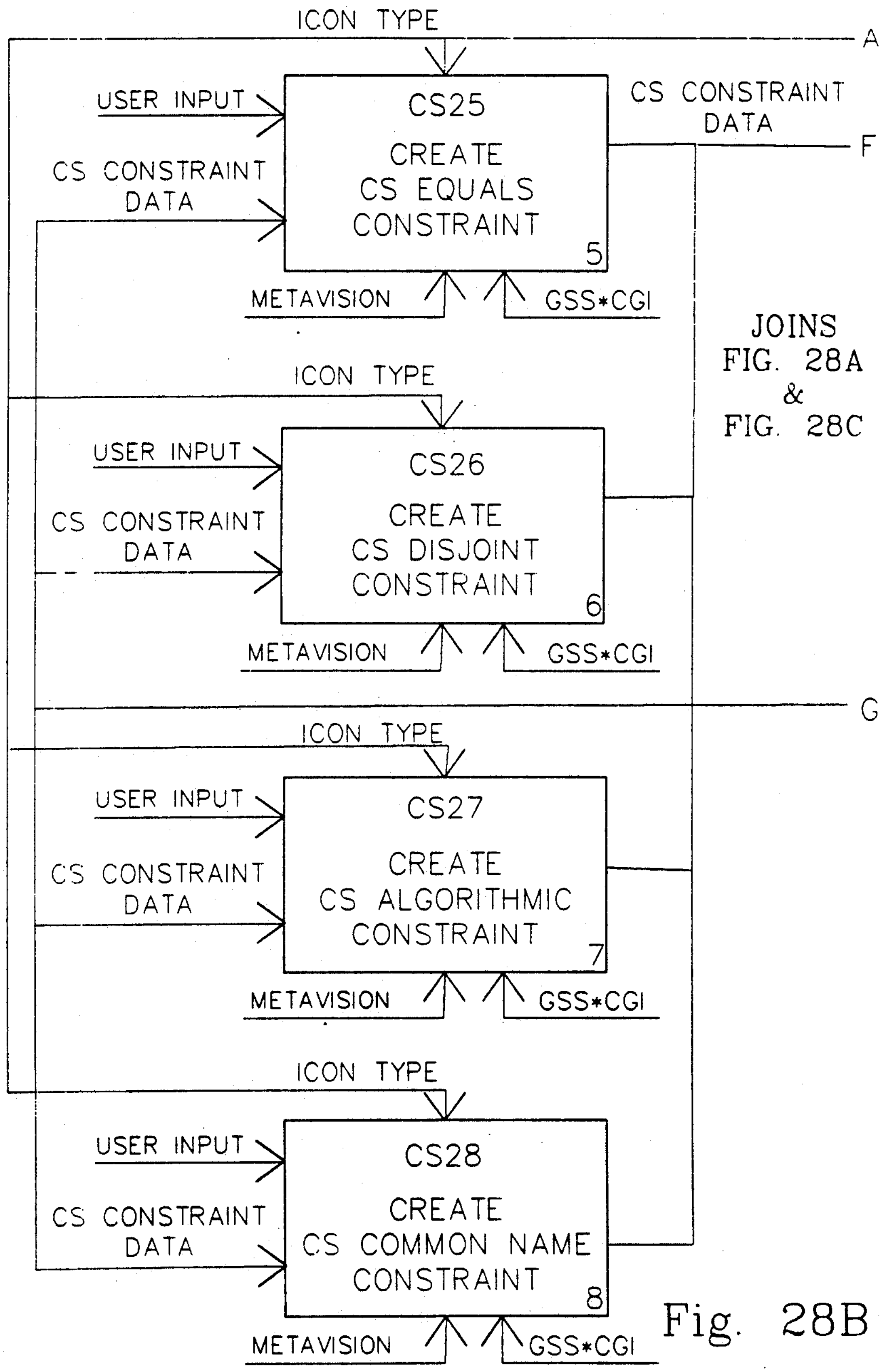
Figure 28C:
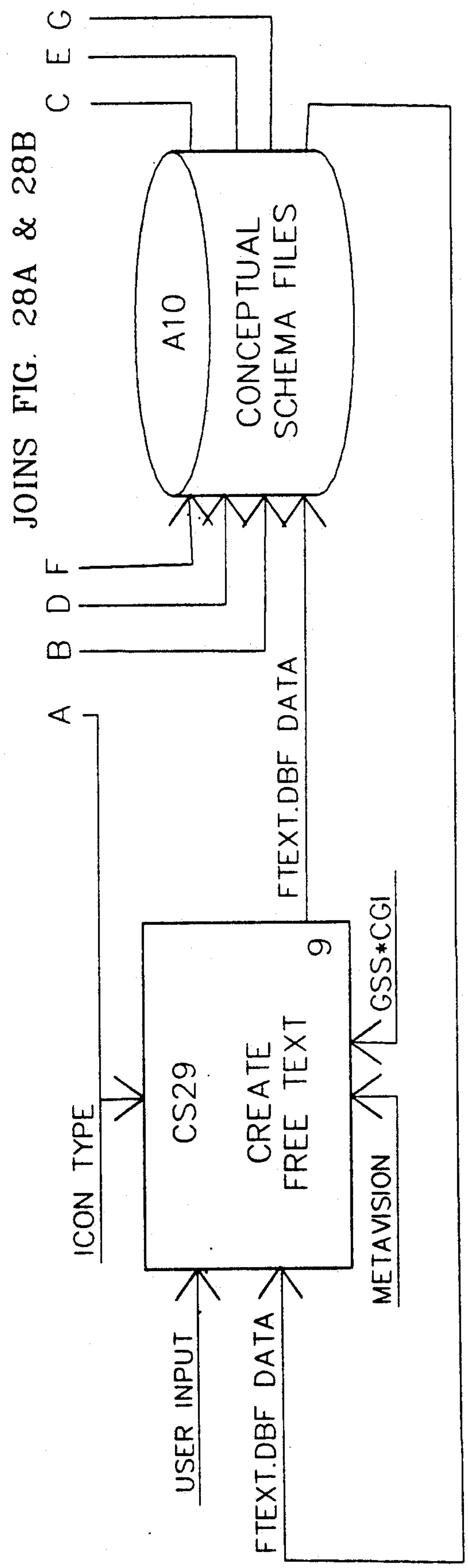

4 User Input
22 Program Flow
94 User Selection
119 Conceptual Schema Data The Conceptual Schema CREATE routine executes the functions of the CREATE Pull Down menu on a Question Map according to the following steps and as illustrated in FIG. 28, the Conceptual Schema CREATE data flow diagram.

CS21 Process CREATE Pull Down Menu

The processing that occurs when an Icon is chosen from the CREATE Pull Down Menu is controlled by this process.

CS22 Create CS Record

A Record is created by selecting the Record Icon, positioning it on the screen, entering the required Record and Field information, and drawing the Record.

CS23 Create CS Record Key

A Record Key is created by selecting the double headed Arrow Icon, selecting the first Record Field, entering the required information, selecting any other Fields, and drawing the Arrow.

CS24 Create CS Subset Constraint

Select the Subset Icon, the Superset Record & Fields, enter the required information, select the Subset Record & Fields, route & draw the Constraint. Must be between fields with same Common ID.

CS25 Create CS Equals Constraint

Select the Equals Icon, the first Record & Fields, enter the required information, select the second Record & Fields, rout & draw the constraint. Must be between fields with the same Common ID.

CS26 Create CS Disjoint Constraint

Select the Disjoint Icon, the first Record & Fields, enter the required information, select the second Record & Fields, route & draw the constraint. Must be between fields with same Common ID.

CS27 Create CS Algorithmic Constraint

Select the Algorithmic Constraint Icon, the first Record & Fields, enter the required information, select the second Record & Fields, route & draw the constraint. May be between any fields.

CS28 Create CS Common Name Constraint

Select the Common Name Constraint Icon, the first Record & Fields, enter the required information, select the second Record & Fields, route & draw the constraint. May be between any fields.

CS29 Create Free Text

After opening a Conceptual Schema, Free Text is created by selecting the word TEXT, positioning it on the screen, entering the required information, and drawing the Text.

During the performance of the Conceptual Schema CREATE steps, input and output data consisting of the following reports, forms and data packets are entered or generated.

Figure 29A:
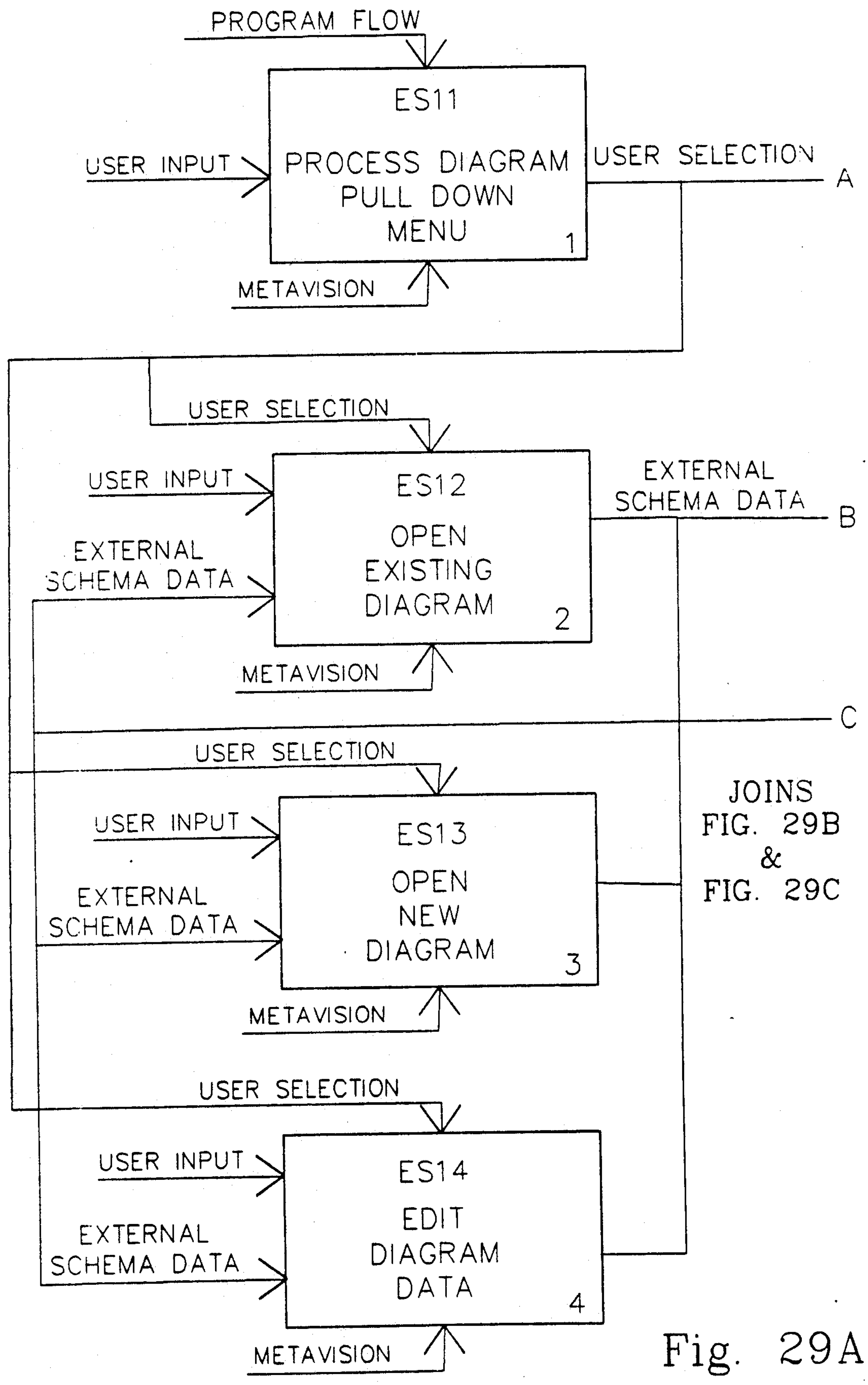
FIGS. 29A, 29B and 29C make up for FIG. 29 which is the External Schema DIAGRAM data flow diagram.
Figure 29B:
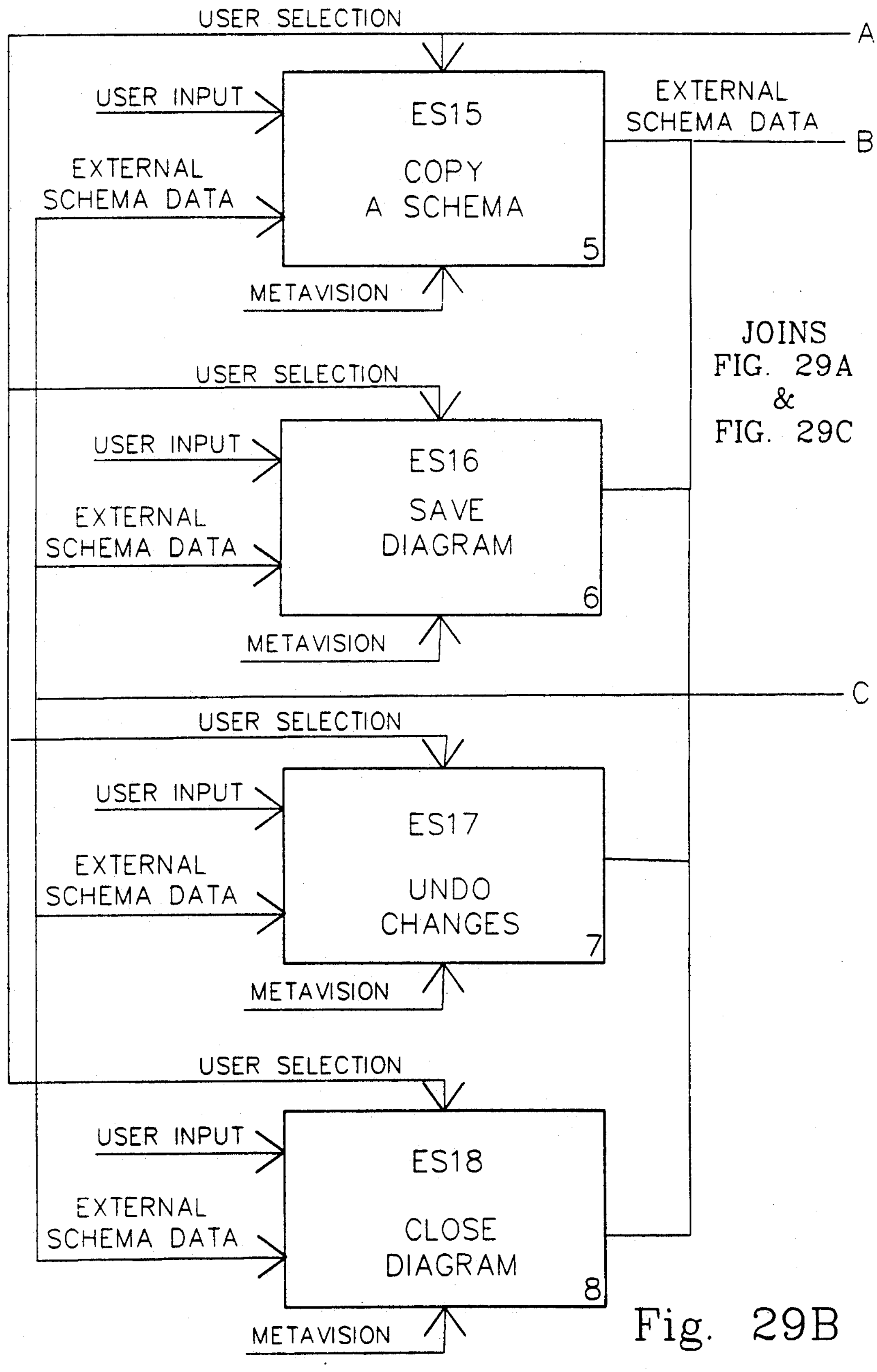
Figure 29C:
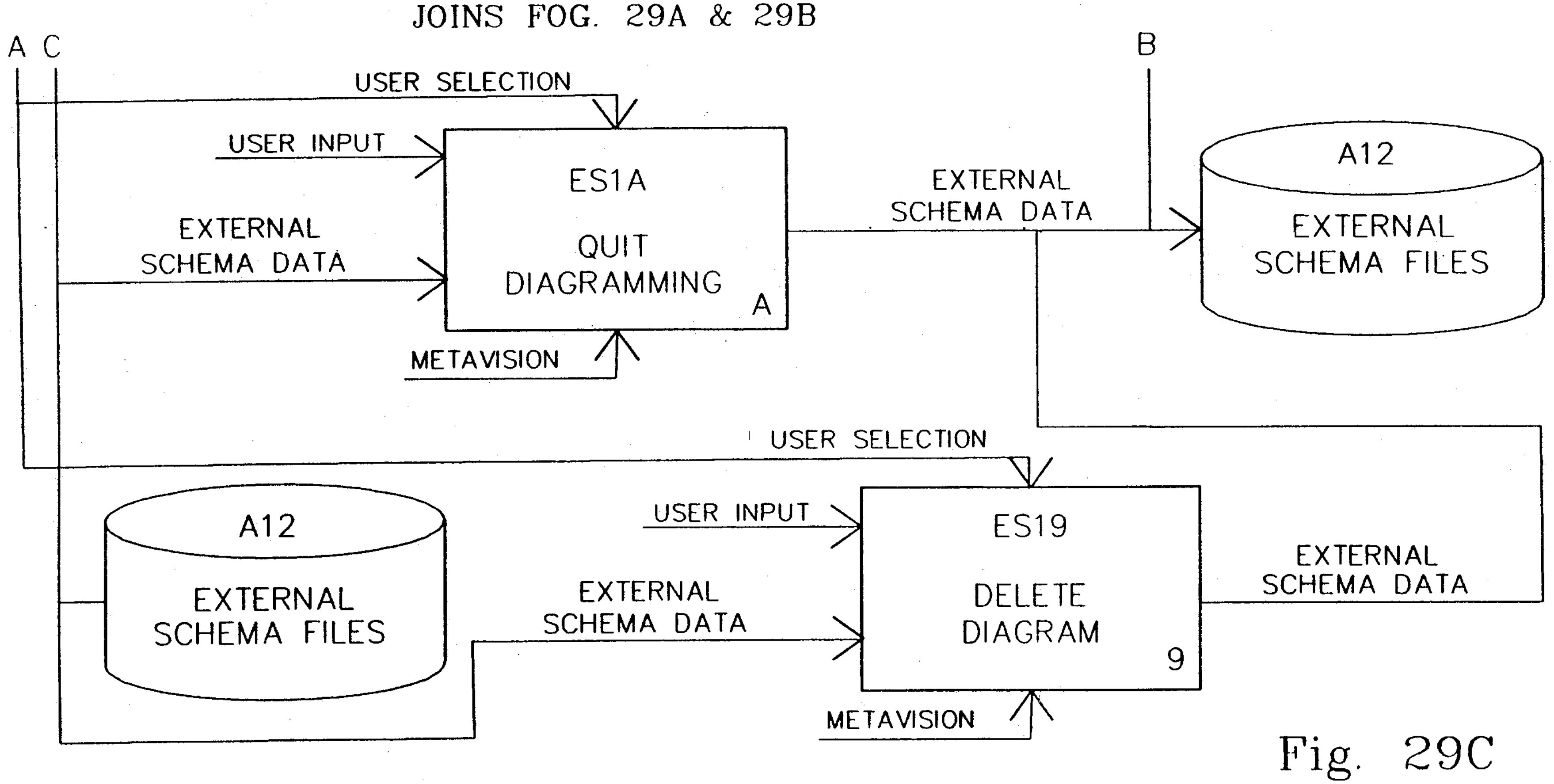

4 User Input
22 Program Flow
59 FTEXT.DBF Data
Free Text information
96 Icon Type
125 CS Record Data
126 CS Record Key Data
127 CS Constraint Data The functions of the DIAGRAM Pull Down Menu are accessed according to the following steps and as illustrated in FIG. 29, the External Schema DIAGRAM data flow diagram.

ES11 Process DIAGRAM Pull Down Menu

The functions of the DIAGRAM Pull Down Menu are controlled.

ES12 OPEN Existing Diagram

The information for the diagram is read from the External Schema Files and stored in linked lists in memory. The diagram is then drawn.

ES13 Open NEW Diagram

The information for the new diagram is read from the External Schema Files and stored in linked lists in memory. The diagram is then drawn.

ES14 EDIT Diagram Data

The basic information about the diagram that is kept in PICT.DBF can be changed by selecting Edit from the Diagram Pull Down Menu.

ES15 COPY A Schema

A new External Schema may be created by copying an existing Conceptual or External Schema chosen from a selection list.

ES16 SAVE Diagram

Save copies the Current Diagram files to the Backup Diagram Diagram files. The diagram is not closed.

ES17 UNDO Changes

The diagram is closed and Undo copies the Backup Diagram files to the Current Diagram files. All changes to every diagram since the last Save are lost.

ES18 CLOSE Diagram

The Save/Undo/Exit choice box is displayed. Save copies the Current files to the Backup files. Undo copies the Backup files to the Current files. Exit does not copy files. The diagram is closed.

ES19 DELETE Diagram

After selecting the diagram to delete from the list of diagrams from PICT.DBF, the External Schema Data for the selected diagram is deleted in all files. This is a logical delete.

ES1A QUIT Diagramming

The Save/Undo/Exit choice is displayed. Save copies the Current files to the Backup files. Undo copies the Backup files to the Current files. Exit does not copy files. Activity Selection List is next.

During the performance of the External Schema DIAGRAM steps, input and output data consisting of the following reports, forms and data packets are entered or generated.

Figure 30A:
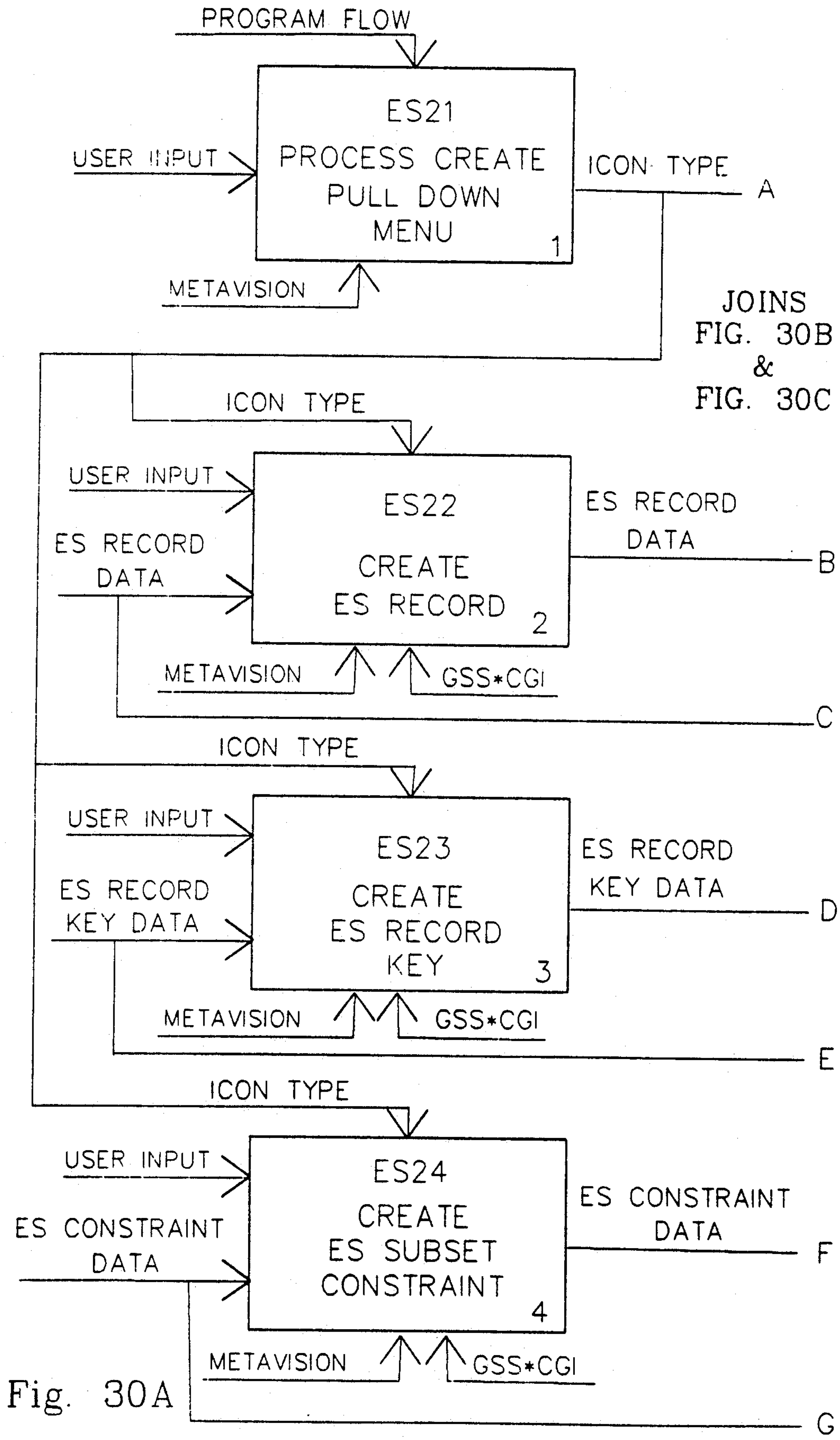
FIGS. 30A, 30B and 30C make up for FIG. 30 which is the External Schema CREATE data flow diagram.
Figure 30B:
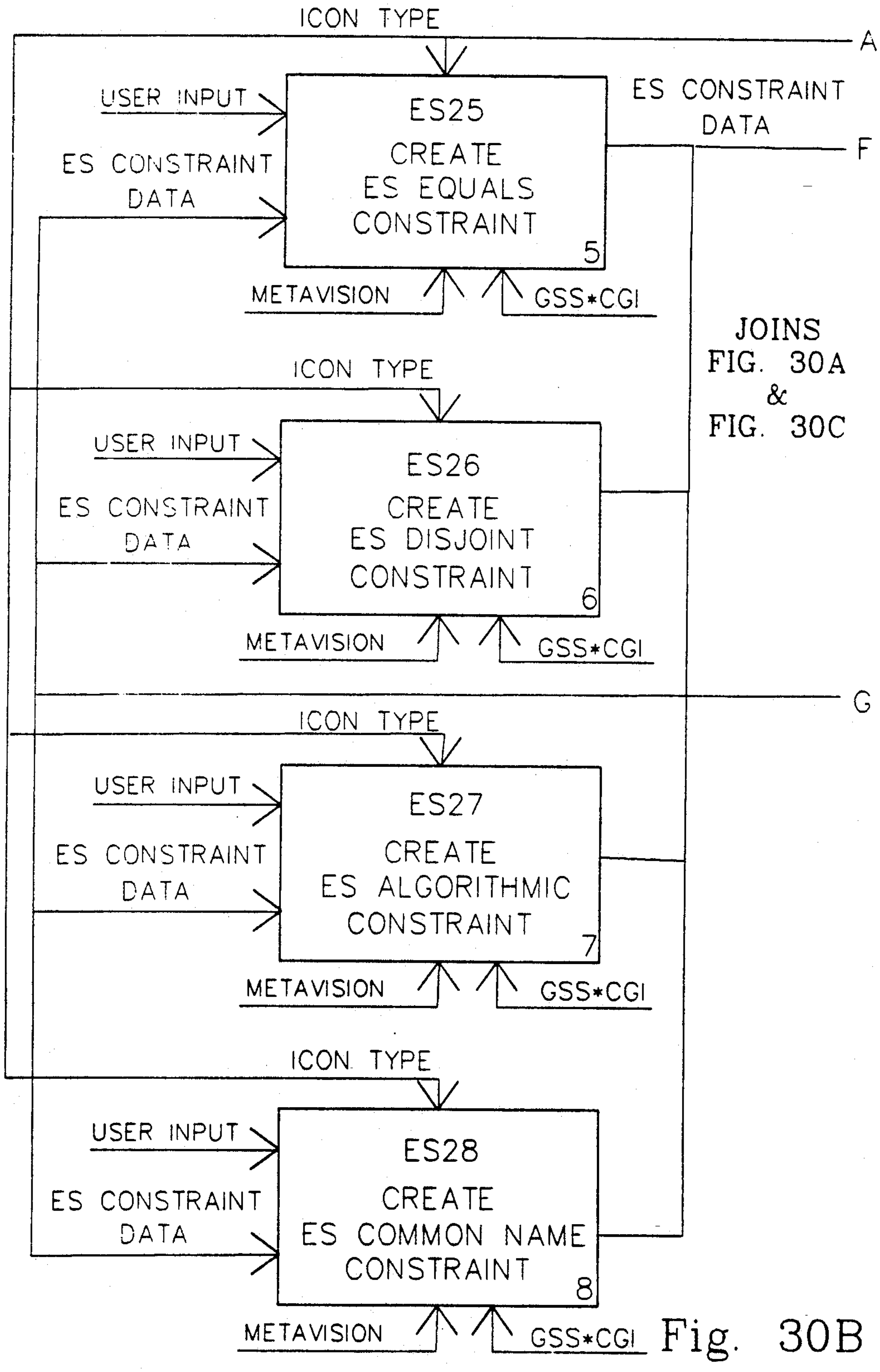
Figure 30C:
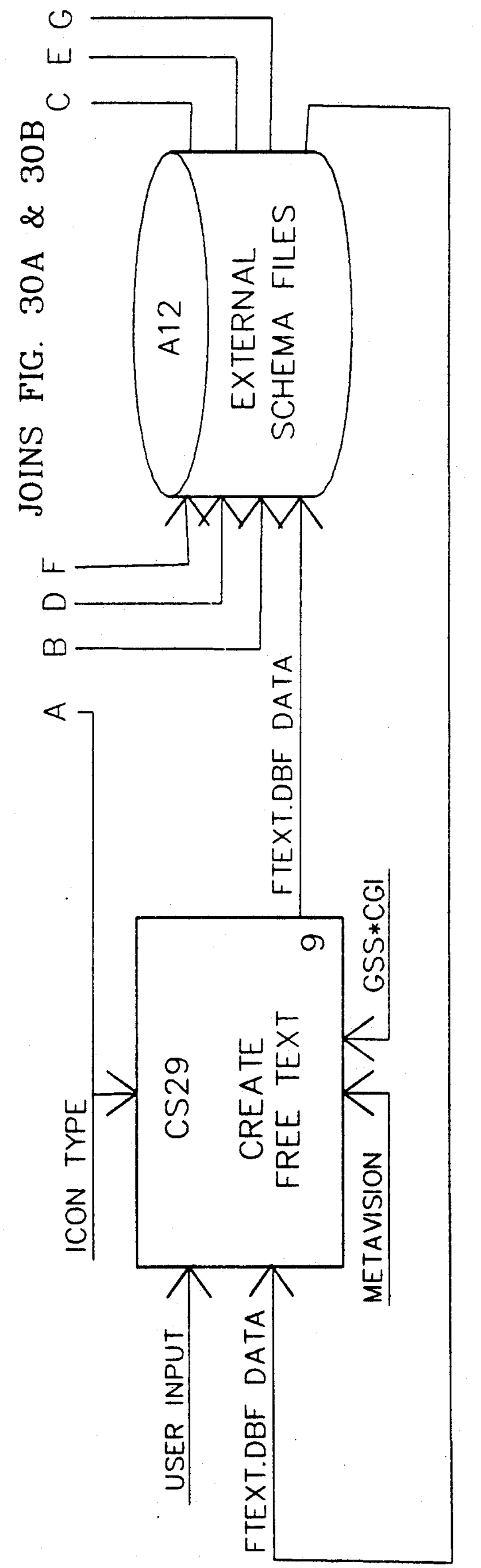

4 User Input
22 Program Flow
94 User Selection
120 External Schema Data The External Schema CREATE routine executes the functions of the CREATE Pull Down menu on an External Schema or Business Information Diagram according to the following steps and as illustrated in FIG. 30, the External Schema CREATE data flow diagram.

ES21 Process CREATE Pull Down Menu

The processing that occurs when an Icon is chosen from the CREATE Pull Down Menu is controlled by this process.

ES22 Create ES Record

A Record is created by selecting the Record Icon, positioning it on the screen, entering the required Record and Field information, and drawing the Record.

ES23 Create ES Record Key

A Record Key is created by selecting the double headed Arrow Icon, selecting the first Record Field, entering the required information, selecting any other Fields, and drawing the Arrow.

ES24 Create ES Subset Constraint

Select the Subset Icon, the Superset Record & Fields, enter the required information, select the Subset Record & Fields, route & draw the Constraint. Must be between fields with same Common ID.

ES25 Create ES Equals Constraint

Select the Equals Icon, the first Record & Fields, enter the required information, select the second Record & Fields, rout & draw the constraint. Must be between fields with the same Common ID.

ES26 Create ES Disjoint Constraint

Select the Disjoint Icon, the first Record & Fields, enter the required information, select the second Record & Fields, route & draw the constraint. Must be between fields with same Common ID.

ES27 Create ES Algorithmic Constraint

Select the Algorithmic Constraint Icon, the first Record & Fields, enter the required information, select the second Record & Fields, route & draw the constraint. May be between any fields.

ES28 Create ES Common Name Constraint

Select the Common Name Constraint Icon, the first Record & Fields, enter the required information, select the second Record & Fields, route & draw the constraint. May be between any fields.

ES29 Create Free Text

After opening an External Schema, Free Text is created by selecting the word TEXT, positioning it on the screen, entering the required information, and drawing the Text.

During the performance of the External Schema CREATE steps, input and output data consisting of the following reports, forms and data packets are entered or generated.

Figure 31A:
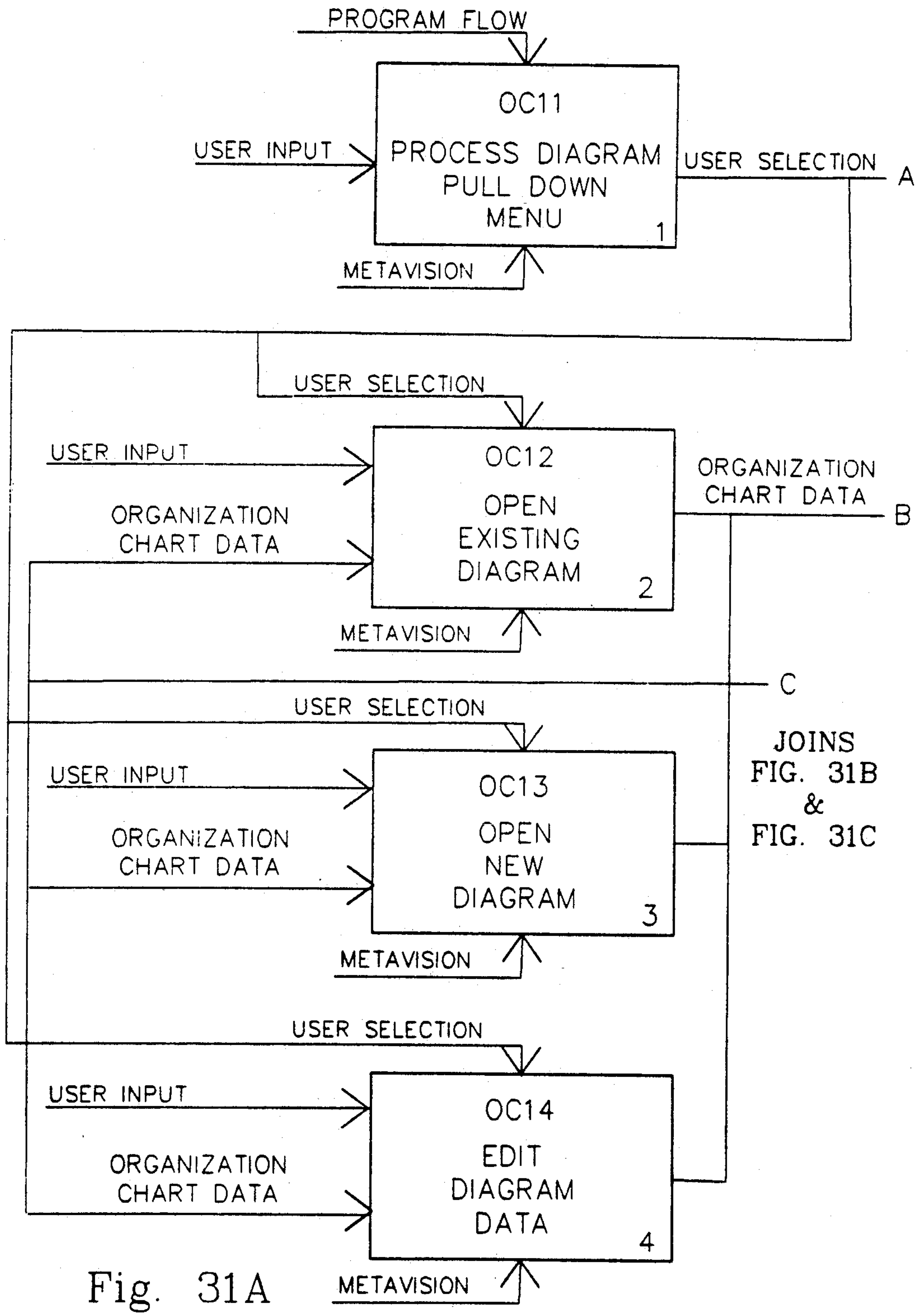
FIGS. 31A, 31B and 31C make up for FIG. 31 which is the Organization Chart DIAGRAM data flow diagram.
Figure 31B:
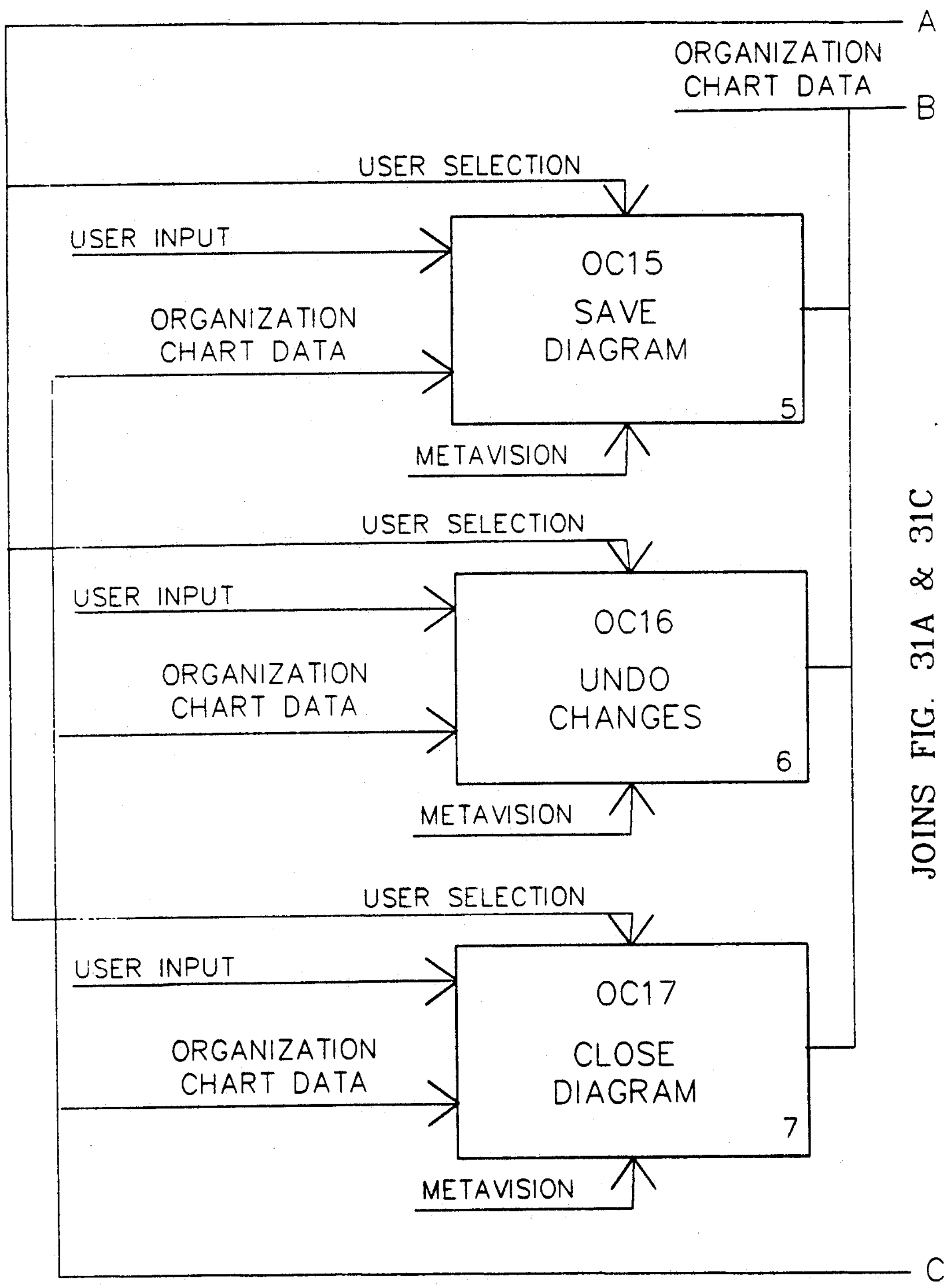
Figure 31C:
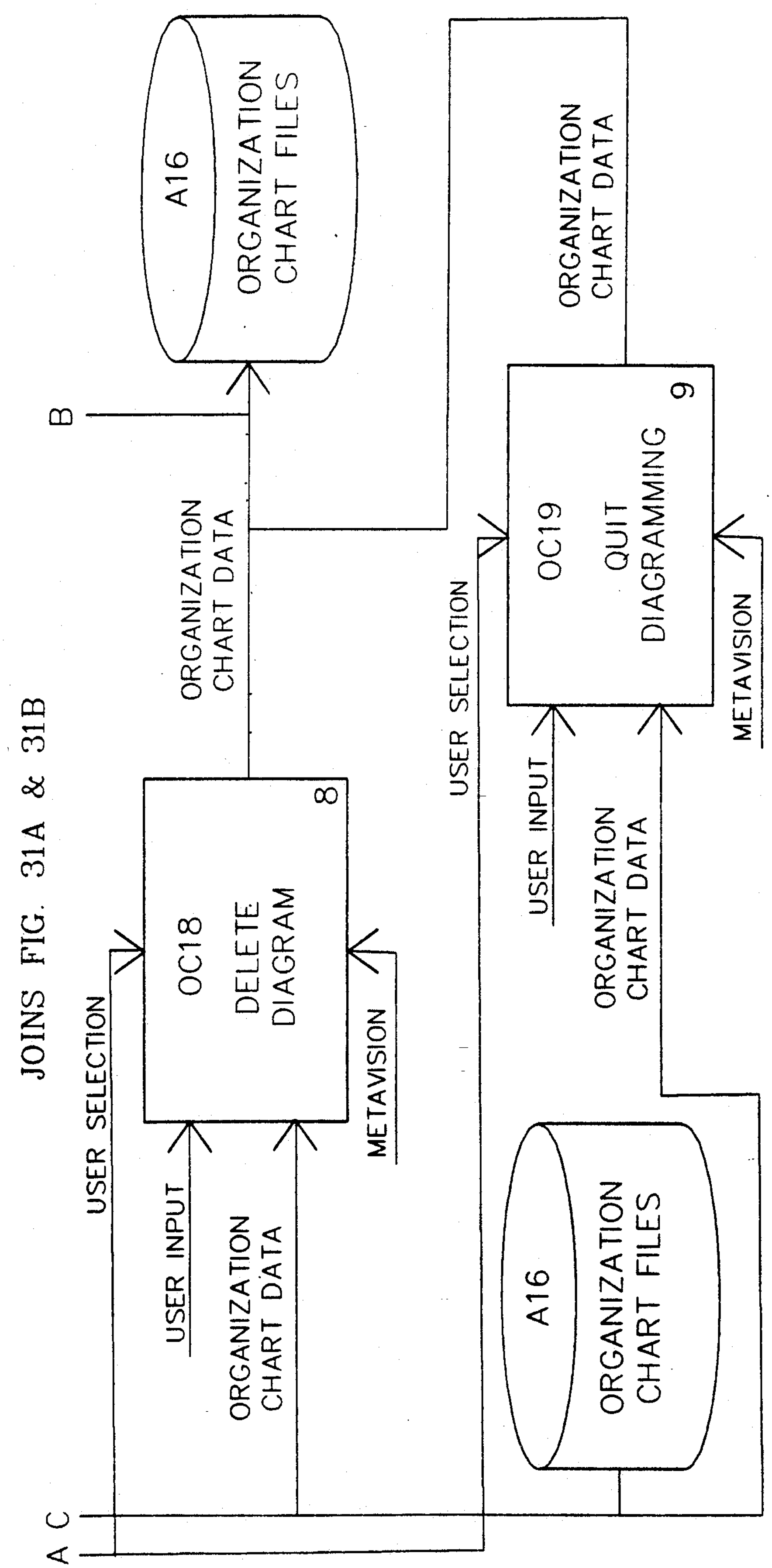

4 User Input
22 Program Flow
59 FTEXT.DBF Data
Free Text information
96 Icon Type
128 ES Record Data
129 ES Record Key Data
130 ES Constraint Data The functions of the DIAGRAM Pull Down Menu are accessed according to the following steps and as illustrated in FIG. 31, the Organization Chart DIAGRAM data flow diagram.

OC11 Process DIAGRAM Pull Down Menu

The functions of the DIAGRAM Pull Down Menu are controlled.

OC12 OPEN Existing Diagram

The information for the diagram is read from the Organization Chart Files and stored in linked lists in memory. The diagram is then drawn.

OC13 Open NEW Diagram

The information for the new diagram is read from the Organization Chart Files and stored in linked lists in memory. The diagram is then drawn.

OC14 EDIT Diagram Data

The basic information about the diagram that is kept in PICT.DBF can be changed by selecting Edit from the Diagram Pull Down Menu.

OC15 SAVE Diagram

Save copies the Current Diagram files to the Backup Diagram Diagram files. The diagram is not closed.

OC16 UNDO Changes

The diagram is closed and Undo copies the Backup Diagram files to the Current Diagram files. All changes to every diagram since the last Save are lost.

OC17 CLOSE Diagram

The Save/Undo/Exit choice box is displayed. Save copies the Current files to the Backup files. Undo copies the Backup files to the Current files. Exit does not copy files. The diagram is closed.

OC18 DELETE Diagram

After selecting the diagram to delete from the list of diagrams from PICT.DBF, the Conceptual Schema Data for the selected diagram is deleted in all files. This is a logical delete.

OC19 QUIT Diagramming

The Save/Undo/Exit choice is displayed. Save copies the Current files to the Backup files. Undo copies the Backup files to the Current files. Exit does not copy files. Activity Selection List is next.

During the performance of the Organization Chart DIAGRAM steps, input and output data consisting of the following reports, forms and data packets are entered or generated.

Figure 32A:
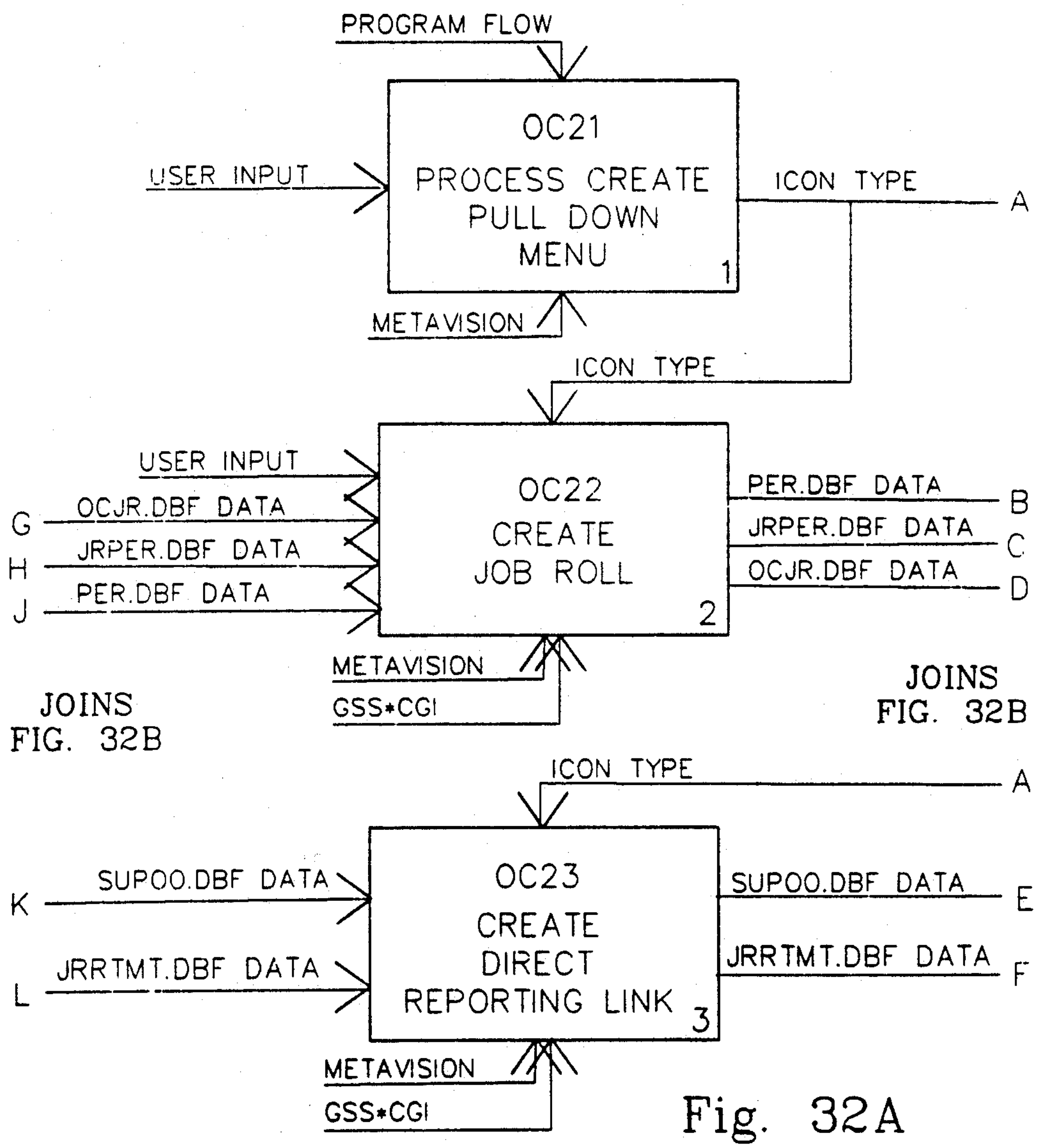
FIGS. 32A and 32B make up for FIG. 32 which is the Organization Chart CREATE data flow diagram.
Figure 32B:
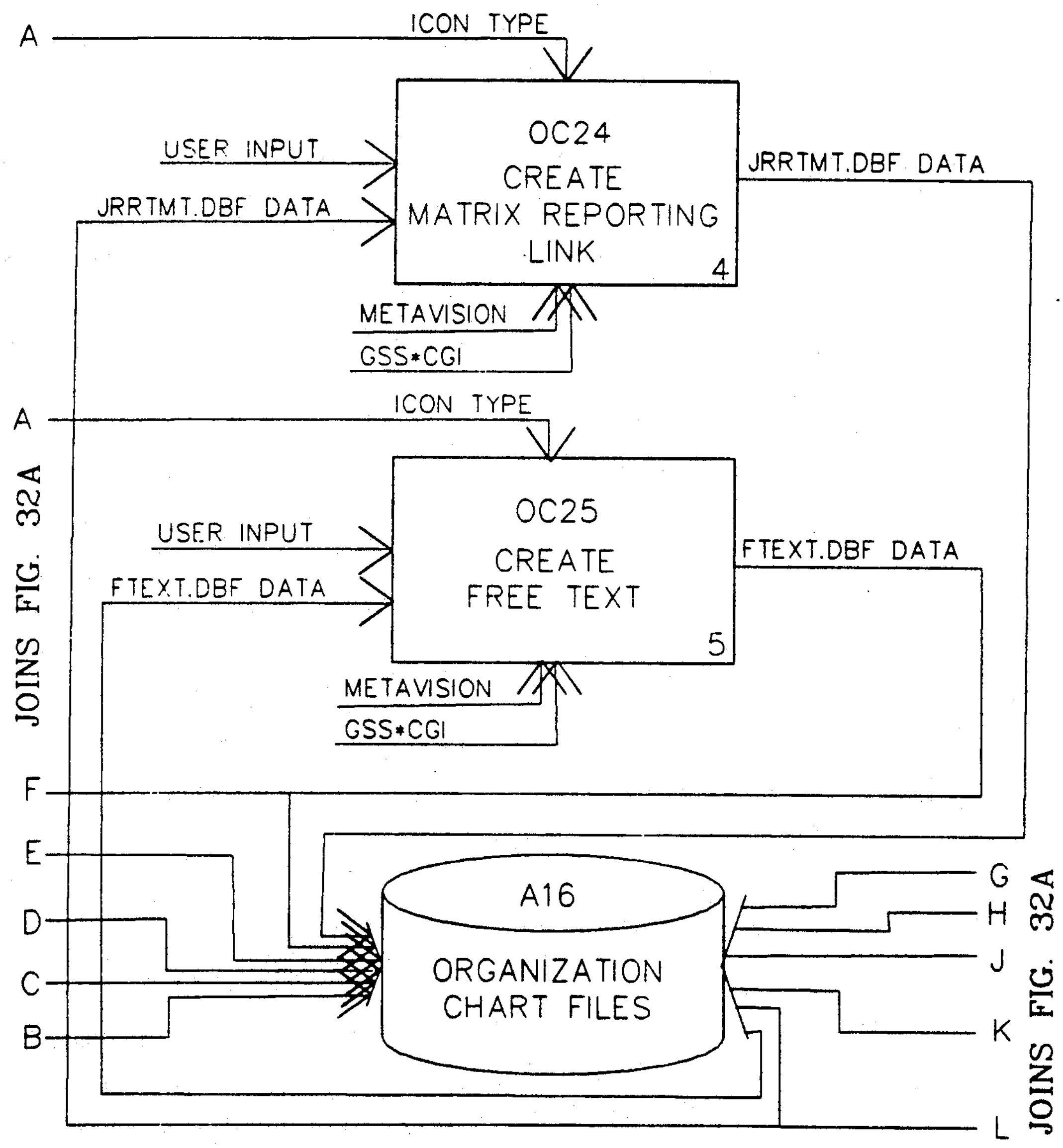

4 User Input
22 Program Flow
94 User Selection
122 Organization Chart Data The Organization Chart CREATE routine executes the functions of the CREATE Pull Down menu on an Organization Chart or System Organization Chart according to the following steps and as illustrated in FIG. 32, the Organization Chart CREATE data flow diagram.

OC21 Process CREATE Pull Down Menu
The processing that occurs when an Icon is chosen from the CREATE Pull Down Menu is controlled by this process.
OC22 Create Job Role
A Job Role is created by selecting the Job Role Icon, positioning it on the screen, entering the required information, and drawing the Job Role box.
OC23 Create Direct Reporting Link
Select the first Job Role, enter the required information, select the second Job Role, and route and draw the Direct Reporting Link.
OC24 Create Matrix Reporting Link
Select the first Job Role, enter the required information, select the second Job Role, and route and draw the Matrix Reporting Link.
OC25 Create Free Text
After opening an Organization Chart, Free Text is created by selecting the word TEXT, positioning it on the screen, entering the required information, and drawing the Text.

During the performance of the Organization Chart CREATE steps, input and output data consisting of the following reports, forms and data packets are entered or generated.

Figure 33A:
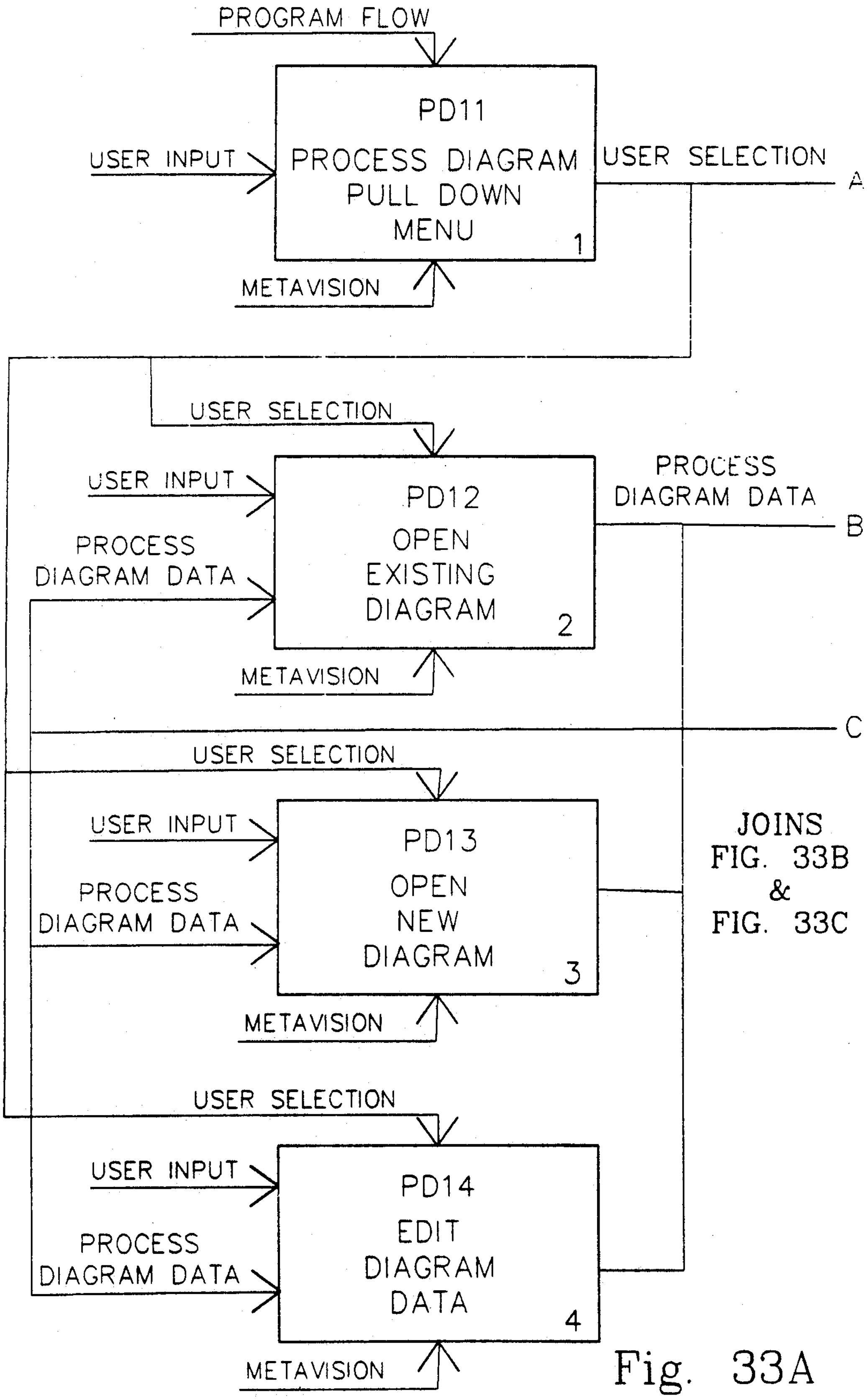
FIGS. 33A, 33B and 33C make up for FIG. 33 which is the Process Diagram DIAGRAM data flow diagram.
Figure 33B:
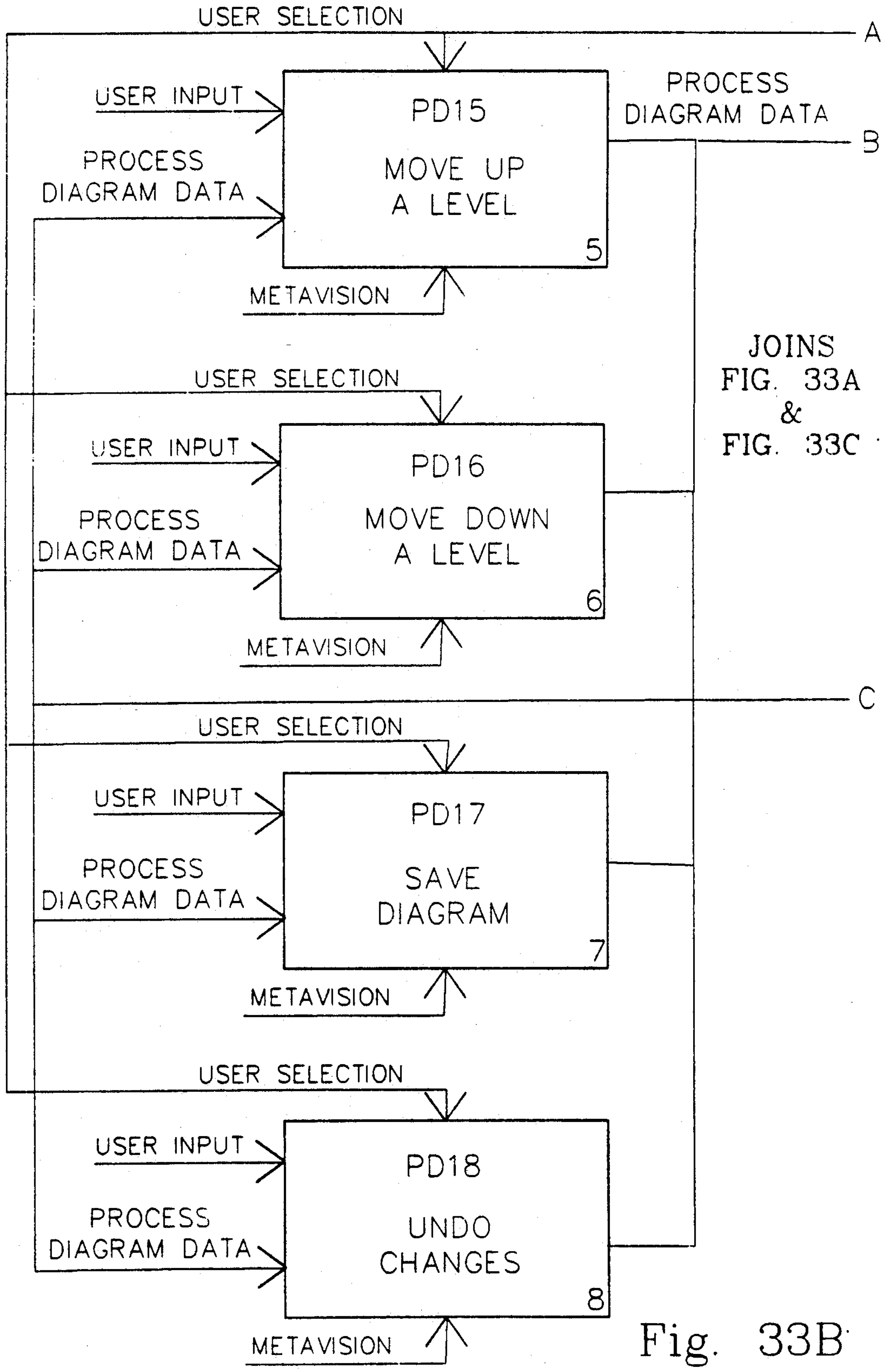
Figure 33C:
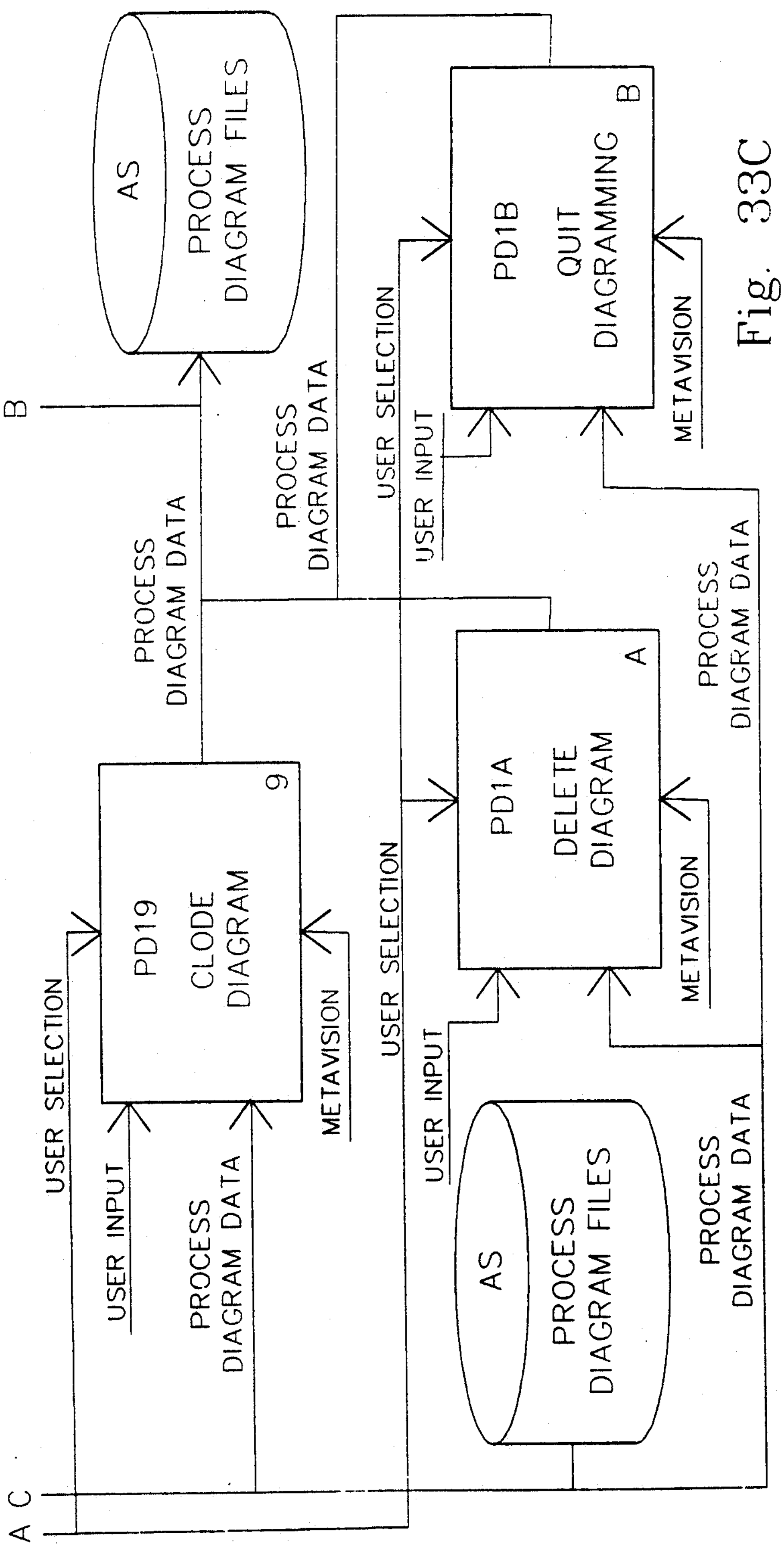

4 User Input
22 Program Flow
36 PER.DBF Data
Support information
49 SUPOO.DBF Data
Support to Support relation
56 OCJR.DBF Data
Org. Chart Job Role location
57 JRPER.DBF Data
Job Role Person relation
58 JRRTMT.DBF Data
Job Role Reports To/Matrixed To information
59 FTEXT.DBF Data
Free Text information
96 Icon Type The functions of the DIAGRAM Pull Down Menu are accessed according to the following steps and as illustrated in FIG. 33, the Process Diagram DIAGRAM data flow diagram.

PD11 Process DIAGRAM Pull Down Menu
The functions of the DIAGRAM Pull Down Menu are controlled.
PD12 OPEN Existing Diagram
The information for the diagram is read from the Process Diagram Files and stored in linked lists in memory. The diagram is then drawn.
PD13 Open NEW Diagram
The information for the new diagram is read from the Process Diagram Files and stored in linked lists in memory. The diagram is then drawn.
PD14 EDIT Diagram Data
The basic information about the diagram that is kept in PICT.DBF can be changed by selecting Edit from the Diagram Pull Down Menu.
PD15 Move UP A Level
Move UP allows you to move up the hierarchy of Process Diagrams. If there is no Parent Diagram, it is created. You cannot move up from the top or "0" Level diagram.
PD16 Move DOWN A Level
Move DOWN allows you to decompose a Process into its subprocesses. You point and click to select the Process to decompose. A total of 21 levels are supported.
PD17 SAVE Diagram
Save copies the Current Diagram files to the Backup Diagram Diagram files. The diagram is not closed.
PD18 UNDO Changes
The diagram is closed and Undo copies the Backup Diagram files to the Current Diagram files. All changes to every diagram since the last Save are lost.
PD19 CLOSE Diagram
The Save/Undo/Exit choice box is displayed. Save copies the Current files to the Backup files. Undo copies the Backup files to the Current files. Exit does not copy files. The diagram is closed.
PD1A DELETE Diagram
After selecting the diagram to delete from the list of diagrams from PICT.DBF, the Process Diagram Data for the selected diagram is deleted in all files. This is a logical delete.
PD1B QUIT Diagramming
The Save/Undo/Exit choice is displayed. Save copies the Current files to the Backup files. Undo copies the Backup files to the Current files. Exit does not copy files. Activity Selection List is next.

During the performance of the Process Diagram DIAGRAM steps, input and output data consisting of the following reports, forms and data packets are entered or generated.

4 User Input
22 Program Flow
94 User Selection
113 Process Diagram Data
Information about a Process Diagram.

Figure 34A:
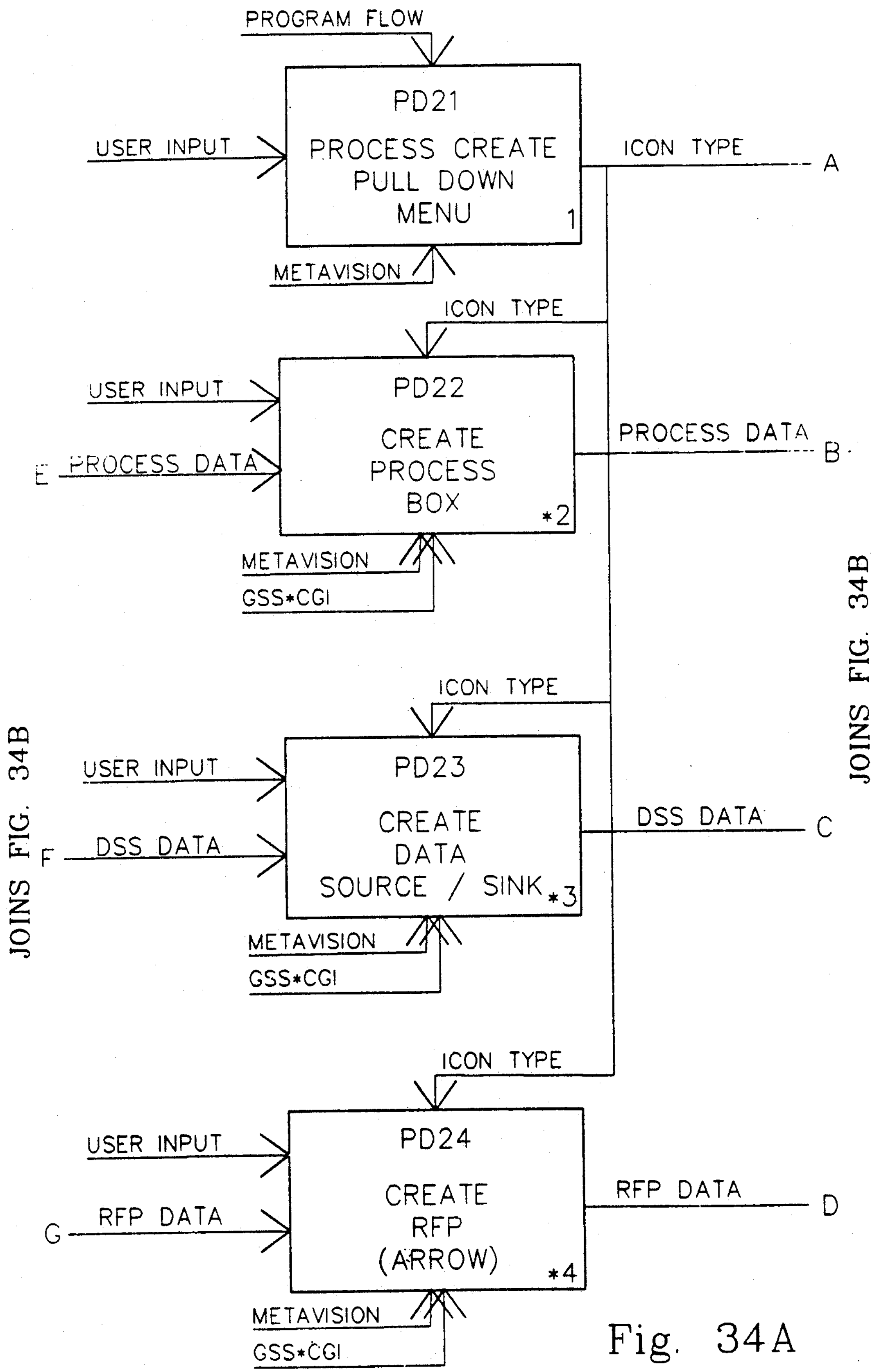
FIGS. 34A and 34B make up for FIG. 34 which is the Process Diagram CREATE data flow diagram.
Figure 34B:
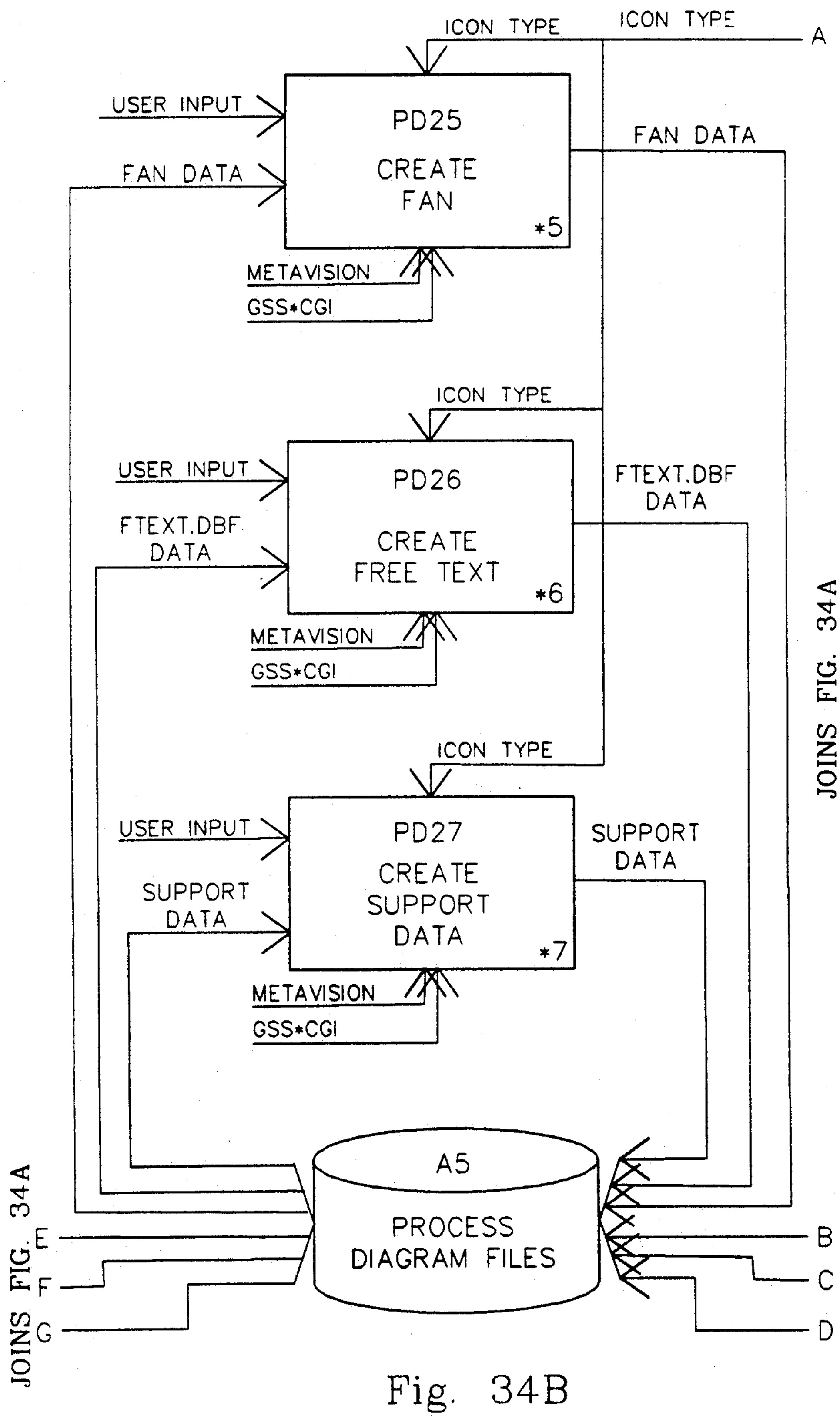

The Process Diagram CREATE routine executes the functions of the CREATE Pull Down menu on a Process Diagram according to the following steps and as illustrated in FIG. 34, the Process Diagram CREATE data flow diagram.

PD21 Process CREATE Pull Down Menu
The processing that occurs when an Icon is chosen from the CREATE Pull Down Menu is controlled by this process.
PD22 Create Process Box After opening a Process Diagram, a Process Box is created by selecting the Process Box Icon, positioning it on the screen, entering the required information, and drawing the Process Box.

PD23 Create Data Source/Sink

After opening a Process Diagram, a Data Source/-Sink is created by selecting the Data S/S Icon, positioning it on the screen, entering the required information, and drawing the Data S/S.

PD24 Create RFP (Arrow)

After opening a Process Diagram, an RFP is created by selecting the Arrow Icon, selecting the two end points for the Arrow, entering the required information, and routing and drawing the Arrow.

PD25 Create Fan

After opening a Process Diagram, a Fan is created by selecting the Fan-In or Fan-Out Icon, positioning it on the screen, entering the required information, and drawing the Fan.

PD26 Create Free Text

After opening a Process Diagram, Free Text is created by selecting the word TEXT, positioning it on the screen, entering the required information, and drawing the Text.

PD27 Create Support Data

After opening a Process Diagram, a Support is created by selecting the Arrow or one of the other Support Icons, selecting a Process, entering the required information, and drawing the Support.

During the performance of the Process Diagram CREATE steps, input and output data consisting of the following reports, forms and data packets are entered or generated.

4 User Input
22 Program Flow
59 FTEXT.DBF Data
Free Text information
96 Icon Type
105 Process Data
Information about a Process Box.
106 DSS Data
Information about a Data Source/Sink.
107 RFP Data
Information about RFP's and their connections.
108 Fan Data
Information about Fans.
109 Support Data
Information about Supports and their connections.

Figure 35A:
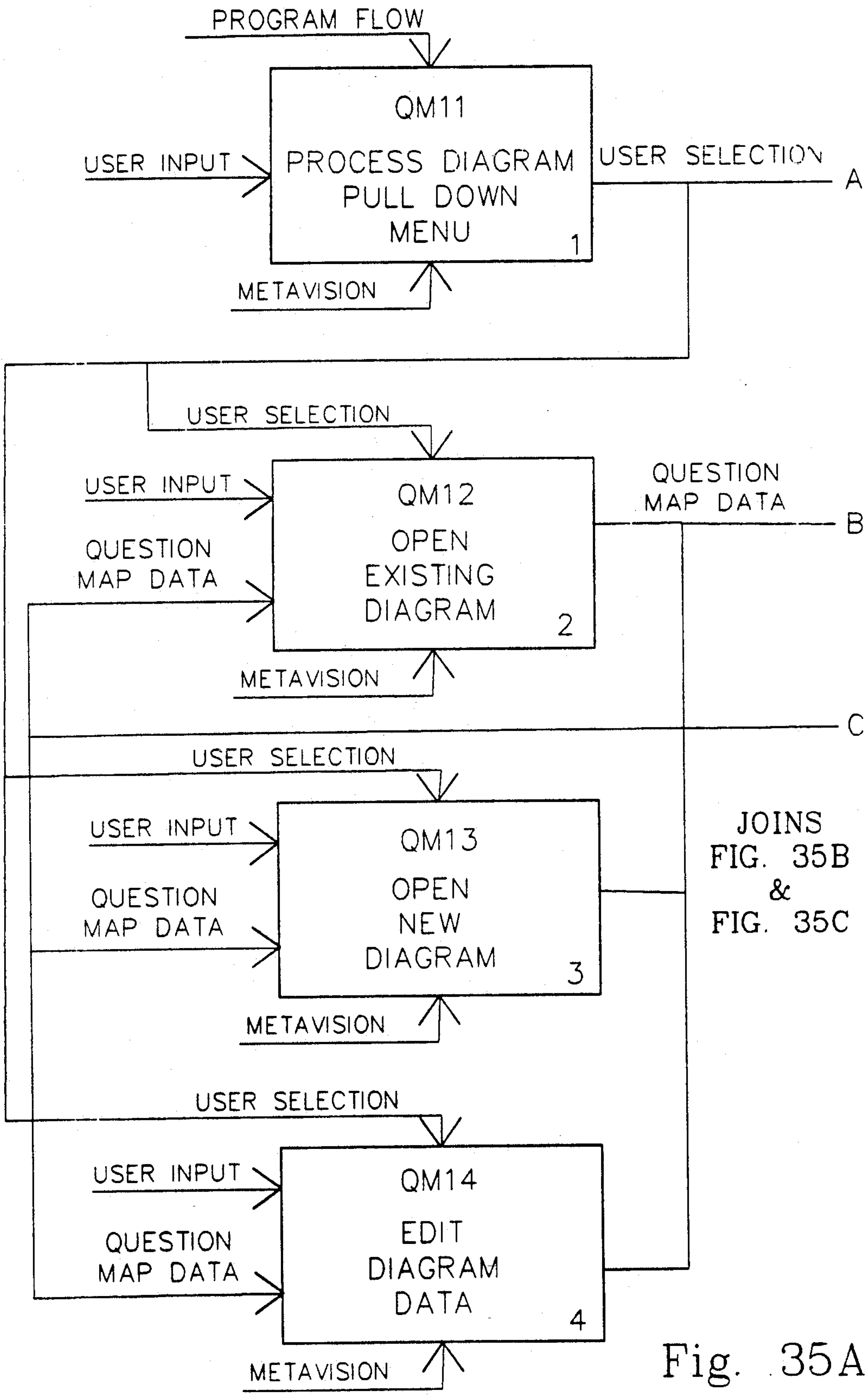
FIGS. 35A, 35B and 35C make up for FIG. 35 which is the Question Map DIAGRAM data flow diagram.
Figure 35B:
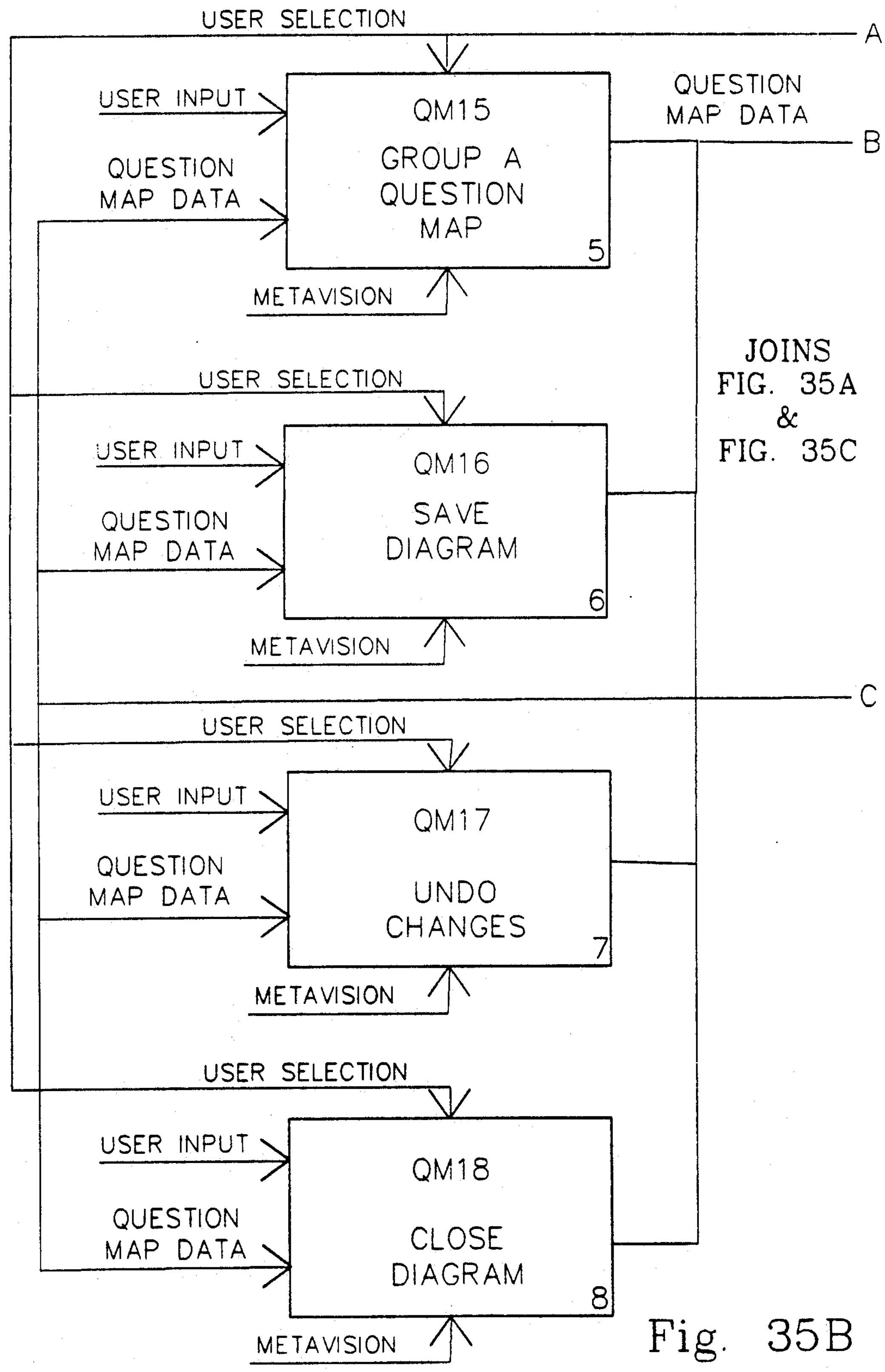
Figure 35C:
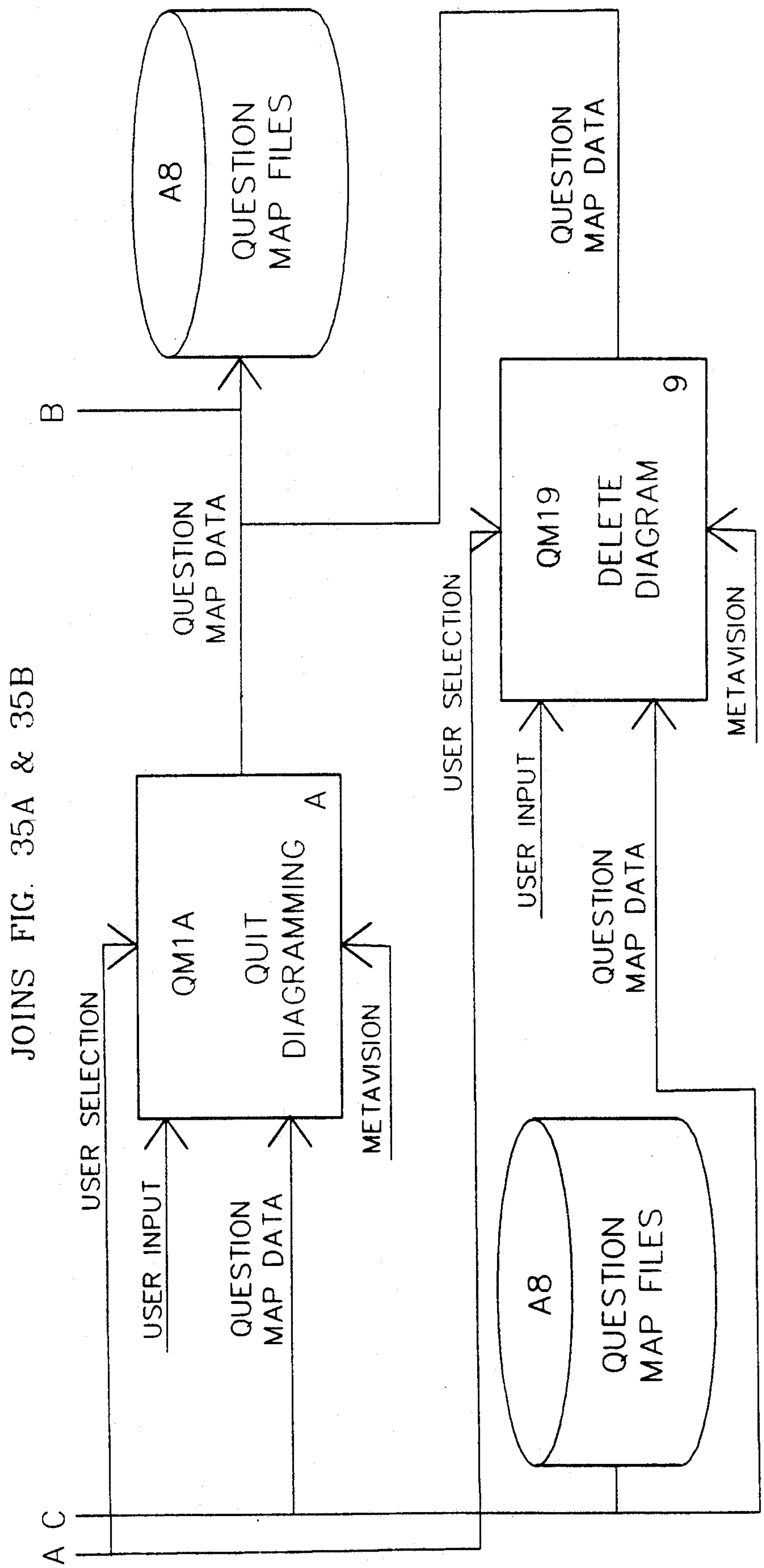

The functions of the DIAGRAM Pull Down Menu are accessed according to the following steps and as illustrated in FIG. 35, the Question Map DIAGRAM data flow diagram.

QM11 Process DIAGRAM Pull Down Menu

The functions of the DIAGRAM Pull Down Menu are controlled.

QM12 OPEN Existing Diagram

The information for the diagram is read from the Question Map Files and stored in linked lists in memory. The diagram is then drawn.

QM13 Open NEW Diagram

The information for the new diagram is read from the Question Map Files and stored in linked lists in memory. The diagram is then drawn.

QM14 EDIT Diagram Data

The basic information about the diagram that is kept in PICT.DBF can be changed by selecting Edit from the Diagram Pull Down Menu.

QM15 GROUP A Question Map

The 5th Normal Form Sentences are combined into a 3rd Normal Form Conceptual Schema based on the Uniqueness and Equality Constraints within and between the sentences. Contexts are expanded if desired.

QM16 SAVE Diagram

Save copies the Current Diagram files to the Backup Diagram Diagram files. The diagram is not closed.

QM17 UNDO Changes

The diagram is closed and Undo copies the Backup Diagram files to the Current Diagram files. All changes to every diagram since the last Save are lost.

QM18 CLOSE Diagram

The Save/Undo/Exit choice box is displayed. Save copies the Current files to the Backup files. Undo copies the Backup files to the Current files. Exit QM19 DELETE Diagram After selecting the diagram to delete from the list of diagrams from PICT.DBF, the Question Map Data for the selected diagram is deleted in all files. This is a logical delete.

QM1A QUIT Diagramming

The Save/Undo/Exit choice is displayed. Save copies the Current files to the Backup files. Undo copies the Backup files to the Current files. Exit does not copy files. Activity Selection List is next.

During the performance of the Question Map DIAGRAM steps, input and output data consisting of the following reports, forms and data packets are entered or generated.

Figure 36A:
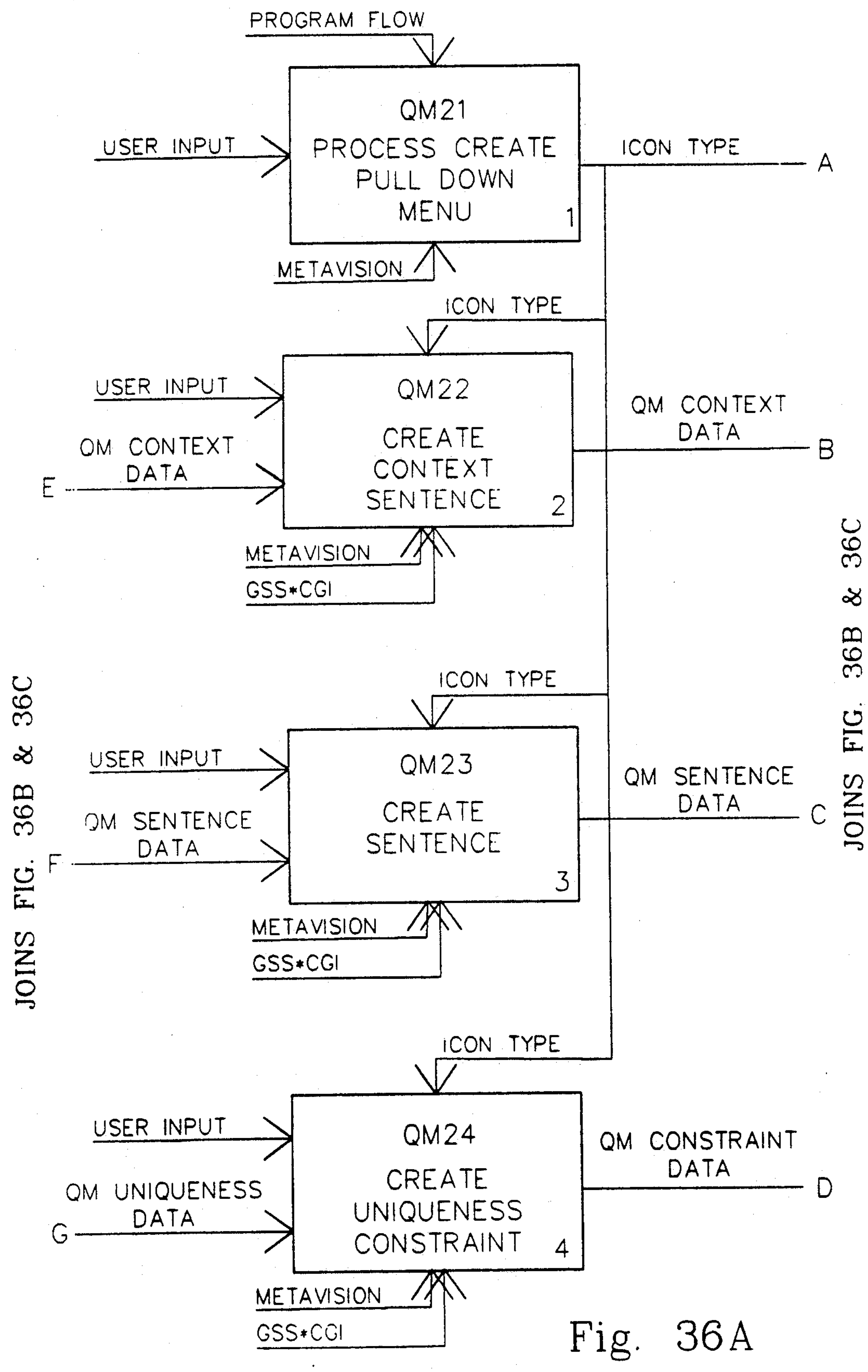
FIGS. 36A, 36B and 36C make up for FIG. 36 which is the Question Map CREATE data flow diagram.
Figure 36B:
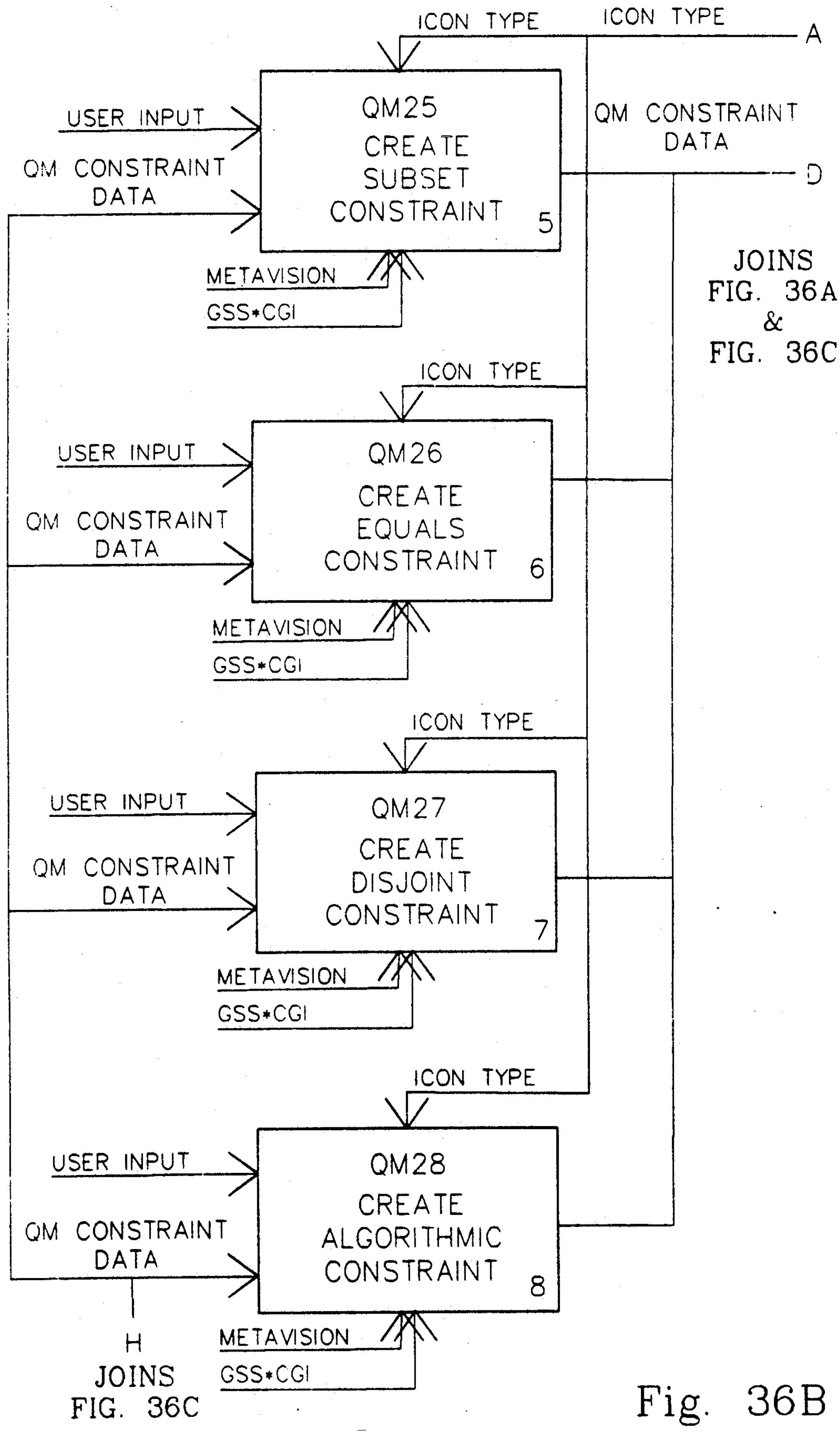
Figure 36C:
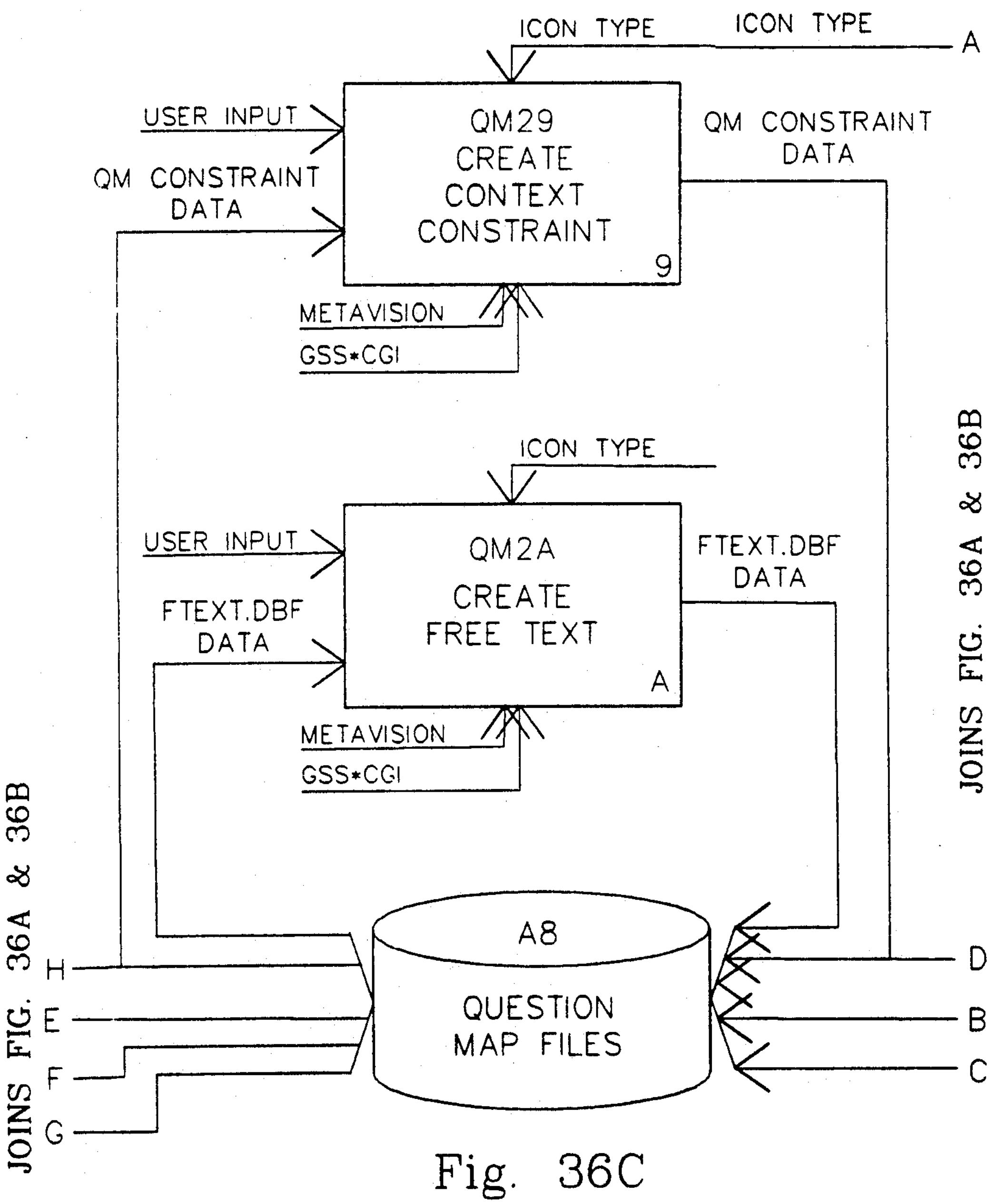

4 User Input
22 Program Flow
94 User Selection
118 Question Map Data The Question Map CREATE routine executes the functions of the CREATE Pull Down menu on a Question Map according to the following steps and as illustrated in FIG. 36, the Question Map CREATE data flow diagram.

QM21 Process CREATE Pull Down Menu

The processing that occurs when an Icon is chosen from the CREATE Pull Down Menu is controlled by this process.

QM22 Create Context Sentence

A Context Sentence is created by selecting the Context Sentence Icon, positioning it on the screen, entering the required Sentence and Field information, and drawing the Context Sentence.

QM23 Create Sentence

A Sentence is created by selecting the Sentence Icon, positioning it on the screen, entering the required Sentence and Field information, and drawing the Sentence.

QM24 Create Uniqueness Constraint

A Uniqueness Constraint is created by selecting the double headed Arrow Icon, selecting the first Sentence Field, entering the required information, selecting any other Fields, and drawing the Arrow.

QM25 Create Subset Constraint

Subset Constraint is created by selecting the Subset Icon, the Superset Sentence & Fields, entering the required information, selecting the Subset Sentence & Fields, routing & drawing the Constraint.

QM26 Create Equals Constraint

An Equals Constraint is created by selecting the Equals Icon, the first Sentence & Fields, entering the required information, selecting the second Sentence & Fields, routing & drawing the constraint.

QM27 Create Disjoint Constraint

Disjoint Constraint is created by selecting the Disjoint Icon, the first Sentence & Fields, entering the required information, selecting the

QM28 Create Algorithmic Constraint

Select the Algorithmic Constraint Icon, the first Sentence & Fields, enter the required information, select the second Sentence & Fields, route & draw the constraint. May be between any fields.

QM29 Create Context Constraint

QM2A Create Free Text

After opening a Question Map, Free Text is created by selecting the word TEXT, positioning it on the screen, entering the required information, and drawing the Text.

During the performance of the Question Map CREATE steps, input and output data consisting of the following reports, forms and data packets are entered or generated.

Figure 37A:
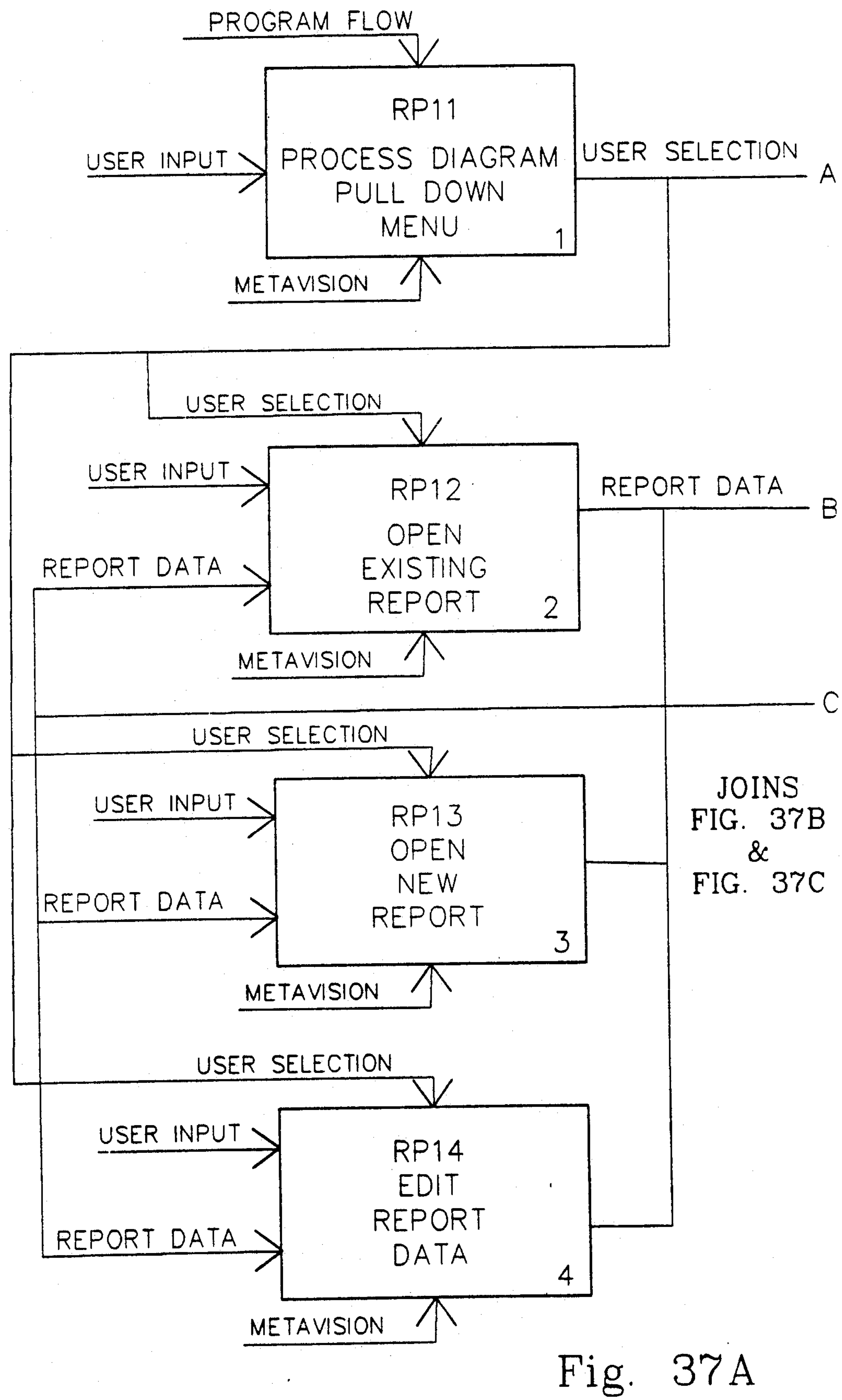
FIGS. 37A, 37B and 37C make up for FIG. 37 which is the Report Design DIAGRAM data flow diagram.
Figure 37B:
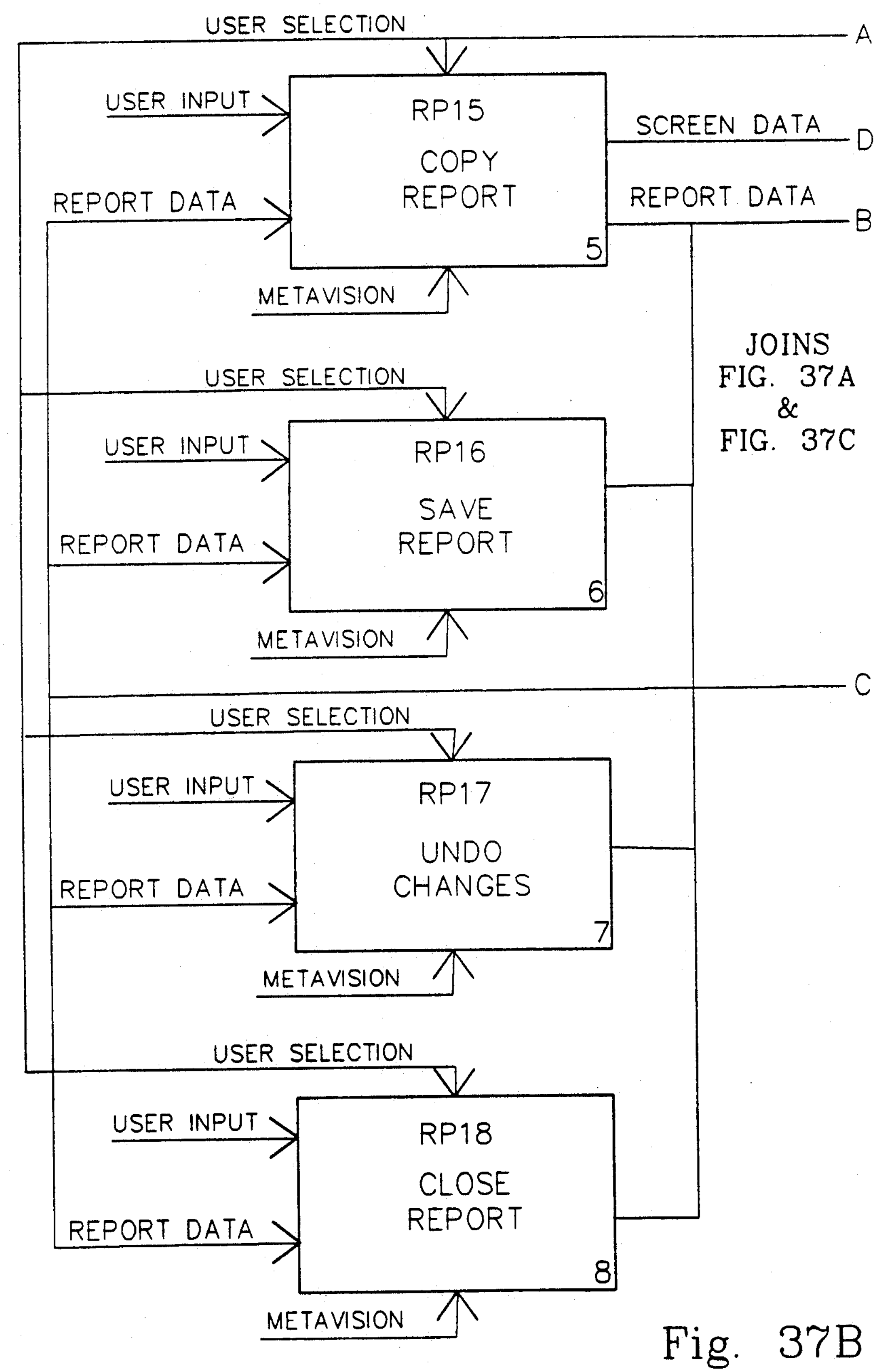
Figure 37C:
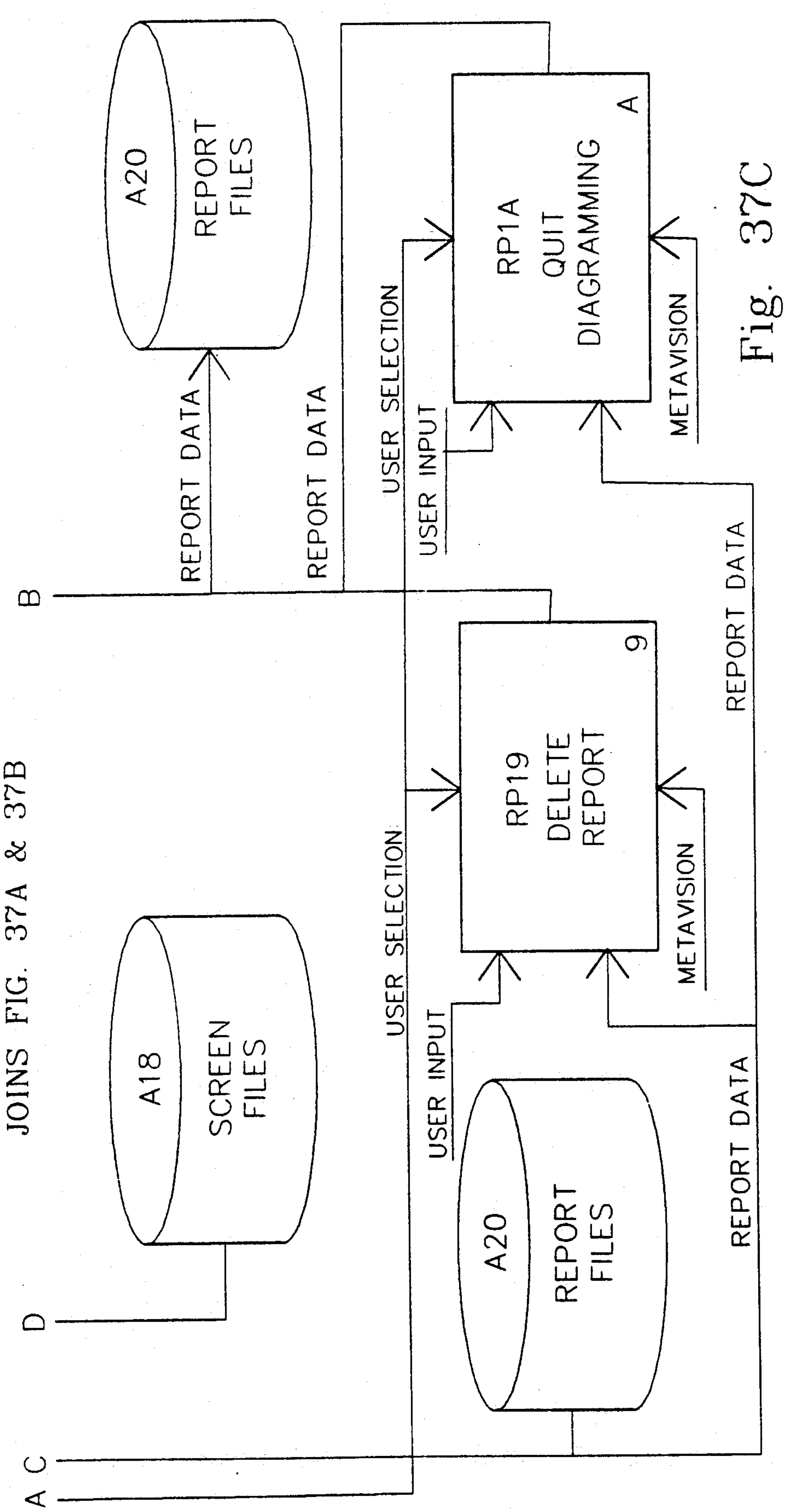

4 User Input
22 Program Flow
59 FTEXT.DBF Data
Free Text information
96 Icon Type
131 QM Sentence Data
132 QM Uniqueness Data
133 QM Constraint Data
134 QM Context Data The functions of the DIAGRAM Pull Down Menu are accessed according to the following steps and as illustrated in FIG. 37, the Report Design DIAGRAM data flow diagram.

RP11 Process DIAGRAM Pull Down Menu

The functions of the DIAGRAM Pull Down Menu are controlled.

RP12 OPEN Existing Report

The information for the diagram is read from the Report Files and stored in linked lists in memory. The Report Layout is then drawn.

RP13 Open NEW Report

The information for the new diagram is read from the Report Files and stored in linked lists in memory. The Report Layout is then drawn.

RP14 EDIT Report Data

The basic information about the diagram that is kept in PICT.DBF can be changed by selecting Edit from the Diagram Pull Down Menu.

RP15 COPY Report

A new Report or Screen may be created by copying an existing Report chosen from the selection list of all Reports.

RP16 SAVE Report

Save copies the Report Files to the Backup Report Files. The diagram is not closed.

RP17 UNDO Changes

The Report is closed and Undo copies the Backup Diagram files to the Current Diagram files. All changes to every diagram since the last Save are lost.

RP18 CLOSE Report

The Save/Undo/Exit choice box is displayed. Save copies the Current files to the Backup files. Undo copies the Backup files to the Current files. Exit does not copy files. The diagram is closed.

RP19 DELETE Report

After selecting the Report to delete from the list of Reports from PICT.DBF, the Report Data for the selected diagram is deleted in all files. This is a logical delete.

RP1A QUIT Diagramming

The Save/Undo/Exit choice is displayed. Save copies the Current files to the Backup files. Undo copies the Backup files to the Current files. Exit does not copy files. Activity Selection List is next.

During the performance of the Report Design DIAGRAM steps, input and output data consisting of the following reports, forms and data packets are entered or generated.

Figure 38A:
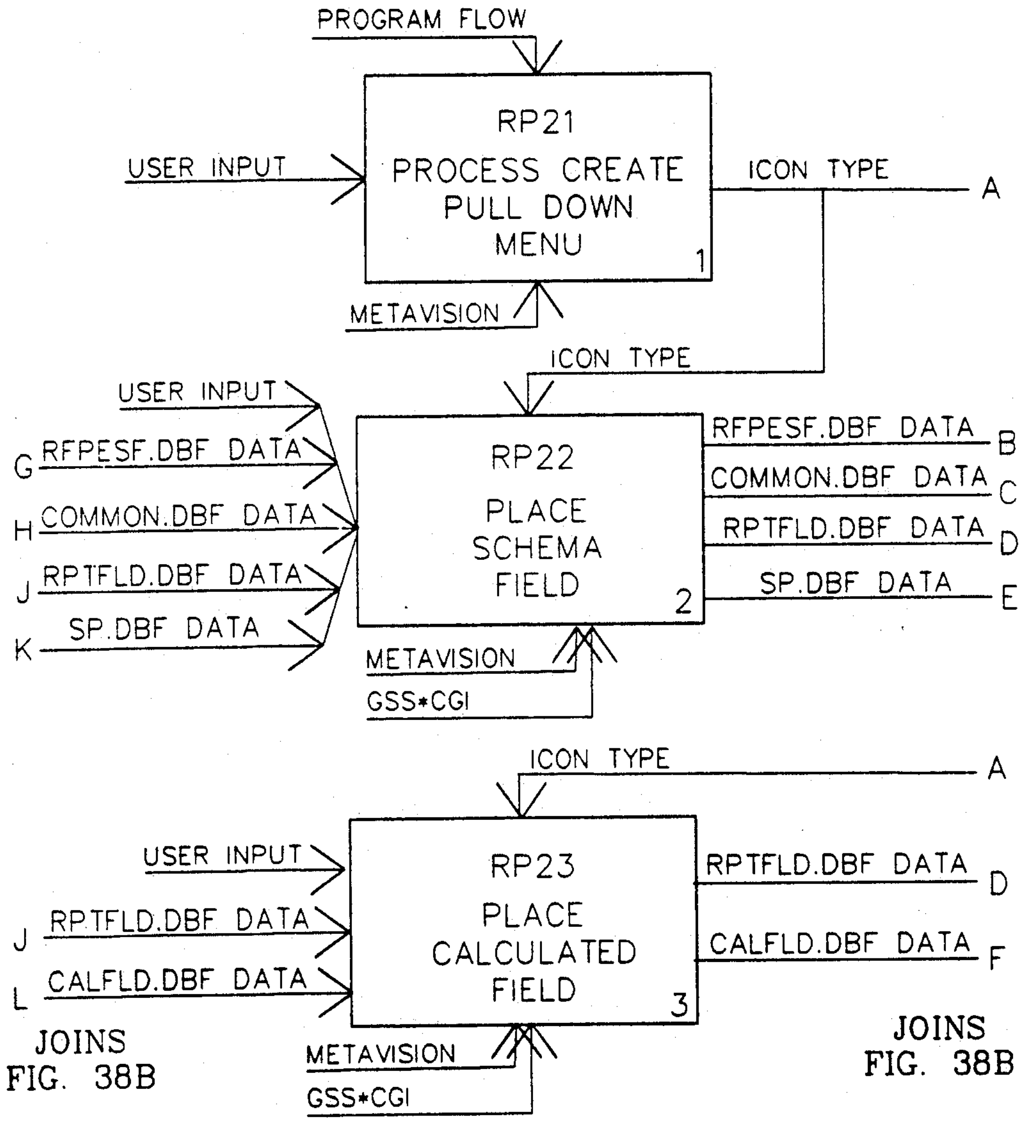
FIGS. 38A and 38B make up for FIG. 38 which is the Report Design CREATE data flow diagram.
Figure 38B:
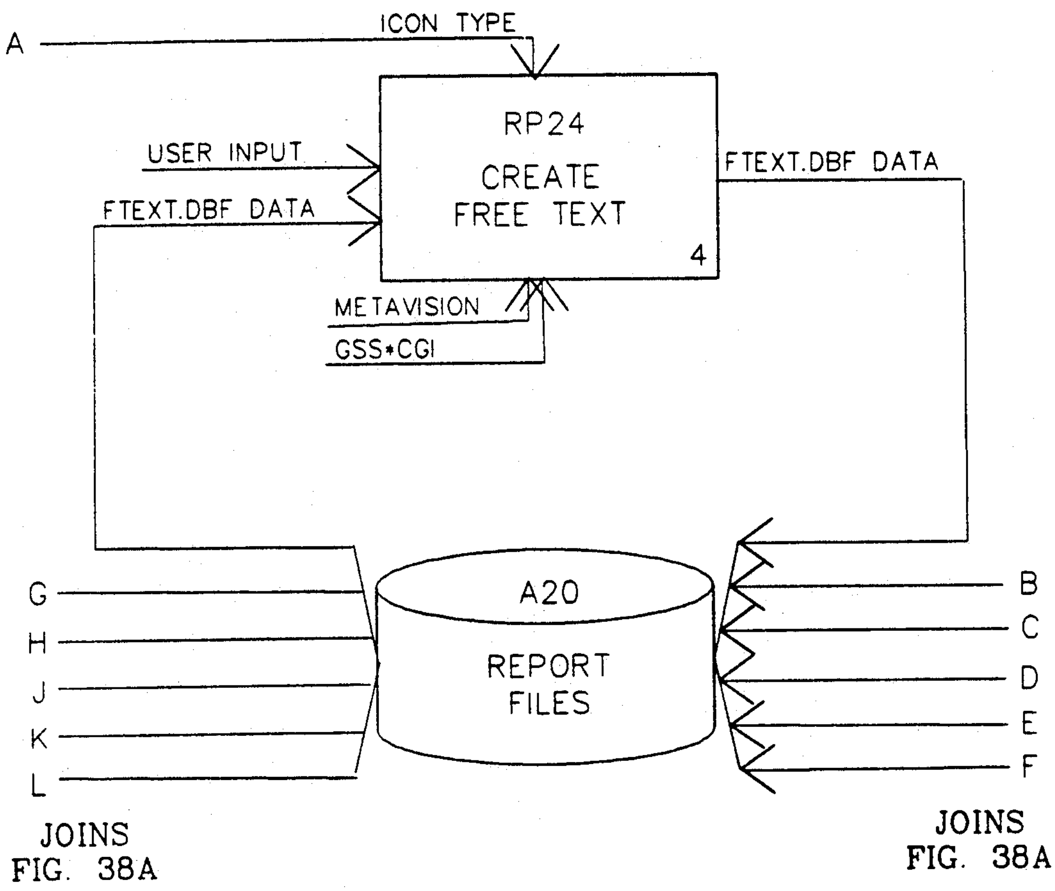

4 User Input
22 Program Flow
94 User Selection
152 Screen Data
153 Report Data The Report Design CREATE routine executes the functions of the CREATE Pull Down menu on a Report according to the following steps and as illustrated in FIG. 38, the Report Design CREATE data flow diagram.

RP21 Process CREATE Pull Down Menu

The processing that occurs when an Icon is chosen from the CREATE Pull Down Menu is controlled by this process.

RP22 Place Schema Field

Select the Field Icon, position the Field Label and the Field, choose the field from the Schema Record List, enter the required information, and draw the Field and Label.

RP23 Place Calculated Field

Select the Calc. Icon, position the Field Label and the Field, enter the required information, and draw the Field and Label. New or previously defined Calculated Fields may be used.

RP24 Create Free Text

After opening a Report, Free Text is created by selecting the word TEXT, positioning it on the screen, entering the required information, and drawing the Text.

During the performance of the Report Design CREATE steps, input and output data consisting of the following reports, forms and data packets are entered or generated.

3 SP.DBF Data
Role/Field Information
4 User Input
22 Program Flow
59 FTEXT.DBF Data
Free Text information

Figure 39A:
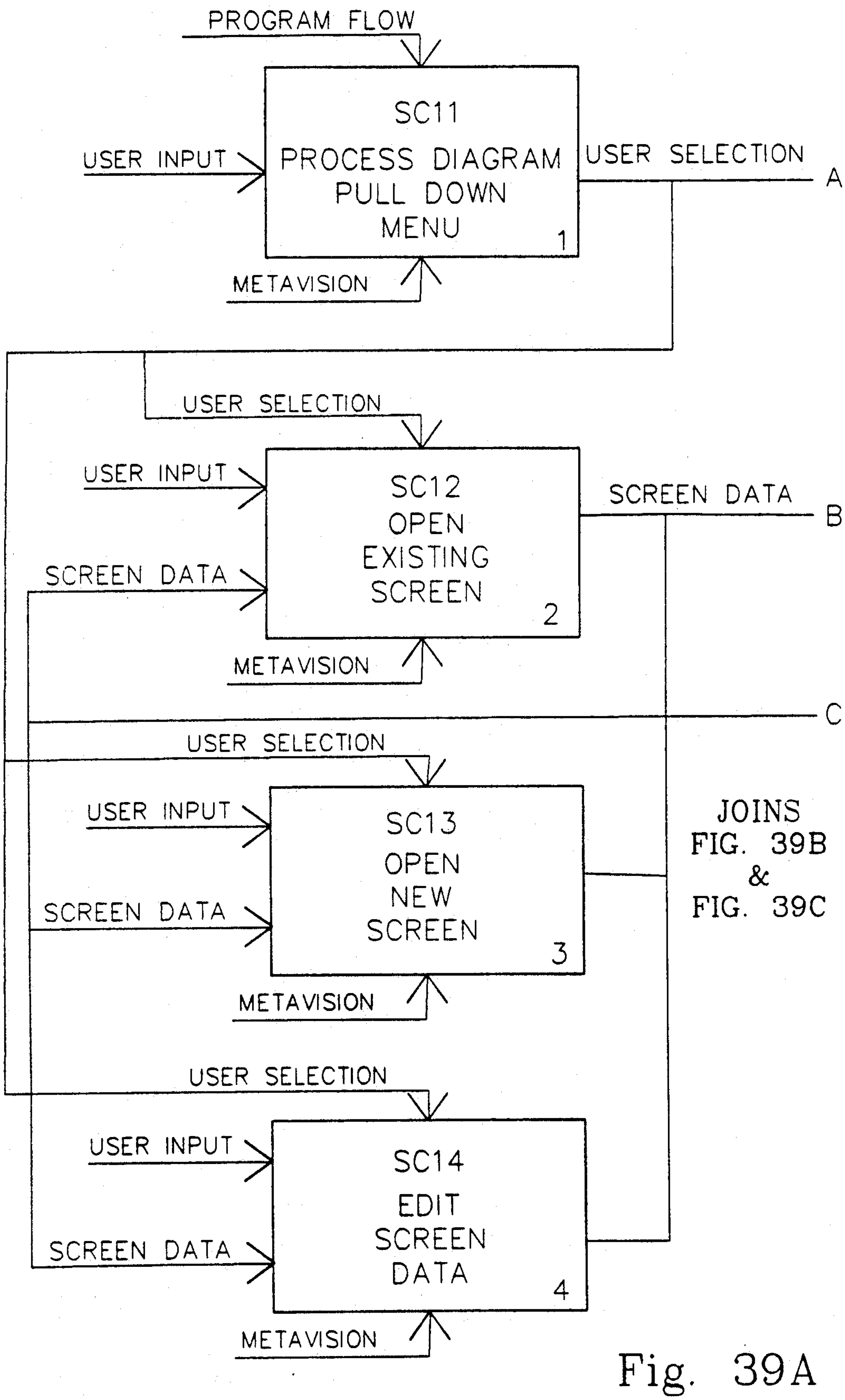
FIGS. 39A, 39B and 39C make up for FIG. 39 which is the Screen Design DIAGRAM data flow diagram.
Figure 39B:
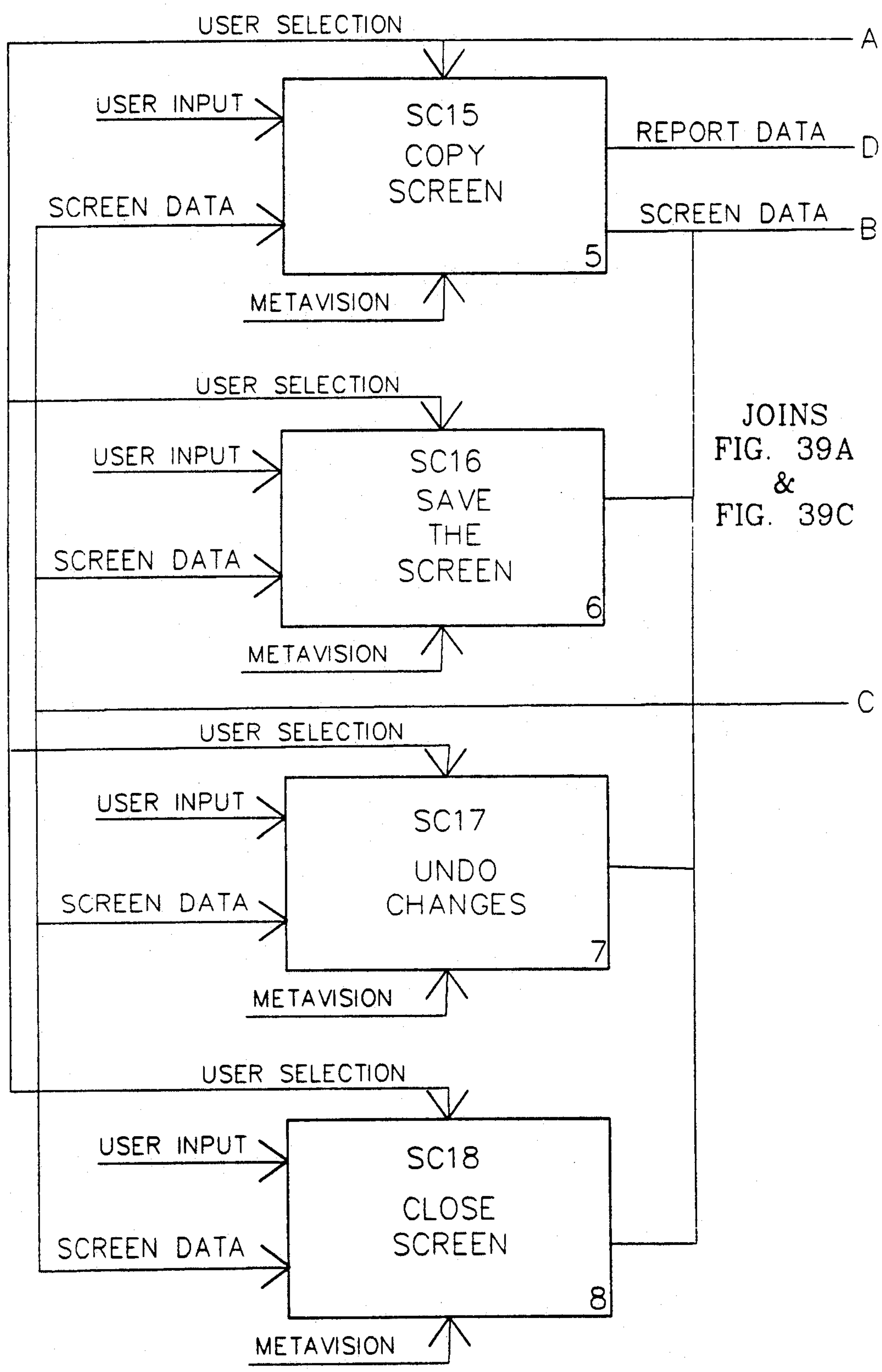
Figure 39C:
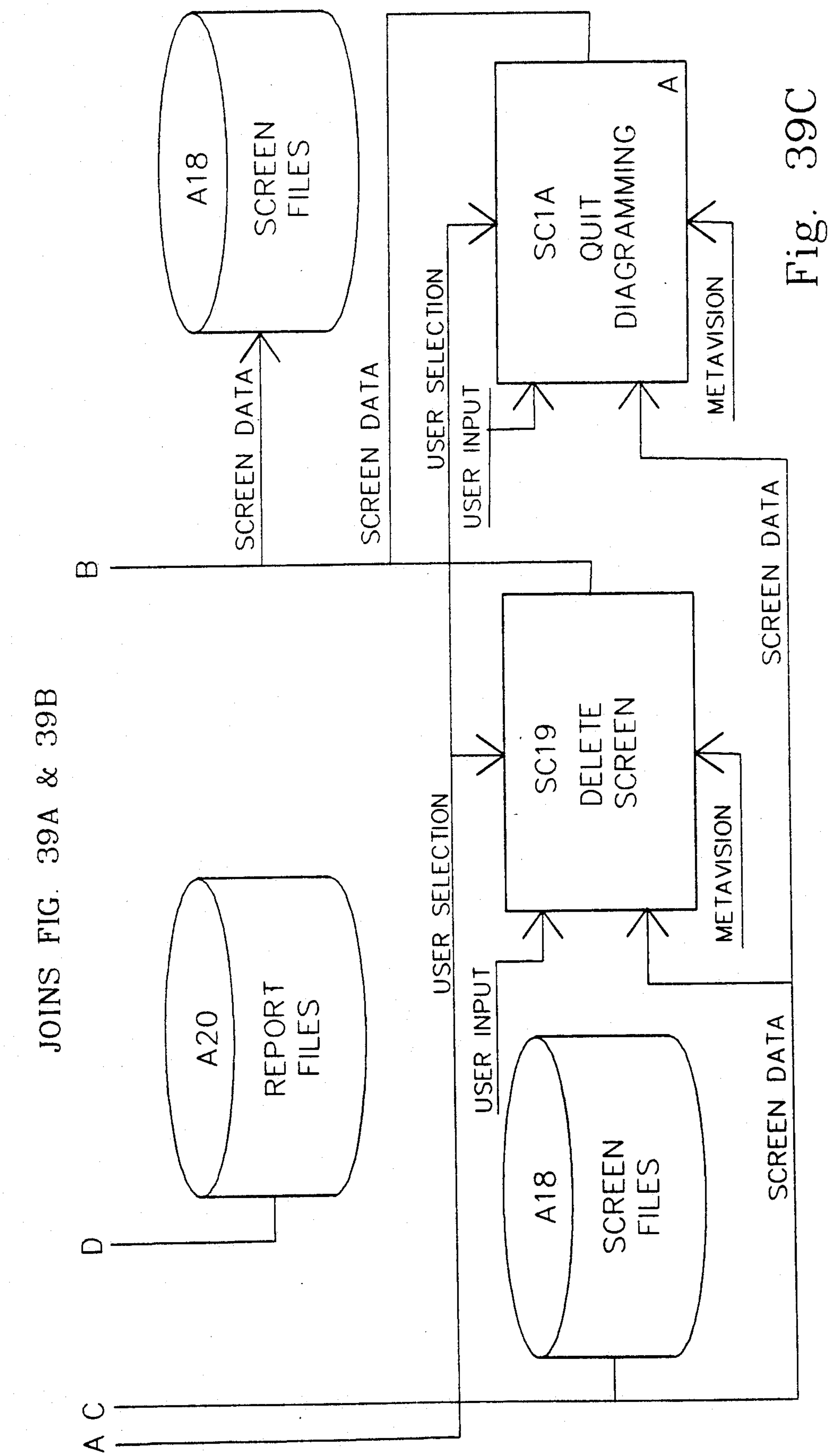

61 RPTFLD.DBF Data
Report Field information
62 CALFLD.DBF Data
Calculated Field information
63 RFPESF.DBF Data
RFP/External Schema Field relation
70 COMMON.DBF Data
Common information
96 Icon Type The functions of the DIAGRAM Pull Down Menu are accessed according to the following steps and as illustrated in FIG. 39, the Screen Design DIAGRAM data flow diagram.

SC11 Process DIAGRAM Pull Down Menu
The functions of the DIAGRAM Pull Down Menu are controlled.
SC12 OPEN Existing Screen
The information for the diagram is read from the Screen Files and stored in linked lists in memory. The diagram is then drawn.
SC13 Open NEW Screen
The information for the new diagram is read from the Screen Files and stored in linked lists in memory. The diagram is then drawn.
SC14 EDIT Screen Data
The basic information about the Screen that is kept in PICT.DBF can be changed by selecting Edit from the Diagram Pull Down Menu.
SC15 COPY Screen
A new Screen or Report may be created by copying an existing Screen chosen from a selection list.
SC16 SAVE The Screen
Save copies the Current Diagram files to the Backup Diagram Diagram files. The diagram is not closed.
SC17 UNDO Changes
The Screen is closed and Undo copies the Backup Diagram files to the Current Diagram files. All changes to every diagram since the last Save are lost.
SC18 CLOSE Screen
The Save/Undo/Exit choice box is displayed. Save copies the Current files to the Backup files. Undo copies the Backup files to the Current files. Exit does not copy files. The diagram is closed.
SC19 DELETE Screen
After selecting the diagram to delete from the list of diagrams from PICT.DBF, the Screen Data for the selected diagram is deleted in all files. This is a logical delete.
SC1A QUIT Diagramming
The Save/Undo/Exit choice is displayed. Save copies the Current files to the Backup files. Undo copies the Backup files to the Current files. Exit does not copy files. Activity Selection List is next.

During the performance of the Screen Design DIAGRAM steps, input and output data consisting of the following reports, forms and data packets are entered or generated.

Figure 40:
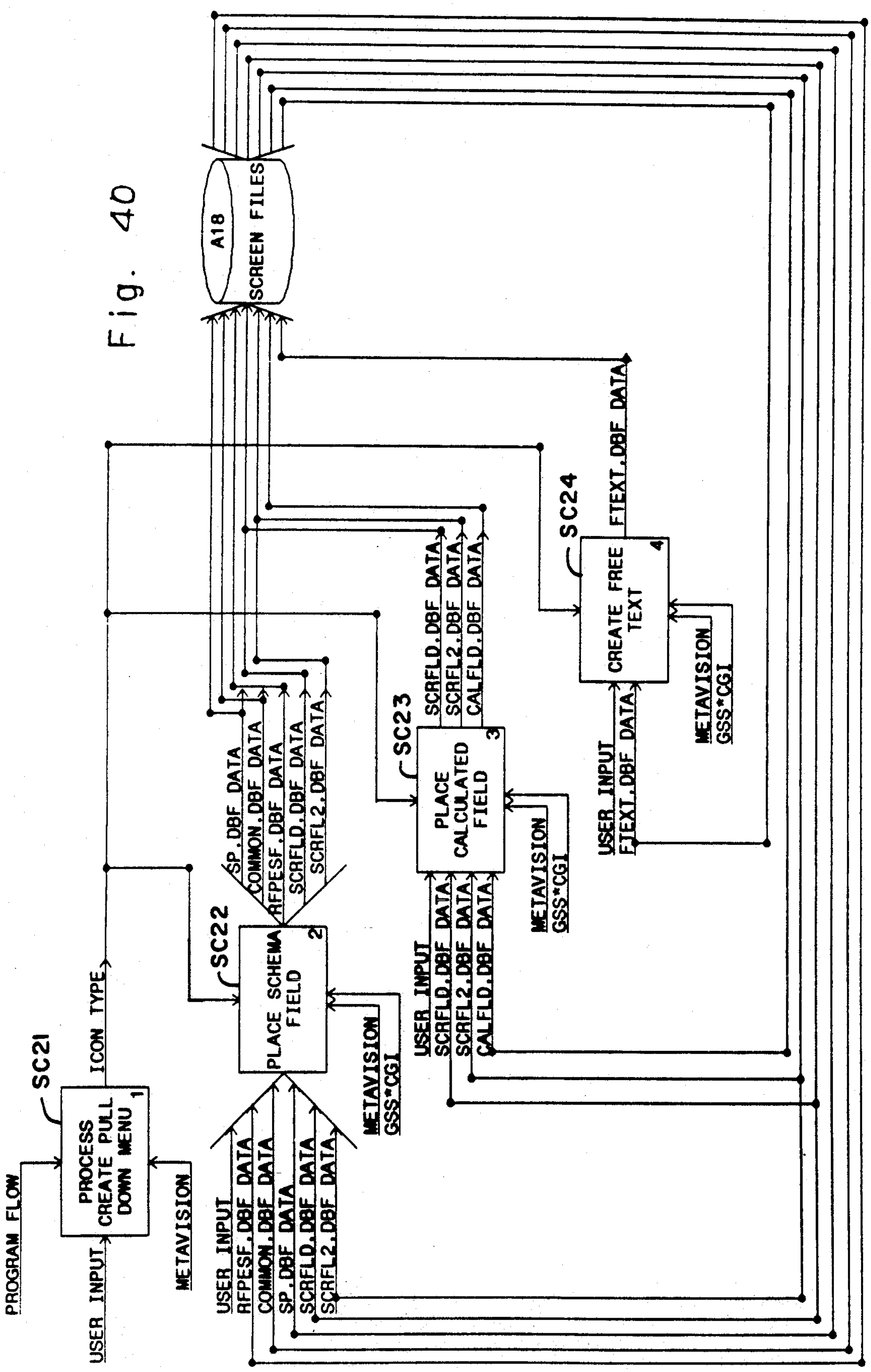
FIG. 40 is the Screen Design CREATE data flow diagram.

4 User Input
22 Program Flow
94 User Selection
152 Screen Data
153 Report Data The Screen Design CREATE routine executes the functions of the CREATE Pull Down menu on a Screen according to the following steps and as illustrated in FIG. 40, the Screen Design CREATE data flow diagram.

SC21 Process CREATE Pull Down Menu
The processing that occurs when an Icon is chosen from the CREATE Pull Down Menu is controlled by this process.
SC22 Place Schema Field
Select the Field Icon, position the Field Label and the Field, choose the field from the Schema Record List, enter the required information, and draw the Field and Label.
SC23 Place Calculated Field
Select the Calc. Icon, position the Field Label and the Field, enter the required information, and draw the Field and Label. New or previously defined Calculated Fields may be used.
SC24 Create Free Text
After opening a Screen, Free Text is created by selecting the word TEXT, positioning it on the screen, entering the required information, and drawing the Text.

During the performance of the Screen Design CREATE steps, input and output data consisting of the following reports, forms and data packets are entered or generated.

3 SP.DBF Data
Role/Field Information
4 User Input
22 Program Flow
59 FTEXT.DBF Data
Free Text information
62 CALFLD.DBF Data
Calculated Field information
63 RFPESF.DBF Data
RFP/External Schema Field relation
65 SCRFLD.DBF Data
Screen Field information
67 SCRFL2.DBF Data
Screen Field additional information
70 COMMON.DBF Data
Common information
96 Icon Type

PD15

Figure 41:
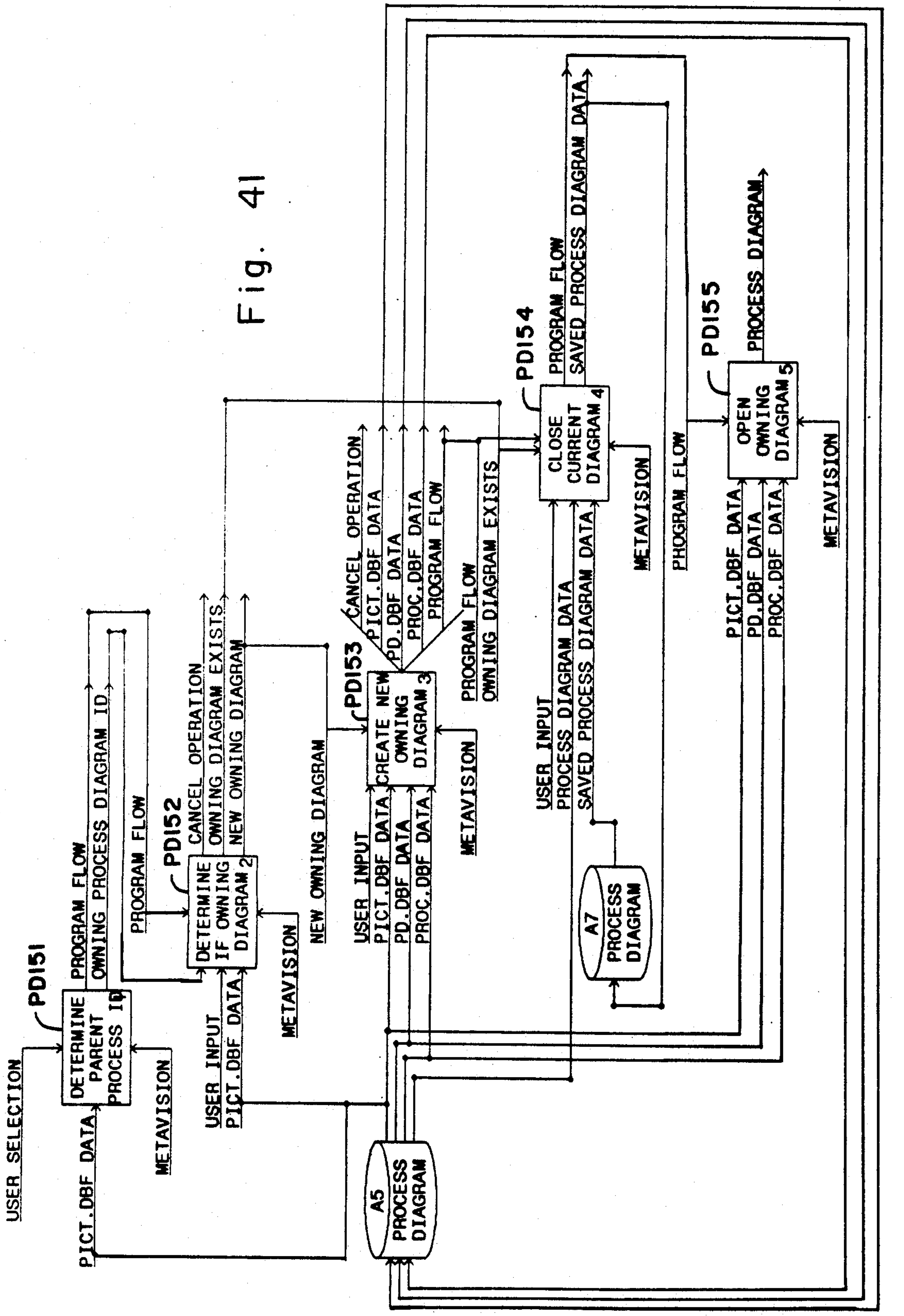
FIG. 41 is the Move UP A Level data flow diagram.

Move UP allows you to move up the hierarchy of Process Diagrams according to the following steps and as illustrated in FIG. 41, the Move UP A Level data flow diagram. If there is no Parent Diagram, it is created. You cannot move up from the top or "0" Level diagram.

PD151 Determine Parent Process ID
The Owning ID is found by shifting the current Diagram ID one character to the right. All 1 character diagrams are owned by Diagram 0. You cannot go UP from Diagram 0.
PD152 Determine If Owning Diagram Exists
If the Owning ID does not exist in PICT.DBF, the user is prompted to see if the Owning Diagram should be created.
PD153 Create New Owning Diagram The dialog boxes needed to create a new Process Diagram are displayed to allow the user to create the new Owning Diagram. PICT.DBF, PD.DBF, and PROC.DBF are updated.

PD154 Close Current Diagram
The Save/Undo/Exit choice box is displayed. Save copies the PD files to the Backup PD files. Undo copies the Backup PD files to the PD files. Exit does not copy files. The diagram is closed.

PD155 Open Owning Diagram
The information for the diagram is read from the Process Diagram Files and stored in linked lists in memory. The diagram is then drawn.

During the performance of the Move UP A Level steps, input and output data consisting of the following reports, forms and data packets are entered or generated.

Figure 42A:
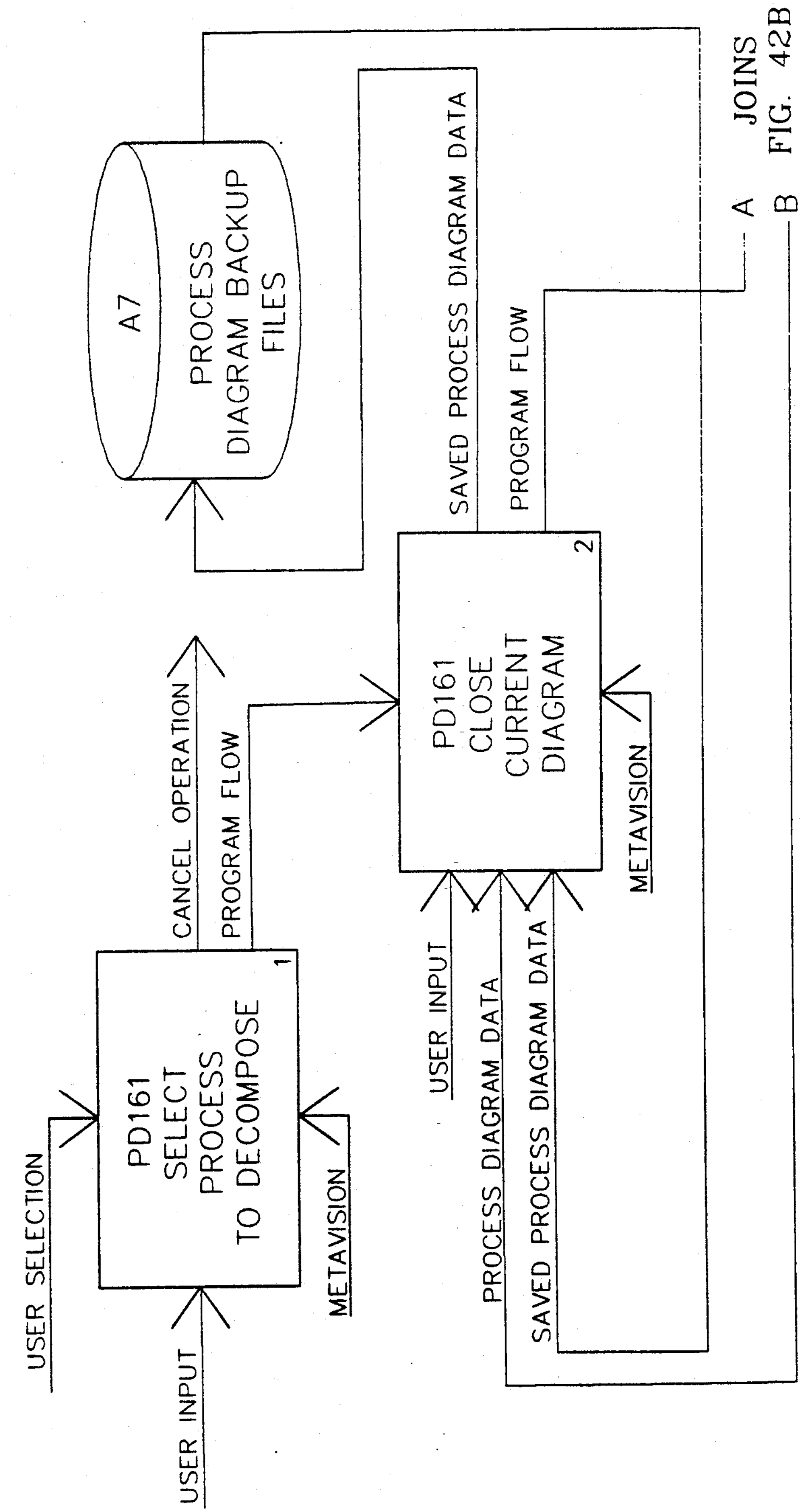
FIGS. 42A and 42B make up for FIG. 42 which is the Move DOWN A Level data flow diagram.
Figure 42B:
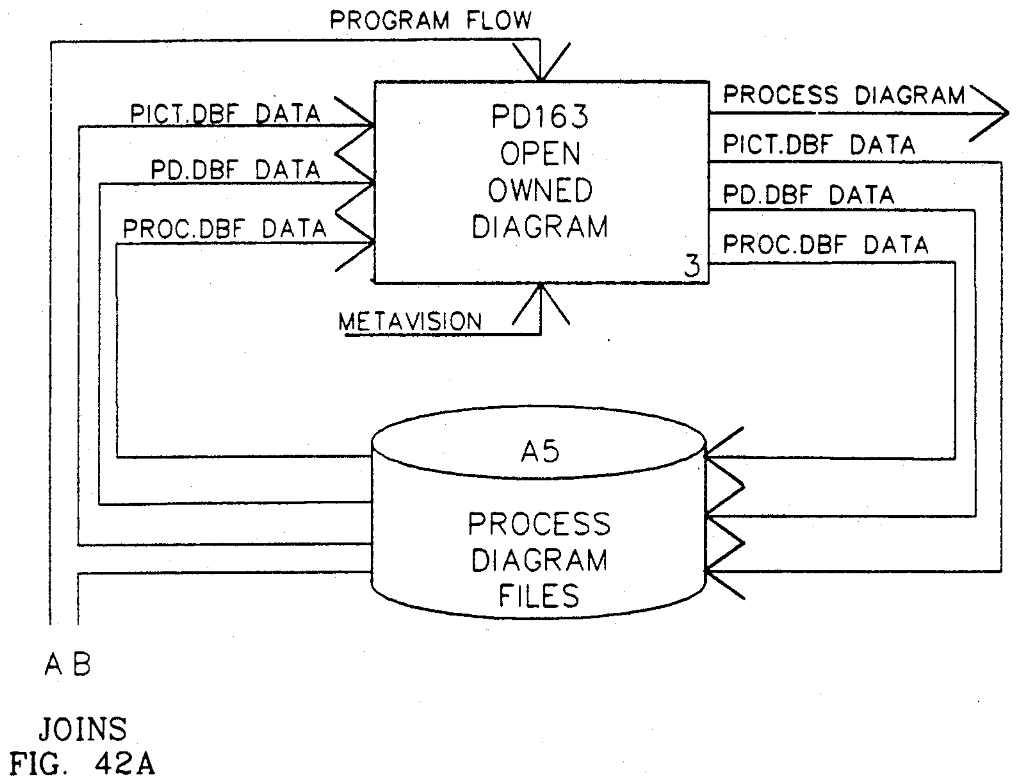

4 User Input
6 PICT.DBF Data
Picture information
22 Program Flow
31 PROC.DBF Data
Process information file
45 PD.DBF Data
Process decomposition information
79 Process Diagram
Process Diagram
94 User Selection
103 Cancel Operation
The Operation or Function is cancelled via the F10 key on dialog boxes, the CANCEL Icon on Selection Lists, or by clicking off screen, etc.
113 Process Diagram Data
Information about a Process Diagram.
114 Owning Process Diagram ID
115 SAVED Process Diagram Data
116 New Owning Diagram
117 Owning Diagram Exists Move DOWN allows you to decompose a Process into its subprocesses according to the following steps and as illustrated in FIG. 42, the Move DOWN A Level data flow diagram. You point and click to select the Process to decompose. A total of 21 levels are supported.

PD161 Select Process To Decompose
Position the cursor on the Process Box to be decomposed and click.

PD162 Close Current Diagram
The Save/Undo/Exit choice box is displayed. Save copies the Current files to the Backup files. Undo copies the Backup files to the Current files. Exit does not copy files. The diagram is closed.

PD163 Open Owned Diagram
If the Owned Diagram does not exist, it is created. The information for the diagram is read from the Process Diagram Files and stored in linked lists in memory. The diagram is then drawn.

During the performance of the Move DOWN A Level steps, input and output data consisting of the following reports, forms and data packets are entered or generated.

Figure 43A:
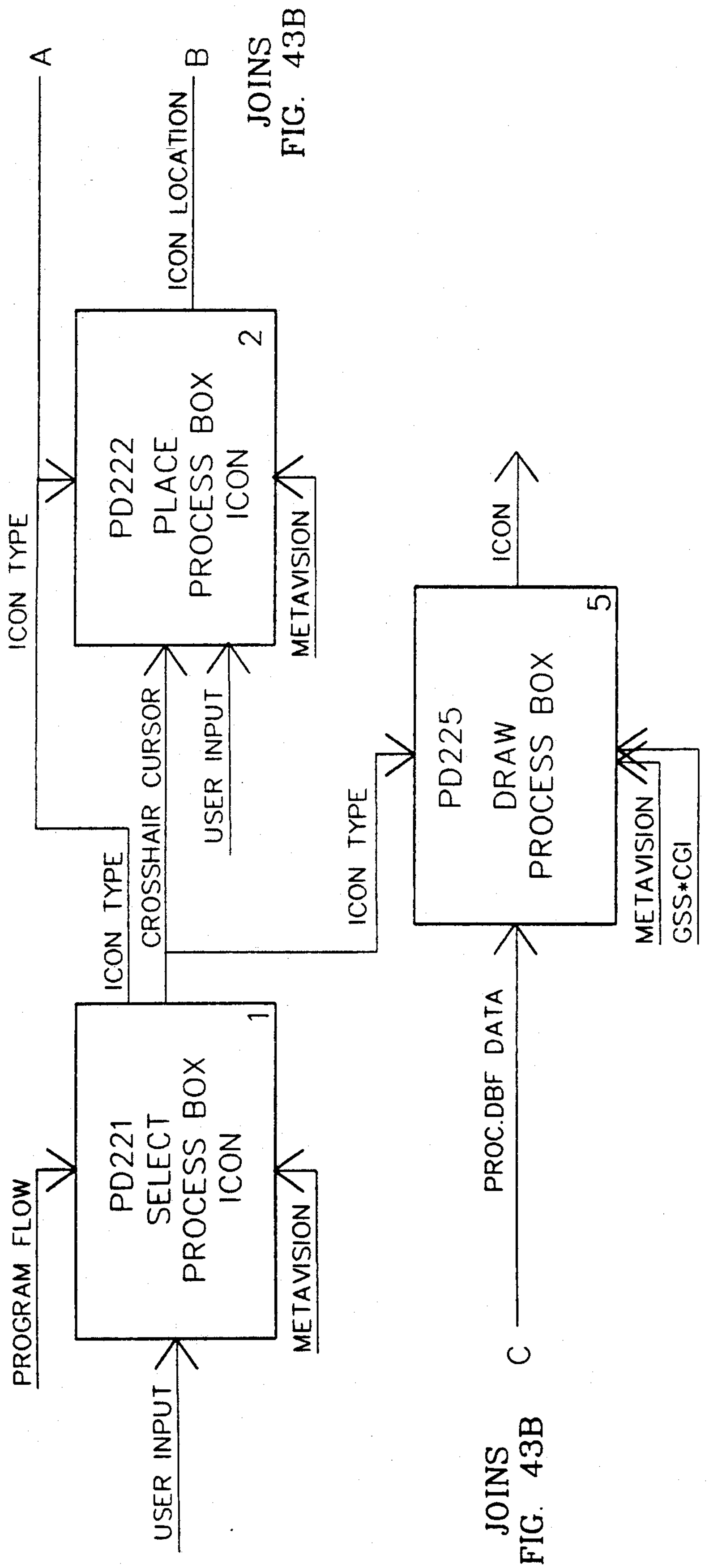
FIGS. 43A and 43B make up for FIG. 43 which is the Create Process Box data flow diagram.
Figure 43B:
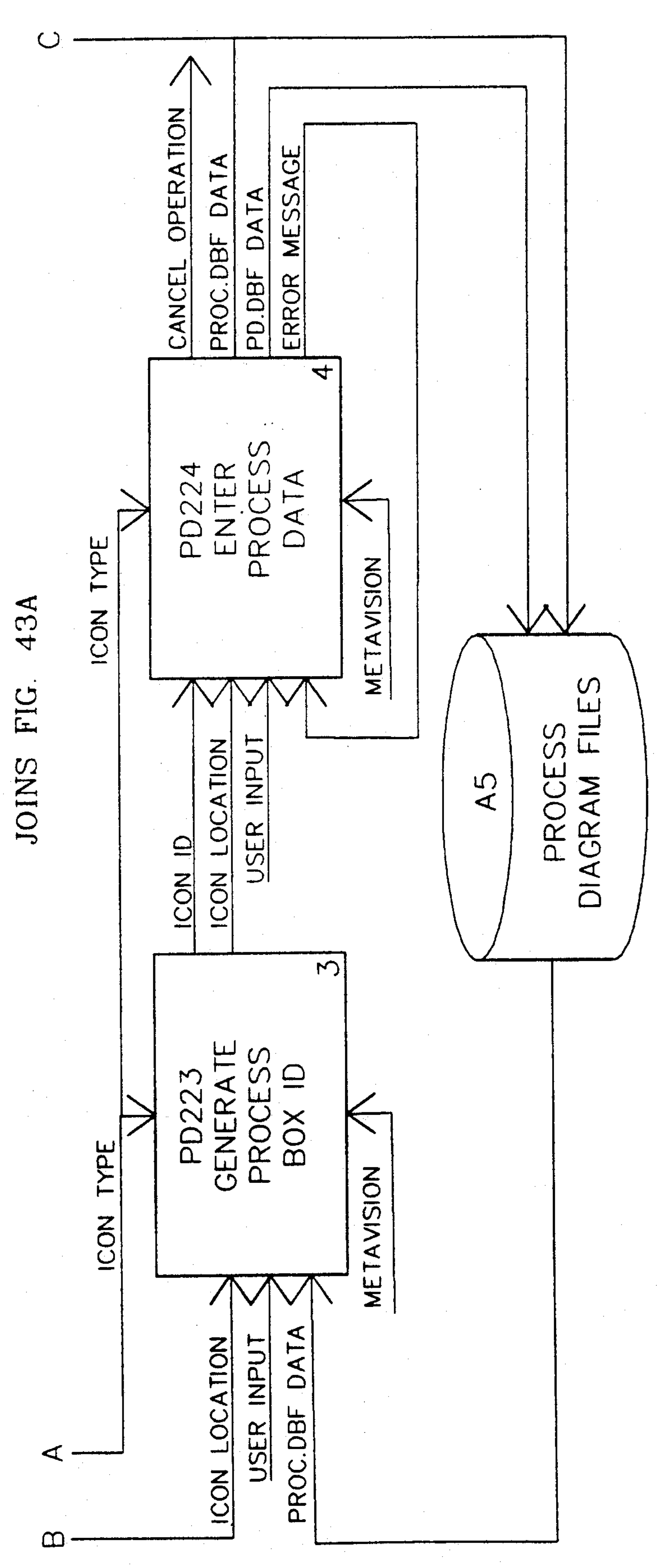

4 User Input
6 PICT.DBF Data
Picture information
22 Program Flow
31 PROC.DBF Data
Process information file
45 PD.DBF Data
Process decomposition information
79 Process Diagram
Process Diagram
94 User Selection
103 Cancel Operation
The Operation or Function is cancelled via the F10 key on dialog boxes, the CANCEL Icon on Selection Lists, or by clicking off screen, etc.
113 Process Diagram Data
Information about a Process Diagram.
115 SAVED Process Diagram Data Afteropening a Process Diagram, a Process Box is created by selecting the Process Box Icon, positioning it on the screen, entering the required information, and drawing the Process Box according to the following steps and as illustrated in FIG. 43, the Create Process Box data flow diagram.

PD221 Select Process Box Icon
Position the Arrow Cursor over the Process Box Icon on the Create Menu and click.

PD222 Place Process Box Icon
The XY coordinates of the center of the Process Box is the location of the crosshair cursor when the user clicks.

PD223 Generate Process Box ID
Process Box IDs=ID of owning Process+a sequence number of 1-9, A-Z. Leading "0" is omitted.

PD224 Enter Process Data
The data for the Process is entered into PD.DBF and PROC.DBF. Existing processes can be selected from a list and reused or new processes can be created. Reused processes are assigned new IDs.

PD225 Draw Process Box
The Process Box is drawn centered on the specified location. The last digit of the ID and the Name are displayed. The name may be split into 3 lines.

During the performance of the Create Process Box steps, input and output data consisting of the following reports, forms and data packets are entered or generated.

4 User Input
22 Program Flow
31 PROC.DBF Data
Process information file
45 PD.DBF Data
Process decomposition information
88 Error Message
Invalid data causes an error message to be generated and the user must correct the error before proceeding.
95 Crosshair Cursor
The center of the Crosshair Cursor defines the center of the Icon.
96 Icon Type
97 Icon Location
99 Icon ID
103 Cancel Operation The Operation or Function is cancelled via the F10 key on dialog boxes, the CANCEL Icon on Selection Lists, or by clicking off screen, etc.

104 Icon

The Icon drawn at the specified location with all its label information.

Figure 44A:
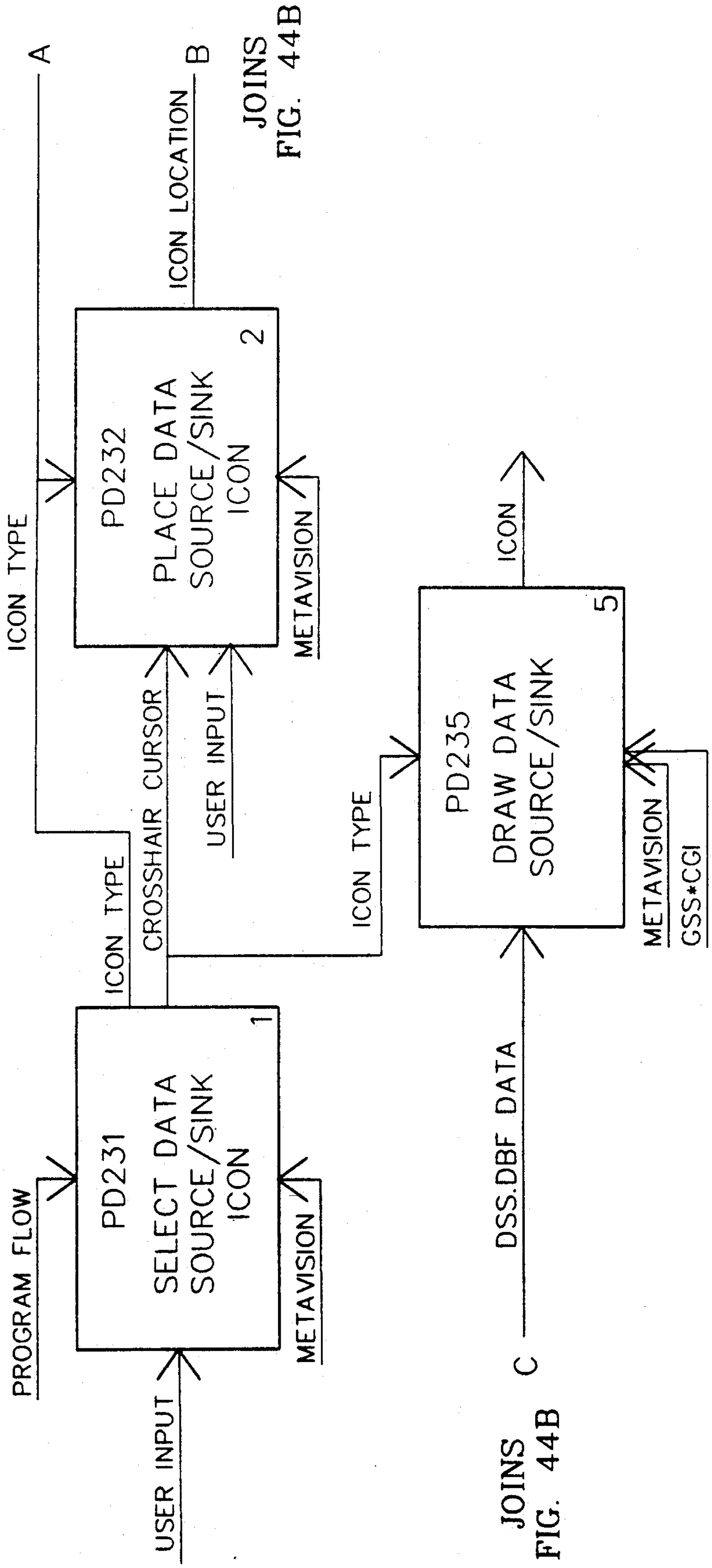
FIGS. 44A and 44B make up for FIG. 44 which is the Create Data Source/Sink data flow diagram.
Figure 44B:
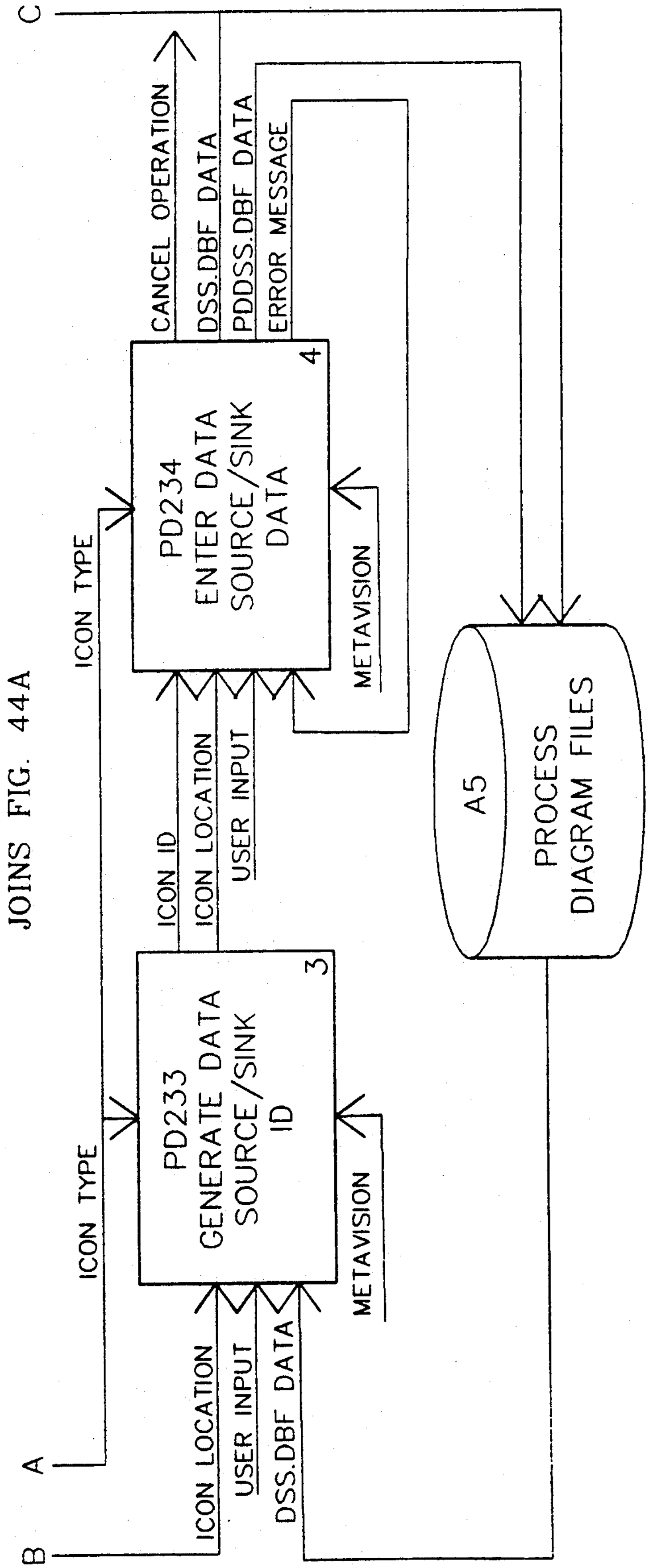

After opening a Process Diagram, a Data Source/-Sink is created by selecting the Data S/S Icon, positioning it on the screen, entering the required information, and drawing the Data S/S. according to the following steps and as illustrated in FIG. 44, the Create Data Source/Sink data flow diagram.

PD231 Select Data Source/Sink Icon

Position the Arrow Cursor over the Data Source/-Sink on the Create Menu and click.

PD232 Place Data Source/Sink Icon

The XY coordinates of the center of the Data Source/Sink is the location of the crosshair cursor when the user clicks.

PD233 Generate Date Source/Sink ID

DSS ID is calculated as the last DSS ID+1 for a new DSS. If an existing DSS is selected, then the existing DSS ID is used. An Instance field allows multiple occurences of a DSS on a diagram.

PD234 Enter Data Source/Sink Data

The DSS Data is entered into DSS.DBF and PDDSS.DBF. Existing DSS's can be selected from a list and reused or new DSS's can be created. An Instance is needed if a DSS is used again on a diagram.

PD235 Draw Data Source/Sink

The DSS is drawn centered on the specified location. The ID, Instance, and the Name are displayed.

During the performance of the Create Data Source/-Sink steps, input and output data consisting of the following reports, forms and data packets are entered or generated.

4 User Input

22 Program Flow

34 DSS.DBF Data

Data Source/Sink information

41 PDDSS.DBF Data

Process Diagram/Data Source Sink relation

88 Error Message

Invalid data causes an error message to be generated and the user must correct the error before proceeding.

95 Crosshair Cursor

The center of the Crosshair Cursor defines the center of the Icon.

96 Icon Type

97 Icon Location

99 Icon ID

103 Cancel Operation

The Operation or Function is cancelled via the F10 key on dialog boxes, the CANCEL Icon on Selection Lists, or by clicking off screen, etc.

104 Icon

The Icon drawn at the specified location with all its label information.

Figure 45A:
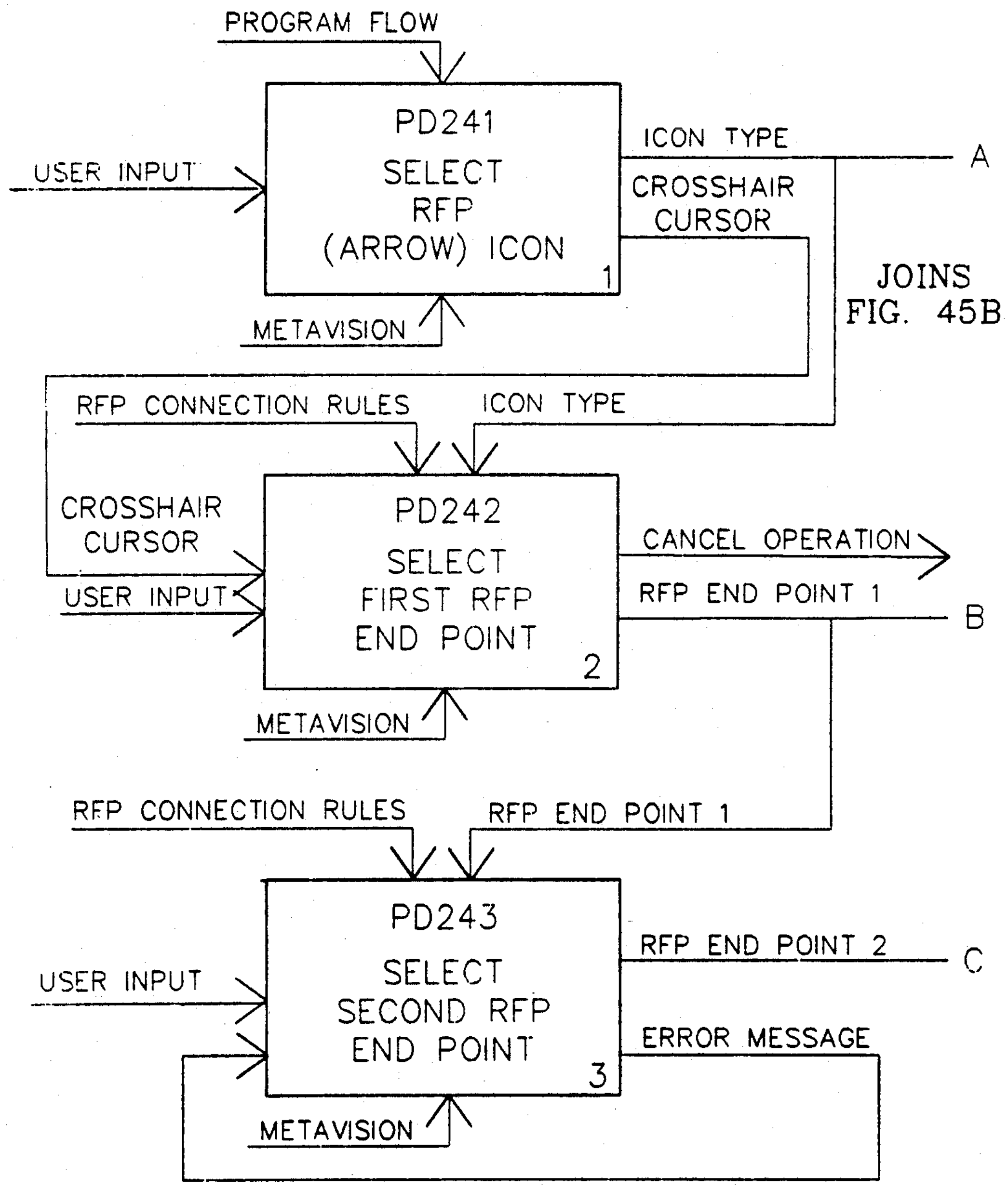
FIGS. 45A and 45B make up for FIG. 45 which is the Create RFP (Arrow) data flow diagram.
Figure 45B:
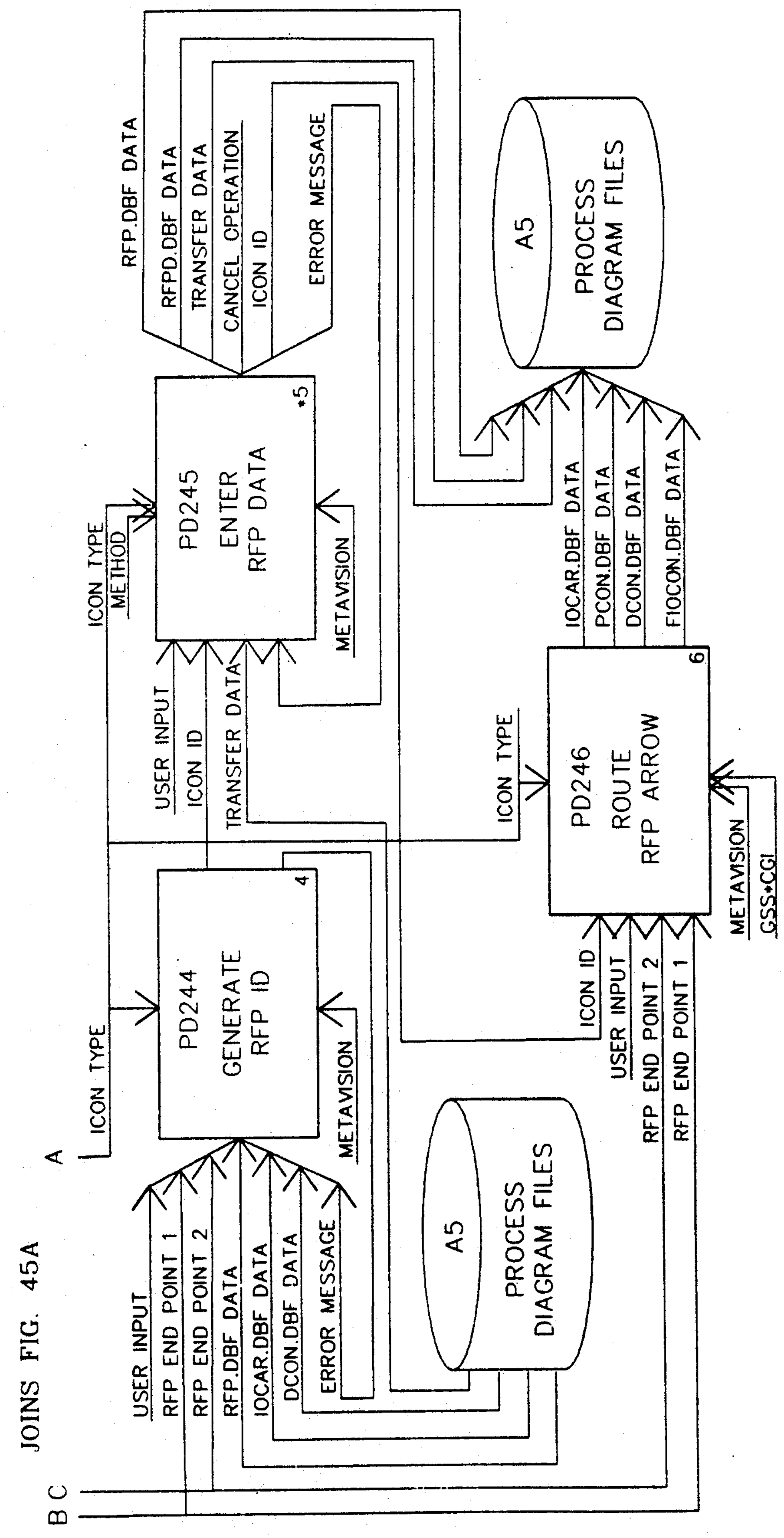

After opening a Process Diagram, an RFP is created by selecting the Arrow Icon, selecting the two end points for the Arrow, entering the required information, and routing and drawing the Arrow according to the following steps and as illustrated in FIG. 45, the Create RFP (Arrow) data flow diagram.

PD241 Select RFP (Arrow) Icon

Position the Arrow Cursor over the Arrow Icon on the Create Menu and click.

PD242 Select First RFP End Point

An RFP Arrow has two end points. The first end point may be the left, top, or right side of a process Box or the left or right side of a Data Source/Sink. You may also select an existing RFP or Fan.

PD243 Select Second RFP End Point

The Second end point may be the Left, Right, or Top of a Process Box, the Left or Right side of a Data S/S, no Icon at all, or an existing RFP or Fan RFP.

PD244 Generate RFP ID

The RFP ID is calculated as the last RFP ID+1 for a new RFP. If an existing RFP is selected, either by choosing it as an end point or from the list of RFPs, then the existing RFP ID is used.

PD245 Enter RFP Data

The RFP data is entered into RFP.DBF, RFPD.DBF. Connections are entered in IOCAR.DBF and PCON.DBF (Process), DCON.DBF (DSS), and FIOCON.DBF(Fan) after Routing. Existing or new RFP's can be used.

PD246 Route RFP Arrow

After entering the RFP Data, you must route the arrow. You can choose 1 or 3 clicks. The clicks select the 1st X, the Y, and the 2nd X offsets from the Icon location. Defaults are 0.

During the performance of the Create RFP (Arrow) steps, input and output data consisting of the following reports, forms and data packets are entered or generated.

4 User Input

22 Program Flow

32 RFP.DBF Data

RFP information file.

33 IOCAR.DBF Data

Process/RFP relation

35 DCON.DBF Data

Data Source/Sink connection information.

40 PCON.DBF Data

Process to process connection information

44 FIOCON.DBF Data

Fan to process connection information

50 RFPD.DBF Data

RFP additional information

88 Error Message

Invalid data causes an error message to be generated and the user must correct the error before proceeding.

95 Crosshair Cursor

The center of the Crosshair Cursor defines the center of the Icon.

96 Icon Type

99 Icon ID

Figure 46A:
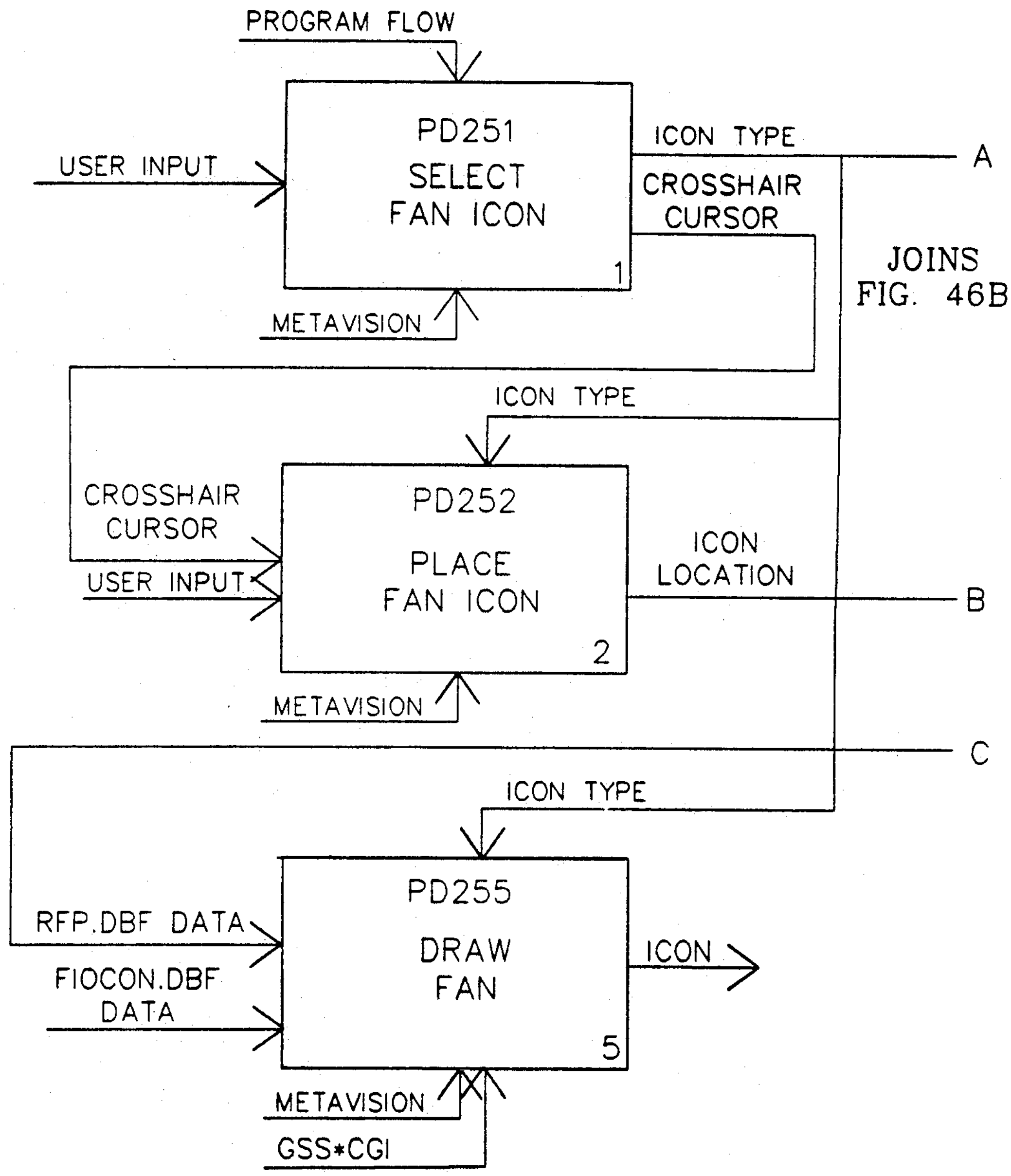
FIGS. 46A and 46B make up for FIG. 46 which is the Create Fan data flow diagram.
Figure 46B:
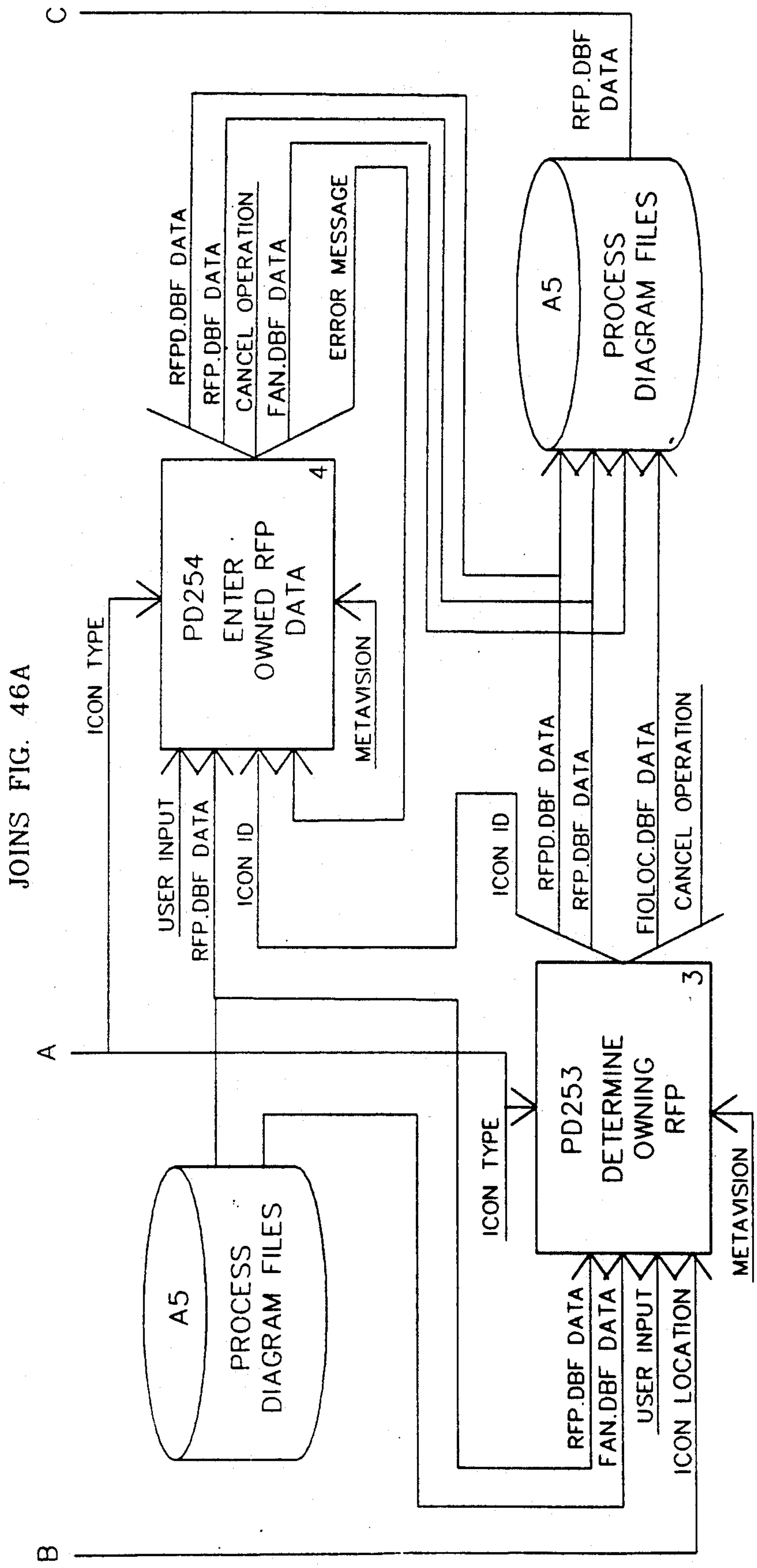

After opening a Process Diagram, a Fan is created by selecting the Fan-In or Fan-Out Icon, positioning it on the screen, entering the required information, and drawing the Fan according to the following steps and as illustrated in FIG. 46, the Create Fan data flow diagram.

PD251 Select Fan Icon
Position the Arrow Cursor over the Fan-In or Fan-Out Icon on the Create Menu and click.
PD252 Place Fan Icon
The XY coordinates of the center of the Fan is the location of the crosshair cursor when the user clicks.
PD253 Determine Owning RFP
The RFP that is to be broken down into its component RFPs may be chosen from existing RFPs, existing Fans in which case the Fan is duplicated, or a new RFP may be created.
PD254 Enter Owned RFP Data
The data for each RFP that belongs to the Fan is entered. You may choose an existing RFP or create a new one. The sequence in which the RFPs are entered determines the order in which they are shown.
PD255 Draw Fan
The Fan is drawn centered at the crosshair cursor location. The component arrows are drawn in the order they were entered. All arrows are labeled.

During the performance of the Create Fan steps, input and output data consisting of the following reports, forms and data packets are entered or generated.

4 User Input
22 Program Flow
32 RFP.DBF Data
RFP information file.
42 FAN.DBF Data
RFP Owning/Owned relation
43 FIOLOC.DBF Data
Fan location on Process diagram
44 FIOCON.DBF Data
Fan to process connection information
50 RFPD.DBF Data
RFP additional information
88 Error Message
Invalid data causes an error message to be generated and the user must correct the error before proceeding.
95 Crosshair Cursor
The center of the Crosshair Cursor defines the center of the Icon.
96 Icon Type
97 Icon Location
99 Icon ID
103 Cancel Operation
The Operation or Function is cancelled via the F10 key on dialog boxes, the CANCEL Icon on Selection Lists, or by clicking off screen, etc.
104 Icon
The Icon drawn at the specified location with all its label information.

Figure 47:
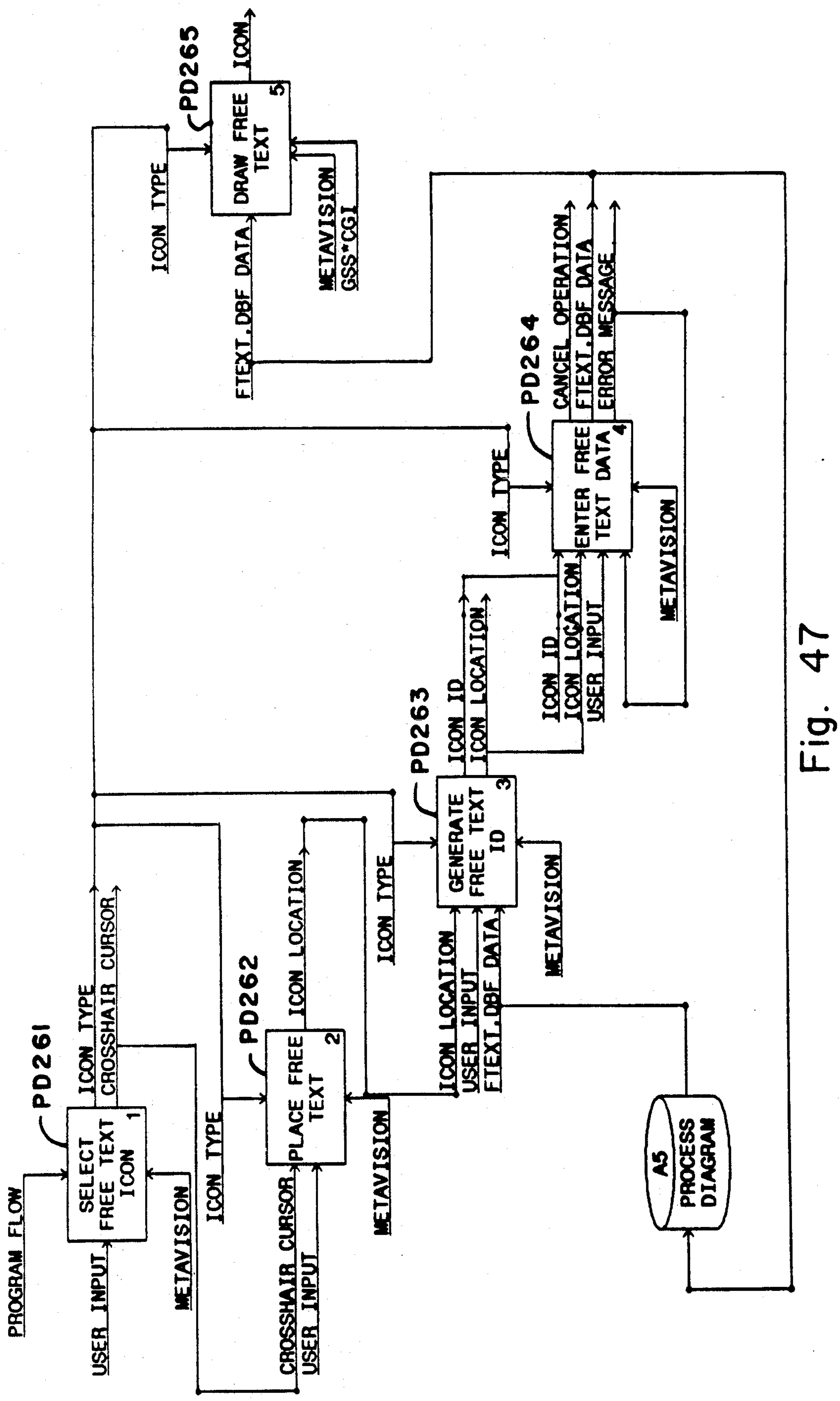
FIG. 47 is the Create Free Text data flow diagram.

After opening a Process Diagram, Free Text is created by selecting the word TEXT, positioning it on the screen, entering the required information, and drawing the Text according to the following steps and as illustrated in FIG. 47, the Create Free Text data flow diagram.

PD261 Select Free Text Icon
Position the Arrow Cursor over the word Text on the Create Menu and click.
PD262 Place Free Text
The Text is placed by determining the length of the text string and applying the specified Justification to the crosshair cursor location.
PD263 Generate Free Text ID
The Text ID is "PD"+<Process Diagram ID>+<sequence number> where the sequence number is the number of free text entries on the diagram.
PD264 Enter Free Text Data
The Text data is entered into FTEXT.DBF. Existing Text can be selected from a list and reused or new Text can be created. Reused Text is assigned a new ID.
PD265 Draw Free Text
The Text is placed on the diagram at the specified location, with the specified justification, size, and font.

During the performance of the Create Free Text steps, input and output data consisting of the following reports, forms and data packets are entered or generated.

4 User Input
22 Program Flow
59 FTEXT.DBF Data
Free Text information
88 Error Message
Invalid data causes an error message to be generated and the user must correct the error before proceeding.
95 Crosshair Cursor
The center of the Crosshair Cursor defines the center of the Icon.
96 Icon Type
97 Icon Location
99 Icon ID
103 Cancel Operation
The Operation or Function is cancelled via the F10 key on dialog boxes, the CANCEL Icon on Selection Lists, or by clicking off screen, etc.
104 Icon
The Icon drawn at the specified location with all its label information.

PD27

Figure 48:
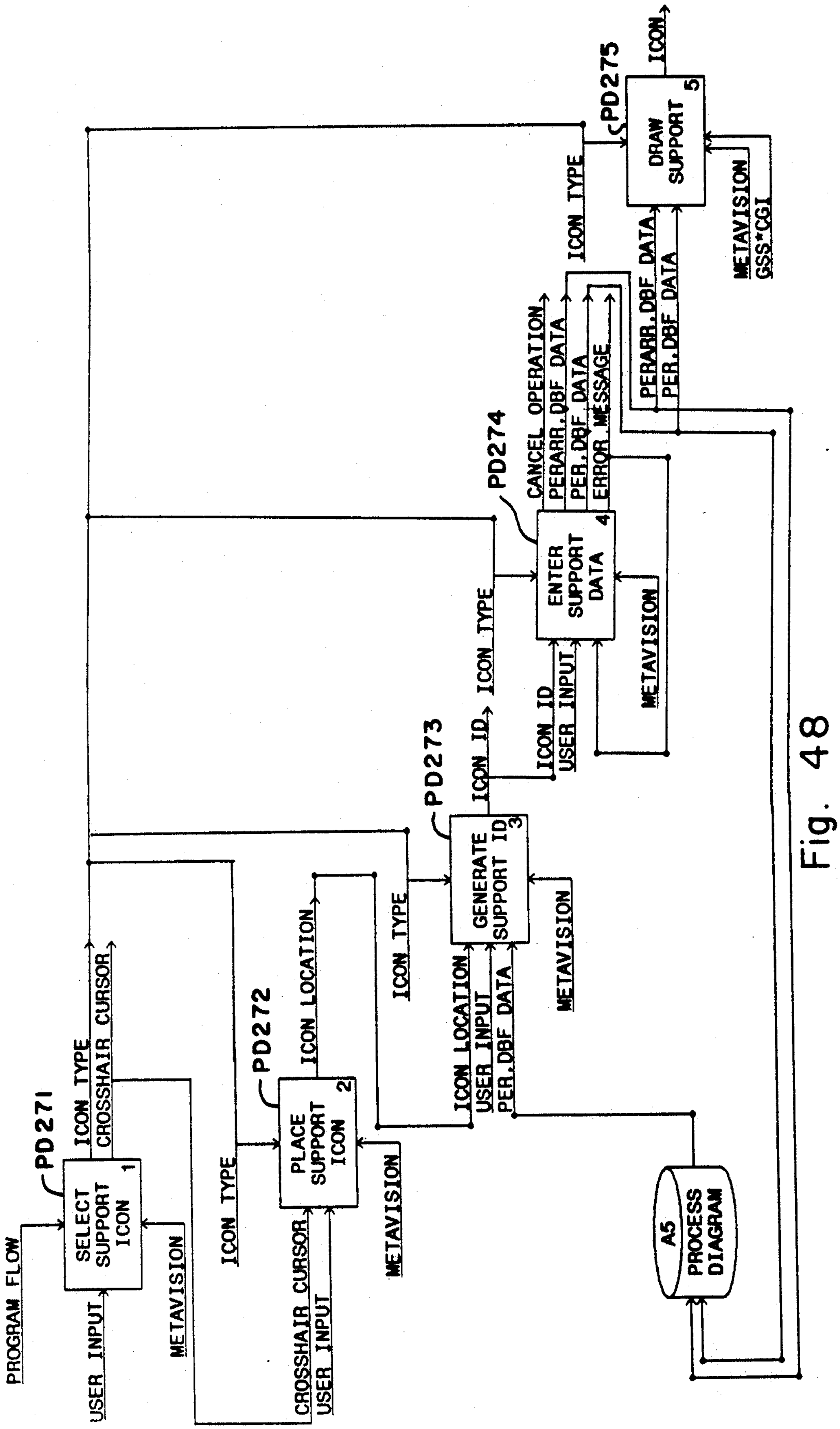
FIG. 48 is the Create Support Data data flow diagram.

After opening a Process Diagram, a Support is created by selecting the Arrow or one of the other Support Icons, selecting a Process, entering the required information, and drawing the Support according to the following steps and as illustrated in FIG. 48, the Create Support Data data flow diagram.

PD271 Select Support Icon
Position the Arrow Cursor over the Arrow, Person, Program/System, Dollars, Time, Hardware, or Location Icon on the Create Menu and click. (Arrow is the only presently implemented Support Icon).
PD272 Place Support Icon
The Support Icon is always on the bottom of the Process Box. A sequence number is kept for each of the Support Icon types. The People through Location Icons are displayed once per Process Box.
PD273 Generate Support ID The Support ID is the last Support ID+1 for new supports or the Support ID for an existing support if one is chosen.

PD274 Enter Support Data

The Support may be chosen from a list, the Support ID entered to select an existing Support, or the Dialog Box may be filled in to create another Support.

PD275 Draw Support

The labeled Support Arrow is drawn at the bottom of the box. Once the other Icons are implemented, the Icon will be drawn below the box. Only one Icon will be shown for each Support Type used.

During the performance of the Create Support Data steps, input and output data consisting of the following reports, forms and data packets are entered or generated.

Figure 49A:
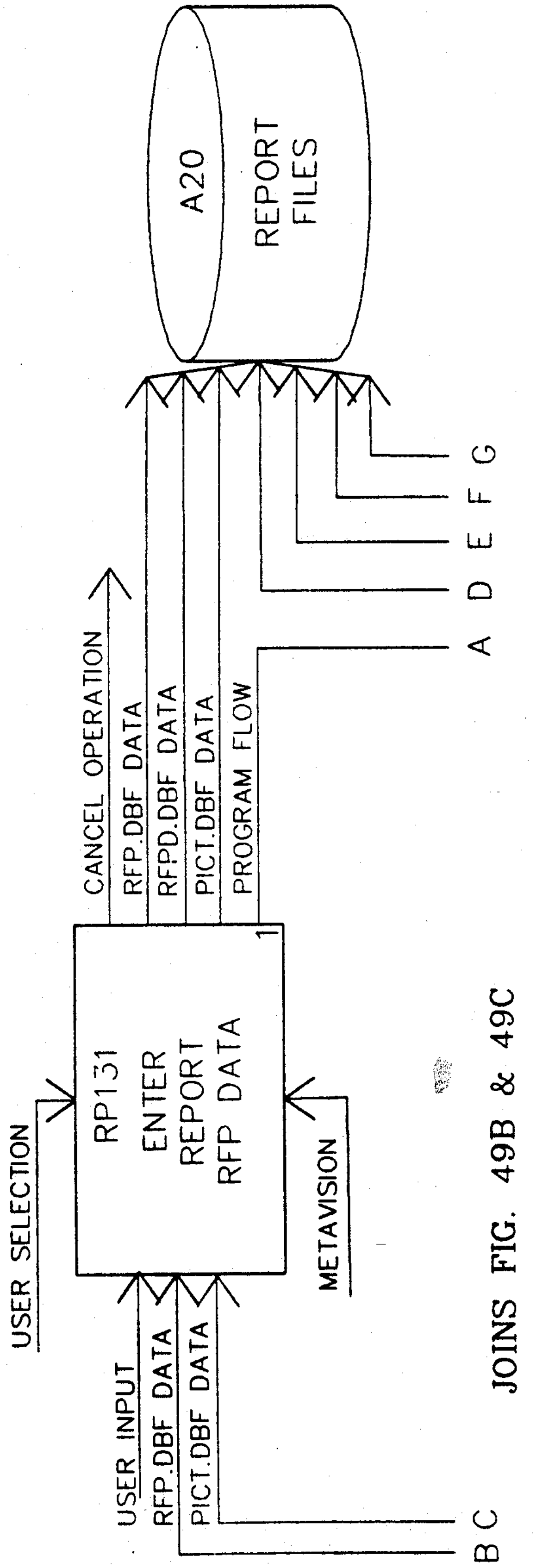
FIGS. 49A, 49B and 49C make up for FIG. 49 which is the Open NEW Report data flow diagram.
Figure 49B:
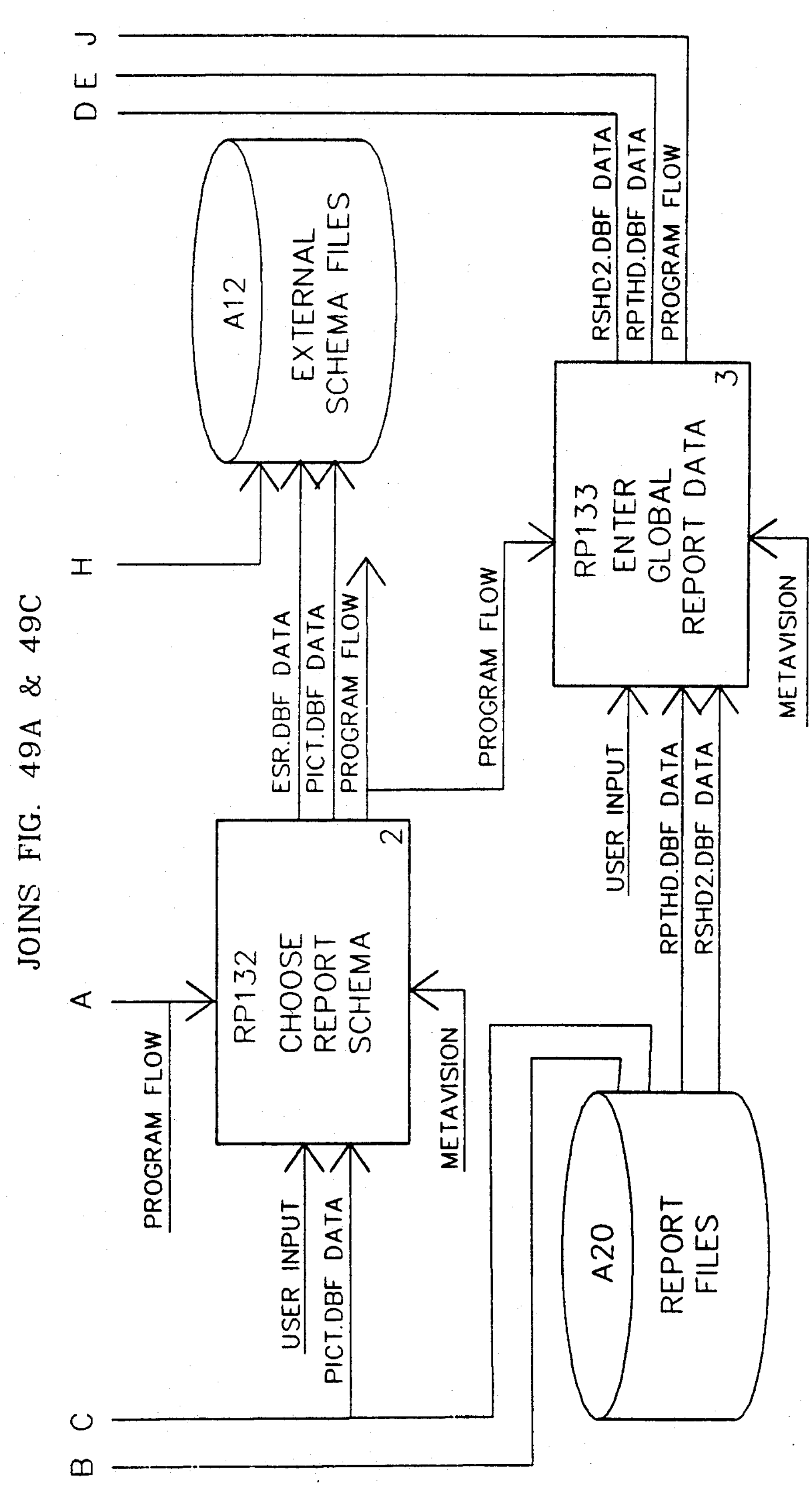
Figure 49C:
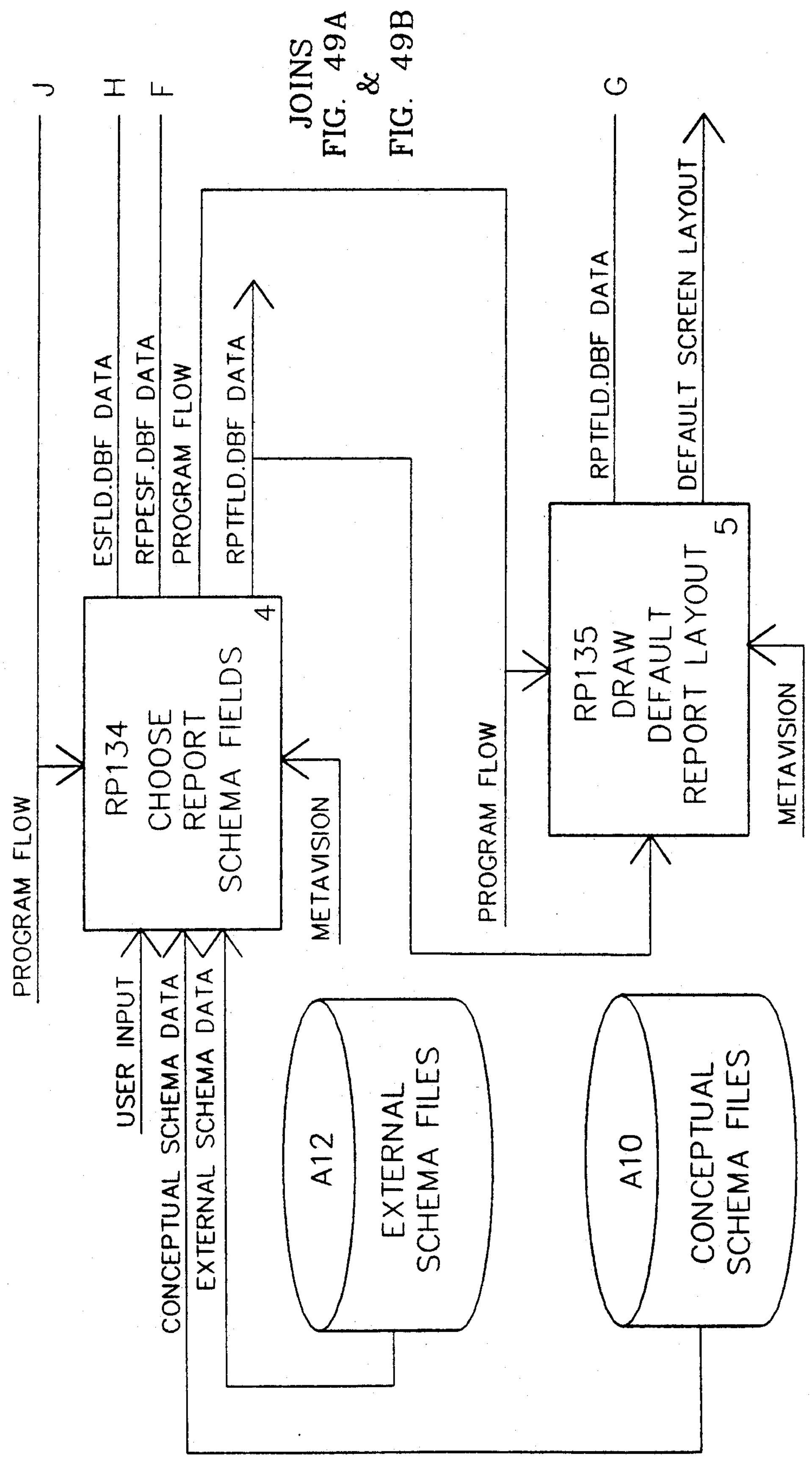

4 User Input
22 Program Flow
36 PER.DBF Data
Support information
37 PERARR.DBF Data
Process/Support relation
88 Error Message
Invalid data causes an error message to be generated and the user must correct the error before proceeding.
95 Crosshair Cursor
The center of the Crosshair Cursor defines the center of the Icon.
96 Icon Type
97 Icon Location
99 Icon ID
103 Cancel Operation The information for the new diagram is read from the Report Files and stored in linked lists in memory. The Report Layout is then drawn according to the following steps and as illustrated in FIG. 49, the Open NEW Report data flow diagram.

RP131 Enter Report RFP Data

All Reports are RFPs. The basic RFP data for the Report is entered. In addition a PICT.DBF record is created of type "RP" and ID of the RFP ID of the screen.

RP132 Choose Report Schema

Fields on a Report may be taken from an External Schema or a Conceptual Schema. If no schema is selected, an External Schema is created with one record containing all Fields on the screen.

RP133 Enter Global Report Data

Basic information about the report size, etc, is entered into RPTHD.DBF and RSHD2.DBF.

RP134 Choose Report Schema Fields

Fields may be chosen directly from the Report's External or Conceptual Schema, either from the Diagram or a Selection List, or no fields need be chosen at this time.

RP135 Draw Default Report Layout

The chosen Schema Fields are placed one field to a line, starting at the top left of the screen. The Field Name and size from SP.DBF are used to label and size the field.

During the performance of the Open NEW Report steps, input and output data consisting of the following reports, forms and data packets are entered or generated.

Figure 50A:
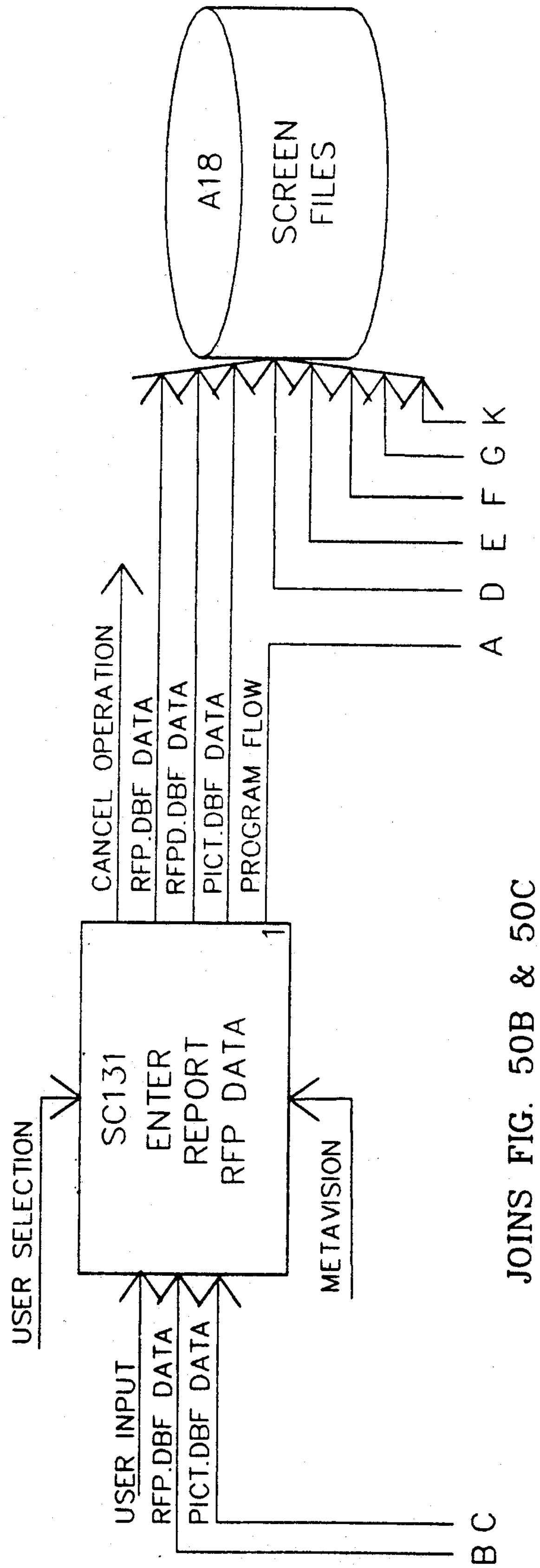
FIGS. 50A, 50B and 50C make up for FIG. 50 which is the Open NEW Screen data flow diagram.
Figure 50B:
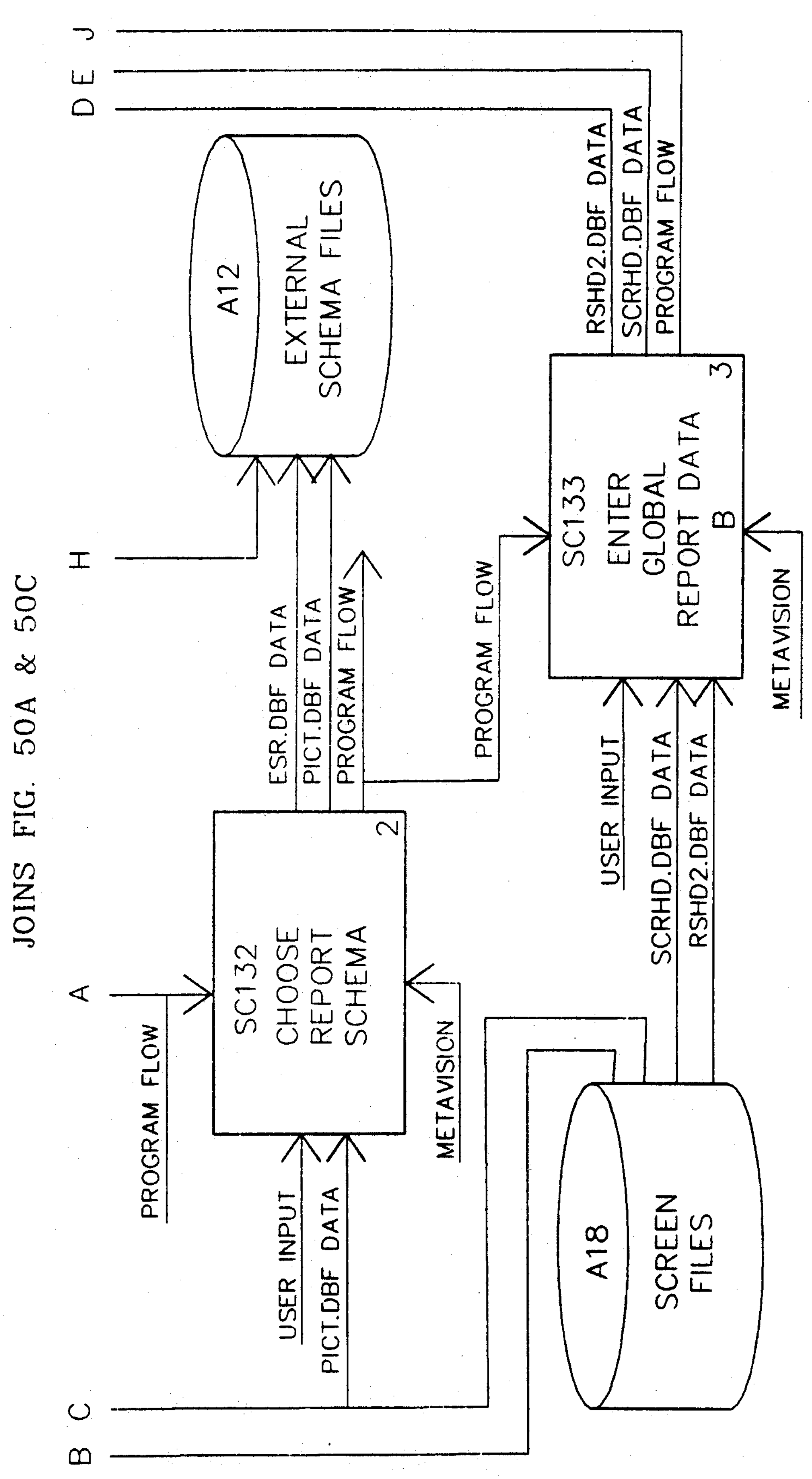
Figure 50C:
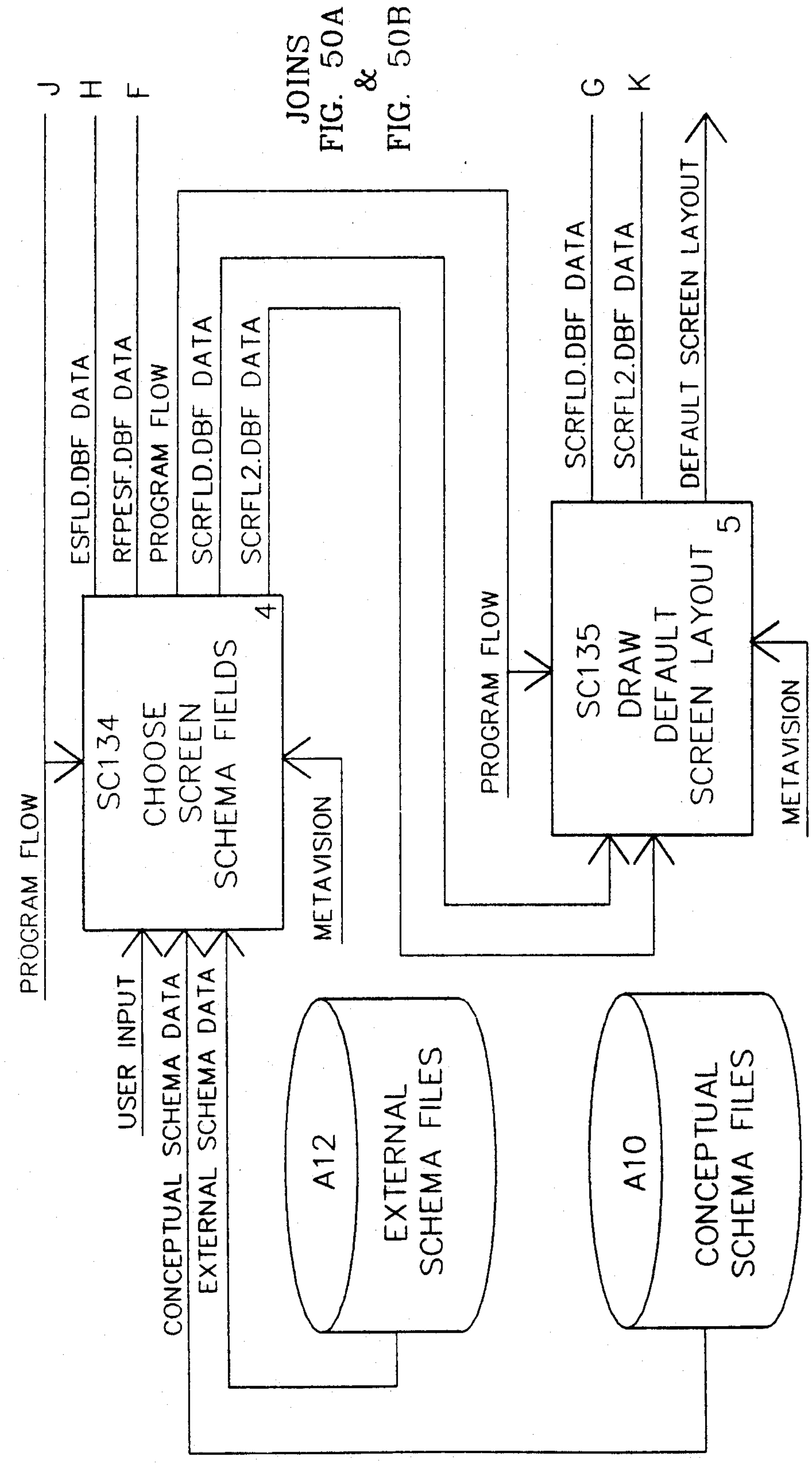

4 User Input
6 PICT.DBF Data
Picture information
22 Program Flow
32 RFP.DBF Data
RFP information file.
50 RFPD.DBF Data
RFP additional information
60 RPTHD.DBF Data
Report Header information
61 RPTFLD.DBF Data
Report Field information
63 RFPESF.DBF Data
RFP/External Schema Field relation
66 RSHD2.DBF Data
Screen Header additional information
72 ESR.DBF Data
External Schema Record Information
73 ESFLD.DBF Data
External Schema Record/Field relation
94 User Selection
103 Cancel Operation
The Operation or Function is cancelled via the F10 key on dialog boxes, the CANCEL Icon on Selection Lists, or by clicking off screen, etc.
119 Conceptual Schema Data
120 External Schema Data
154 Default Screen Layout The information for the new diagram is read from the Screen Files and stored in linked lists in memory. The diagram is then drawn according to the following steps and as illustrated in FIG. 50, the Open NEW Screen data flow diagram.

SC131 Enter Screen RFP Data

All Screens are RFPs. The basic RFP data for the Screen is entered. In addition a PICT.DBF record is created of type "SC" and ID of the RFP ID of the screen.

SC132 Choose Screen Schema

Fields on a Screen may be taken from an External Schema or a Conceptual Schema. If no schema is selected, an External Schema is created with one record containing all Fields on the screen.

SC133 Enter Global Screen Data

Basic information about the screen size, color, etc is entered into SCRHD.DBF and RSHD2.DBF.

SC134 Choose Screen Schema Fields

Fields may be chosen directly from the Screen's External or Conceptual Schema, either from the Diagram or a Selection List, or no fields need be chosen at this time.

SC135 Draw Default Screen Layout

The chosen Schema Fields are placed one field to a line, starting at the top left of the screen. The Field Name and size from SP.DBF are used to label and size the field.

During the performance of the Open NEW Screen steps, input and output data consisting of the following reports, forms and data packets are entered or generated.

Figure 51:
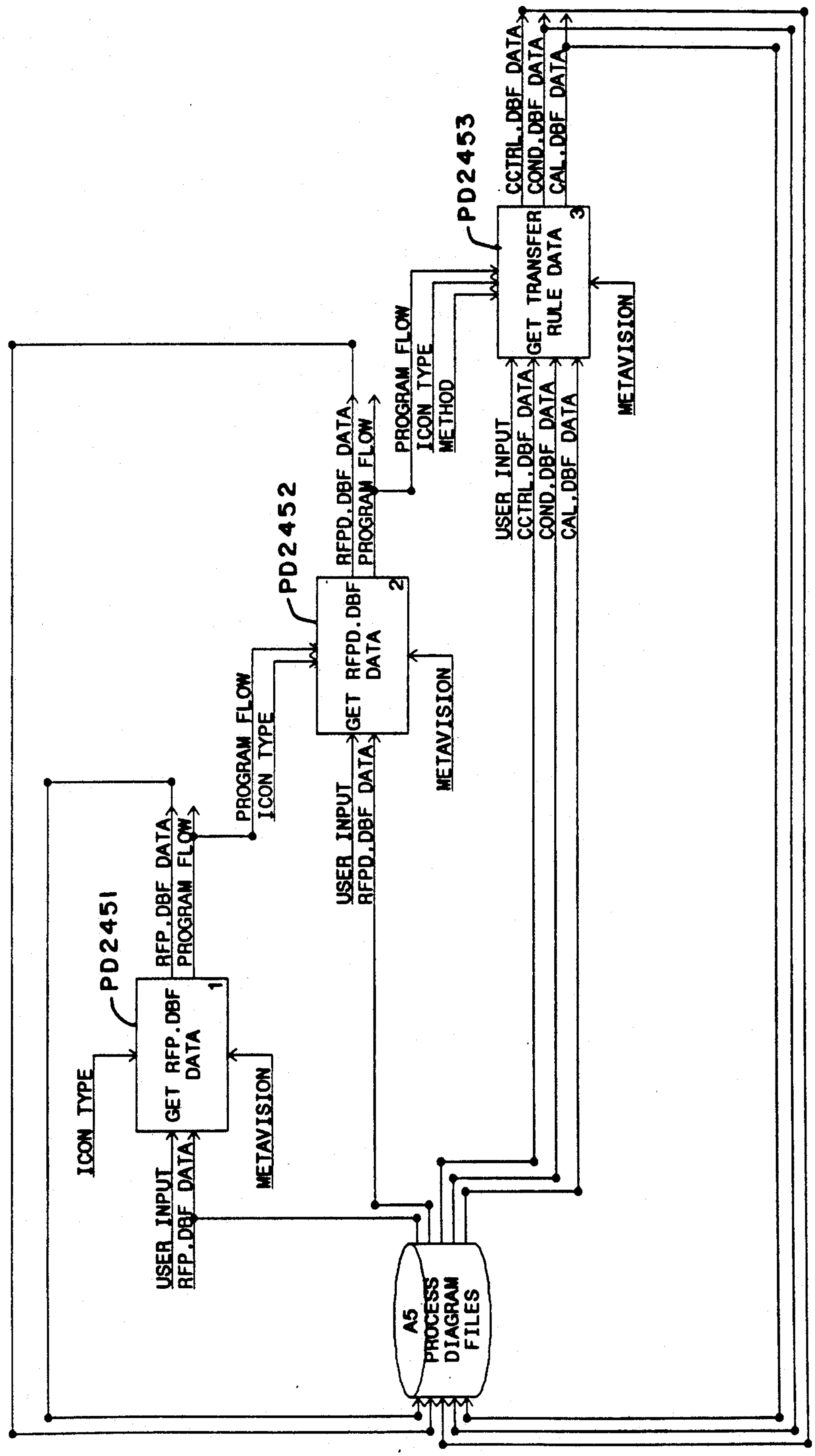
FIG. 51 is the Enter RFP Data data flow diagram.

4 User Input
6 PICT.DBF Data
Picture information
22 Program Flow
32 RFP.DBF Data
RFP information file.
50 RFPD.DBF Data
RFP additional information
63 RFPESF.DBF Data
RFP/External Schema Field relation
64 SCRHD.DBF Data
Screen Header information
65 SCRFLD.DBF Data
Screen Field information
66 RSHD2.DBF Data
Screen Header additional information
67 SCRFL2.DBF Data
Screen Field additional information
72 ESR.DBF Data
External Schema Record Information
73 ESFLD.DBF Data
External Schema Record/Field relation
94 User Selection
103 Cancel Operation
The Operation or Function is cancelled via the F10 key on dialog boxes, the CANCEL Icon on Selection Lists, or by clicking off screen, etc.
119 Conceptual Schema Data
120 External Schema Data
154 Default Screen Layout The RFP data is entered into RFP.DBF, RFPD.DBF. Connections are entered in IOCAR.DBF and PCON.DBF (Process), DCON.DBF (DSS), and FIOCON.DBF(Fan) after Routing according to the following steps and as illustrated in FIG. 51, the Enter RFP Data data flow diagram. Existing or new RFP's can be used.

PD2451 Get RFP.DBF Data
The basic RFP data of ID, Name, and Description is always prompted for.
PD2452 Get RFPD.DBF Data
Additional information about the RFP is obtained only if the user decides to enter the data by entering "Y" in the add more data field on the RFP Dialog Box.
PD245 Get Transfer Rule Data
Transfer Rule information is prompted for when the RFP is a Control and the Method is Software Engineering. This data is used to model program flow and for prototyping and code generation.

During the performance of the Enter RFP Data steps, input and output data consisting of the following reports, forms and data packets are entered or generated.

Figure 52A:
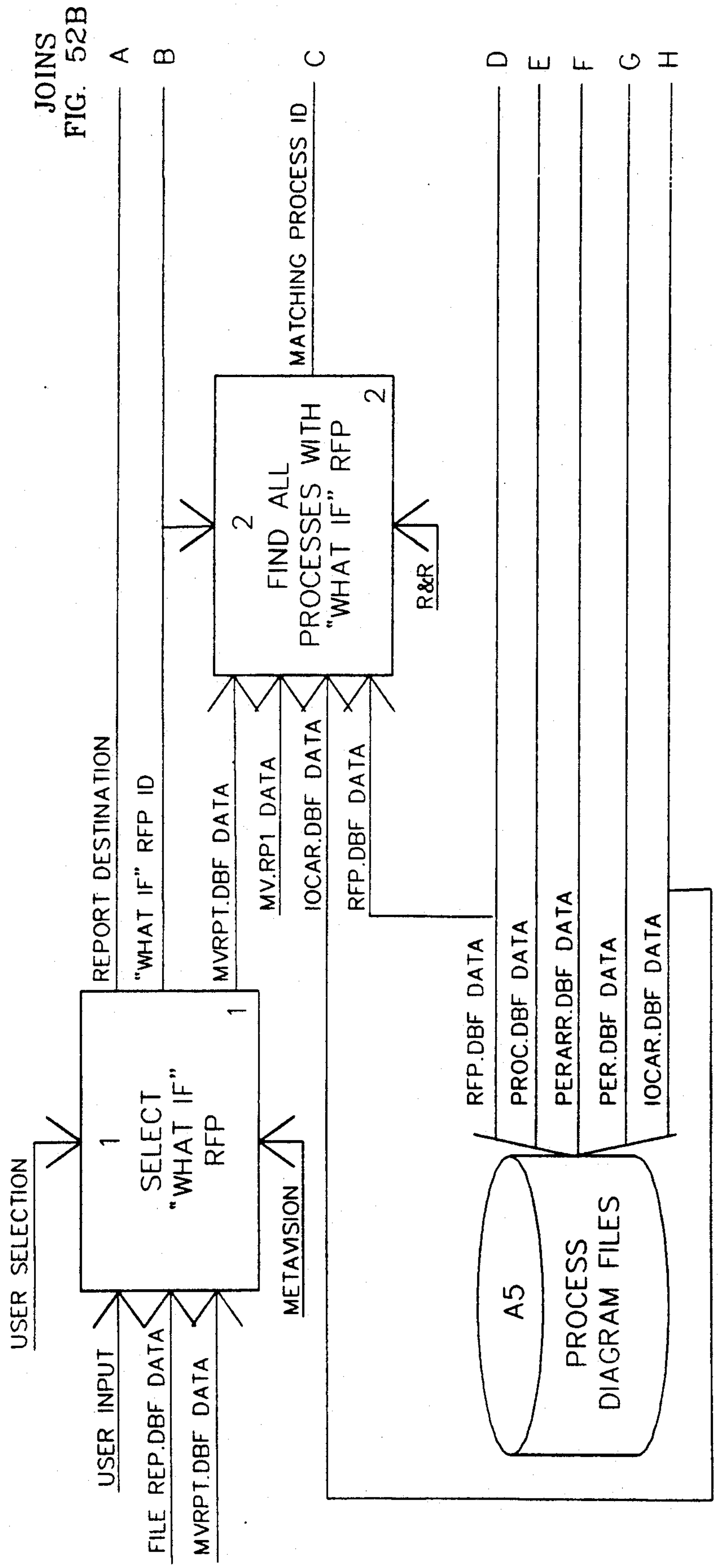
FIGS. 52A and 52B make up for FIG. 52 which is the Control What If data flow diagram.
Figure 52B:
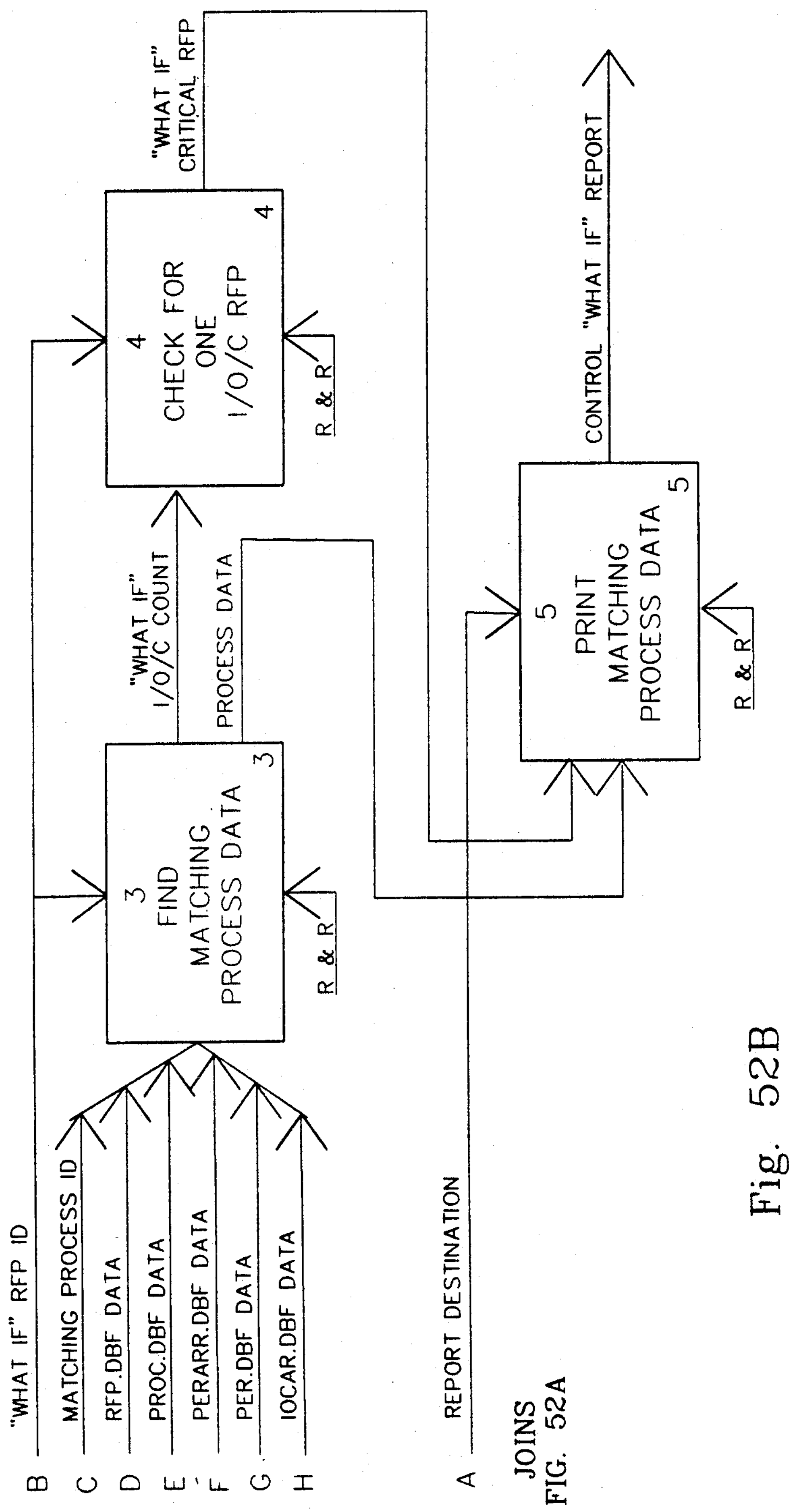

4 User Input
22 Program Flow
32 RFP.DBF Data
RFP information file.
46 CCTRL.DB Data
Transfer of control information
47 COND.DBF Data
Condition information
50 RFPD.DBF Data
RFP additional information
96 Icon Type
111 Method
The selected Methodology: Business Modeling or Software Engineering.
112 CAI.DBF Data
Action/Initialization information The Control What If shows all Processes that have the selected RFP as an Input, Output, or Control according to the following steps and as illustrated in FIG. 52, the Control What If data flow diagram. If it is the only I/O/C RFP, it is labeled as Critical.

CWHATIF1 Select "What If" RFP
The user selects the RFP to be examined by entering the RFP ID or by selecting it from the list of all RFPs. The user also selects the destination for the report.
CWHATIF2 Find All Processes With "What If" RFP
IOCAR.DBF is scanned by RFP ID (CON_ARRWID) using an index which is created for this report. Matches receive further processing.
CWHATIF3 Find Matching Process Data
Process Name is obtained from PROC.DBF. IOCAR.DBF is read to get all I/O/C RFPs for the process. RFP.DBF is read to get the RFP name. PERARR.DBF and PER.DBF are read to get Support Data.
CWHATIF4 Check For One I/O/C RFP
A counter is maintained for each type of RFP: Input, Output, and Control. If it is 1 when all data for the Process is obtained, and the only RFP is the "What If" RFP, it is marked Critical.
CWHATIF5 Print Matching Process Data
The information for each Matching Process is printed. Processing continues until all IOCAR.DBF records are examined.

During the performance of the Control what If steps, input and output data consisting of the following reports, forms and data packets are entered or generated.

4 User Input
31 PROC.DBF Data
Process information file
32 RFP.DBF Data
RFP information file.
33 IOCAR.DBF Data
Process/RFP relation
36 PER.DBF Data
Support information
37 PERARR.DBF Data
Process/Support relation
94 User Selection
105 Process Data
Information about a Process Box.
135 "What If" RFP ID
136 Report Destination
137 Matching Process ID
138 "What If" I/O/C Count
140 "What If" Critical RFP
141 MV.RP1 Data
MetaVision R&R Report Library
142 MVRPT.DBF Data
MetaVision R&R Runtime control file.
146 Control "What If" Report
151 FILE_REP.DBF Data

DWHATIF

Figure 53A:
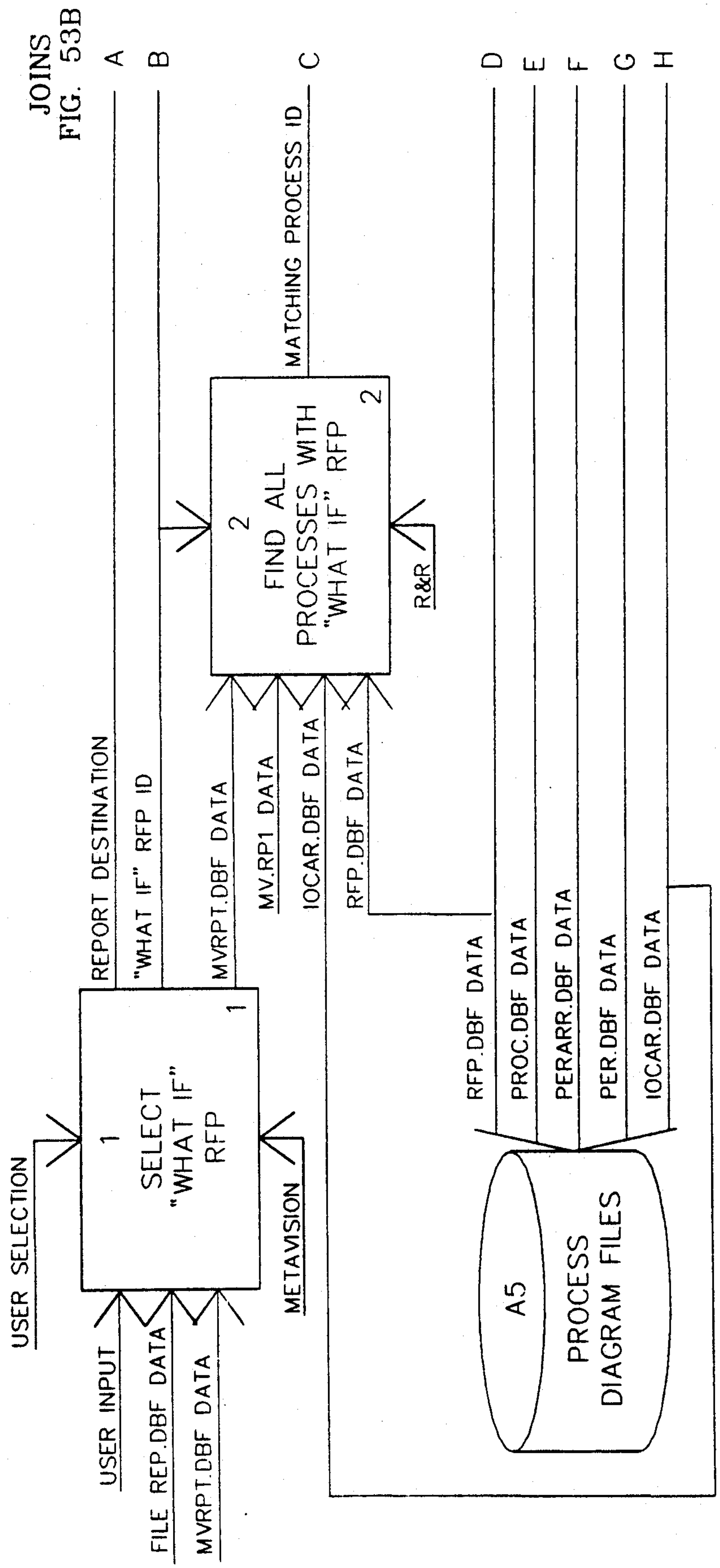
FIGS. 53A and 53B make up for FIG. 53 which is the Data What If data flow diagram.
Figure 53B:
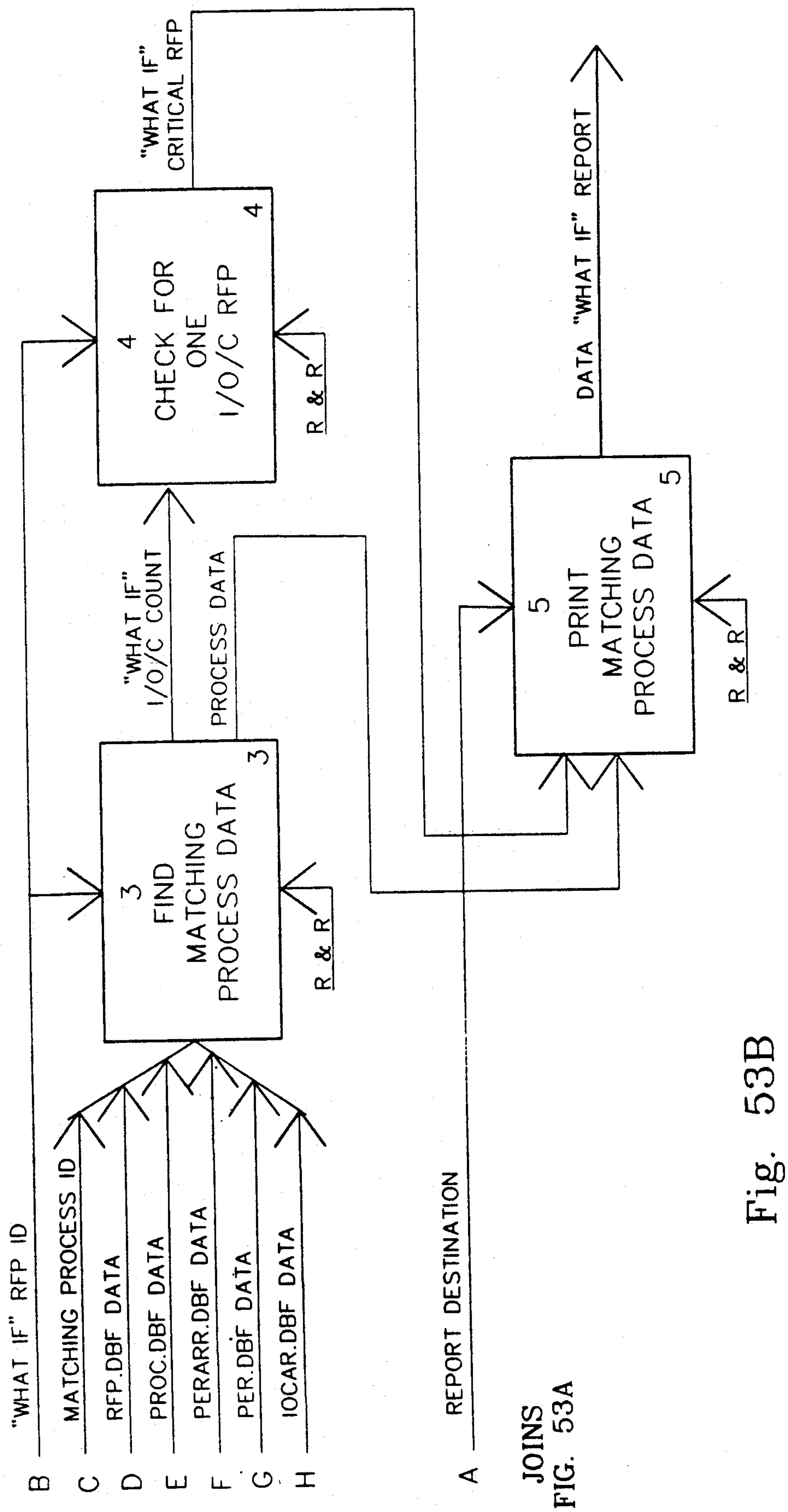

The Data What If shows all Processes that have the selected RFP as an Input, Output, or Control according to the following steps and as illustrated in FIG. 53, the Data What If data flow diagram. If it is the only I/O/C RFP, it is labeled as Critical.

DWHATIF1 Select "What If" RFP
The user selects the RFP to be examined by entering the RFP ID or by selecting it from the list of all RFPs. The user also selects the destination for the report.
DWHATIF2 Find All Processes With "What If" RFP
IOCAR.DBF is scanned by RFP ID (CON_ARRWID) using an index which is created for this report. Matches receive further processing.
DWHATIF3 Find Matching Process Data
Process Name is obtained from PROC.DBF. IOCAR.DBF is read to get all I/O/C RFPs for the process. RFP.DBF is read to get the RFP name. PERARR.DBF and PER.DBF are read to get Support Data.
DWHATIF4 Check For One I/O/C RFP
A counter is maintained for each type of RFP: Input, Output, and Control. If it is 1 when all data for the Process is obtained, and the only RFP is the "What If" RFP, it is marked Critical.
DWHATIF5 Print Matching Process Data
The information for each Matching Process is printed. Processing continues until all IOCAR.DBF records are examined.

During the performance of the Data What If steps, input and output data consisting of the following reports, forms and data packets are entered or generated.

Figure 54:
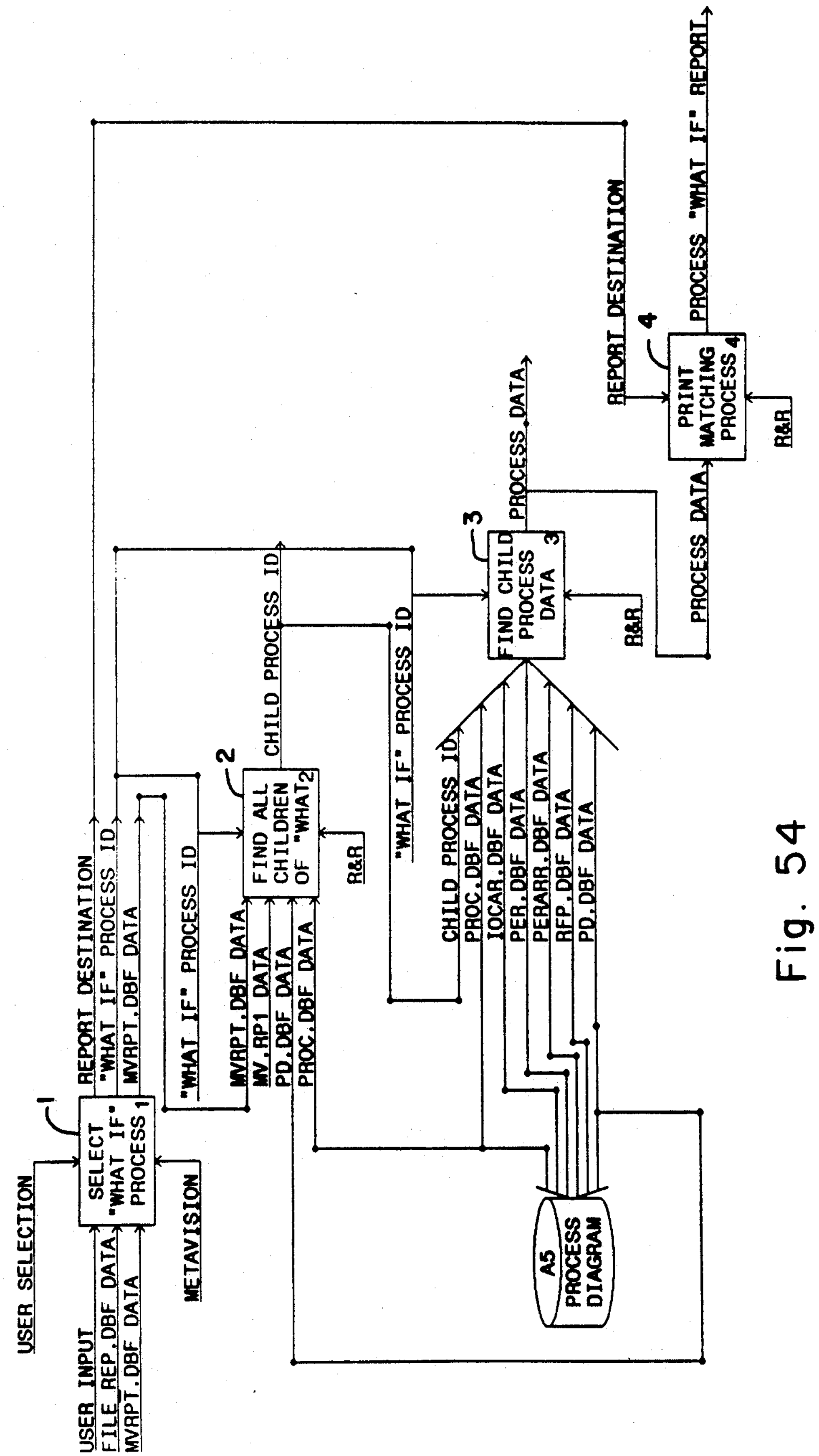
FIG. 54 is the Process What If data flow diagram.

4 User Input
31 PROC.DBF Data
Process information file
32 RFP.DBF Data
RFP information file.
33 IOCAR.DBF Data
Process/RFP relation
36 PER.DBF Data
Support information
37 PERARR.DBF Data
Process/Support relation
94 User Selection
105 Process Data
Information about a Process Box.
135 "What If" RFP ID
136 Report Destination
137 Matching Process ID
138 "What If" I/O/C Count
139 Data "What If" Report
140 "What If" Critical RFP
141 MV.RP1 Data
MetaVision R&R Report Library
142 MVRPT.DBF Data
MetaVision R&R Runtime control file.
151 FILE_REP.DBF Data The Process What If shows all Child Processes of the selected Process according to the following steps and as illustrated in FIG. 54, the Process What If data flow diagram.

PWHATIF1 Select "What If"
The user selects the Process to be examined by entering the Process ID or by selecting it from the list of all Processes. The user also selects the destination for the report.
PWHATIF2 Find All Children of "What If" Process
PD.DBF is scanned by Process ID. Matches receive further processing.
PWHATIF3 Find Child Process Data
Process Name is obtained from PROC.DBF. IOCAR.DBF is read to get all I/O/C RFPs for the process. RFP.DBF is read to get the RFP name. PERARR.DBF and PER.DBF are read to get Support Data.
PWHATIF4 Print Matching Process Data
The information for each Matching Process is printed. Processing continues until all PERARR.DBF records are examined.

During the performance of the Process What If steps, input and output data consisting of the following reports, forms and data packets are entered or generated.

Figure 55A:
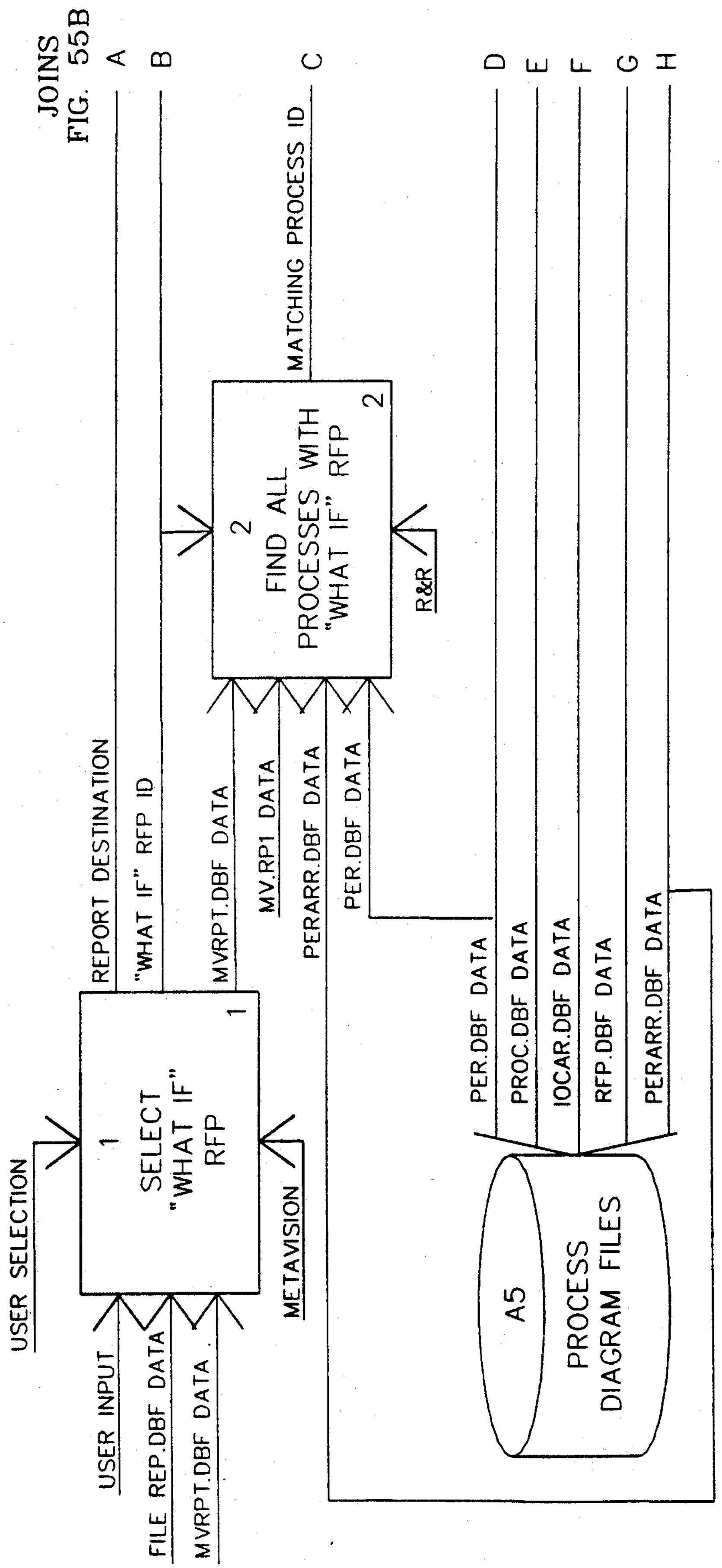
FIGS. 55A and 55B make up for FIG. 55 which is the Support What If data flow diagram.
Figure 55B:
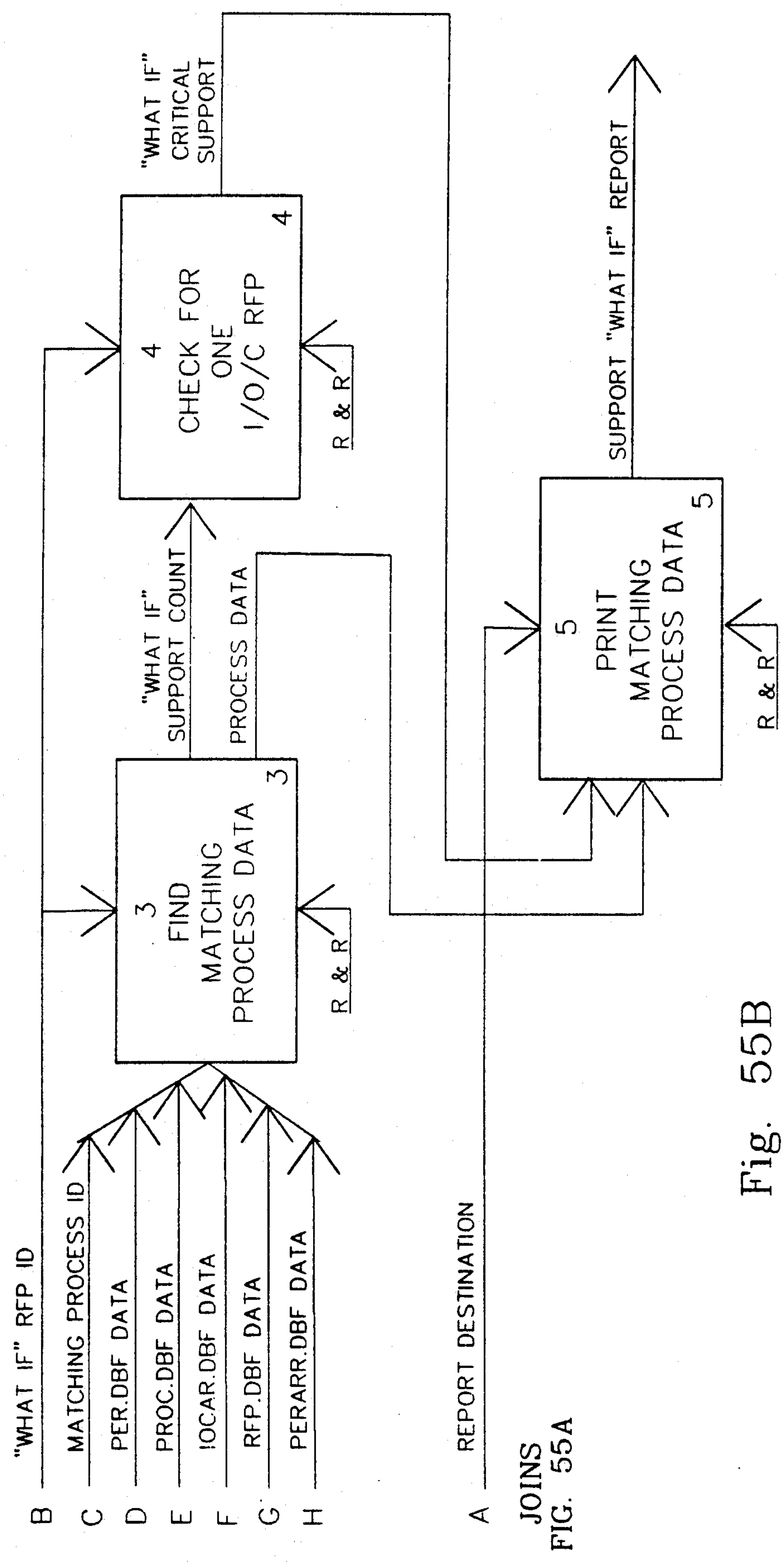

4 User Input
31 PROC.DBF Data
Process information file
32 RFP.DBF Data
RFP information file.
33 IOCAR.DBF Data
Process/RFP relation
36 PER.DBF Data
Support information
37 PERARR.DBF Data
Process/Support relation
45 PD.DBF Data
V Process decomposition information
94 User Selection
105 Process Data
Information about a Process Box.
136 Report Destination
141 MV.RP1 Data
MetaVision R&R Report Library
142 MVRPT.DBF Data
MetaVision R&R Runtime control file.
143 "What If" Process ID
144 Child Process ID
145 Process "What If" Report
151 FILE_REP.DBF Data The Support What If shows all Processes that have the selected Support according to the following steps and as illustrated in FIG. 55, the Support What If data flow diagram. If it is the only Support for the Process, it is labeled as SWHATIF1 Select "What If" Support
The user selects the Support to be examined by entering the Support ID or by selecting it from the list of all Supports. The user also selects the destination for the report.
SWHATIF2 Find All Processes With "What If" Support
PERARR.DBF is scanned by Support (PERSONALID) using an index PERARR2.NDX. Matches receive further processing.
SWHATIF3 Find Matching Process Data
Process Name is obtained from PROC.DBF. IOCAR.DBF is read to get all I/O/C RFPs for the process. RFP.DBF is read to get the RFP name. PERARR.DBF and PER.DBF are read to get Support Data.

SWHATIF4 Check For One Support

A counter is maintained for Supports. If it is 1 when all data for the Process is obtained, and the only Support is the "What If" Support, it is marked Critical.

SWHATIF5 Print Matching Process Data

The information for each Matching Process is printed. Processing continues until all PERARR.DBF records are examined.

During the performance of the Support What If steps, input and output data consisting of the following reports, forms and data packets are entered or generated.

Figure 56:
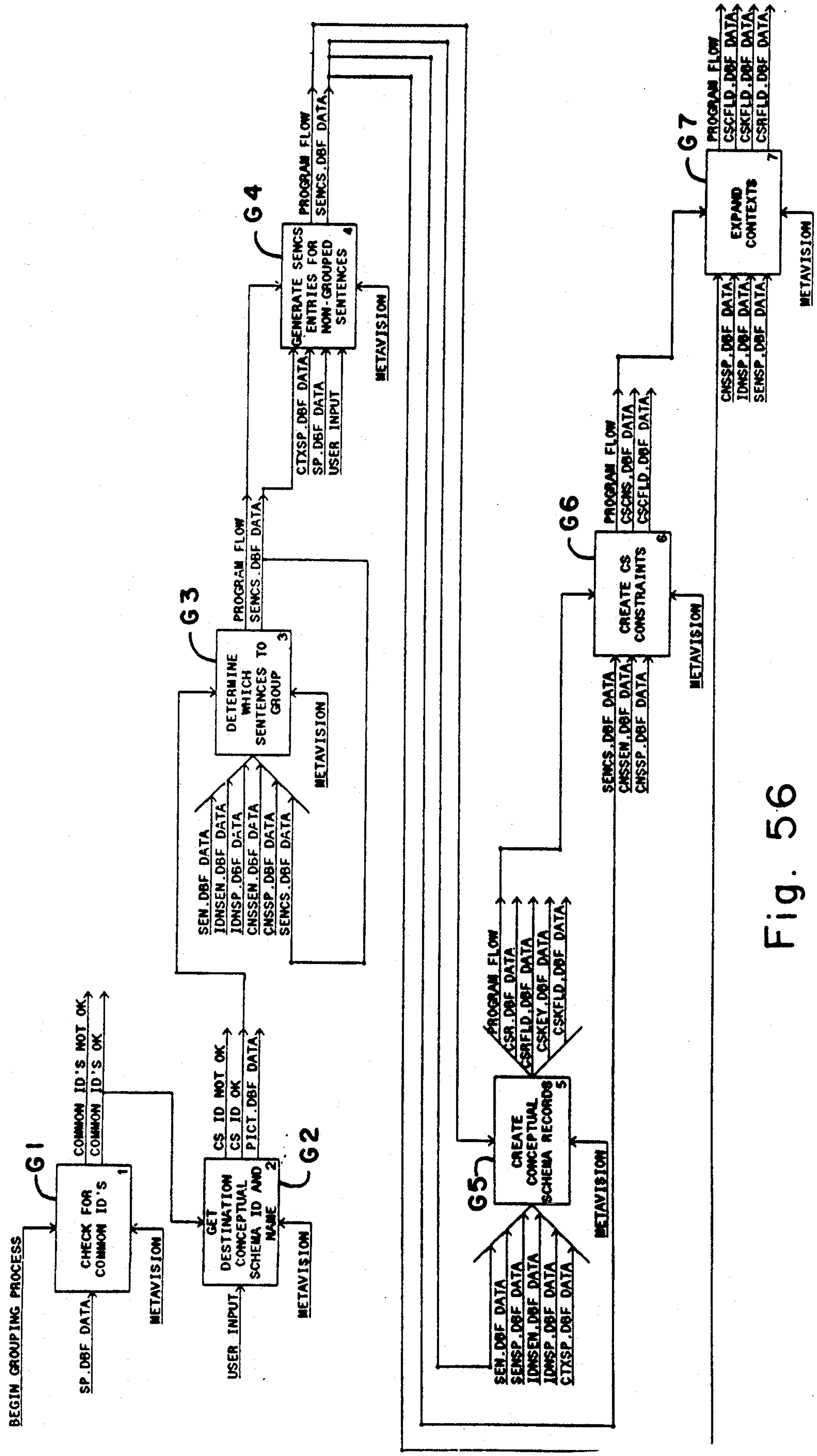
FIG. 56 is the Grouping data flow diagram.

4 User Input
31 PROC.DBF Data
Process information file
32 RFP.DBF Data
RFP information file.
33 IOCAR.DBF Data
Process/RFP relation
36 PER.DBF Data
Support information
37 PERARR.DBF Data
Process/Support relation
94 User Selection
105 Process Data
Information about a Process Box.
136 Report Destination
137 Matching Process ID
141 MV.RP1 Data
MetaVision R&R Report Library
142 MVRPT.DBF Data
MetaVision R&R Runtime control file.
147 Support "What If" Report
148 "What If" Support ID
149 "What If" Support Count
150 "What If" Critical Support
151 FILE_REP.DBF Data Group Question Map sentences with uniqueness constraints and equality database integrity constraints are created according to the following steps and as illustrated in FIG. 56, the Grouping data flow diagram.

GROUP1 Check for Common ID's

Make sure all Common ID fields in SP.DBF are non-blank.

GROUP2 Get destination Conceptual Schema Id and Name

Get CS ID and Name.

GROUP3 Determine which sentences to group.

Determine which sentences to group—sentences with identical uniqueness constraints and equality database integrity constraints involving the same roles.

GROUP4 Generate SENCS entries for non-grouped sentences

Generate SENCS entries for sentences not being grouped, and for Context Sentences, find out whether or not to expand them.

GROUP5 Create Conceptual Schema Records

Create correct Conceptual Schema records based on SENCS which lists all CS records and which sentences participate in them.

GROUP6 Create CS Constraints

Create Conceptual Schema Constraints from Question Map Constraints and the Sentence/CS Record translation table SENCS.

GROUP7 Expand Contexts

Expand Context Fields indicated to be expanded. Expand means to add context sentence fields to CS records where the context role appeared.

During the performance of the Grouping steps, input and output data consisting of the following reports, forms and data packets are entered or generated.

Figure 57:
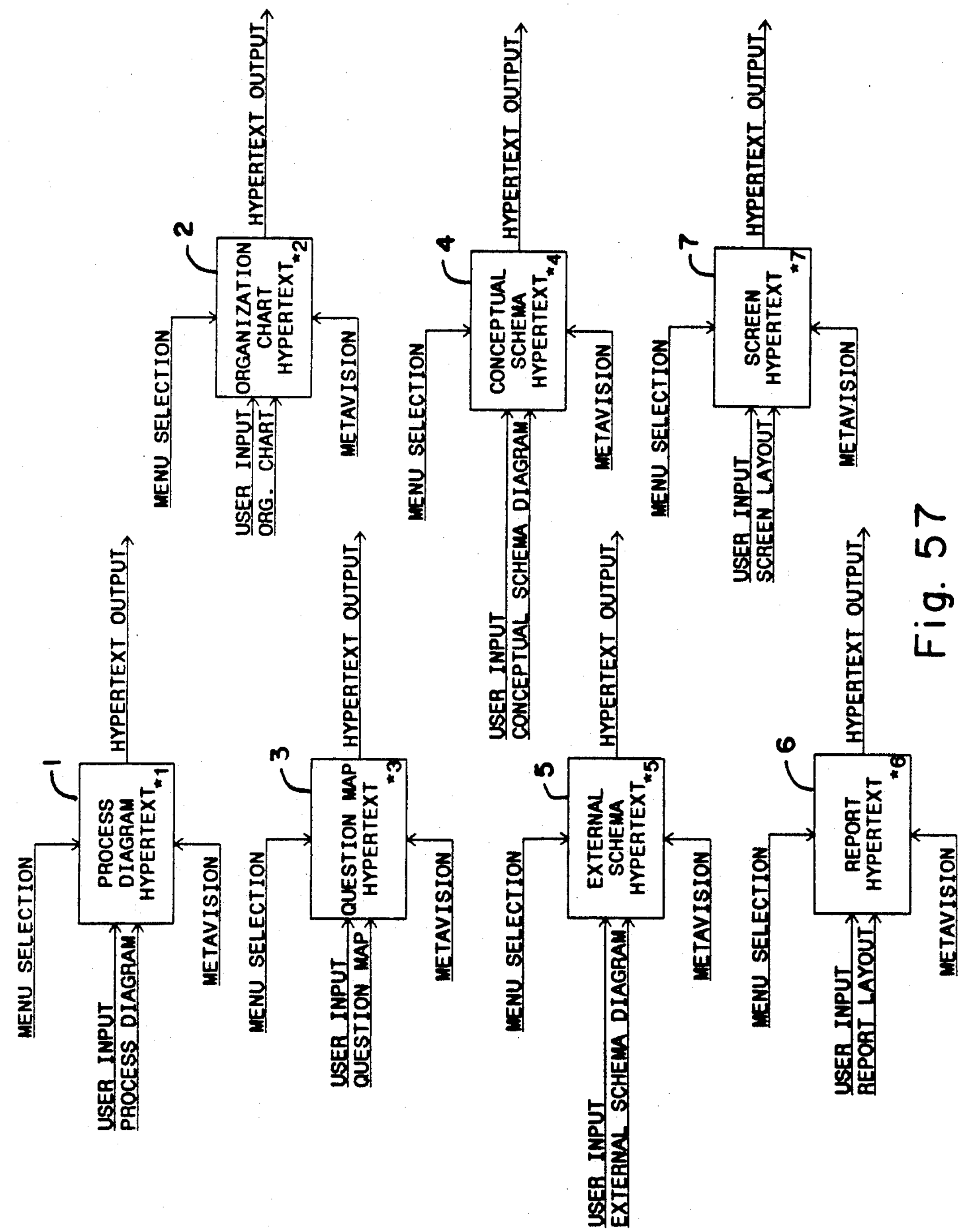
FIG. 57 is the Hypertext Processing data flow diagram.
Figure 58A:
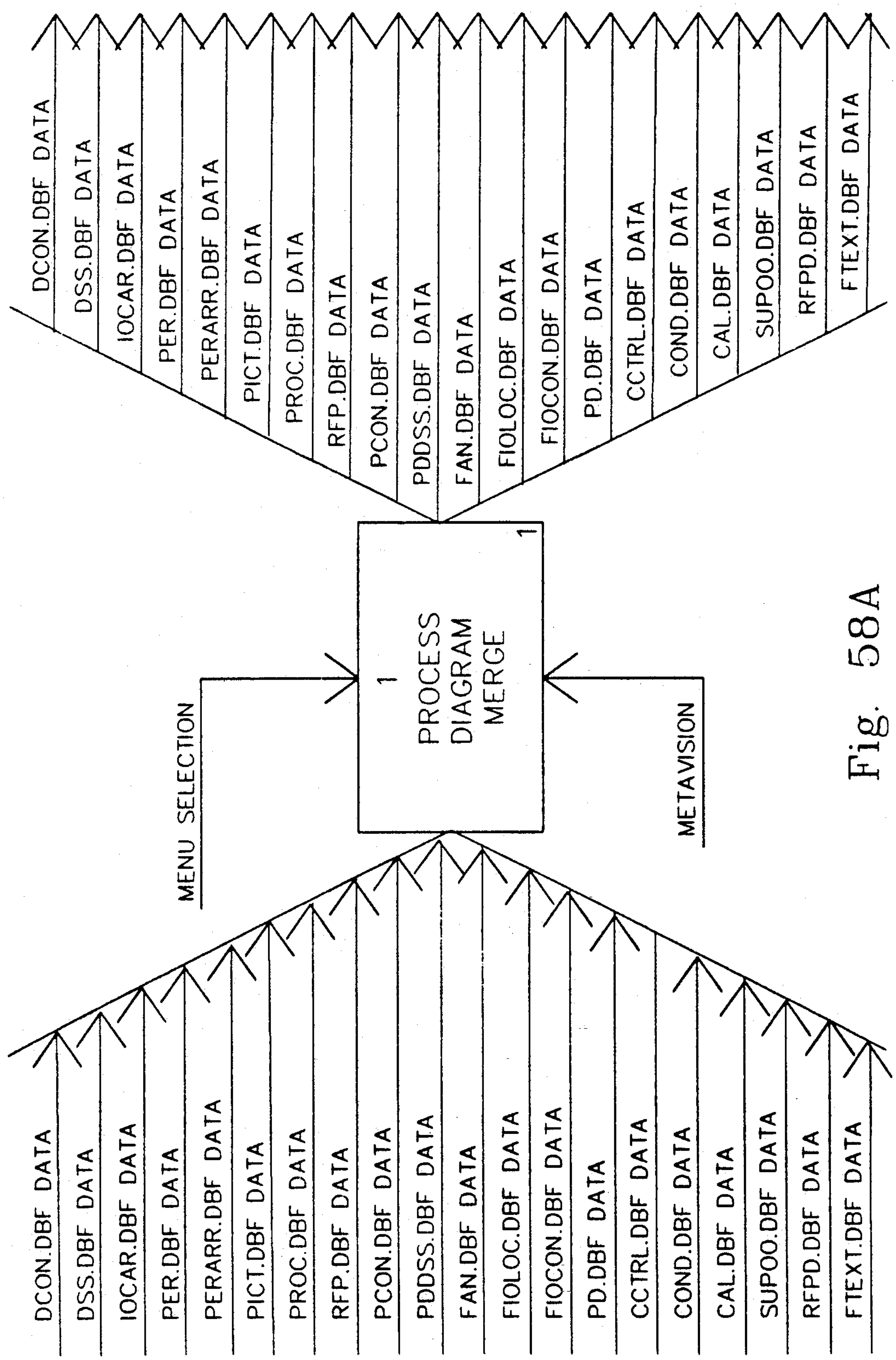
FIGS. 58A, 58B, 58C, 58D, 58E, 58F, 58G and 58H make up for FIG. 58 which illustrates the Merge processes for two copies of a file, one in the source directory and one in the destination directory.
Figure 58B:
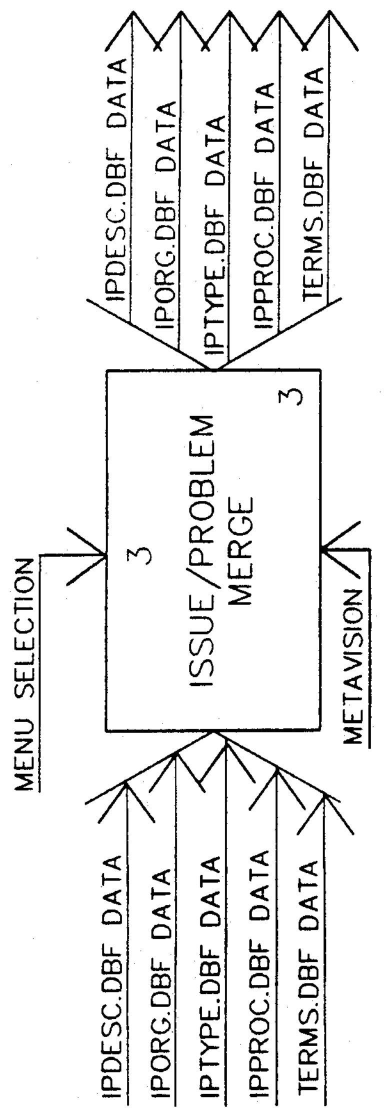
Figure 58C:
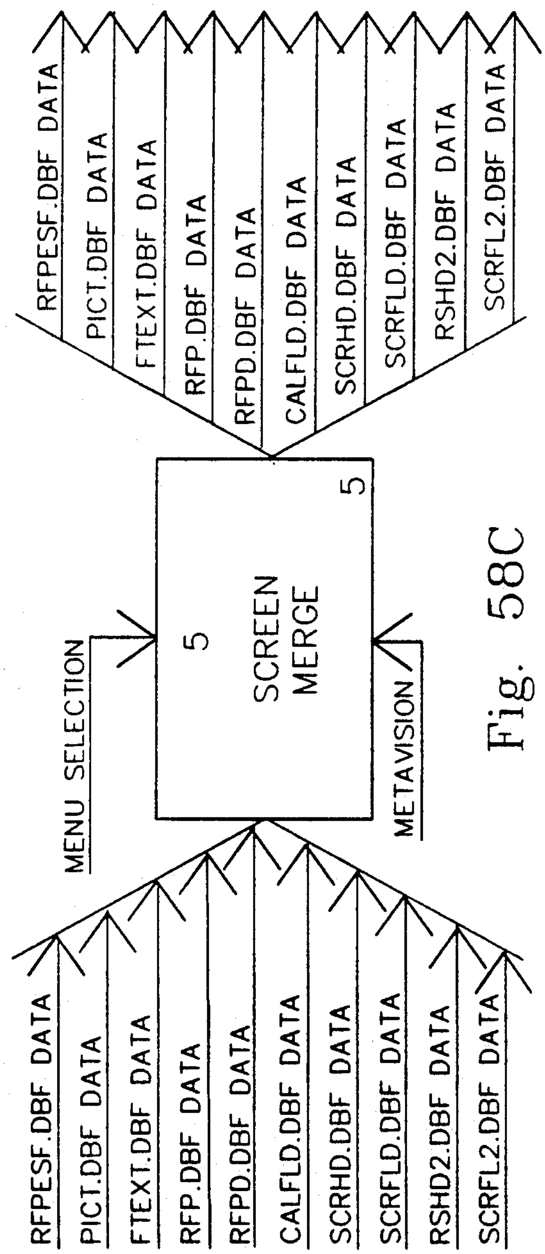
Figure 58D:
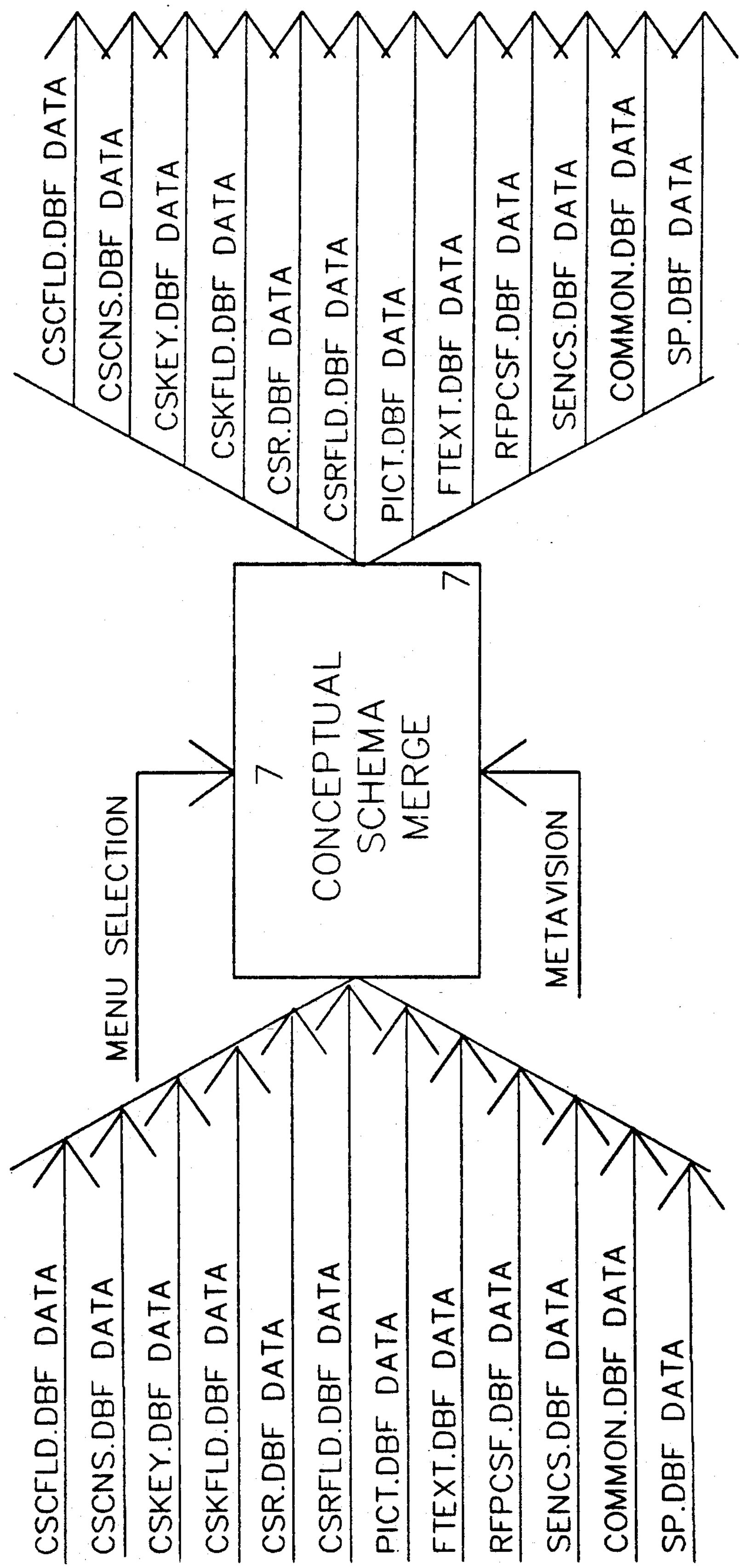
Figure 58E:
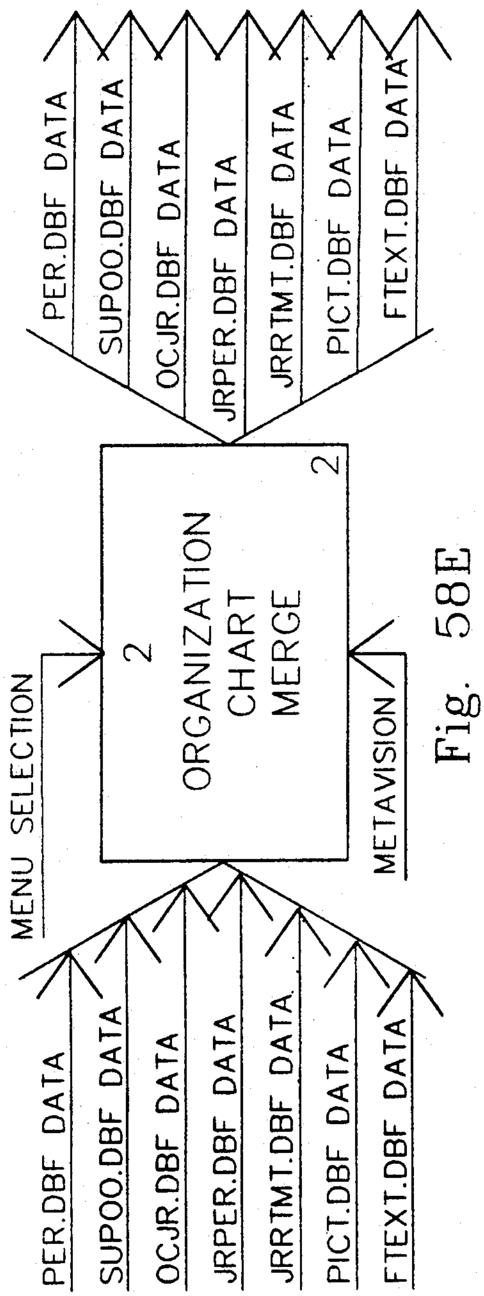
Figure 58F:
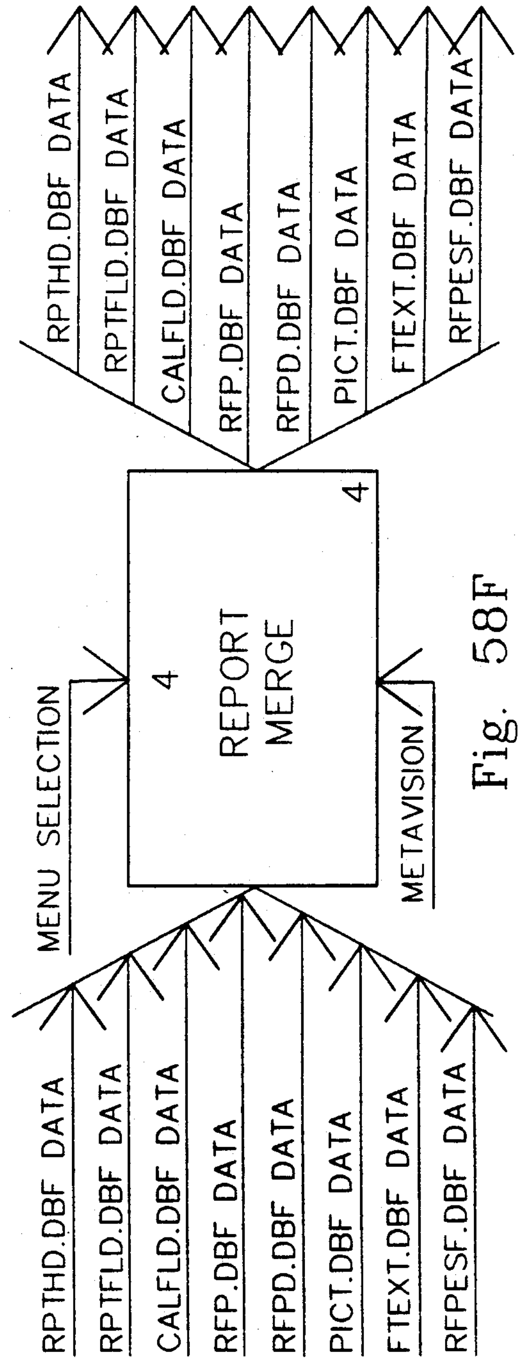
Figure 58G:
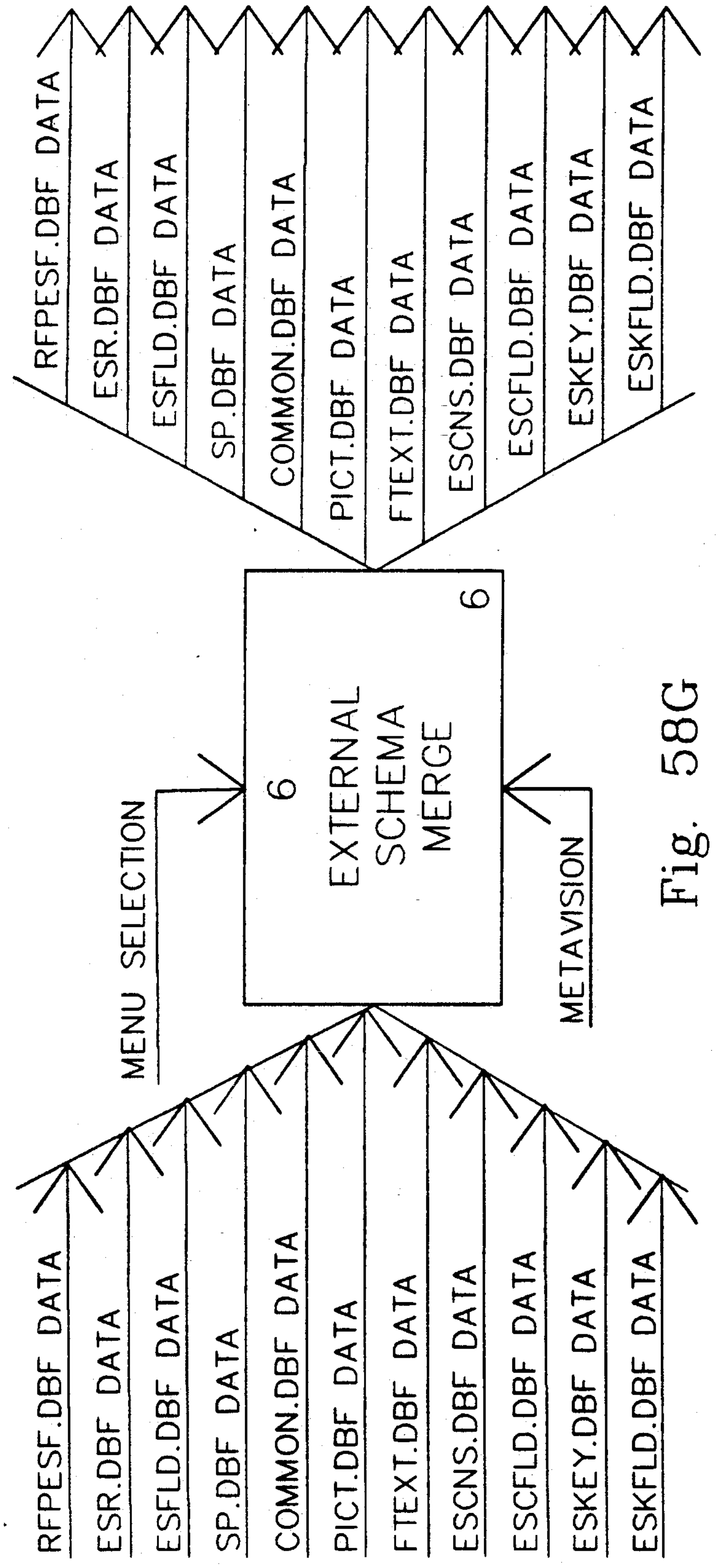
Figure 58H:
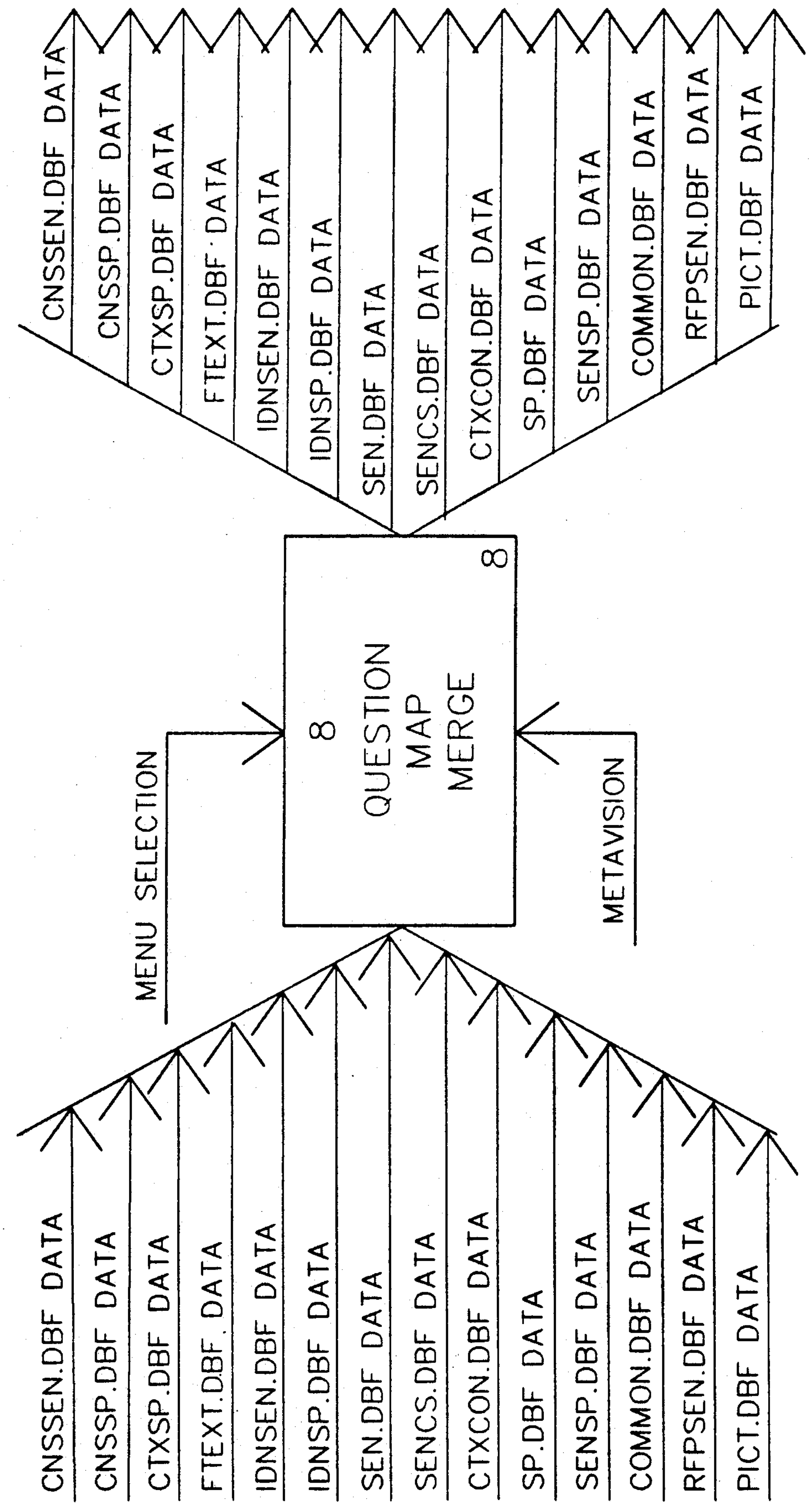

1 SENCS.DBF Data
This is the Sentence/ Conceptual Schema Record relation.
2 CTXSP.DBF Data
Context/Role relation.
3 SP.DBF Data
Role/Field Information
4 User Input
5 Common ID's 0K
6 PICT.DBF Data
Picture information
7 IDNSEN.DBF Data
The Identifier/Sentence relation
8 IDNSP.DBF Data
Identifier/Role Relation.
9 CNSSEN.DBF Data
Constraint Sentence and Route information
10 SEN.DBF Data
Sentence information
11 CNSSP.DBF Data
Constraint Role relation.
12 SENSP.DBF Data
The Sentence/Role relation
13 CSR.DBF Data
Conceptual Schema Record information
14 CSRFLD.DBF Data
Conceptual Schema Record/Field relation
15 CSKEY.DBF Data
CS Key information
16 CSKFLD.DBF Data
CS Key/Field relation
17 CSCNS.DBF Data
Conceptual Schema Constraint information
18 Begin grouping process
19 Common ID's not 0K
20 CS ID 0K
21 CS ID Not 0K
22 Program Flow
23 CSCFLD.DBF Data
Conceptual Schema Constraint/Field relation Hypertext Menu Selections are processed according to the following steps and as illustrated in FIG. 57, the Hypertext Processing data flow diagram.

HYPER1 Process Diagram Hypertext
Process Diagram Hypertext selections
HYPER2 Organization Chart Hypertext
Process Org. Chart Hypertext
HYPER3 Question Map Hypertext
Process Question Map Hypertext
HYPER4 Conceptual Schema Hypertext Process Conceptual Schema Hypertext HYPER5 External Schema Hypertext
Process External Schema Hypertext HYPER6 Report Hypertext
Process Report Hypertext HYPER7 Screen Hypertext
Process Screen Hypertext During the performance of the Hypertext Processing steps, input and output data consisting of the following reports, forms and data packets are entered or generated.

4 User Input

38 Menu Selection

78 Hypertext Output

79 Process Diagram
Process Diagram

80 Org. Chart
Organization Chart on the screen

81 Question Map
Question Map on the screen

82 Conceptual Schema Diagram
Conceptual Schema Diagram on the screen

83 External Schema Diagram
External Schema Diagram on the screen

84 Screen Layout
Screen Layout on the screen

85 Report Layout
Report Layout on the screen

MERGE Database Merge

Merge processes two copies of a file, one in the source directory and one in the destination directory according to the following steps and as illustrated in FIG. 58.

MERGE1 Process Diagram Merge
If dest. record does not exist, add from source file. If dest. record exists, non-blank dest. fields in both cause message and dest. takes precedence. If dest. field is blank, copy source.

MERGE2 Organization Chart Merge
If dest. record does not exist, add from source file. If dest. record exists, non-blank dest. fields in both cause message and dest. takes precedence. If dest. field is blank, copy source.

MERGE3 Issue/Problem Merge
If dest. record does not exist, add from source file. If dest. record exists, non-blank dest. fields in both cause message and dest. takes precedence. If dest. field is blank, copy source.

MERGE4 Report Merge
If dest. record does not exist, add from source file. If dest. record exists, non-blank dest. fields in both cause message and dest. takes precedence. If dest. field is blank, copy source.

MERGE5 Screen Merge
If dest. record does not exist, add from source file. If dest. record exists, non-blank dest. fields in both cause message and dest. takes precedence. If dest. field is blank, copy source.

MERGE6 External Schema Merge
If dest. record does not exist, add from source file. If dest. record exists, non-blank dest. fields in both cause message and dest. takes precedence. If dest. field is blank, copy source.

MERGE7 Conceptual Schema Merge
If dest. record does not exist, add from source file. If dest. record exists, non-blank dest. fields in both cause message and dest. takes precedence. If dest. field is blank, copy source.

MERGE8 Question Map Merge
If dest. record does not exist, add from source file. If dest. record exists, non-blank dest. fields in both cause message and dest. takes precedence. If dest. field is blank, copy source.

During the performance of the Database Merge steps, input and output data consisting of the following reports, forms and data packets are entered or generated.

1 SENCS.DBF Data
This is the Sentence/ Conceptual Schema Record relation.

2 CTXSP.DBF Data
Context/Role relation.

3 SP.DBF Data
Role/Field Information

6 PICT.DBF Data
Picture information

7 IDNSEN.DBF Data
The Identifier/Sentence relation

8 IDNSP.DBF Data
Identifier/Role Relation.

9 CNSSEN.DBF Data
Constraint Sentence and Route information

10 SEN.DBF Data
Sentence information

11 CNSSP.DBF Data
Constraint Role relation.

12 SENSP.DBF Data
The Sentence/Role relation

13 CSR.DBF Data
Conceptual Schema Record information

14 CSRFLD.DBF Data
Conceptual Schema Record/Field relation

15 CSKEY.DBF Data
CS Key information

16 CSKFLD.DBF Data
CS Key/Field relation

17 CSCNS.DBF Data
Conceptual Schema Constraint information

23 CSCFLD.DBF Data
Conceptual Schema Constraint/Field relation

31 PROC.DBF Data
Process information file

32 RFP.DBF Data
RFP information file.

33 IOCAR.DBF Data
Process/RFP relation

34 DSS.DBF Data
Data Source/Sink information

35 DCON.DBF Data
Data Source/Sink connection information.

36 PER.DBF Data
Support information

37 PERARR.DBF Data
Process/Support relation

38 Menu Selection

40 PCON.DBF Data
Process to process connection information

41 PDDSS.DBF Data
Process Diagram/Data Source Sink relation

42 FAN.DBF Data
RFP Owning/Owned relation

Figure 59A:
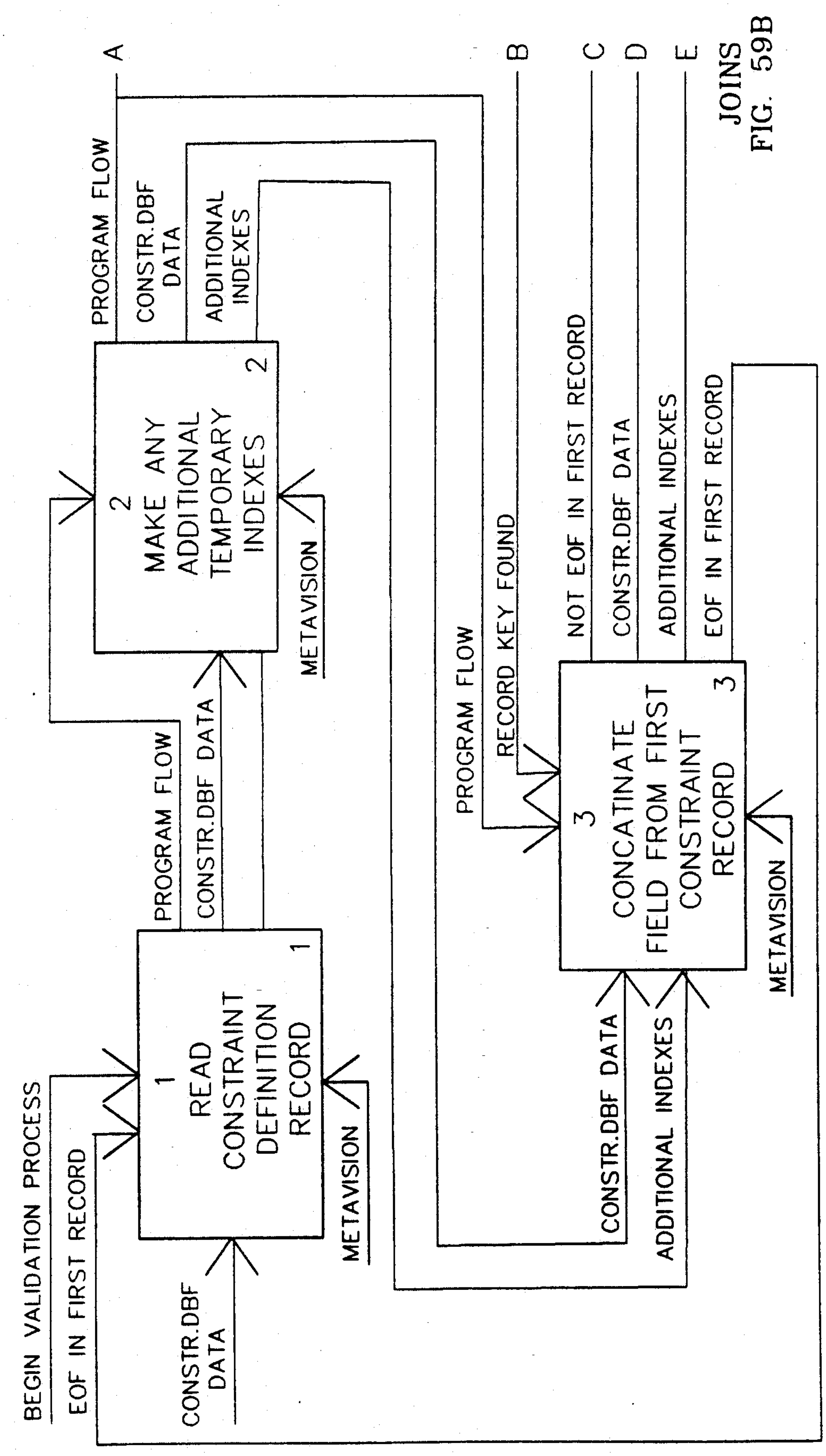
FIGS. 59A and 59B make up for FIG. 59 which is the Constraint Validation data flow diagram.
Figure 59B:
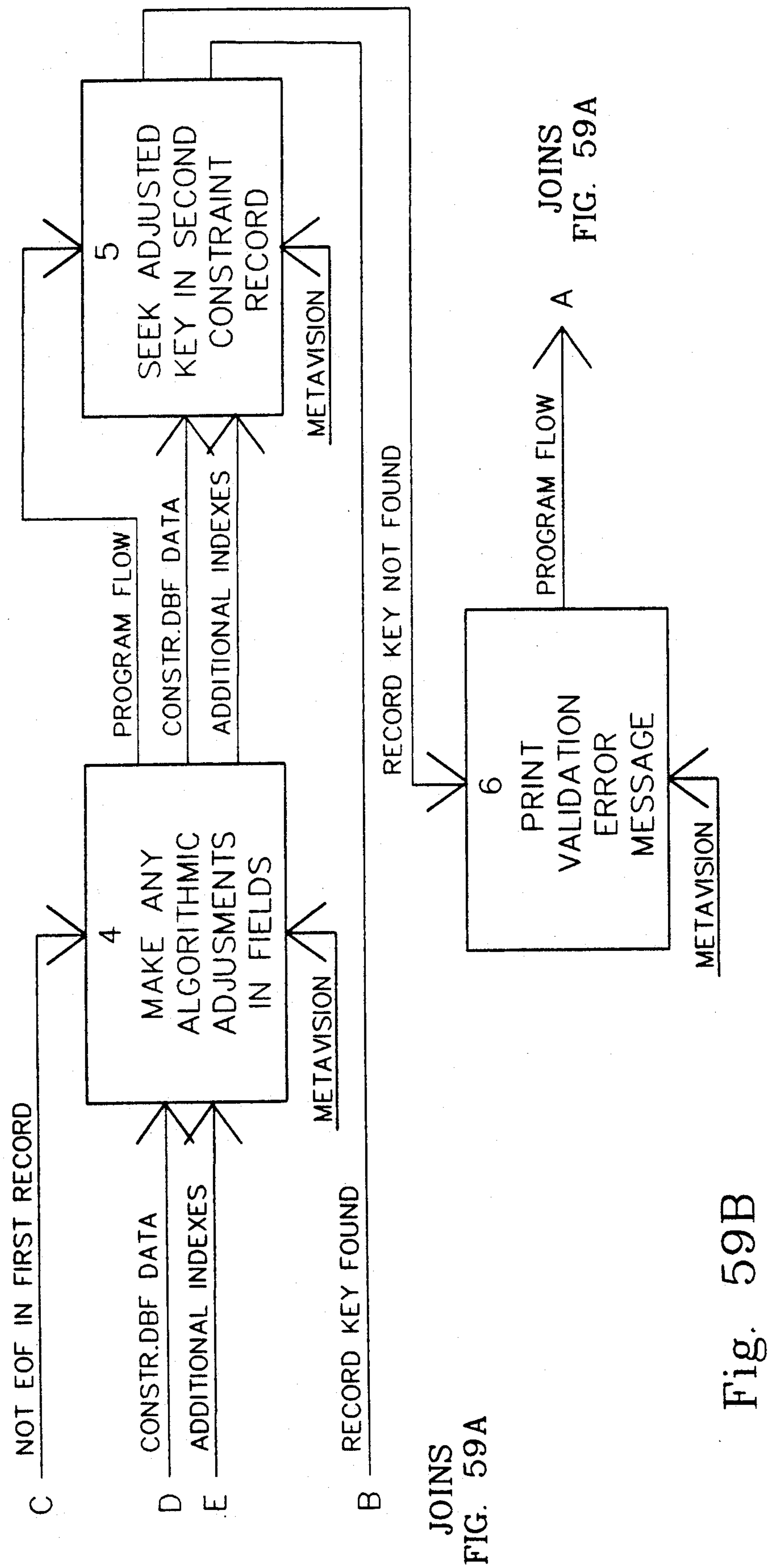

43 FIOLOC.DBF Data
Fan location on Process diagram
44 FIOCON.DBF Data
Fan to process connection information
45 PD.DBF Data
Process decomposition information
46 CCTRL.DBF Data
Transfer of control information
47 COND.DBF Data
Condition information
48 CAI.DBF Data
Action/Initialization information
49 SUPOO.DBF Data
Support to Support relation
50 RFPD.DBF Data
RFP additional information
51 IPDESC.DBF Data
Issue Problem Description
52 IPORG.DBF Data
Issue Problem Owning Organization
53 IPTYPE.DBF Data
Issue Problem Type
54 IPPROC.DBF Data
Issue Problem related Process ID
55 TERMS.DBF Data
Glossary of terms.
56 OCJR.DBF Data
Org. Chart Job Role location
57 JRPER.DBF Data
Job Role Person relation
58 JRRTMT DBF Data
Job Role Reports To/Matrixed To information
59 FTEXT.DBF Data
Free Text information
60 RPTHD.DBF Data
Report Header information
61 RPTFLD.DBF Data
Report Field information
62 CALFLD.DBF Data
Calculated Field information
63 RFPESF.DBF Data
RFP/External Schema Field relation
64 SCRHD.DBF Data
Screen Header information
65 SCRFLD.DBF Data
Screen Field information
66 RSHD2.DBF Data
Screen Header additional information
67 SCRFL2.DBF Data
Screen Field additional information
68 RFPCSF.DBF Data
RFP/Conceptual Schema Field relation
69 CTXCON.DBF Data
Context Connection information
70 COMMON.DBF Data
Common information
71 RFPSEN.DBF Data
RFP/Sentence relation
72 ESR.DBF Data
External Schema Record Information
73 ESFLD.DBF Data
External Schema Record/Field relation
74 ESCNS.DBF Data
External Schema Constraint information
75 ESCFLD.DBF Data
External Schema Constraint Field information
76 ESKEY.DBF Data
External Schema Key information
77 ESKFLD.DBF Data
External Schema Key Field information Validation uses only subset constraints according to the following steps and as illustrated in FIG. 59, the Constraint Validation data flow diagram. The constraint fields from the first constraint record are formed into a key which is used to read the second record. Non-existence→violation.

VALID1 Read Constraint Definition Record
Read constraint definition record from CONSTR.DBF. All constraints are described in machine readable format in this file, including participating fields, field order, etc.
VALID2 Make any additional temporary indexes
The first constraint record is read sequentially. The second is read with a key-read. If no index file for the second record exists using the constraint fields, a temporary one is created.
VALID3 Concatenate fields from first constraint record
Concatenate the fields used by the constraint from first constraint record to form a key.
VALID4 Make any algorithmic adjustments in fields
Make any algorithmic adjustments called for in the constraint fields of the first constraint record. This information is not included in the Constraint information file.
VALID5 Seek adjusted key in second constraint record.
Read second constraint record to determine existence of adjusted record key from the first constraint record. Non-existence implies a constraint violation.
VALID6 Print validation error message
Print message of this constraint violation into error message file.

During the performance of the Constraint Validation steps, input and output data consisting of the following reports, forms and data packets are entered or generated.

Figure 60:
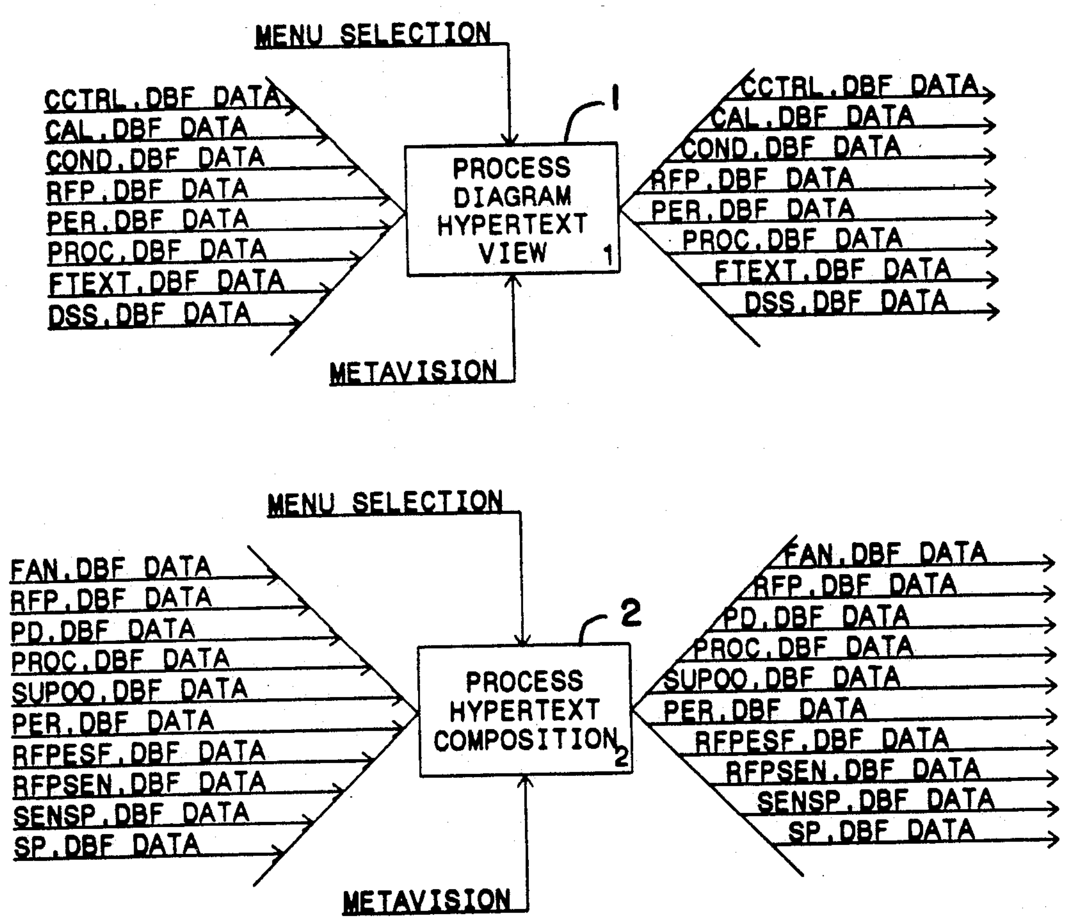
FIG. 60 is the Process Diagram Hypertext data flow diagram

22 Program Flow
24 CONSTR.DBF Data
Constraint information database
25 Begin Validation Process
26 Additional indexes
Temporary additional indexes created for the validation operation.
27 Record key not found
28 Record key found
29 Not EOF in first record
30 EOF in first record Process Diagram Hypertext selections are Processed according to the following steps and as illustrated in FIG. 60, the Process Diagram Hypertext data flow diagram HYPER11 Process Diagram Hypertext View
Process Hypertext View option. This option brings up the Edit dialog boxes in view mode.
HYPER12 Process Hypertext Composition
Process Hypertext Composition Option. This option displays entity composition.

During the performance of the Process Diagram Hypertext steps, input and output data consisting of the following reports, forms and data packets are entered or generated.

Figure 61:
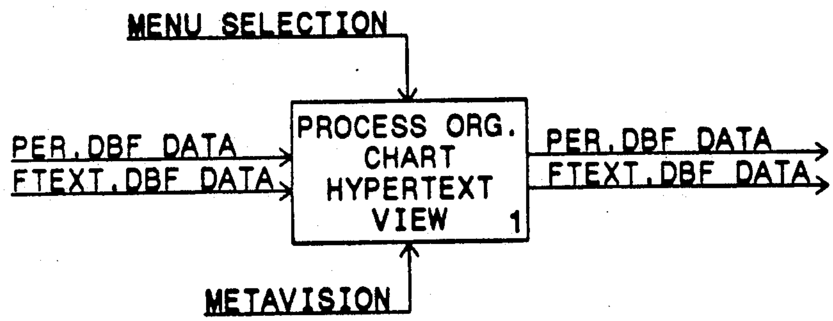
FIG. 61 is the Organization Chart Hypertext data flow diagram.

3 SP.DBF Data
  Role/Field Information
12 SENSP.DBF Data
  The Sentence/Role relation
31 PROC.DBF Data
  Process information file
32 RFP.DBF Data
  RFP information file.
34 DSS.DBF Data
  Data Source/Sink information
36 PER.DBF Data
  Support information
38 Menu Selection
42 FAN.DBF Data
  RFP Owning/Owned relation
45 PD.DBF Data
  Process decomposition information
46 CCTRL.DBF Data
  Transfer of control information
47 COND.DBF Data
  Condition information
48 CAI.DBF Data
  Action/Initialization information
49 SUPOO.DBF Data
  Support to Support relation
59 FTEXT.DBF Data
  Free Text information
63 RFPESF.DBF Data
  RFP/External Schema Field relation
71 RFPSEN.DBD Data
  RFP/Sentence relation Organization Chart Hypertext is Processed according to the following steps and as illustrated in FIG. 61, the Organization Chart Hypertext data flow diagram.

HYPER21 Process Org. Chart Hypertext View
  Process Hypertext View option. This option brings up the Edit dialog boxes in view mode.

During the performance of the Organization Chart Hypertext steps, input and output data consisting of the following reports, forms and data packets are entered or generated.

Figure 62:
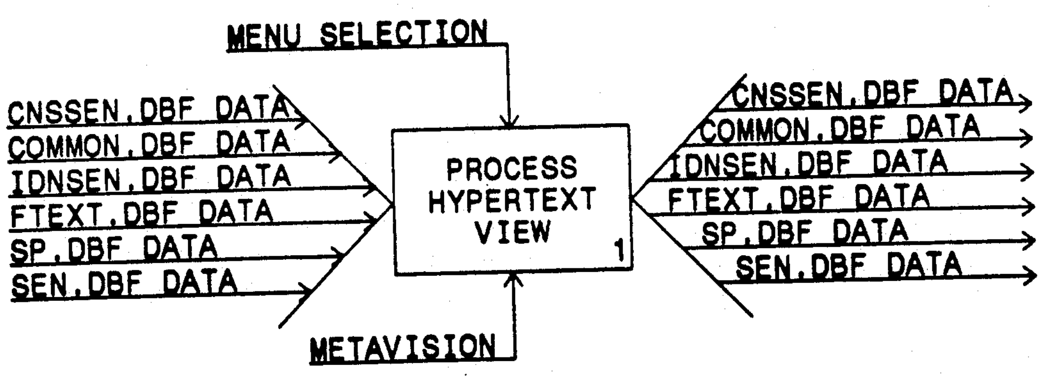
FIG. 62 is the Question Map Hypertext data flow diagram

36 PER.DBF Data
  Support information
38 Menu Selection
59 FTEXT.DBF Data Question Map Hypertext is Processed according to the following steps and as illustrated in FIG. 62, the Question Map Hypertext data flow diagram HYPER31 Process Hypertext View
  Process Hypertext View option. This option brings up the Edit dialog boxes in view mode.

During the performance of the Question Map Hypertext steps, input and output data consisting of the following reports, forms and data packets are entered or generated.

Figure 63:
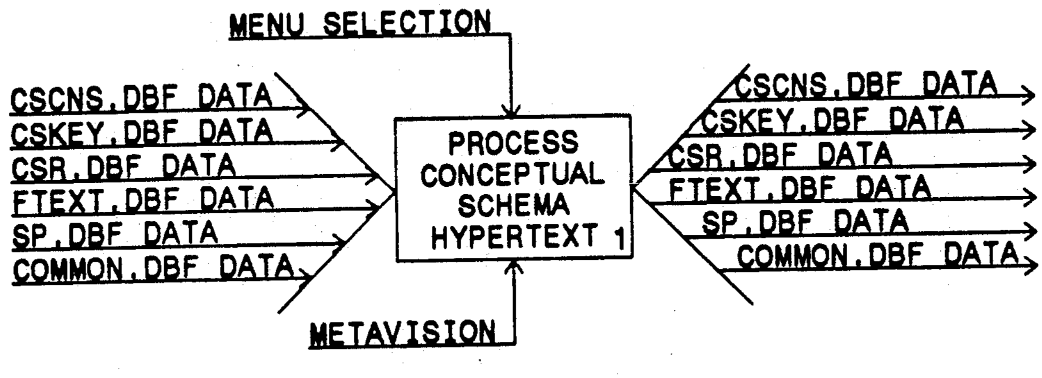
FIG. 63 is the Conceptual Schema Hypertext data flow diagram

3 SP.DBF Data
  Role/Field Information
7 IDNSEN.DBF Data
  The Identifier/Sentence relation
9 CNSSEN.DBF Data
  Constraint Sentence and Route information
10 SEN.DBF Data
  Sentence information
38 Menu Selection
  59 FTEXT.DBF Data
  Free Text information
70 COMMON.DBF Data
  Common information Conceptual Schema Hypertext is processed according to the following steps and as illustrated in FIG. 63, the Conceptual Schema Hypertext data flow diagram HYPER41 Process Conceptual Schema Hypertext View
  Process Hypertext View option. This option brings up the Edit dialog boxes in view mode.

During the performance of the Conceptual Schema Hypertext steps, input and output data consisting of the following reports, forms and data packets are entered or generated.

Figure 64:
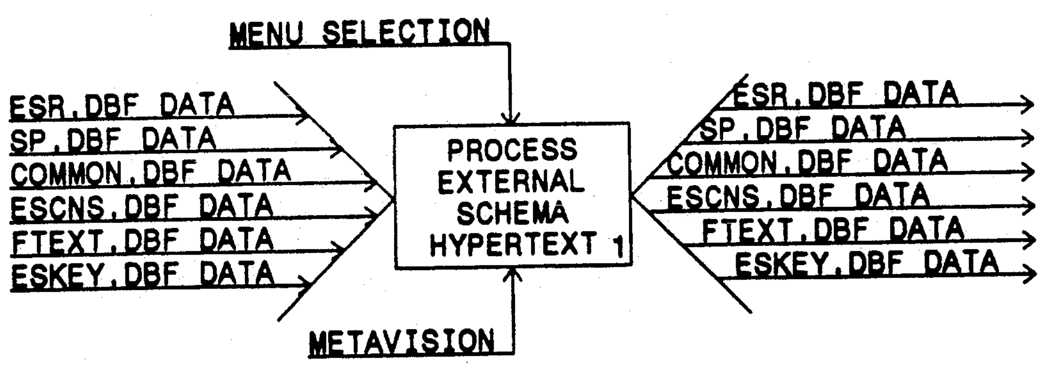
FIG. 64 is the data flow diagram.

3 SP.DBF Data
  Role/Field Information
13 CSR.DBF Data
  Conceptual Schema Record information
15 CSKEY.DBF Data
  CS Key information
17 CSCNS.DBF Data
  Conceptual Schema Constraint information
38 Menu Selection
59 FTEXT.DBF Data
  Free Text information
70 COMMON.DBF Data
  Common information HYPER5 External Schema Hypertext External Schema Hypertext is Processed according to the following steps and as illustrated in FIG. 64, the data flow diagram.

HYPER51 Process External Schema Hypertext View
  Process Hypertext View option. This option brings up the Edit dialog boxes in view mode.

During the performance of the External Schema Hypertext steps, input and output data consisting of the following reports, forms and data packets are entered or generated.

3 SP.DBF Data
  Role/Field Information
38 Menu Selection
59 FTEXT.DBF Data
  Free Text information
70 COMMON.DBF Data
  Common information
72 ESR.DBF Data
  External Schema Record Information
74 ESCNS.DBF Data
  External Schema Constraint information
76 ESKEY.DBF Data External Schema Key information

HYPER6

Figure 65:
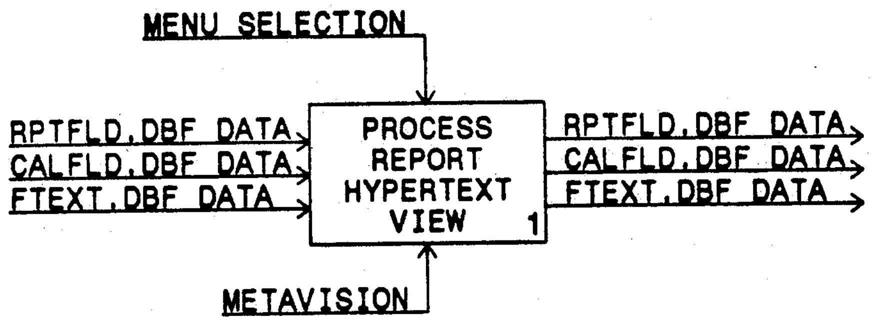
FIG. 65 is the Report Hypertext data flow diagram

Report Hypertext is Processed according to the following steps and as illustrated in FIG. 65, the Report Hypertext data flow diagram

HYPER61 Process Report Hypertext View
Process Hypertext View option. This option brings up the Edit dialog boxes in view mode.

During the performance of the Report Hypertext steps, input and output data consisting of the following reports, forms and data packets are entered or generated.

Figure 66:
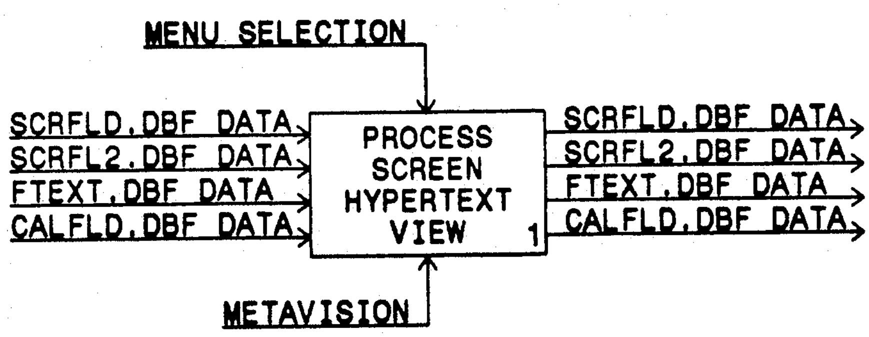
FIG. 66 is the Screen Hypertext data flow diagram

38 Menu Selection
59 FTEXT.DBF Data
Free Text information
61 RPTFLD.DBF Data
Report Field information
62 CALFLD.DBF Data
Calculated Field information Screen Hypertext is Processed according to the following steps and as illustrated in FIG. 66, the Screen Hypertext data flow diagram

HYPER71 Process Screen Hypertext View
Process Hypertext View option. This option brings up the Edit dialog boxes in view mode.

During the performance of the Screen Hypertext steps, input and output data consisting of the following reports, forms and data packets are entered or generated.

Figure 67:
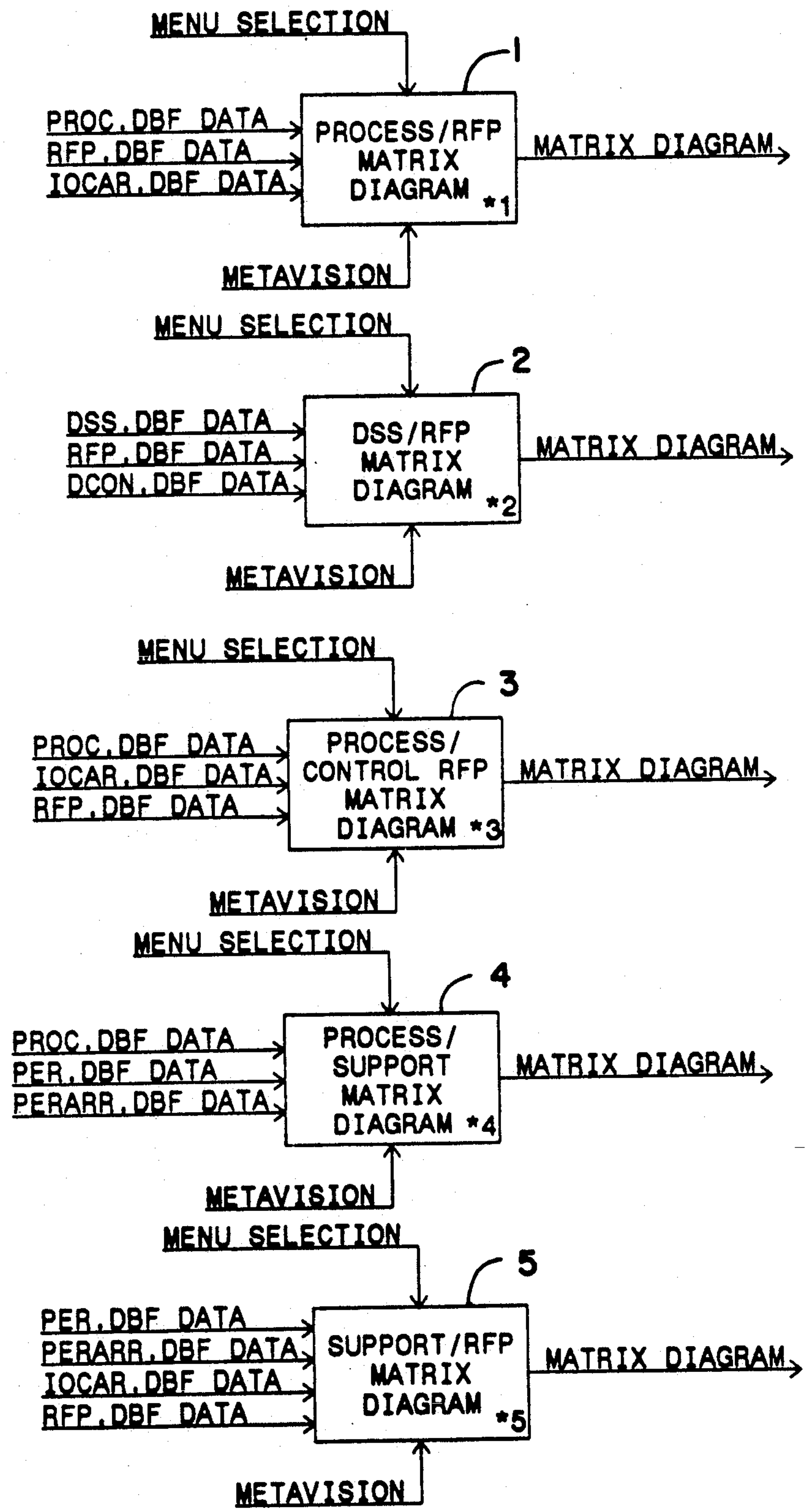
FIG. 67 is the Matrix Diagrams data flow diagram

38 Menu Selection
59 FTEXT DBF Data
Free Text information
62 CALFLD.DBF Data
Calculated Field information
65 SCRFLD.DBF Data
Screen Field information
67 SCRFL2.DBF Data
Screen Field additional information Matrix Diagrams are processed according to the following steps and as illustrated in FIG. 67, the Matrix Diagrams data flow diagram

MATRIX1 Process/RFP Matrix Diagram
This Matrix Diagram does Process versus RFP. 'C' means that the process creates the RFP, 'R' means that the process reads the RFP and 'U/D' means that the process updates or deletes the RFP.
MATRIX2 DSS/RFP Matrix Diagram
Data Source/Sinks with an RFP appearing only as input are annotated 'I', with an RFP appearing only as output are annotated 'O' and with an RFP appearing as input and output are annotated 'I/O'.
MATRIX3 Process/Control RFP Matrix Diagram
Processes with a the RFP as a Control are annotated with the RFP type.
MATRIX4 Process/Support Matrix Diagram
The Support/Process intersection is annotated with an 'X', i.e. Processes have the Support are annotated with an 'X'.
MATRIX5 Support/RFP Matrix Diagram
The Support is annotated as follows: 'C' means create, 'R' means read and 'U/D' means update/-delete. The codes may be combined if the Support has more than one capacity.

During the performance of the Matrix Diagrams steps, input and output data consisting of the following reports, forms and data packets are entered or generated.

Figure 68:
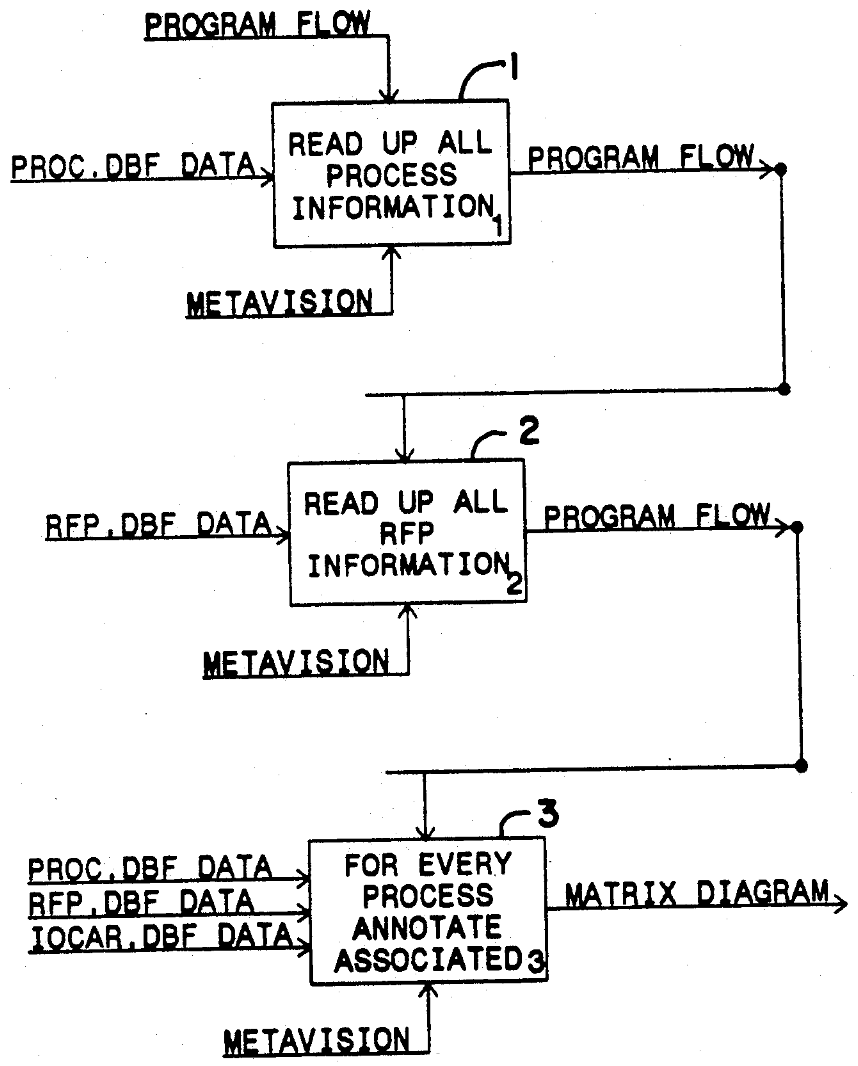
FIG. 68 is the Process/RFP Matrix Diagram data flow diagram.

31 PROC.DBF Data
Process information file
32 RFP.DBF Data
RFP information file.
33 IOCAR.DBF Data
Process/RFP relation
34 DSS.DBF Data
Data Source/Sink information
35 DCON.DBF Data
Data Source/Sink connection information.
36 PER.DBF Data
Support information
37 PERARR.DBF Data
Process/Support relation
38 Menu Selection
39 Matrix Diagram This Matrix Diagram does Process versus RFP. 'C' means that the process creates the RFP, 'R' means that the process reads the RFP and 'U/D' means that the process updates or deletes the RFP. according to the following steps and as illustrated in FIG. 68, the Process/RFP Matrix Diagram data flow diagram.

MATRIX11 Read up all Process information
Read up information about all processes to get a process count and to save process ids.
MATRIX12 Read up all RFP information
Read up all RFP information to get a count of RFP's and save RFP ids.
MATRIX13 For every Process annotate associated RFP's
Annotate 'C' if RFP is output only for process, annotate 'R' if RFP is input and/or control to process and annotate 'U/D' if RFP is input and/or control and output for process as per IOCAR.DBF.

During the performance of the Process/RFP Matrix Diagram steps, input and output data consisting of the following reports, forms and data packets are entered or generated.

Figure 69:
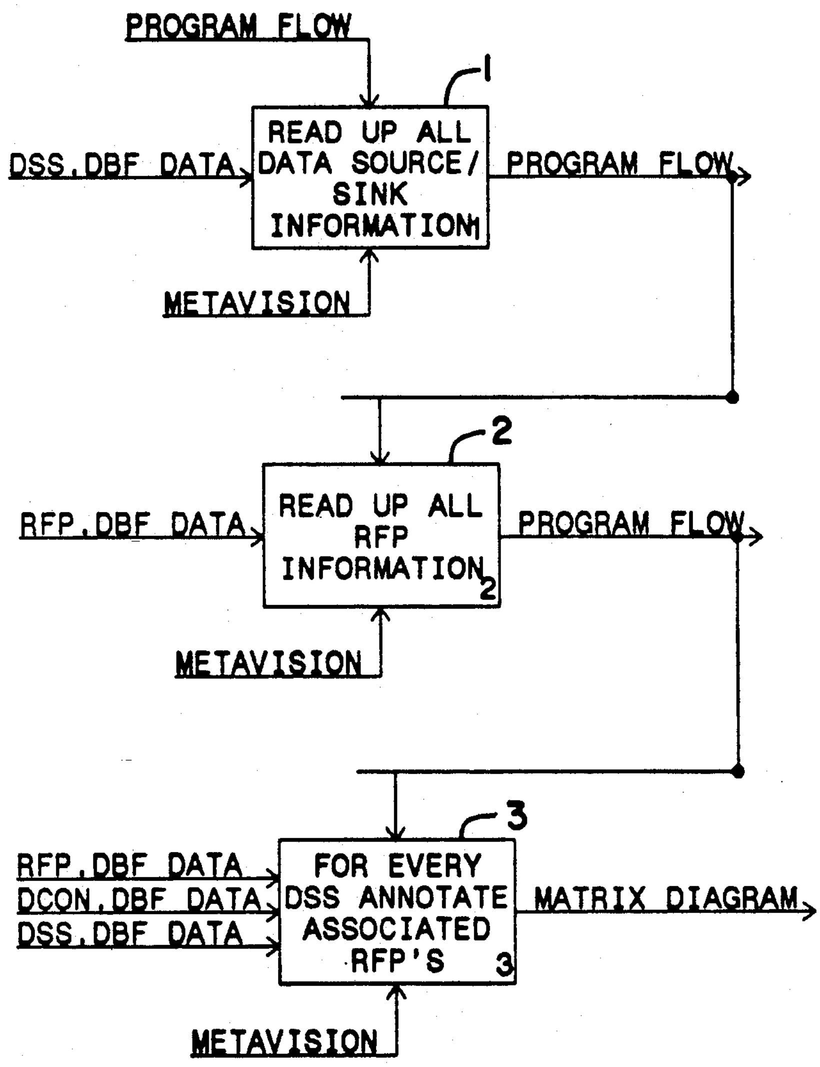
FIG. 69 is the DSS/RFP Matrix Diagram data flow diagram.

22 Program Flow
31 PROC.DBF Data
Process information file
32 RFP.DBF Data
RFP information file.
33 IOCAR.DBF Data
Process/RFP relation
39 Matrix Diagram Data Source/Sinks with an RFP appearing only as input are annoted 'I', with an RFP appearing only as output are annotated 'O' and with an RFP appearing as input and output are annotated 'I/O' according to the following steps and as illustrated in FIG. 69, the DSS/RFP Matrix Diagram data flow diagram.

MATRIX21 Read up all Data Source/Sink information
Read up information about all data source/sinks to get a DSS count and to save DSS ids.
MATRIX22 Read up all RFP information
Read up all RFP information to get a count of RFP's and save RFP ids.
MATRIX23 For every DSS annotate associated RFP's
Annotate 'O' if RFP is output only from a DSS, annotate 'I' if RFP is input only to a DSS, and annotate 'I/O' if RFP is input and output to the same DSS for all processes as per DCON.DBF.

During the performance of the DSS/RFP Matrix Diagram steps, input and output data consisting of the following reports, forms and data packets are entered or generated.

Figure 70:
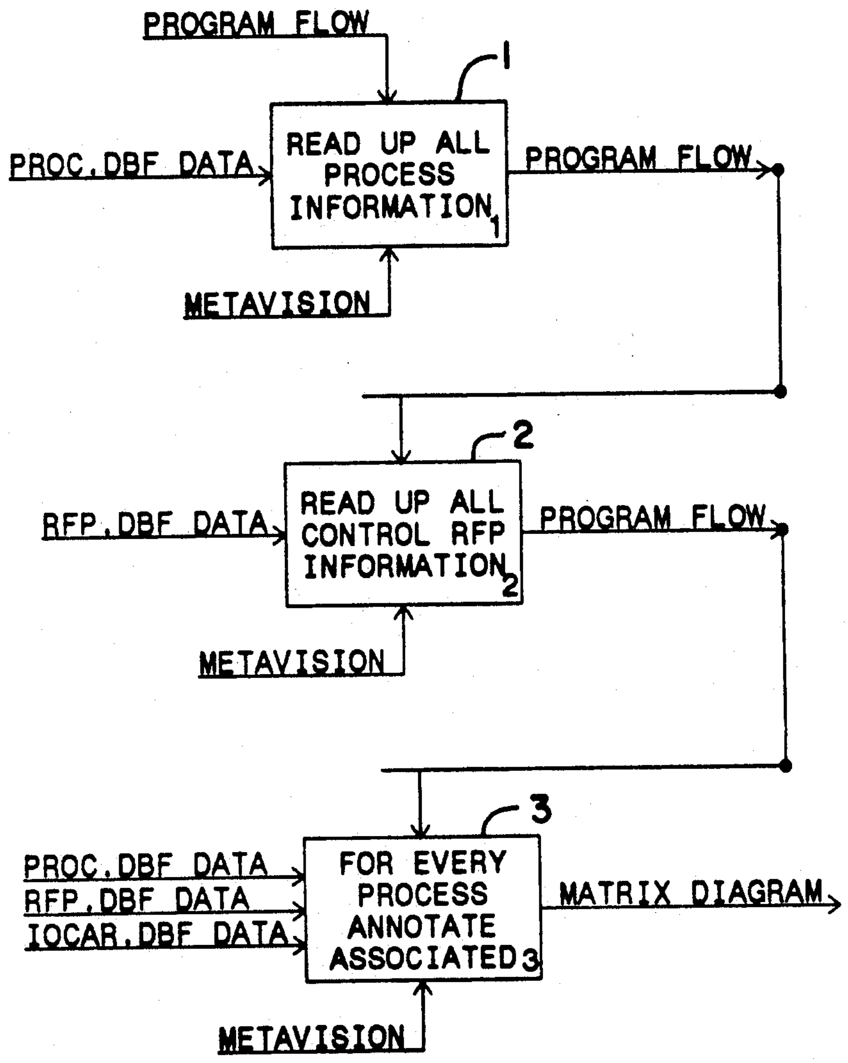
FIG. 70 is the Process/Control RFP Matrix Diagram data flow diagram.

22 Program Flow
32 RFP.DBF Data
RFP information file.
34 DSS.DBF Data
Data Source/Sink information
35 DCON.DBF Data
Data Source/Sink connection information.
39 Matrix Diagram Processes with a the RFP as a Control are annotated with the RFP type according to the following steps and as illustrated in FIG. 70, the Process/Control RFP Matrix Diagram data flow diagram.

MATRIX31 Read up all Process information
Read up information about all processes to get a process count and to save process ids.
MATRIX32 Read up all Control RFP information
Read up all Control RFP information to get a count of Control RFP's and save RFP ids.
MATRIX33 For every Process annotate associated Ctrl RFP's
Annotate each Process having a Control RFP with the RFP type as per IOCAR.DBF.

During the performance of the Process/Control RFP Matrix Diagram steps, input and output data consisting of the following reports, forms and data packets are entered or generated.

Figure 71:
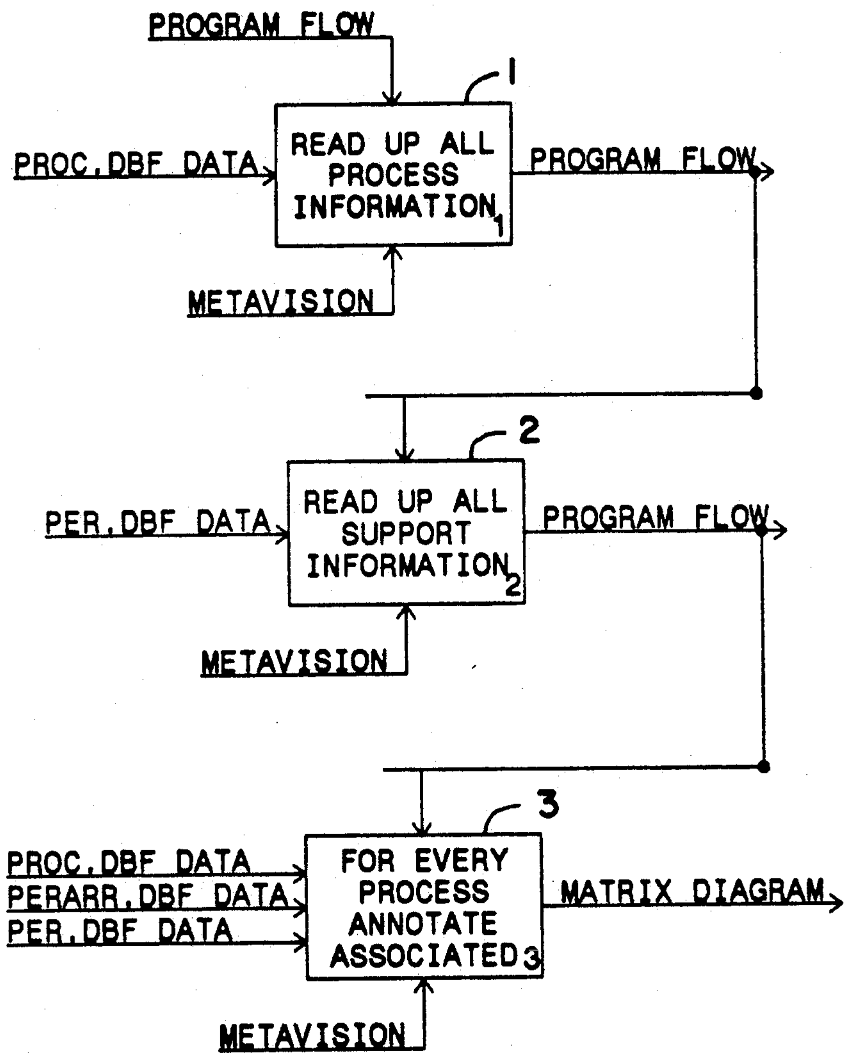
FIG. 71 is the Process/Support Matrix Diagram data flow diagram.

22 Program Flow
31 PROC.DBF Data
Process information file
32 RFP.DBF Data
RFP information file.
33 IOCAR.DB Data
Process/RFP relation
39 Matrix Diagram The Support/Process intersection is annotated with an 'X', i.e. Processes have the Support are annotated with an 'X' according to the following steps and as illustrated in FIG. 71, the Process/Support Matrix Diagram data flow diagram.

MATRIX41 Read up all Process information
Read up information about all processes to get a process count and to save process ids.
MATRIX42 Read up all Support information
Read up all Support information to get a count of Supports and to save the Support IDs.
MATRIX43 For every Process annotate associated Supports
Annotate 'X' if Support appears for a process as per PERARR.DBF.

During the performance of the Process/Support Matrix Diagram steps, input and output data consisting of the following reports, forms and data packets are entered or generated.

Figure 72:
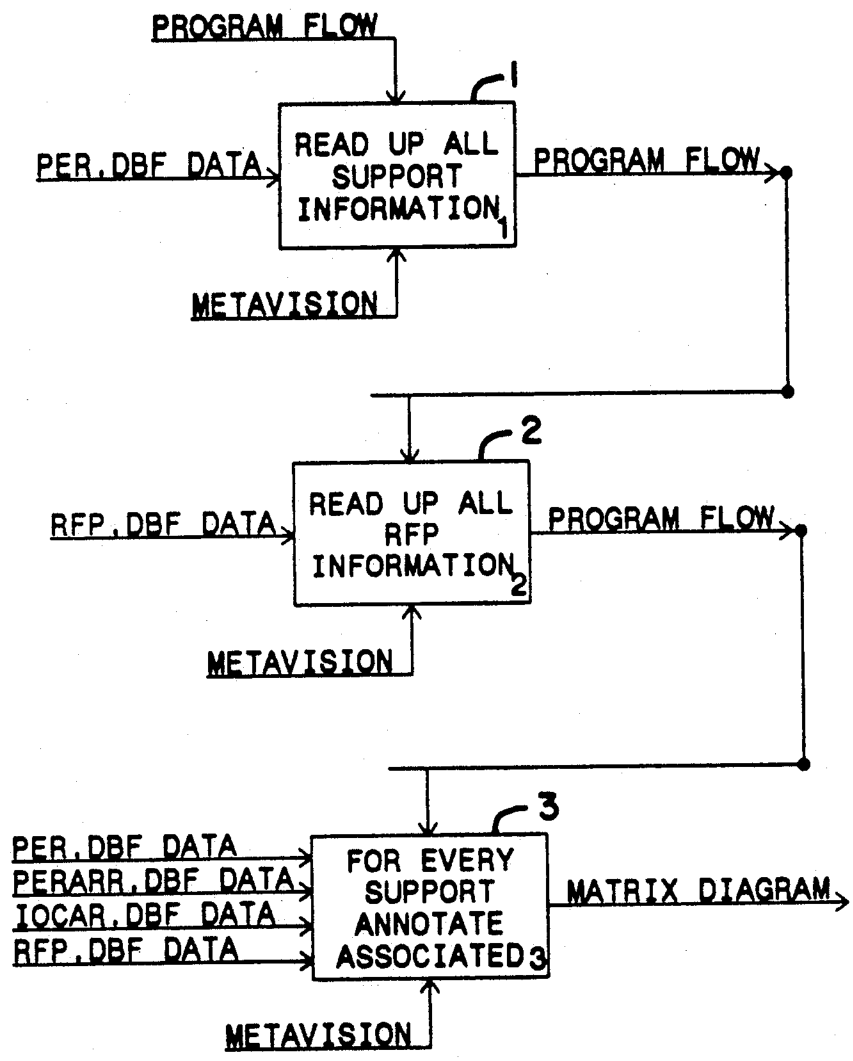
FIG. 72 is the Support/RFP Matrix Diagram data flow diagram.

22 Program Flow
31 PROC.DBF Data
Process information file
36 PER.DBF Data
Support information
37 PERARR.DBF Data
Process/Support relation
39 Matrix Diagram The Support is annotated as follows: 'C' means create, 'R' means read and 'U/D' means update/delete according to the following steps and as illustrated in FIG. 72, the Support/RFP Matrix Diagram data flow diagram. The codes may be combined if the Support has more than one capacity.

MATRIX51 Read up all Support information
Read up all Support information to get a count of Supports and to save the Support Ids.
MATRIX52 Read up all RFP information
Read up all RFP information to get a count of RFP's and to save RFP IDs.
MATRIX53 For every Support annotate associated RFP's
'C' if RFP is output only for support/process, 'R' if RFP is input and/or control for support/process and 'U/D' if RFP is input or control and output for sup/proc as per PERARR.DBF & IOCAR.DBF During the performance of the Support/RFP Matrix Diagram steps, input and output data consisting of the following reports, forms and data packets are entered or generated.

Figure 73:
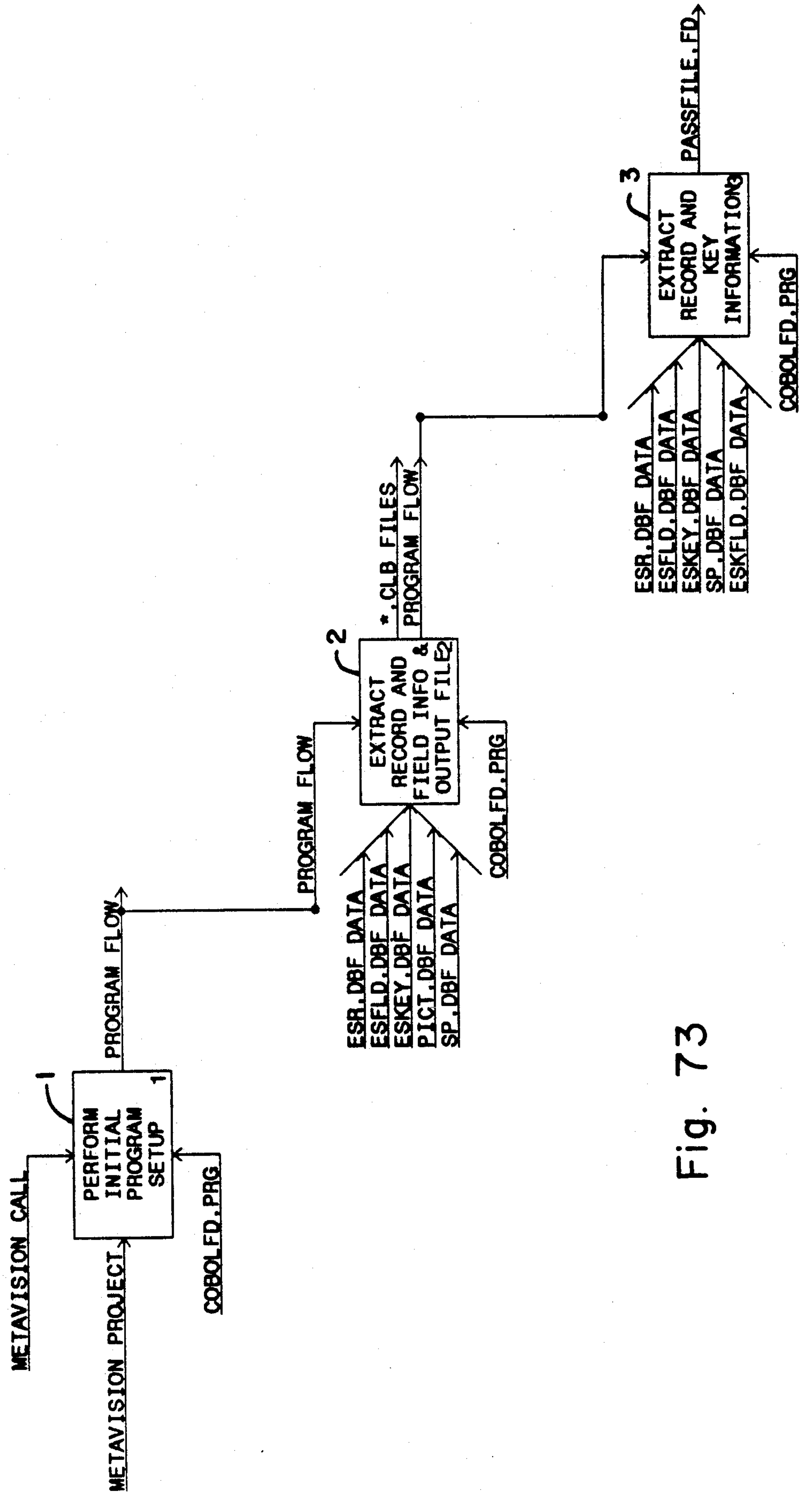
FIG. 73 is the COBOL FD Documentation data flow diagram.

22 Program Flow
32 RFP.DBF Data
RFP information file.
33 IOCAR.DBF Data
Process/RFP relation Documentation for the COBOLFD Dbase program that extracts data for all of the external schemas in a project is generated according to the following steps and as illustrated in FIG. 73, the COBOL FD Documentation data flow diagram.

1 Perform Initial Program Setup
Select files to areas, set the level strings, initialize variables, output a message to the screen that identifies the process occurring.
2 Extract record and field info & output file
Information on records and their fields is extracted for all records in a project and the information is reformatted and output to ascii files that are standard COBOL fd's
3 Extract record and key information Information is extracted for the keys for all of the records in an external schema and reformatted and output to a file that identifies the keys for each of the files comprising the schema.

Figure 74:
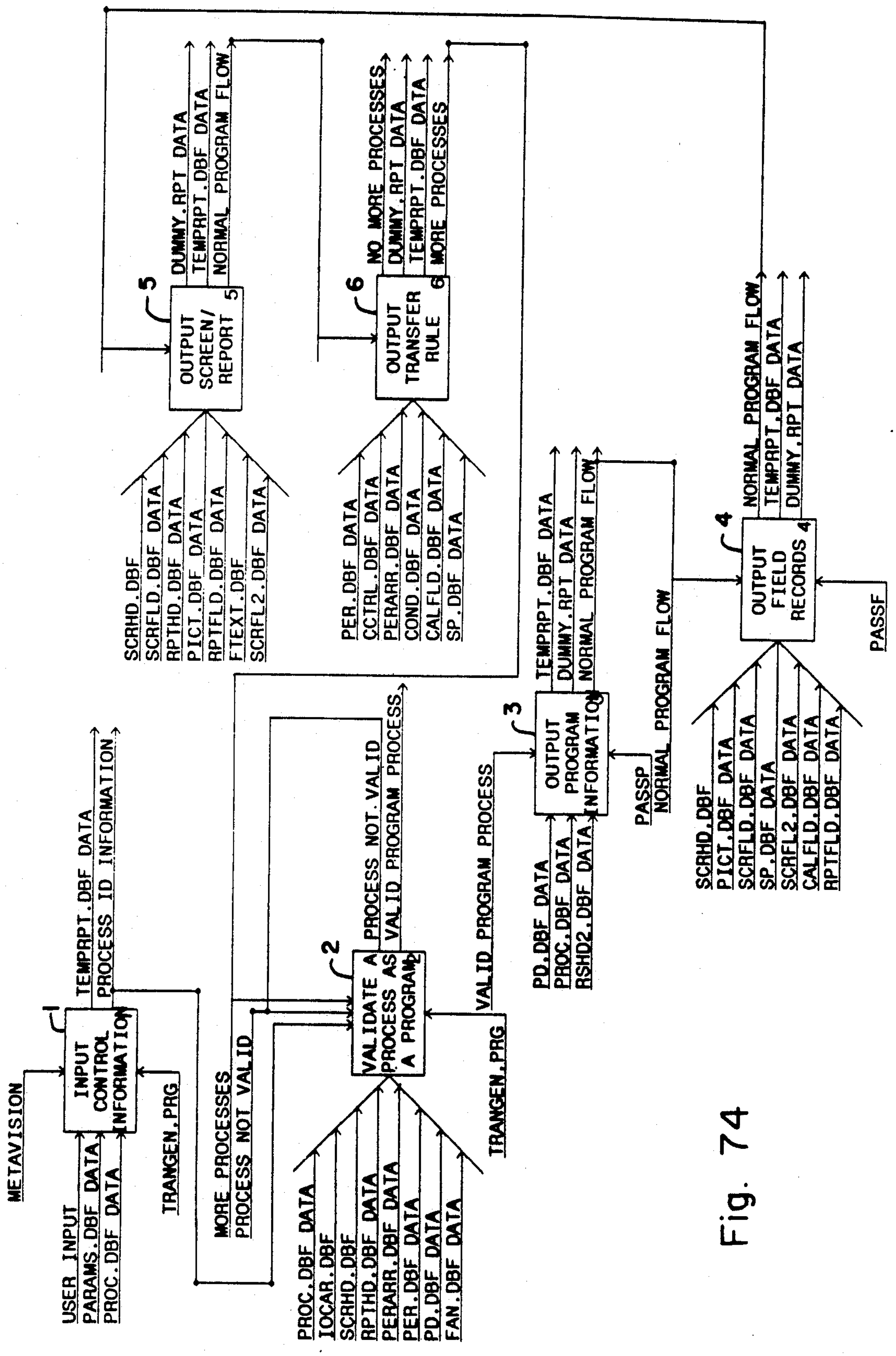
FIG. 74 is the Trangen Documentation data flow diagram.

This is documentation for the program TRANGEN.PRG that transfers data from the MetaVision Software Engineering files to the Prototyping module by creating an intermediate file that Proto. reads according to the following steps and as illustrated in FIG. 74, the Trangen Documentation data flow diagram.

1 Input control information
Control information for TRANGEN.PRG is read from the PARAMS file that contains information on the particular process(es) to be used as a basis for the transfer.

2 Validate a process as a program
Each process that meets the criteria specified in the PARAMS file is read in order to determine that the process is an automated process, with a single report or screen output and no components.

3 Output Program Information
The information relating to the process at the program level is read from the dBase files and is used to output a record to PASSFILE.TXT for the program.

4 Output field records
The field information that corresponds to the screen or report is read and used to output a series of four records per field.

5 Output screen/report 'image'
A series of records are read and a corresponding 'image' record written for each row of the screen or report to be output by the prototyped program.

6 Output transfer rule records
A record per transfer condition is output to the file PASSFILE.TXT.

This is documentation for the program TRANGEN.PRG that transfers data from the MetaVision Software Engineering files to the Prototyping module by creating an intermediate file that Proto. reads according to the following steps and as illustrated in FIG. 74, the Trangen Documentation data flow diagram.

1 Process not valid
A process has been validated valid process to serve as a basis for generating a program and has been found not to be.

2 Valid program process
A MetaVision process has been determined to be validly structured to serve as a basis for code generation.

3 Normal Program Flow
The normal flow of a program.

4 More processes
There are more to be used as a basis for generating programs.

5 No more processes
There are no more processes to be used as a basis for generating code.

6 User Input
7 PARAMS.DBF data
8 Process ID information
9 PROC.DBF Data
10 IOCAR.DBF
11 SCRHD.DBF
12 RPTHD.DBF data
13 PERARR.DBF data
14 PER.DBF data
15 PD.DBF data
16 FAN.DBF data
17 RSHD2.DBF data
18 TEMPRPT.DBF data
19 MetaVision
20 PICT.DBF data
21 SCRFLD.DBF data
22 SP.DBF data
23 SCRFL2.DBF data
24 CALFLD.DBF data
25 RPTFLD.DBF data
26 DUMMY.RPT data
27 FTEXT.DBF
29 CCTRL.DBF data
30 COND.DBF data
36 PER.DBF Data Support information
37 PERARR.DBF Data Process/Support relation
39 Matrix Diagram Although a preferred embodiment of the invention has been disclosed in detail to enable one skilled in the art to make and use this invention, it will now be understood in view of the applicants' teaching herein, that variation in operational steps, algorithm, algorithm execution, material, dimensions and geometry are contemplated as being within the scope of the present invention, which is limited only by the appended claims.

What I claim is:

1. A method for creating a business management system, including the steps of:
creating a business model by analysis of process, data, control and support for business functions within the scope of said business management system; and
generating application programs by expert system manipulation of data defining said business model.

2. A method for creating a business management system as defined in claim 1, wherein said process, data, control and support is derived by cognitive linguistic evaluation.

3. A method for creating a business management system as defined in claim 1, including the steps of:
simulating said application programs;
testing said simulation on said business model; modifying said simulation to correct deficiencies detected during said testing; and
generating application program code from said simulation.

4. A method for creating a business management system as defined in claim 1, wherein said step of creating a business model includes the steps of:
creating an existing business model defining the business as it presently exists; creating an ideal business model defining
the business as it should be ideally; comparing said existing and ideal models;
analyzing said comparison to determine what must be done to reduce disparity between said models;
determining how to accomplish what must be done to reduce said disparity between said models; and
developing a software ideal business process model including the processes identified by said step of determining how to accomplish what must be done.

5. A method for creating a business management system as defined in claim 1, including the steps of:

creating for said business model, process models containing: (1) process transformations, (2) process sequence and process descriptions, (3) supporting agents for performing process and supporting instruments used in said process, (4) people and organizational units, (5) software program modules including automated software system, (6) computer hardware, (7) manual tools and automated machines, (8) agents and instruments used to perform said processes, (9) location of supporting resource and facilities information, (10) size of supporting resources, (11) quantity of people/computers/tools performing said processes, (12) commitment of supporting resources including person/computer/tool hours spent on said process per unit of calendar time, (13) cost of supporting resource including total of (person/computer/tool, unit cost)×(resource commitment), (14) process efficiency including support time to perform job per 1 unit of output, (15) process throughput for calendar time to produce 1 unit of output, (16) process capacity in units of output=(resource commitment)×(throughput), (17) data consumed and produced by each process, (18) transfer rules controlling transfers between the processes of branching, start, stop and sequence, (19) goals, objectives, policies and procedures controlling a process, (20) quality standard indicators for controlling input data quality, including edit rules and tables, reports, forms and data quantification of name, description, form and report number, (21) collect information on sizing, volume, security, retention and source database names, and (22) model interviewees' organization with an organization chart showing formal control structure for said business model.

6. A method for creating a business management system as defined in claim 1, wherein said step of creating a business model includes the steps of:

establishing Project Management Controls by determining the project scope, personnel, responsibilities, schedules, budgets, and deliverables;

modeling the current business practices of the organization for the scope that falls within the project;

modeling the business as it should be to meet requirements;

describing what needs to be done in order to make the transition from a current system to a proposed system; and modeling how to implement changes to said proposed system by cognitive linguistic evaluation.

7. A method for creating a business management system, including the steps of:

modeling a business through the application of cognitive linguistic evaluation to develop structured data inputs to a modeling program;

running said modeling program on a microprocessor based engine for manipulating the data to create variable business models; and converting said variable business models via said microprocessor to produce application software for said business.

8. A method for creating a business management system by establishing project management controls, including the steps of:

determining the scope, objectives and benefits for a business model of management controls;

quantifying scope limits for a business model of management controls;

establishing quality indicators for objectives for said business model of management controls;

quantifying benefits for said business model of management controls;

developing a deliverables list for said business model of management controls, including a deliverables list for each phase for said business model of management controls;

establishing project reviews for said business model of management controls;

establishing a review and acceptance cycle for said business model of management controls;

establishing progress reporting for said business model of management controls;

establishing a change control procedure for said business model management controls;

developing a plan for said business model of management controls, including a detailed plan for the first phase of the project for said business model of management controls;

developing project tasks for said business model of management controls;

developing manpower loading for said business model of management controls;

developing deliverable milestones for said business model of management controls;

developing review and acceptance dates for said business model of management controls;

developing hardware availability dates for said business model of management controls;

developing resource budgets for said business model of management controls;

developing a personnel budget for said business model of management controls;

developing a facilities budget for said business model of management controls;

developing a hardware budget for said business model of management controls;

developing software packages and tools budget for said business model of management controls;

developing a money budget for said business model of management controls;

developing interview lists and schedules for said business model of management controls;

modeling current business practices for said business model of management controls;

conducting interviews to build process models for said business model of management controls;

creating process models of line management and reporting job roles by function for said business model of management controls;

creating process models of higher management levels with line management reports for said business model; and creating process models of automated computer and mechanical systems for said business of management controls.

9. A method for creating a business management system as defined in claim 8, including the steps of:

collecting user issues and problems about a current business process model;

modeling automated systems database schemas for said business model;

loading existing system database schemas as business information external schemas for said business model;

entering user supplied definitions and descriptions for database fields and record relationships for said business model;

collecting information on sizing, volume, security, retention and source database names for said business model;

summarizing and integrating process models, summarizing reports and forms and summarizing support for said business model;

summarizing first line management and worker process models up into a complete functional processes, including management control and worker execution by using a 7 plus or minus 2 rule for each functional area interviewed;

balancing summarized levels of data for said business model;

integrating summarized process models from different functional areas by summarizing them into larger complete functional processes with their controlling higher management control processes included;

observing said 7 plus or minus 2 rule if actual business follows said rule for said business model;

summarizing input and output data on higher level process diagrams by creating part-whole relationships; and collecting examples of reports, forms, databases, policies, procedures, goals and other packets of information produced, consumed or controlled during interviews for said business model.

10. A method for creating a business management system as defined in claim 1, including the steps of:

creating a question map to model business data relationships;

creating a question map to model business data relationships from created simple sentences identifying the questions the user needs to answer;

creating a question map to model business data relationships from grouped like sentences combining all similar information gathered from different sources;

creating a question map to model business data relationships from developed population tables identifying role names and set up tablets of instances;

creating a question map to model business data relationships from uniqueness constraints which eliminate duplicates from tables and ensure the proper level of specificity;

creating a question map to model business data relationships from multiple reference roles which determine a unique way to identify roles;

creating a question map to model business data relationships from integrity constraints to keep logical consistency between statements about a system and reflect how an enterprise works;

grouping the question map into a conceptual schema to create an optimal database design;

modeling menus, screens and reports for use by programs developed from a business model;

specifying fields for menu function selection for use by programs developed from said business model;

specifying detailed hardware and packaged software requirements selection for use by programs developed from said business model;

producing database design documentation for use by program developed from said business model; and generating application software system from said models for use by programs developed from said business model.

11. A method for creating a business management system, including the steps of:

creating business models with a general knowledge modeling system incorporating a four Dimensional Cognitive Modeling Expert system;

automatically generating application software systems from said business models.

12. A method for creating a business management system, as defined in claim 11, including the steps of:

creating a Metavision process model of a work group by providing a Metavision system program with the individual workers job steps for each job, the information each worker needs to know to do the job and the information produced by doing the job;

providing said Metavision system program with the goals and objectives of each job; and creating an organizational model by having users enter the names and titles of the individuals they report to.

13. A method for creating a business management system, as defined in claim 12, including the steps of:

running a Variety of Metavision analysis reports that identify job problems from the group including poor management control, lack of information needed to do a job and information bottlenecks that slow job performance;

comparing formal organization charts created in the preceding step with actual organizational controls on said process models;

changing the model based on problems identified, said changes including both improvements in the jobs performed by the workers and computer automation of job steps; and generating a list of the information for the automated systems together with its sources and relationships to information automatically generated by Metavision.

14. A method for creating a business management system, as defined in claim 13, including the steps of:

attaching automated process tags to the data generated in preceding steps; and prioritizing projects which must be done first to feed information to later systems;

15. A method for creating a business management system, as defined in claim 14, including the steps of:

selecting the kind of computer, computer language and database system that the automated system will be generated into.

16. A method for creating a business management system, as defined in claim 15, including the steps of:

selecting a project from a list of job steps to be automated; and reducing selected steps into greater detail until each job step is at a single function level of detail.

17. A method for creating a business management system, as defined in claim 16, including the steps of:

linking all the single function processes that will be automated to menus that enable a system user to select them; and generating a default menu selection system by selecting prototype menu selection processes from the Metavision product process option list.

18. A method for creating a business management system, as defined in claim 17, including the steps of:

generating a complete three schema data model for all programs, screens, menus, reports, databases and inter-programs transfers of data that is automatically generated from the set of questions that a business user requires the information system to answer;

identifying the subjects and objects in the central question sentences;

evaluating information shared between two or more question sentences;

using the answers to evaluated questions with Metavision to calculate database relations, indexes, keys, navigational paths and referential integrity constraints;

using the answers to calculate report and screen root files and relational updates; and automatically generating a third normal form logical databases design and corresponding third normal for external database structure.

19. A method for creating a business management system, as defined in claim 18, including the steps of:

selecting interface standard and hardware and software configurations to support the selected interface.

20. A method for creating a business management system as defined in claim 19, including the steps of:

selecting processes to be automated from the list; and automatically generating application program code.

* * * * *